US011018736B2

(12) United States Patent
Murakami et al.

(10) Patent No.: US 11,018,736 B2
(45) Date of Patent: *May 25, 2021

(54) SIGNAL GENERATING METHOD AND SIGNAL GENERATING APPARATUS

(71) Applicant: Sun Patent Trust, New York, NY (US)

(72) Inventors: Yutaka Murakami, Kanagawa (JP); Tomohiro Kimura, Osaka (JP); Mikihiro Ouchi, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,059

(22) Filed: Jun. 23, 2020

(65) Prior Publication Data

US 2020/0322011 A1 Oct. 8, 2020

Related U.S. Application Data

(63) Continuation of application No. 16/718,357, filed on Dec. 18, 2019, now Pat. No. 10,735,065, which is a (Continued)

(30) Foreign Application Priority Data

Sep. 8, 2011 (JP) ................................ 2011-196511

(51) Int. Cl.
*H04B 7/0456* (2017.01)
*H04B 7/0426* (2017.01)
(Continued)

(52) U.S. Cl.
CPC ......... *H04B 7/0469* (2013.01); *H04B 1/0057* (2013.01); *H04B 7/0417* (2013.01);
(Continued)

(58) Field of Classification Search
CPC .... H04B 1/005; H04B 1/0057; H04B 7/0417; H04B 7/0426; H04B 7/0456;
(Continued)

(56) References Cited

U.S. PATENT DOCUMENTS 7,006,804 B1 2/2006 Clark
7,738,590 B2 6/2010 Murakami
(Continued)

FOREIGN PATENT DOCUMENTS

JP 2008-35079 2/2008
JP 2009-194732 8/2009
(Continued)

OTHER PUBLICATIONS

International Search Report dated Oct. 2, 2012 in International (PCT) Application No. PCT/JP2012/005666.
(Continued)

*Primary Examiner* — Young T. Tse
(74) *Attorney, Agent, or Firm* — Wenderoth, Lind & Ponack, L.L.P.

(57) ABSTRACT

A transmission apparatus that (i) generates a Quadrature Phase Shift Keying (QPSK) modulation signal s1(*t*) by applying a QPSK modulation scheme to a first data sequence, (ii) generates a 16-Quadrature Amplitude Modulation (QAM) modulation signal s2(*t*) by applying a 16-QAM modulation scheme to a second data sequence, (iii) generates a transmission signal z1(*t*) and a second transmission signal z2(*t*) by applying a phase hopping process, a precoding process, and a power adjust process to the QPSK modulation signal s1(*t*) and the 16-QAM modulation signal s2(*t*), wherein an average transmission power of the 16-QAM modulation signal s2(*t*) being the same as an average transmission power of the QPSK modulation signal s1(*t*), and (iv) transmits the transmission signal z1(*t*) from a
(Continued)

first antenna at a first time and a first frequency and the second transmission signal z2(*t*) from a second antenna at the first time and the first frequency.

2 Claims, 149 Drawing Sheets

Related U.S. Application Data continuation of application No. 16/392,910, filed on Apr. 24, 2019, now Pat. No. 10,554,271, which is a continuation of application No. 16/028,642, filed on Jul. 6, 2018, now Pat. No. 10,320,458, which is a continuation of application No. 15/202,766, filed on Jul. 6, 2016, now Pat. No. 10,050,687, which is a continuation of application No. 14/703,009, filed on May 4, 2015, now Pat. No. 9,425,874, which is a continuation of application No. 14/241,130, filed as application No. PCT/JP2012/005666 on Sep. 6, 2012, now Pat. No. 9,054,757.

(51) Int. Cl.
*H04L 27/34* (2006.01)
*H04L 25/02* (2006.01)
*H04L 27/20* (2006.01)
*H04L 27/36* (2006.01)
*H04B 7/0417* (2017.01)
*H04L 5/00* (2006.01)
*H04B 1/00* (2006.01)

(52) U.S. Cl.
CPC ......... *H04B 7/0426* (2013.01); *H04B 7/0456* (2013.01); *H04B 7/0465* (2013.01); *H04L 5/00* (2013.01); *H04L 5/0048* (2013.01); *H04L 25/0222* (2013.01); *H04L 27/20* (2013.01); *H04L 27/34* (2013.01); *H04L 27/36* (2013.01); *H04L 5/0023* (2013.01); *H04L 5/0044* (2013.01)

(58) Field of Classification Search
CPC ....... H04B 7/0465; H04B 7/0469; H04L 5/00; H04L 5/0023; H04L 5/0044; H04L 5/0048; H04L 25/0222; H04L 25/024; H04L 25/0256; H04L 25/0258; H04L 27/18; H04L 27/20; H04L 27/22; H04L 27/34; H04L 27/36; H04L 27/38
USPC ....... 375/261, 267, 279–281, 298, 299, 308, 375/329, 332, 340; 329/304, 345, 347; 332/103, 144, 149, 157; 455/102, 108, 455/116, 142, 304
See application file for complete search history.

(56) References Cited

U.S. PATENT DOCUMENTS

2003/0012298 A1 1/2003 Eudes
2003/0095012 A1* 5/2003 Chethik ................ H04L 27/361 332/103
2006/0093065 A1 5/2006 Thomas et al.
2006/0285479 A1 12/2006 Han et al.
2007/0140377 A1 6/2007 Murakami et al.
2008/0186934 A1 8/2008 Khan et al.
2009/0067543 A1* 3/2009 Hsiao .................... H04L 1/0013 375/298
2009/0168730 A1 7/2009 Baum et al.
2009/0207931 A1 8/2009 Ohwatari et al.
2010/0034312 A1 2/2010 Muharemovic et al.
2010/0046445 A1 2/2010 Sawahashi
2010/0067512 A1 3/2010 Nam
2010/0150000 A1 6/2010 Sakata
2010/0183057 A1* 7/2010 Lee ...................... H04B 7/0632 375/219
2010/0322349 A1 12/2010 Lee et al.
2011/0134902 A1 6/2011 Ko
2011/0142001 A1 6/2011 Ko et al.
2011/0149945 A1 6/2011 Nakao et al.
2012/0039159 A1 2/2012 Ikeda et al.
2012/0099446 A1 4/2012 Su et al.
2012/0195264 A1 8/2012 Taoka et al.
2012/0257689 A1* 10/2012 Hong ................... H04L 5/0053 375/295
2012/0300877 A1 11/2012 Murakami
2012/0328042 A1 12/2012 Jang
2013/0039334 A1 2/2013 Han
2013/0100914 A1 4/2013 Nakamura
2014/0071952 A1 3/2014 Kim

FOREIGN PATENT DOCUMENTS

JP 2010-525655 7/2010
JP 2011-082705 4/2011
WO 2005/050885 6/2005
WO 2008/130162 10/2008

OTHER PUBLICATIONS

Hochwald et al., "Achieving Near-Capacity on a Multiple-Antenna Channel", IEEE Transactions on Communications, vol. 51, No. 3, Mar. 2003, pp. 389-399.
Lu et al., "Performance Analysis and Design Optimization of LDPC-Coded MIMO OFDM Systems", IEEE Transactions on Signal Processing, vol. 52, No. 2, Feb. 2004, pp. 348-361.
Murakami et al., "BER Performance Evaluation in 2 X 2 MIMO Spatial Multiplexing Systems under Rician Fading Channels", IEICE Trans. Fundamentals, vol. E91-A, No. 10, Oct. 2008, pp. 2798-2807.
Chen et al., "Turbo Space-Time Codes with Time Varying Linear Transformations", IEEE Transactions on Wireless Communications, vol. 6, No. 2, Feb. 2007, pp. 486-493.
Kawai et al., "Likelihood Function for QRM-MLD Suitable for Soft-Decision Turbo Decoding and Its Performance for OFCDM MIMO Multiplexing in Multipath Fading Channel", IEICE Trans. Commun., vol. E88-B, No. 1, Jan. 2005, pp. 47-57.
Isaka et al., "A tutorial on "parallel concatenated (Turbo) coding", "Turbo (iterative) decoding" and related topics", Technical Report IEICE, vol. IT98-51, 1998, with English abstract.
Galli et al., "Advanced Signal Processing for PLCs: Wavelet-OFDM", Proc. of IEEE International symposium on ISPLC 2008, 2008, pp. 187-192.
Love et al., "Limited Feedback Unitary Precoding for Spatial Multiplexing Systems", IEEE Transactions on Information Theory, vol. 51, No. 8, Aug. 2005, pp. 2967-2976.
DVB Digital Video Broadcasting, "Frame structure channel coding and modulation for a second generation digital terrestrial television boradcasting system (DVB-T2)", DVB Document A122, Jun. 2008.
Vangelista et al., "Key Technologies for Next-Generation Terrestrial Digital Television Standard DVB-T2", IEEE Communications Magazine, vol. 47, No. 10, Oct. 2009, pp. 146-153.
Ohgane et al., "Applications of Space Division Multiplexing and Those Performance in a MIMO Channel", IEICE Trans. Commun., vol. E88-B, No. 5, May 205, pp. 1843-1851.
Gallager, R., "Low-Density Parity-Check Codes", IRE Transactions on Information Theory, IT-8, pp. 21-28.
MacKay, D., "Good Error-Correcting Codes Based on Very Sparse Matrices", IEEE Transactions on Information Theory, vol. 45, No. 2, Mar. 1999, pp. 399-431.
"Digital Video Broadcasting (DVB); Second generation framing structure, channel coding and modulation systems for Broadcasting, Interactive Services, News Gathering and other broadband satellite applications", ETSI EN 302 307 V1.1.2, Jun. 2006.
Ueng et al., "A Fast-Convergence Decoding Method and Memory-Efficient VLSI Decoder Architecture for Irregular LDPC Codes in the IEEE 802.16e Standards", IEEE VTC-2007 Fall, 2007, pp. 1255-1259.

(56) References Cited

OTHER PUBLICATIONS

Alamouti, S., "A Simple Transmit Diversity Technique for Wireless Communications", IEEE Journal on Select Areas in Communications, vol. 16, No. 8, Oct. 1998, pp. 1451-1458.
Tarokh et al., "Space-Time Block Coding for Wireless Communications: Performance Results", IEEE Journal on Selected Areas in Communications, vol. 17, No. 3, Mar. 1999, pp. 451-460.

* cited by examiner

FIG. 23- PRIOR ART
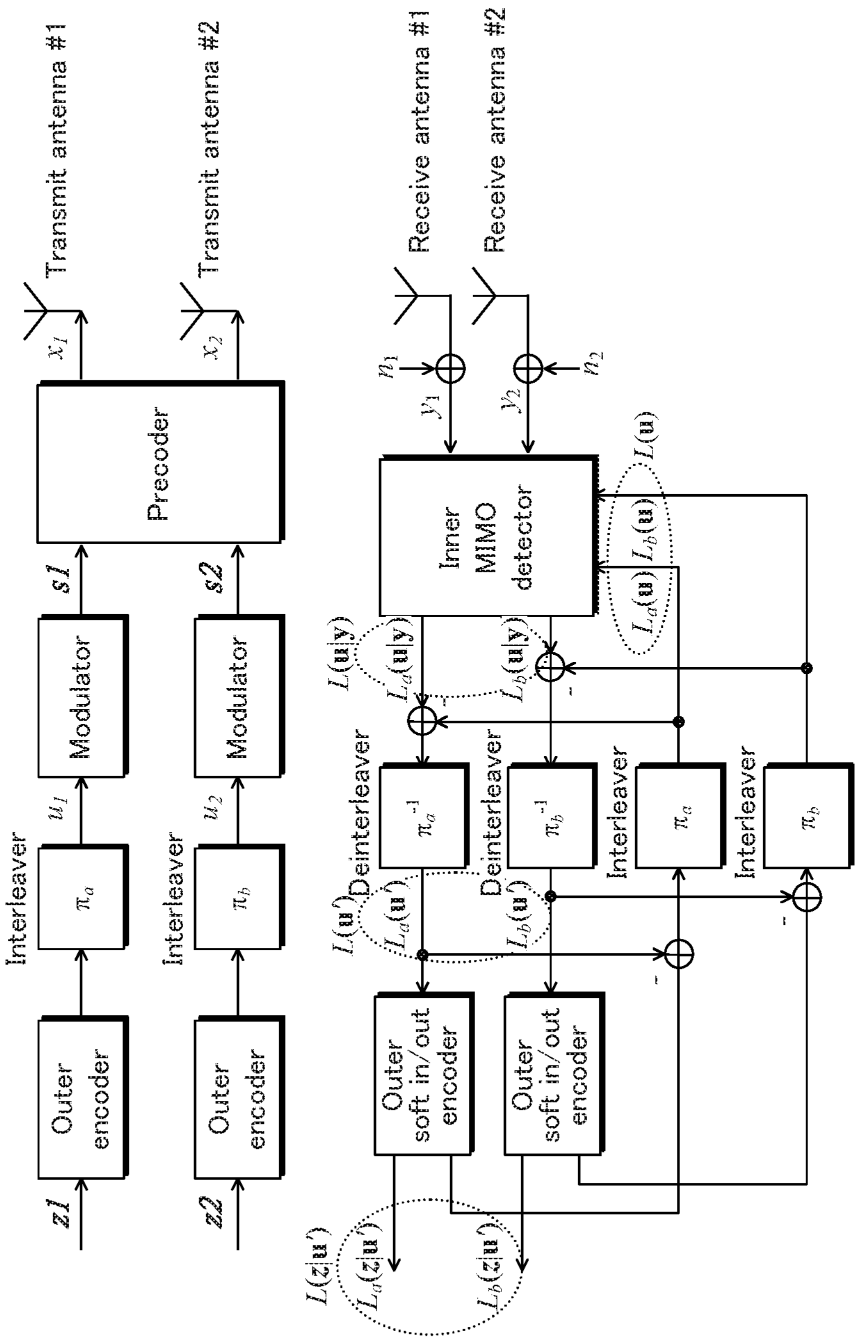

FIG. 24A - PRIOR ART
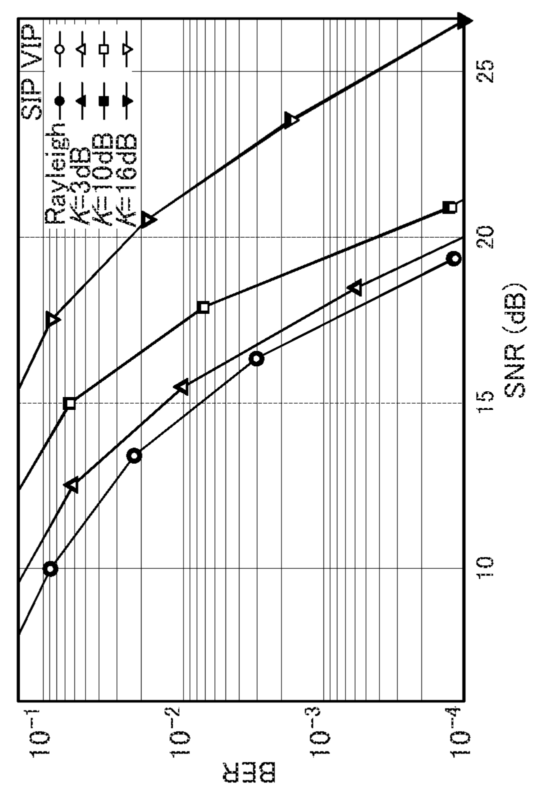
FIG. 24B- PRIOR ART
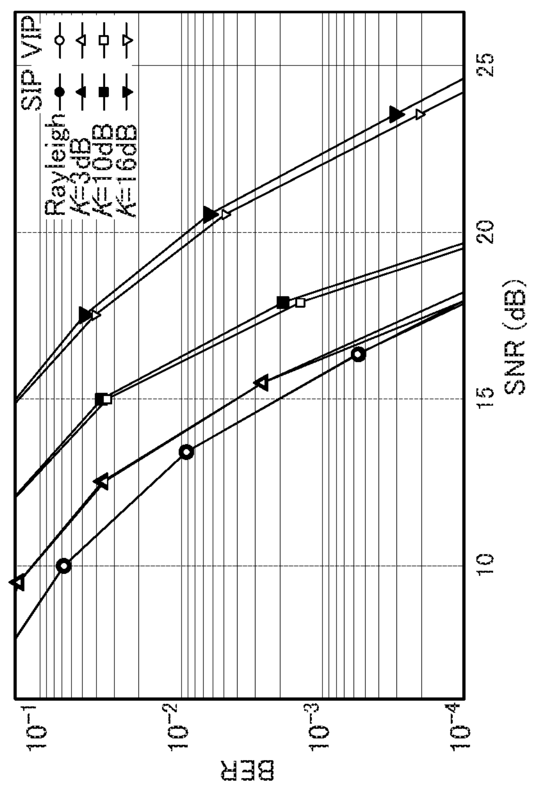

Sample variations of phase changing formulae y1(t), y2(t) used by phase changers

| timestamp u | timestamp u+1 | timestamp u+2 | timestamp u+3 | | timestamp u+k | |
|---|---|---|---|---|---|---|
| $y_1(u)=e^{j0}$ | $y_1(u+1)=e^{j\frac{\pi}{4}}$ | $y_1(u+2)=e^{j\frac{\pi}{2}}$ | $y_1(u+3)=e^{j\frac{3\pi}{4}}$ | ... | $y_1(u+k)=e^{j\frac{k\pi}{4}}$ | ... |
| $y_2(u)=e^{-j\frac{\pi}{2}}$ | $y_2(u+1)=e^{-j\frac{3\pi}{4}}$ | $y_2(u+2)=e^{-j\pi}$ | $y_2(u+3)=e^{-j\frac{5\pi}{4}}$ | ... | $y_2(u+k)=e^{j\left(-\frac{k\pi}{4}-\frac{\pi}{2}\right)}$ | ... |

Sample variations of phase changing formulae y1(t), y2(t) used by phase changers

| timestamp u | timestamp u+1 | timestamp u+2 | timestamp u+3 | | timestamp u+k | |
|---|---|---|---|---|---|---|
| $y_1(u)=e^{j0}$ | $y_1(u+1)=e^{j\frac{\pi}{4}}$ | $y_1(u+2)=e^{j\frac{\pi}{2}}$ | $y_1(u+3)=e^{j\frac{3\pi}{4}}$ | ... | $y_1(u+k)=e^{j\frac{k\pi}{4}}$ | ... |
| $y_2(u)=e^{-j\frac{\pi}{2}}$ | $y_2(u+1)=e^{-j\frac{3\pi}{4}}$ | $y_2(u+2)=e^{-j\pi}$ | $y_2(u+3)=e^{-j\frac{5\pi}{4}}$ | ... | $y_2(u+k)=e^{j\left(\frac{k\pi}{4}-\frac{\pi}{2}\right)}$ | ... |

FIG. 87

Cycle of phase change: 3

| s1(t) | QPSK | QPSK | QPSK | 16QAM | 16QAM | 16QAM | QPSK | QPSK | QPSK | 16QAM | 16QAM | 16QAM | ··· |
|---|---|---|---|---|---|---|---|---|---|---|---|---|---|
| s2(t) | 16QAM | 16QAM | 16QAM | QPSK | QPSK | QPSK | 16QAM | 16QAM | 16QAM | QPSK | QPSK | QPSK | ··· |
| Power changer (8501A) | v=a | v=a | v=a | v=b | v=b | v=b | v=a | v=a | v=a | v=b | v=b | v=b | ··· |
| Power changer (8501B) | u=b | u=b | u=b | u=a | u=a | u=a | u=b | u=b | u=b | u=a | u=a | u=a | ··· |
| Phase changing value | y[0] | y[1] | y[2] | y[0] | y[1] | y[2] | y[0] | y[1] | y[2] | y[0] | y[1] | y[2] | ··· |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ··· |

Cycle of phase change: 6=3×2
(when taking phase change and
switching between modulation
schemes into consideration)

FIG. 88

Cycle of phase change: 3

| | | | | | | | | | | | | | |
|---|---|---|---|---|---|---|---|---|---|---|---|---|---|
| s1(t) | QPSK | 16QAM | QPSK | 16QAM | QPSK | 16QAM | QPSK | 16QAM | QPSK | 16QAM | QPSK | 16QAM | ... |
| s2(t) | 16QAM | QPSK | 16QAM | QPSK | 16QAM | QPSK | 16QAM | QPSK | 16QAM | QPSK | 16QAM | QPSK | ... |
| Power changer (8501A) | v=a | v=b | v=a | v=b | v=a | v=b | v=a | v=b | v=a | v=b | v=a | v=b | ... |
| Power changer (8501B) | u=b | u=a | u=b | u=a | u=b | u=a | u=b | u=a | u=b | u=a | u=b | u=a | ... |
| Phase changing value | y[0] | y[1] | y[2] | y[0] | y[1] | y[2] | y[0] | y[1] | y[2] | y[0] | y[1] | y[2] | ... |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ... |

Cycle of phase change: 6=3×2 (when taking phase change and switching between modulation schemes into consideration)

FIG. 91

Cycle of phase change: 3

| s1(t) | QPSK | | | | | | | | | | | | ... |
|---|---|---|---|---|---|---|---|---|---|---|---|---|---|
| s2(t) | 16QAM | | | | | | | | | | | | ... |
| Ω1(t) | QPSK | QPSK | QPSK | 16QAM | 16QAM | 16QAM | QPSK | QPSK | QPSK | 16QAM | 16QAM | 16QAM | ... |
| Ω2(t) | 16QAM | 16QAM | 16QAM | QPSK | QPSK | QPSK | 16QAM | 16QAM | 16QAM | QPSK | QPSK | QPSK | ... |
| Power changer (8501A) | v=a | v=a | v=a | v=b | v=b | v=b | v=a | v=a | v=a | v=b | v=b | v=b | ... |
| Power changer (8501B) | u=b | u=b | u=b | u=a | u=a | u=a | u=b | u=b | u=b | u=a | u=a | u=a | ... |
| Phase changing value | y[0] | y[1] | y[2] | y[0] | y[1] | y[2] | y[0] | y[1] | y[2] | y[0] | y[1] | y[2] | ... |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ... |

Cycle of phase change: 6=3×2 (when taking phase change and switching between modulation schemes into consideration)

FIG. 92

Cycle of phase change: 3

| | | | | | | | | | | | | | |
|---|---|---|---|---|---|---|---|---|---|---|---|---|---|
| s1(t) | QPSK | | | | | | | | | | | | ... |
| s2(t) | 16QAM | | | | | | | | | | | | ... |
| Ω1(t) | QPSK | 16QAM | QPSK | 16QAM | QPSK | 16QAM | QPSK | 16QAM | QPSK | 16QAM | QPSK | 16QAM | ... |
| Ω2(t) | 16QAM | QPSK | 16QAM | QPSK | 16QAM | QPSK | 16QAM | QPSK | 16QAM | QPSK | 16QAM | QPSK | ... |
| Power changer (8501A) | v=a | v=b | v=a | v=b | v=a | v=b | v=a | v=b | v=a | v=b | v=a | v=b | ... |
| Power changer (8501B) | u=b | u=a | u=b | u=a | u=b | u=a | u=b | u=a | u=b | u=a | u=b | u=a | ... |
| Phase changing value | y[0] | y[1] | y[2] | y[0] | y[1] | y[2] | y[0] | y[1] | y[2] | y[0] | y[1] | y[2] | ... |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ... |

Cycle of phase change: 6=3×2 (when taking phase change and switching between modulation schemes into consideration)

Period (cycle) of phase change : 3

| | | | | | | | | | | | | | |
|---|---|---|---|---|---|---|---|---|---|---|---|---|---|
| s1(t) | 8QAM | | | | | | | | | | | | ··· |
| s2(t) | 8QAM | | | | | | | | | | | | ··· |
| Phase change value | y[0] | y[1] | y[2] | y[0] | y[1] | y[2] | y[0] | y[1] | y[2] | y[0] | y[1] | y[2] | ··· |
| r1(t) | z1(t=0) | z1(t=1) | z1(t=2) | z2(t=3) | z2(t=4) | z2(t=5) | z1(t=6) | z1(t=7) | z1(t=8) | z2(t=9) | z2(t=10) | z2(t=11) | ··· |
| r2(t) | z2(t=0) | z2(t=1) | z2(t=2) | z1(t=3) | z1(t=4) | z1(t=5) | z2(t=6) | z2(t=7) | z2(t=8) | z1(t=9) | z1(t=10) | z1(t=11) | ··· |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ··· |

Period (cycle) in consideration of phase change and baseband signal switching : 6=3x2

FIG. 102

Period (cycle) of phase change : 3

| s1(t) | 8QAM | | | | | | | | | | | ··· |
|---|---|---|---|---|---|---|---|---|---|---|---|---|
| s2(t) | 8QAM | | | | | | | | | | | ··· |
| Phase change value | y[0] | y[1] | y[2] | y[0] | y[1] | y[2] | y[0] | y[1] | y[2] | y[0] | y[1] | y[2] | ··· |
| r1(t) | z1(t=0) | z2(t=1) | z1(t=2) | z2(t=3) | z1(t=4) | z2(t=5) | z1(t=6) | z2(t=7) | z1(t=8) | z2(t=9) | z1(t=10) | z2(t=11) | ··· |
| r2(t) | z2(t=0) | z1(t=1) | z2(t=2) | z1(t=3) | z2(t=4) | z1(t=5) | z2(t=6) | z1(t=7) | z2(t=8) | z1(t=9) | z2(t=10) | z1(t=11) | ··· |
| Time (Frequency) | t=0 (f=f0) | t=1 (f=f1) | t=2 (f=f2) | t=3 (f=f3) | t=4 (f=f4) | t=5 (f=f5) | t=6 (f=f6) | t=7 (f=f7) | t=8 (f=f8) | t=9 (f=f9) | t=10 (f=f10) | t=11 (f=f11) | ··· |

Period (cycle) in consideration of phase change and baseband signal switching : 6=3x2

FIG. 139

CSI (Channel State Information) :

| CQI (Channel Quality Information) | RI (Rank Indication) | PSI (Phase Shift Information) |
|---|---|---|

SIGNAL GENERATING METHOD AND SIGNAL GENERATING APPARATUS

CROSS-REFERENCE TO RELATED APPLICATIONS

This application is based on the application No. 2011-196511 filed Sep. 8, 2011 in Japan, the claims, the specification, the drawings, and the abstract of which are hereby incorporated by reference.

TECHNICAL FIELD

The present invention relates to a transmission device and a reception device for communication using multiple antennas.

BACKGROUND ART

A MIMO (Multiple-Input, Multiple-Output) system is an example of a conventional communication system using multiple antennas. In multi-antenna communication, of which the MIMO system is typical, multiple transmission signals are each modulated, and each modulated signal is simultaneously transmitted from a different antenna in order to increase the transmission speed of the data.

FIG. 23 illustrates a sample configuration of a transmission and reception device having two transmit antennas and two receive antennas, and using two transmit modulated signals (transmit streams). In the transmission device, encoded data are interleaved, the interleaved data are modulated, and frequency conversion and the like are performed to generate transmission signals, which are then transmitted from antennas. In this case, the scheme for simultaneously transmitting different modulated signals from different transmit antennas at the same time and on a common frequency is a spatial multiplexing MIMO system.

In this context, Patent Literature 1 suggests using a transmission device provided with a different interleaving pattern for each transmit antenna. That is, the transmission device from FIG. 23 should use two distinct interleaving patterns performed by two interleavers ($\pi_a$ and $\pi_b$). As for the reception device, Non-Patent Literature 1 and Non-Patent Literature 2 describe improving reception quality by iteratively using soft values for the detection scheme (by the MIMO detector of FIG. 23).

As it happens, models of actual propagation environments in wireless communications include NLOS (Non Line-Of-Sight), typified by a Rayleigh fading environment is representative, and LOS (Line-Of-Sight), typified by a Rician fading environment. When the transmission device transmits a single modulated signal, and the reception device performs maximal ratio combination on the signals received by a plurality of antennas and then demodulates and decodes the resulting signals, excellent reception quality can be achieved in a LOS environment, in particular in an environment where the Rician factor is large. The Rician factor represents the received power of direct waves relative to the received power of scattered waves. However, depending on the transmission system (e.g., a spatial multiplexing MIMO system), a problem occurs in that the reception quality deteriorates as the Rician factor increases (see Non-Patent Literature 3).

FIGS. 24A and 24B illustrate an example of simulation results of the BER (Bit Error Rate) characteristics (vertical axis: BER, horizontal axis: SNR (signal-to-noise ratio) for data encoded with LDPC (low-density parity-check) codes and transmitted over a 2×2 (two transmit antennas, two receive antennas) spatial multiplexing MIMO system in a Rayleigh fading environment and in a Rician fading environment with Rician factors of K=3, 10, and 16 dB. FIG. 24A gives the Max-Log approximation-based log-likelihood ratio (Max-log APP) BER characteristics without iterative detection (see Non-Patent Literature 1 and Non-Patent Literature 2), while FIG. 24B gives the Max-log APP BER characteristic with iterative detection (see Non-Patent Literature 1 and Non-Patent Literature 2) (number of iterations: five). FIGS. 24A and 24B clearly indicate that, regardless of whether or not iterative detection is performed, reception quality degrades in the spatial multiplexing MIMO system as the Rician factor increases. Thus, the problem of reception quality degradation upon stabilization of the propagation environment in the spatial multiplexing MIMO system, which does not occur in a conventional single-modulation signal system, is unique to the spatial multiplexing MIMO system.

Broadcast or multicast communication is a service applied to various propagation environments. The radio wave propagation environment between the broadcaster and the receivers belonging to the users is often a LOS environment. When using a spatial multiplexing MIMO system having the above problem for broadcast or multicast communication, a situation may occur in which the received electric field strength is high at the reception device, but in which degradation in reception quality makes service reception difficult. In other words, in order to use a spatial multiplexing MIMO system in broadcast or multicast communication in both the NLOS environment and the LOS environment, a MIMO system that offers a certain degree of reception quality is desirable.

Non-Patent Literature 8 describes a scheme for selecting a codebook used in precoding (i.e. a precoding matrix, also referred to as a precoding weight matrix) based on feedback information from a communication party. However, Non-Patent Literature 8 does not at all disclose a scheme for precoding in an environment in which feedback information cannot be acquired from the other party, such as in the above broadcast or multicast communication.

On the other hand, Non-Patent Literature 4 discloses a scheme for switching the precoding matrix over time. This scheme is applicable when no feedback information is available. Non-Patent Literature 4 discloses using a unitary matrix as the precoding matrix, and switching the unitary matrix at random, but does not at all disclose a scheme applicable to degradation of reception quality in the above-described LOS environment. Non-Patent Literature 4 simply recites hopping between precoding matrices at random. Obviously, Non-Patent Literature 4 makes no mention whatsoever of a precoding method, or a structure of a precoding matrix, for remedying degradation of reception quality in a LOS environment.

CITATION LIST

Patent Literature

[Patent Literature 1]
International Patent Application Publication No. WO2005/050885

Non-Patent Literature

[Non-Patent Literature 1]
"Achieving near-capacity on a multiple-antenna channel" IEEE Transaction on communications, vol. 51, no. 3, pp. 389-399, March 2003

[Non-Patent Literature 2]

"Performance analysis and design optimization of LDPC-coded MIMO OFDM systems" IEEE Trans. Signal Processing, vol. 52, no. 2, pp. 348-361, February 2004

[Non-Patent Literature 3]

"BER performance evaluation in 2×2 MIMO spatial multiplexing systems under Rician fading channels" IEICE Trans. Fundamentals, vol. E91-A, no. 10, pp. 2798-2807, October 2008

[Non-Patent Literature 4]

"Turbo space-time codes with time varying linear transformations" IEEE Trans. Wireless communications, vol. 6, no. 2, pp. 486-493, February 2007

[Non-Patent Literature 5]

"Likelihood function for QR-MLD suitable for soft-decision turbo decoding and its performance" IEICE Trans. Commun., vol. E88-B, no. 1, pp. 47-5'7, January 2004

[Non-Patent Literature 6]

"A tutorial on 'Parallel concatenated (Turbo) coding', 'Turbo (iterative) decoding' and related topics" IEICE, Technical Report IT98-51

[Non-Patent Literature 7]

"Advanced signal processing for PLCs: Wavelet-OFDM" Proc. of IEEE International symposium on ISPLC 2008, pp. 187-192, 2008

[Non-Patent Literature 8]

D. J. Love and R. W. Heath Jr., "Limited feedback unitary precoding for spatial multiplexing systems" IEEE Trans. Inf. Theory, vol. 51, no. 8, pp. 1967-1976, August 2005

[Non-Patent Literature 9]

DVB Document A122, Framing structure, channel coding and modulation for a second generation digital terrestrial television broadcasting system (DVB-T2), June 2008

[Non-Patent Literature 10]

L. Vangelista, N. Benvenuto, and S. Tomasin "Key technologies for next-generation terrestrial digital television standard DVB-T2," IEEE Commun. Magazine, vol. 47, no. 10, pp. 146-153, October 2009

[Non-Patent Literature 11]

T. Ohgane, T. Nishimura, and Y. Ogawa, "Application of space division multiplexing and those performance in a MIMO channel" IEICE Trans. Commun., vol. 88-B, no. 5, pp. 1843-1851, May 2005

[Non-Patent Literature 12]

R. G. Gallager "Low-density parity-check codes," IRE Trans. Inform. Theory, IT-8, pp. 21-28, 1962

[Non-Patent Literature 13]

D. J. C. Mackay, "Good error-correcting codes based on very sparse matrices," IEEE Trans. Inform. Theory, vol. 45, no. 2, pp. 399-431, March 1999.

[Non-Patent Literature 14]

ETSI EN 302 307, "Second generation framing structure, channel coding and modulation systems for broadcasting, interactive services, news gathering and other broadband satellite applications" v.1.1.2, June 2006

[Non-Patent Literature 15]

Y.-L. Ueng, and C.-C. Cheng "A fast-convergence decoding method and memory-efficient VLSI decoder architecture for irregular LDPC codes in the IEEE 802.16e standards" IEEE VTC-2007 Fall, pp. 1255-1259

[Non-Patent Literature 16]

S. M. Alamouti "A simple transmit diversity technique for wireless communications" IEEE J. Select. Areas Commun., vol. 16, no. 8, pp. 1451-1458, October 1998

[Non-Patent Literature 17]

V. Tarokh, H. Jafrkhani, and A. R. Calderbank "Space-time block coding for wireless communications: Performance results" IEEE J. Select. Areas Commun., vol. 17, no. 3, no. 3, pp. 451-460, March 1999

SUMMARY OF INVENTION

Technical Problem

An object of the present invention is to provide a MIMO system that improves reception quality in a LOS environment.

Solution to Problem

The present invention provides a signal generation method for generating, from a plurality of baseband signals, a plurality of signals to be transmitted from a plurality of antennas at the same frequency and at the same time, and for generating a plurality of pilot signals to be transmitted from the plurality of antennas at the same frequency and at the same time, the signal generation method comprising: generating a first baseband signal s1 from a first set of bits, and generating a second baseband signal s2 from a second set of bits; performing phase change on each of the first baseband signal s1 and the second baseband signal s2, thus generating a first phase-changed baseband signal s1' and a second phase-changed baseband signal s2'; applying weighting according to a predetermined matrix F to the first phase-changed baseband signal s1' and the second phase-changed baseband signal s2', thus generating a first weighted signal z1 and a second weighted signal z2; performing power change on the first weighted signal z1 and the second weighted signal z2, thus generating a first power-changed signal z1' and a second power-changed signal z2' as the plurality of signals to be transmitted at the same frequency and at the same time; and generating a first pilot signal p1 and a second pilot signal p2, the first pilot signal p1 being a pilot signal to be transmitted from the same antenna as the first power-changed signal z1', and the second pilot signal p2 being a pilot signal to be transmitted from the same antenna as the second power-changed signal z2', wherein the first weighted signal z1 and the second weighted signal z2 satisfy the relation: (z1, z2)T=F(s1', s2')T, and a ratio of an average power of the first power-changed signal z1' to an average power of the second power-changed signal z2' differs from a ratio of an average power of the first pilot signal p1 to an average power of the second pilot signal p2.

The present invention also provides a signal generation apparatus for generating, from a plurality of baseband signals, a plurality of signals to be transmitted from a plurality of antennas at the same frequency and at the same time, and for generating a plurality of pilot signals to be transmitted from the plurality of antennas at the same frequency and at the same time, the signal generation apparatus comprising: a mapper generating a first baseband signal s1 from a first set of bits, and generating a second baseband signal s2 from a second set of bits; a phase changer performing phase change on each of the first baseband signal s1 and the second baseband signal s2, thus generating a first phase-changed baseband signal s1' and a second phase-changed baseband signal s2'; a weighting unit applying weighting according to a predetermined matrix F to the first phase-changed baseband signal s1' and the second phase-changed baseband signal s2', thus generating a first weighted signal z1 and a second weighted signal z2; a power changer performing power change on the first weighted signal z1 and the second weighted signal z2, thus generating a first power-changed signal z1' and a second power-changed signal z2' as the plurality of signals to be transmitted at the same frequency and at the same time; and a pilot inserter generating a first pilot signal p1 and a second pilot signal p2, the first pilot signal p1 being a pilot signal to be transmitted from the same antenna as the first power-changed signal z1', and the second pilot signal p2 being a pilot signal to be transmitted from the same antenna as the second power-changed signal z2', wherein the first weighted signal z1 and the second weighted signal z2 satisfy the relation: $(z1, z2)^T=F(s1', s2')^T$, and a ratio of an average power of the first power-changed signal z1' to an average power of the second power-changed signal z2' differs from a ratio of an average power of the first pilot signal p1 to an average power of the second pilot signal p2.

Advantageous Effects of Invention

According to the above structure, the present invention provides a signal generation method and a signal generation apparatus that remedy degradation of reception quality in a LOS environment, thereby providing high-quality service to LOS users during broadcast or multicast communication.

BRIEF DESCRIPTION OF DRAWINGS

FIG. 23 illustrates another example of a transmission and reception device in a spatial multiplexing MIMO system.

FIGS. 24A and 24B illustrate sample BER characteristics.

FIG. 87 shows the modulation scheme, the power changing value and the phase changing value to be set at each time.

FIG. 88 shows the modulation scheme, the power changing value and the phase changing value to be set at each time.

FIG. 91 shows the modulation scheme, the power changing value and the phase changing value to be set at each time.

FIG. 92 shows the modulation scheme, the power changing value and the phase changing value to be set at each time.

FIG. 101 shows the modulation scheme, the power changing value and the phase changing value to be set at each time.

FIG. 102 shows the modulation scheme, the power changing value and the phase changing value to be set at each time.

Q delay is applied.

Figure 112:
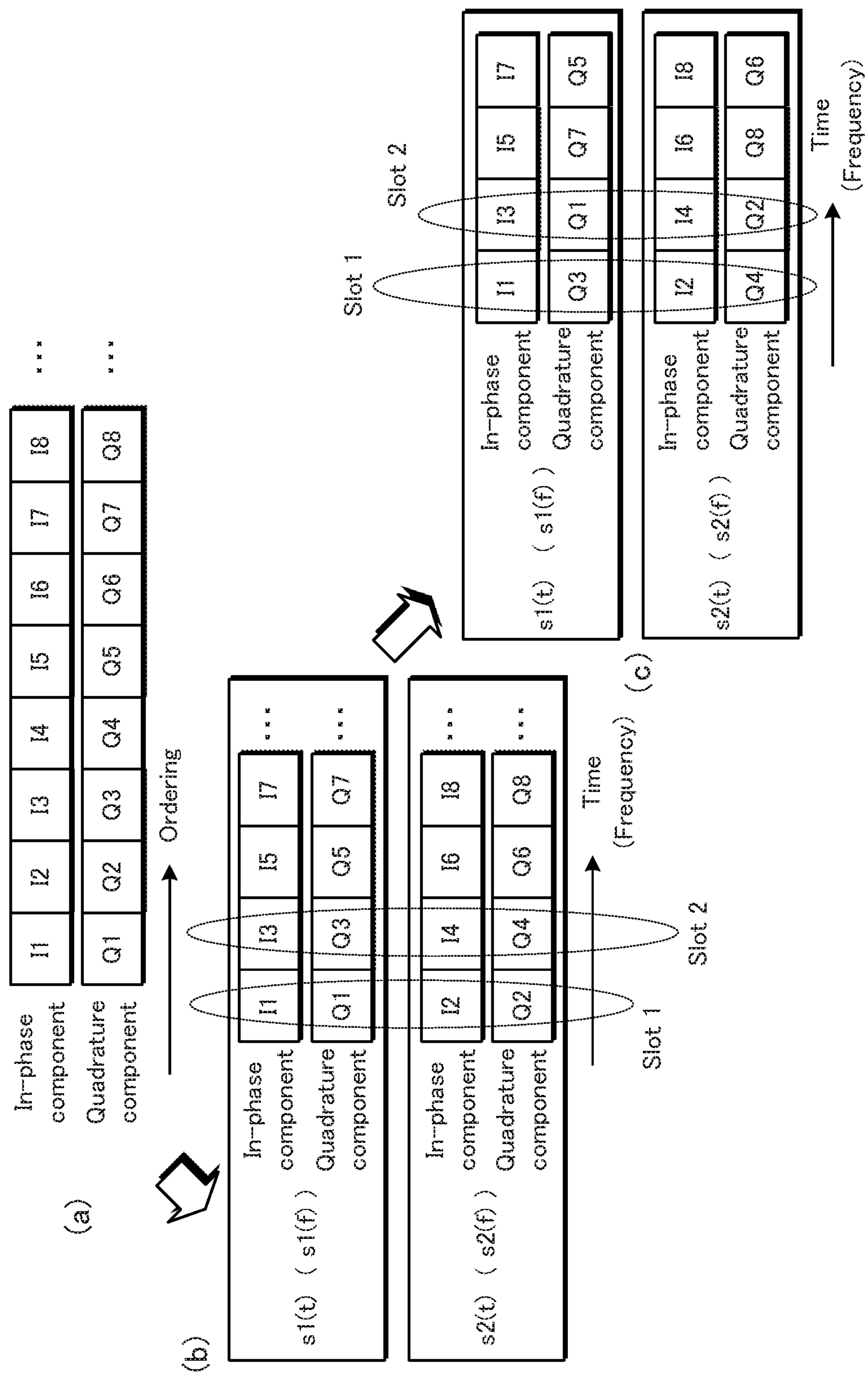

FIG. 112 illustrates a second example of a generation method for $s1(t)$ and $s2(t)$ when cyclic Q delay is used.

Figure 113:
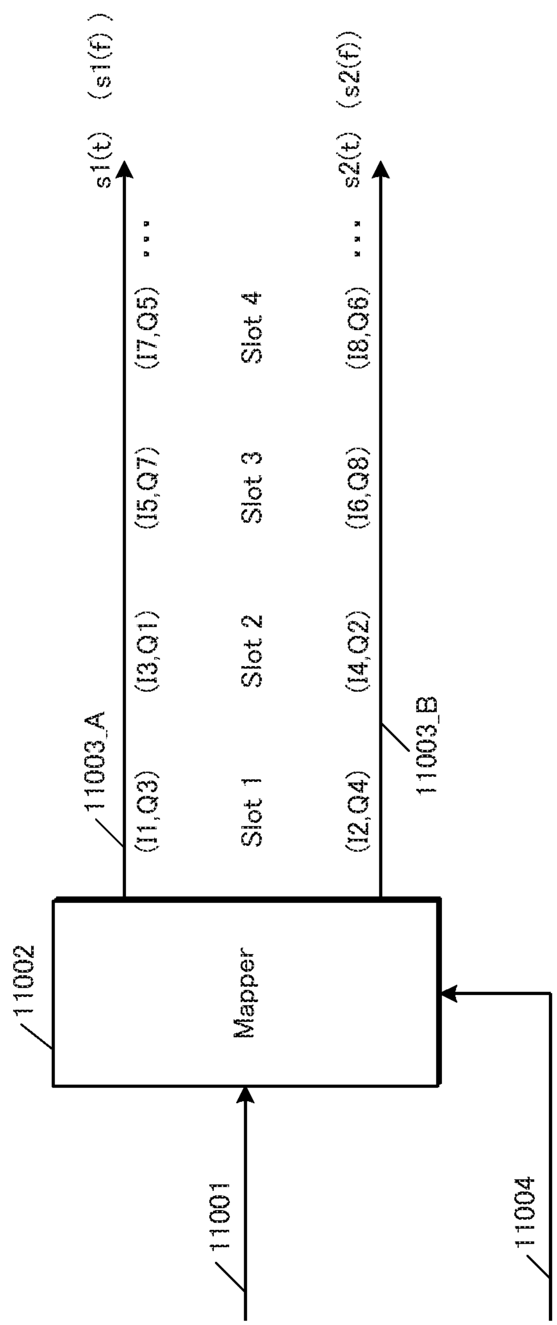

FIG. 113 indicates a sample configuration for a signal generator when cyclic Q delay is applied.

Figure 114:
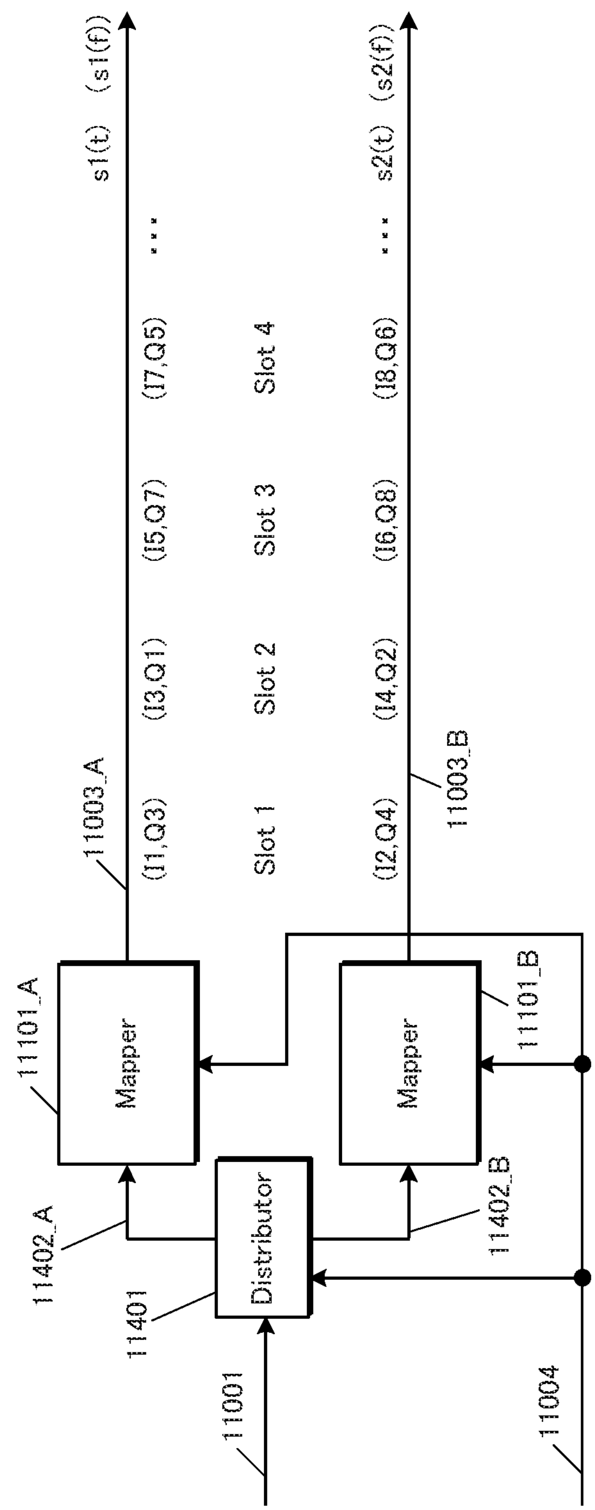

FIG. 114 indicates a sample configuration for a signal generator when cyclic Q delay is applied.

Figure 115:
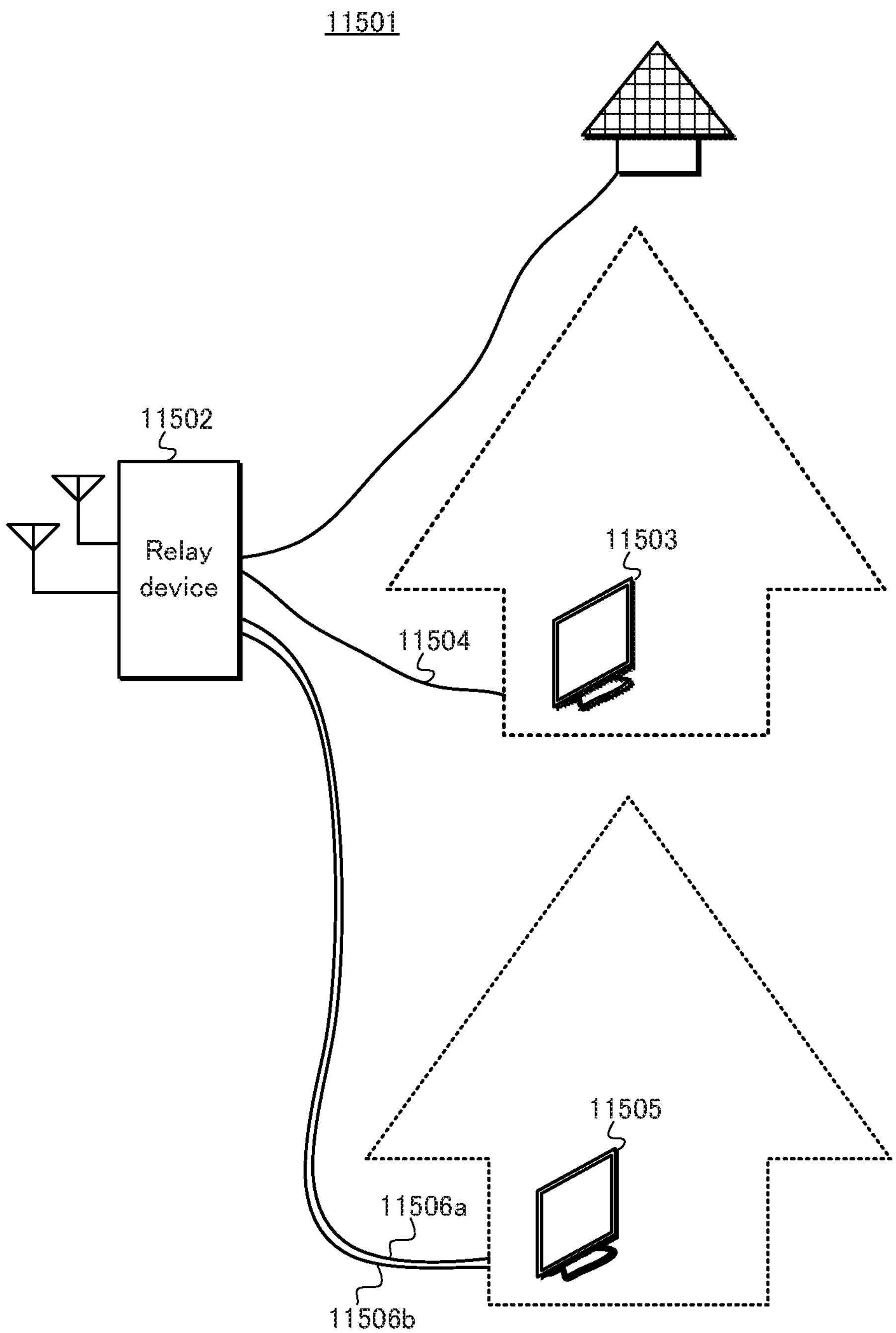

FIG. 115 illustrates an outline of a reception system.

Figure 116:
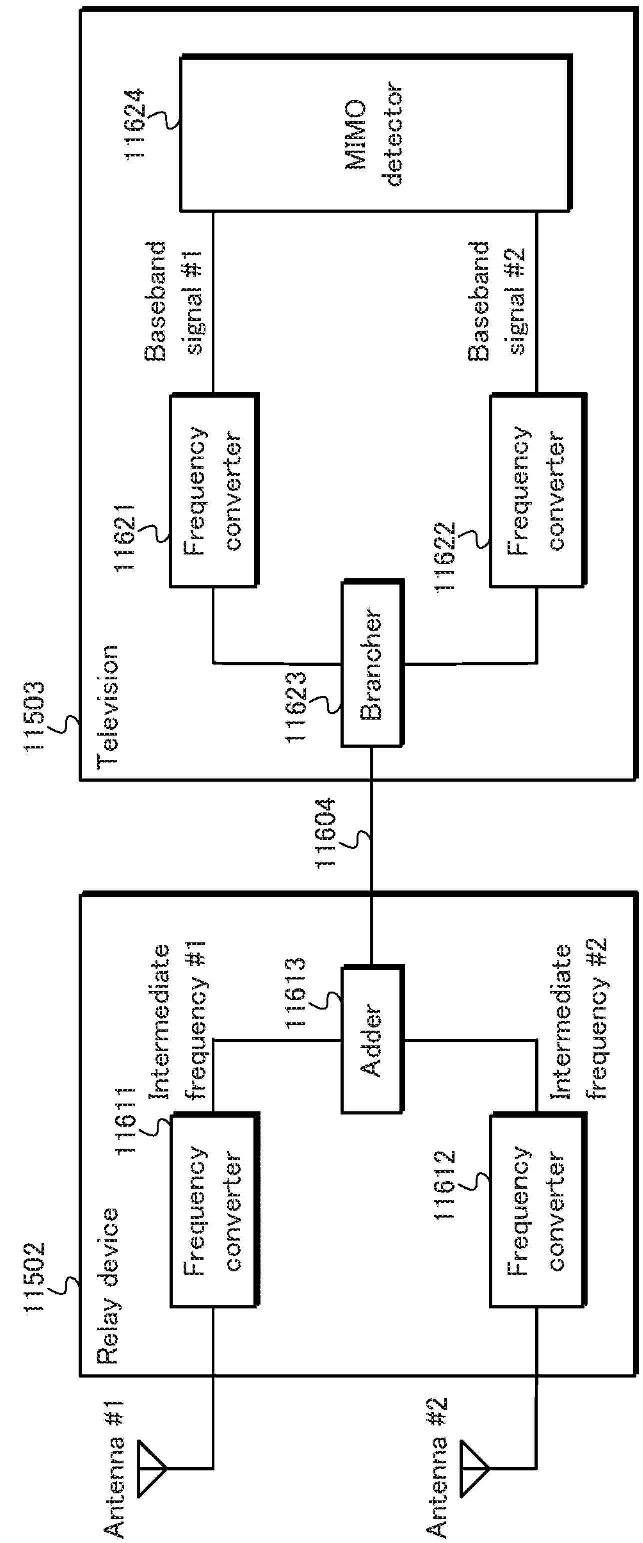

FIG. 116 illustrates a structure of a reception system.

Figure 117:
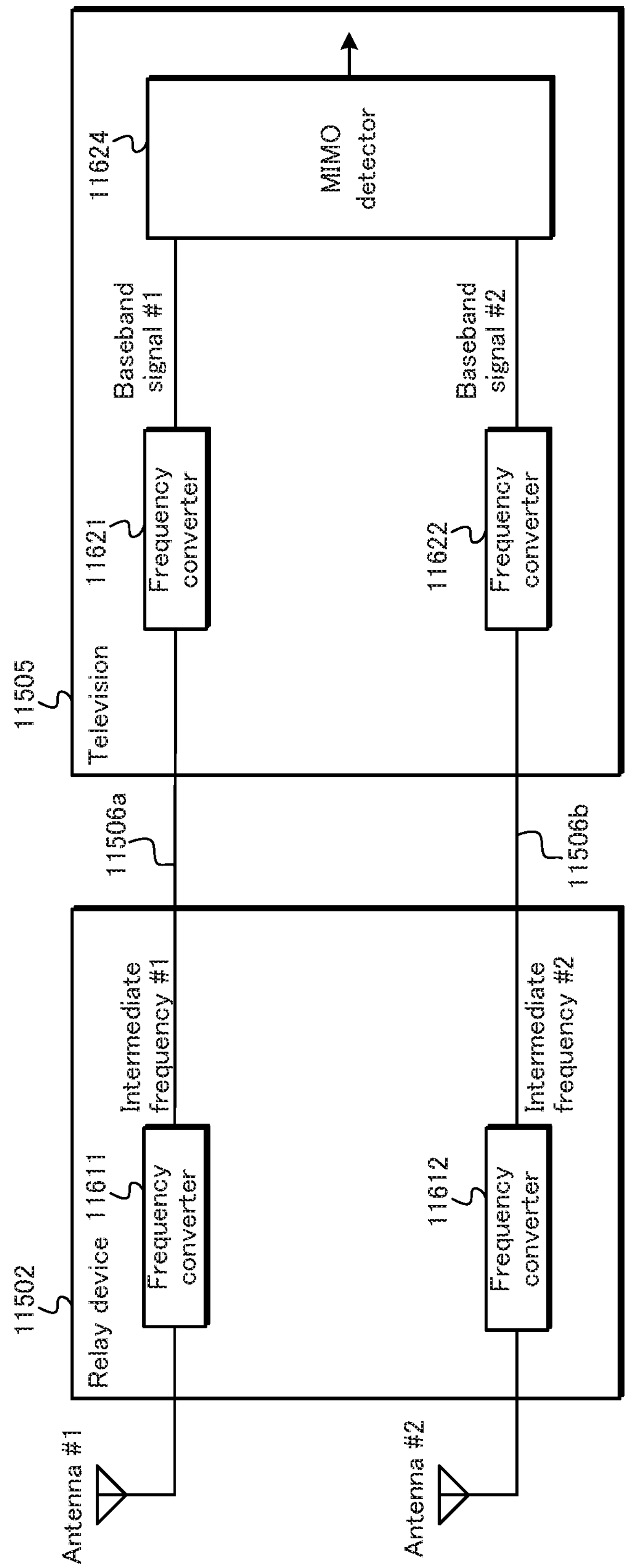

FIG. 117 illustrates a structure of a reception system.

Figure 118:
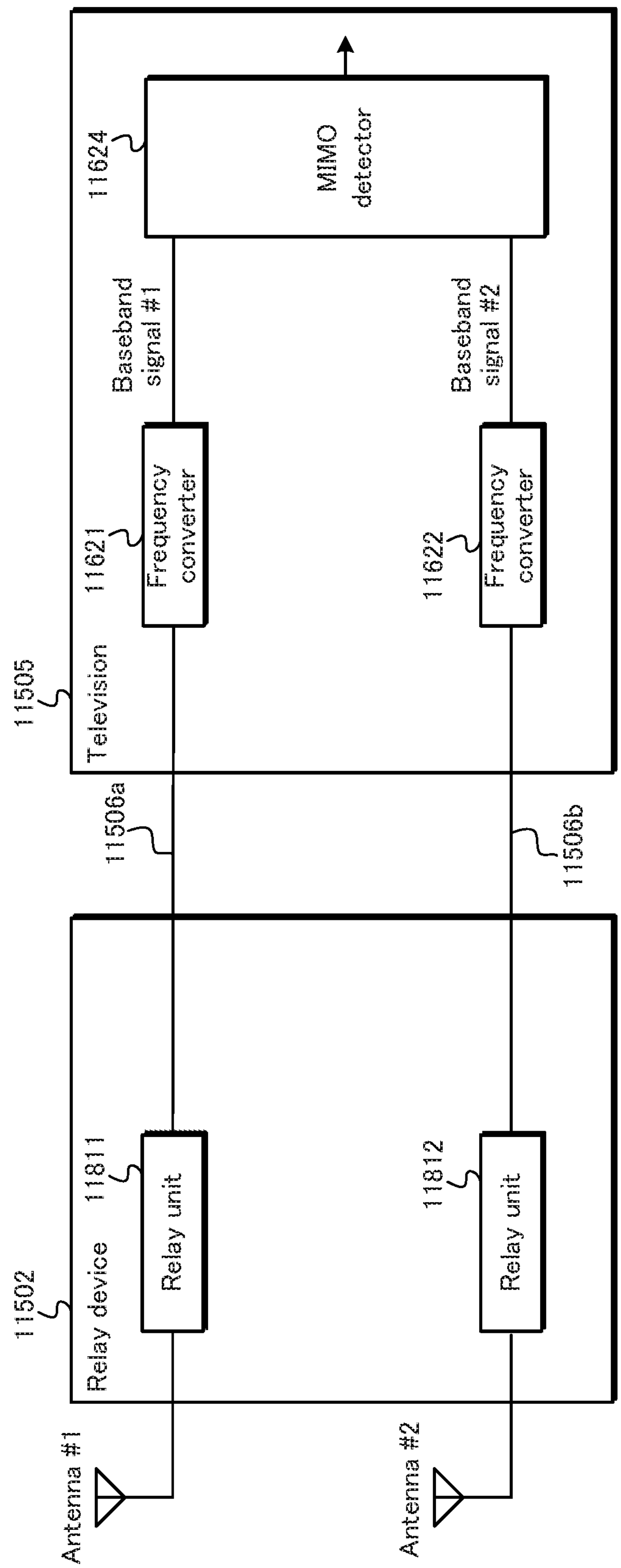

FIG. 118 illustrates a structure of a reception system.

Figure 119:
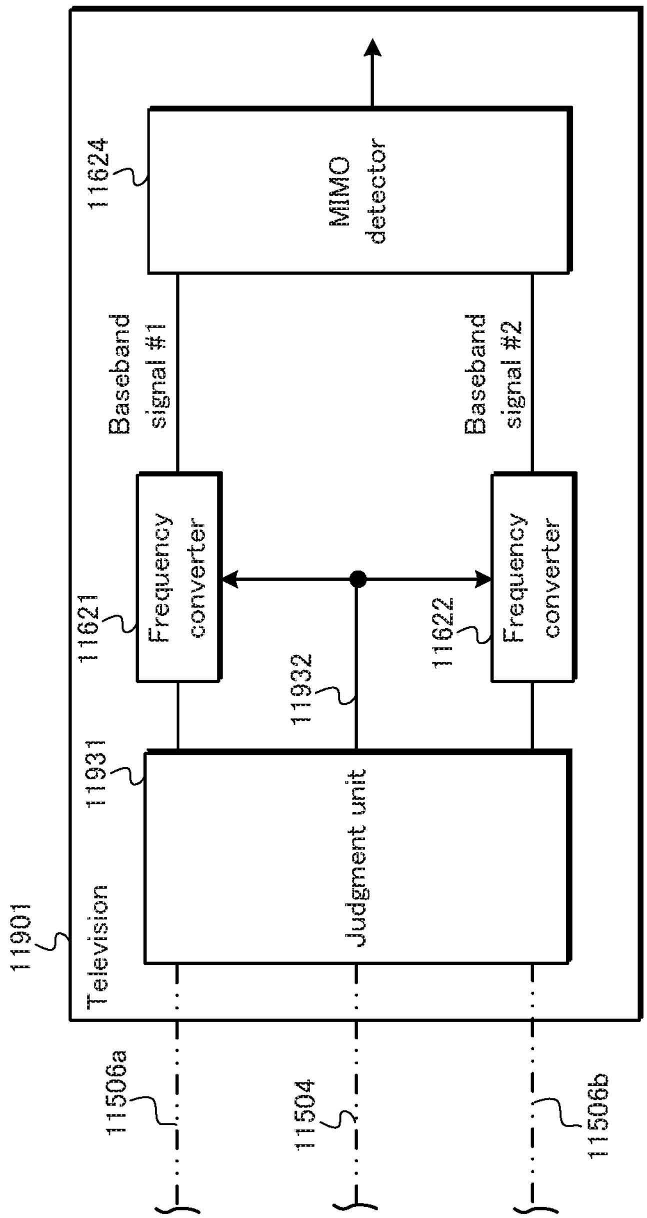

FIG. 119 illustrates a structure of a television.

Figure 120:
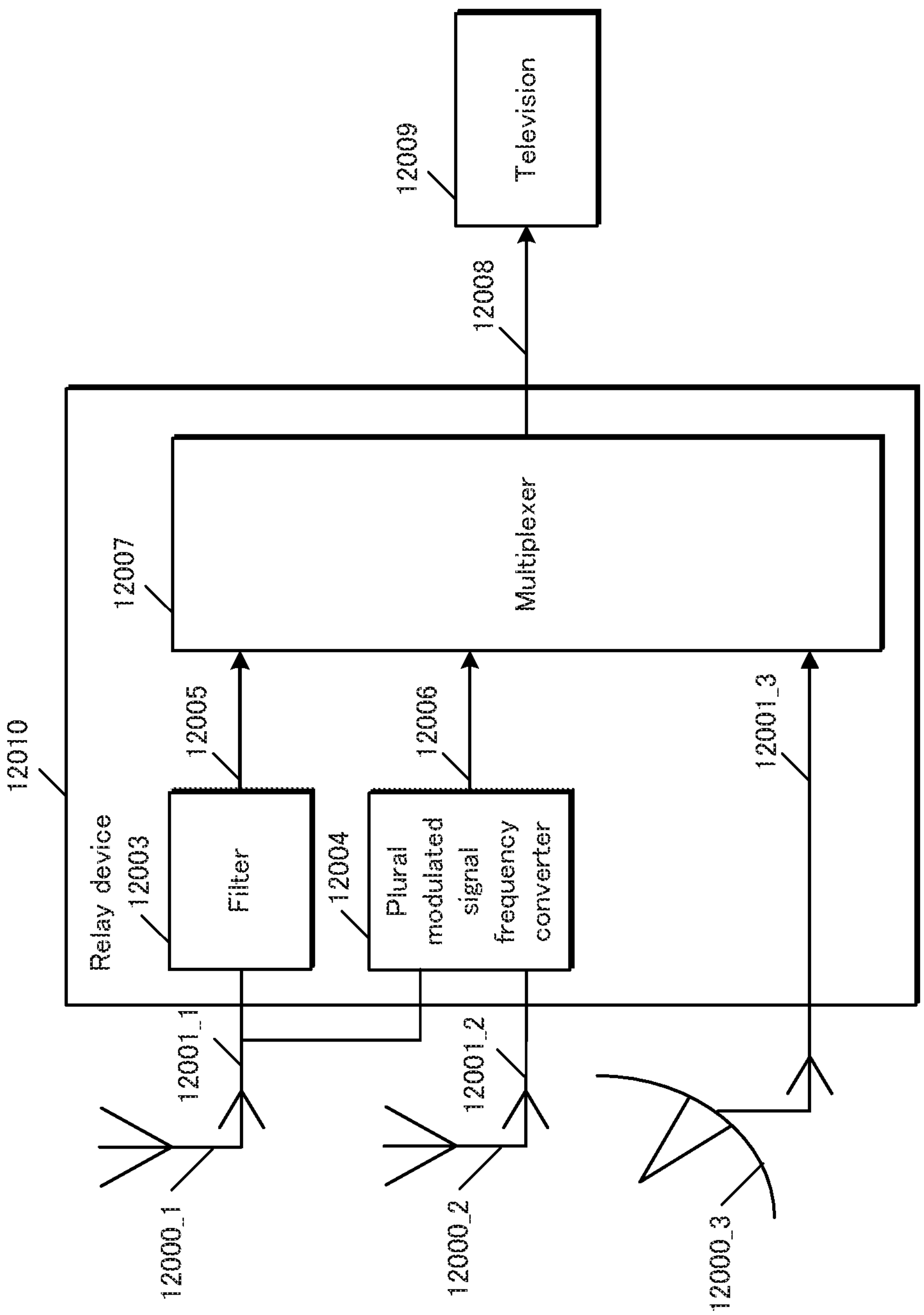

FIG. 120 illustrates a structure of a reception system.

Figure 121:
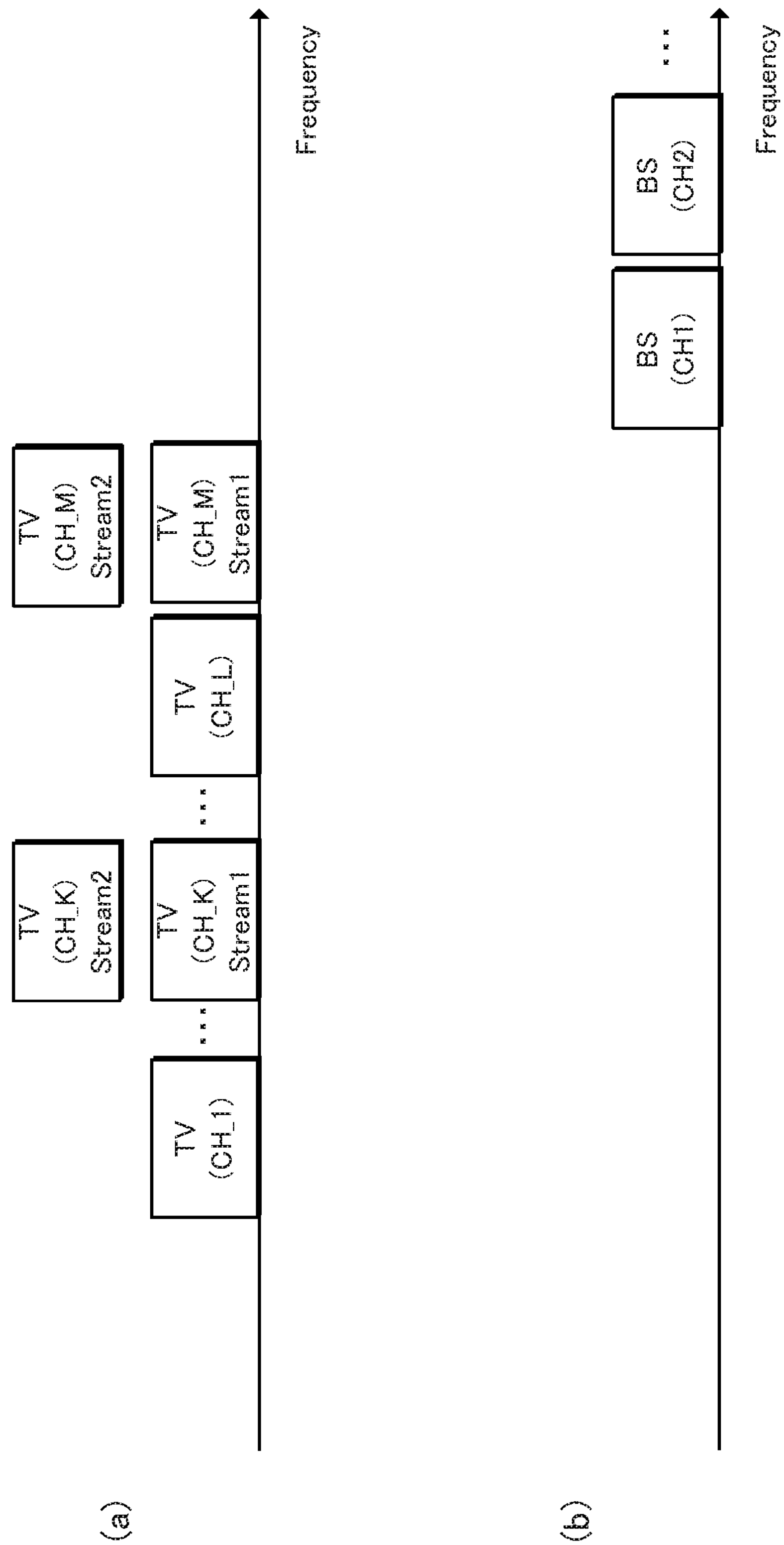

FIG. 121 illustrates a conceptual diagram of broadcast waves of terrestrial digital television broadcast in portion (a), and illustrates a conceptual diagram of broadcast waves of BS broadcast in portion (b).

Figure 122:
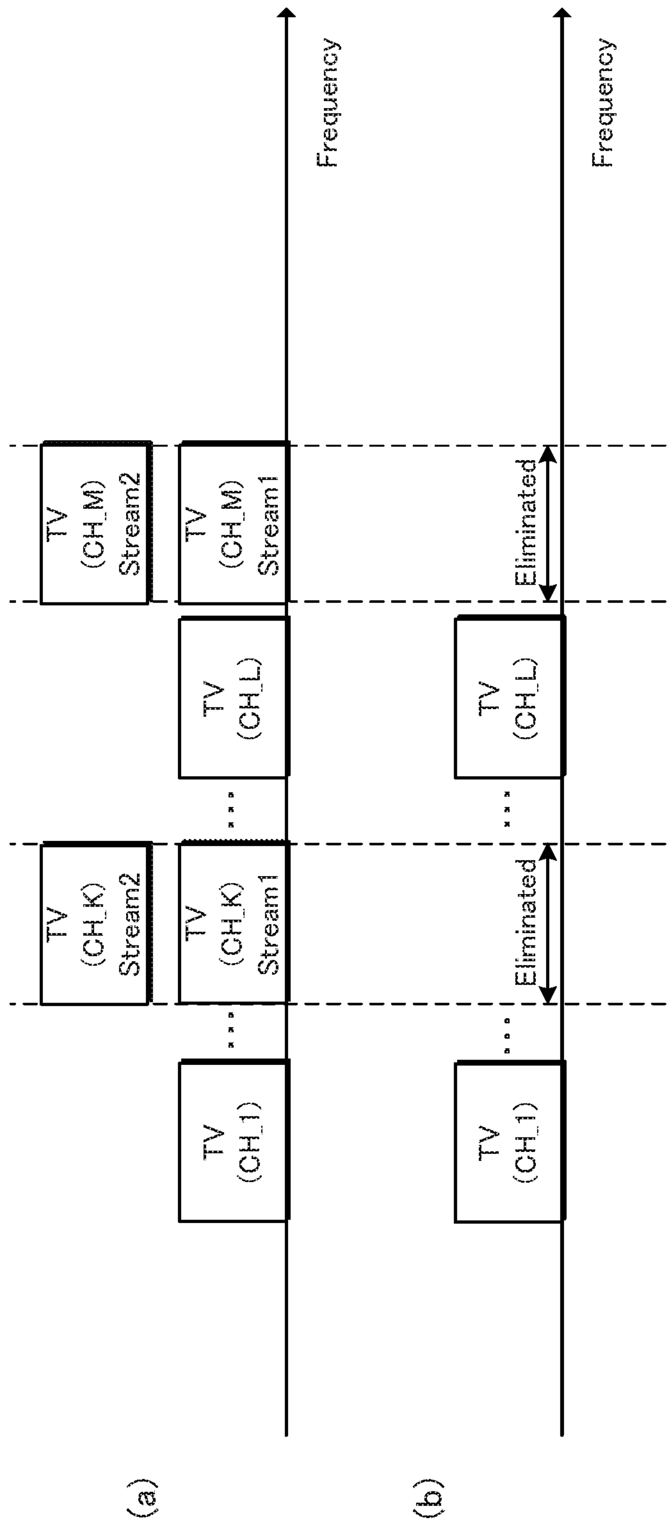

FIG. 122 illustrates a conceptual diagram of received signals before filtering in portion (a), and illustrates elimination of a received signal having a frequency band at which a plurality of modulated signals have been transmitted from a broadcast station by a plurality of antennas in portion (b).

Figure 123:
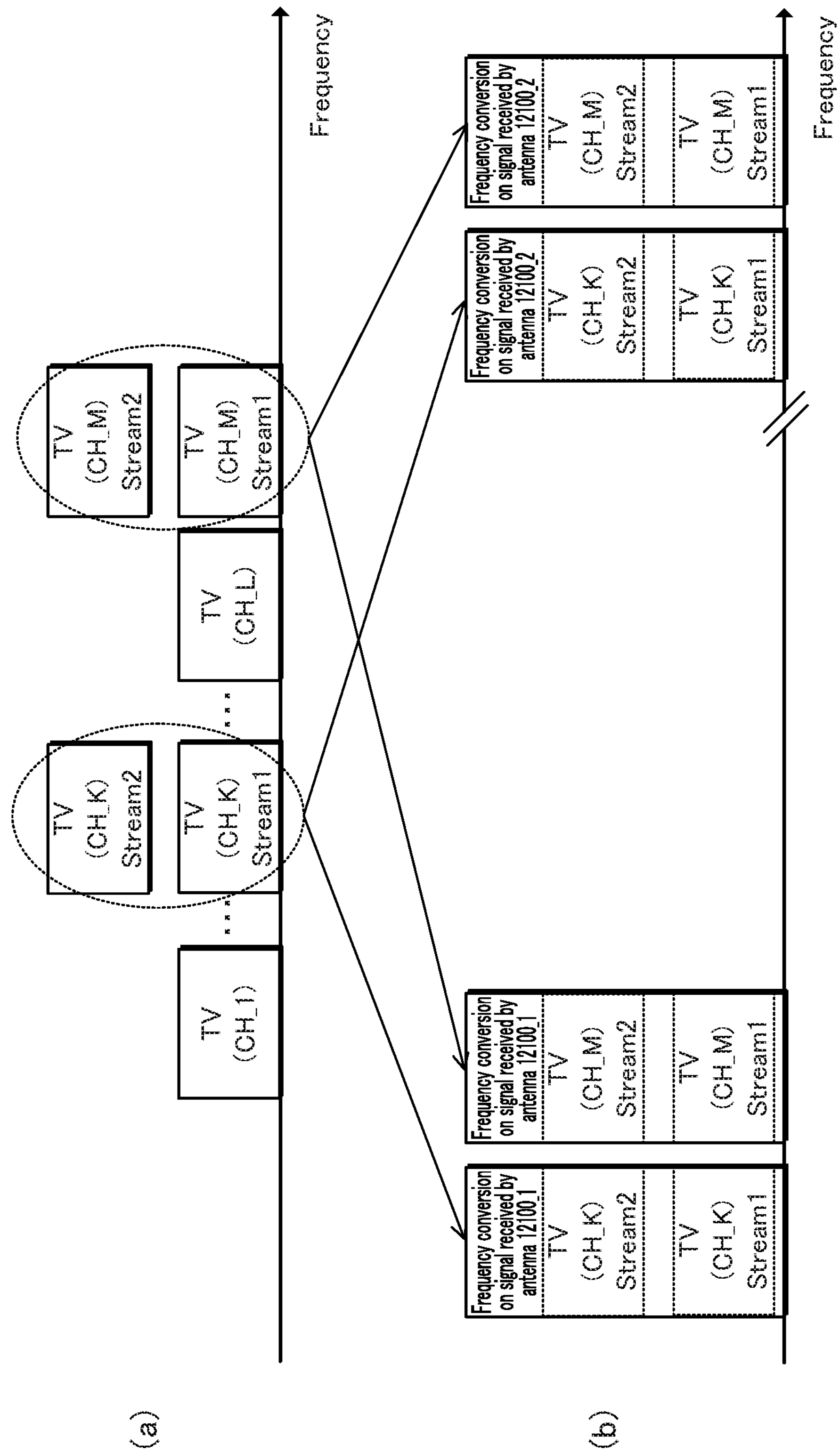

FIG. 123 illustrates a conceptual diagram of received signals before frequency conversion in portion (a), and illustrates frequency conversion of received signals having a frequency band at which a plurality of modulated signals have been transmitted from a broadcast station by a plurality of antennas in portion (b).

Figure 124:
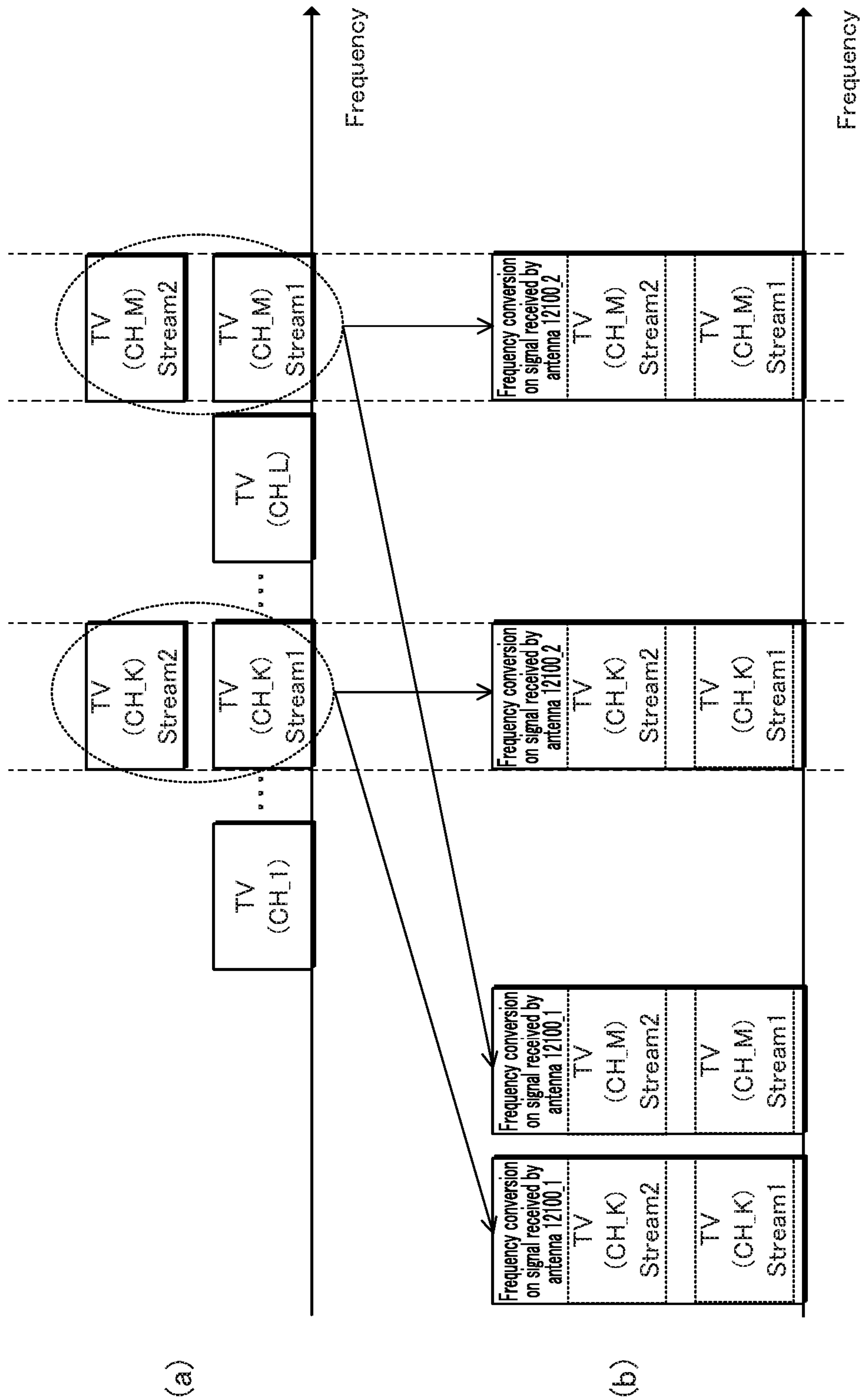

FIG. 124 illustrates a conceptual diagram of received signals before frequency conversion in portion (a), and illustrates frequency conversion of received signals having a frequency band at which a plurality of modulated signals have been transmitted from a broadcast station by a plurality of antennas in portion (b).

Figure 125:
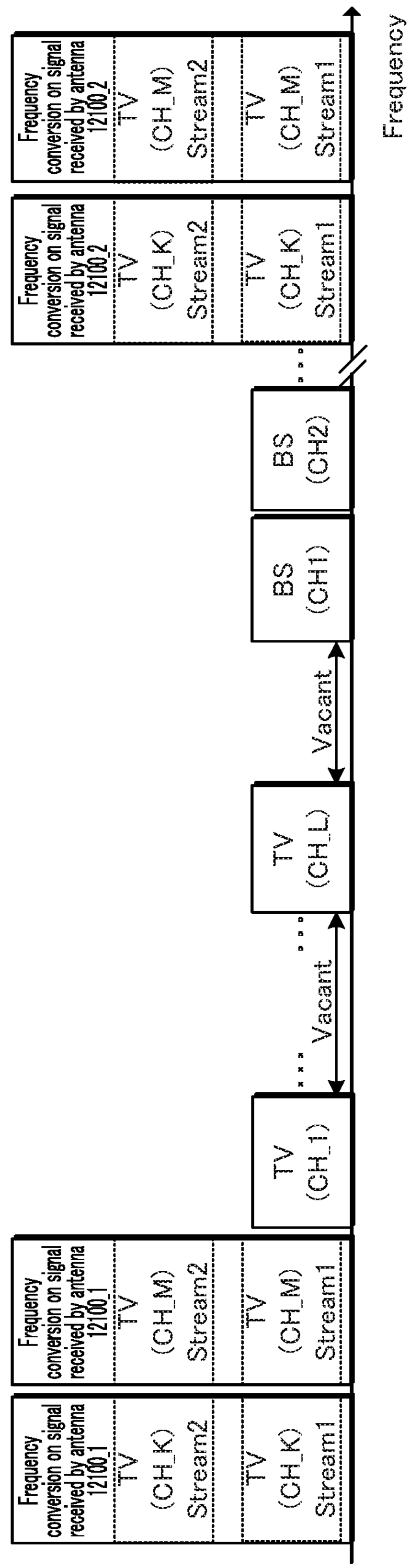

FIG. 125 illustrates frequency arrangement for leading signals to houses via a single signal line in the case shown in FIG. 123.

Figure 126:
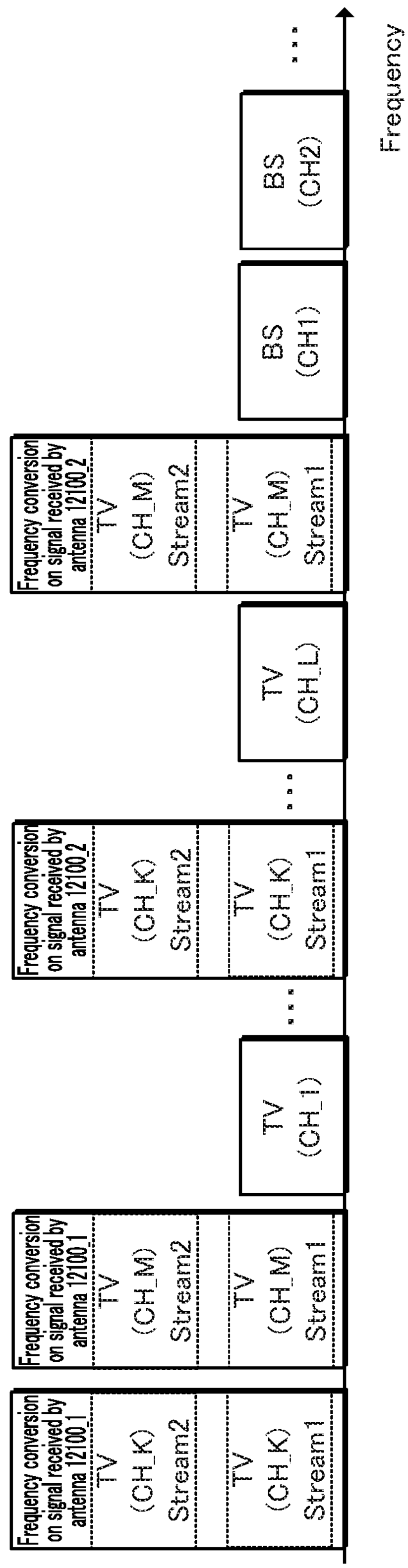

FIG. 126 illustrates frequency arrangement for leading signals to houses via a single signal line in the case shown in FIG. 124.

Figure 127:
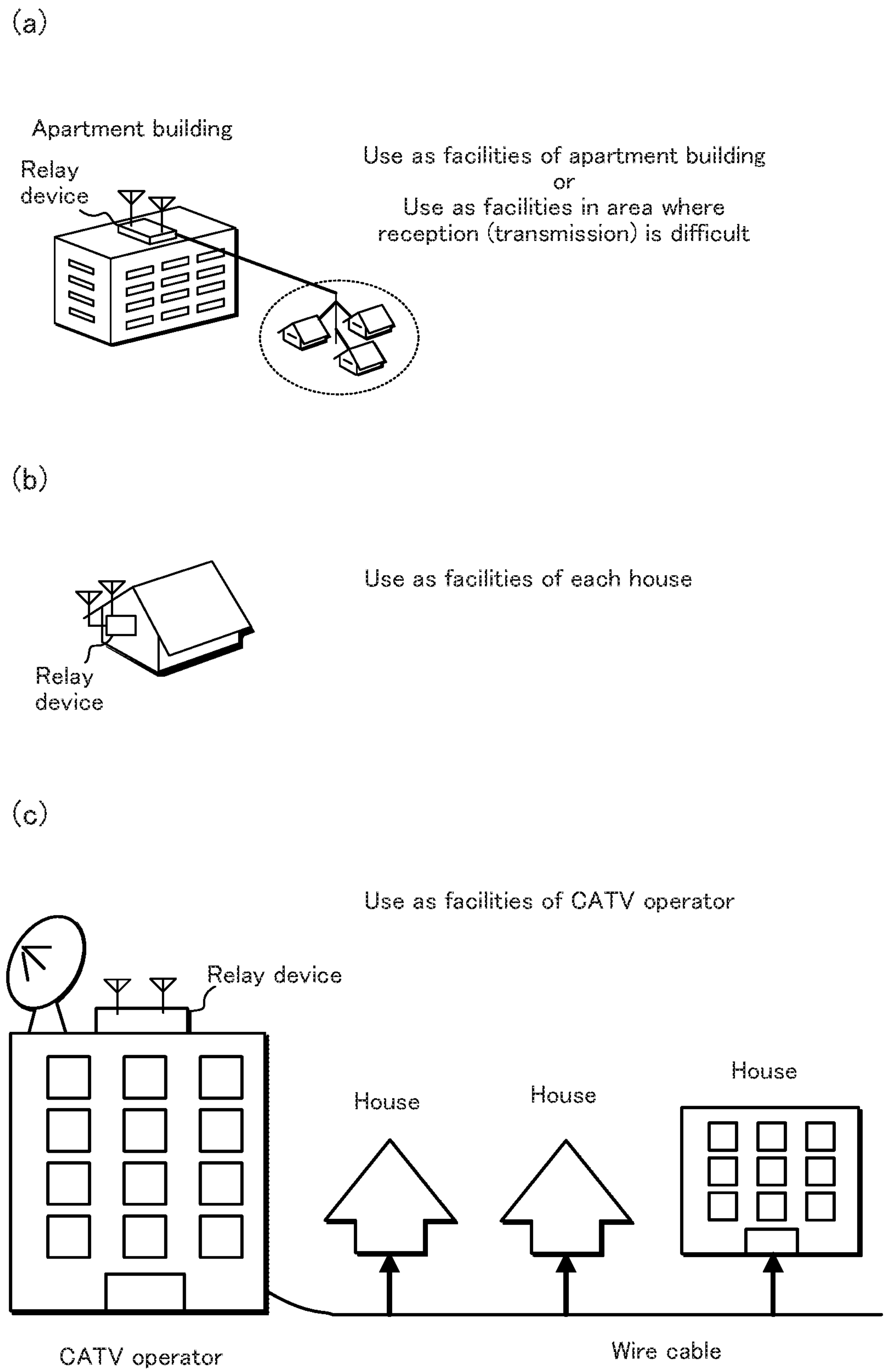

FIG. 127 illustrates an example of settings of a relay device for community reception in an apartment building in portion (a), illustrates an example of settings of a relay device for an individual house in portion (b), and illustrates an example of settings of a relay device for a cable television system operator in portion (c).

Figure 128:
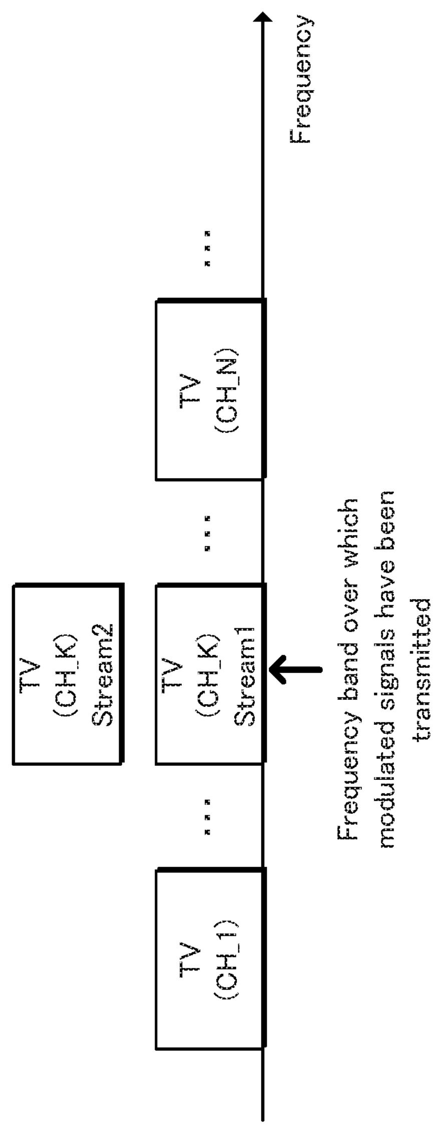

FIG. 128 illustrates a conceptual diagram of the data structure of a received television broadcast.

Figure 129:
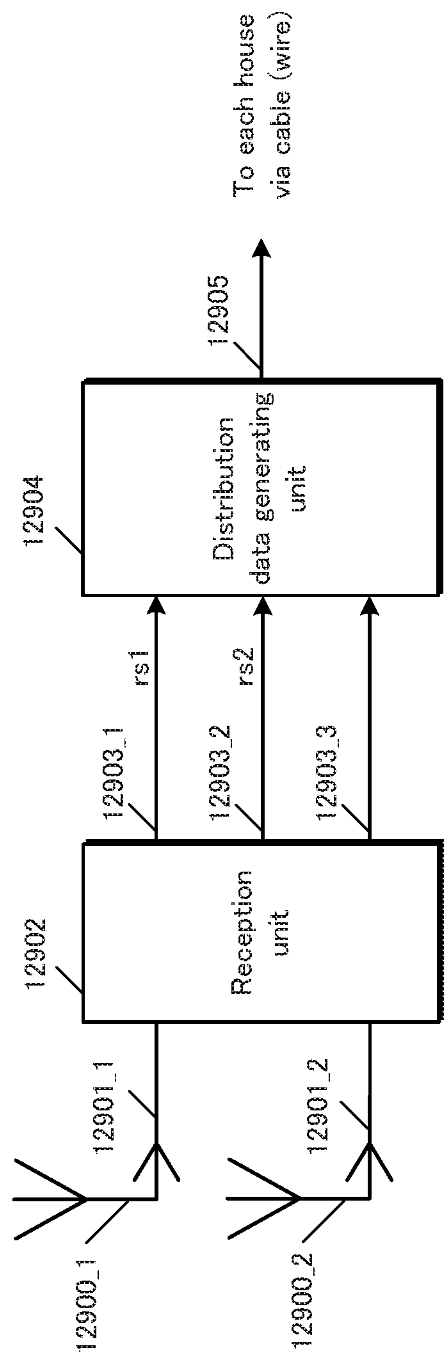

FIG. 129 illustrates an example of the structure of a relay device for a cable television system operator.

Figure 130:
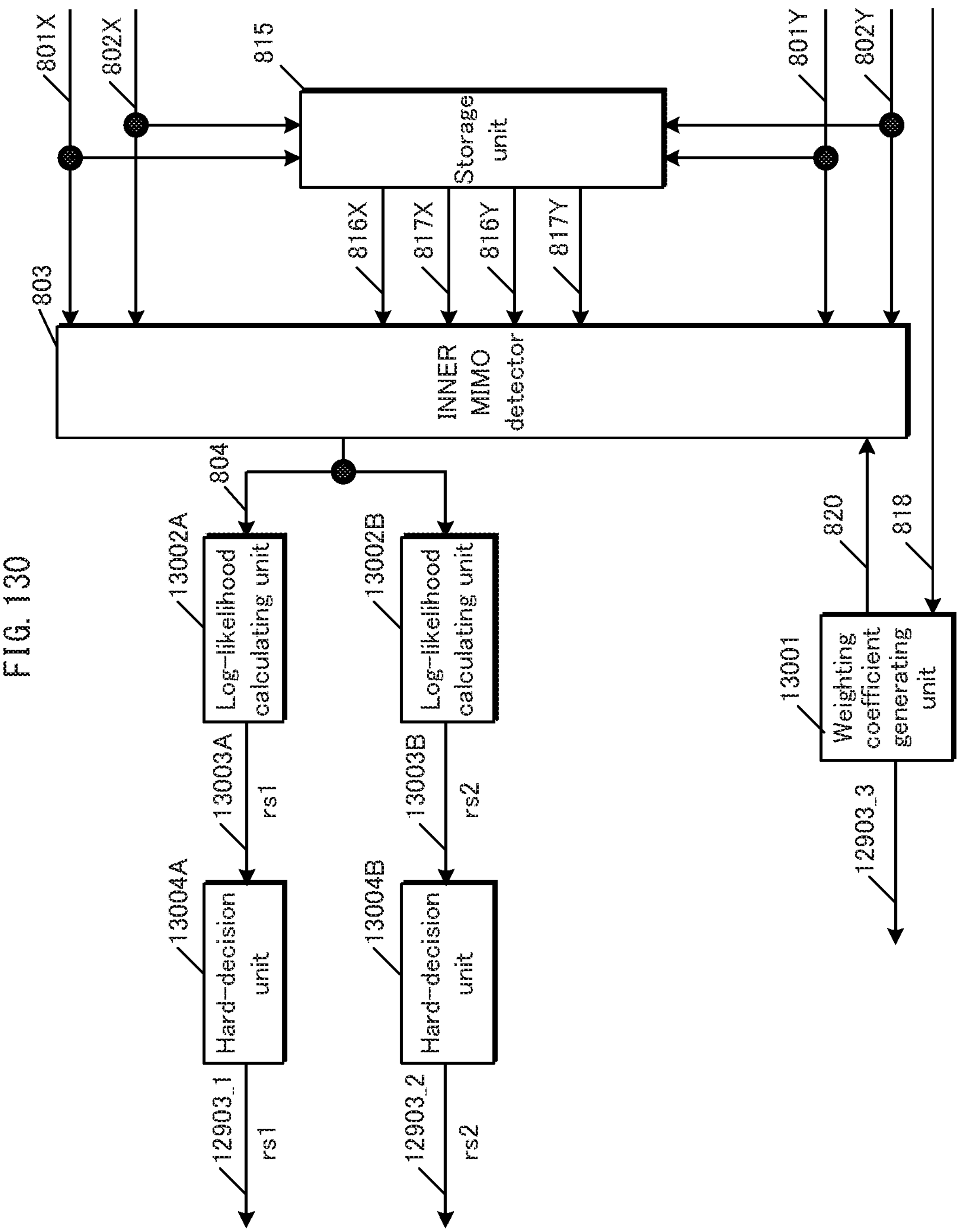

FIG. 130 illustrates an example of the structure of a signal processing unit.

Figure 131:
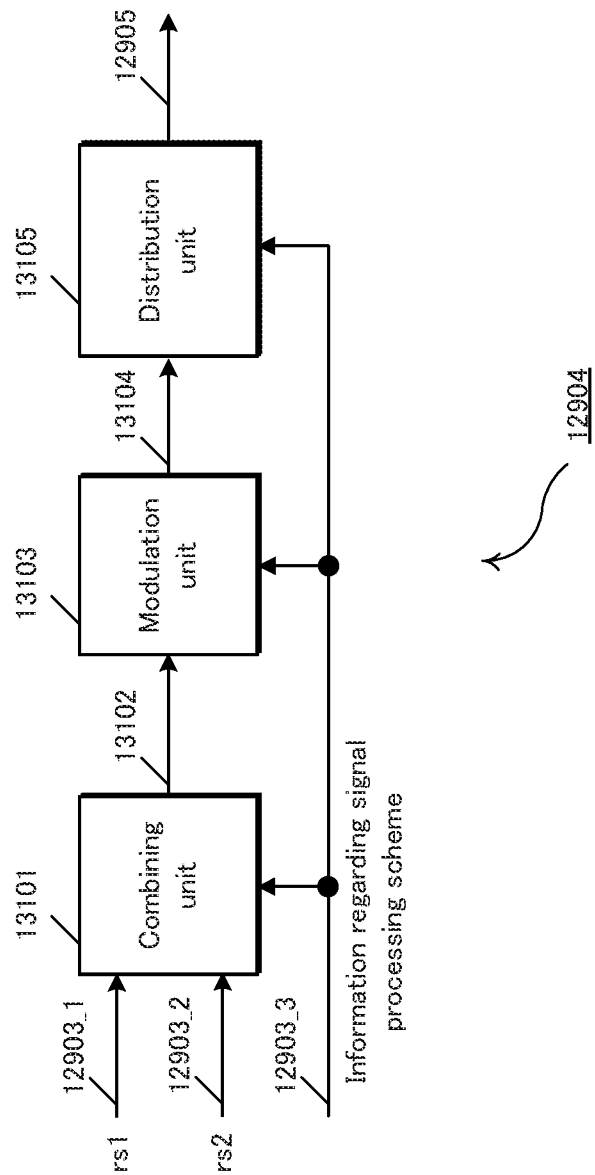

FIG. 131 illustrates an example of the structure of a distribution data generating unit.

Figure 132:
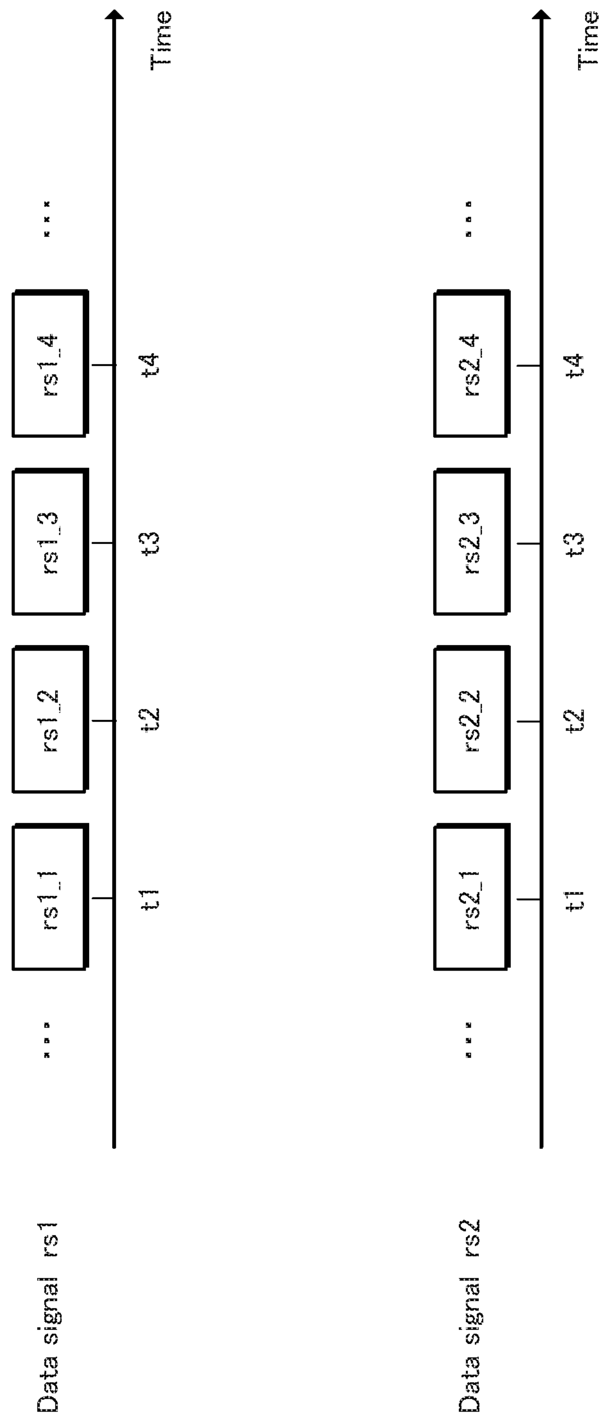

FIG. 132 illustrates an example of signals before combining.

Figure 133:
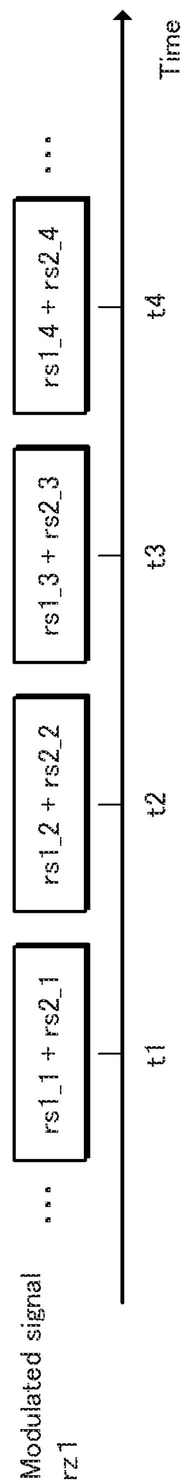

FIG. 133 illustrates an example of signals after combining.

Figure 134:
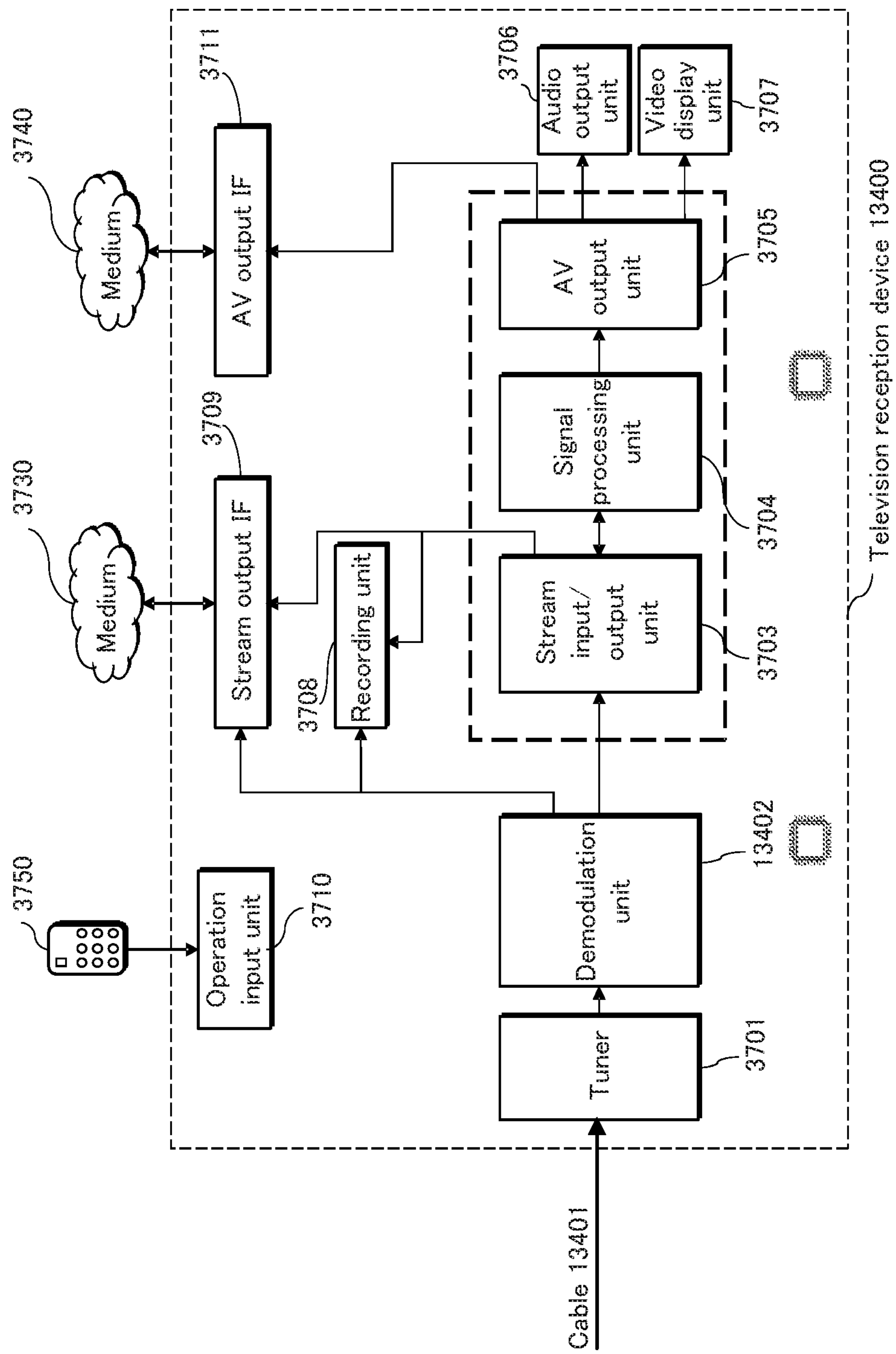

FIG. 134 illustrates an example of the structure of a television reception device.

Figure 135:
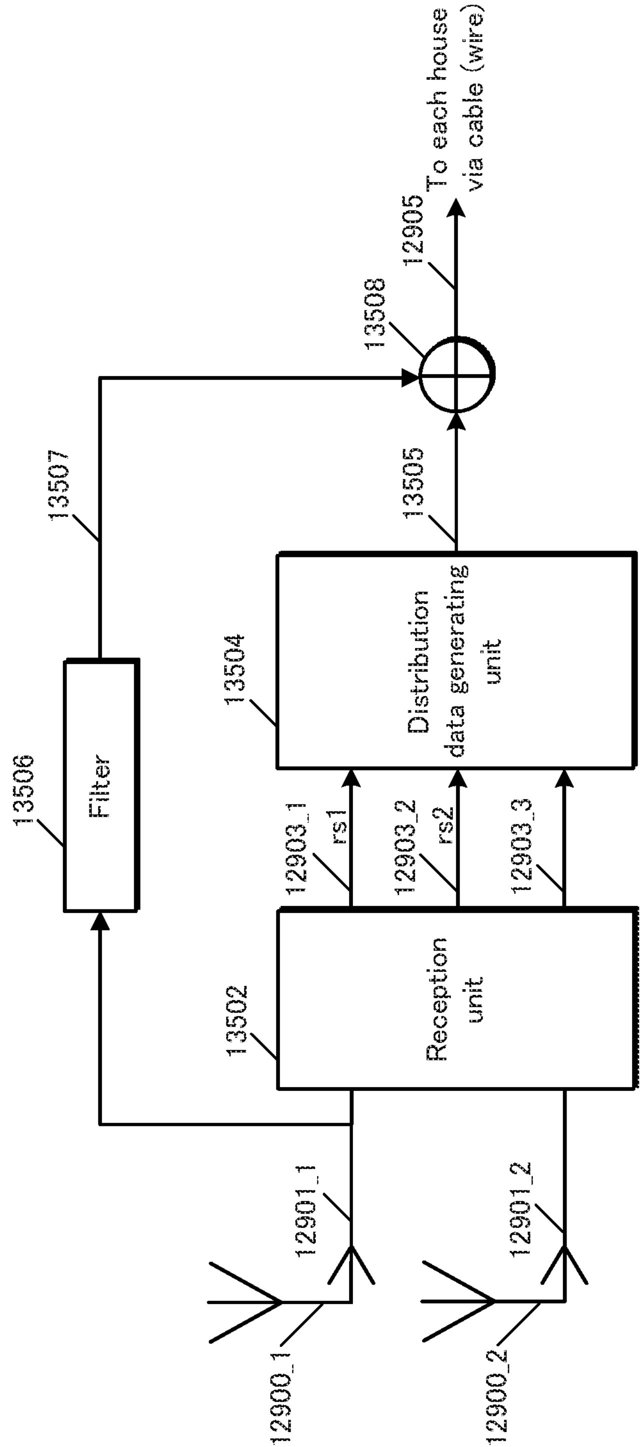

FIG. 135 illustrates an example of the structure of a relay device for a cable television system operator.

Figure 136:
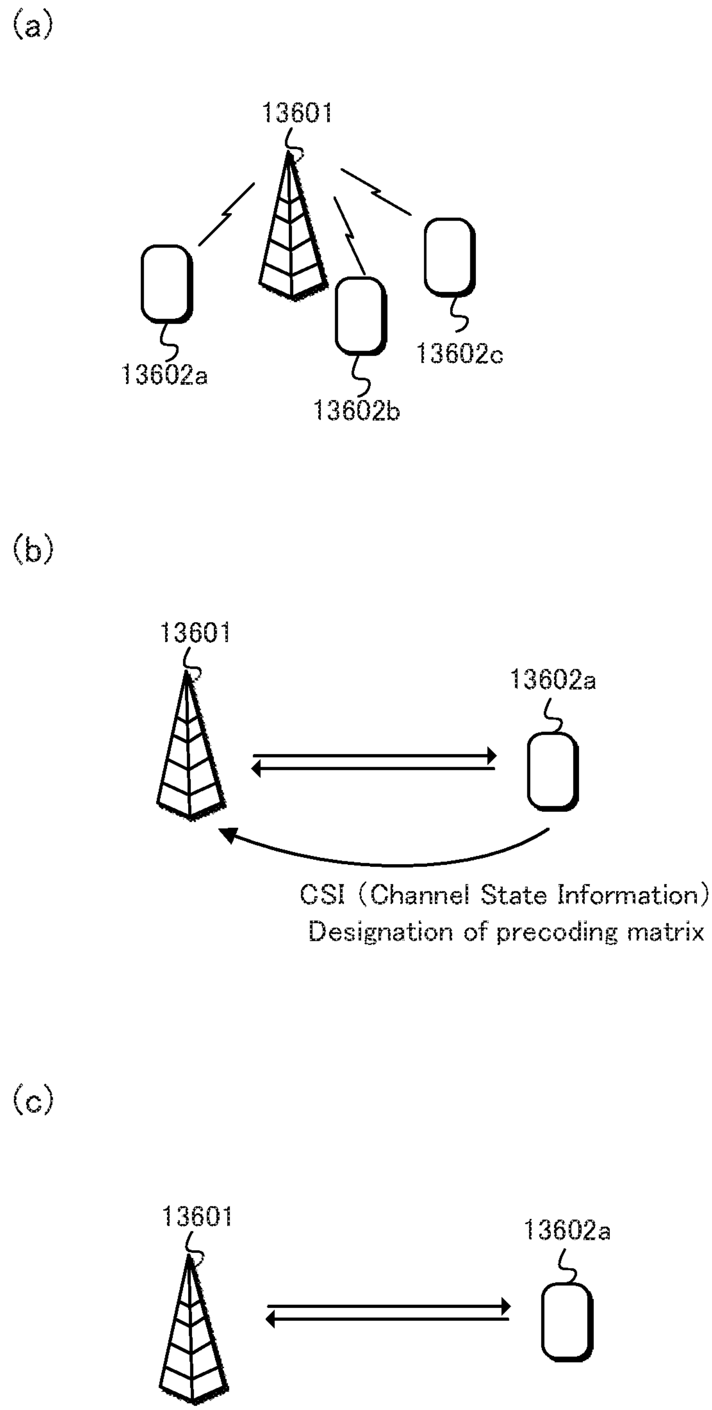

FIG. 136 illustrates an example of multicast communication in portion (a), illustrates an example of unicast communication with feedback in portion (b), and illustrates an example of unicast communication without feedback in portion (c).

Figure 137:
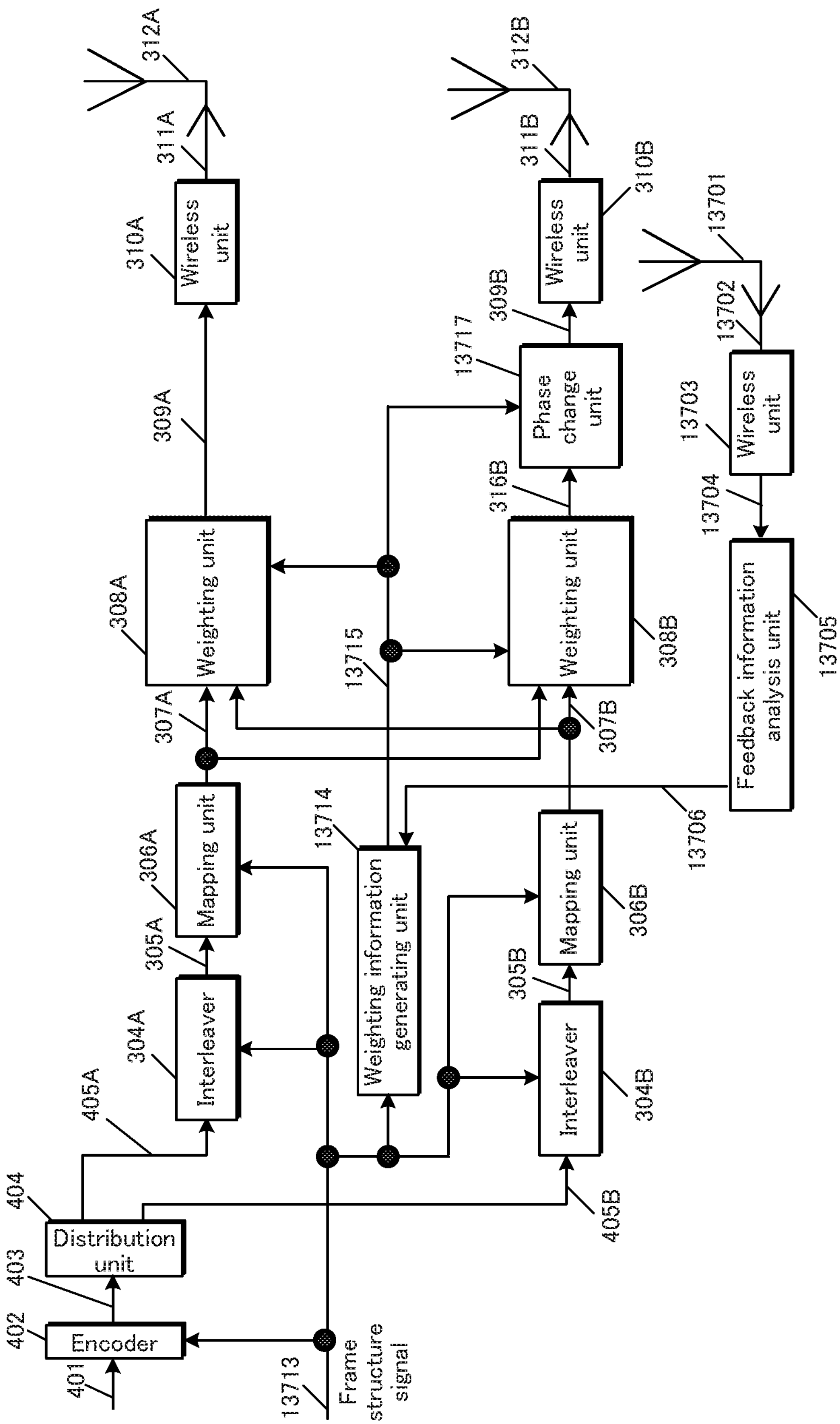

FIG. 137 illustrates an example of the structure of a transmission device.

Figure 138:
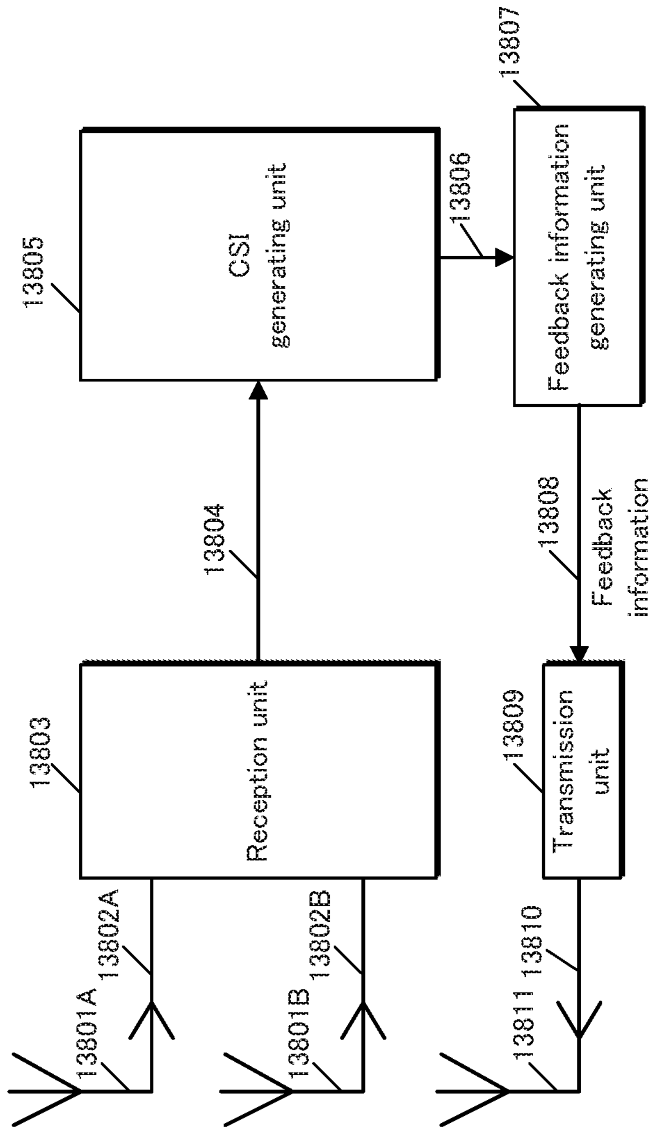

FIG. 138 illustrates an example of the structure of a reception device having a feedback function.

FIG. 139 illustrates an example of the frame structure of CSI.

Figure 140:
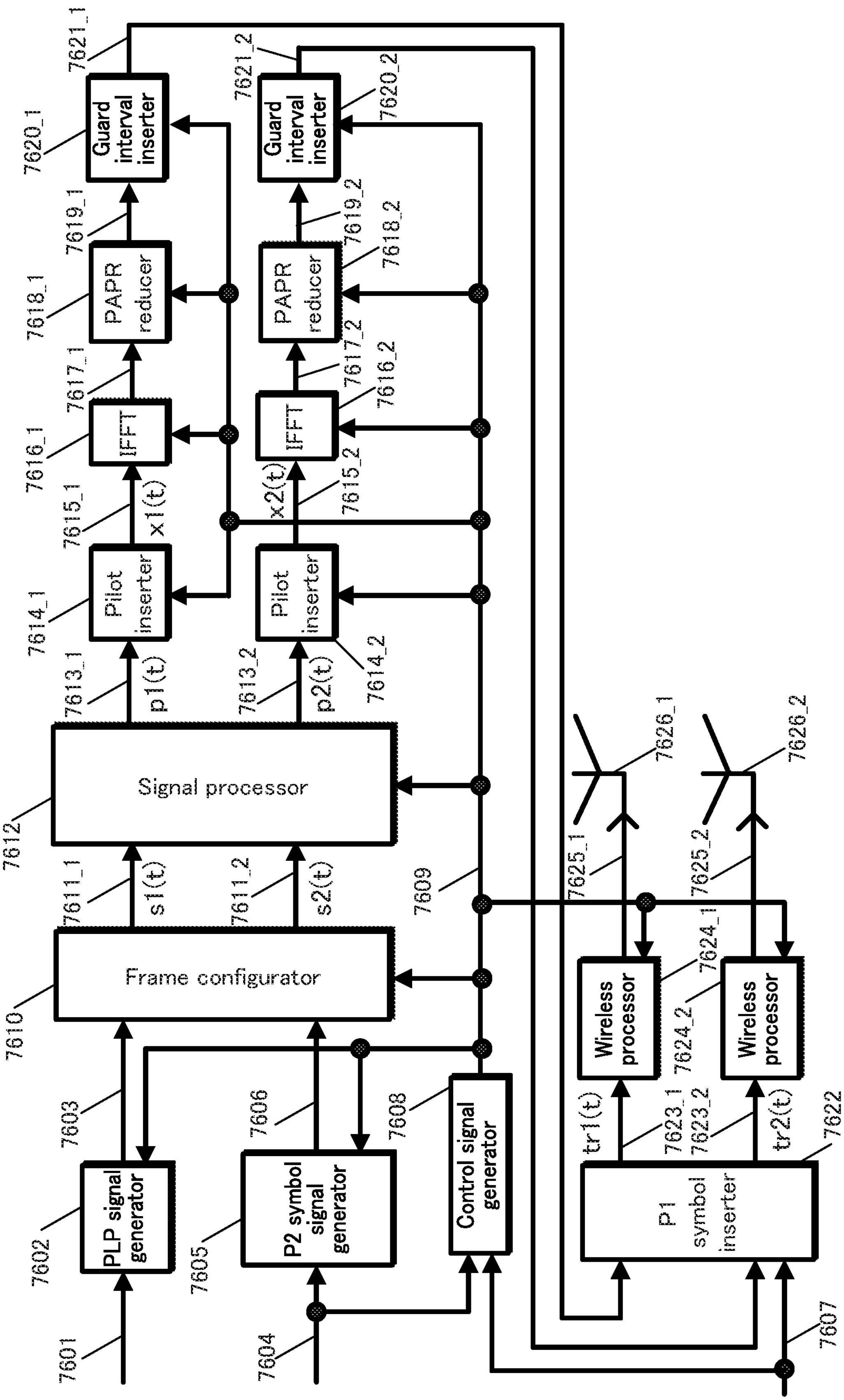

FIG. 140 illustrates an example of a structure of a transmission device.

Figure 141:
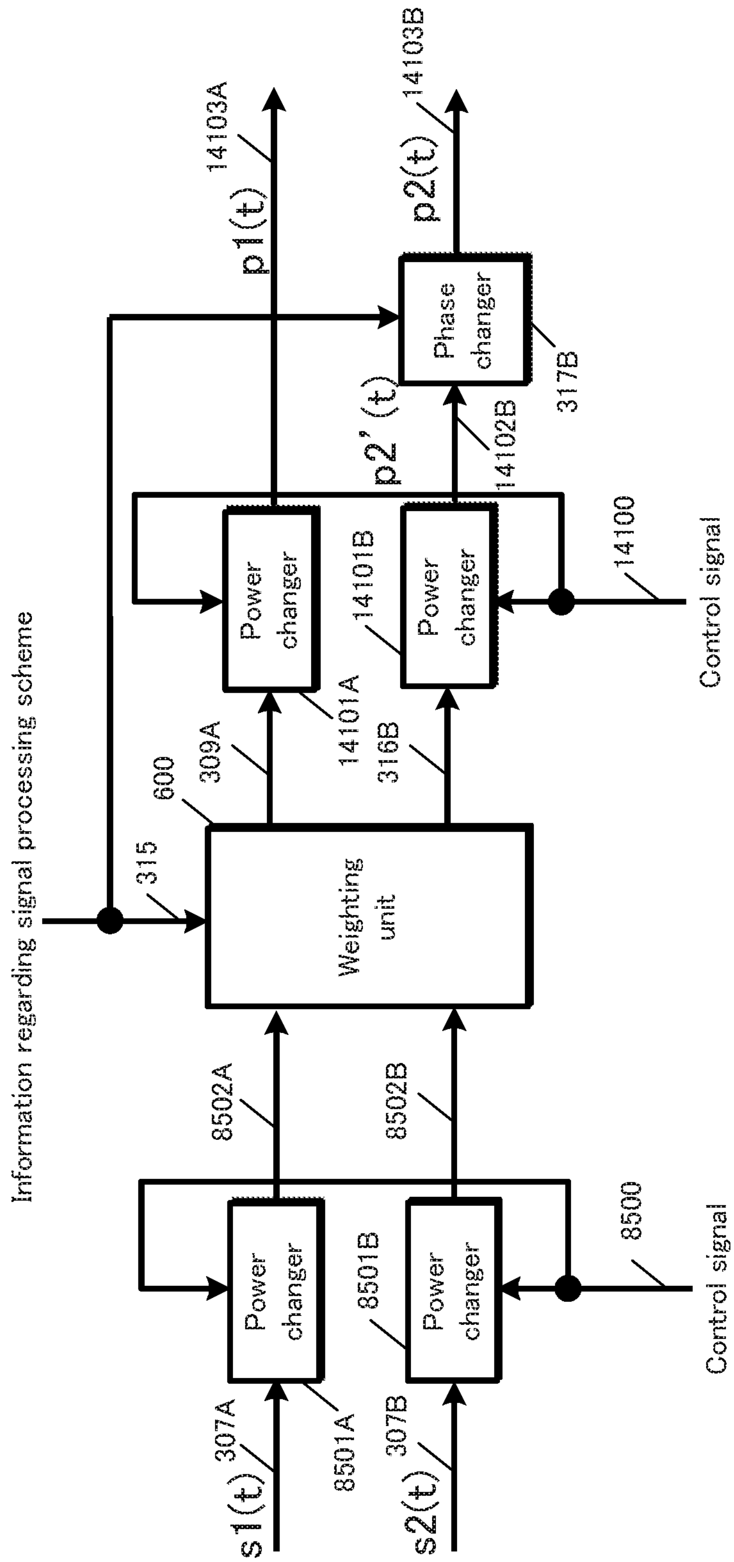

FIG. 141 illustrates an example of a structure of a signal processor pertaining to a weighting unit.

Figure 142A:
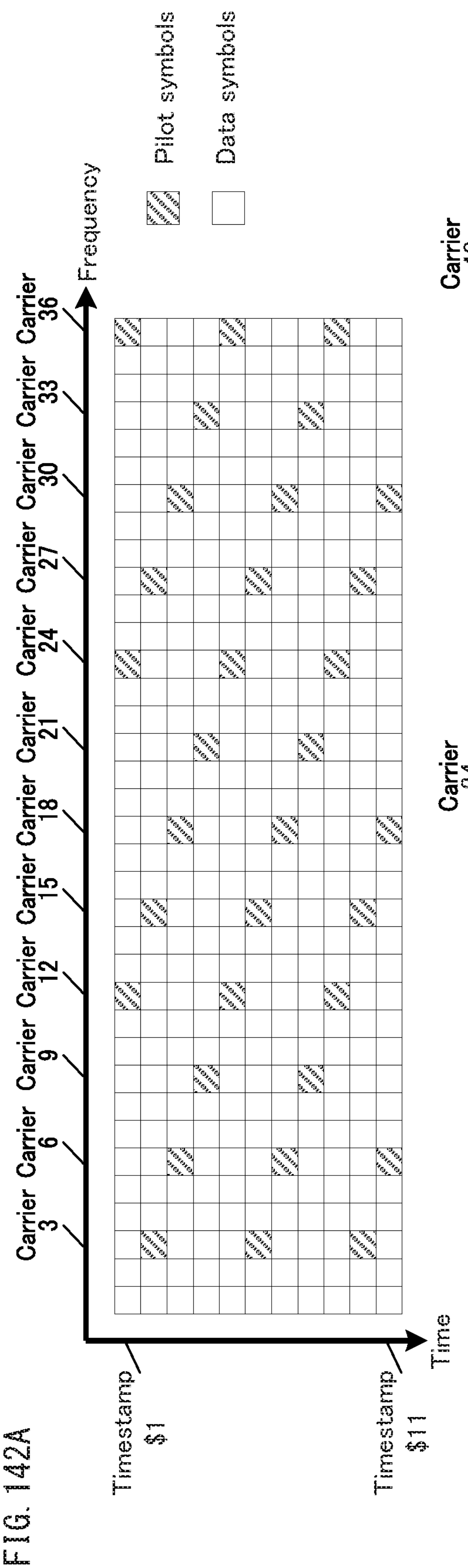
Figure 142B:
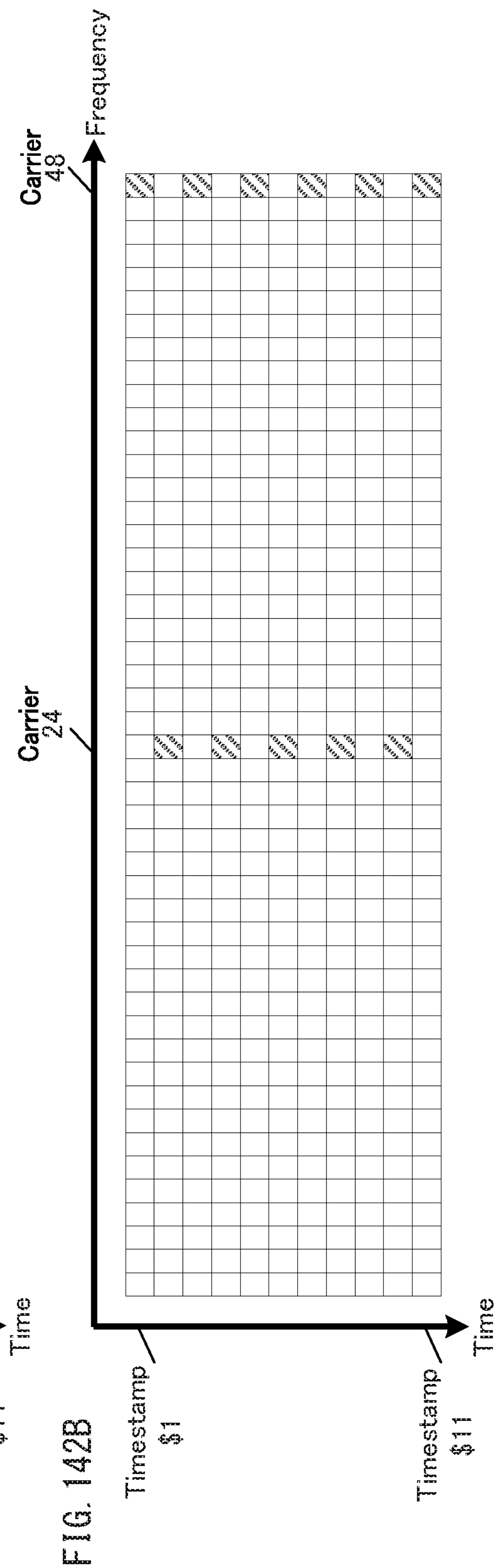

FIGS. 142A and 142B illustrate an example of a pilot symbol arrangement for a modulated signal.

Figure 143:
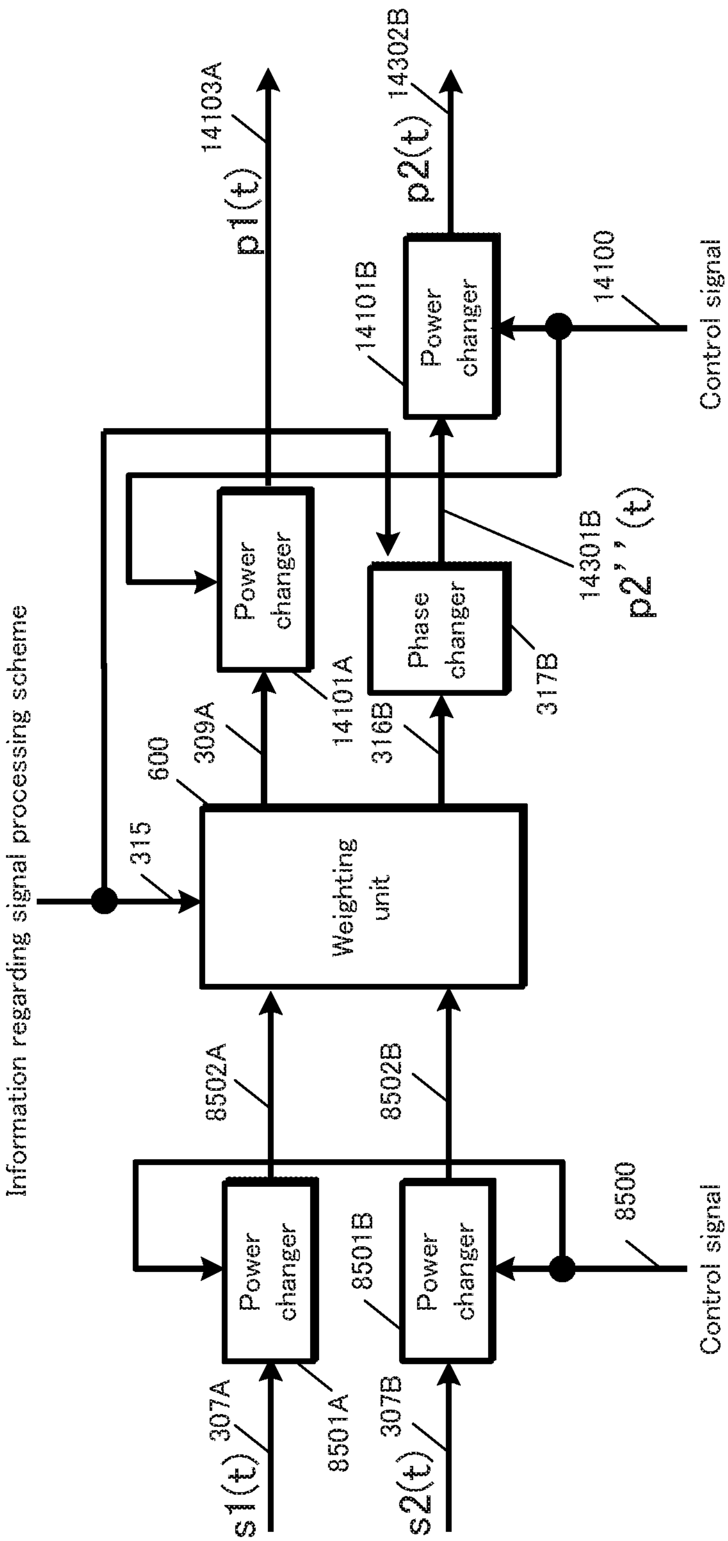

FIG. 143 illustrates an example of a structure of the signal processor pertaining to the weighting unit.

Figure 144:
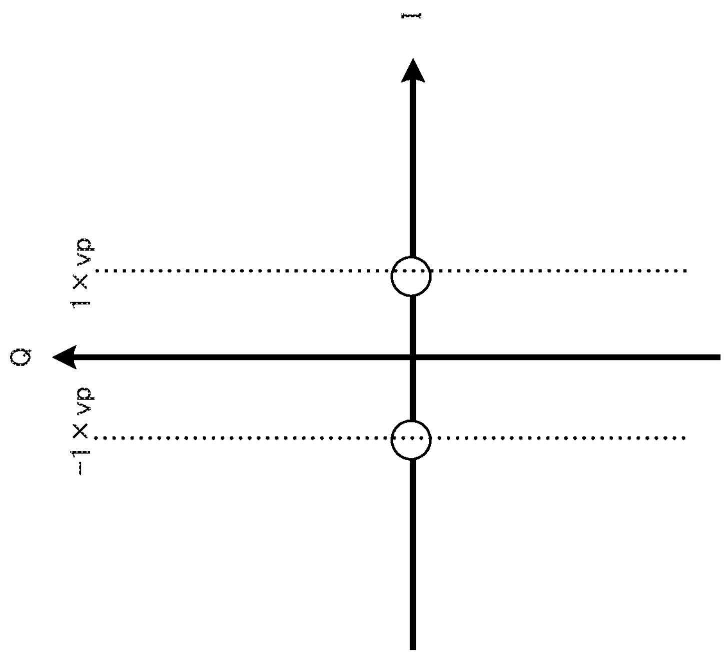

FIG. 144 illustrates an example of a signal point arrangement for BPSK in the I-Q plane.

Figure 145:
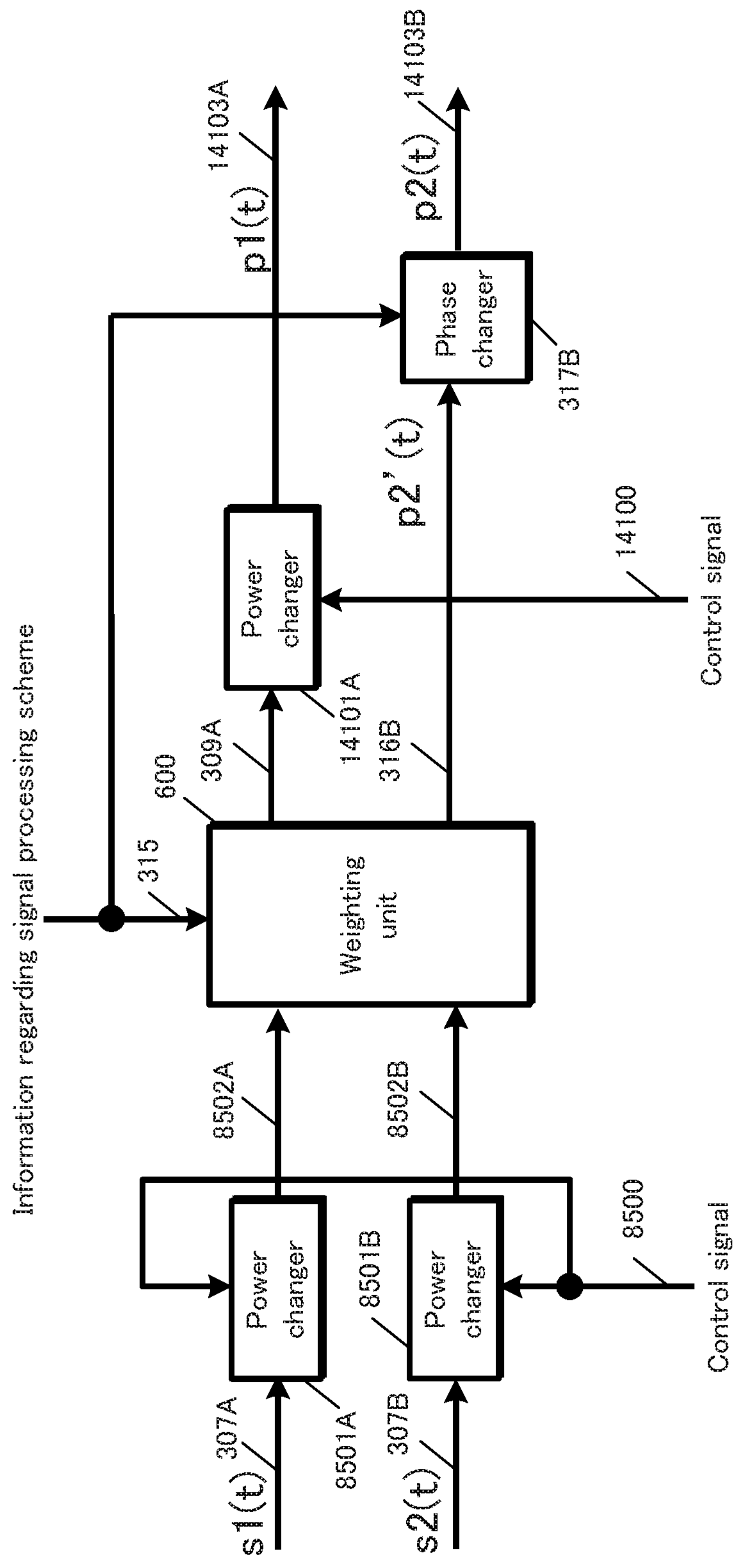

FIG. 145 illustrates an example of a structure of the signal processor pertaining to the weighting unit.

Figure 146:
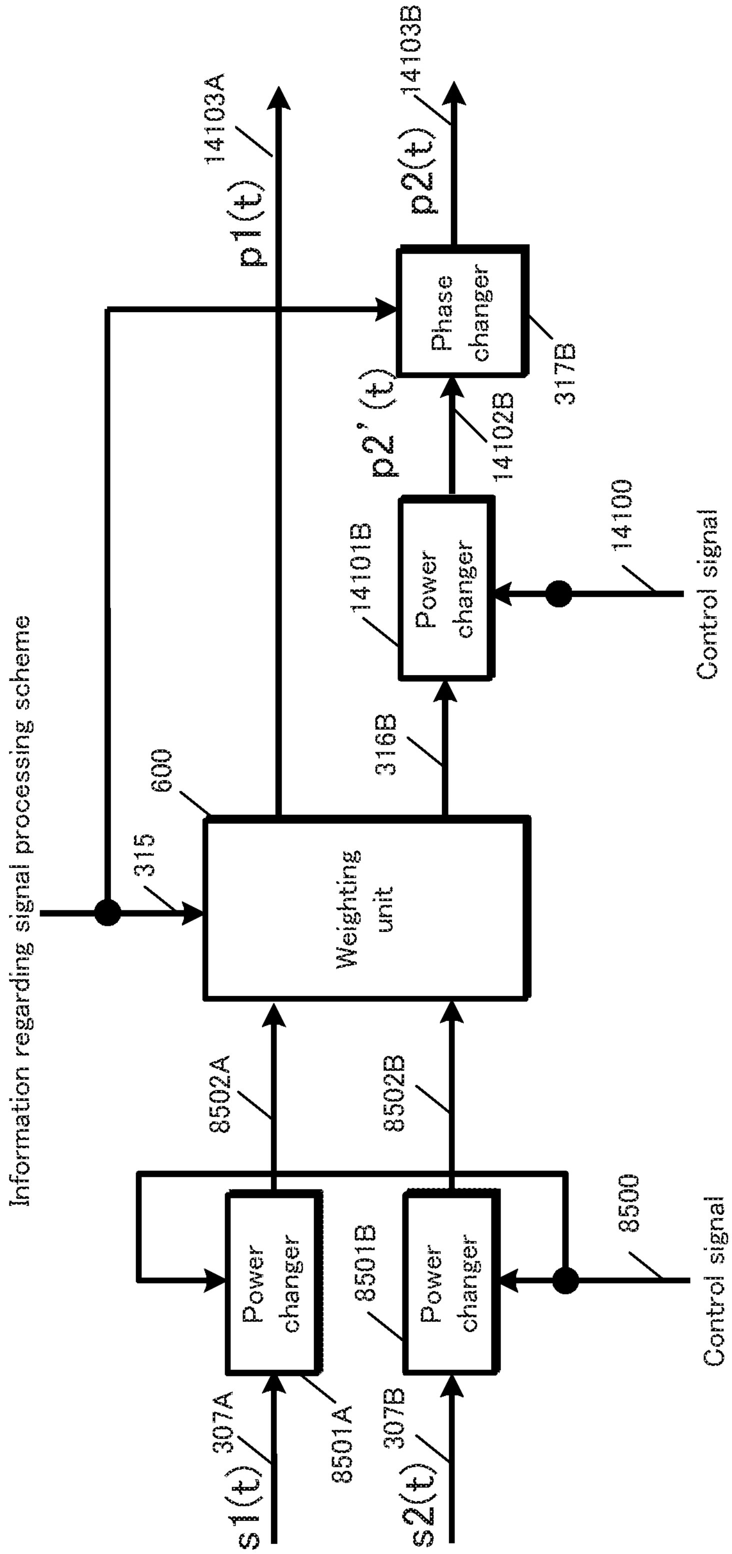

FIG. 146 illustrates an example of a structure of the signal processor pertaining to the weighting unit.

Figure 147:
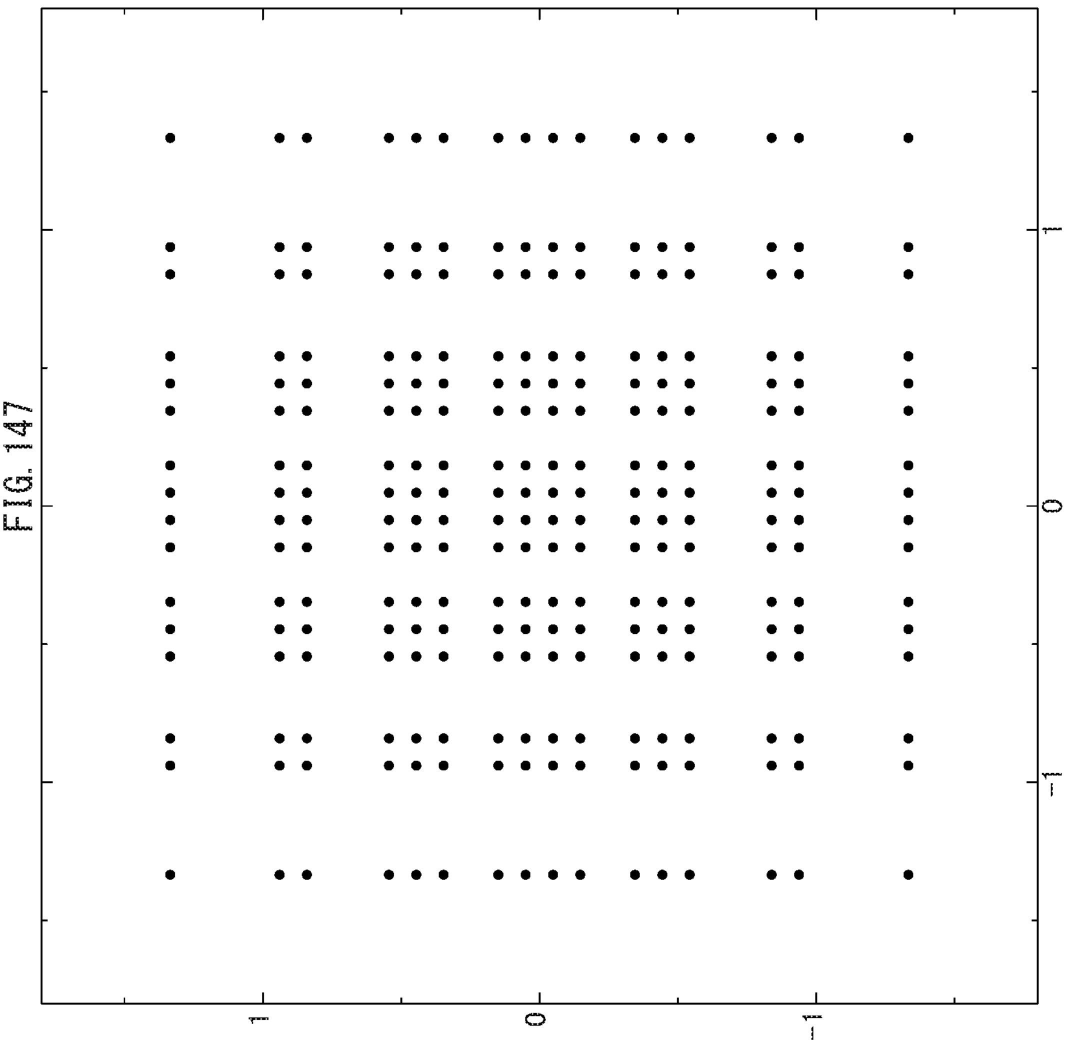

FIG. 147 illustrates an example of a signal point arrangement after precoding for 16-QAM in the I-Q plane.

Figure 148:
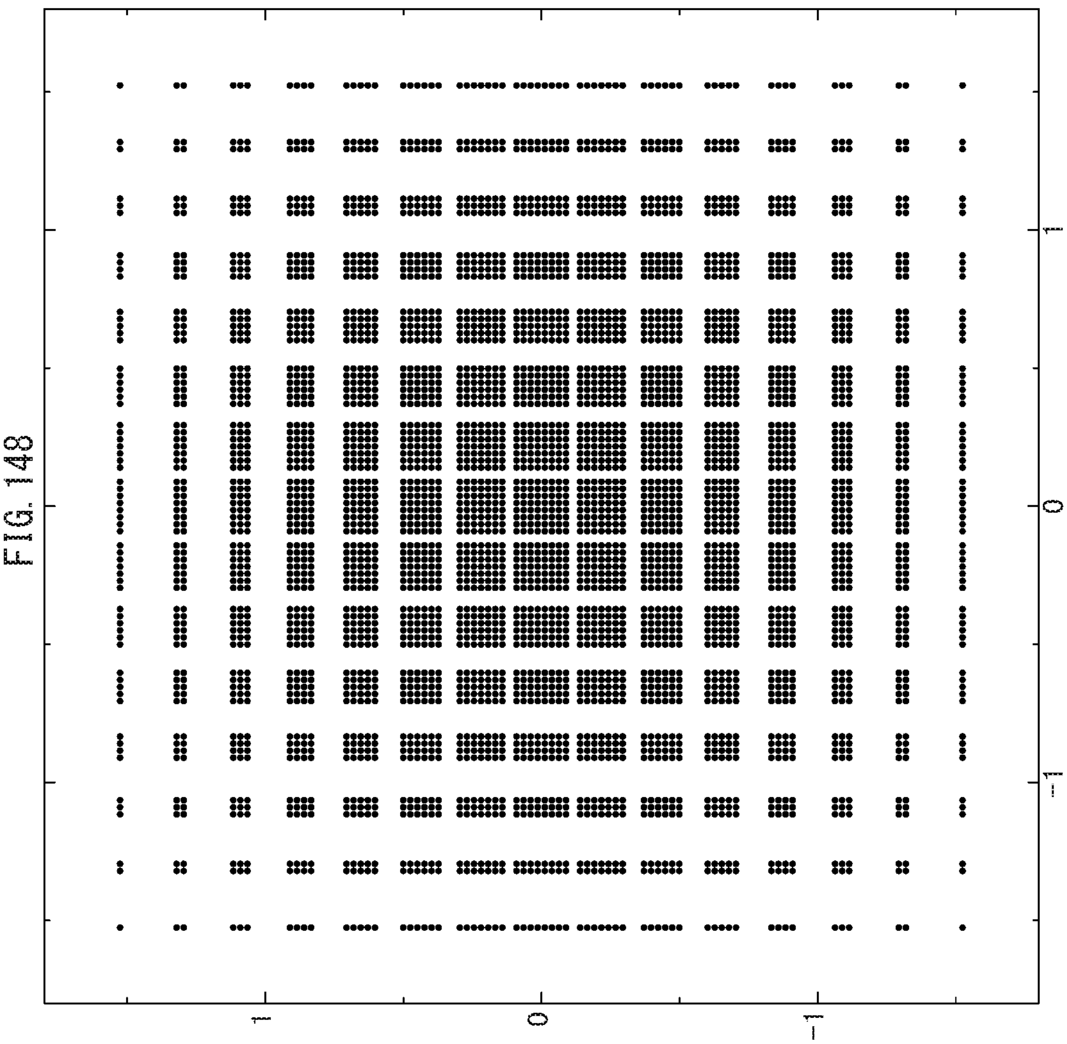

FIG. 148 illustrates an example of a signal point arrangement after precoding for 64-QAM in the I-Q plane.

Figure 149:
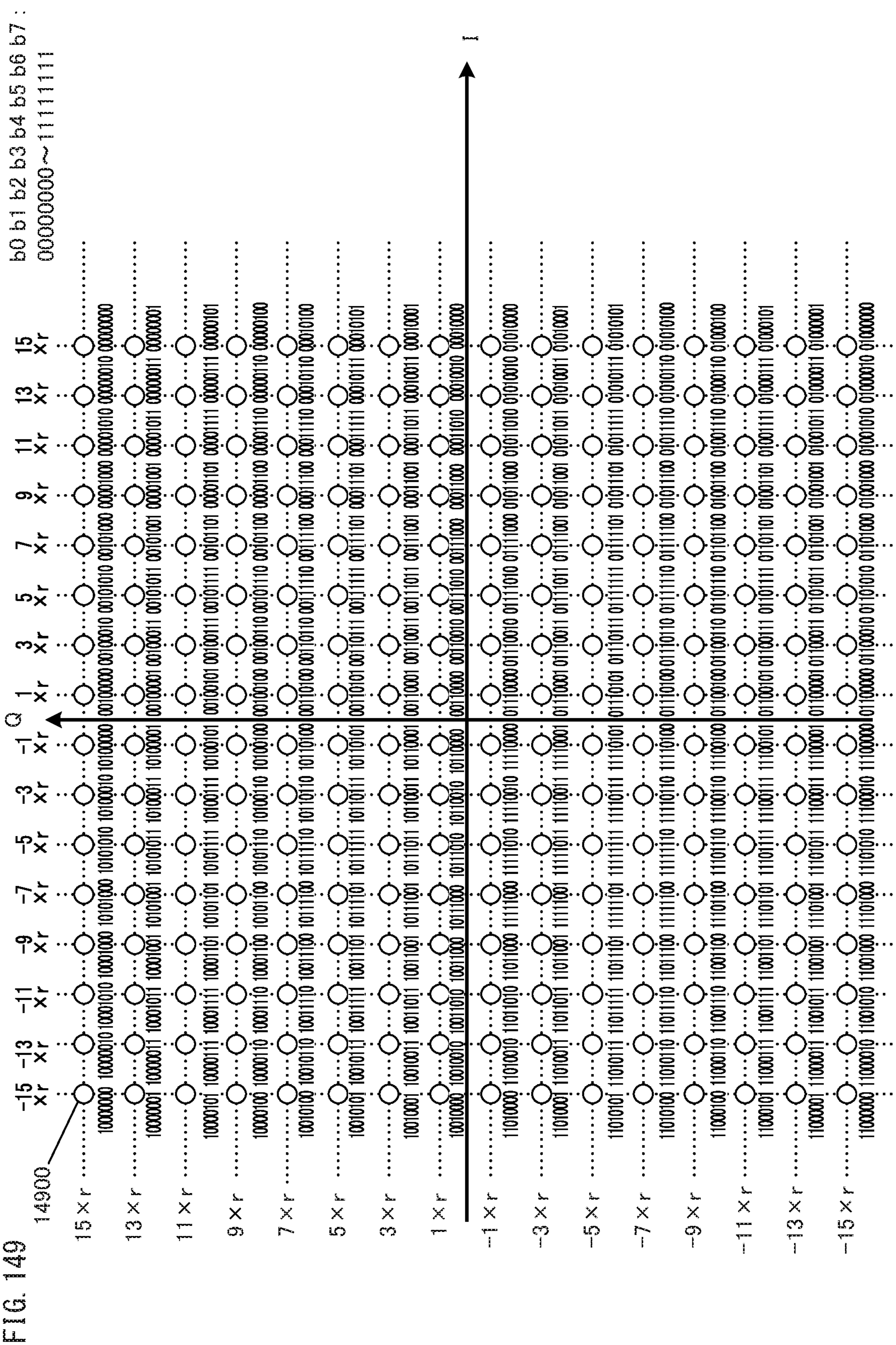

FIG. 149 illustrates an example of a signal point arrangement for 256-QAM in the I-Q plane.

DESCRIPTION OF EMBODIMENTS

Embodiments of the present invention are described below with reference to the accompanying drawings.

Embodiment 1

The following describes, in detail, a transmission scheme, a transmission device, a reception scheme, and a reception device pertaining to the present embodiment.

Before beginning the description proper, an outline of transmission schemes and decoding schemes in a conventional spatial multiplexing MIMO system is provided.

Figure 1:
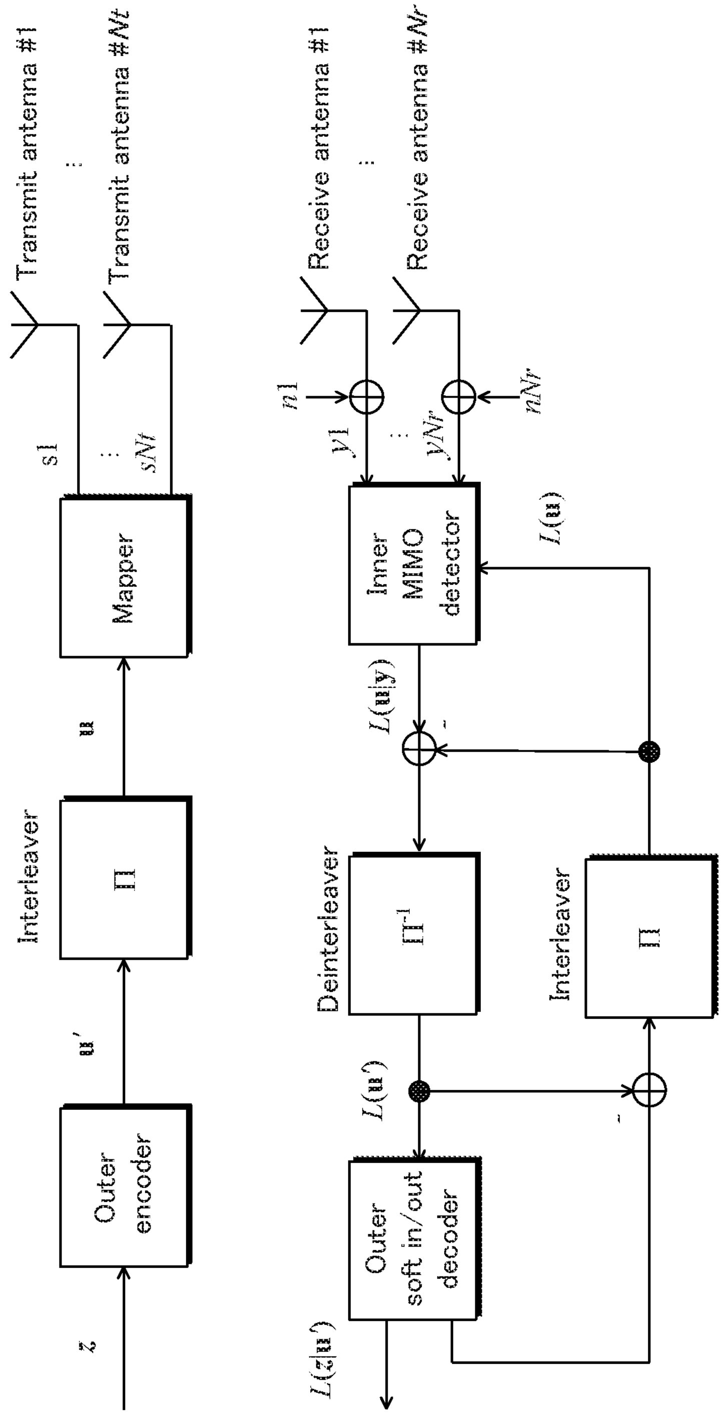
FIG. 1 illustrates an example of a transmission and reception device in a spatial multiplexing MIMO system.

FIG. 1 illustrates the structure of an $N_t \times N_r$ spatial multiplexing MIMO system. An information vector z is encoded and interleaved. The encoded bit vector $u=(u_1, \ldots, u_{Nt})$ is obtained as the interleave output. Here, $u_i=(u_{i1}, \ldots, u_{iM})$ (where M is the number of transmitted bits per symbol). For a transmit vector $s=(s_1, \ldots, s_{Nt})$, a received signal $s_i=\text{map}(u_i)$ is found for transmit antenna #i. Normalizing the transmit energy, this is expressible as $E\{|s_i|^2\}=E_s/N_t$ (where $E_s$ is the total energy per channel). The receive vector $y=(y_1, \ldots, y_{Nr})^T$ is expressed in formula 1, below.

[Math. 1]

$$\begin{aligned} y &= (y_1, \ldots, y_{Nr})^T \\ &= H_{NtNr}s + n \end{aligned} \quad \text{(formula 1)}$$

Here, $H_{NtNr}$ is the channel matrix, $n=(n_1, \ldots, n_{Nr})$ is the noise vector, and the average value of $n_i$ is zero for independent and identically distributed (i.i.d) complex Gaussian noise of variance $\sigma^2$. Based on the relationship between transmitted symbols introduced into a receiver and the received symbols, the probability distribution of the received vectors can be expressed as formula 2, below, for a multi-dimensional Gaussian distribution.

[Math. 2]

$$p(y \mid u) = \frac{1}{(2\pi\sigma^2)^{N_r}} \exp\left(-1\frac{1}{2\sigma^2}\|y - Hs(u)\|^2\right) \quad \text{(formula 2)}$$

Here, a receiver performing iterative decoding is considered. Such a receiver is illustrated in FIG. 1 as being made up of an outer soft-in/soft-out decoder and a MIMO detector. The log-likelihood ratio vector (L-value) for FIG. 1 is given by formula 3 through formula 5, as follows.

[Math. 3]

$$L(u) = (L(u_1), \ldots, L(u_{N_t}))^T \quad \text{(formula 3)}$$

[Math. 4]

$$L(u) = (L(u_{i1}), \ldots, L(u_{iM})) \quad \text{(formula4)}$$

[Math. 5]

$$L(u_{ij}) = \ln\frac{P(u_{ij} = +1)}{P(u_{ij} = -1)} \quad \text{(formula 5)}$$

(Iterative Detection Scheme)

The following describes the MIMO signal iterative detection performed by the $N_t\lambda N_r$ spatial multiplexing MIMO system.

The log-likelihood ratio of $u_{mn}$ is defined by formula 6.

[Math. 6]

$$L(u_{mn} \mid y) = \ln\frac{P(u_{mn} = +1 \mid y)}{P(u_{mn} = -1 \mid y)} \quad \text{(formula 6)}$$

Through application of Bayes' theorem, formula 6 can be expressed as formula 7.

[Math. 7]

$$\begin{aligned} L(u_{mn} \mid y) &= \ln\frac{p(y \mid u_{mn} = +1)P(u_{mn} = +1)/p(y)}{p(y \mid u_{mn} = -1)P(u_{mn} = -1)/p(y)} \\ &= \ln\frac{P(u_{mn} = +1)}{P(u_{mn} = -1)} + \ln\frac{p(y \mid u_{mn} = +1)}{p(y \mid u_{mn} = -1)} \\ &= \ln\frac{P(u_{mn} = +1)}{P(u_{mn} = -1)} + \ln\frac{\sum_{U_{mn,+1}} p(y \mid u)p(u \mid u_{mn})}{\sum_{U_{mn,-1}} p(y \mid u)p(u \mid u_{mn})} \end{aligned} \quad \text{(formula 7)}$$

Note that $U_{mn,\pm1}=\{u|u_{mn}=\pm1\}$. Through the approximation $\ln \Sigma\, a_j \sim \max \ln a_j$, formula 7 can be approximated as formula 8. The symbol ~ is herein used to signify approximation.

[Math. 8]

$$L(u_{mn} \mid y) \approx \ln\frac{P(u_{mn} = +1)}{P(u_{mn} = -1)} + \max_{Umn,+1}\{\ln p(y \mid u) + P(u \mid u_{mn})\} - \max_{Umn,-1}\{\ln p(y \mid u) + P(u \mid u_{mn})\} \quad \text{(formula 8)}$$

In formula 8, $P(u|u_{mn})$ and $\ln P(u|u_{mn})$ can be expressed as follows.

[Math. 9]

$$\begin{aligned} P(u \mid u_{mn}) &= \prod_{(ij)\neq(mn)} P(u_{ij}) \\ &= \prod_{(ij)\neq(mn)} \frac{\exp\left(\frac{u_{ij}L(u_{ij})}{2}\right)}{\exp\left(\frac{L(u_{ij})}{2}\right) + \exp\left(-\frac{L(u_{ij})}{2}\right)} \end{aligned} \quad \text{(formula 9)}$$

-continued

[Math. 10]

$$\ln P(u \mid u_{mn}) = \left(\sum_{ij} \ln P(u_{ij})\right) - \ln P(u_{mn}) \quad \text{(formula 10)}$$

[Math. 11]

$$\begin{aligned} \ln P(u_{ij}) &= \frac{1}{2}u_{ij}(P_{uj}) - \ln\left(\exp\left(\frac{L(u_{ij})}{2}\right) + \exp\left(-\frac{L(u_{ij})}{2}\right)\right) \\ &\approx \frac{1}{2}u_{ij}L(u_{ij}) - \frac{1}{2}|L(u_{ij})| \\ &\text{for } |L(u_{ij})| > 2 \\ &\left|\frac{L(u_{ij})}{2}\right|(u_{ij}\operatorname{sign}(L(u_{ij})) - 1) \end{aligned} \quad \text{(formula 11)}$$

Note that the log-probability of the formula given in formula 2 can be expressed as formula 12.

[Math. 12]

$$\ln p(y \mid u) = -\frac{N_r}{2}\ln(2\pi\sigma^2)\frac{1}{2\sigma^2}\|y - Hs(u)\|^2 \quad \text{(formula 12)}$$

Accordingly, given formula 7 and formula 13, the posterior L-value for the MAP or APP (a posteriori probability) can be can be expressed as follows.

[Math. 13]

$$L(u_{mn} \mid y) = \ln\frac{\sum_{U_{mn,+1}} \exp\left\{-\frac{1}{2\sigma^2}\|y - Hs(u)\|^2 + \sum_{ij}\ln P(u_{ij})\right\}}{\sum_{U_{mn,-1}} \exp\left\{-\frac{1}{2\sigma^2}\|y - Hs(u)\|^2 + \sum_{ij}\ln P(u_{ij})\right\}} \quad \text{(formula 13)}$$

This is hereinafter termed iterative APP decoding. Also, given formula 8 and formula 12, the posterior L-value for the Max-log APP can be can be expressed as follows.

[Math. 14]

$$L(u_{mn} \mid y) \approx \max_{Umn,+1}\{\Psi(u, y, L(u))\} - \max_{Umn,-1}\{\Psi(u, y, L(u))\} \quad \text{(formula 14)}$$

[Math. 15]

$$\Psi(u, y, L(u)) = -\frac{1}{2\sigma^2}\|y - Hs(u)\|^2 + \sum_{ij}\ln P(u_{ij}) \quad \text{(formula 15)}$$

This is hereinafter referred to as iterative Max-log APP decoding. As such, the external information required by the iterative decoding system is obtainable by subtracting prior input from formula 13 or from formula 14.

(System Model)

FIG. 23 illustrates the basic configuration of a system related to the following explanations. The illustrated system is a 2×2 spatial multiplexing MIMO system having an outer decoder for each of two streams A and B. The two outer decoders perform identical LDPC encoding (Although the present example considers a configuration in which the outer encoders use LDPC codes, the outer encoders are not restricted to the use of LDPC as the error-correcting codes. The example may also be realized using other error-correcting codes, such as turbo codes, convolutional codes, or LDPC convolutional codes. Further, while the outer encoders are presently described as individually configured for each transmit antenna, no limitation is intended in this regard. A single outer encoder may be used for a plurality of transmit antennas, or the number of outer encoders may be greater than the number of transmit antennas. The system also has interleavers ($\pi_a$, $\pi_b$) for each of the streams A and B. Here, the modulation scheme is $2^h$-QAM (i.e., h bits transmitted per symbol).

The receiver performs iterative detection (iterative APP (or Max-log APP) decoding) of MIMO signals, as described above. The LDPC codes are decoded using, for example, sum-product decoding.

Figure 2:
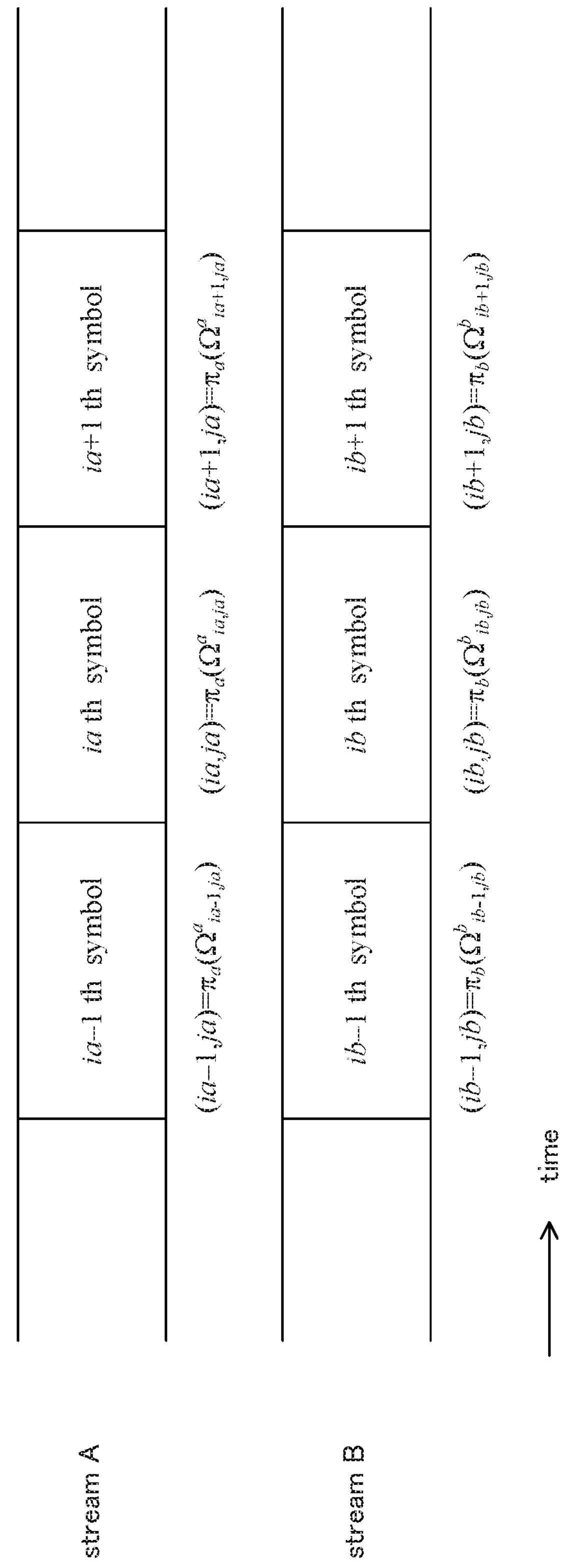
FIG. 2 illustrates a sample frame configuration.

FIG. 2 illustrates the frame configuration and describes the symbol order after interleaving. Here, $(i_a, j_a)$ and $(i_b, j_b)$ can be expressed as follows.

[Math. 16]

$$(i_a,j_a)=\pi_a(\Omega_{ia,ja}^{a}) \quad \text{(formula 16)}$$

[Math. 17]

$$(i_b,i_j)=\pi_b(\Omega_{ib,jb}^{a}) \quad \text{(formula 17)}$$

Here, $i_a$ and $i_b$ represent the symbol order after interleaving, $j_a$ and $j_b$ represent the bit position in the modulation scheme (where $j_a, j_b=1, \ldots h$), $\pi_a$ and $\pi_b$ represent the interleavers of streams A and B, and $\Omega_{ia,ja}^{a}$ and $\Omega_{ib,jb}^{b}$ represent the data order of streams A and B before interleaving. Note that FIG. 2 illustrates a situation where $i_a=i_b$.

(Iterative Decoding)

The following describes, in detail, the sum-product decoding used in decoding the LDPC codes and the MIMO signal iterative detection algorithm, both used by the receiver.

Sum-Product Decoding

A two-dimensional M×N matrix $H=\{H_{mn}\}$ is used as the check matrix for LDPC codes subject to decoding. For the set$[1,N]=\{1, 2, \ldots, N\}$, the partial sets A(m) and B(n) are defined as follows.

[Math. 18]

$$A(m)\equiv\{n:H_{mn}=1\} \quad \text{(formula 18)}$$

[Math. 19]

$$B(n)\equiv\{m:H_{mn}=1\} \quad \text{(formula 19)}$$

Here, A(m) signifies the set of column indices equal to 1 for row m of check matrix H, while B(n) signifies the set of row indices equal to 1 for row n of check matrix H. The sum-product decoding algorithm is as follows.

Step A-1 (Initialization): For all pairs (m,n) satisfying $H_{mn}=1$, set the prior log ratio $\beta_{mn}=1$. Set the loop variable (number of iterations) $l_{sum}=1$, and set the maximum number of loops $l_{sum,max}$.

Step A-2 (Processing): For all pairs (m,n) satisfying $H_{mn}=1$ in the order $m=1, 2, \ldots, M$, update the extrinsic value log ratio $\alpha_{mn}$ using the following update formula.

[Math. 20]

$$\alpha_{mn} = \left(\prod_{n' \in A(m)\setminus n} \text{sign}(\lambda_{n'} + \beta_{mn'})\right) \times f\left(\sum_{n' \in A(m)\setminus n} f(\lambda_{n'} + \beta_{mn'})\right) \quad \text{(formula 20)}$$

[Math. 21]

$$\text{sign}(x) \equiv \begin{cases} 1 & x \geq 0 \\ -1 & x < 0 \end{cases} \quad \text{(formula 21)}$$

[Math. 22]

$$f(x) \equiv \ln\frac{\exp(x)+1}{\exp(x)-1} \quad \text{(formula 22)}$$

where f is the Gallager function. $\lambda_n$ can then be computed as follows.

Step A-3 (Column Operations): For all pairs (m,n) satisfying $H_{mn}=1$ in the order $n=1, 2, \ldots, N$, update the extrinsic value log ratio $\beta_{mn}$ using the following update formula.

[Math. 23]

$$\beta_{mn} = \sum_{m' \in B(n)\setminus m} \alpha_{m'n} \quad \text{(formula 23)}$$

Step A-4 (Log-likelihood Ratio Calculation): For $n\in[1, N]$, the log-likelihood ratio $L_n$ is computed as follows.

[Math. 24]

$$L_n = \sum_{m' \in B(n)\setminus m} \alpha_{m'n} + \lambda_n \quad \text{(formula 24)}$$

Step A-5 (Iteration Count): If $l_{sum}<l_{sum,max}$, then $l_{sum}$ is incremented and the process returns to step A-2. Sum-product decoding ends when $l_{sum}=l_{sum,max}$.

The above describes one iteration of sum-product decoding operations. Afterward, MIMO signal iterative detection is performed. The variables m, n, $\alpha_{mn}$, $\beta_{mn}$, $\lambda_n$, and $L_n$ used in the above explanation of sum-product decoding operations are expressed as $m_a$, $n_a$, $\alpha^{a}_{mana}$, $\beta^{a}_{mana}$, $\lambda_{na}$, and $L_{na}$ for stream A and as $m_b$, $n_b$, $\alpha^{b}_{mbnb}$, $\beta^{b}_{mbnb}$, $\lambda_{nb}$, and $L_{nb}$ for stream B.

(MIMO Signal Iterative Detection)

The following describes the calculation of $\lambda_n$ for MIMO signal iterative detection.

The following formula is derivable from formula 1.

[Math. 25]

$$\begin{aligned} y(t) &= (y_1(t), y_2(t))^T \\ &= H_{22}(t)s(t) + n(t) \end{aligned} \quad \text{(formula 25)}$$

Given the frame configuration illustrated in FIG. 2, the following functions are derivable from formula 16 and formula 17.

[Math. 26]

$$n_a=\Omega_{ia,ja}^{a} \quad \text{(formula 26)}$$

[Math. 27]

$$n_b=\Omega_{ib,jb}{}^{b} \quad \text{(formula 27)}$$

where $n_a,n_b \in [1,N]$. For iteration k of MIMO signal iterative detection, the variables $\lambda_{na}$, $L_{na}$, $\lambda_{nb}$, and $L_{nb}$ are expressed as $\lambda_{k,na}$, $L_{k,na}$, $\lambda_{\kappa,nb}$, and $L_{k,nb}$.

Step B-1 (Initial Detection; k=0): For initial wave detection, $\lambda_{o,na}$ and $\lambda_{0,nb}$ are calculated as follows.

For iterative APP decoding:

[Math. 28]

$$\lambda_{0,n_X}=\ln\frac{\sum_{U_{0,n_X,+1}}\exp\left\{-\frac{1}{2\sigma^2}\|y(i_X)-H_{22}(i_X)s(u(i_X))\|^2\right\}}{\sum_{U_{0,n_X,-1}}\exp\left\{-\frac{1}{2\sigma^2}\|y(i_X)-H_{22}(i_X)s(u(i_X))\|^2\right\}} \quad \text{(formula 28)}$$

For iterative Max-log APP decoding:

[Math. 29]

$$\lambda_{0,n_X}=\max_{U_{0,n_X,+1}}\{\Psi(u(i_X),y(i_X))\}-\max_{U_{0,n_X,-1}}\{\Psi(u(i_X),y(i_X))\} \quad \text{(formula 29)}$$

[Math. 30]

$$\Psi(u(i_X),y(i_X))=-\frac{1}{2\sigma^2}\|y(i_X)-H_{22}(i_X)s(u(i_X))\|^2 \quad \text{(formula 30)}$$

where X=a,b. Next, the iteration count for the MIMO signal iterative detection is set to $l_{mimo}=0$, with the maximum iteration count being $l_{mimo,max}$.

Step B-2 (Iterative Detection; Iteration k): When the iteration count is k, formula 11, formula 13) through formula 15), formula 16), and formula 17) can be expressed as formula 31) through formula 34), below. Note that (X,Y)=(a,b)(b,a).

For iterative APP decoding:

[Math. 31]

$$\lambda_{k,n_X}=L_{k-1_{\Omega^X_{iX,jX}}}\left(u_{\Omega^X_{iX,jX}}\right)+\ln\frac{\sum_{U_{k,n_X,+1}}\exp\left\{-\frac{1}{2\sigma^2}\|y(i_X)-H_{22}(i_X)s(u(i_X))\|^2+\rho\left(u_{\Omega^X_{iX,jX}}\right)\right\}}{\sum_{U_{k,n_X,+1}}\exp\left\{-\frac{1}{2\sigma^2}\|y(i_X)-H_{22}(i_X)s(u(i_X))\|^2+\rho\left(u_{\Omega^X_{iX,jX}}\right)\right\}} \quad \text{(formula 31)}$$

-continued

[Math. 32]

$$\rho\left(u_{\Omega^X_{iX,jX}}\right)=\sum_{\substack{\gamma=1\\ \gamma\neq jX}}^{h}\left|\frac{L_{k-1,\Omega^X_{iX,\gamma}}\left(u_{\Omega^X_{iX,\gamma}}\right)}{2}\right|\left(u_{\Omega^X_{iX,\gamma}}\operatorname{sign}\left(L_{k-1,\Omega^X_{iX,\gamma}}\left(u_{\Omega^X_{iX,\gamma}}\right)\right)-1\right)+\sum_{\gamma=1}^{h}\left|\frac{L_{k-1,\Omega^X_{iX,\gamma}}\left(u_{\Omega^Y_{iX,\gamma}}\right)}{2}\right|\left(u_{\Omega^Y_{iX,\gamma}}\operatorname{sign}\left(L_{k-1,\Omega^Y_{iX,\gamma}}\left(u_{\Omega^Y_{iX,\gamma}}\right)\right)-1\right) \quad \text{(formula 32)}$$

For iterative Max-log APP decoding:

[Math. 33]

$$\lambda_{k,n_X}=L_{k-1_{\Omega^X_{iX,jX}}}\left(u_{\Omega^X_{iX,jX}}\right)+\max_{U_{k,n_X,+1}}\left\{\Psi\left(u(i_X),y(i_X),\rho\left(u_{\Omega^X_{iX,jX}}\right)\right)\right\}-\max_{U_{k,n_X,-1}}\left\{\Psi\left(u(i_X),y(i_X),\rho\left(u_{\Omega^X_{iX,jX}}\right)\right)\right\} \quad \text{(formula 33)}$$

[Math. 34]

$$\Psi\left(u(i_X),y(i_X),\rho\left(u_{\Omega^X_{iX,jX}}\right)\right)=-\frac{1}{2\sigma^2}\|y(i_X)-H_{22}(i_X)s(u(i_X))\|^2+\rho\left(u_{\Omega^X_{iX,jX}}\right) \quad \text{(formula 34)}$$

Step B-3 (Iteration Count and Codeword Estimation): If $l_{mimo}<l_{mimo,max}$, then $l_{mimo}$ is incremented and the process returns to step B-2. When $l_{mimo}=l_{mimo,max}$, an estimated codeword is found, as follows.

[Math. 35]

$$\hat{u}_{n_X}=\begin{cases}1 & L_{l_{mimo},n_X}\geq 0\\ -1 & L_{l_{mimo},n_X}<0\end{cases} \quad \text{(formula 35)}$$

where X=a,b.

Figure 3:
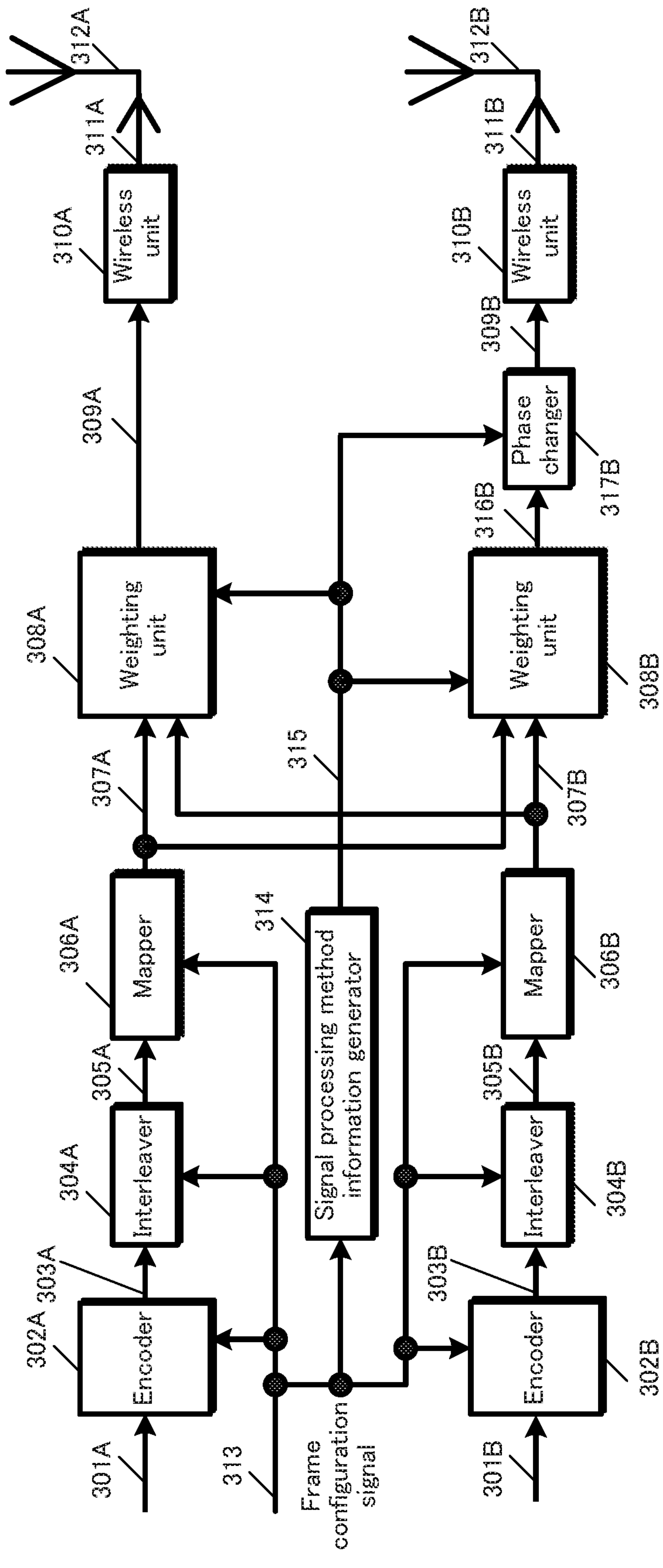
FIG. 3 illustrates an example of a transmission device applying a phase changing scheme.

FIG. 3 shows a sample configuration of a transmission device 300 pertaining to the present embodiment. An encoder 302A takes information (data) 301A and a frame configuration signal 313 as input (which includes the error-correction scheme, coding rate, block length, and other information used by the encoder 302A in error-correction coding of the data, such that the scheme designated by the frame configuration signal 313 is used. The error-correction scheme may be switched). In accordance with the frame configuration signal 313, the encoder 302A performs error-correction coding, such as convolutional encoding, LDPC encoding, turbo encoding or similar, and outputs encoded data 303A.

An interleaver 304A takes the encoded data 303A and the frame configuration signal 313 as input, performs interleaving, i.e., rearranges the order thereof, and then outputs interleaved data 305A. (Depending on the frame configuration signal 313, the interleaving scheme may be switched.)

A mapper 306A takes the interleaved data 305A and the frame configuration signal 313 as input and performs modulation, such as QPSK (Quadrature Phase Shift Keying), 16-QAM (16-Quadrature Amplitude Modulation), or 64-QAM (64-Quadrature Amplitude Modulation) thereon, then outputs a baseband signal 307A. (Depending on the frame configuration signal 313, the modulation scheme may be switched.)

Figure 19B:
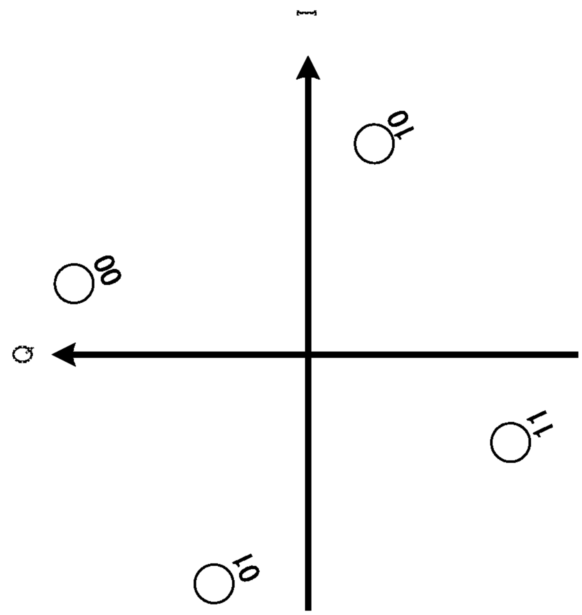
FIGS. 19A and 19B illustrate examples of a mapping scheme.
Figure 19A:
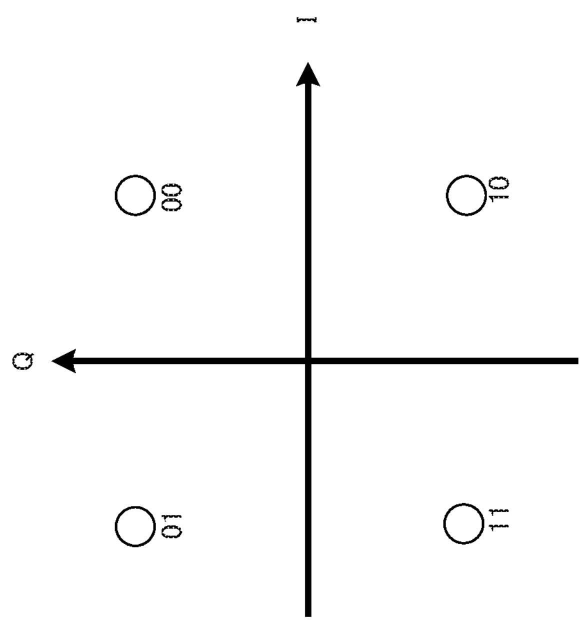
Figure 20B:
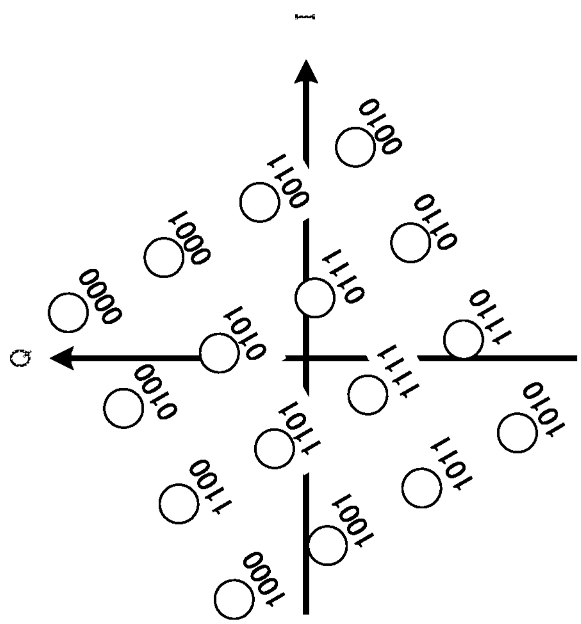
FIGS. 20A and 20B illustrate further examples of a mapping scheme.
Figure 20A:
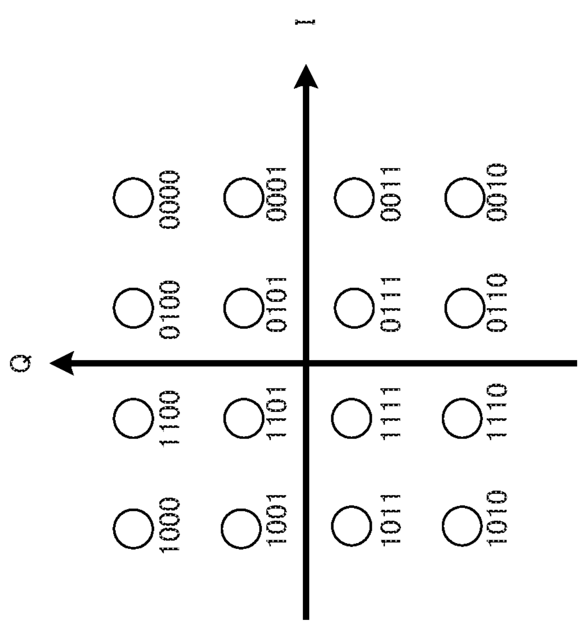

FIGS. 19A and 19B illustrate an example of a QPSK modulation mapping scheme for a baseband signal made up of an in-phase component I and a quadrature component Q in the I-Q plane. For example, as shown in FIG. 19A, when the input data are 00, then the output is I=1.0, Q=1.0. Similarly, when the input data are 01, the output is I=−1.0, Q=1.0, and so on. FIG. 19B illustrates an example of a QPSK modulation mapping scheme in the I-Q plane differing from FIG. 19A in that the signal points of FIG. 19A have been rotated about the origin to obtain the signal points of FIG. 19B. Non-Patent Literature 9 and Non-Patent Literature 10 describe such a constellation rotation scheme. Alternatively, the Cyclic Q Delay described in Non-Patent Literature 9 and Non-Patent Literature 10 may also be adopted. An alternate example, distinct from FIGS. 19A and 19B, is shown in FIGS. 20A and 20B, which illustrate a signal point arrangement for 16-QAM in the I-Q plane. The example of FIG. 20A corresponds to FIG. 19A, while that of FIG. 20B corresponds to FIG. 19B.

An encoder 302B takes information (data) 301B and the frame configuration signal 313 as input (which includes the error-correction scheme, coding rate, block length, and other information used by the encoder 302A in error-correction coding of the data, such that the scheme designated by the frame configuration signal 313 is used. The error-correction scheme may be switched). In accordance with the frame configuration signal 313, the encoder 302B performs error-correction coding, such as convolutional encoding, LDPC encoding, turbo encoding or similar, and outputs encoded data 303B.

An interleaver 304B takes the encoded data 303B and the frame configuration signal 313 as input, performs interleaving, i.e., rearranges the order thereof, and outputs interleaved data 305B. (Depending on the frame configuration signal 313, the interleaving scheme may be switched.)

A mapper 306B takes the interleaved data 305B and the frame configuration signal 313 as input and performs modulation, such as QPSK, 16-QAM, or 64-QAM thereon, then outputs a baseband signal 307B. (Depending on the frame configuration signal 313, the modulation scheme may be switched.)

A signal processing scheme information generator 314 takes the frame configuration signal 313 as input and accordingly outputs signal processing scheme information 315. The signal processing scheme information 315 designates the fixed precoding matrix to be used, and includes information on the pattern of phase changes used for changing the phase.

A weighting unit 308A takes baseband signal 307A, baseband signal 307B, and the signal processing scheme information 315 as input and, in accordance with the signal processing scheme information 315, performs weighting on the baseband signals 307A and 307B, then outputs a weighted signal 309A. The weighting scheme is described in detail, later.

A wireless unit 310A takes weighted signal 309A as input and performs processing such as quadrature modulation, band limitation, frequency conversion, amplification, and so on, then outputs transmit signal 311A. Transmit signal 311A is then output as radio waves by an antenna 312A.

A weighting unit 308B takes baseband signal 307A, baseband signal 307B, and the signal processing scheme information 315 as input and, in accordance with the signal processing scheme information 315, performs weighting on the baseband signals 307A and 307B, then outputs weighted signal 316B.

Figure 21:
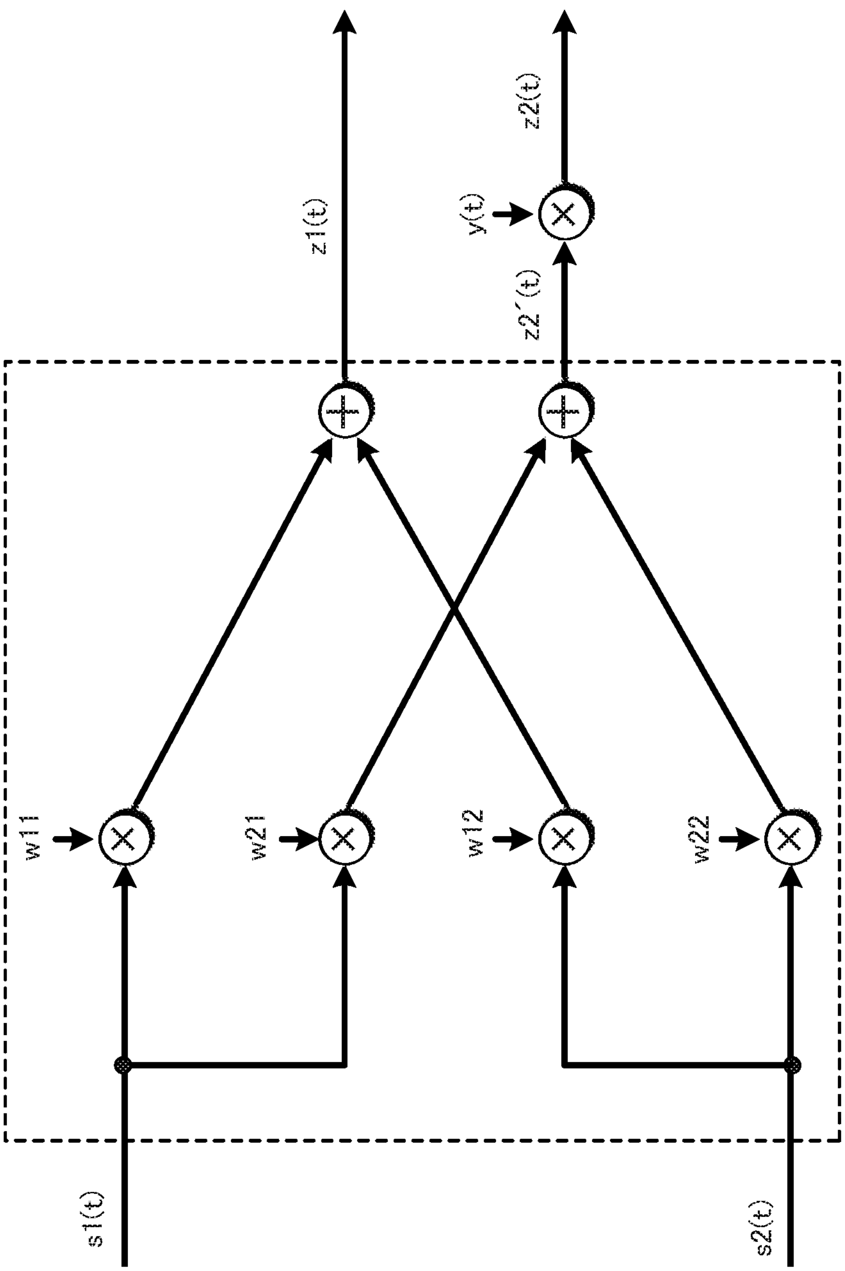
FIG. 21 illustrates a sample configuration of a weighting unit.

FIG. 21 illustrates the configuration of the weighting units 308A and 308B. The area of FIG. 21 enclosed in the dashed line represents one of the weighting units. Baseband signal 307A is multiplied by w11 to obtain w11·s1(*t*), and multiplied by w21 to obtain w21·s1(*t*). Similarly, baseband signal 307B is multiplied by w12 to obtain w12·s2(*t*), and multiplied by w22 to obtain w22·s2(*t*). Next, z1(*t*)=w11·s1(*t*)+w12·s2(*t*) and z2(*t*)=w21·s1(*t*)+w22·s22(*t*) are obtained. Here, as explained above, s1(*t*) and s2(*t*) are baseband signals modulated according to a modulation scheme such as BPSK (Binary Phase Shift Keying), QPSK, 8-PSK (8-Phase Shift Keying), 16-QAM, 32-QAM (32-Quadrature Amplitude Modulation), 64-QAM, 256-QAM 16-APSK (16-Amplitude Phase Shift Keying) and so on.

Both weighting units perform weighting using a fixed precoding matrix. The precoding matrix uses, for example, the scheme of formula 36, and satisfies the conditions of formula 37 or formula 38, all found below. However, this is only an example. The value of a is not restricted to formula 37 and formula 38, and may take on other values, e.g., α=1.

Here, the precoding matrix is:

[Math. 36]

$$\begin{pmatrix} w11 & w12 \\ w21 & w22 \end{pmatrix} = \frac{1}{\sqrt{\alpha^2+1}}\begin{pmatrix} e^{j0} & \alpha \times e^{j0} \\ \alpha \times e^{j0} & e^{j\pi} \end{pmatrix} \quad \text{(formula 36)}$$

In formula 36,

[Math. 37]

$$\alpha = \frac{\sqrt{2}+4}{\sqrt{2}+2} \quad \text{(formula 37)}$$

α may be given by formula 37.

Alternatively, in formula 36,

[Math. 38]

$$\alpha = \frac{\sqrt{2}+3+\sqrt{5}}{\sqrt{2}+3-\sqrt{5}} \quad \text{(formula 38)}$$

α may be given by formula 38.

The precoding matrix is not restricted to that of formula 36, but may also be as indicated by formula 39.

[Math. 39]

$$\begin{pmatrix} w11 & w12 \\ w21 & w22 \end{pmatrix} = \begin{pmatrix} a & b \\ c & d \end{pmatrix} \quad \text{(formula 39)}$$

In formula 39, let $a=Ae^{j\delta 11}$, $b=Be^{j\delta 12}$, $c=Ce^{j\delta 21}$, and $d=De^{j\delta 22}$. Further, one of a, b, c, and d may be zero. For example, the following configurations are possible: (1) a may be zero while b, c, and d are non-zero, (2) b may be zero while a, c, and d are non-zero, (3) c may be zero while a, b, and d are non-zero, or (4) d may be zero while a, b, and c are non-zero.

When any of the modulation scheme, error-correcting codes, and the coding rate thereof are changed, the precoding matrix may also be set, changed, and fixed for use.

A phase changer 317B takes weighted signal 316B and the signal processing scheme information 315 as input, then regularly changes the phase of the signal 316B for output. This regular change is a change of phase performed according to a predetermined phase changing pattern having a predetermined period (cycle) (e.g., every n symbols (n being an integer, n≥1) or at a predetermined interval). The details of the phase changing pattern are explained below, in Embodiment 4.

Wireless unit 310B takes post-phase-change signal 309B as input and performs processing such as quadrature modulation, band limitation, frequency conversion, amplification, and so on, then outputs transmit signal 311B. Transmit signal 311B is then output as radio waves by an antenna 312B.

Figure 4:
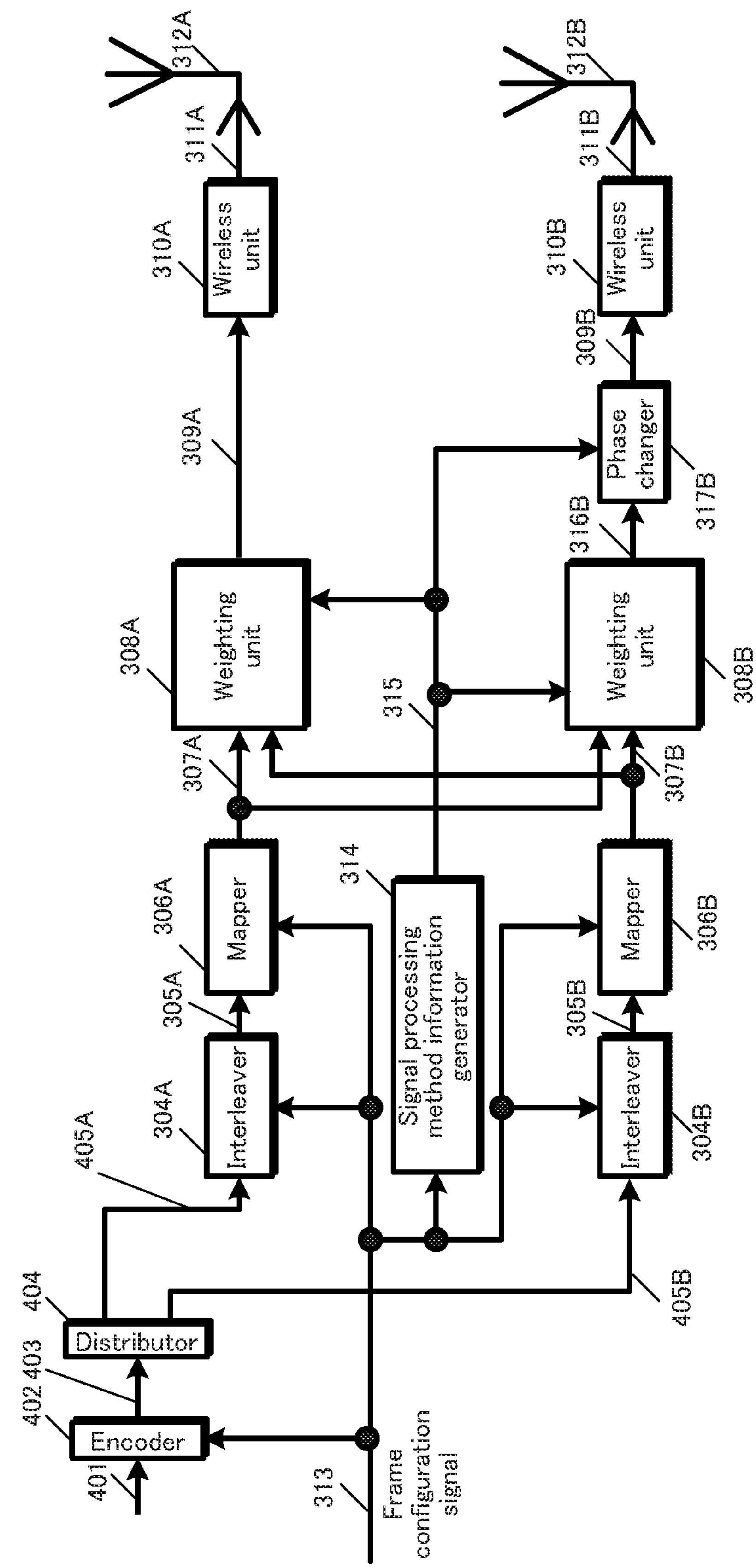
FIG. 4 illustrates another example of a transmission device applying a phase changing scheme.

FIG. 4 illustrates a sample configuration of a transmission device 400 that differs from that of FIG. 3. The points of difference of FIG. 4 from FIG. 3 are described next.

An encoder 402 takes information (data) 401 and the frame configuration signal 313 as input, and, in accordance with the frame configuration signal 313, performs error-correction coding and outputs encoded data 402.

A distributor 404 takes the encoded data 403 as input, performs distribution thereof, and outputs data 405A and data 405B. Although FIG. 4 illustrates only one encoder, the number of encoders is not limited as such. The present invention may also be realized using m encoders (m being an integer, m≥1) such that the distributor divides the encoded data created by each encoder into two groups for distribution.

Figure 5:
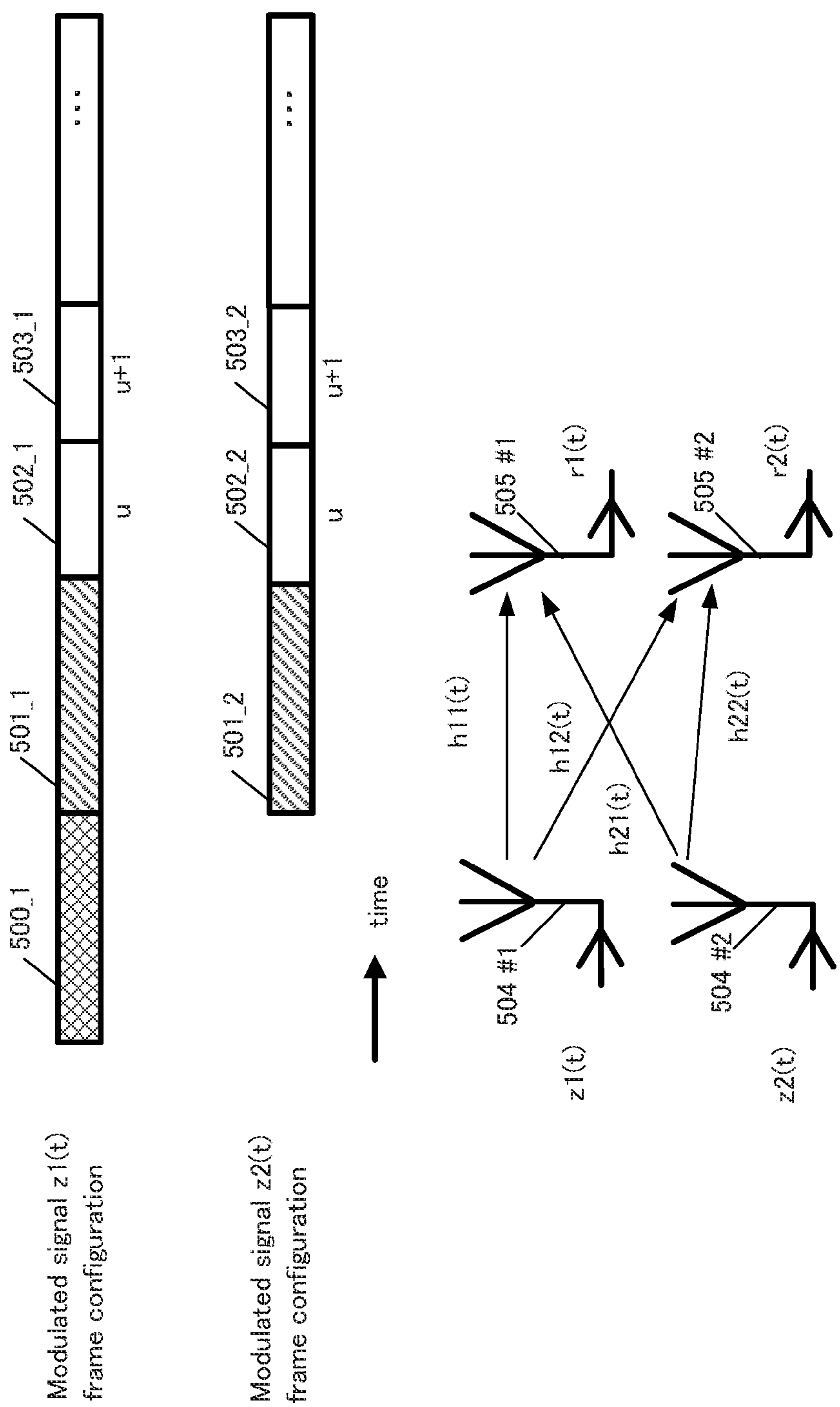
FIG. 5 illustrates another sample frame configuration.

FIG. 5 illustrates an example of a frame configuration in the time domain for a transmission device according to the present embodiment. Symbol 500_1 is for notifying the reception device of the transmission scheme. For example, symbol 500_1 conveys information such as the error-correction scheme used for transmitting data symbols, the coding rate thereof, and the modulation scheme used for transmitting data symbols.

Symbol 501_1 is for estimating channel fluctuations for modulated signal z1(*t*) (where t is time) transmitted by the transmission device. Symbol 502_1 is a data symbol transmitted by modulated signal z1(*t*) as symbol number u (in the time domain). Symbol 503_1 is a data symbol transmitted by modulated signal z1(*t*) as symbol number u+1.

Symbol 501_2 is for estimating channel fluctuations for modulated signal z2(*t*) (where t is time) transmitted by the transmission device. Symbol 502_2 is a data symbol transmitted by modulated signal z2(*t*) as symbol number u (in the time domain). Symbol 503_2 is a data symbol transmitted by modulated signal z1(*t*) as symbol number u+1.

Here, the symbols of z1(*t*) and of z2(*t*) having the same time (identical timing) are transmitted from the transmit antenna using the same (shared/common) frequency.

The following describes the relationships between the modulated signals z1(*t*) and z2(*t*) transmitted by the transmission device and the received signals r1(*t*) and r2(*t*) received by the reception device.

In FIGS. 5, 504#1 and 504#2 indicate transmit antennas of the transmission device, while 505#1 and 505#2 indicate receive antennas of the reception device. The transmission device transmits modulated signal z1(*t*) from transmit antenna 504#1 and transmits modulated signal z2(*t*) from transmit antenna 504#2. Here, the modulated signals z1(*t*) and z2(*t*) are assumed to occupy the same (shared/common) frequency (band). The channel fluctuations in the transmit antennas of the transmission device and the antennas of the reception device are $h_{11}(t)$, $h_{12}(t)$, $h_{21}(t)$, and $h_{22}(t)$, respectively. Assuming that receive antenna 505#1 of the reception device receives received signal r1(*t*) and that receive antenna 505#2 of the reception device receives received signal r2(*t*), the following relationship holds.

[Math. 40]

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} \quad \text{(formula 40)}$$

Figure 6:
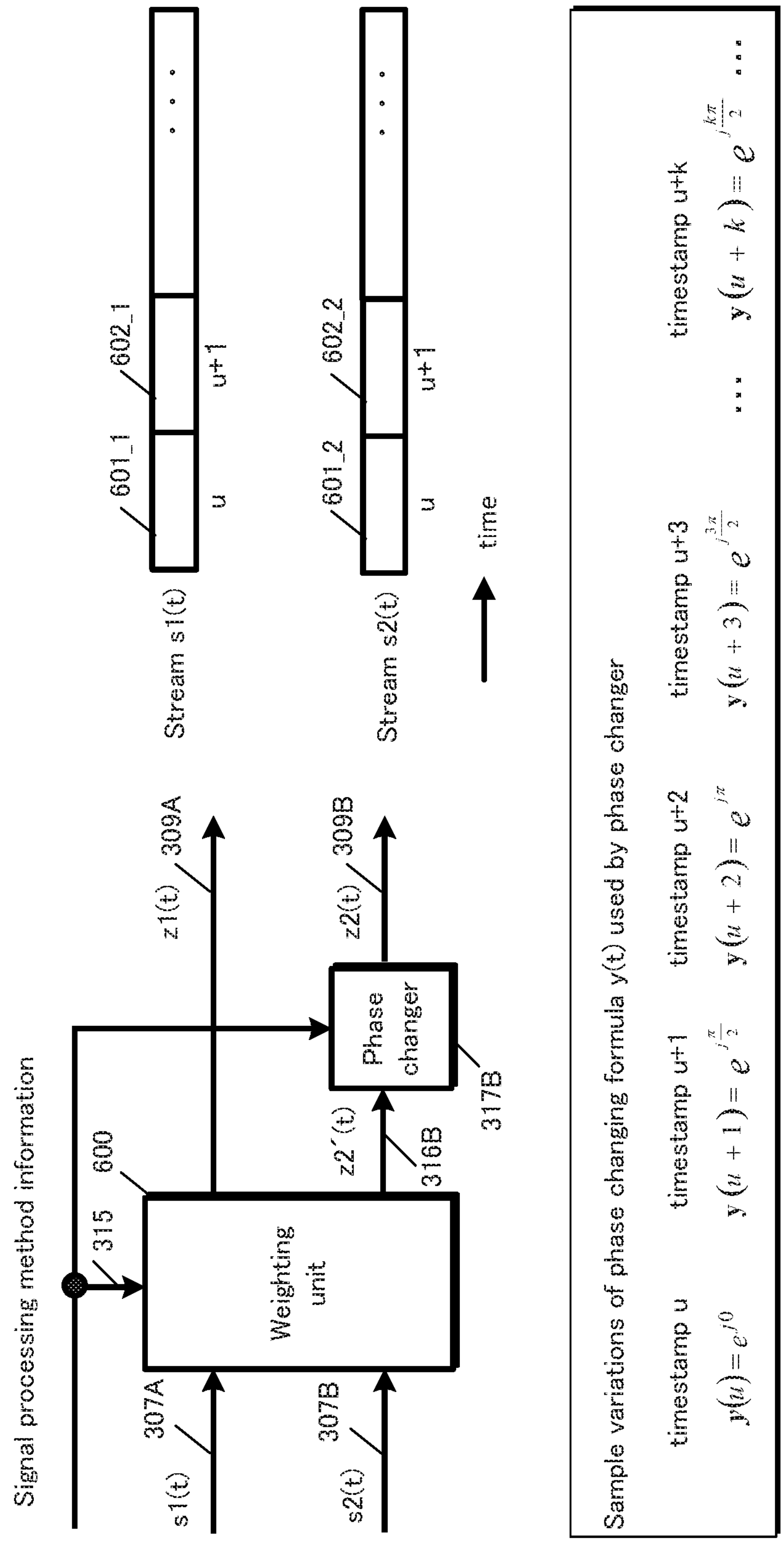
FIG. 6 illustrates a sample phase changing scheme.

FIG. 6 pertains to the weighting scheme (precoding scheme) and the phase changing scheme of the present embodiment. A weighting unit 600 is a combined version of the weighting units 308A and 308B from FIG. 3. As shown, stream s1(*t*) and stream s2(*t*) correspond to the baseband signals 307A and 307B of FIG. 3. That is, the streams s1(*t*) and s2(*t*) are baseband signals made up of an in-phase component I and a quadrature component Q conforming to mapping by a modulation scheme such as QPSK, 16-QAM, and 64-QAM. As indicated by the frame configuration of FIG. 6, stream s1(*t*) is represented as s1(*u*) at symbol number u, as s1(*u*+1) at symbol number u+1, and so forth. Similarly, stream s2(*t*) is represented as s2(*u*) at symbol number u, as s2(*u*+1) at symbol number u+1, and so forth. The weighting unit 600 takes the baseband signals 307A (s1(*t*)) and 307B (s2(*t*)) as well as the signal processing scheme information 315 from FIG. 3 as input, performs weighting in accordance with the signal processing scheme information 315, and outputs the weighted signals 309A (z1(*t*)) and 316B(z2'(*t*)) from FIG. 3. The phase changer 317B changes the phase of weighted signal 316B(z2'(*t*)) and outputs post-phase-change signal 309B(z2(*t*)).

Here, given vector W1=(w11,w12) from the first row of the fixed precoding matrix F, z1(*t*) is expressible as formula 41, below.

[Math. 41]

$$z1(t)=W1\times(s1(t),s2(t))^T \quad \text{(formula 41)}$$

Similarly, given vector W2=(w21,w22) from the second row of the fixed precoding matrix F, and letting the phase changing formula applied by the phase changer by y(t), then z2(*t*) is expressible as formula 42, below.

[Math. 42]

$$z2(t)=y(t)\times W2\times(s1(t),s2(t))^T \quad \text{(formula 42)}$$

Here, y(t) is a phase changing formula following a predetermined scheme. For example, given a period (cycle) of four and time u, the phase changing formula is expressible as formula 43, below.

[Math. 43]

$$y(u)=e^{j0} \quad \text{(formula 43)}$$

Similarly, the phase changing formula for time u+1 may be, for example, as given by formula 44.

[Math. 44]

$$y(u+1)=e^{j\frac{\pi}{2}} \quad \text{(formula 44)}$$

That is, the phase changing formula for time u+k is expressible as formula 45.

[Math. 45]

$$y(u+k)=e^{j\frac{k\pi}{2}} \quad \text{(formula 45)}$$

Note that formula 43 through formula 45 are given only as an example of regular phase changing.

The regular change of phase is not restricted to a period (cycle) of four. Improved reception capabilities (the error-correction capabilities, to be exact) may potentially be promoted in the reception device by increasing the period (cycle) number (this does not mean that a greater period (cycle) is better, though avoiding small numbers such as two is likely ideal).

Furthermore, although formula 43 through formula 45, above, represent a configuration in which a change in phase is carried out through rotation by consecutive predetermined phases (in the above formula, every π/2), the change in phase need not be rotation by a constant amount, but may also be random. For example, in accordance with the predetermined period (cycle) of y(t), the phase may be changed through sequential multiplication as shown in formula 46 and formula 47. The key point of regular phase changing is that the phase of the modulated signal is regularly changed. The degree of phase change is preferably as even as possible, such as from −π radians to π radians. However, given that this describes a distribution, random changes are also possible.

[Math. 46]

$$e^{j0}\rightarrow e^{j\frac{\pi}{5}}\rightarrow e^{j\frac{2\pi}{5}}\rightarrow e^{j\frac{3\pi}{5}}\rightarrow e^{j\frac{4\pi}{5}}\rightarrow e^{j\pi}\rightarrow e^{j\frac{6\pi}{5}}\rightarrow e^{j\frac{7\pi}{5}}\rightarrow e^{j\frac{8\pi}{5}}\rightarrow e^{j\frac{9\pi}{5}} \quad \text{(formula 46)}$$

[Math. 47]

$$e^{j\frac{\pi}{2}}\rightarrow e^{j\pi}\rightarrow e^{j\frac{3\pi}{2}}\rightarrow e^{j2\pi}\rightarrow e^{j\frac{\pi}{4}}\rightarrow e^{j\frac{3}{4}\pi}\rightarrow e^{j\frac{5\pi}{4}}\rightarrow e^{j\frac{7\pi}{4}} \quad \text{(formula 47)}$$

As such, the weighting unit 600 of FIG. 6 performs precoding using fixed, predetermined precoding weights, and the phase changer 317B changes the phase of the signal input thereto while regularly varying the phase changing degree.

When a specialized precoding matrix is used in a LOS environment, the reception quality is likely to improve tremendously. However, depending on the direct wave conditions, the phase and amplitude components of the direct wave may greatly differ from the specialized precoding matrix, upon reception. The LOS environment has certain rules. Thus, data reception quality is tremendously improved through a regular change applied to a transmit signal that obeys those rules. The present invention offers a signal processing scheme for improvements in the LOS environment.

Figure 7:
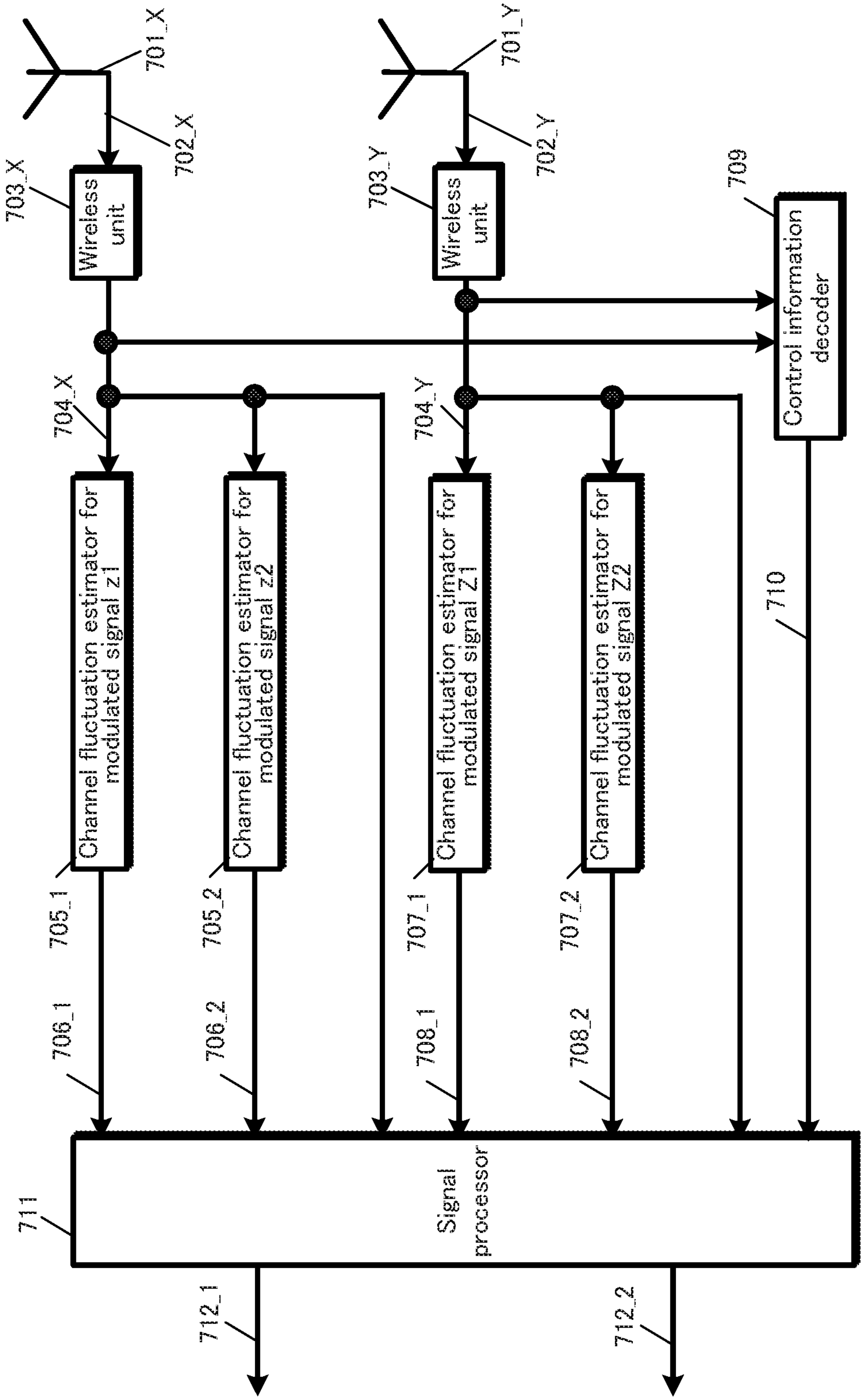
FIG. 7 illustrates a sample configuration of a reception device.

FIG. 7 illustrates a sample configuration of a reception device 700 pertaining to the present embodiment. Wireless unit 703_X receives, as input, received signal 702_X received by antenna 701_X, performs processing such as frequency conversion, quadrature demodulation, and the like, and outputs baseband signal 704_X.

Channel fluctuation estimator 705_1 for modulated signal z1 transmitted by the transmission device takes baseband signal 704_X as input, extracts reference symbol 501_1 for channel estimation from FIG. 5, estimates the value of $h_{11}$ from formula 40, and outputs channel estimation signal 706_1.

Channel fluctuation estimator 705_2 for modulated signal z2 transmitted by the transmission device takes baseband signal 704_X as input, extracts reference symbol 501_2 for channel estimation from FIG. 5, estimates the value of $h_{12}$ from formula 40, and outputs channel estimation signal 706_2.

Wireless unit 703_Y receives, as input, received signal 702_Y received by antenna 701_X, performs processing such as frequency conversion, quadrature demodulation, and the like, and outputs baseband signal 704_Y.

Channel fluctuation estimator 707_1 for modulated signal z1 transmitted by the transmission device takes baseband signal 704_Y as input, extracts reference symbol 501_1 for channel estimation from FIG. 5, estimates the value of $h_{21}$ from formula 40, and outputs channel estimation signal 708_1.

Channel fluctuation estimator 707_2 for modulated signal z2 transmitted by the transmission device takes baseband signal 704_Y as input, extracts reference symbol 501_2 for channel estimation from FIG. 5, estimates the value of $h_{22}$ from formula 40, and outputs channel estimation signal 708_2.

A control information decoder 709 receives baseband signal 704_X and baseband signal 704_Y as input, detects symbol 500_1 that indicates the transmission scheme from FIG. 5, and outputs a transmission scheme information signal 710 for the transmission device.

A signal processor 711 takes the baseband signals 704_X and 704_Y, the channel estimation signals 706_1, 706_2, 708_1, and 708_2, and the transmission scheme information signal 710 as input, performs detection and decoding, and then outputs received data 712_1 and 712_2.

Figure 8:
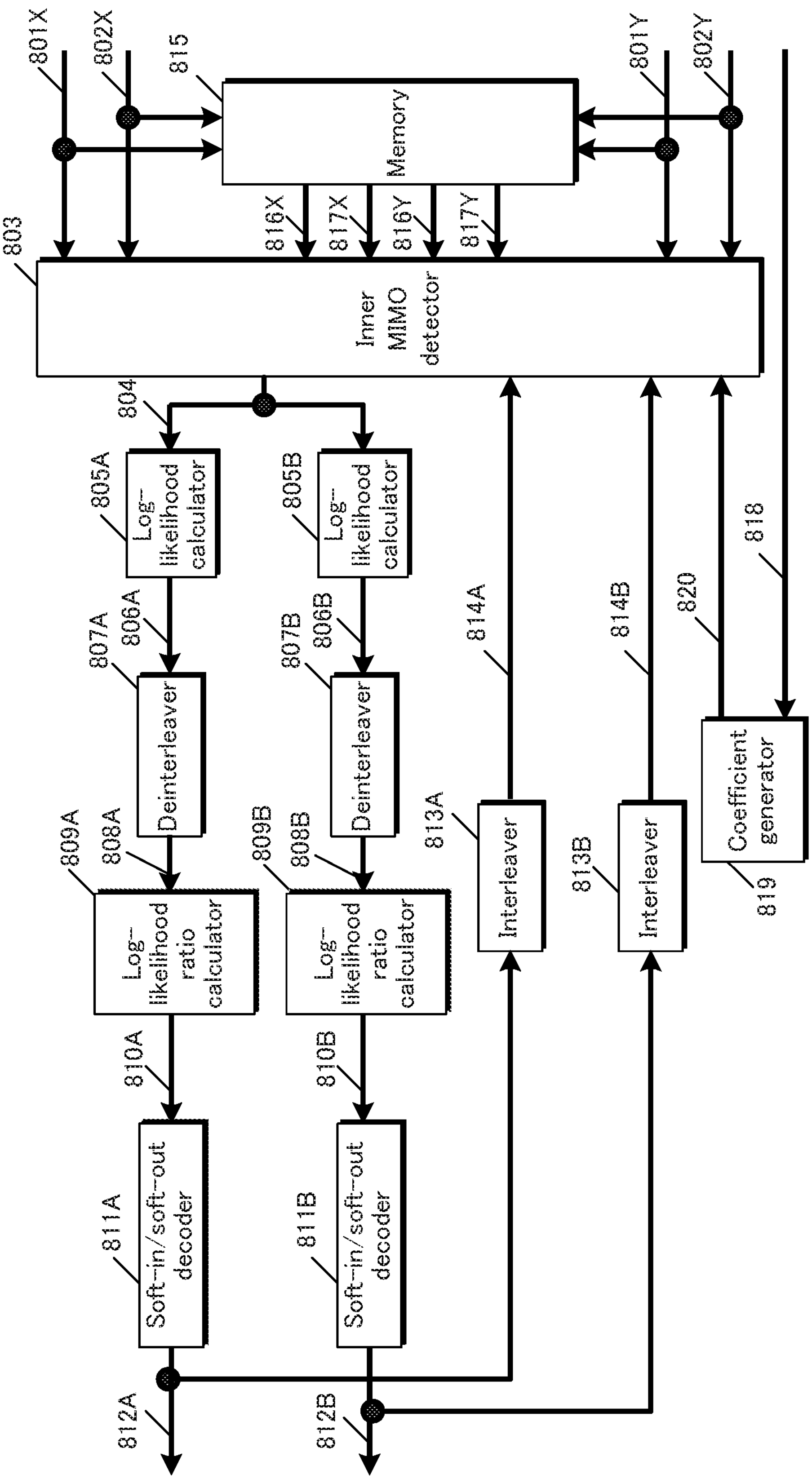
FIG. 8 illustrates a sample configuration of a signal processor in the reception device.

Next, the operations of the signal processor 711 from FIG. 7 are described in detail. FIG. 8 illustrates a sample configuration of the signal processor 711 pertaining to the present embodiment. As shown, the signal processor 711 is primarily made up of an inner MIMO detector, soft-in/soft-out decoders, and a coefficient generator. Non-Patent Literature 2 and Non-Patent Literature 3 describe a scheme of iterative decoding using this structure. The MIMO system described in Non-Patent Literature 2 and Non-Patent Literature 3 is a spatial multiplexing MIMO system, while the present embodiment differs from Non-Patent Literature 2 and Non-Patent Literature 3 in describing a MIMO system that regularly changes the phase over time while using the same precoding matrix. Taking the (channel) matrix H(t) of formula 36, then by letting the precoding weight matrix from FIG. 6 be F (here, a fixed precoding matrix remaining unchanged for a given received signal) and letting the phase changing formula used by the phase changer from FIG. 6 be Y(t) (here, Y(t) changes over time t), then the receive vector $R(t)=(r1(t),r2(t))^T$ and the stream vector $S(t)=(s1(t),s2(t))^T$ the following function is derived:

[Math. 48]

$$R(t) = H(t) \times Y(t) \times F \times S(t) \quad \text{(formula 48)}$$

where $$Y(t) = \begin{pmatrix} 1 & 0 \\ 0 & y(t) \end{pmatrix}$$

Here, the reception device may use the decoding schemes of Non-Patent Literature 2 and 3 on R(t) by computing H(t)×Y(t)×F.

Accordingly, the coefficient generator 819 from FIG. 8 takes a transmission scheme information signal 818 (corresponding to 710 from FIG. 7) indicated by the transmission device (information for specifying the fixed precoding matrix in use and the phase changing pattern used when the phase is changed) and outputs a signal processing scheme information signal 820.

The inner MIMO detector 803 takes the signal processing scheme information signal as input and performs iterative detection and decoding using the signal and the relationship thereof to formula 48. The operations thereof are described below.

Figure 10:
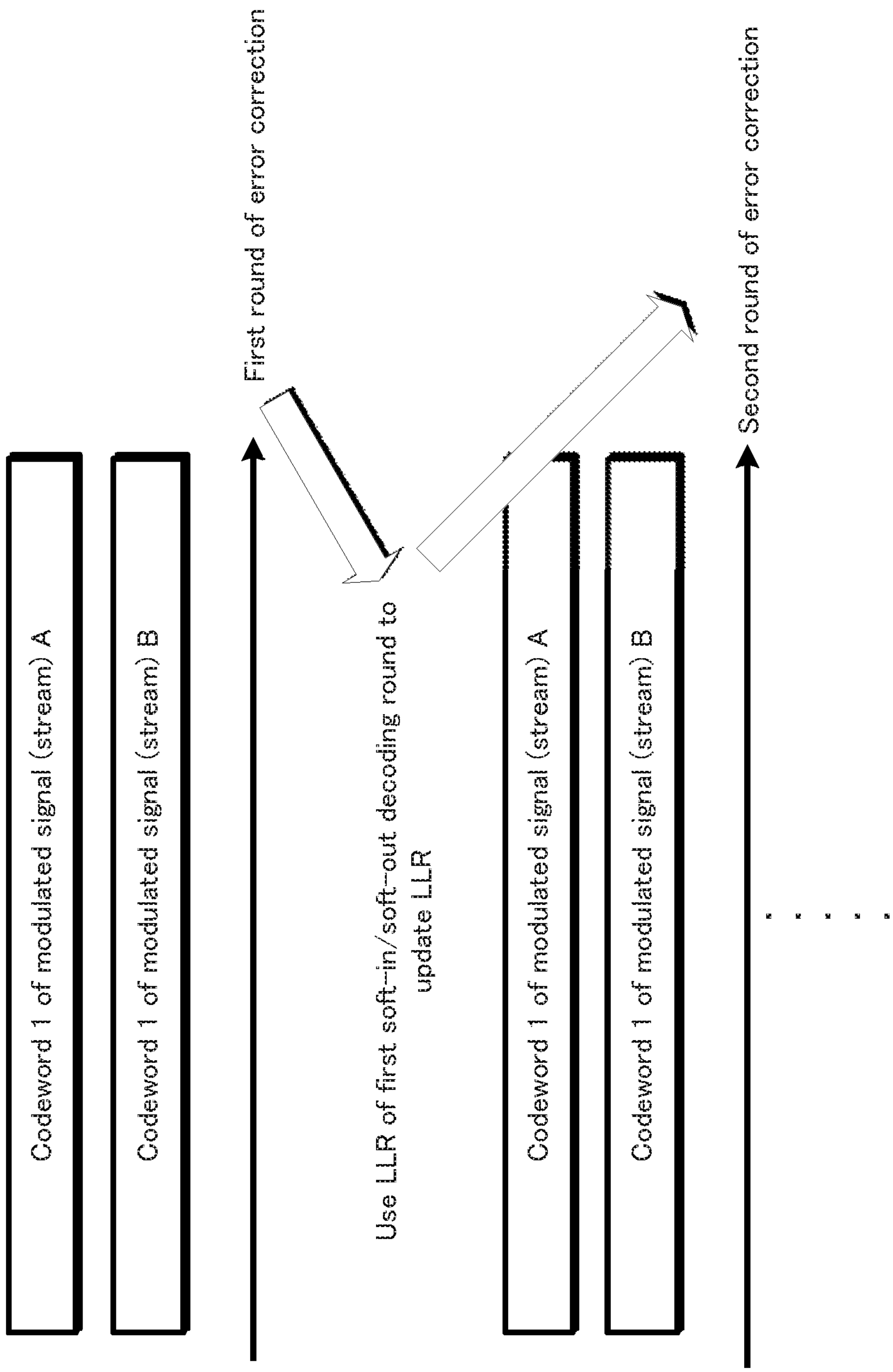
FIG. 10 illustrates an iterative decoding scheme.

The processor illustrated in FIG. 8 uses a processing scheme, as illustrated by FIG. 10, to perform iterative decoding (iterative detection). First, detection of one codeword (or one frame) of modulated signal (stream) s1 and of one codeword (or one frame) of modulated signal (stream) s2 is performed. As a result, the soft-in/soft-out decoder obtains the log-likelihood ratio of each bit of the codeword (or frame) of modulated signal (stream) s1 and of the codeword (or frame) of modulated signal (stream) s2. Next, the log-likelihood ratio is used to perform a second round of detection and decoding. These operations are performed multiple times (these operations are hereinafter referred to as iterative decoding (iterative detection)). The following explanations center on the creation scheme of the log-likelihood ratio of a symbol at a specific time within one frame.

In FIG. 8, a memory 815 takes baseband signal 801X (corresponding to baseband signal 704_X from FIG. 7), channel estimation signal group 802X (corresponding to channel estimation signals 706_1 and 706_2 from FIG. 7), baseband signal 801Y (corresponding to baseband signal 704_Y from FIG. 7), and channel estimation signal group 802Y (corresponding to channel estimation signals 708_1 and 708_2 from FIG. 7) as input, executes (computes) H(t)×Y(t)×F from formula 48 in order to perform iterative decoding (iterative detection) and stores the resulting matrix as a transformed channel signal group. The memory 815 then outputs the above-described signals as needed, specifically as baseband signal 816X, transformed channel estimation signal group 817X, baseband signal 816Y, and transformed channel estimation signal group 817Y.

Subsequent operations are described separately for initial detection and for iterative decoding (iterative detection).

(Initial Detection)

The inner MIMO detector 803 takes baseband signal 801X, channel estimation signal group 802X, baseband signal 801Y, and channel estimation signal group 802Y as input. Here, the modulation scheme for modulated signal (stream) s1 and modulated signal (stream) s2 is taken to be 16-QAM.

Figure 11:
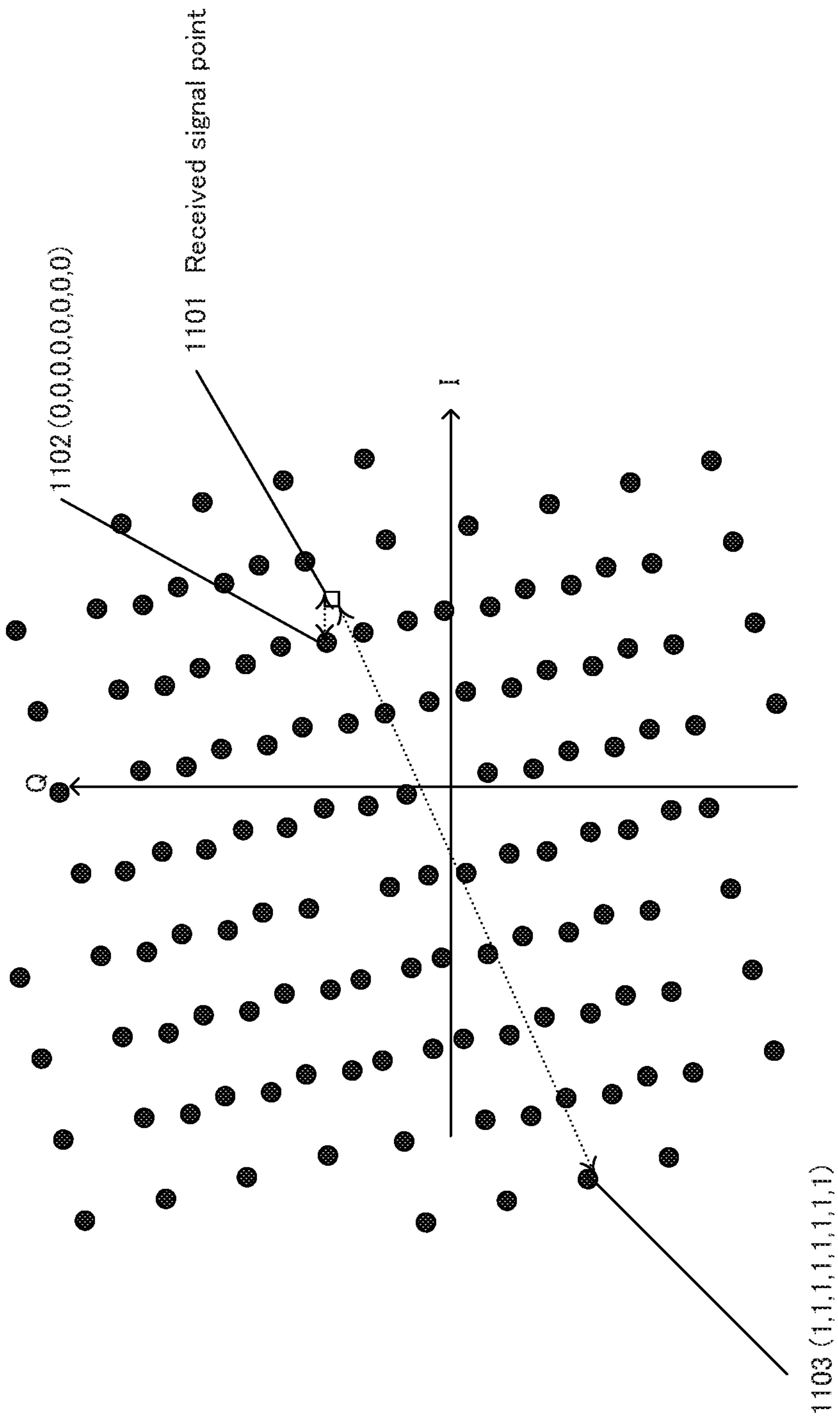
FIG. 11 illustrates sample reception conditions.

The inner MIMO detector 803 first computes H(t)×Y(t)×F from the channel estimation signal groups 802X and 802Y, thus calculating a candidate signal point corresponding to baseband signal 801X. FIG. 11 represents such a calculation. In FIG. 11, each black dot is a candidate signal point in the I-Q plane. Given that the modulation scheme is 16-QAM, 256 candidate signal points exist. (However, FIG. 11 is only a representation and does not indicate all 256 candidate signal points.) Letting the four bits transmitted in modulated signal s1 be b0, b1, b2, and b3 and the four bits transmitted in modulated signal s2 be b4, b5, b6, and b7, candidate signal points corresponding to (b0, b1, b2, b3, b4, b5, b6, b7) are found in FIG. 11. The Euclidean squared distance between each candidate signal point and each received signal point 1101 (corresponding to baseband signal 801X) is then computed. The Euclidian squared distance between each point is divided by the noise variance $\sigma^2$. Accordingly, Ex(b0, b1, b2, b3, b4, b5, b6, b7) is calculated. That is, Ex is the Euclidian squared distance between a candidate signal point corresponding to (b0, b1, b2, b3, b4, b5, b6, b7) and a received signal point, divided by the noise variance. Here, each of the baseband signals and the modulated signals s1 and s2 is a complex signal.

Similarly, the inner MIMO detector 803 computes H(t)×Y(t)×F from the channel estimation signal groups 802X and 802Y, calculates candidate signal points corresponding to baseband signal 801Y, computes the Euclidean squared distance between each of the candidate signal points and the received signal points (corresponding to baseband signal 801Y), and divides the Euclidean squared distance by the noise variance $\sigma^2$. Accordingly, $E_Y$(b0, b1, b2, b3, b4, b5, b6, b7) is calculated. That is, $E_Y$ is the Euclidian squared distance between a candidate signal point corresponding to (b0, b1, b2, b3, b4, b5, b6, b7) and a received signal point, divided by the noise variance.

Next, $E_X$(b0, b1, b2, b3, b4, b5, b6, b7)+$E_Y$(b0, b1, b2, b3, b4, b5, b6, b7)=E(b0, b1, b2, b3, b4, b5, b6, b7) is computed.

The inner MIMO detector 803 outputs E(b0, b1, b2, b3, b4, b5, b6, b7) as a signal 804.

Log-likelihood calculator 805A takes the signal 804 as input, calculates the log-likelihood of bits b0, b1, b2, and b3, and outputs log-likelihood signal 806A. Note that this log-likelihood calculation produces the log-likelihood of a bit being 1 and the log-likelihood of a bit being 0. The calculation scheme is as shown in formula 28, formula 29, and formula 30, and the details are given by Non-Patent Literature 2 and 3.

Similarly, log-likelihood calculator 805A takes the signal 804 as input, calculates the log-likelihood of bits b0, b1, b2, and b3, and outputs log-likelihood signal 806B.

A deinterleaver (807A) takes log-likelihood signal 806A as input, performs deinterleaving corresponding to that of the interleaver (the interleaver (304A) from FIG. 3), and outputs deinterleaved log-likelihood signal 808A.

Similarly, a deinterleaver (807B) takes log-likelihood signal 806B as input, performs deinterleaving corresponding to that of the interleaver (the interleaver (304B) from FIG. 3), and outputs deinterleaved log-likelihood signal 808B.

Log-likelihood ratio calculator 809A takes deinterleaved log-likelihood signal 808A as input, calculates the log-likelihood ratio of the bits encoded by encoder 302A from FIG. 3, and outputs log-likelihood ratio signal 810A.

Similarly, log-likelihood ratio calculator 809B takes deinterleaved log-likelihood signal 808B as input, calculates the log-likelihood ratio of the bits encoded by encoder 302B from FIG. 3, and outputs log-likelihood ratio signal 810B.

Soft-in/soft-out decoder 811A takes log-likelihood ratio signal 810A as input, performs decoding, and outputs decoded log-likelihood ratio 812A.

Similarly, soft-in/soft-out decoder 811B takes log-likelihood ratio signal 810B as input, performs decoding, and outputs decoded log-likelihood ratio 812B.

(Iterative Decoding (Iterative Detection), k Iterations)

The interleaver (813A) takes the k−1th decoded log-likelihood ratio 812A decoded by the soft-in/soft-out decoder as input, performs interleaving, and outputs interleaved log-likelihood ratio 814A. Here, the interleaving pattern used by the interleaver (813A) is identical to that of the interleaver (304A) from FIG. 3.

Another interleaver (813B) takes the k−1th decoded log-likelihood ratio 812B decoded by the soft-in/soft-out decoder as input, performs interleaving, and outputs interleaved log-likelihood ratio 814B. Here, the interleaving pattern used by the other interleaver (813B) is identical to that of another interleaver (304B) from FIG. 3.

The inner MIMO detector 803 takes baseband signal 816X, transformed channel estimation signal group 817X, baseband signal 816Y, transformed channel estimation signal group 817Y, interleaved log-likelihood ratio 814A, and interleaved log-likelihood ratio 814B as input. Here, baseband signal 816X, transformed channel estimation signal group 817X, baseband signal 816Y, and transformed channel estimation signal group 817Y are used instead of baseband signal 801X, channel estimation signal group 802X, baseband signal 801Y, and channel estimation signal group 802Y because the latter cause delays due to the iterative decoding.

The iterative decoding operations of the inner MIMO detector 803 differ from the initial detection operations thereof in that the interleaved log-likelihood ratios 814A and 814B are used in signal processing for the former. The inner MIMO detector 803 first calculates E(b0, b1, b2, b3, b4, b5, b6, b7) in the same manner as for initial detection. In addition, the coefficients corresponding to formula 11 and formula 32 are computed from the interleaved log-likelihood ratios 814A and 814B. The value of E(b0, b1, b2, b3, b4, b5, b6, b7) is corrected using the coefficients so calculated to obtain E'(b0, b1, b2, b3, b4, b5, b6, b7), which is output as the signal 804.

Log-likelihood calculator 805A takes the signal 804 as input, calculates the log-likelihood of bits b0, b1, b2, and b3, and outputs the log-likelihood signal 806A. Note that this log-likelihood calculation produces the log-likelihood of a bit being 1 and the log-likelihood of a bit being 0. The calculation scheme is as shown in formula 31 through formula 35, and the details are given by Non-Patent Literature 2 and 3.

Similarly, log-likelihood calculator 805B takes the signal 804 as input, calculates the log-likelihood of bits b4, b5, b6, and b7, and outputs the log-likelihood signal 806A. Operations performed by the deinterleaver onwards are similar to those performed for initial detection.

While FIG. 8 illustrates the configuration of the signal processor when performing iterative detection, this structure is not absolutely necessary as good reception improvements are obtainable by iterative detection alone. As long as the components needed for iterative detection are present, the configuration need not include the interleavers 813A and 813B. In such a case, the inner MIMO detector 803 does not perform iterative detection.

The key point for the present embodiment is the calculation of H(t)×Y(t)×F. As shown in Non-Patent Literature 5 and the like, QR decomposition may also be used to perform initial detection and iterative detection.

Also, as indicated by Non-Patent Literature 11, MMSE (Minimum Mean-Square Error) and ZF (Zero-Forcing) linear operations may be performed based on H(t)×Y(t)×F when performing initial detection.

Figure 9:
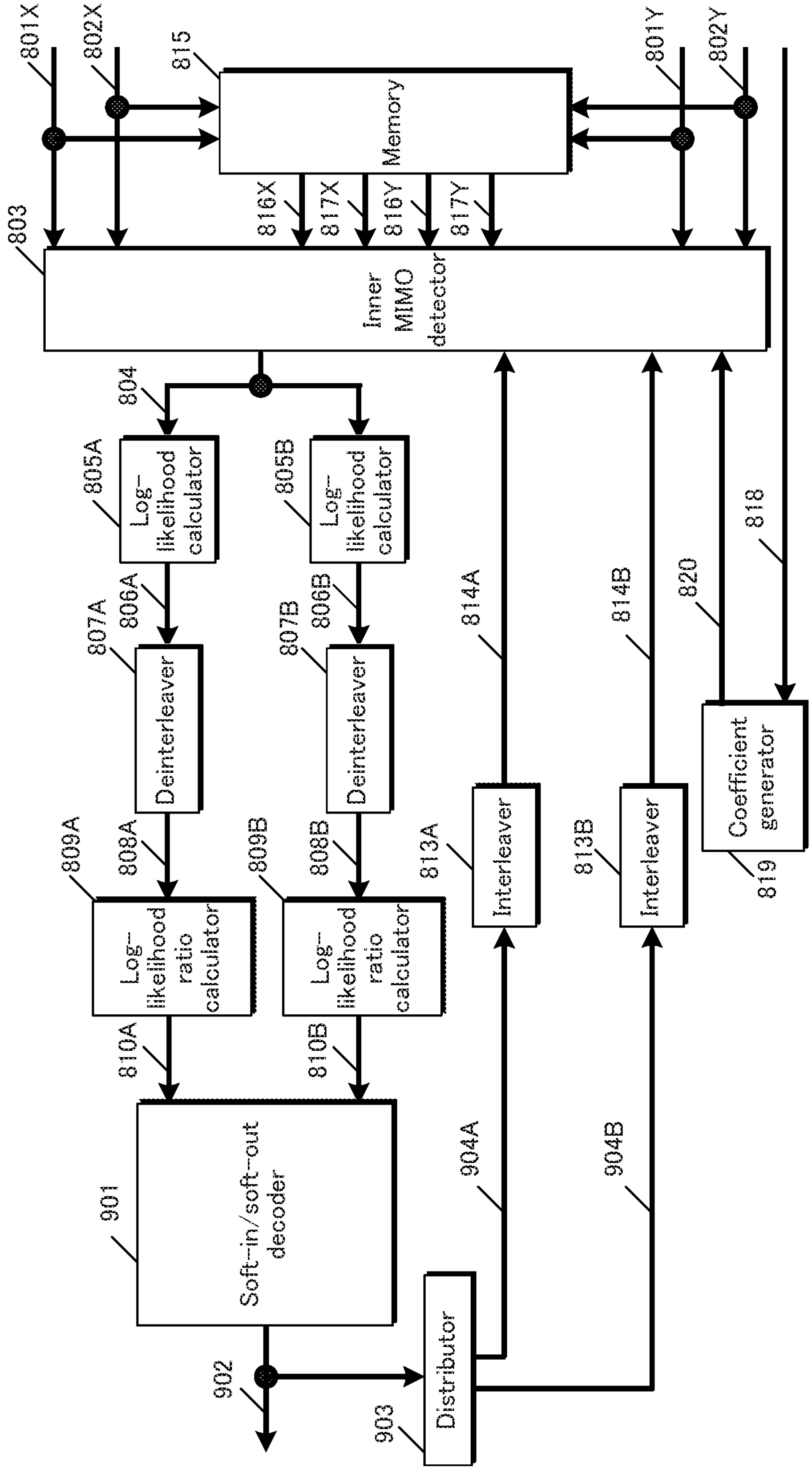
FIG. 9 illustrates another sample configuration of a signal processor in the reception device.

FIG. 9 illustrates the configuration of a signal processor, unlike that of FIG. 8, that serves as the signal processor for modulated signals transmitted by the transmission device from FIG. 4. The point of difference from FIG. 8 is the number of soft-in/soft-out decoders. A soft-in/soft-out decoder 901 takes the log-likelihood ratio signals 810A and 810B as input, performs decoding, and outputs a decoded log-likelihood ratio 902. A distributor 903 takes the decoded log-likelihood ratio 902 as input for distribution. Otherwise, the operations are identical to those explained for FIG. 8.

As described above, when a transmission device according to the present embodiment using a MIMO system transmits a plurality of modulated signals from a plurality of antennas, changing the phase over time while multiplying by the precoding matrix so as to regularly change the phase results in improvements to data reception quality for a reception device in a LOS environment where direct waves are dominant, in contrast to a conventional spatial multiplexing MIMO system.

In the present embodiment, and particularly in the configuration of the reception device, the number of antennas is limited and explanations are given accordingly. However, the Embodiment may also be applied to a greater number of antennas. In other words, the number of antennas in the reception device does not affect the operations or advantageous effects of the present embodiment.

Also, although LDPC codes are described as a particular example, the present embodiment is not limited in this manner. Furthermore, the decoding scheme is not limited to the sum-product decoding example given for the soft-in/soft-out decoder. Other soft-in/soft-out decoding schemes, such as the BCJR algorithm, SOVA, and the Max-Log-Map algorithm may also be used. Details are provided in Non-Patent Literature 6.

In addition, although the present embodiment is described using a single-carrier scheme, no limitation is intended in this regard. The present embodiment is also applicable to multi-carrier transmission. Accordingly, the present embodiment may also be realized using, for example, spread-spectrum communications, OFDM (Orthogonal Frequency-Division Multiplexing), SC-FDMA (Single Carrier Frequency-Division Multiple Access), SC-OFDM (Single Carrier Orthogonal Frequency-Division Multiplexing), wavelet OFDM as described in Non-Patent Literature 7, and so on. Furthermore, in the present embodiment, symbols other than data symbols, such as pilot symbols (preamble, unique word, etc) or symbols transmitting control information, may be arranged within the frame in any manner.

The following describes an example in which OFDM is used as a multi-carrier scheme.

Figure 12:
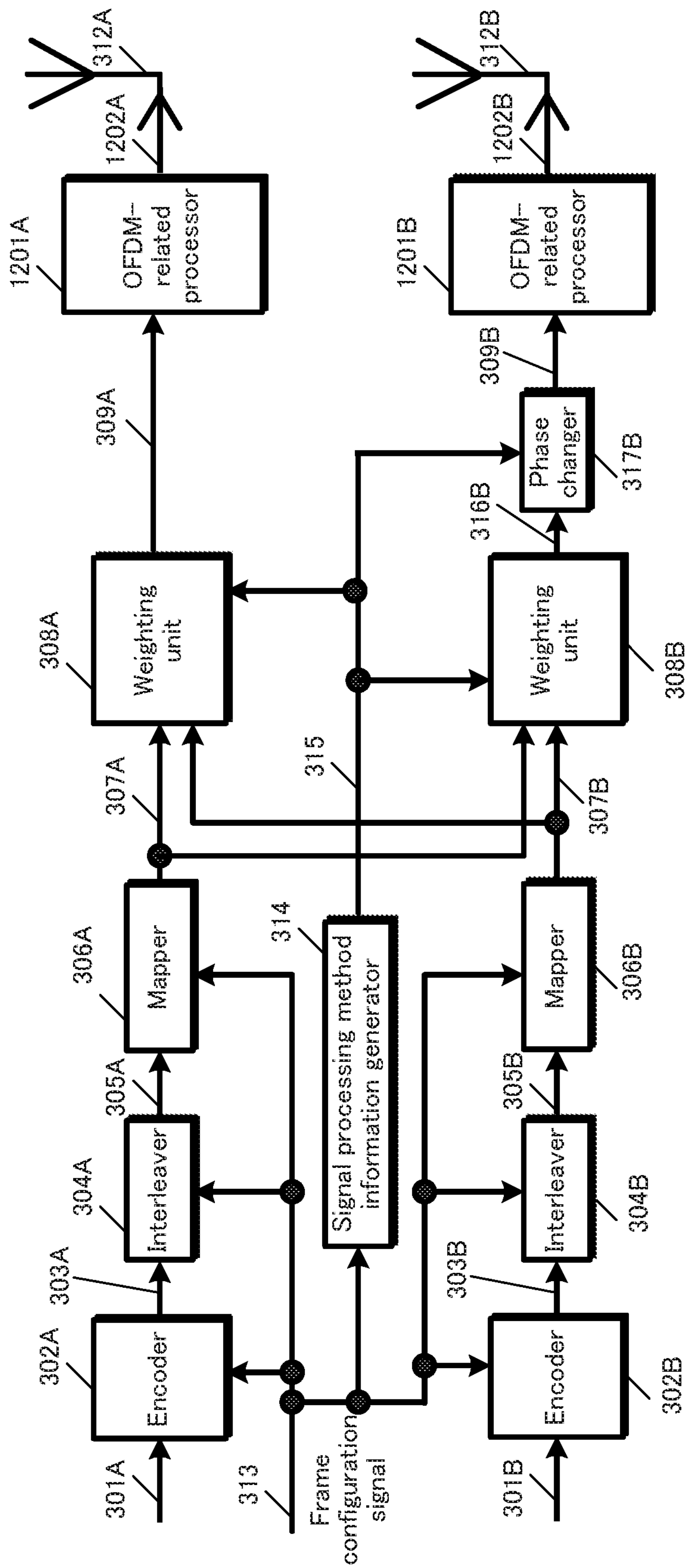
FIG. 12 illustrates a further example of a transmission device applying a phase changing scheme.

FIG. 12 illustrates the configuration of a transmission device using OFDM. In FIG. 12, components operating in the manner described for FIG. 3 use identical reference numbers.

Figure 13:
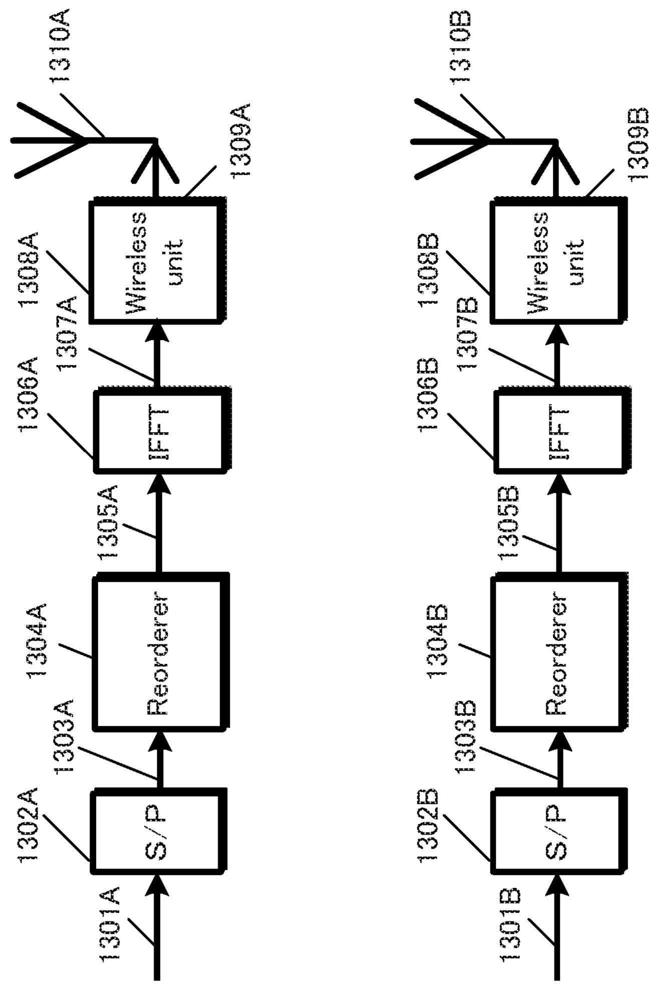
FIG. 13 illustrates yet a further example of a transmission device applying a phase changing scheme.

OFDM-related processor 1201A takes weighted signal 309A as input, performs OFDM-related processing thereon, and outputs transmit signal 1202A. Similarly, OFDM-related processor 1201B takes post-phase-change signal 309B as input, performs OFDM-related processing thereon, and outputs transmit signal 1202A FIG. 13 illustrates a sample configuration of the OFDM-related processors 1201A and 1201B and onward from FIG. 12. Components 1301A through 1310A belong between 1201A and 312A from FIG. 12, while components 1301B through 1310B belong between 1201B and 312B.

Serial-to-parallel converter 1302A performs serial-to-parallel conversion on weighted signal 1301A (corresponding to weighted signal 309A from FIG. 12) and outputs parallel signal 1303A.

Reorderer 1304A takes parallel signal 1303A as input, performs reordering thereof, and outputs reordered signal 1305A. Reordering is described in detail later.

IFFT (Inverse Fast Fourier Transform) unit 1306A takes reordered signal 1305A as input, applies an IFFT thereto, and outputs post-IFFT signal 1307A.

Wireless unit 1308A takes post-IFFT signal 1307A as input, performs processing such as frequency conversion and amplification, thereon, and outputs modulated signal 1309A. Modulated signal 1309A is then output as radio waves by antenna 1310A.

Serial-to-parallel converter 1302B performs serial-to-parallel conversion on weighted signal 1301B (corresponding to post-phase-change signal 309B from FIG. 12) and outputs parallel signal 1303B.

Reorderer 1304B takes parallel signal 1303B as input, performs reordering thereof, and outputs reordered signal 1305B. Reordering is described in detail later.

IFFT unit 1306B takes reordered signal 1305B as input, applies an IFFT thereto, and outputs post-IFFT signal 1307B.

Wireless unit 1308B takes post-IFFT signal 1307B as input, performs processing such as frequency conversion and amplification thereon, and outputs modulated signal 1309B. Modulated signal 1309B is then output as radio waves by antenna 1310A.

The transmission device from FIG. 3 does not use a multi-carrier transmission scheme. Thus, as shown in FIG. 6, the change of phase is performed to achieve a period (cycle) of four and the post-phase-change symbols are arranged with respect to the time domain. As shown in FIG. 12, when multi-carrier transmission, such as OFDM, is used, then, naturally, precoded post-phase-change symbols may be arranged with respect to the time domain as in FIG. 3, and this applies to each (sub-)carrier. However, for multi-carrier transmission, the arrangement may also be in the frequency domain, or in both the frequency domain and the time domain. The following describes these arrangements.

Figure 14A:
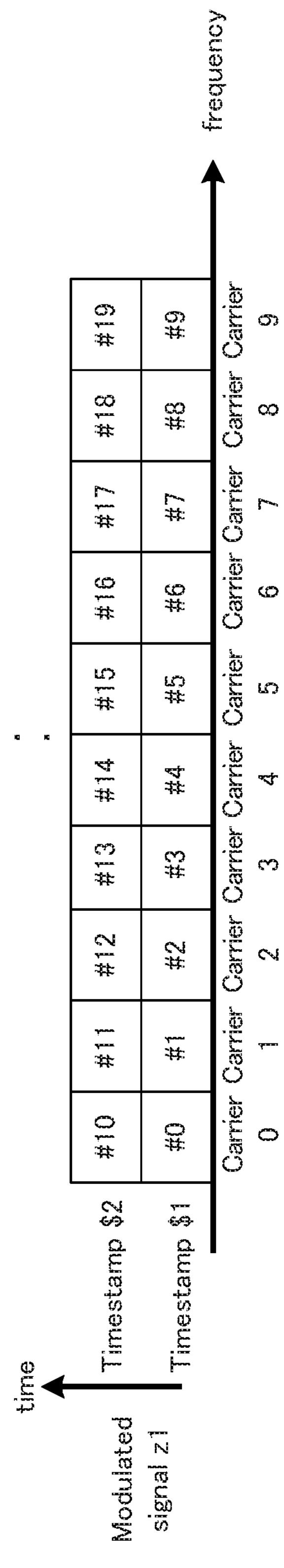
FIGS. 14A and 14B illustrate a further sample frame configuration.
Figure 14B:
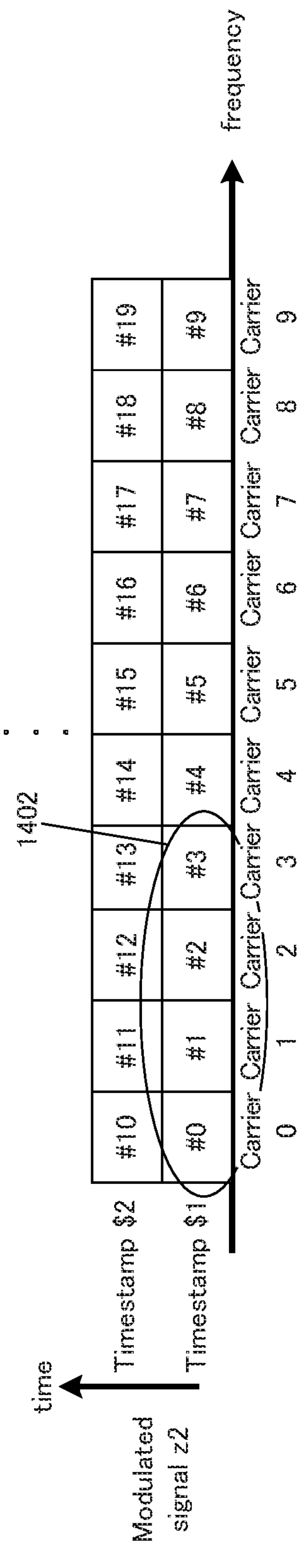

FIGS. 14A and 14B indicate frequency on the horizontal axes and time on the vertical axes thereof, and illustrate an example of a symbol reordering scheme used by the reorderers 1304A and 1304B from FIG. 13. The frequency axes are made up of (sub-)carriers 0 through 9. The modulated signals z1 and z2 share common time (timing) and use a common frequency band. FIG. 14A illustrates a reordering scheme for the symbols of modulated signal z1, while FIG. 14B illustrates a reordering scheme for the symbols of modulated signal z2. With respect to the symbols of weighted signal 1301A input to serial-to-parallel converter 1302A, the assigned ordering is #0, #1, #2, #3, and so on. Here, given that the example deals with a period (cycle) of four, #0, #1, #2, and #3 are equivalent to one period (cycle). Similarly, #4n, #4n+1, #4n+2, and #4n+3 (n being a non-zero positive integer) are also equivalent to one period (cycle).

As shown in FIG. 14A, symbols #0, #1, #2, #3, and so on are arranged in order, beginning at carrier 0. Symbols #0 through #9 are given time $1, followed by symbols #10 through #19 which are given time #2, and so on in a regular arrangement. Note that the modulated signals z1 and z2 are complex signals.

Similarly, with respect to the symbols of weighted signal 1301B input to serial-to-parallel converter 1302B, the assigned ordering is #0, #1, #2, #3, and so on. Here, given that the example deals with a period (cycle) of four, a different change of phase is applied to each of #0, #1, #2, and #3, which are equivalent to one period (cycle). Similarly, a different change of phase is applied to each of #4n, #4n+1, #4n+2, and #4n+3 (n being a non-zero positive integer), which are also equivalent to one period (cycle)

As shown in FIG. 14B, symbols #0, #1, #2, #3, and so on are arranged in order, beginning at carrier 0. Symbols #0 through #9 are given time $1, followed by symbols #10 through #19 which are given time #2, and so on in a regular arrangement.

The symbol group 1402 shown in FIG. 14B corresponds to one period (cycle) of symbols when the phase changing scheme of FIG. 6 is used. Symbol #0 is the symbol obtained by using the phase at time u in FIG. 6, symbol #1 is the symbol obtained by using the phase at time u+1 in FIG. 6, symbol #2 is the symbol obtained by using the phase at time u+2 in FIG. 6, and symbol #3 is the symbol obtained by using the phase at time u+3 in FIG. 6. Accordingly, for any symbol #x, symbol #x is the symbol obtained by using the phase at time u in FIG. 6 when x mod 4 equals 0 (i.e., when the remainder of x divided by 4 is 0, mod being the modulo operator), symbol #x is the symbol obtained by using the phase at time u+1 in FIG. 6 when x mod 4 equals 1, symbol #x is the symbol obtained by using the phase at time u+2 in FIG. 6 when x mod 4 equals 2, and symbol #x is the symbol obtained by using the phase at time u+3 in FIG. 6 when x mod 4 equals 3.

In the present embodiment, modulated signal z1 shown in FIG. 14A has not undergone a change of phase.

As such, when using a multi-carrier transmission scheme such as OFDM, and unlike single carrier transmission, symbols may be arranged with respect to the frequency domain. Of course, the symbol arrangement scheme is not limited to those illustrated by FIGS. 14A and 14B. Further examples are shown in FIGS. 15A, 15B, 16A, and 16B.

Figure 15A:
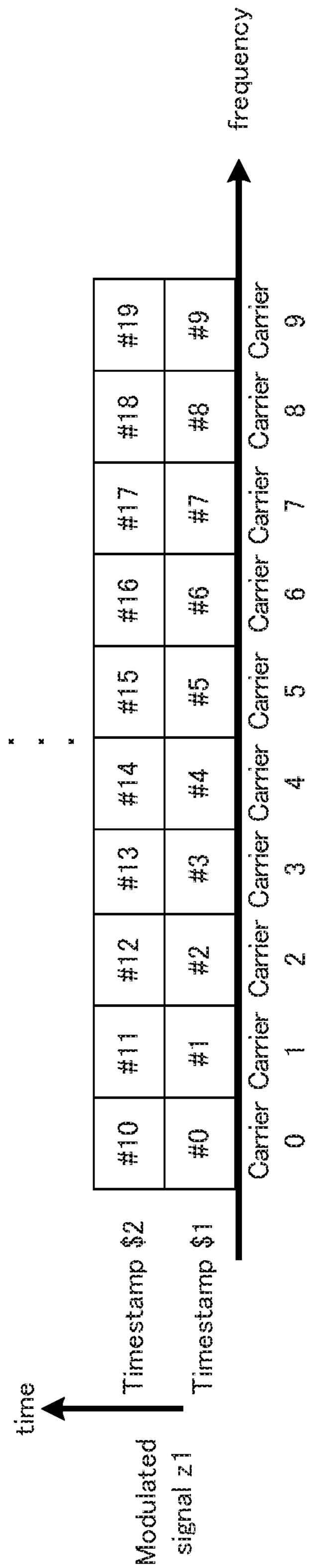
FIGS. 15A and 15B illustrate yet another sample frame configuration.
Figure 15B:
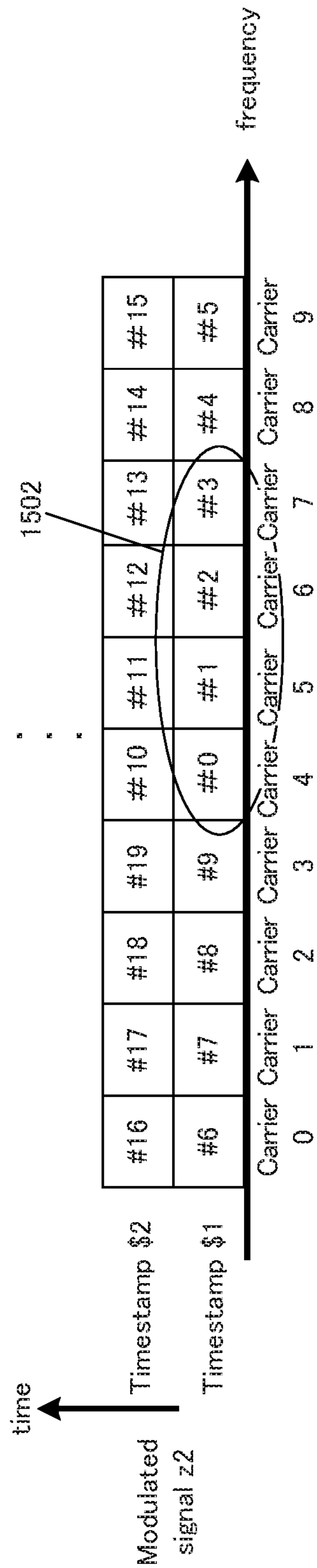

FIGS. 15A and 15B indicate frequency on the horizontal axes and time on the vertical axes thereof, and illustrate an example of a symbol reordering scheme used by the reorderers 1304A and 1304B from FIG. 13 that differs from that of FIGS. 14A and 14B. FIG. 15A illustrates a reordering scheme for the symbols of modulated signal z1, while FIG. 15B illustrates a reordering scheme for the symbols of modulated signal z2. FIGS. 15A and 15B differ from FIGS. 14A and 14B in that different reordering schemes are applied to the symbols of modulated signal z1 and to the symbols of modulated signal z2. In FIG. 15B, symbols #0 through #5 are arranged at carriers 4 through 9, symbols #6 though #9 are arranged at carriers 0 through 3, and this arrangement is repeated for symbols #10 through #19. Here, as in FIG. 14B, symbol group 1502 shown in FIG. 15B corresponds to one period (cycle) of symbols when the phase changing scheme of FIG. 6 is used.

Figure 16A:
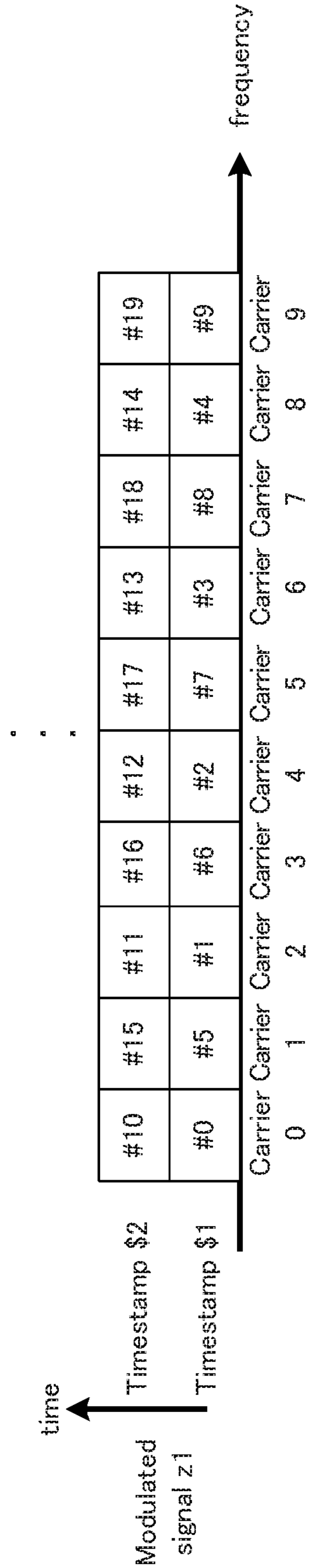
FIGS. 16A and 16B illustrate still another sample frame configuration.
Figure 16B:
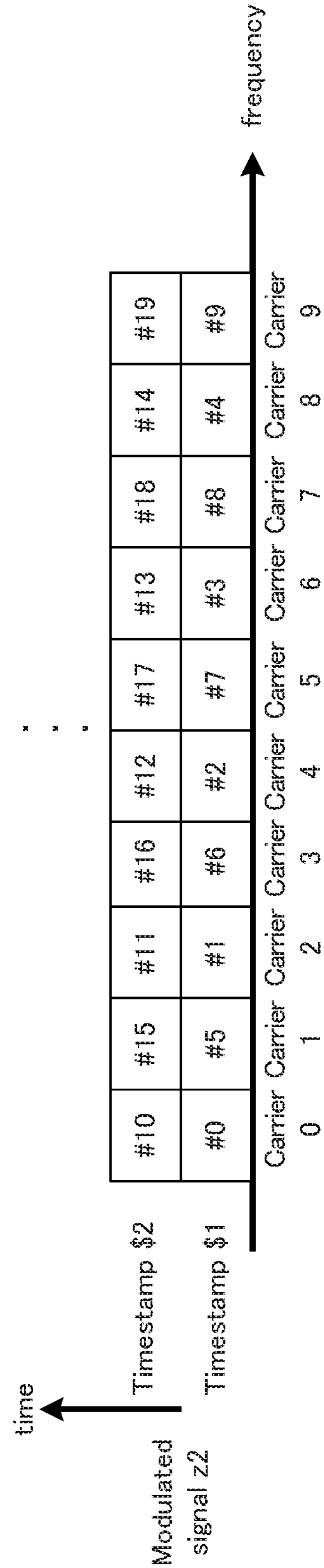

FIGS. 16A and 16B indicate frequency on the horizontal axes and time on the vertical axes thereof, and illustrate an example of a symbol reordering scheme used by the reorderers 1304A and 1304B from FIG. 13 that differs from that of FIGS. 14A and 14B. FIG. 16A illustrates a reordering scheme for the symbols of modulated signal z1, while FIG. 16B illustrates a reordering scheme for the symbols of modulated signal z2. FIGS. 16A and 16B differ from FIGS. 14A and 14B in that, while FIGS. 14A and 14B showed symbols arranged at sequential carriers, FIGS. 16A and 16B do not arrange the symbols at sequential carriers. Obviously, for FIGS. 16A and 16B, different reordering schemes may be applied to the symbols of modulated signal z1 and to the symbols of modulated signal z2 as in FIGS. 15A and 15B.

Figure 17A:
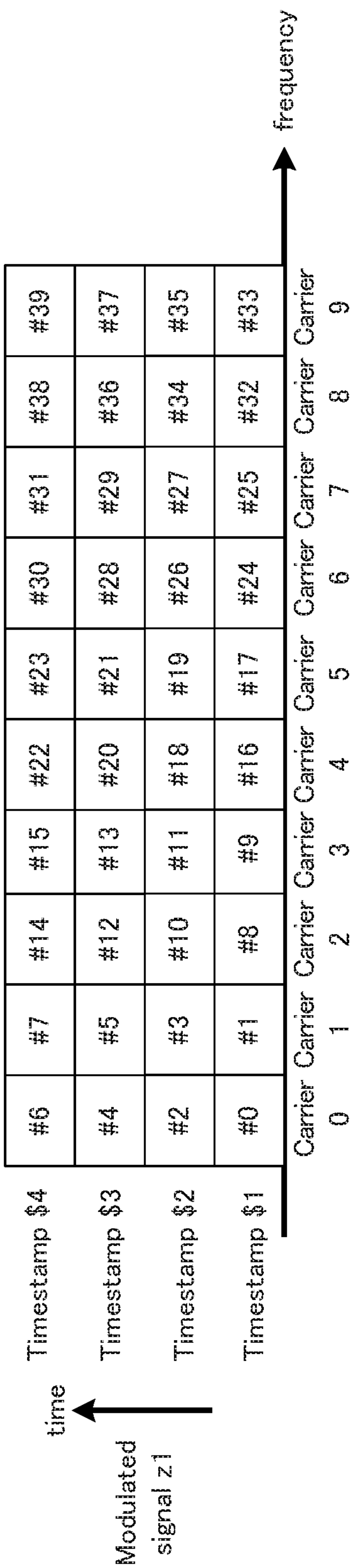
FIGS. 17A and 17B illustrate still yet another sample frame configuration.
Figure 17B:
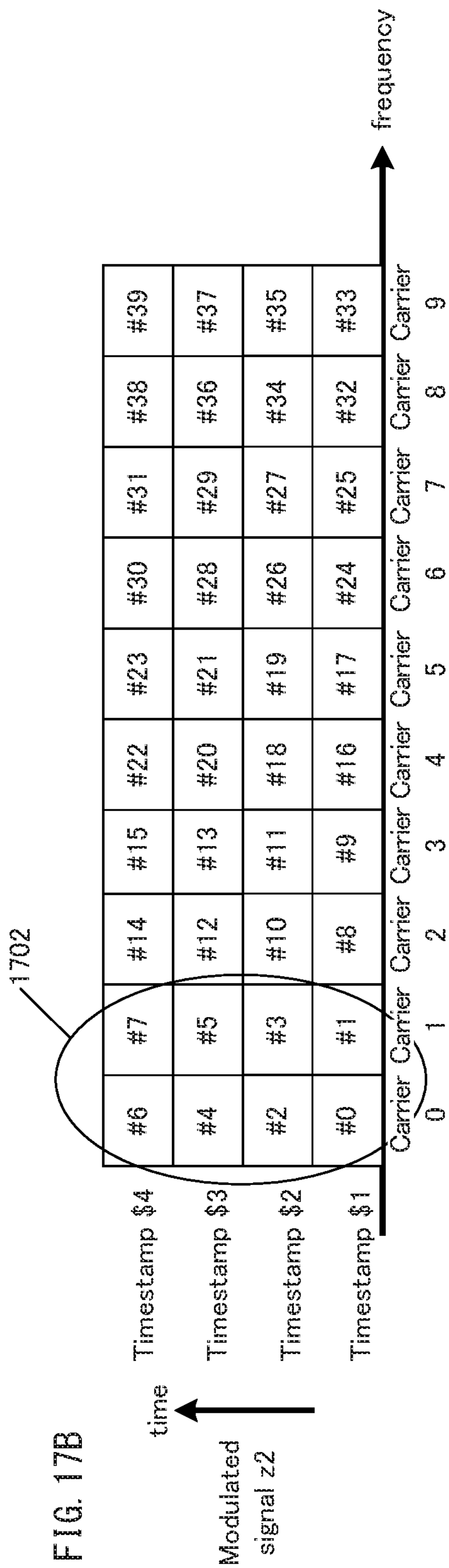

FIGS. 17A and 17B indicate frequency on the horizontal axes and time on the vertical axes thereof, and illustrate an example of a symbol reordering scheme used by the reorderers 1304A and 1304B from FIG. 13 that differs from those of FIGS. 14A through 16B. FIG. 17A illustrates a reordering scheme for the symbols of modulated signal z1 and FIG. 17B illustrates a reordering scheme for the symbols of modulated signal z2. While FIGS. 14A through 16B show symbols arranged with respect to the frequency axis, FIGS. 17A and 17B use the frequency and time axes together in a single arrangement.

While FIG. 6 describes an example where a change of phase is performed in a four slot period (cycle), the following example describes an eight slot period (cycle). In FIGS. 17A and 17B, the symbol group 1702 is equivalent to one period (cycle) of symbols when the phase changing scheme is used (i.e., to eight symbols) such that symbol #0 is the symbol obtained by using the phase at time u, symbol #1 is the symbol obtained by using the phase at time u+1, symbol #2 is the symbol obtained by using the phase at time u+2, symbol #3 is the symbol obtained by using the phase at time u+3, symbol #4 is the symbol obtained by using the phase at time u+4, symbol #5 is the symbol obtained by using the phase at time u+5, symbol #6 is the symbol obtained by using the phase at time u+6, and symbol #7 is the symbol obtained by using the phase at time u+7. Accordingly, for any symbol #x, symbol #x is the symbol obtained by using the phase at time u when x mod 8 equals 0, symbol #x is the symbol obtained by using the phase at time u+1 when x mod 8 equals 1, symbol #x is the symbol obtained by using the phase at time u+2 when x mod 8 equals 2, symbol #x is the symbol obtained by using the phase at time u+3 when x mod 8 equals 3, symbol #x is the symbol obtained by using the phase at time u+4 when x mod 8 equals 4, symbol #x is the symbol obtained by using the phase at time u+5 when x mod 8 equals 5, symbol #x is the symbol obtained by using the phase at time u+6 when x mod 8 equals 6, and symbol #x is the symbol obtained by using the phase at time u+7 when x mod 8 equals 7. In FIGS. 17A and 17B four slots along the time axis and two slots along the frequency axis are used for a total of 4×2=8 slots, in which one period (cycle) of symbols is arranged. Here, given m×n symbols per period (cycle) (i.e., m×n different phases are available for multiplication), then n slots (carriers) in the frequency domain and m slots in the time domain should be used to arrange the symbols of each period (cycle), such that m>n. This is because the phase of direct waves fluctuates slowly in the time domain relative to the frequency domain. Accordingly, the present embodiment performs a regular change of phase that reduces the influence of steady direct waves. Thus, the phase changing period (cycle) should preferably reduce direct wave fluctuations. Accordingly, m should be greater than n. Taking the above into consideration, using the time and frequency domains together for reordering, as shown in FIGS. 17A and 17B, is preferable to using either of the frequency domain or the time domain alone due to the strong probability of the direct waves becoming regular. As a result, the effects of the present invention are more easily obtained. However, reordering in the frequency domain may lead to diversity gain due the fact that frequency-domain fluctuations are abrupt. As such, using the frequency and time domains together for reordering is not always ideal.

Figure 18A:
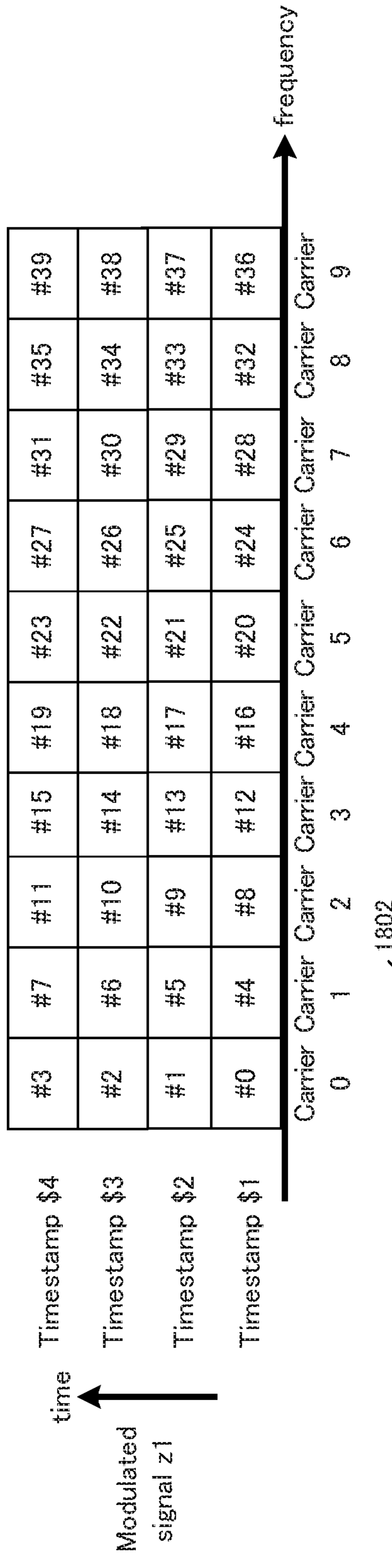
FIGS. 18A and 18B illustrate yet a further sample frame configuration.
Figure 18B:
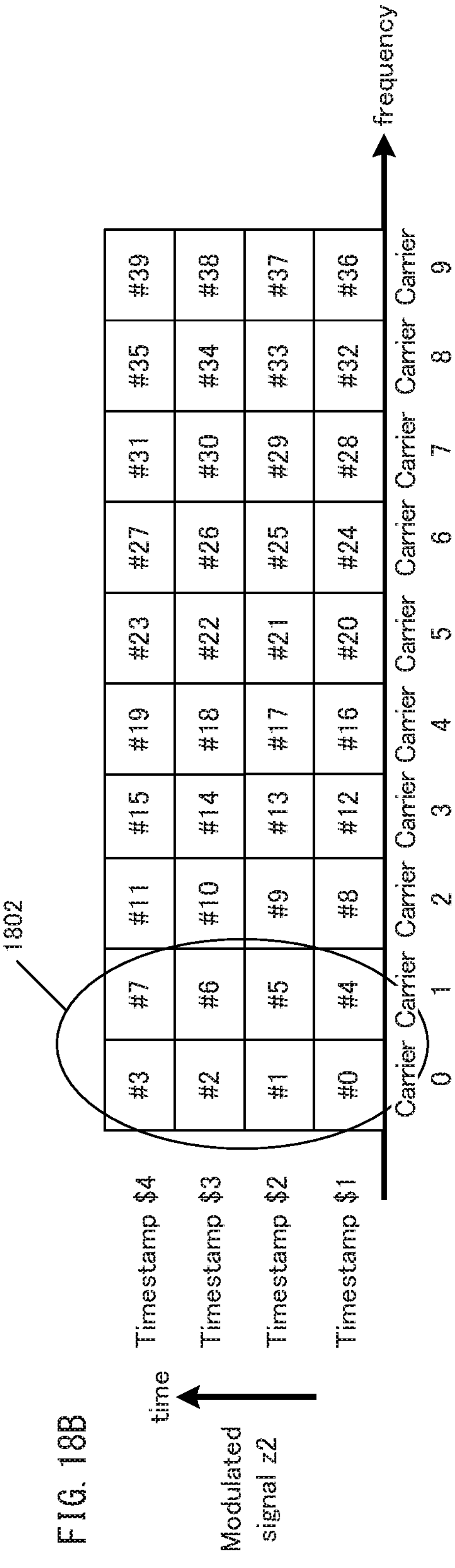

FIGS. 18A and 18B indicate frequency on the horizontal axes and time on the vertical axes thereof, and illustrate an example of a symbol reordering scheme used by the reorderers 1304A and 1304B from FIG. 13 that differs from that of FIGS. 17A and 14B. FIG. 18A illustrates a reordering scheme for the symbols of modulated signal z1, while FIG. 18B illustrates a reordering scheme for the symbols of modulated signal z2. Much like FIGS. 17A and 17B, FIGS. 18A and 18B illustrate the use of the time and frequency domains, together. However, in contrast to FIGS. 17A and 17B, where the frequency domain is prioritized and the time domain is used for secondary symbol arrangement, FIGS. 18A and 18B prioritize the time domain and use the frequency domain for secondary symbol arrangement. In FIG. 18B, symbol group 1802 corresponds to one period (cycle) of symbols when the phase changing scheme is used.

In FIGS. 17A, 17B, 18A, and 18B, the reordering scheme applied to the symbols of modulated signal z1 and the symbols of modulated signal z2 may be identical or may differ as in FIGS. 15A and 15B. Both approaches allow good reception quality to be obtained. Also, in FIGS. 17A, 17B, 18A, and 18B, the symbols may be arranged non-sequentially as in FIGS. 16A and 16B. Both approaches allow good reception quality to be obtained.

Figure 22:
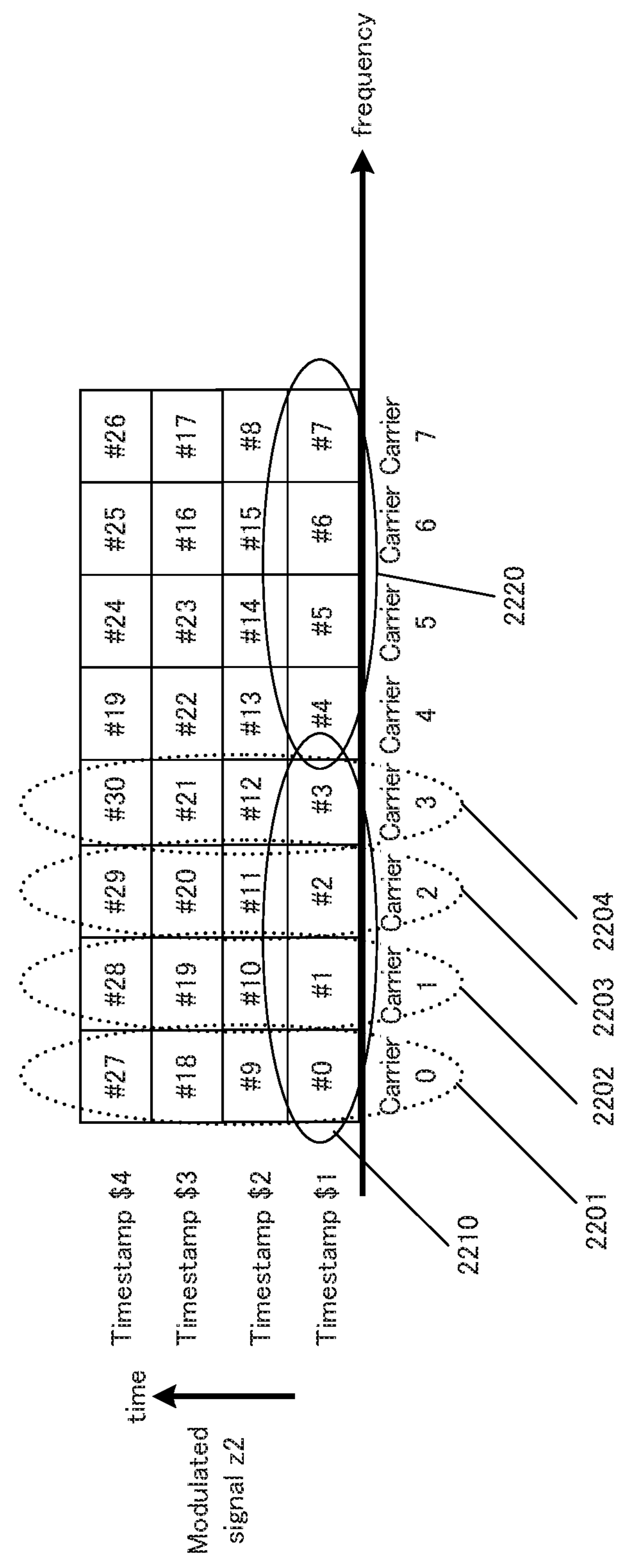
FIG. 22 illustrates a sample symbol rearrangement scheme.

FIG. 22 indicates frequency on the horizontal axis and time on the vertical axis thereof, and illustrates an example of a symbol reordering scheme used by the reorderers 1304A and 1304B from FIG. 13 that differs from the above. FIG. 22 illustrates a regular phase changing scheme using four slots, similar to time u through u+3 from FIG. 6. The characteristic feature of FIG. 22 is that, although the symbols are reordered with respect the frequency domain, when read along the time axis, a periodic shift of n (n=1 in the example of FIG. 22) symbols is apparent. The frequency-domain symbol group 2210 in FIG. 22 indicates four symbols to which the change of phase is applied at time u through u+3 from FIG. 6.

Here, symbol #0 is obtained through a change of phase at time u, symbol #1 is obtained through a change of phase at time u+1, symbol #2 is obtained through a change of phase at time u+2, and symbol #3 is obtained through a change of phase at time u+3.

Similarly, for frequency-domain symbol group 2220, symbol #4 is obtained through a change of phase at time u, symbol #5 is obtained through a change of phase at time u+1, symbol #6 is obtained through a change of phase at time u+2, and symbol #7 is obtained through a change of phase at time u+3.

The above-described change of phase is applied to the symbol at time $1. However, in order to apply periodic shifting in the time domain, the following phase changes are applied to symbol groups 2201, 2202, 2203, and 2204.

For time-domain symbol group 2201, symbol #0 is obtained through a change of phase at time u, symbol #9 is obtained through a change of phase at time u+1, symbol #18 is obtained through a change of phase at time u+2, and symbol #27 is obtained through a change of phase at time u+3.

For time-domain symbol group 2202, symbol #28 is obtained through a change of phase at time u, symbol #1 is obtained through a change of phase at time u+1, symbol #10 is obtained through a change of phase at time u+2, and symbol #19 is obtained through a change of phase at time u+3.

For time-domain symbol group 2203, symbol #20 is obtained through a change of phase at time u, symbol #29 is obtained through a change of phase at time u+1, symbol #2 is obtained through a change of phase at time u+2, and symbol #11 is obtained through a change of phase at time u+3.

For time-domain symbol group 2204, symbol #12 is obtained through a change of phase at time u, symbol #21 is obtained through a change of phase at time u+1, symbol #30 is obtained through a change of phase at time u+2, and symbol #3 is obtained through a change of phase at time u+3.

The characteristic feature of FIG. 22 is seen in that, taking symbol #11 as an example, the two neighbouring symbols thereof having the same time in the frequency domain (#10 and #12) are both symbols changed using a different phase than symbol #11, and the two neighbouring symbols thereof having the same carrier in the time domain (#2 and #20) are both symbols changed using a different phase than symbol #11. This holds not only for symbol #11, but also for any symbol having two neighboring symbols in the frequency domain and the time domain. Accordingly, phase changing is effectively carried out. This is highly likely to improve date reception quality as influence from regularizing direct waves is less prone to reception.

Although FIG. 22 illustrates an example in which n=1, the invention is not limited in this manner. The same may be applied to a case in which n=3. Furthermore, although FIG. 22 illustrates the realization of the above-described effects by arranging the symbols in the frequency domain and advancing in the time domain so as to achieve the characteristic effect of imparting a periodic shift to the symbol arrangement order, the symbols may also be randomly (or regularly) arranged to the same effect.

Embodiment 2

In Embodiment 1, described above, phase changing is applied to a weighted (precoded with a fixed precoding matrix) signal z(t). The following Embodiments describe various phase changing schemes by which the effects of Embodiment 1 may be obtained.

In the above-described Embodiment, as shown in FIGS. 3 and 6, phase changer 317B is configured to perform a change of phase on only one of the signals output by the weighting unit 600.

Figure 25:
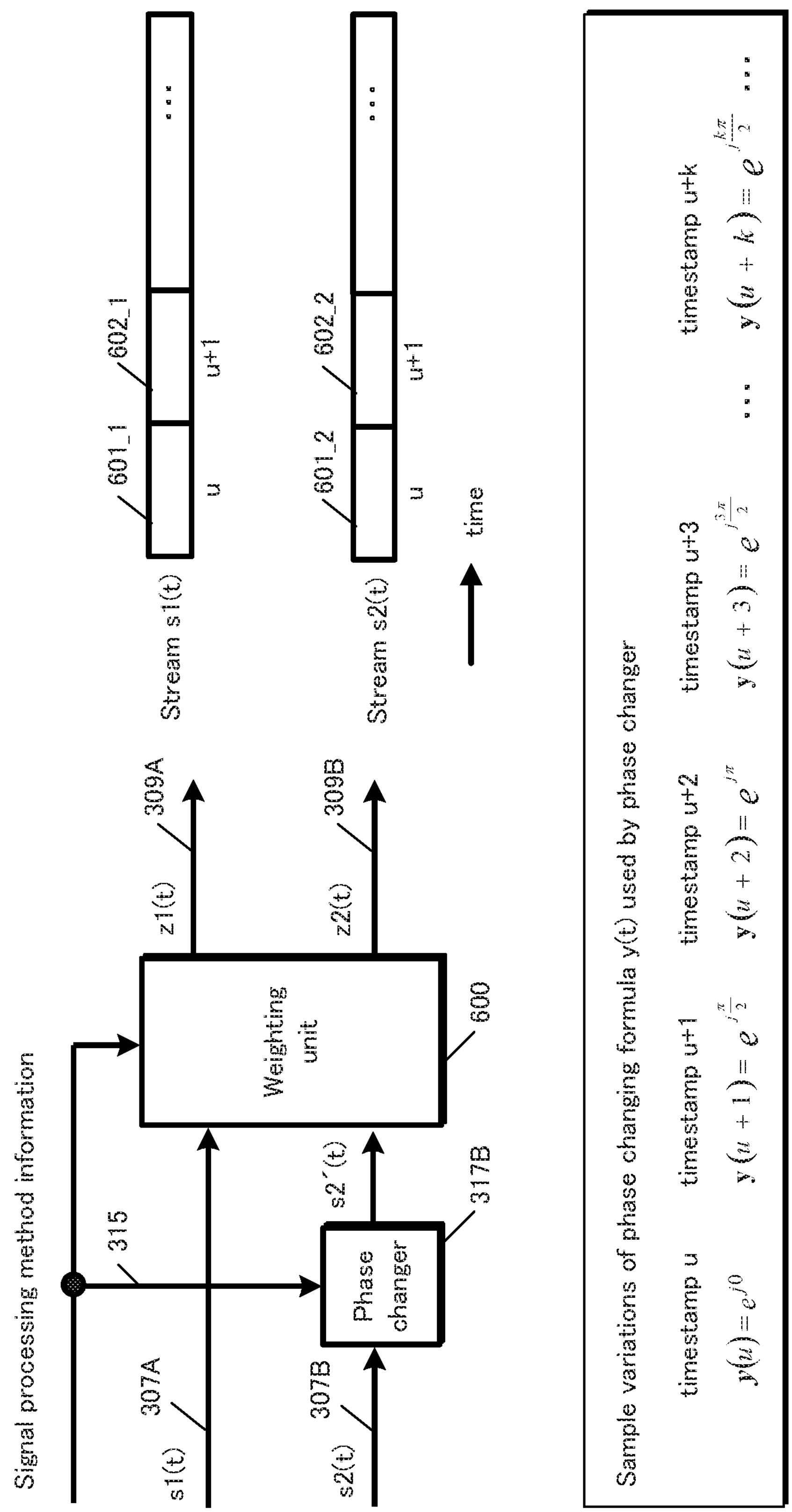
FIG. 25 illustrates another sample phase changing scheme.

However, phase changing may also be applied before precoding is performed by the weighting unit 600. In addition to the components illustrated in FIG. 6, the transmission device may also feature the weighting unit 600 before the phase changer 317B, as shown in FIG. 25.

In such circumstances, the following configuration is possible. The phase changer 317B performs a regular change of phase with respect to baseband signal s2(*t*), on which mapping has been performed according to a selected modulation scheme, and outputs s2'(*t*)=s2(*t*)y(t) (where y(t) varies over time t). The weighting unit 600 executes precoding on s2'*t*, outputs z2(*t*)=W2*s*2'(*t*) (see formula 42) and the result is then transmitted.

Alternatively, phase changing may be performed on both modulated signals s1(*t*) and s2(*t*). As such, the transmission device is configured so as to include a phase changer taking both signals output by the weighting unit 600, as shown in FIG. 26.

Like phase changer 317B, phase changer 317A performs regular a regular change of phase on the signal input thereto, and as such changes the phase of signal z1'(*t*) precoded by the weighting unit. Post-phase-change signal z1(*t*) is then output to a transmitter.

Figure 26:
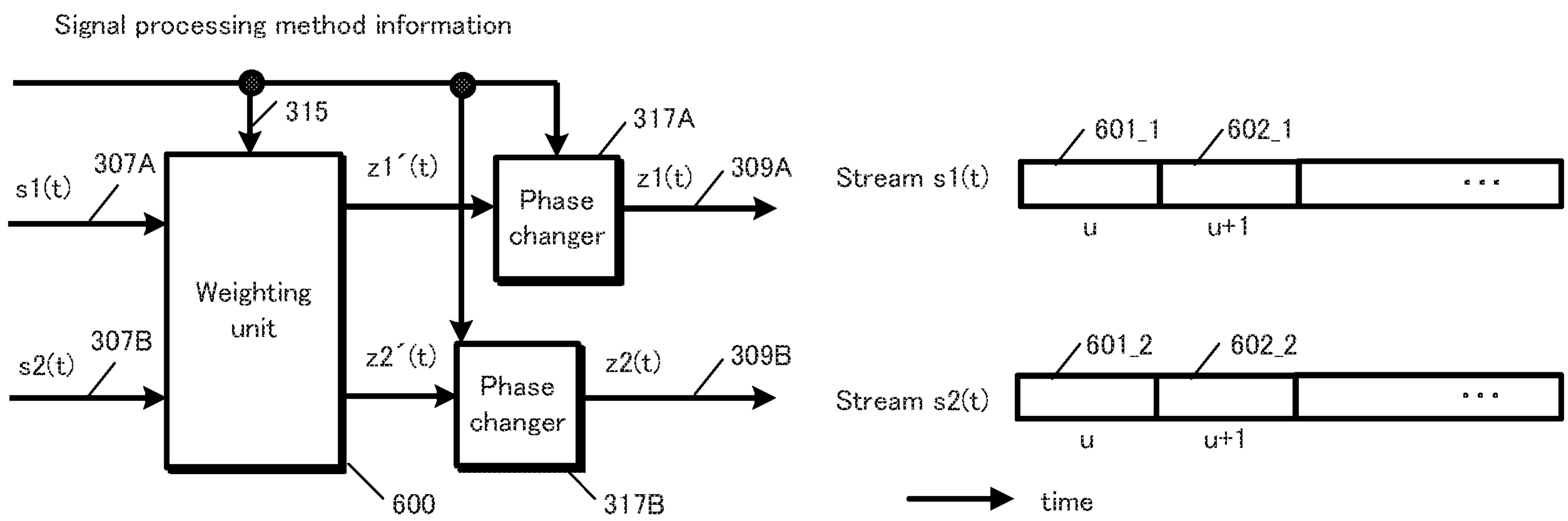
FIG. 26 illustrates yet another sample phase changing scheme.

However, the phase changing rate applied by the phase changers 317A and 317B varies simultaneously in order to perform the phase changing shown in FIG. 26. (The following describes a non-limiting example of the phase changing scheme.) For time u, phase changer 317A from FIG. 26 performs the change of phase such that z1(*t*)=$y_1$(t)z1'(*t*), while phase changer 317B performs the change of phase such that z2(*t*)=$y_2$(t)z2'(*t*). For example, as shown in FIG. 26, for time u, $y_1(u)=e^{j0}$ and $y_2(u)=e^{-j\pi/2}$, for time u+1, $y_1(u+1)=e^{j\pi/4}$ and $y_2(u+1)=e^{-j3\pi/4}$, and for time u+k, $y_1(u+k)=e^{jk\pi/4}$ and $y_2(u+k)=e^{j(k3\pi/4-\pi/2)}$. Here, the regular phase changing period (cycle) may be the same for both phase changers 317A and 317B, or may vary for each.

Figure 27:
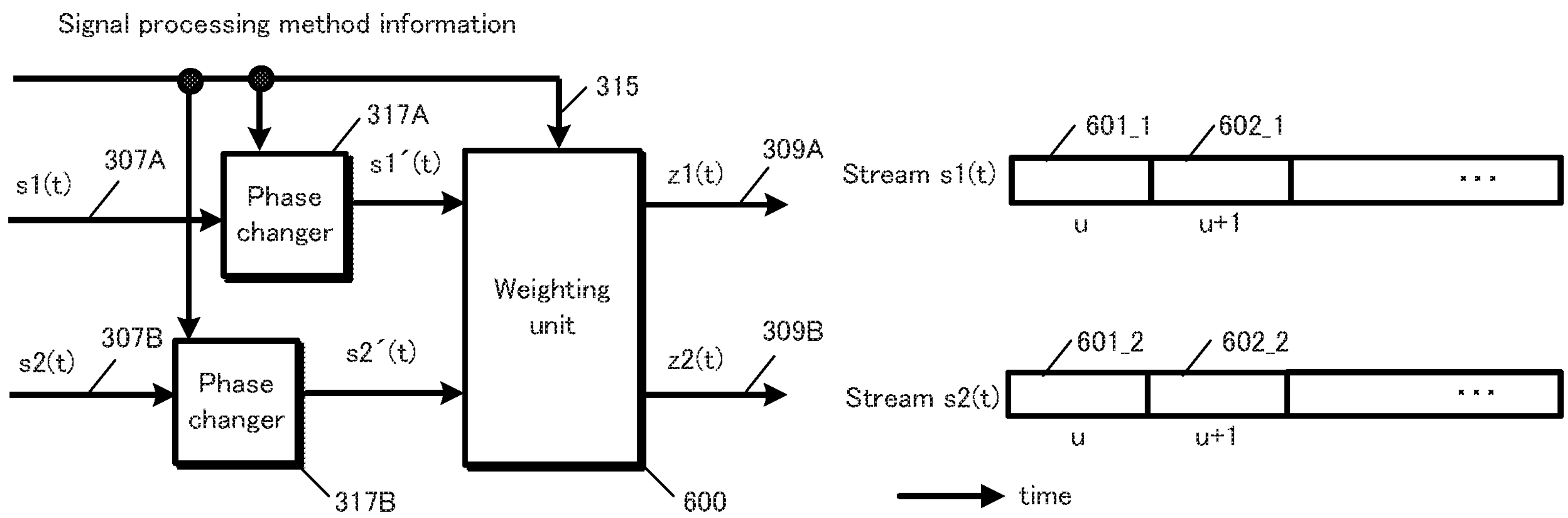
FIG. 27 illustrates a further sample phase changing scheme.

Also, as described above, a change of phase may be performed before precoding is performed by the weighting unit. In such a case, the transmission device should be configured as illustrated in FIG. 27.

When a change of phase is carried out on both modulated signals, each of the transmit signals is, for example, control information that includes information about the phase changing pattern. By obtaining the control information, the reception device knows the phase changing scheme by which the transmission device regularly varies the change, i.e., the phase changing pattern, and is thus able to demodulate (decode) the signals correctly.

Figure 28:
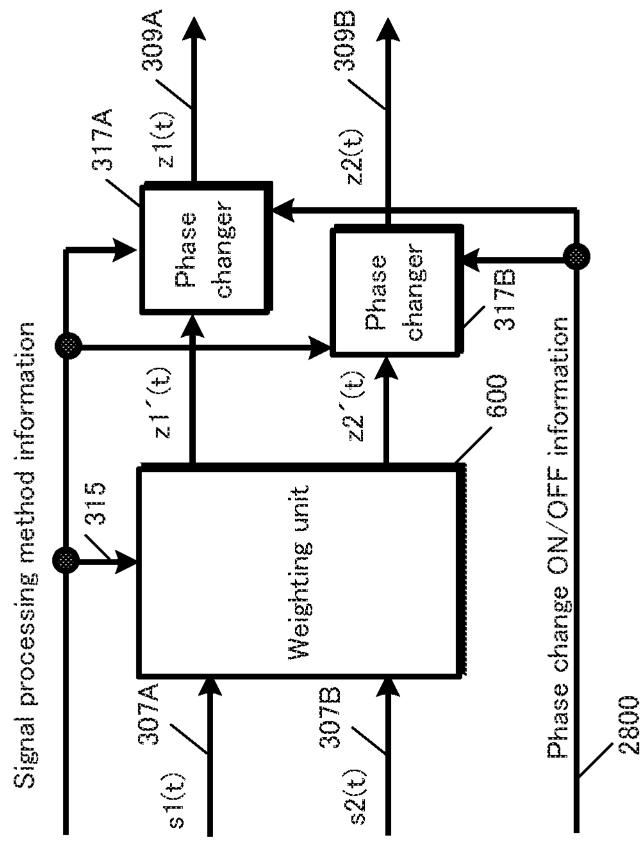
FIG. 28 illustrates still a further sample phase changing scheme.

Next, variants of the sample configurations shown in FIGS. 6 and 25 are described with reference to FIGS. 28 and 29. FIG. 28 differs from FIG. 6 in the inclusion of phase change ON/OFF information 2800 and in that the change of phase is performed on only one of z1'(*t*) and z2'(*t*) (i.e., performed on one of z1'(*t*) and z2'(*t*), which have identical time or a common frequency). Accordingly, in order to perform the change of phase on one of z1'(*t*) and z2'(*t*), the phase changers 317A and 317B shown in FIG. 28 may each be ON, and performing the change of phase, or OFF, and not performing the change of phase. The phase change ON/OFF information 2800 is control information therefor. The phase change ON/OFF information 2800 is output by the signal processing scheme information generator 314 shown in FIG. 3.

Phase changer 317A of FIG. 28 changes the phase to produce z1(*t*)=$y_1$(t)z1'(*t*), while phase changer 317B changes the phase to produce z2(*t*)=$y_2$(t)z2'(*t*).

Here, a change of phase having a period (cycle) of four is, for example, applied to z1'(*t*). (Meanwhile, the phase of z2'(*t*) is not changed.) Accordingly, for time u, $y_1(u)=e^{j0}$ and $y_2(u)=1$, for time u+1, $y_1(u+1)=e^{j\pi/2}$ and $y_2(u+1)=1$, for time u+2, $y_1(u+2)=e^{j\pi}$ and $y_2(u+2)=1$, and for time u+3, $y_1(u+3)=e^{j3\pi/2}$ and $y_2(u+3)=1$.

Next, a change of phase having a period (cycle) of four is, for example, applied to z2'(*t*). (Meanwhile, the phase of z1'(*t*) is not changed.) Accordingly, for time u+4, $y_1(u+4)=1$ and $y_2(u+4)=e^{j0}$, for time u+5, $y_1(u+5)=1$ and $y_2(u+5)=e^{j\pi/2}$, for time u+6, $y_1(u+6)=1$ and $y_2(u+6)=e^{j\pi}$, and for time u+7, $y_1(u+7)=1$ and $y_2(u+7)=e^{j3\pi/2}$.

Accordingly, given the above examples.

for any time 8k, $y_1(8k)=e^{j0}$ and $y_2(8k)=1$, for any time 8k+1, $y_1(8k+1)=e^{j\pi/2}$ and $y_2(8k+1)=1$, for any time 8k+2, $y_1(8k+2)=e^{j\pi}$ and $y_2(8k+2)=1$, for any time 8k+3, $y_1(8k+3)=e^{j3\pi/2}$ and $y_2(8k+3)=1$, for any time 8k+4, $y_1(8k+4)=1$ and $y_2(8k+4)=e^{j0}$, for any time 8k+5, $y_1(8k+3)=1$ and $y_2(8k+5)=e^{j\pi/2}$, for any time 8k+6, $y_1(8k+6)=1$ and $y_2(8k+6)=e^{j\pi}$, and for any time 8k+7, $y_1(8k+7)=1$ and $y_2(8k+7)=e^{j3\pi/2}$.

As described above, there are two intervals, one where the change of phase is performed on z1'(*t*) only, and one where the change of phase is performed on z2'(*t*) only. Furthermore, the two intervals form a phase changing period (cycle). While the above explanation describes the interval where the change of phase is performed on z1'(*t*) only and the interval where the change of phase is performed on z2'(*t*)

only as being equal, no limitation is intended in this manner. The two intervals may also differ. In addition, while the above explanation describes performing a change of phase having a period (cycle) of four on z1'(t) only and then performing a change of phase having a period (cycle) of four on z2'(t) only, no limitation is intended in this manner. The changes of phase may be performed on z1'(t) and on z2'(t) in any order (e.g., the change of phase may alternate between being performed on z1'(t) and on z2'(t), or may be performed in random order).

Figure 29:
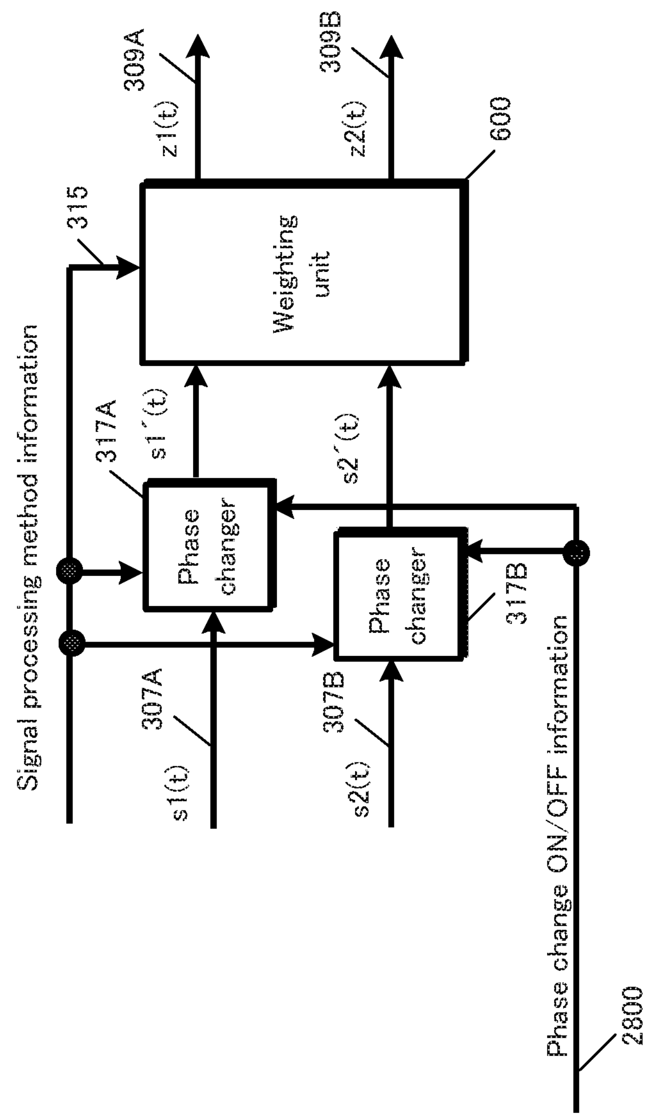
FIG. 29 illustrates still yet a further sample phase changing scheme.

Phase changer 317A of FIG. 29 changes the phase to produce $s1'(t)=y_1(t)s1(t)$, while phase changer 317B changes the phase to produce $s2'(t)=y_2(t)s2(t)$.

Here, a change of phase having a period (cycle) of four is, for example, applied to s1(t). (Meanwhile, s2(t) remains unchanged). Accordingly, for time u, $y_1(u)=e^{j0}$ and $y_2(u)=1$, for time u+1, $y_1(u+1)=e^{j\pi/2}$ and $y_2(u+1)=1$, for time u+2, $y_1(u+2)=e^{j\pi}$ and $y_2(u+2)=1$, and for time u+3, $y_1(u+3)=e^{j3\pi/2}$ and $y_2(u+3)=1$.

Next, a change of phase having a period (cycle) of four is, for example, applied to s2(t). (Meanwhile, s1(t) remains unchanged). Accordingly, for time u+4, $y_1(u+4)=1$ and $y_2(u+4)=e^{j0}$, for time u+5, $y_1(u+5)=1$ and $y_2(u+5)=e^{j\pi/2}$, for time u+6, $y_1(u+6)=1$ and $y_2(u+6)=e^{j\pi}$, and for time u+7, $y_1(u+7)=1$ and $y_2(u+7)=e^{j3\pi/2}$.

Accordingly, given the above examples, for any time 8k, $y_1(8k)=e^{j0}$ and $y_2(8k)=1$,
for any time 8k+1, $y_1(8k+1)=e^{j\pi/2}$ and $y_2(8k+1)=1$,
for any time 8k+2, $y_1(8k+2)=e^{j\pi}$ and $y_2(8k+2)=1$,
for any time 8k+3, $y_1(8k+3)=e^{j3\pi/2}$ and $y_2(8k+3)=1$,
for any time 8k+4, $y_1(8k+4)=1$ and $y_2(8k+4)=e^{j0}$,
for any time 8k+5, $y_1(8k+5)=1$ and $y_2(8k+5)=e^{j\pi/2}$,
for any time 8k+6, $y_1(8k+6)=1$ and $y_2(8k+6)=e^{j\pi}$, and
for any time 8k+7, $y_1(8k+7)=1$ and $y_2(8k+7)=e^{j3\pi/2}$.

As described above, there are two intervals, one where the change of phase is performed on s1(t) only, and one where the change of phase is performed on s2(t) only. Furthermore, the two intervals form a phase changing period (cycle). Although the above explanation describes the interval where the change of phase is performed on s1(t) only and the interval where the change of phase is performed on s2(t) only as being equal, no limitation is intended in this manner. The two intervals may also differ. In addition, while the above explanation describes performing the change of phase having a period (cycle) of four on s1(t) only and then performing the change of phase having a period (cycle) of four on s2(t) only, no limitation is intended in this manner. The changes of phase may be performed on s1(t) and on s2(t) in any order (e.g., may alternate between being performed on s1(t) and on s2(t), or may be performed in random order).

Accordingly, the reception conditions under which the reception device receives each transmit signal z1(t) and z2(t) are equalized. By periodically switching the phase of the symbols in the received signals z1(t) and z2(t), the ability of the error corrected codes to correct errors may be improved, thus ameliorating received signal quality in the LOS environment.

Accordingly, Embodiment 2 as described above is able to produce the same results as the previously described Embodiment 1.

Although the present embodiment used a single-carrier scheme, i.e., time domain phase changing, as an example, no limitation is intended in this regard. The same effects are also achievable using multi-carrier transmission. Accordingly, the present embodiment may also be realized using, for example, spread-spectrum communications, OFDM, SC-FDMA (Single Carrier Frequency-Division Multiple Access), SC-OFDM, wavelet OFDM as described in Non-Patent Literature 7, and so on. As previously described, while the present embodiment explains the change of phase as changing the phase with respect to the time domain t, the phase may alternatively be changed with respect to the frequency domain as described in Embodiment 1. That is, considering the phase changing scheme in the time domain t described in the present embodiment and replacing t with f (f being the ((sub-) carrier) frequency) leads to a change of phase applicable to the frequency domain. Also, as explained above for Embodiment 1, the phase changing scheme of the present embodiment is also applicable to changing the phase with respect both the time domain and the frequency domain.

Accordingly, although FIGS. 6, 25, 26, and 27 illustrate changes of phase in the time domain, replacing time t with carrier f in each of FIGS. 6, 25, 26, and 27 corresponds to a change of phase in the frequency domain. In other words, replacing (t) with (t, f) where t is time and f is frequency corresponds to performing the change of phase on time-frequency blocks.

Furthermore, in the present embodiment, symbols other than data symbols, such as pilot symbols (preamble, unique word, etc) or symbols transmitting control information, may be arranged within the frame in any manner.

Embodiment 3

Embodiments 1 and 2, described above, discuss regular changes of phase. Embodiment 3 describes a scheme of allowing the reception device to obtain good received signal quality for data, regardless of the reception device arrangement, by considering the location of the reception device with respect to the transmission device.

Embodiment 3 concerns the symbol arrangement within signals obtained through a change of phase.

Figure 31:
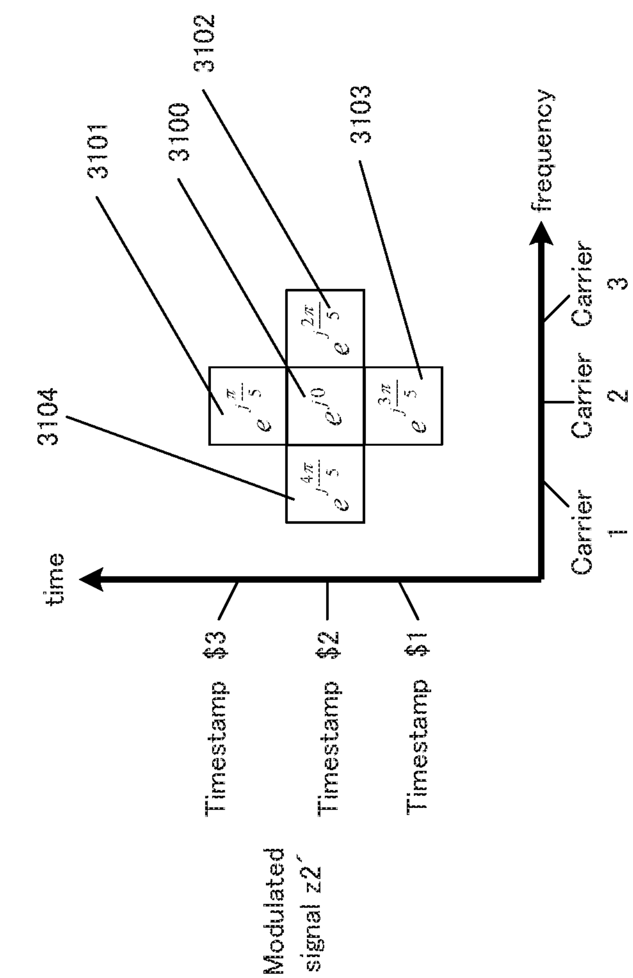
FIG. 31 illustrates a sample frame configuration for a modulated signal providing high received signal quality.

FIG. 31 illustrates an example of frame configuration for a portion of the symbols within a signal in the time-frequency domain, given a transmission scheme where a regular change of phase is performed for a multi-carrier scheme such as OFDM.

First, an example is explained in which the change of phase is performed one of two baseband signals, precoded as explained in Embodiment 1 (see FIG. 6).

(Although FIG. 6 illustrates a change of phase in the time domain, switching time t with carrier f in FIG. 6 corresponds to a change of phase in the frequency domain. In other words, replacing (t) with (t, f) where t is time and f is frequency corresponds to performing phase changes on time-frequency blocks.)

FIG. 31 illustrates the frame configuration of modulated signal z2', which is input to phase changer 317B from FIG. 12. Each square represents one symbol (although both signals s1 and s2 are included for precoding purposes, depending on the precoding matrix, only one of signals s1 and s2 may be used).

Consider symbol 3100 at carrier 2 and time \$2 of FIG. 31. The carrier here described may alternatively be termed a sub-carrier.

Within carrier 2, there is a very strong correlation between the channel conditions for symbol 3100 at carrier 2, time \$2 and the channel conditions for the time domain nearest-neighbour symbols to time \$2, i.e., symbol 3013 at time \$1 and symbol 3101 at time \$3 within carrier 2.

Similarly, for time \$2, there is a very strong correlation between the channel conditions for symbol 3100 at carrier 2, time \$2 and the channel conditions for the frequency-domain nearest-neighbour symbols to carrier 2, i.e., symbol 3104 at carrier 1, time \$2 and symbol 3104 at time \$2, carrier 3.

As described above, there is a very strong correlation between the channel conditions for symbol 3100 and the channel conditions for symbols 3101, 3102, 3103, and 3104.

The present description considers N different phases (N being an integer, N≥2) for multiplication in a transmission scheme where the phase is regularly changed. The symbols illustrated in FIG. 31 are indicated as $e^{j0}$, for example. This signifies that this symbol is signal z2' from FIG. 6 phase-changed through multiplication by $e^{j0}$. That is, the values indicated in FIG. 31 for each of the symbols are the values of y(t) from formula 42, which are also the values of $z2(t)=y_2(t)z2'(t)$ described in Embodiment 2.

The present embodiment takes advantage of the high correlation in channel conditions existing between neighbouring symbols in the frequency domain and/or neighbouring symbols in the time domain in a symbol arrangement enabling high data reception quality to be obtained by the reception device receiving the phase-changed symbols.

In order to achieve this high data reception quality, conditions #1 and #2 are necessary.

(Condition #1)

As shown in FIG. 6, for a transmission scheme involving a regular change of phase performed on precoded baseband signal z2' using multi-carrier transmission such as OFDM, time X, carrier Y is a symbol for transmitting data (hereinafter, data symbol), neighbouring symbols in the time domain, i.e., at time X−1, carrier Y and at time X+1, carrier Y are also data symbols, and a different change of phase should be performed on precoded baseband signal z2' corresponding to each of these three data symbols, i.e., on precoded baseband signal z2' at time X, carrier Y, at time X−1, carrier Y and at time X+1, carrier Y.

(Condition #2)

As shown in FIG. 6, for a transmission scheme involving a regular change of phase performed on precoded baseband signal z2' using multi-carrier transmission such as OFDM, time X, carrier Y is a data symbol, neighbouring symbols in the frequency domain, i.e., at time X, carrier Y−1 and at time X, carrier Y+1 are also data symbols, and a different change of phase should be performed on precoded baseband signal z2' corresponding to each of these three data symbols, i.e., on precoded baseband signal z2' at time X, carrier Y, at time X, carrier Y−1 and at time X, carrier Y+1.

Ideally, data symbols satisfying Condition #1 should be present. Similarly, data symbols satisfying Condition #2 should be present.

The reasons supporting Conditions #1 and #2 are as follows.

A very strong correlation exists between the channel conditions of given symbol of a transmit signal (hereinafter, symbol A) and the channel conditions of the symbols neighbouring symbol A in the time domain, as described above.

Accordingly, when three neighbouring symbols in the time domain each have different phases, then despite reception quality degradation in the LOS environment (poor signal quality caused by degradation in conditions due to direct wave phase relationships despite high signal quality in terms of SNR) for symbol A, the two remaining symbols neighbouring symbol A are highly likely to provide good reception quality. As a result, good received signal quality is achievable after error correction and decoding.

Similarly, a very strong correlation exists between the channel conditions of given symbol of a transmit signal (hereinafter, symbol A) and the channel conditions of the symbols neighbouring symbol A in the frequency domain, as described above.

Accordingly, when three neighbouring symbols in the frequency domain each have different phases, then despite reception quality degradation in the LOS environment (poor signal quality caused by degradation in conditions due to direct wave phase relationships despite high signal quality in terms of SNR) for symbol A, the two remaining symbols neighbouring symbol A are highly likely to provide good reception quality. As a result, good received signal quality is achievable after error correction and decoding.

Combining Conditions #1 and #2, ever greater data reception quality is likely achievable for the reception device. Accordingly, the following Condition #3 can be derived.

(Condition #3)

As shown in FIG. 6, for a transmission scheme involving a regular change of phase performed on precoded baseband signal z2' using multi-carrier transmission such as OFDM, time X, carrier Y is a data symbol, neighbouring symbols in the time domain, i.e., at time X−1, carrier Y and at time X+1, carrier Y are also data symbols, and neighbouring symbols in the frequency domain, i.e., at time X, carrier Y−1 and at time X, carrier Y+1 are also data symbols, and a different change in phase should be performed on precoded baseband signal z2' corresponding to each of these five data symbols, i.e., on precoded baseband signal z2' at time X, carrier Y, at time X, carrier Y−1, at time X, carrier Y+1, at a time X−1, carrier Y, and at time X+1, carrier Y.

Here, the different changes in phase are as follows. Changes in phase are defined from 0 radians to 2π radians. For example, for time X, carrier Y, a phase change of $e^{j\theta X,Y}$ is applied to precoded baseband signal z2' from FIG. 6, for time X−1, carrier Y, a phase change of $e^{j\theta X-1,Y}$ is applied to precoded baseband signal z2' from FIG. 6, for time X+1, carrier Y, a phase change of $e^{j\theta X+1,Y}$ is applied to precoded baseband signal z2' from FIG. 6, such that $0 \le \theta_{X,Y} < 2\pi$, $0 \le \theta_{X-1,Y} \le 2\pi$, and $0 \le \theta_{X+1,Y} < 2\pi$, all units being in radians. Accordingly, for Condition #1, it follows that $\theta_{X,Y} \neq \theta_{X-1,Y}$, $\theta_{X,Y} \neq \theta_{X+,Y}$, and that $\theta_{X-1,Y} \neq \theta_{X+1,Y}$. Similarly, for Condition #2, it follows that $\theta_{X,Y} \neq \theta X_{,Y-1}$, $\theta_{X,Y} \neq \theta_{X,Y+1}$, and that $\theta_{X,Y-1} \neq \theta_{X,Y+1}$. And, for Condition #3, it follows that $\theta_{X,Y} \neq \theta_{X-1,Y}$, $\theta_{X,Y} \neq \theta_{X+1,Y}$, $\theta_{X,Y} \neq \theta_{X,Y-1}$, $\theta_{X,Y} \neq \theta_{X,Y-1}$, $\theta_{X-1,Y} \neq \theta_{X+1,Y}$, $\theta_{X-1,Y} \neq \theta_{X,Y-1}$, $\theta X_{-1,Y} \neq \theta_{X+1,Y}$, $\theta_{X+1,Y} \neq \theta_{X-1,Y}$, $\theta_{X+1,Y} \neq \theta_{X,Y+1}$, and that $\theta_{X,Y-1} \neq \theta_{X,Y+1}$.

Ideally, a data symbol should satisfy Condition #3.

FIG. 31 illustrates an example of Condition #3 where symbol A corresponds to symbol 3100. The symbols are arranged such that the phase by which precoded baseband signal z2' from FIG. 6 is multiplied differs for symbol 3100, for both neighbouring symbols thereof in the time domain 3101 and 3102, and for both neighbouring symbols thereof in the frequency domain 3102 and 3104. Accordingly, despite received signal quality degradation of symbol 3100 for the receiver, good signal quality is highly likely for the neighbouring signals, thus guaranteeing good signal quality after error correction.

Figure 32:
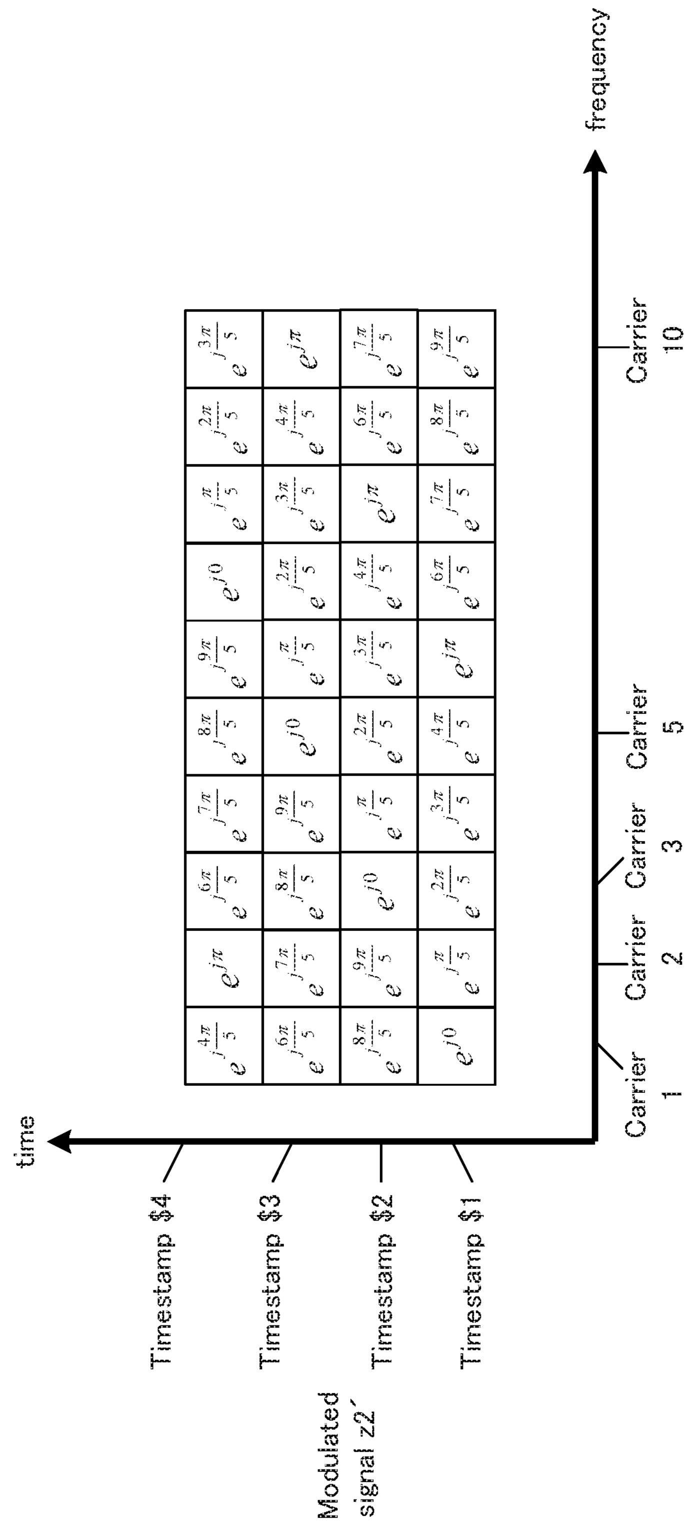
FIG. 32 illustrates another sample symbol arrangement for a modulated signal providing high received signal quality.

FIG. 32 illustrates a symbol arrangement obtained through phase changes under these conditions.

As evident from FIG. 32, with respect to any data symbol, a different change in phase is applied to each neighbouring symbol in the time domain and in the frequency domain. As such, the ability of the reception device to correct errors may be improved.

In other words, in FIG. 32, when all neighbouring symbols in the time domain are data symbols, Condition #1 is satisfied for all Xs and all Ys.

Similarly, in FIG. 32, when all neighbouring symbols in the frequency domain are data symbols, Condition #2 is satisfied for all Xs and all Ys.

Similarly, in FIG. 32, when all neighbouring symbols in the frequency domain are data symbols and all neighbouring symbols in the time domain are data symbols, Condition #3 is satisfied for all Xs and all Ys.

The following describes an example in which a change of phase is performed on two precoded baseband signals, as explained in Embodiment 2 (see FIG. 26).

When a change of phase is performed on precoded baseband signal z1' and precoded baseband signal z2' as shown in FIG. 26, several phase changing schemes are possible. The details thereof are explained below.

Figure 33:
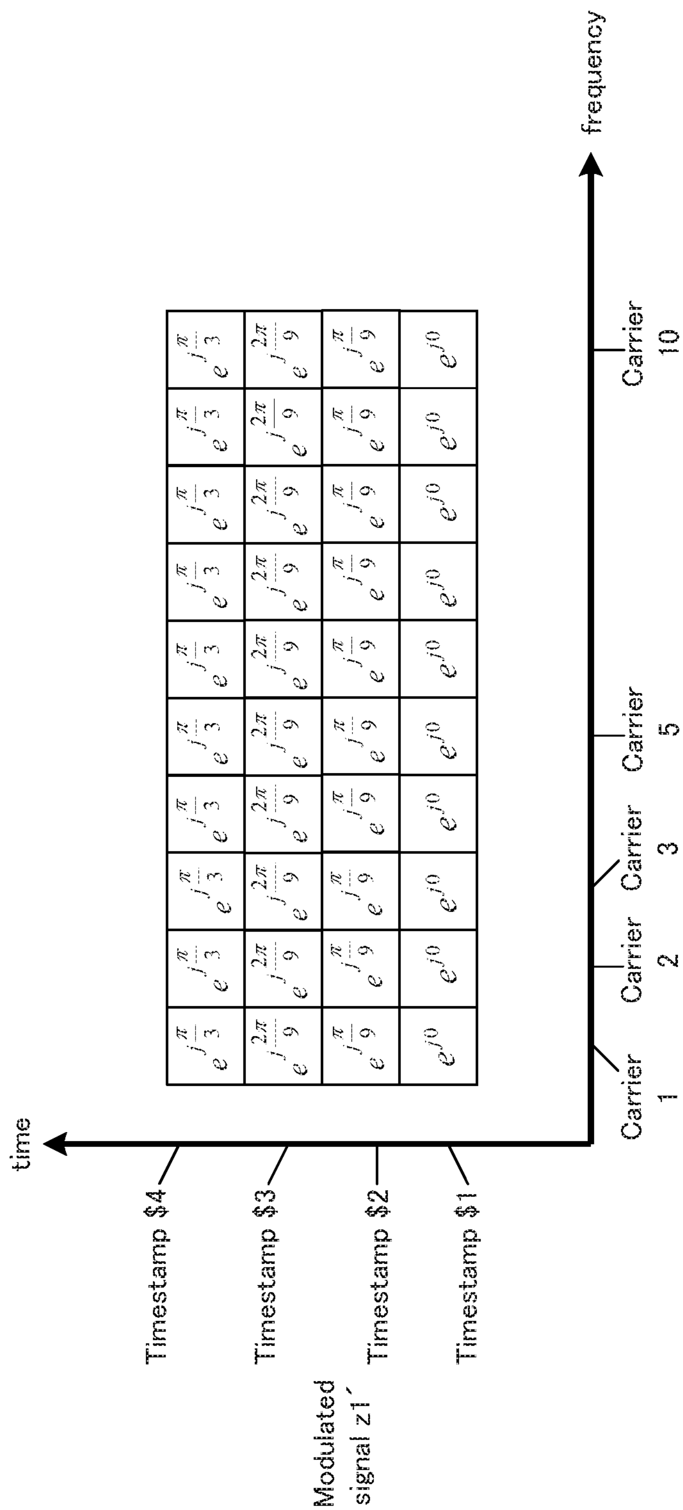
FIG. 33 illustrates yet another sample symbol arrangement for a modulated signal providing high received signal quality.

Scheme 1 involves a change in phase performed on precoded baseband signal z2' as described above, to achieve the change in phase illustrated by FIG. 32. In FIG. 32, a change of phase having a period (cycle) of 10 is applied to precoded baseband signal z2'. However, as described above, in order to satisfy Conditions #1, #2, and #3, the change in phase applied to precoded baseband signal z2' at each (sub-)carrier varies over time. (Although such changes are applied in FIG. 32 with a period (cycle) of ten, other phase changing schemes are also possible.) Then, as shown in FIG. 33, the change in phase performed on precoded baseband signal z1' produces a constant value that is one-tenth of that of the change in phase performed on precoded baseband signal z2'. In FIG. 33, for a period (cycle) (of change in phase performed on precoded baseband signal z2') including time \$1, the value of the change in phase performed on precoded baseband signal z1' is $e^{j0}$. Then, for the next period (cycle) (of change in phase performed on precoded baseband signal z2') including time \$2, the value of the change in phase performed on precoded baseband signal z1' is $e^{j\pi/9}$, and so on.

The symbols illustrated in FIG. 33 are indicated as $e^{j0}$, for example. This signifies that this symbol is signal z1' from FIG. 26 on which a change in phase as been applied through multiplication by $e^{j0}$. That is, the values indicated in FIG. 33 for each of the symbols are the values of $z1'(t)=y_2(t)z1'(t)$ described in Embodiment 2 for $y_1(t)$.

As shown in FIG. 33, the change in phase performed on precoded baseband signal z1' produces a constant value that is one-tenth that of the change in phase performed on precoded baseband signal z2' such that the phase changing value varies with the number of each period (cycle). (As described above, in FIG. 33, the value is $e^{j0}$ for the first period (cycle), $e^{j\pi/9}$ for the second period (cycle), and so on.)

As described above, the change in phase performed on precoded baseband signal z2' has a period (cycle) of ten, but the period (cycle) can be effectively made greater than ten by taking the change in phase applied to precoded baseband signal z1' and to precoded baseband signal z2' into consideration. Accordingly, data reception quality may be improved for the reception device.

Scheme 2 involves a change in phase of precoded baseband signal z2' as described above, to achieve the change in phase illustrated by FIG. 32. In FIG. 32, a change of phase having a period (cycle) of ten is applied to precoded baseband signal z2'. However, as described above, in order to satisfy Conditions #1, #2, and #3, the change in phase applied to precoded baseband signal z2' at each (sub-)carrier varies over time. (Although such changes are applied in FIG. 32 with a period (cycle) of ten, other phase changing schemes are also possible.) Then, as shown in FIG. 30, the change in phase performed on precoded baseband signal z1' differs from that performed on precoded baseband signal z2' in having a period (cycle) of three rather than ten.

Figure 30:
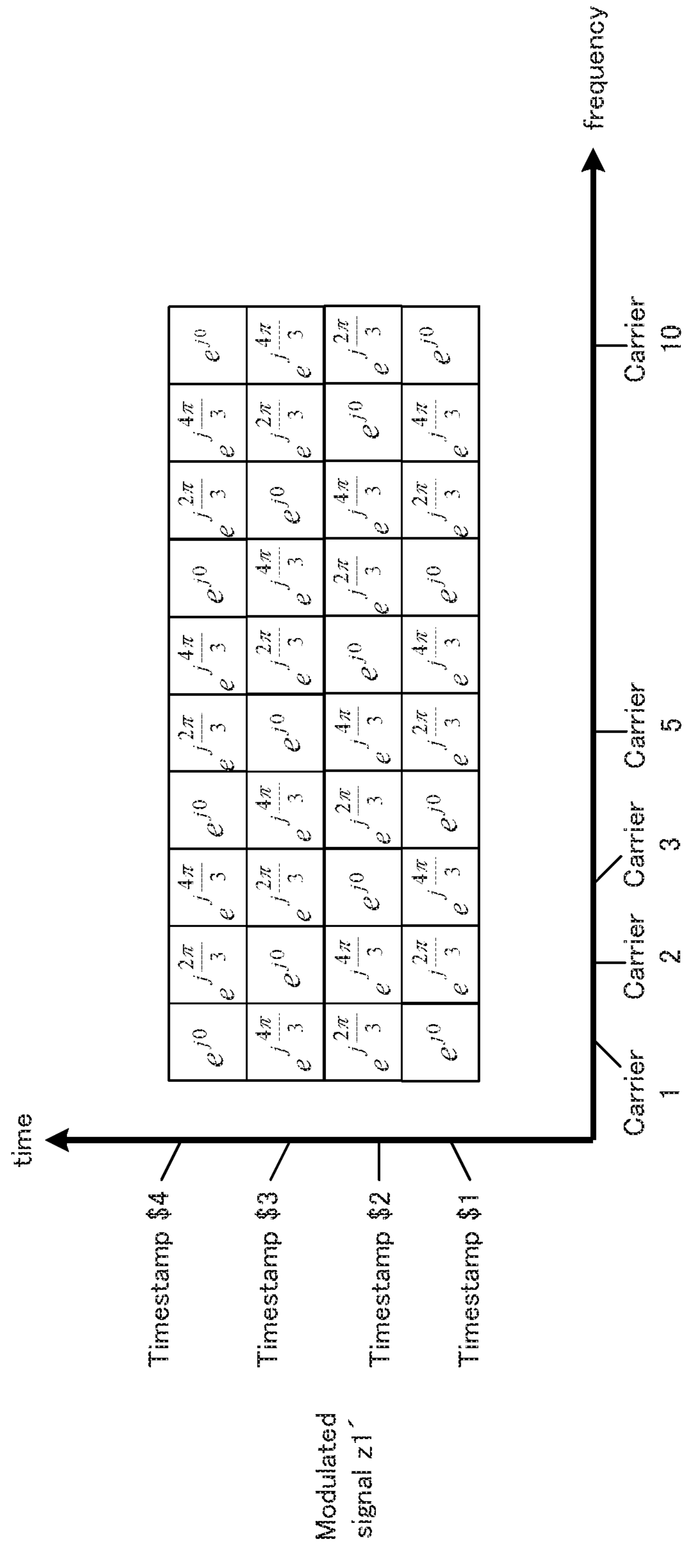
FIG. 30 illustrates a sample symbol arrangement for a modulated signal providing high received signal quality.

The symbols illustrated in FIG. 30 are indicated as $e^{j0}$, for example. This signifies that this symbol is signal z1' from FIG. 26 to which a change in phase has been applied through multiplication by $e^{j0}$. That is, the values indicated in FIG. 30 for each of the symbols are the values of $z1(t)=y_1(t)z1'(t)$ described in Embodiment 2 for $y_1(t)$.

As described above, the change in phase performed on precoded baseband signal z2' has a period (cycle) of ten, but by taking the changes in phase applied to precoded baseband signal z1' and precoded baseband signal z2' into consideration, the period (cycle) can be effectively made equivalent to 30 for both precoded baseband signals z1' and z2'. Accordingly, data reception quality may be improved for the reception device. An effective way of applying scheme 2 is to perform a change in phase on precoded baseband signal z1' with a period (cycle) of N and perform a change in phase on precoded baseband signal z2' with a period (cycle) of M such that N and M are coprime. As such, by taking both precoded baseband signals z1' and z2' into consideration, a period (cycle) of N×M is easily achievable, effectively making the period (cycle) greater when N and M are coprime.

The above describes an example of the phase changing scheme pertaining to Embodiment 3. The present invention is not limited in this manner. As explained for Embodiments 1 and 2, a change in phase may be performed with respect the frequency domain or the time domain, or on time-frequency blocks. Similar improvement to the data reception quality can be obtained for the reception device in all cases.

The same also applies to frames having a configuration other than that described above, where pilot symbols (SP (Scattered Pilot)) and symbols transmitting control information are inserted among the data symbols. The details of change in phase in such circumstances are as follows.

Figure 47A:
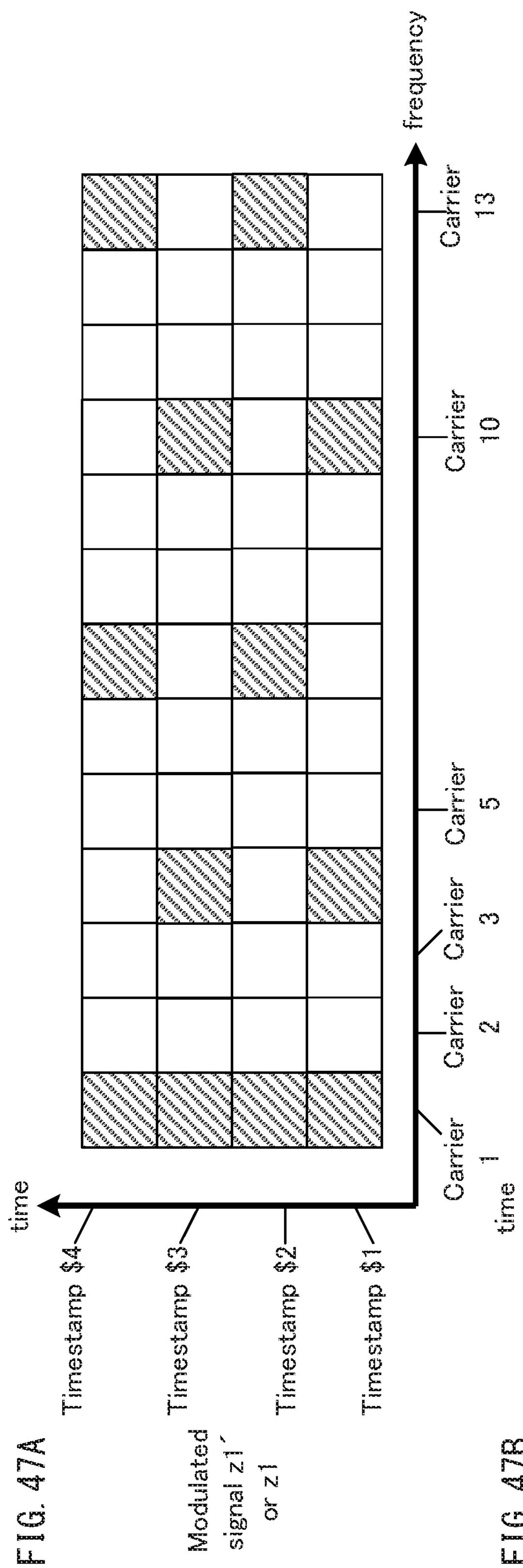
FIGS. 47A and 47B illustrate a variant sample symbol arrangement for a modulated signal providing high received signal quality.
Figure 47B:
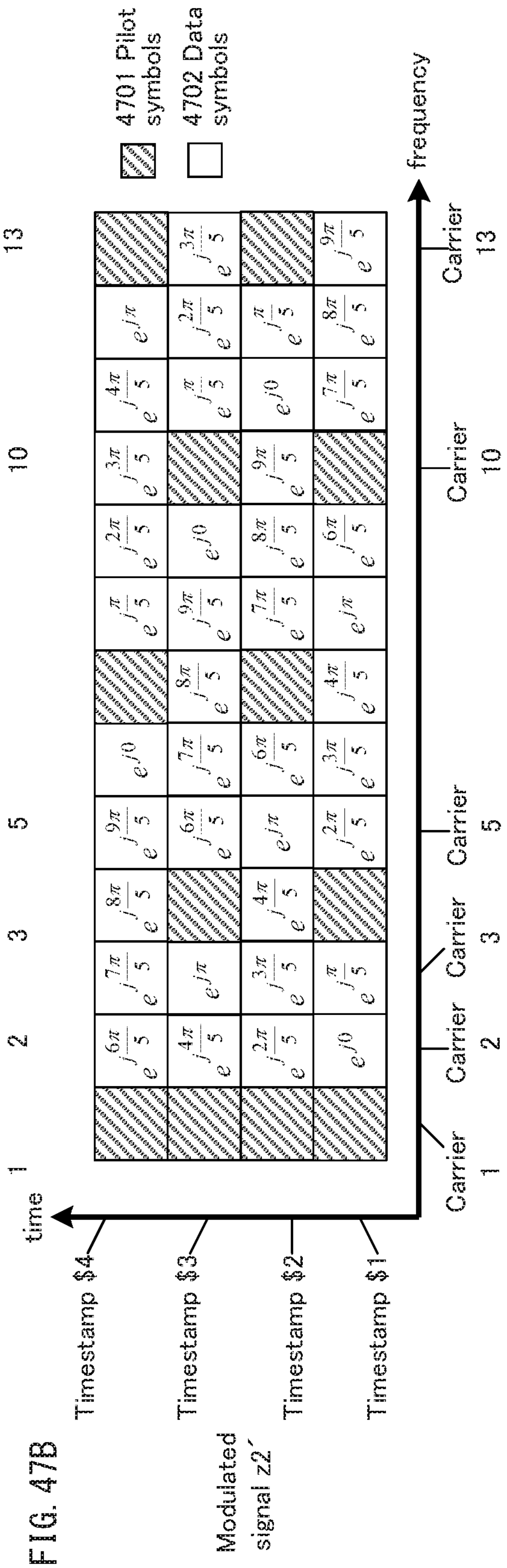

FIGS. 47A and 47B illustrate the frame configuration of modulated signals (precoded baseband signals) z1 or z1' and z2' in the time-frequency domain. FIG. 47A illustrates the frame configuration of modulated signal (precoded baseband signals) z1 or z1' while FIG. 47B illustrates the frame configuration of modulated signal (precoded baseband signals) z2'. In FIGS. 47A and 47B, 4701 marks pilot symbols while 4702 marks data symbols. The data symbols 4702 are symbols on which precoding or precoding and a change in phase have been performed.

FIGS. 47A and 47B, like FIG. 6, indicate the arrangement of symbols when a change in phase is applied to precoded baseband signal z2' (while no change of phase is performed on precoded baseband signal z1). (Although FIG. 6 illustrates a change in phase with respect to the time domain, switching time t with carrier f in FIG. 6 corresponds to a change in phase with respect to the frequency domain. In other words, replacing (t) with (t, f) where t is time and f is frequency corresponds to performing a change of phase on time-frequency blocks.) Accordingly, the numerical values indicated in FIGS. 47A and 47B for each of the symbols are the values of precoded baseband signal z2' after the change in phase. No values are given for the symbols of precoded baseband signal z1' (z1) as no change in phase is performed thereon.

The key point of FIGS. 47A and 47B is that the change in phase is performed on the data symbols of precoded baseband signal z2', i.e., on precoded symbols. (The symbols under discussion, being precoded, actually include both symbols s1 and s2.) Accordingly, no change of phase is performed on the pilot symbols inserted into z2'.

Figure 48A:
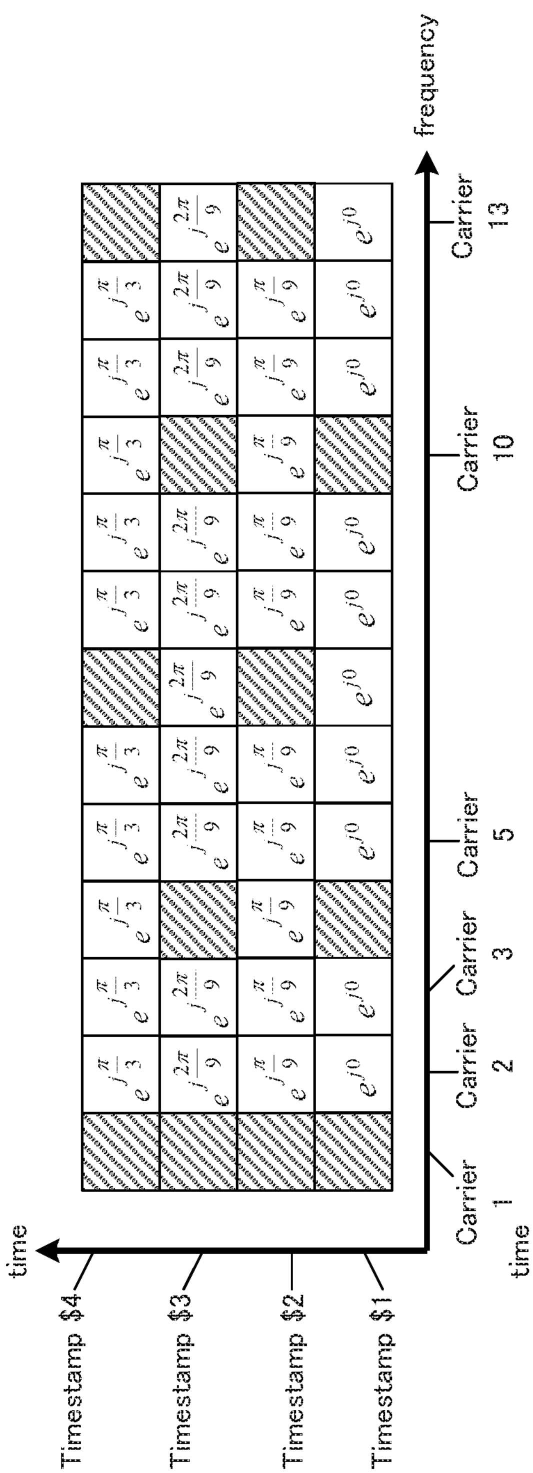
FIGS. 48A and 48B illustrate another variant sample symbol arrangement for a modulated signal providing high received signal quality.
Figure 48B:
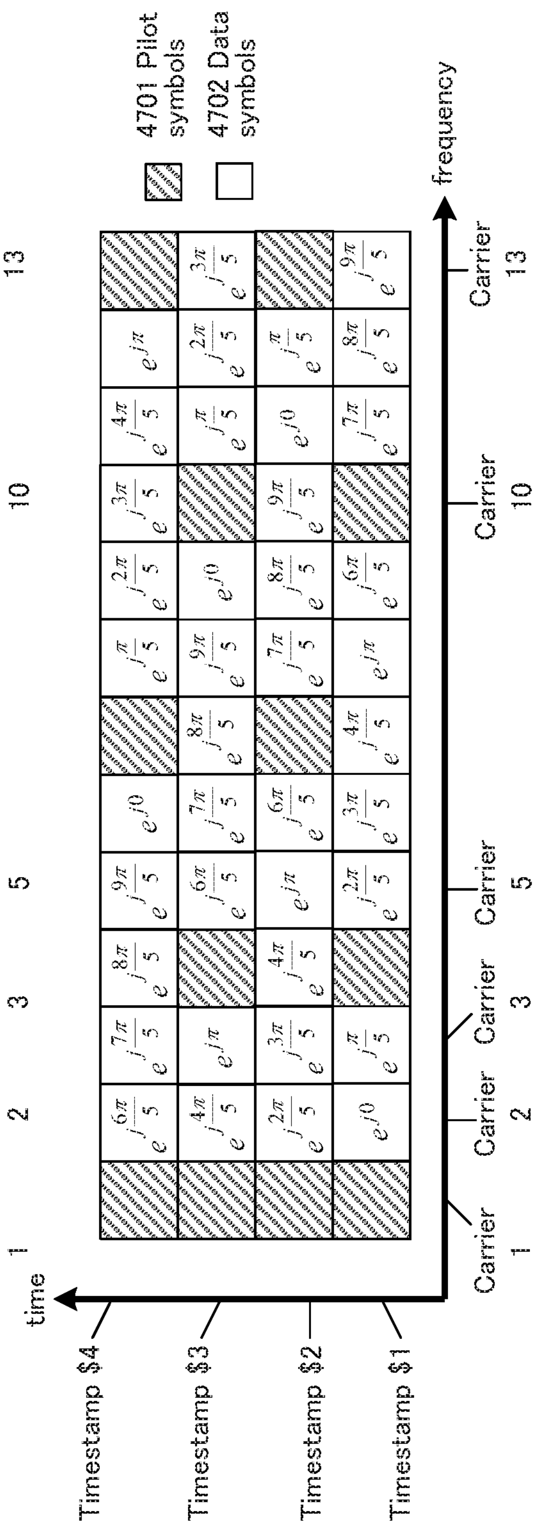

FIGS. 48A and 48B illustrate the frame configuration of modulated signals (precoded baseband signals) z1 or z1' and z2' in the time-frequency domain. FIG. 48A illustrates the frame configuration of modulated signal (precoded baseband signals) z1 or z1' while FIG. 47B illustrates the frame configuration of modulated signal (precoded baseband signals) z2'. In FIGS. 48A and 48B, 4701 marks pilot symbols while 4702 marks data symbols. The data symbols 4702 are symbols on which precoding, or precoding and a change in phase, have been performed.

FIGS. 48A and 48B, like FIG. 26, indicate the arrangement of symbols when a change in phase is applied to precoded baseband signal z1' and to precoded baseband signal z2'. (Although FIG. 26 illustrates a change in phase with respect to the time domain, switching time t with carrier f in FIG. 26 corresponds to a change in phase with respect to the frequency domain. In other words, replacing (t) with (t, f) where t is time and f is frequency corresponds to performing a change of phase on time-frequency blocks.) Accordingly, the numerical values indicated in FIGS. 48A and 48B for each of the symbols are the values of precoded baseband signal z1' and z2' after the change in phase.

The key point of FIGS. 48A and 48B is that a change of phase is performed on the data symbols of precoded baseband signal z1', that is, on the precoded symbols thereof, and on the data symbols of precoded baseband signal z2', that is, on the precoded symbols thereof. (The symbols under discussion, being precoded, actually include both symbols s1 and s2.) Accordingly, no change of phase is performed on the pilot symbols inserted in z1', nor on the pilot symbols inserted in z2'.

Figure 49A:
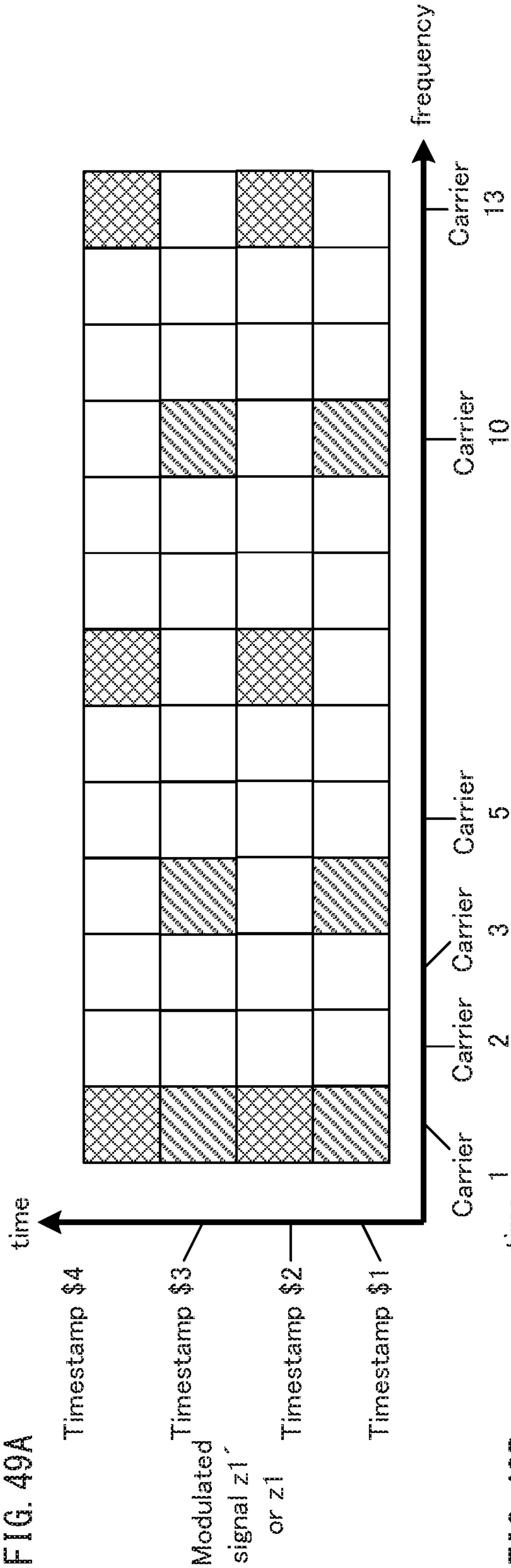
FIGS. 49A and 49B illustrate yet another variant sample symbol arrangement for a modulated signal providing high received signal quality.
Figure 49B:
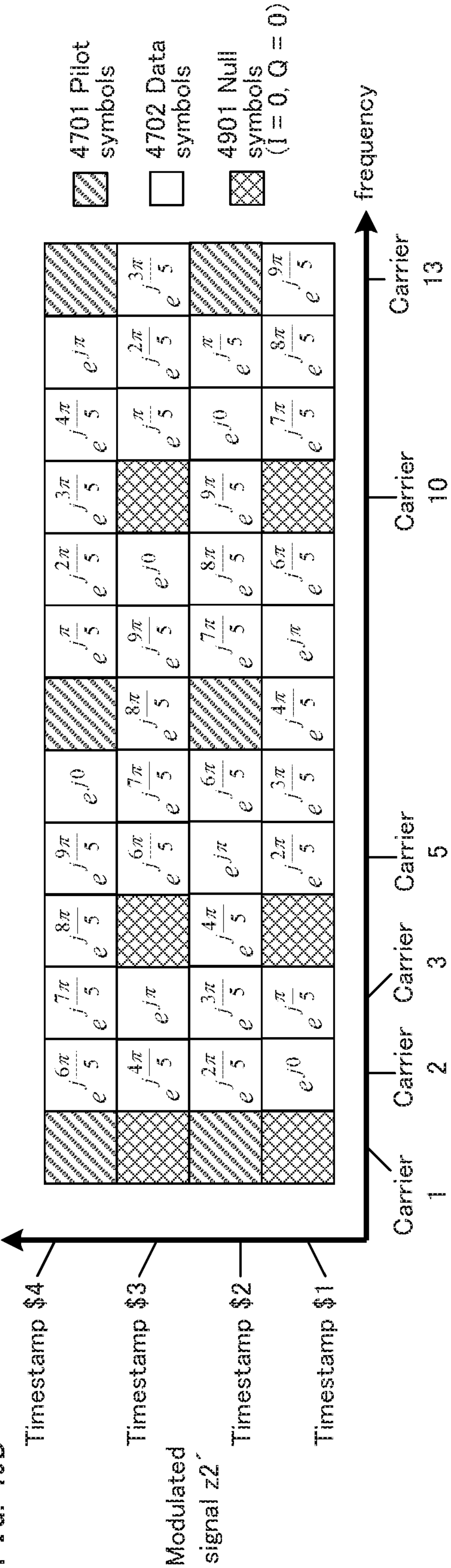

FIGS. 49A and 49B illustrate the frame configuration of modulated signals (precoded baseband signals) z1 or z1' and z2' in the time-frequency domain. FIG. 49A illustrates the frame configuration of modulated signal (precoded baseband signals) z1 or z1' while FIG. 49B illustrates the frame configuration of modulated signal (precoded baseband signal) z2'. In FIGS. 49A and 49B, 4701 marks pilot symbols, 4702 marks data symbols, and 4901 marks null symbols for which the in-phase component of the baseband signal I=0 and the quadrature component Q=0. As such, data symbols 4702 are symbols on which precoding or precoding and the change in phase have been performed. FIGS. 49A and 49B differ from FIGS. 47A and 47B in the configuration scheme for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 49A and 49B, like FIG. 6, indicate the arrangement of symbols when a change in phase is applied to precoded baseband signal z2' (while no change of phase is performed on precoded baseband signal z1). (Although FIG. 6 illustrates a change of phase with respect to the time domain, switching time t with carrier f in FIG. 6 corresponds to a change of phase with respect to the frequency domain. In other words, replacing (t) with (t, f) where t is time and f is frequency corresponds to performing a change of phase on time-frequency blocks.) Accordingly, the numerical values indicated in FIGS. 49A and 49B for each of the symbols are the values of precoded baseband signal z2' after a change of phase is performed. No values are given for the symbols of precoded baseband signal z1' (z1) as no change of phase is performed thereon.

The key point of FIGS. 49A and 49B is that a change of phase is performed on the data symbols of precoded baseband signal z2', i.e., on precoded symbols. (The symbols under discussion, being precoded, actually include both symbols s1 and s2.) Accordingly, no change of phase is performed on the pilot symbols inserted into z2'.

Figures 50A, 50B:
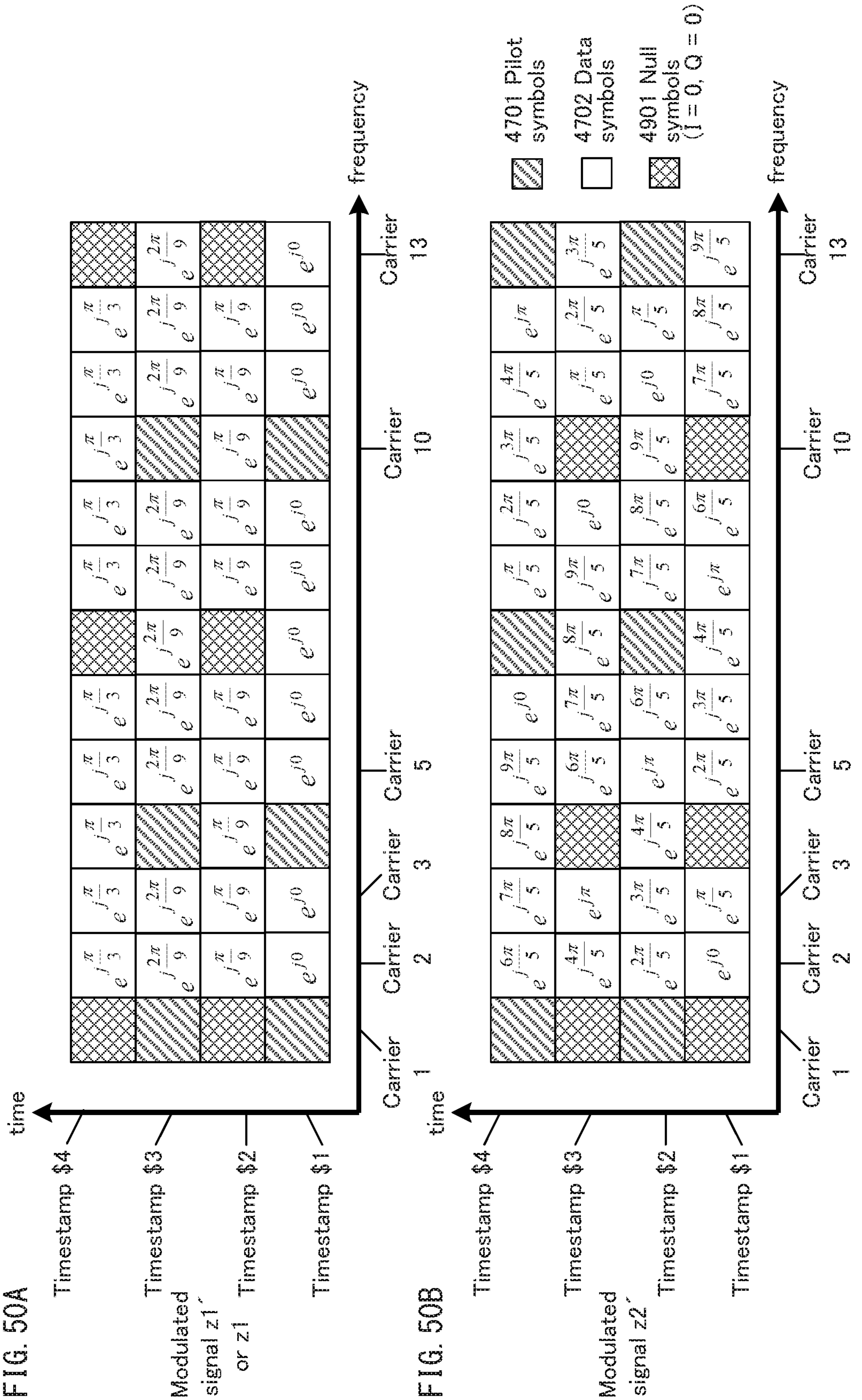
FIGS. 50A and 50B illustrate a further variant sample symbol arrangement for a modulated signal providing high received signal quality.

FIGS. 50A and 50B illustrate the frame configuration of modulated signals (precoded baseband signals) z1 or z1' and z2' in the time-frequency domain. FIG. 50A illustrates the frame configuration of modulated signal (precoded baseband signal) z1 or z1' while FIG. 50B illustrates the frame configuration of modulated signal (precoded baseband signal) z2'. In FIGS. 50A and 50B, 4701 marks pilot symbols, 4702 marks data symbols, and 4901 marks null symbols for which the in-phase component of the baseband signal I=0 and the quadrature component Q=0. As such, data symbols 4702 are symbols on which precoding, or precoding and a change of phase, have been performed. FIGS. 50A and 50B differ from FIGS. 48A and 48B in the configuration scheme for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 50A and 50B, like FIG. 26, indicate the arrangement of symbols when a change of phase is applied to precoded baseband signal z1' and to precoded baseband signal z2'. (Although FIG. 26 illustrates a change of phase with respect to the time domain, switching time t with carrier f in FIG. 26 corresponds to a change of phase with respect to the frequency domain. In other words, replacing (t) with (t, f) where t is time and f is frequency corresponds to performing a change of phase on time-frequency blocks.) Accordingly, the numerical values indicated in FIGS. 50A and 50B for each of the symbols are the values of precoded baseband signal z1' and z2' after a change of phase.

The key point of FIGS. 50A and 50B is that a change of phase is performed on the data symbols of precoded baseband signal z1', that is, on the precoded symbols thereof, and on the data symbols of precoded baseband signal z2', that is, on the precoded symbols thereof. (The symbols under discussion, being precoded, actually include both symbols s1 and s2.) Accordingly, no change of phase is performed on the pilot symbols inserted in z1', nor on the pilot symbols inserted in z2'.

Figure 51:
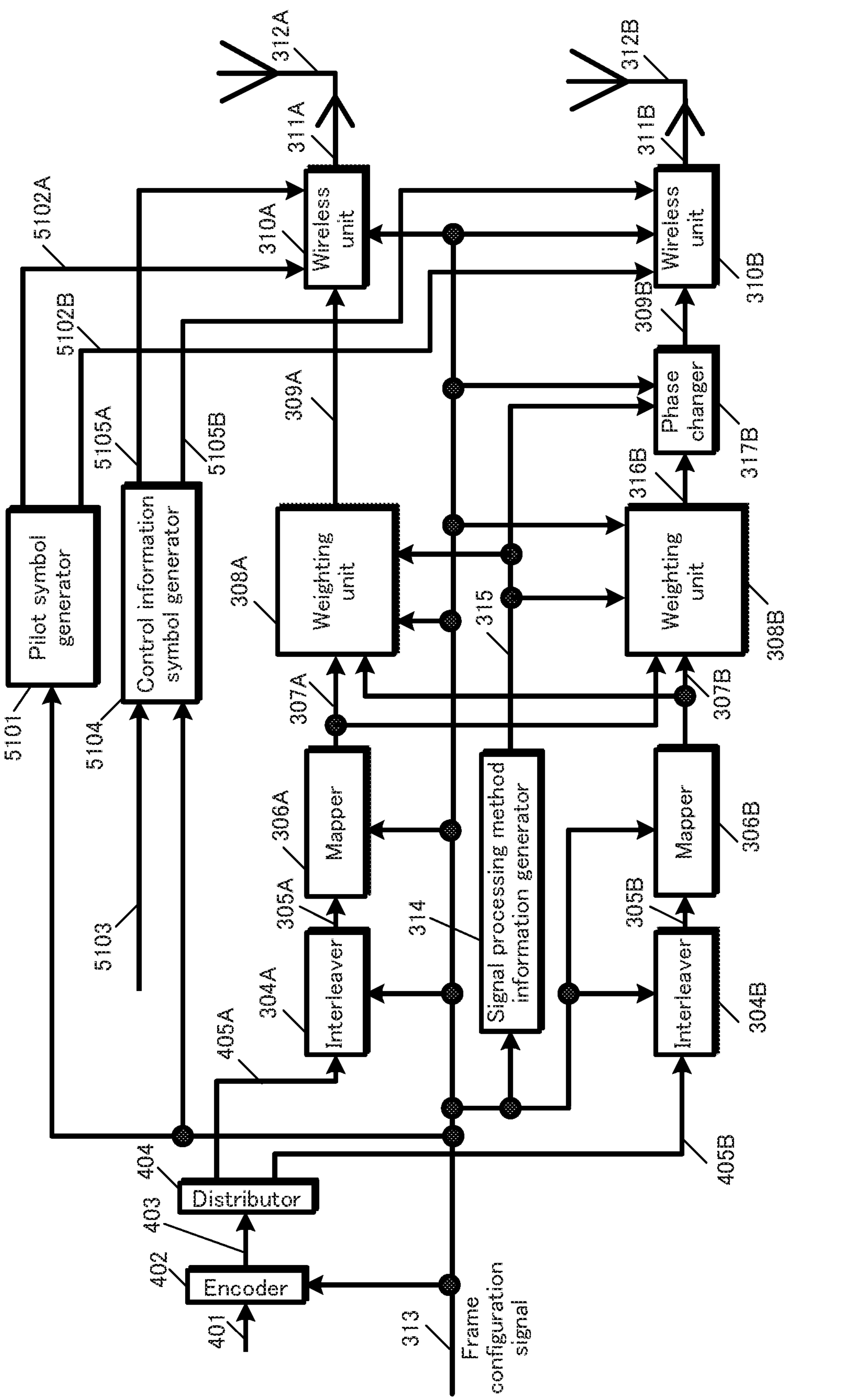
FIG. 51 illustrates a sample configuration of a transmission device.

FIG. 51 illustrates a sample configuration of a transmission device generating and transmitting modulated signal having the frame configuration of FIGS. 47A, 47B, 49A, and 49B. Components thereof performing the same operations as those of FIG. 4 use the same reference symbols thereas.

In FIG. 51, the weighting units 308A and 308B and phase changer 317B only operate at times indicated by the frame configuration signal 313 as corresponding to data symbols.

In FIG. 51, a pilot symbol generator 5101 (that also generates null symbols) outputs baseband signals 5102A and 5102B for a pilot symbol whenever the frame configuration signal 313 indicates a pilot symbol (or a null symbol).

Although not indicated in the frame configurations from FIGS. 47A through 50B, when precoding (or phase change) is not performed, such as when transmitting a modulated signal using only one antenna (such that the other antenna transmits no signal) or when using a space-time coding transmission scheme (particularly, space-time block coding) to transmit control information symbols, then the frame configuration signal 313 takes control information symbols 5104 and control information 5103 as input. When the frame configuration signal 313 indicates a control information symbol, baseband signals 5102A and 5102B thereof are output.

Wireless units 310A and 310B of FIG. 51 take a plurality of baseband signals as input and select a desired baseband signal according to the frame configuration signal 313. Wireless units 310A and 310B then apply OFDM signal processing and output modulated signals 311A and 311B conforming to the frame configuration.

Figure 52:
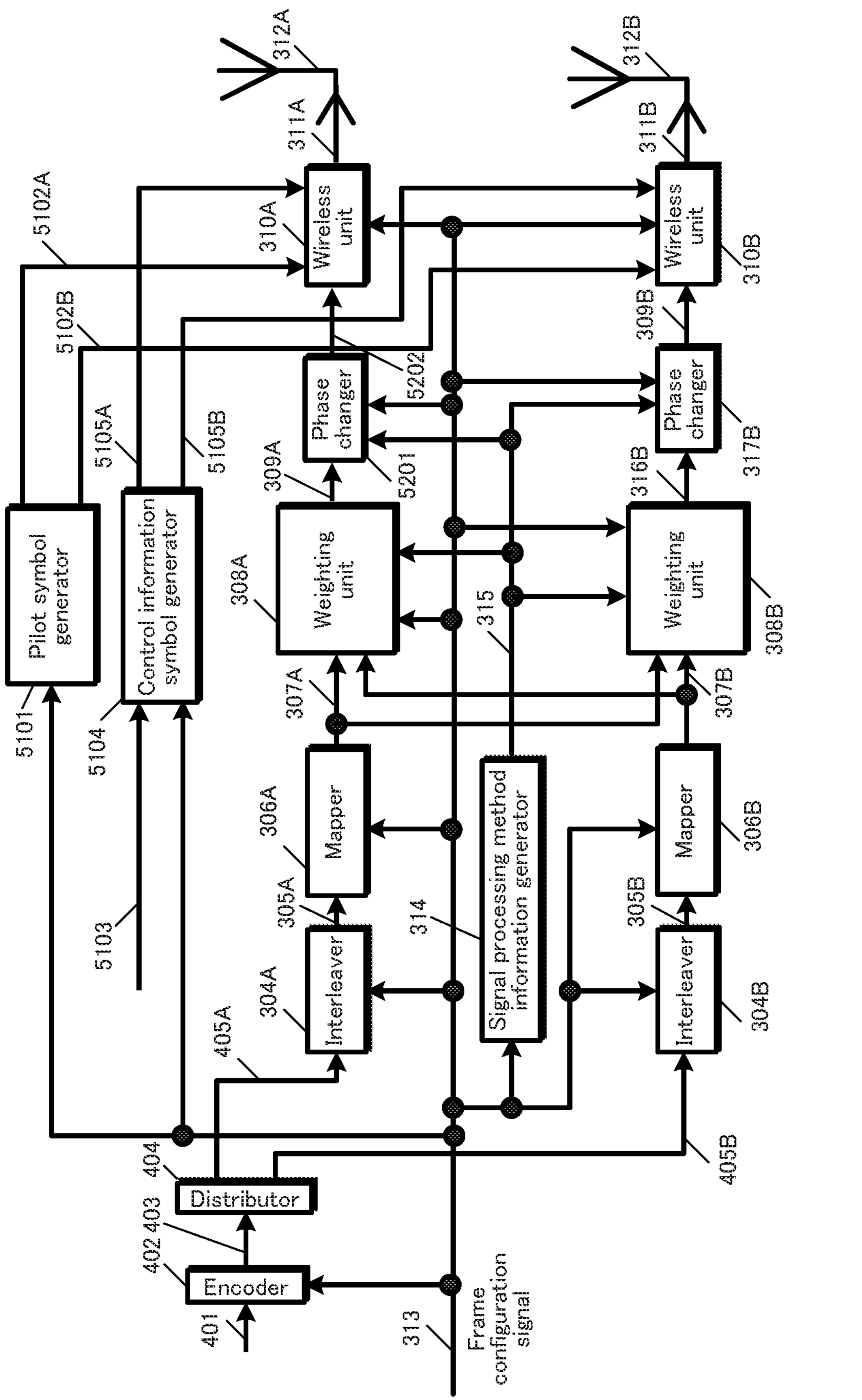
FIG. 52 illustrates another sample configuration of a transmission device.

FIG. 52 illustrates a sample configuration of a transmission device generating and transmitting modulated signal having the frame configuration of FIGS. 48A, 48B, 50A, and 50B. Components thereof performing the same operations as those of FIGS. 4 and 51 use the same reference symbols thereas. FIG. 51 features an additional phase changer 317A that only operates when the frame configuration signal 313 indicates a data symbol. At all other times, the operations are identical to those explained for FIG. 51.

Figure 53:
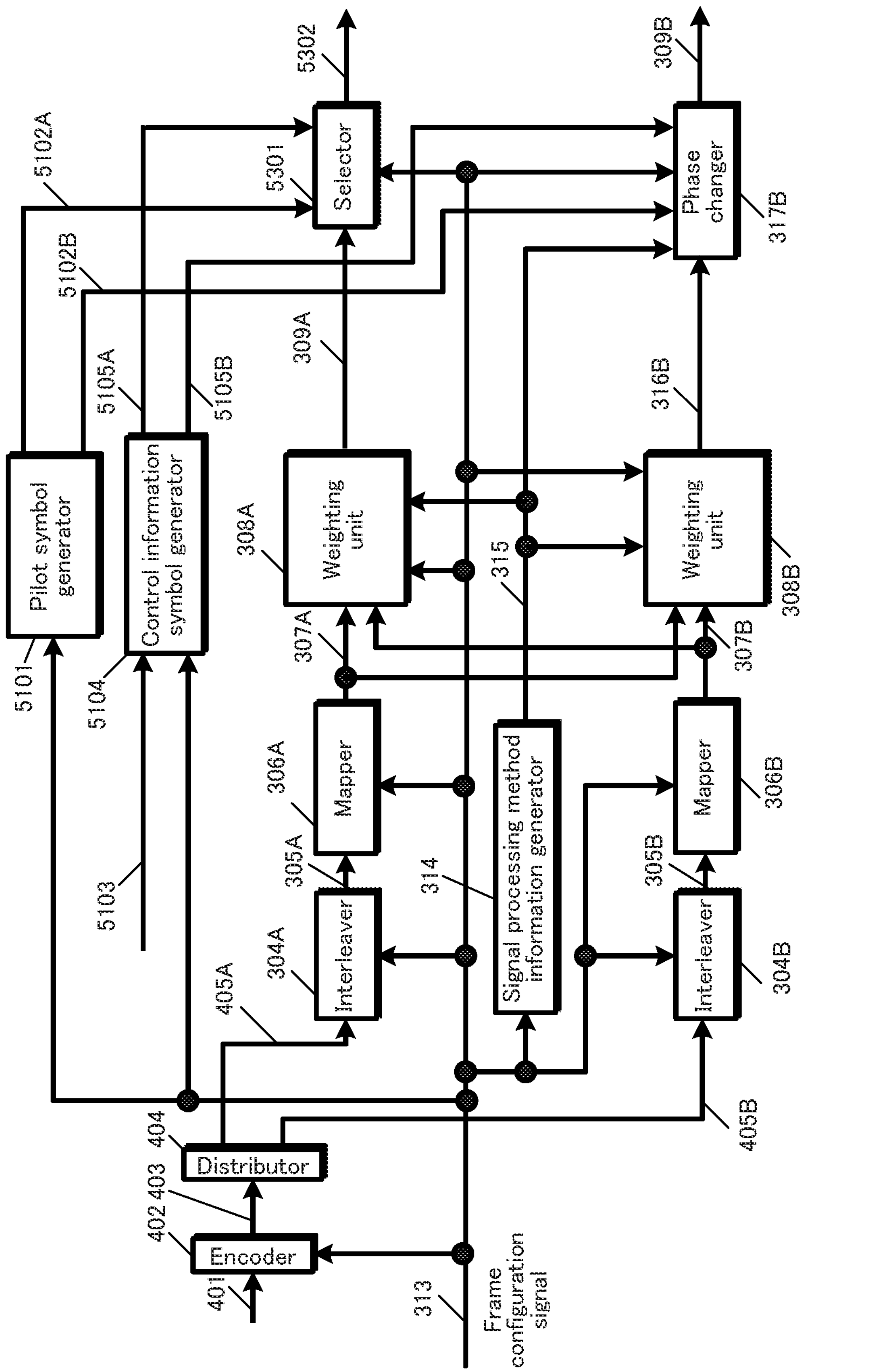
FIG. 53 illustrates a further sample configuration of a transmission device.

FIG. 53 illustrates a sample configuration of a transmission device that differs from that of FIG. 51. The following describes the points of difference. As shown in FIG. 53, phase changer 317B takes a plurality of baseband signals as input. Then, when the frame configuration signal 313 indicates a data symbol, phase changer 317B performs a change of phase on precoded baseband signal 316B. When frame configuration signal 313 indicates a pilot symbol (or null symbol) or a control information symbol, phase changer 317B pauses phase changing operations, such that the symbols of the baseband signal are output as-is. (This may be interpreted as performing forced rotation corresponding to $e^{j0}$.)

A selector 5301 takes the plurality of baseband signals as input and selects a baseband signal having a symbol indicated by the frame configuration signal 313 for output.

Figure 54:
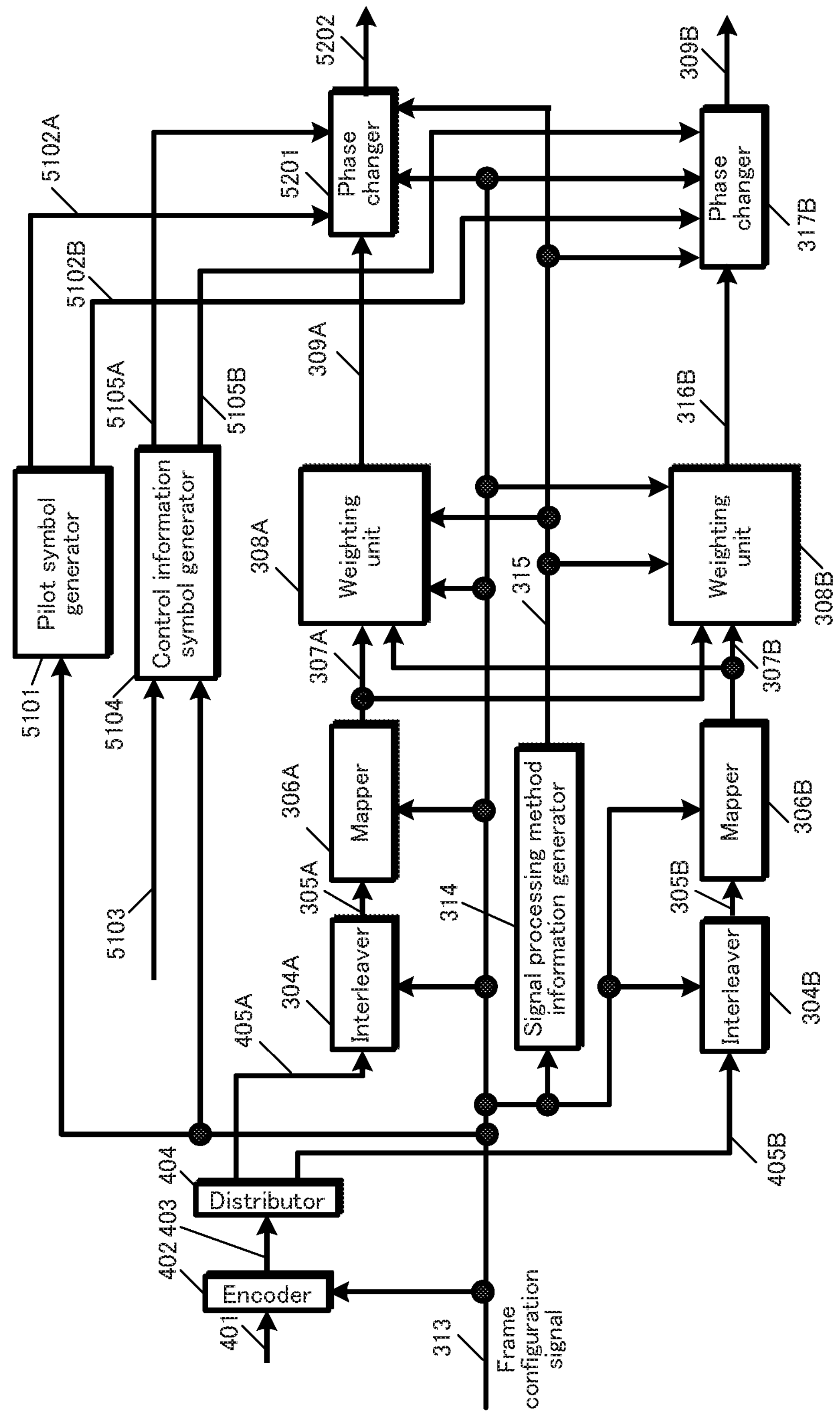
FIG. 54 illustrates yet a further sample configuration of a transmission device.

FIG. 54 illustrates a sample configuration of a transmission device that differs from that of FIG. 52. The following describes the points of difference. As shown in FIG. 54, phase changer 317B takes a plurality of baseband signals as input. Then, when the frame configuration signal 313 indicates a data symbol, phase changer 317B performs a change of phase on precoded baseband signal 316B. When frame configuration signal 313 indicates a pilot symbol (or null symbol) or a control information symbol, phase changer 317B pauses phase changing operations such that the symbols of the baseband signal are output as-is. (This may be interpreted as performing forced rotation corresponding to $e^{j0}$.)

Similarly, as shown in FIG. 54, phase changer 5201 takes a plurality of baseband signals as input. Then, when the frame configuration signal 313 indicates a data symbol, phase changer 5201 performs a change of phase on precoded baseband signal 309A. When frame configuration signal 313 indicates a pilot symbol (or null symbol) or a control information symbol, phase changer 5201 pauses phase changing operations such that the symbols of the baseband signal are output as-is. (This may be interpreted as performing forced rotation corresponding to $e^{j0}$.)

The above explanations are given using pilot symbols, control symbols, and data symbols as examples. However, the present invention is not limited in this manner. When symbols are transmitted using schemes other than precoding, such as single-antenna transmission or transmission using space-time block coding, not performing a change of phase is important. Conversely, performing a change of phase on symbols that have been precoded is the key point of the present invention.

Accordingly, a characteristic feature of the present invention is that the change of phase is not performed on all symbols within the frame configuration in the time-frequency domain, but only performed on signals that have been precoded.

Embodiment 4

Embodiments 1 and 2, described above, discuss a regular change of phase. Embodiment 3, however, discloses performing a different change of phase on neighbouring symbols.

The present embodiment describes a phase changing scheme that varies according to the modulation scheme and the coding rate of the error-correcting codes used by the transmission device.

Table 1, below, is a list of phase changing scheme settings corresponding to the settings and parameters of the transmission device.

TABLE 1

| No. of Modulated Transmission Signals | Modulation Scheme | Coding Rate | Phase Changing Pattern |
|---|---|---|---|
| 2 | #1: QPSK, #2: QPSK | #1: 1/2, #2 2/3 | #1: —, #2: A |
| 2 | #1: QPSK, #2: QPSK | #1: 1/2, #2: 3/4 | #1: A, #2: B |
| 2 | #1: QPSK, #2: QPSK | #1: 2/3, #2: 3/5 | #1: A, #2: C |
| 2 | #1: QPSK, #2: QPSK | #1: 2/3, #2: 2/3 | #1: C, #2: — |
| 2 | #1: QPSK, #2: QPSK | #1: 3/3, #2: 2/3 | #1: D, #2: E |
| 2 | #1: QPSK, #2: 16-QAM | #1: 1/2, #2: 2/3 | #1: B, #2: A |
| 2 | #1: QPSK, #2: 16-QAM | #1: 1/2, #2: 3/4 | #1: A, #2: C |
| 2 | #1: QPSK, #2: 16-QAM | #1: 1/2, #2: 3/5 | #1: —, #2: E |
| 2 | #1: QPSK, #2: 16-QAM | #1: 2/3, #2: 3/4 | #1: D, #2: — |
| 2 | #1: QPSK, #2: 16-QAM | #1: 2/3, #2: 5/6 | #1: D, #2: B |
| 2 | #1: 16-QAM, #2: 16-QAM | #1: 1/2, #2: 2/3 | #1: —, #2: E |
| . | . | . | . |
| . | . | . | . |
| . | . | . | . |

In Table 1, #1 denotes modulated signal s1 from Embodiment 1 described above (baseband signal s1 modulated with the modulation scheme set by the transmission device) and #2 denotes modulated signal s2 (baseband signal s2 modulated with the modulation scheme set by the transmission device). The coding rate column of Table 1 indicates the coding rate of the error-correcting codes for modulation schemes #1 and #2. The phase changing pattern column of Table 1 indicates the phase changing scheme applied to precoded baseband signals z1 (z1') and z2 (z2'), as explained in Embodiments 1 through 3. Although the phase changing patterns are labeled A, B, C, D, E, and so on, this refers to the phase change degree applied, for example, in a phase changing pattern given by formula 46 and formula 47, above. In the phase changing pattern column of Table 1, the dash signifies that no change of phase is applied.

The combinations of modulation scheme and coding rate listed in Table 1 are examples. Other modulation schemes (such as 128-QAM and 256-QAM) and coding rates (such as 7/8) not listed in Table 1 may also be included. Also, as described in Embodiment 1, the error-correcting codes used for s1 and s2 may differ (Table 1 is given for cases where a single type of error-correcting codes is used, as in FIG. 4). Furthermore, the same modulation scheme and coding rate may be used with different phase changing patterns. The transmission device transmits information indicating the phase changing patterns to the reception device. The reception device specifies the phase changing pattern by cross-referencing the information and Table 1, then performs demodulation and decoding. When the modulation scheme and error-correction scheme determine a unique phase changing pattern, then as long as the transmission device transmits the modulation scheme and information regarding the error-correction scheme, the reception device knows the phase changing pattern by obtaining that information. As such, information pertaining to the phase changing pattern is not strictly necessary.

In Embodiments 1 through 3, the change of phase is applied to precoded baseband signals. However, the amplitude may also be modified along with the phase in order to apply periodical, regular changes. Accordingly, an amplification modification pattern regularly modifying the amplitude of the modulated signals may also be made to conform to Table 1. In such circumstances, the transmission device should include an amplification modifier that modifies the amplification after weighting unit 308A or weighting unit 308B from FIG. 3 or 4. In addition, amplification modification may be performed on only one of or on both of the precoded baseband signals z1($t$) and z2($t$) (in the former case, the amplification modifier is only needed after one of weighting unit 308A and 308B).

Furthermore, although not indicated in Table 1 above, the mapping scheme may also be regularly modified by the mapper, without a regular change of phase.

That is, when the mapping scheme for modulated signal s1($t$) is 16-QAM and the mapping scheme for modulated signal s2($t$) is also 16-QAM, the mapping scheme applied to modulated signal s2($t$) may be regularly changed as follows: from 16-QAM to 16-APSK, to 16-QAM in the I-Q plane, to a first mapping scheme producing a signal point arrangement unlike 16-APSK, to 16-QAM in the I-Q plane, to a second mapping scheme producing a signal point arrangement unlike 16-APSK, and so on. As such, the data reception quality can be improved for the reception device, much like the results obtained by a regular change of phase described above.

In addition, the present invention may use any combination of schemes for a regular change of phase, mapping scheme, and amplitude, and the transmit signal may transmit with all of these taken into consideration.

The present embodiment may be realized using single-carrier schemes as well as multi-carrier schemes. Accordingly, the present embodiment may also be realized using, for example, spread-spectrum communications, OFDM, SC-FDMA, SC-OFDM, wavelet OFDM as described in Non-Patent Literature 7, and so on. As described above, the present embodiment describes changing the phase, amplitude, and mapping schemes by performing phase, amplitude, and mapping scheme modifications with respect to the time domain t. However, much like Embodiment 1, the same changes may be carried out with respect to the frequency domain. That is, considering the phase, amplitude, and mapping scheme modification in the time domain t described in the present embodiment and replacing t with f (f being the ((sub-) carrier) frequency) leads to phase, amplitude, and mapping scheme modification applicable to the frequency domain. Also, the phase, amplitude, and mapping scheme modification of the present embodiment is also applicable to phase, amplitude, and mapping scheme modification in both the time domain and the frequency domain.

Furthermore, in the present embodiment, symbols other than data symbols, such as pilot symbols (preamble, unique word, etc) or symbols transmitting control information, may be arranged within the frame in any manner.

Embodiment A1

The present embodiment describes a scheme for regularly changing the phase when encoding is performed using block codes as described in Non-Patent Literature 12 through 15, such as QC (Quasi-Cyclic) LDPC Codes (not only QC-LDPC but also LDPC codes may be used), concatenated LDPC and BCH (Bose-Chaudhuri-Hocquenghem) codes, Turbo codes or Duo-Binary Turbo Codes using tail-biting, and so on. The following example considers a case where two streams s1 and s2 are transmitted. However, when encoding has been performed using block codes and control information and the like is not required, the number of bits making up each coded block matches the number of bits making up each block code (control information and so on described below may yet be included). When encoding has been performed using block codes or the like and control information or the like (e.g., CRC (cyclic redundancy check) transmission parameters) is required, then the number of bits making up each coded block is the sum of the number of bits making up the block codes and the number of bits making up the information.

Figure 34:
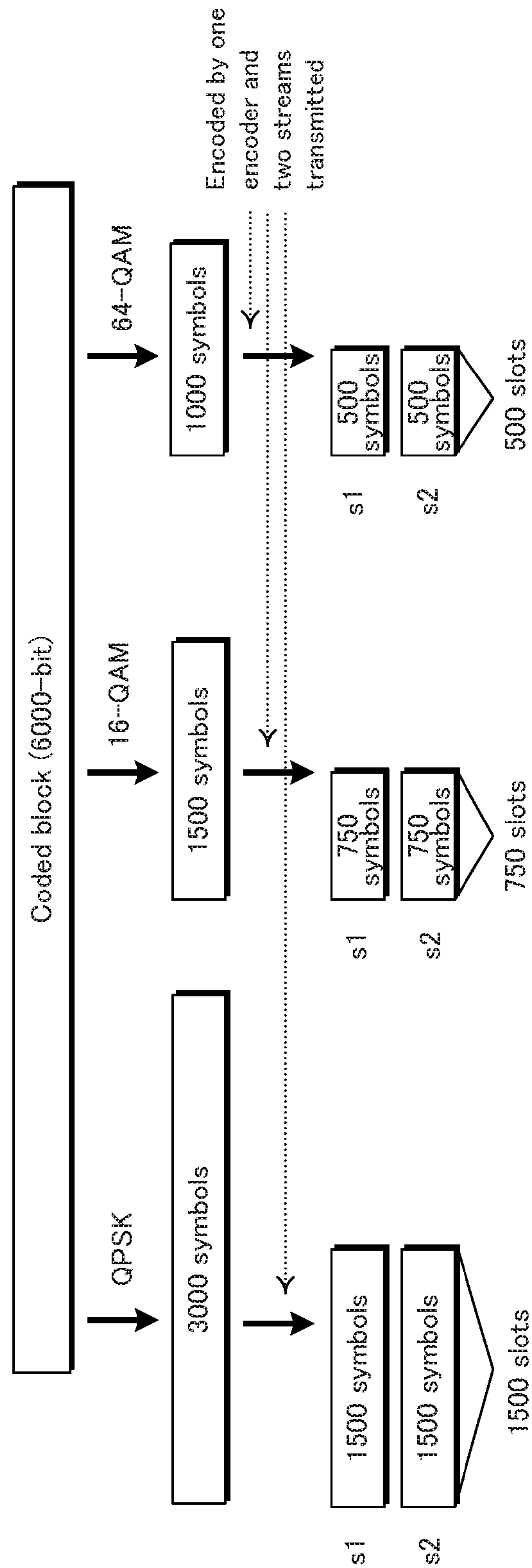
FIG. 34 illustrates variation in numbers of symbols and slots needed per coded block when block codes are used.

FIG. 34 illustrates the varying numbers of symbols and slots needed in each coded block when block codes are used. FIG. 34 illustrates the varying numbers of symbols and slots needed in each coded block when block codes are used when, for example, two streams s1 and s2 are transmitted as indicated by the transmission device from FIG. 4, and the transmission device has only one encoder. (Here, the transmission scheme may be any single-carrier scheme or multi-carrier scheme such as OFDM.)

As shown in FIG. 34, when block codes are used, there are 6000 bits making up a single coded block. In order to transmit these 6000 bits, the number of required symbols depends on the modulation scheme, being 3000 symbols for QPSK, 1500 symbols for 16-QAM, and 1000 symbols for 64-QAM.

Then, given that the transmission device from FIG. 4 transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up a single coded block, and when the modulation scheme is 64-QAM, 500 slots are needed to transmit all of the bits making up a single coded block.

The following describes the relationship between the above-defined slots and the phase of multiplication, as pertains to schemes for a regular change of phase.

Here, five different phase changing values (or phase changing sets) are assumed as having been prepared for use in the scheme for a regular change of phase. That is, five different phase changing values (or phase changing sets) have been prepared for the phase changer of the transmission device from FIG. 4 (equivalent to the period (cycle) from Embodiments 1 through 4) (As in FIG. 6, five phase changing values are needed in order to perform a change of phase with a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform the change of phase with a period (cycle) of five in such circumstances). These five phase changing values (or phase changing sets) are expressed as PHASE[0], PHASE[1], PHASE[2], PHASE[3], and PHASE[4].

For the above-described 1500 slots needed to transmit the 6000 bits making up a single coded block when the modulation scheme is QPSK, PHASE[0] is used on 300 slots, PHASE[1] is used on 300 slots, PHASE[2] is used on 300 slots, PHASE[3] is used on 300 slots, and PHASE[4] is used on 300 slots. This is due to the fact that any bias in phase usage causes great influence to be exerted by the more frequently used phase, and that the reception device is dependent on such influence for data reception quality.

Similarly, for the above-described 700 slots needed to transmit the 6000 bits making up a single coded block when the modulation scheme is 16-QAM, PHASE[0] is used on 150 slots, PHASE[1] is used on 150 slots, PHASE[2] is used on 150 slots, PHASE[3] is used on 150 slots, and PHASE[4] is used on 150 slots.

Furthermore, for the above-described 500 slots needed to transmit the 6000 bits making up a single coded block when the modulation scheme is 64-QAM, PHASE[0] is used on 100 slots, PHASE[1] is used on 100 slots, PHASE[2] is used on 100 slots, PHASE[3] is used on 100 slots, and PHASE[4] is used on 100 slots.

As described above, a scheme for a regular change of phase requires the preparation of N phase changing values (or phase changing sets) (where the N different phases are expressed as PHASE[0], PHASE[1], PHASE[2], . . . , PHASE[N−2], PHASE[N−1]). As such, in order to transmit all of the bits making up a single coded block, PHASE[0] is used on $K_0$ slots, PHASE[1] is used on $K_1$ slots, PHASE[i] is used on $K_i$ slots (where i=0, 1, 2, . . . , N−1 (i denotes an integer that satisfies 0≤i≤N−1)), and PHASE[N−1] is used on $K_{N-1}$ slots, such that Condition #A01 is met.

(Condition #A01)

$K_0=K_1 \ldots =K_i= \ldots K_{N-1}$. That is, $K_a=K_b$ (∀a and ∀b where a, b, =0, 1, 2, . . . , N−1 (a denotes an integer that satisfies 0≤a≤N−1, b denotes an integer that satisfies 0≤b≤N−1), a≠b).

Then, when a communication system that supports multiple modulation schemes selects one such supported modulation scheme for use, Condition #A01 is preferably satisfied for the supported modulation scheme.

However, when multiple modulation schemes are supported, each such modulation scheme typically uses symbols transmitting a different number of bits per symbols (though some may happen to use the same number), Condition #A01 may not be satisfied for some modulation schemes. In such a case, the following condition applies instead of Condition #A01.

(Condition #A02)

The difference between $K_a$ and $K_b$ satisfies 0 or 1. That is, $|K_a-K_b|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b)

Figure 35:
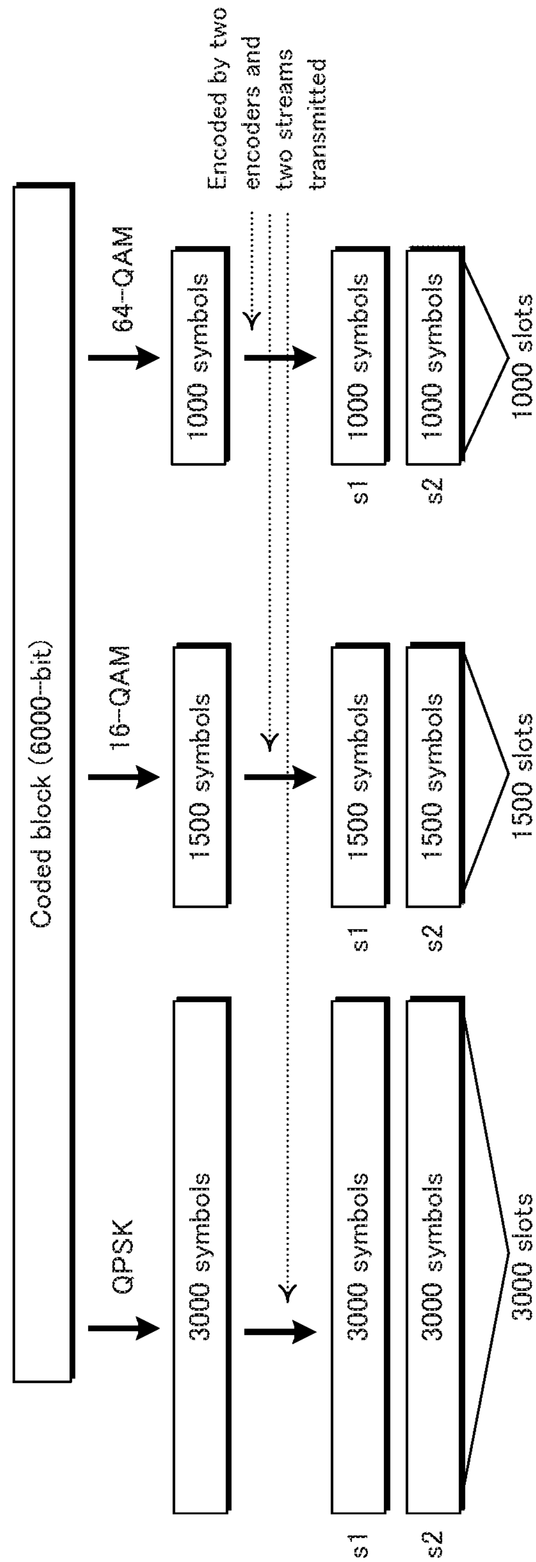
FIG. 35 illustrates variation in numbers of symbols and slots needed per pair of coded blocks when block codes are used.

FIG. 35 illustrates the varying numbers of symbols and slots needed in two coded blocks when block codes are used. FIG. 35 illustrates the varying numbers of symbols and slots needed in each coded block when block codes are used when, for example, two streams s1 and s2 are transmitted as indicated by the transmission device from FIG. 3 and FIG. 12, and the transmission device has two encoders. (Here, the transmission scheme may be any single-carrier scheme or multi-carrier scheme such as OFDM.)

As shown in FIG. 35, when block codes are used, there are 6000 bits making up a single coded block. In order to transmit these 6000 bits, the number of required symbols depends on the modulation scheme, being 3000 symbols for QPSK, 1500 symbols for 16-QAM, and 1000 symbols for 64-QAM.

The transmission device from FIG. 3 and the transmission device from FIG. 12 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up the two coded blocks, and when the modulation scheme is 64-QAM, 1000 slots are needed to transmit all of the bits making up the two coded blocks.

The following describes the relationship between the above-defined slots and the phase of multiplication, as pertains to schemes for a regular change of phase.

Here, five different phase changing values (or phase changing sets) are assumed as having been prepared for use in the scheme for a regular change of phase. That is, five different phase changing values (or phase changing sets) have been prepared for the phase changers of the transmission devices from FIGS. 3 and 12 (equivalent to the period (cycle) from Embodiments 1 through 4) (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform the change of phase with a period (cycle) of five in such circumstances). These five phase changing values (or phase changing sets) are expressed as PHASE[0], PHASE[1], PHASE[2], PHASE[3], and PHASE[4].

For the above-described 3000 slots needed to transmit the 6000×2 bits making up a single coded block when the modulation scheme is QPSK, PHASE[0] is used on 600 slots, PHASE[1] is used on 600 slots, PHASE[2] is used on 600 slots, PHASE[3] is used on 600 slots, and PHASE[4] is used on 600 slots. This is due to the fact that any bias in phase usage causes great influence to be exerted by the more frequently used phase, and that the reception device is dependent on such influence for data reception quality.

Furthermore, in order to transmit the first coded block, PHASE[0] is used on slots 600 times, PHASE[1] is used on slots 600 times, PHASE[2] is used on slots 600 times, PHASE[3] is used on slots 600 times, and PHASE[4] is used on slots 600 times. Furthermore, in order to transmit the second coded block, PHASE[0] is used on slots 600 times, PHASE[1] is used on slots 600 times, PHASE[2] is used on slots 600 times, PHASE[3] is used on slots 600 times, and PHASE[4] is used on slots 600 times.

Similarly, for the above-described 1500 slots needed to transmit the 6000×2 bits making up the two coded blocks when the modulation scheme is 16-QAM, PHASE[0] is used on 300 slots, PHASE[1] is used on 300 slots, PHASE[2] is used on 300 slots, PHASE[3] is used on 300 slots, and PHASE[4] is used on 300 slots.

Furthermore, in order to transmit the first coded block, PHASE[0] is used on slots 300 times, PHASE[1] is used on slots 300 times, PHASE[2] is used on slots 300 times, PHASE[3] is used on slots 300 times, and PHASE[4] is used on slots 300 times. Furthermore, in order to transmit the second coded block, PHASE[0] is used on slots 300 times, PHASE[1] is used on slots 300 times, PHASE[2] is used on slots 300 times, PHASE[3] is used on slots 300 times, and PHASE[4] is used on slots 300 times.

Similarly, for the above-described 1000 slots needed to transmit the 6000×2 bits making up the two coded blocks when the modulation scheme is 64-QAM, PHASE[0] is used on 200 slots, PHASE[1] is used on 200 slots, PHASE[2] is used on 200 slots, PHASE[3] is used on 200 slots, and PHASE[4] is used on 200 slots.

Furthermore, in order to transmit the first coded block, PHASE[0] is used on slots 200 times, PHASE[1] is used on slots 200 times, PHASE[2] is used on slots 200 times, PHASE[3] is used on slots 200 times, and PHASE[4] is used on slots 200 times. Furthermore, in order to transmit the second coded block, PHASE[0] is used on slots 200 times, PHASE[1] is used on slots 200 times, PHASE[2] is used on slots 200 times, PHASE[3] is used on slots 200 times, and PHASE[4] is used on slots 200 times.

As described above, a scheme for regularly changing the phase requires the preparation of phase changing values (or phase changing sets) expressed as PHASE[0], PHASE[1], PHASE[2], . . . , PHASE[N−2], PHASE[N−1]. As such, in order to transmit all of the bits making up two coded blocks, PHASE[0] is used on $K_0$ slots, PHASE[1] is used on $K_1$ slots, PHASE[i] is used on $K_i$ slots (where i=0, 1, 2, . . . , N−1 (i denotes an integer that satisfies 0≤i≤N−1), and PHASE[N−1] is used on $K_{N-1}$ slots, such that Condition #A03 is met.

(Condition #A03)

$K_0=K_1 \ldots == \ldots K_{N-1}$. That is, $K_a=K_b$ (∀a and ∀b where a, b, =0, 1, 2, . . . , N−1 (a denotes an integer that satisfies 0≤a≤N−1, b denotes an integer that satisfies 0≤b≤N−1), a≠b).

Further, in order to transmit all of the bits making up the first coded block, PHASE[0] is used $K_{0,1}$ times, PHASE[1] is used $K_{1,1}$ times, PHASE[i] is used $K_{i,1}$ times (where i=0, 1, 2, . . . , N−1 (i denotes an integer that satisfies 0≤i≤N−1), and PHASE[N−1] is used $K_{N-1,1}$ times, such that Condition #A04 is met.

(Condition #A04)

$K_{0,1}=K_{1,1}= \ldots K_{i,1}= \ldots K_{N-1,1}$. That is, $K_{a,1}=K_{b,1}$ (∀a and ∀b where a, b, =0, 1, 2, . . . , N−1 (a denotes an integer that satisfies 0≤a≤N−1, b denotes an integer that satisfies 0≤b≤N−1), a≠b).

Furthermore, in order to transmit all of the bits making up the second coded block, PHASE[0] is used $K_{0,2}$ times, PHASE[1] is used $K_{1,2}$ times, PHASE[i] is used $K_{i,2}$ times (where i=0, 1, 2, . . . , N−1 (i denotes an integer that satisfies 0≤i≤N−1), and PHASE[N−1] is used $K_{N-1,2}$ times, such that Condition #A05 is met.

(Condition #A05)

$K_{0,2}=K_{1,2}= \ldots K_{i,2}= \ldots K_{N-1,2}$. That is, $K_{a,2}=K_{b,2}$ (∀a and ∀b where a, b, =0, 1, 2, . . . , N−1 (a denotes an integer that satisfies 0≤a≤N−1, b denotes an integer that satisfies 0≤b≤N−1), a≠b).

Then, when a communication system that supports multiple modulation schemes selects one such supported modulation scheme for use, Condition #A03, #A04, and #A05 should preferably be met for the supported modulation scheme.

However, when multiple modulation schemes are supported, each such modulation scheme typically uses symbols transmitting a different number of bits per symbol (though some may happen to use the same number), Conditions #A03, #A04, and #A05 may not be satisfied for some modulation schemes. In such a case, the following conditions apply instead of Condition #A03, #A04, and #A05.

(Condition #A06)

The difference between $K_a$ and $K_b$ satisfies 0 or 1. That is, $|K_a-K_b|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b)

(Condition #A07)

The difference between $K_{a,1}$ and $K_{b,1}$ satisfies 0 or 1. That is, $|K_{a,1}-K_{b,1}|$ satisfies 0 or 1 (∀a, ∀b, where a, b=0, 1, 2, . . . , N−1, (a denotes an integer that satisfies 0≤a≤N−1, b denotes an integer that satisfies 0≤b≤N−1) a≠b)

(Condition #A08)

The difference between $K_{a,2}$ and $K_{b,2}$ satisfies 0 or 1. That is, $|K_{a,2}-K_{b,2}|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b)

As described above, bias among the phases being used to transmit the coded blocks is removed by creating a relationship between the coded block and the phase of multiplication. As such, data reception quality can be improved for the reception device.

In the present embodiment N phase changing values (or phase changing sets) are needed in order to perform a change of phase having a period (cycle) of N with the scheme for a regular change of phase. As such, N phase changing values (or phase changing sets) PHASE[0], PHASE[1], PHASE[2], PHASE[N−2], and PHASE[N−1] are prepared. However, schemes exist for reordering the phases in the stated order with respect to the frequency domain. No limitation is intended in this regard. The N phase changing values (or phase changing sets) may also change the phases of blocks in the time domain or in the time-frequency domain to obtain a symbol arrangement as described in Embodiment 1. Although the above examples discuss a phase changing scheme with a period (cycle) of N, the same effects are obtainable using N phase changing values (or phase changing sets) at random. That is, the N phase changing values (or phase changing sets) need not always for a regular period (cycle). As long as the above-described conditions are satisfied, great quality data reception improvements are realizable for the reception device.

Furthermore, given the existence of modes for spatial multiplexing MIMO schemes, MIMO schemes using a fixed precoding matrix, space-time block coding schemes, single-stream transmission, and schemes using a regular change of phase (the transmission schemes described in Embodiments 1 through 4), the transmission device (broadcaster, base station) may select any one of these transmission schemes.

As described in Non-Patent Literature 3, spatial multiplexing MIMO schemes involve transmitting signals s1 and s2, which are mapped using a selected modulation scheme, on each of two different antennas. As described in Embodiments 1 through 4, MIMO schemes using a fixed precoding matrix involve performing precoding only (with no change of phase). Further, space-time block coding schemes are described in Non-Patent Literature 9, 16, and 17. Single-stream transmission schemes involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO schemes, MIMO schemes using a fixed precoding matrix, space-time block coding schemes, single-stream transmission, and schemes using a regular change of phase may be used. In particular, schemes using a regular change of phase on a selected (sub-)carrier group are preferably used to realize the present embodiment.

When a change of phase is performed, then for example, a phase changing value for PHASE[i] of X radians is performed on only one precoded baseband signal, the phase changers of FIGS. 3, 4, 5, 12, 25, 29, 51, and 53 multiplies precoded baseband signal z2' by $e^{jX}$. Then, for a change of phase by, for example, a phase changing set for PHASE[i] of X radians and Y radians is performed on both precoded baseband signals, the phase changers from FIGS. 26, 27, 28, 52, and 54 multiplies precoded baseband signal z2' by $e^{jX}$ and multiplies precoded baseband signal z1' by $e^{jY}$.

Embodiment B1

The following describes a sample configuration of an application of the transmission schemes and reception schemes discussed in the above embodiments and a system using the application.

Figure 36:
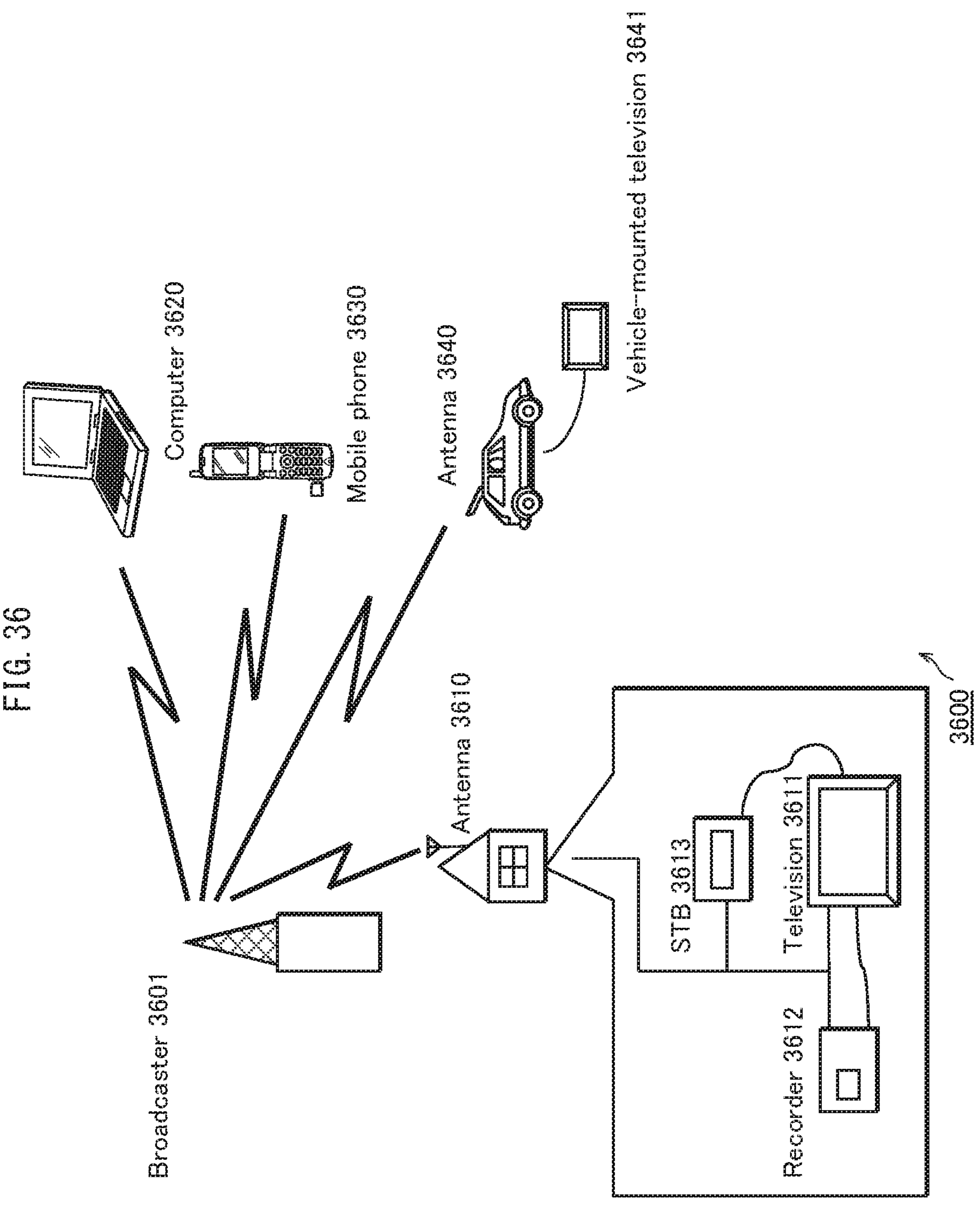
FIG. 36 illustrates an overall configuration of a digital broadcasting system.

FIG. 36 illustrates the configuration of a system that includes devices executing transmission schemes and reception schemes described in the above Embodiments. As shown in FIG. 36, the devices executing transmission schemes and reception schemes described in the above Embodiments include various receivers such as a broadcaster, a television 3611, a DVD recorder 3612, a STB (set-top box) 3613, a computer 3620, a vehicle-mounted television 3641, a mobile phone 3630 and so on within a digital broadcasting system 3600. Specifically, the broadcaster 3601 uses a transmission scheme discussed in the above-described Embodiments to transmit multiplexed data, in which video, audio, and other data are multiplexed, over a predetermined transmission band.

The signals transmitted by the broadcaster 3601 are received by an antenna (such as antenna 3660 or 3640) embedded within or externally connected to each of the receivers. Each receiver obtains the multiplexed data by using reception schemes discussed in the above-described Embodiments to demodulate the signals received by the antenna. Accordingly, the digital broadcasting system 3600 is able to realize the effects of the present invention, as discussed in the above-described Embodiments.

The video data included in the multiplexed data are coded with a video coding method compliant with a standard such as MPEG-2 (Moving Picture Experts Group), MPEG4-AVC (Advanced Video Coding), VC-1, or the like. The audio data included in the multiplexed data are encoded with an audio coding method compliant with a standard such as Dolby AC-3 (Audio Coding), Dolby Digital Plus, MLP (Meridian Lossless Packing), DTS (Digital Theater Systems), DTS-HD, PCM (Pulse-Code Modulation), or the like.

Figure 37:
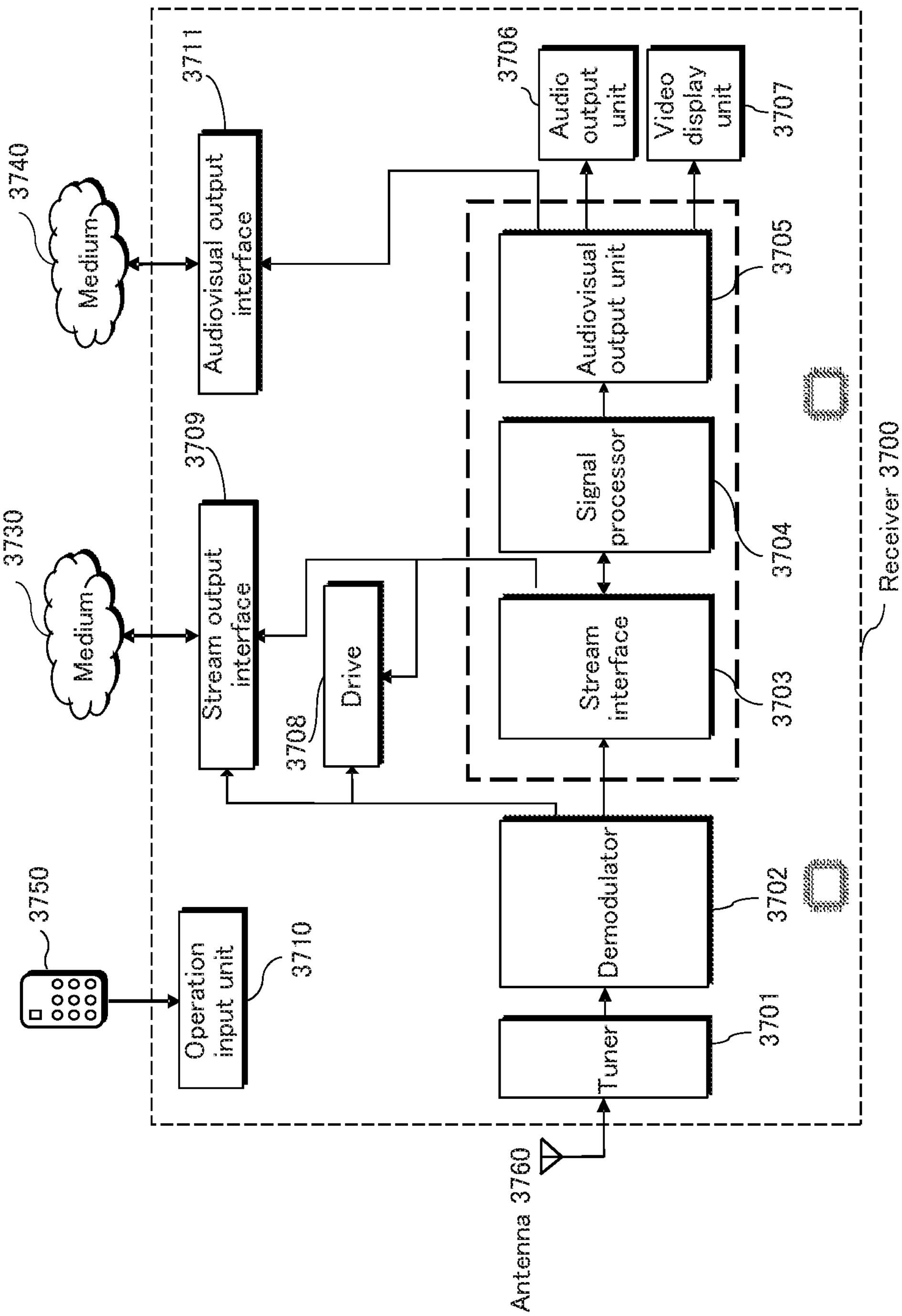
FIG. 37 is a block diagram illustrating a sample receiver.

FIG. 37 illustrates the configuration of a receiver 7900 that executes a reception scheme described in the above-described Embodiments. The receiver 3700 corresponds to a receiver included in one of the television 3611, the DVD recorder 3612, the STB 3613, the computer 3620, the vehicle-mounted television 3641, the mobile phone 3630 and so on from FIG. 36. The receiver 3700 includes a tuner 3701 converting a high-frequency signal received by an antenna 3760 into a baseband signal, and a demodulator 3702 demodulating the baseband signal so converted to obtain the multiplexed data. The demodulator 3702 executes a reception scheme discussed in the above-described Embodiments, and thus achieves the effects of the present invention as explained above.

The receiver 3700 further includes a stream interface 3720 that demultiplexes the audio and video data in the multiplexed data obtained by the demodulator 3702, a signal processor 3704 that decodes the video data obtained from the demultiplexed video data into a video signal by applying a video decoding method corresponding thereto and decodes the audio data obtained from the demultiplexed audio data into an audio signal by applying an audio decoding method corresponding thereto, an audio output unit 3706 that outputs the decoded audio signal through a speaker or the like, and a video display unit 3707 that outputs the decoded video signal on a display or the like.

When, for example, a user uses a remote control 3750, information for a selected channel (selected (television) program or audio broadcast) is transmitted to an operation input unit 3710. Then, the receiver 3700 performs processing on the received signal received by the antenna 3760 that includes demodulating the signal corresponding to the selected channel, performing error-correcting decoding, and so on, in order to obtain the received data. At this point, the receiver 3700 obtains control symbol information that includes information on the transmission scheme (the transmission scheme, modulation scheme, error-correction scheme, and so on from the above-described Embodiments) (as described using FIGS. 5 and 41) from control symbols included the signal corresponding to the selected channel. As such, the receiver 3700 is able to correctly set the reception operations, demodulation scheme, error-correction scheme and so on, thus enabling the data included in the data symbols transmitted by the broadcaster (base station) to be obtained. Although the above description is given for an example of the user using the remote control 3750, the same operations apply when the user presses a selection key embedded in the receiver 3700 to select a channel.

According to this configuration, the user is able to view programs received by the receiver 3700.

The receiver 3700 pertaining to the present embodiment further includes a drive 3708 that may be a magnetic disk, an optical disc, a non-volatile semiconductor memory, or a similar recording medium. The receiver 3700 stores data included in the demultiplexed data obtained through demodulation by the demodulator 3702 and error-correcting decoding (in some circumstances, the data obtained through demodulation by the demodulator 3702 may not be subject to error correction. Also, the receiver 3700 may perform further processing after error correction. The same hereinafter applies to similar statements concerning other components), data corresponding to such data (e.g., data obtained through compression of such data), data obtained through audio and video processing, and so on, on the drive 3708. Here, an optical disc is a recording medium, such as DVD (Digital Versatile Disc) or BD (Blu-ray Disc), that is readable and writable with the use of a laser beam. A magnetic disk is a floppy disk, a hard disk, or similar recording medium on which information is storable through the use of magnetic flux to magnetize a magnetic body. A non-volatile semiconductor memory is a recording medium, such as flash memory or ferroelectric random access memory, composed of semiconductor element(s). Specific examples of non-volatile semiconductor memory include an SD card using flash memory and a Flash SSD (Solid State Drive). Naturally, the specific types of recording media mentioned herein are merely examples. Other types of recording mediums may also be used.

According to this structure, the user is able to record and store programs received by the receiver 3700, and is thereby able to view programs at any given time after broadcasting by reading out the recorded data thereof.

Although the above explanations describe the receiver 3700 storing multiplexed data obtained through demodulation by the demodulator 3702 and error-correcting decoding on the drive 3708, a portion of the data included in the multiplexed data may instead be extracted and recorded. For example, when data broadcasting services or similar content is included along with the audio and video data in the multiplexed data obtained through demodulation by the demodulator 3702 and error-correcting decoding, the audio and video data may be extracted from the multiplexed data demodulated by the demodulator 3702 and stored as new multiplexed data. Furthermore, the drive 3708 may store either the audio data or the video data included in the multiplexed data obtained through demodulation by the demodulator 3702 and error-correcting decoding as new multiplexed data. The aforementioned data broadcasting service content included in the multiplexed data may also be stored on the drive 3708.

Furthermore, when a television, recording device (e.g., a DVD recorder, BD recorder HDD recorder, SD card, or similar), or mobile phone incorporating the receiver 3700 of the present invention receives multiplexed data obtained through demodulation by the demodulator 3702 and error-correcting decoding that includes data for correcting bugs in software used to operate the television or recording device, for correcting bugs in software for preventing personal information and recorded data from being leaked, and so on, such software bugs may be corrected by installing the data on the television or recording device. As such, bugs in the receiver 3700 are corrected through the inclusion of data for correcting bugs in the software of the receiver 3700. Accordingly, the television, recording device, or mobile phone incorporating the receiver 3700 may be made to operate more reliably.

Here, the process of extracting a portion of the data included in the multiplexed data obtained through demodulation by the demodulator 3702 and error-correcting decoding is performed by, for example, the stream interface 3703. Specifically, the stream interface 3703, demultiplexes the various data included in the multiplexed data demodulated by the demodulator 3702, such as audio data, video data, data broadcasting service content, and so on, as instructed by a non-diagrammed controller such as a CPU. The stream interface 3703 then extracts and multiplexes only the indicated demultiplexed data, thus generating new multiplexed data. The data to be extracted from the demultiplexed data may be determined by the user or may be determined in advance according to the type of recording medium.

According to such a structure, the receiver 3700 is able to extract and record only the data needed in order to view the recorded program. As such, the amount of data to be recorded can be reduced.

Although the above explanation describes the drive 3708 as storing multiplexed data obtained through demodulation by the demodulator 3702 and error-correcting decoding, the video data included in the multiplexed data so obtained may be converted by using a different video coding method than the original video coding method applied thereto, so as to reduce the amount of data or the bit rate thereof. The drive 3708 may then store the converted video data as new multiplexed data. Here, the video coding method used to generate the new video data may conform to a different standard than that used to generate the original video data. Alternatively, the same video coding method may be used with different parameters. Similarly, the audio data included in the multiplexed data obtained through demodulation by the demodulator 3702 and error-correcting decoding may be converted by using a different audio coding method than the original audio coding method applied thereto, so as to reduce the amount of data or the bit rate thereof. The drive 3708 may then store the converted audio data as new multiplexed data.

Here, the process by which the audio or video data included in the multiplexed data obtained through demodulation by the demodulator 3702 and error-correcting decoding is converted so as to reduce the amount of data or the bit rate thereof is performed by, for example, the stream interface 3703 or the signal processor 3704. Specifically, the stream interface 3703 demultiplexes the various data included in the multiplexed data demodulated by the demodulator 3702, such as audio data, video data, data broadcasting service content, and so on, as instructed by an undiagrammed controller such as a CPU. The signal processor 3704 then performs processing to convert the video data so demultiplexed by using a different video coding method than the original video coding method applied thereto, and performs processing to convert the audio data so demultiplexed by using a different video coding method than the original audio coding method applied thereto. As instructed by the controller, the stream interface 3703 then multiplexes the converted audio and video data, thus generating new multiplexed data. The signal processor 3704 may, in accordance with instructions from the controller, performing conversion processing on either the video data or the audio data, alone, or may perform conversion processing on both types of data. In addition, the amounts of video data and audio data or the bit rate thereof to be obtained by conversion may be specified by the user or determined in advance according to the type of recording medium.

According to such a structure, the receiver 3700 is able to modify the amount of data or the bitrate of the audio and video data for storage according to the data storage capacity of the recording medium, or according to the data reading or writing speed of the drive 3708. Therefore, programs can be stored on the drive despite the storage capacity of the recording medium being less than the amount of multiplexed data obtained through demodulation by the demodulator 3702 and error-correcting decoding, or the data reading or writing speed of the drive being lower than the bit rate of the demultiplexed data obtained through demodulation by the demodulator 3702. As such, the user is able to view programs at any given time after broadcasting by reading out the recorded data.

The receiver 3700 further includes a stream output interface 3709 that transmits the multiplexed data demultiplexed by the demodulator 3702 to external devices through a communications medium 3730. The stream output interface 3709 may be, for example, a wireless communication device transmitting modulated multiplexed data to an external device using a wireless transmission scheme conforming to a wireless communication standard such as Wi-Fi™ (IEEE 802.11a, IEEE 802.11b, IEEE 802.11g, IEEE 802.11n, and so on), WiGig, WirelessHD, Bluetooth, ZigBee, and so on through a wireless medium (corresponding to the communications medium 3730). The stream output interface 3709 may also be a wired communication device transmitting modulated multiplexed data to an external device using a communication scheme conforming to a wired communication standard such as Ethernet™, USB (Universal Serial Bus), PLC (Power Line Communication), HDMI (High-Definition Multimedia Interface) and so on through a wired transmission path (corresponding to the communications medium 3730) connected to the stream output interface 3709.

According to this configuration, the user is able to use an external device with the multiplexed data received by the receiver 3700 using the reception scheme described in the above-described Embodiments. The usage of multiplexed data by the user here includes use of the multiplexed data for real-time viewing on an external device, recording of the multiplexed data by a recording unit included in an external device, and transmission of the multiplexed data from an external device to a yet another external device.

Although the above explanations describe the receiver 3700 outputting multiplexed data obtained through demodulation by the demodulator 3702 and error-correcting decoding through the stream output interface 3709, a portion of the data included in the multiplexed data may instead be extracted and output. For example, when data broadcasting services or similar content is included along with the audio and video data in the multiplexed data obtained through demodulation by the demodulator 3702 and error-correcting decoding, the audio and video data may be extracted from the multiplexed data obtained through demodulation by the demodulator 3702 and error-correcting decoding, multiplexed and output by the stream output interface 3709 as new multiplexed data. In addition, the stream output interface 3709 may store either the audio data or the video data included in the multiplexed data obtained through demodulation by the demodulator 3702 and error-correcting decoding as new multiplexed data.

Here, the process of extracting a portion of the data included in the multiplexed data obtained through demodulation by the demodulator 3702 and error-correcting decoding is performed by, for example, the stream interface 3703. Specifically, the stream interface 3703 demultiplexes the various data included in the multiplexed data demodulated by the demodulator 3702, such as audio data, video data, data broadcasting service content, and so on, as instructed by an undiagrammed controller such as a CPU. The stream interface 3703 then extracts and multiplexes only the indicated demultiplexed data, thus generating new multiplexed data. The data to be extracted from the demultiplexed data may be determined by the user or may be determined in advance according to the type of stream output interface 3709.

According to this structure, the receiver 3700 is able to extract and output only the required data to an external device. As such, fewer multiplexed data are output using less communication band.

Although the above explanation describes the stream output interface 3709 as outputting multiplexed data obtained through demodulation by the demodulator 3702 and error-correcting decoding, the video data included in the multiplexed data so obtained may be converted by using a different video coding method than the original video coding method applied thereto, so as to reduce the amount of data or the bit rate thereof. The stream output interface 3709 may then output the converted video data as new multiplexed data. Here, the video coding method used to generate the new video data may conform to a different standard than that used to generate the original video data. Alternatively, the same video coding method may be used with different parameters. Similarly, the audio data included in the multiplexed data obtained through demodulation by the demodulator 3702 and error-correcting decoding may be converted by using a different audio coding method than the original audio coding method applied thereto, so as to reduce the amount of data or the bit rate thereof. The stream output interface 3709 may then output the converted audio data as new multiplexed data.

Here, the process by which the audio or video data included in the multiplexed data obtained through demodulation by the demodulator 3702 and error-correcting decoding is converted so as to reduce the amount of data or the bit rate thereof is performed by, for example, the stream interface 3703 or the signal processor 3704. Specifically, the stream interface 3703 demultiplexes the various data included in the multiplexed data demodulated by the demodulator 3702, such as audio data, video data, data broadcasting service content, and so on, as instructed by an undiagrammed controller. The signal processor 3704 then performs processing to convert the video data so demultiplexed by using a different video coding method than the original video coding method applied thereto, and performs processing to convert the audio data so demultiplexed by using a different video coding method than the original audio coding method applied thereto. As instructed by the controller, the stream interface 3703 then multiplexes the converted audio and video data, thus generating new multiplexed data. The signal processor 3704 may, in accordance with instructions from the controller, performing conversion processing on either the video data or the audio data, alone, or may perform conversion processing on both types of data. In addition, the amounts of video data and audio data or the bit rate thereof to be obtained by conversion may be specified by the user or determined in advance according to the type of stream output interface 3709.

According to this structure, the receiver 3700 is able to modify the bit rate of the video and audio data for output according to the speed of communication with the external device. Thus, despite the speed of communication with an external device being slower than the bit rate of the multiplexed data obtained through demodulation by the demodulator 3702 and error-correcting decoding, by outputting new multiplexed data from the stream output interface to the external device, the user is able to use the new multiplexed data with other communication devices.

The receiver 3700 further includes an audiovisual output interface 3711 that outputs audio and video signals decoded by the signal processor 3704 to the external device through an external communications medium. The audiovisual output interface 3711 may be, for example, a wireless communication device transmitting modulated audiovisual data to an external device using a wireless transmission scheme conforming to a wireless communication standard such as Wi-Fi™ (IEEE 802.11a, IEEE 802.11b, IEEE 802.11g, IEEE 802.11n, and so on), WiGig, WirelessHD, Bluetooth, ZigBee, and so on through a wireless medium. The stream output interface 3709 may also be a wired communication device transmitting modulated audiovisual data to an external device using a communication scheme conforming to a wired communication standard such as Ethernet™, USB, PLC, HDMI, and so on through a wired transmission path connected to the stream output interface 3709. Furthermore, the stream output interface 3709 may be a terminal for connecting a cable that outputs analogue audio signals and video signals as-is.

According to such a structure, the user is able to use the audio signals and video signals decoded by the signal processor 3704 with an external device.

Further, the receiver 3700 includes an operation input unit 3710 that receives user operations as input. The receiver 3700 behaves in accordance with control signals input by the operation input unit 3710 according to user operations, such as by switching the power supply ON or OFF, changing the channel being received, switching subtitle display ON or OFF, switching between languages, changing the volume output by the audio output unit 3706, and various other operations, including modifying the settings for receivable channels and the like.

The receiver 3700 may further include functionality for displaying an antenna level representing the received signal quality while the receiver 3700 is receiving a signal. The antenna level may be, for example, a index displaying the received signal quality calculated according to the RSSI (Received Signal Strength Indicator), the received signal magnetic field strength, the C/N (carrier-to-noise) ratio, the BER, the packet error rate, the frame error rate, the channel state information, and so on, received by the receiver 3700 and indicating the level and the quality of a received signal. In such circumstances, the demodulator 3702 includes a signal quality calibrator that measures the RSSI, the received signal magnetic field strength, the C/N ratio, the BER, the packet error rate, the frame error rate, the channel state information, and so on. In response to user operations, the receiver 3700 displays the antenna level (signal level, signal quality) in a user-recognizable format on the video display unit 3707. The display format for the antenna level (signal level, signal quality) may be a numerical value displayed according to the RSSI, the received signal magnetic field strength, the C/N ratio, the BER, the packet error rate, the frame error rate, the channel state information, and so on, or may be an image display that varies according to the RSSI, the received signal magnetic field strength, the C/N ratio, the BER, the packet error rate, the frame error rate, the channel state information, and so on. The receiver 3700 may display multiple antenna level (signal level, signal quality) calculated for each stream s1, s2, and so on demultiplexed using the reception scheme discussed in the above-described Embodiments, or may display a single antenna level (signal level, signal quality) calculated for all such streams. When the video data and audio data composing a program are transmitted hierarchically, the signal level (signal quality) may also be displayed for each hierarchical level.

According to the above structure, the user is given an understanding of the antenna level (signal level, signal quality) numerically or visually during reception using the reception schemes discussed in the above-described Embodiments.

Although the above example describes the receiver 3700 as including the audio output unit 3706, the video display unit 3707, the drive 3708, the stream output interface 3709, and the audiovisual output interface 3711, all of these components are not strictly necessary. As long as the receiver 3700 includes at least one of the above-described components, the user is able to use the multiplexed data obtained through demodulation by the demodulator 3702 and error-correcting decoding. Any receiver may be freely combined with the above-described components according to the usage scheme.

(Multiplexed Data)

The following is a detailed description of a sample configuration of multiplexed data. The data configuration typically used in broadcasting is an MPEG-2 transport stream (TS). Therefore the following description describes an example related to MPEG2-TS. However, the data configuration of the multiplexed data transmitted by the transmission and reception schemes discussed in the above-described Embodiments is not limited to MPEG2-TS. The advantageous effects of the above-described Embodiments are also achievable using any other data structure.

Figure 38:
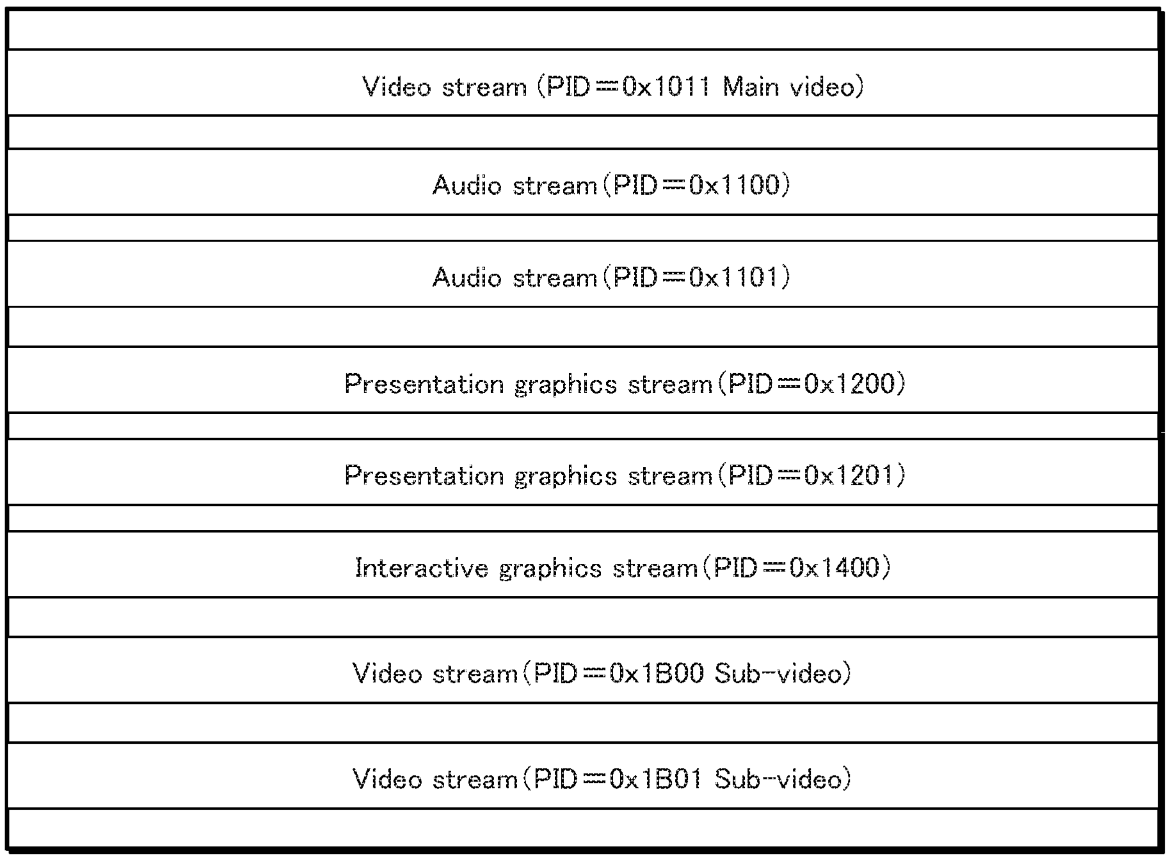
FIG. 38 illustrates multiplexed data configuration.

FIG. 38 illustrates a sample configuration for multiplexed data. As shown, the multiplexed data are elements making up programmes (or events, being a portion thereof) currently provided by various services. For example, one or more video streams, audio streams, presentation graphics (PG) streams, interactive graphics (IG) streams, and other such element streams are multiplexed to obtain the multiplexed data. When a broadcast program provided by the multiplexed data is a movie, the video streams represent main video and sub video of the movie, the audio streams represent main audio of the movie and sub-audio to be mixed with the main audio, and the presentation graphics streams represent subtitles for the movie. Main video refers to video images normally presented on a screen, whereas sub-video refers to video images (for example, images of text explaining the outline of the movie) to be presented in a small window inserted within the video images. The interactive graphics streams represent an interactive display made up of GUI (Graphical User Interface) components presented on a screen.

Each stream included in the multiplexed data is identified by an identifier, termed a PID, uniquely assigned to the stream. For example, PID 0x1011 is assigned to the video stream used for the main video of the movie, PIDs 0x1100 through 0x111F are assigned to the audio streams, PIDs 0x1200 through 0x121F are assigned to the presentation graphics, PIDs 0x1400 through 0x141F are assigned to the interactive graphics, PIDs 0x1B00 through 0x1B1F are assigned to the video streams used for the sub-video of the movie, and PIDs 0x1A00 through 0x1A1F are assigned to the audio streams used as sub-audio to be mixed with the main audio of the movie.

Figure 39:
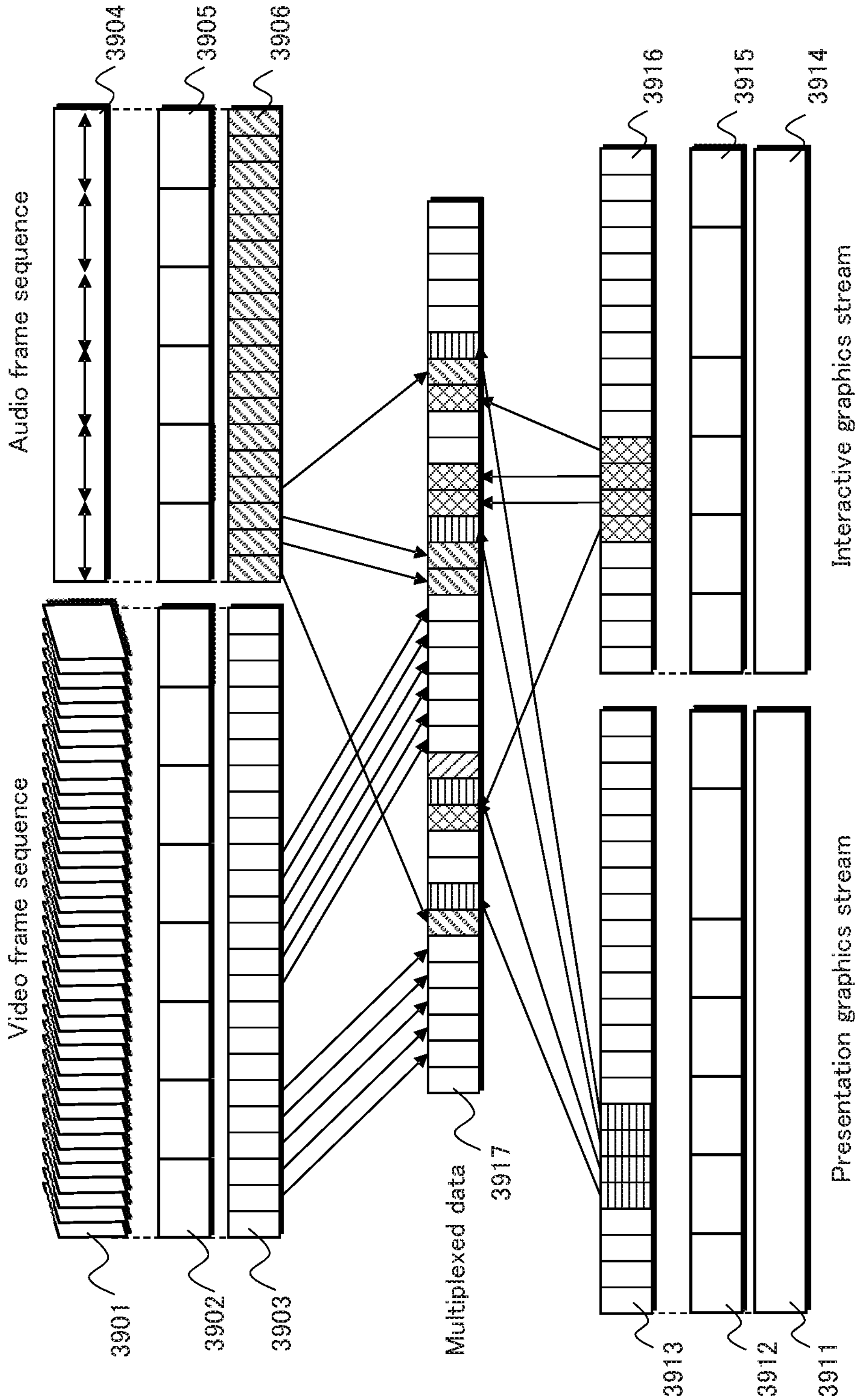
FIG. 39 is a schematic diagram illustrating multiplexing of encoded data into streams.

FIG. 39 is a schematic diagram illustrating an example of the multiplexed data being multiplexed. First, a video stream 3901, made up of a plurality of frames, and an audio stream 3904, made up of a plurality of audio frames, are respectively converted into PES packet sequence 3902 and 3905, then further converted into TS packets 3903 and 3906. Similarly, a presentation graphics stream 3911 and an interactive graphics stream 3914 are respectively converted into PES packet sequence 3912 and 3915, then further converted into TS packets 3913 and 3916. The multiplexed data 3917 is made up of the TS packets 3903, 3906, 3913, and 3916 multiplexed into a single stream.

Figure 40:
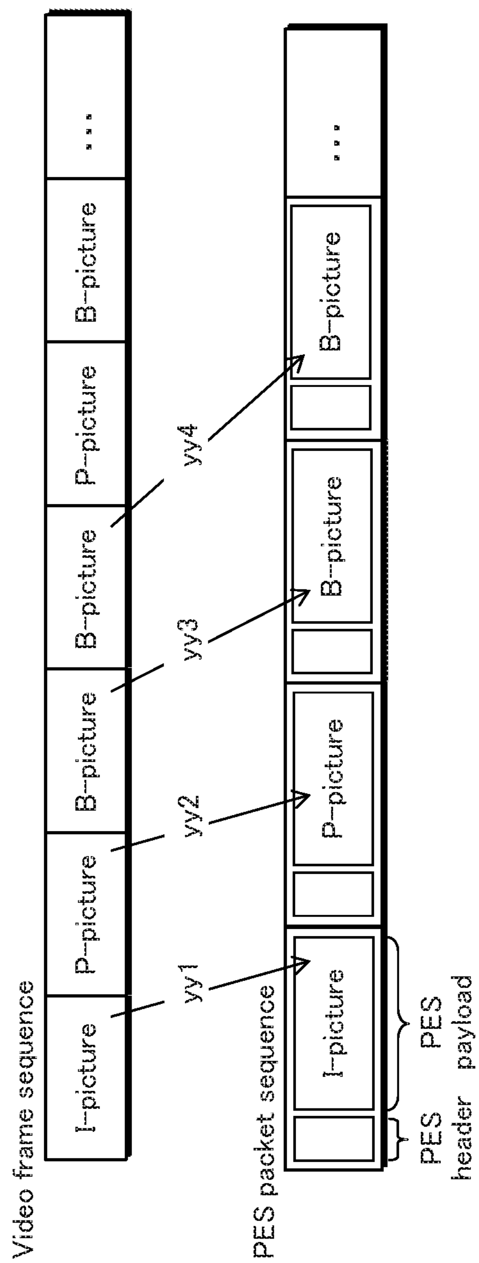
FIG. 40 is a detailed diagram illustrating a video stream as contained in a PES packet sequence.

FIG. 40 illustrates further details of a PES packet sequence as contained in the video stream. The first tier of FIG. 40 shows a video frame sequence in the video stream. The second tier shows a PES packet sequence. Arrows yy1, yy2, yy3, and yy4 indicate the plurality of Video Presentation Units, which are I-pictures, B-pictures, and P-pictures, in the video stream as divided and individually stored as the payload of a PES packet. Each PES packet has a PES header. A PES header contains a PTS (Presentation Time Stamp) at which the picture is to be displayed, a DTS (Decoding Time Stamp) at which the picture is to be decoded, and so on.

Figure 41:
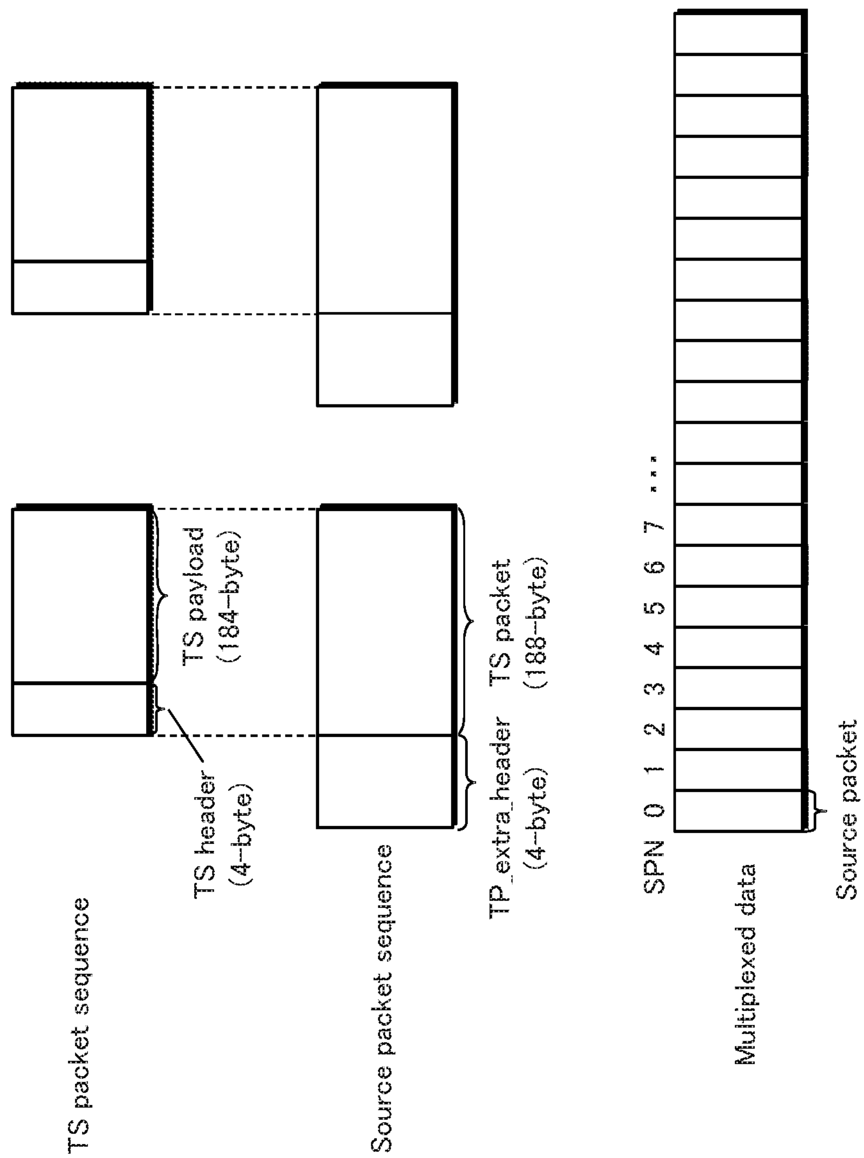
FIG. 41 is a structural diagram of TS packets and source packets in the multiplexed data.

FIG. 41 illustrates the structure of a TS packet as ultimately written into the multiplexed data. A TS packet is a 188-byte fixed-length packet made up of a 4-byte PID identifying the stream and of a 184-byte TS payload containing the data. The above-described PES packets are divided and individually stored as the TS payload. For a BD-ROM, each TS packet has a 4-byte TP_Extra_Header affixed thereto to build a 192-byte source packet, which is to be written as the multiplexed data. The TP_Extra_Header contains information such as an Arrival_Time_Stamp (ATS). The ATS indicates a time for starring transfer of the TS packet to the PID filter of a decoder. The multiplexed data are made up of source packets arranged as indicated in the bottom tier of FIG. 41. A SPN (source packet number) is incremented for each packet, beginning at the head of the multiplexed data.

In addition to the video streams, audio streams, presentation graphics streams, and the like, the TS packets included in the multiplexed data also include a PAT (Program Association Table), a PMT (Program Map Table), a PCR (Program Clock Reference) and so on. The PAT indicates the PID of a PMT used in the multiplexed data, and the PID of the PAT itself is registered as 0. The PMT includes PIDs identifying the respective streams, such as video, audio and subtitles, contained in the multiplexed data and attribute information (frame rate, aspect ratio, and the like) of the streams identified by the respective PIDs. In addition, the PMT includes various types of descriptors relating to the multiplexed data. One such descriptor may be copy control information indicating whether or not copying of the multiplexed data is permitted. The PCR includes information for synchronizing the ATC (Arrival Time Clock) serving as the chronological axis of the ATS to the STC (System Time Clock) serving as the chronological axis of the PTS and DTS. Each PCR packet includes an STC time corresponding to the ATS at which the packet is to be transferred to the decoder.

Figure 42:
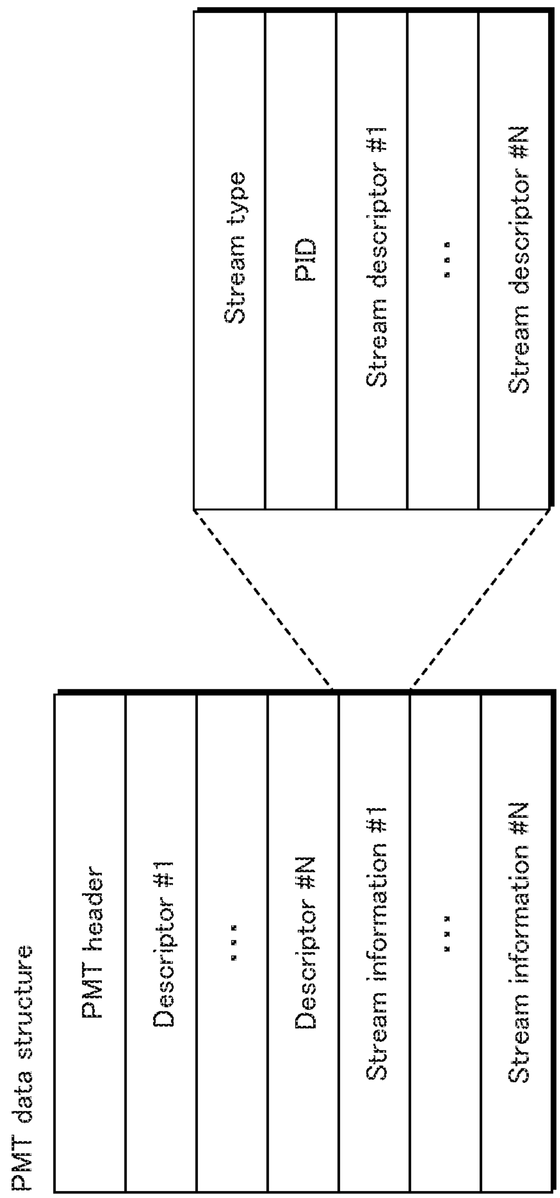
FIG. 42 illustrates PMT data configuration.

FIG. 42 illustrates the detailed data configuration of a PMT. The PMT starts with a PMT header indicating the length of the data contained in the PMT. Following the PMT header, descriptors pertaining to the multiplexed data are arranged. One example of a descriptor included in the PMT is the copy control information described above. Following the descriptors, stream information pertaining to the respective streams included in the multiplexed data is arranged. Each piece of stream information is composed of stream descriptors indicating a stream type identifying a compression codec employed for a corresponding stream, a PID for the stream, and attribute information (frame rate, aspect ratio, and the like) of the stream. The PMT includes the same number of stream descriptors as the number of streams included in the multiplexed data.

When recorded onto a recoding medium or the like, the multiplexed data are recorded along with a multiplexed data information file.

Figure 43:
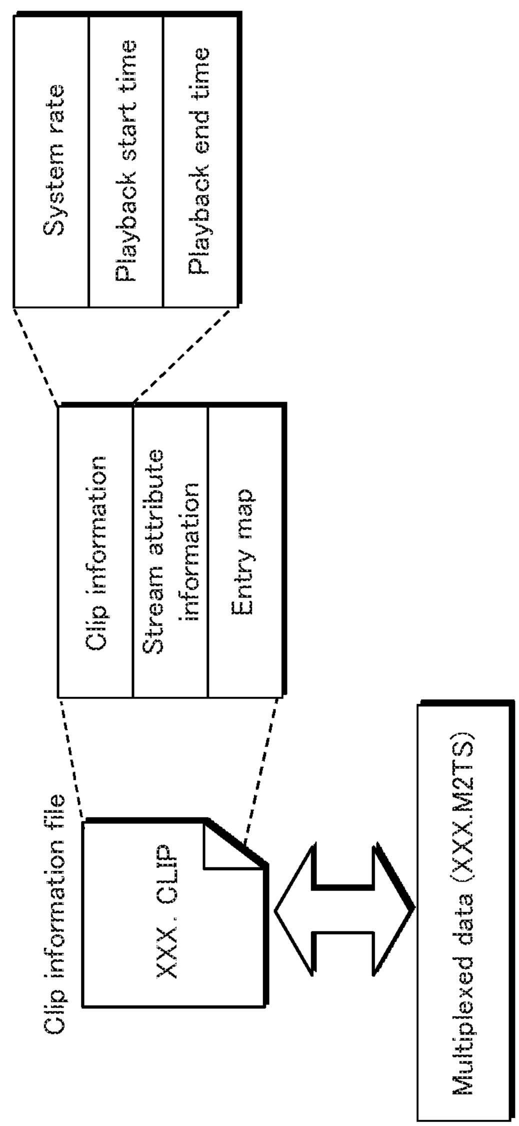
FIG. 43 illustrates information as configured in the multiplexed data.

FIG. 43 illustrates a sample configuration for the multiplexed data information file. As shown, the multiplexed data information file is management information for the multiplexed data, is provided in one-to-one correspondence with the multiplexed data, and is made up of multiplexed data information, stream attribute information, and an entry map.

The multiplexed data information is made up of a system rate, a playback start time, and a playback end time. The system rate indicates the maximum transfer rate of the multiplexed data to the PID filter of a later-described system target decoder. The multiplexed data includes ATS at an interval set so as not to exceed the system rate. The playback start time is set to the time specified by the PTS of the first video frame in the multiplexed data, whereas the playback end time is set to the time calculated by adding the playback duration of one frame to the PTS of the last video frame in the multiplexed data.

Figure 44:
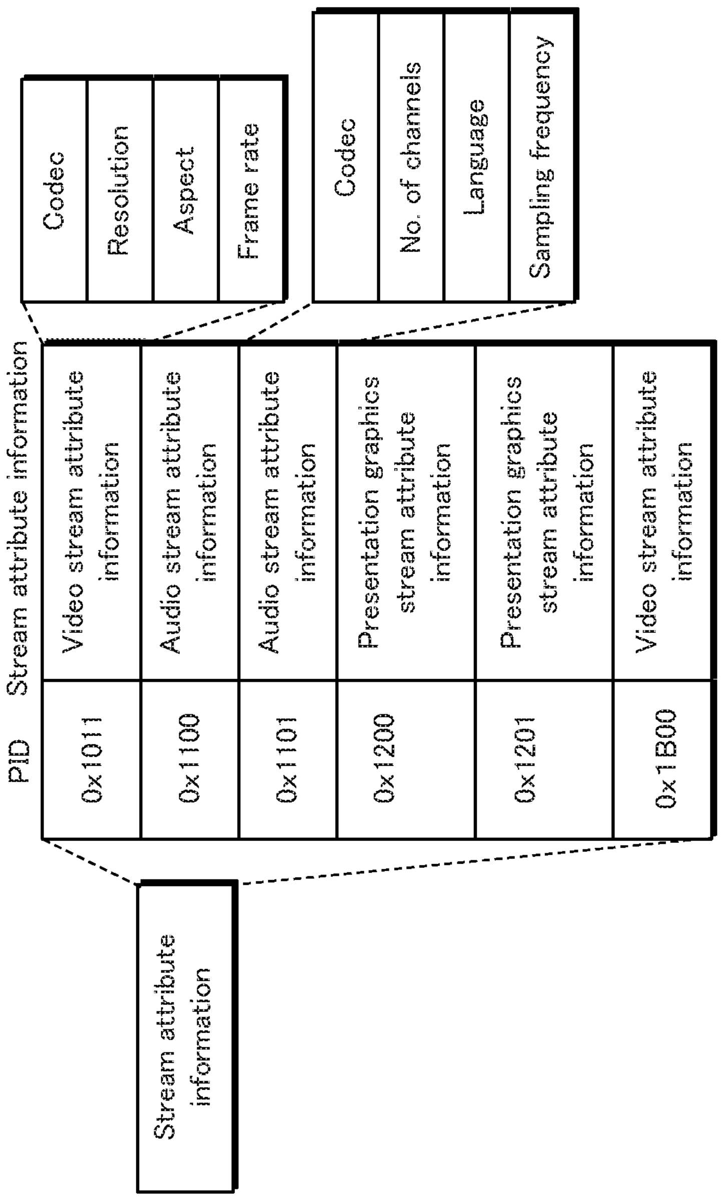
FIG. 44 illustrates the configuration of stream attribute information.

FIG. 44 illustrates a sample configuration for the stream attribute information included in the multiplexed data information file. As shown, the stream attribute information is attribute information for each stream included in the multiplexed data, registered for each PID. That is, different pieces of attribute information are provided for different streams, namely for the video streams, the audio streams, the presentation graphics streams, and the interactive graphics streams. The video stream attribute information indicates the compression codec employed to compress the video stream, the resolution of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. This information is used to initialize the decoder before playback by a player.

In the present embodiment, the stream type included in the PMT is used among the information included in the multiplexed data. When the multiplexed data are recorded on a recording medium, the video stream attribute information included in the multiplexed data information file is used. Specifically, the video coding method and device described in any of the above Embodiments may be modified to additionally include a step or unit of setting a specific piece of information in the stream type included in the PMT or in the video stream attribute information. The specific piece of information is for indicating that the video data are generated by the video coding method and device described in the Embodiment. According to such a structure, video data generated by the video coding method and device described in any of the above Embodiments is distinguishable from video data compliant with other standards.

Figure 45:
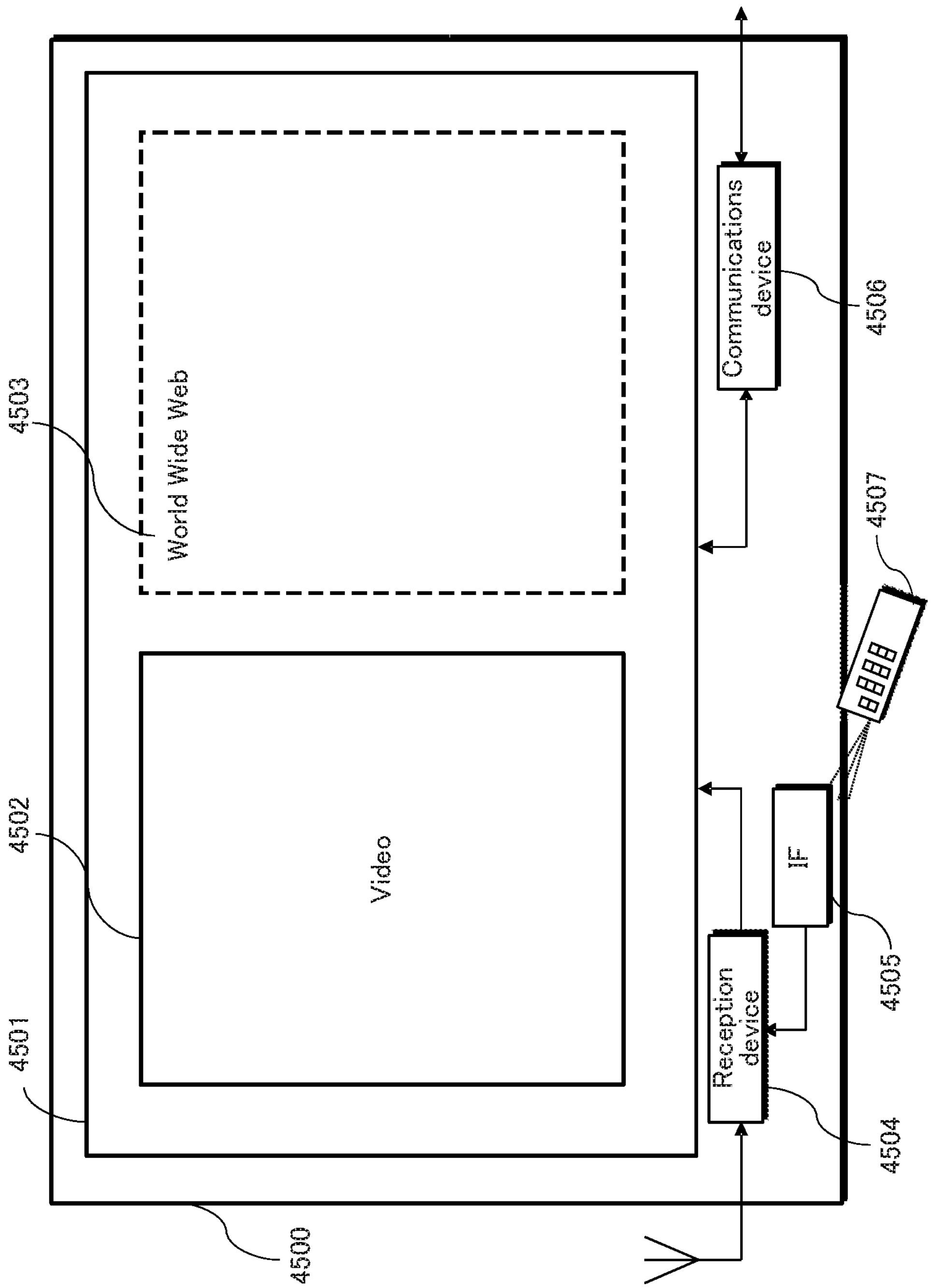
FIG. 45 illustrates the configuration of a video display and audio output device.

FIG. 45 illustrates a sample configuration of an audiovisual output device 4500 that includes a reception device 4504 receiving a modulated signal that includes audio and video data transmitted by a broadcaster (base station) or data intended for broadcasting. The configuration of the reception device 4504 corresponds to the reception device 3700 from FIG. 37. The audiovisual output device 4500 incorporates, for example, an OS (Operating System), or incorporates a communication device 4506 for connecting to the Internet (e.g., a communication device intended for a wireless LAN (Local Area Network) or for Ethernet™). As such, a video display unit 4501 is able to simultaneously display audio and video data, or video in video data for broadcast 4502, and hypertext 4503 (from the World Wide Web) provided over the Internet. By operating a remote control 4507 (alternatively, a mobile phone or keyboard), either of the video in video data for broadcast 4502 and the hypertext 4503 provided over the Internet may be selected to change operations. For example, when the hypertext 4503 provided over the Internet is selected, the website displayed may be changed by remote control operations. When audio and video data, or video in video data for broadcast 4502 is selected, information from a selected channel (selected (television) program or audio broadcast) may be transmitted by the remote control 4507. As such, an interface 4505 obtains the information transmitted by the remote control. The reception device 4504 performs processing such as demodulation and error-correction corresponding to the selected channel, thereby obtaining the received data. At this point, the reception device 4504 obtains control symbol information that includes information on the transmission scheme (as described using FIG. 5) from control symbols included the signal corresponding to the selected channel. As such, the reception device 4504 is able to correctly set the reception operations, demodulation scheme, error-correction scheme and so on, thus enabling the data included in the data symbols transmitted by the broadcaster (base station) to be obtained. Although the above description is given for an example of the user using the remote control 4507, the same operations apply when the user presses a selection key embedded in the audiovisual output device 4500 to select a channel.

In addition, the audiovisual output device 4500 may be operated using the Internet. For example, the audiovisual output device 4500 may be made to record (store) a program through another terminal connected to the Internet. (Accordingly, the audiovisual output device 4500 should include the drive 3708 from FIG. 37.) The channel is selected before recording begins. As such, the reception device 4504 performs processing such as demodulation and error-correction corresponding to the selected channel, thereby obtaining the received data. At this point, the reception device 4504 obtains control symbol information that includes information on the transmission scheme (the transmission scheme, modulation scheme, error-correction scheme, and so on from the above-described Embodiments) (as described using FIG. 5) from control symbols included the signal corresponding to the selected channel. As such, the reception device 4504 is able to correctly set the reception operations, demodulation scheme, error-correction scheme and so on, thus enabling the data included in the data symbols transmitted by the broadcaster (base station) to be obtained.

(Supplement)

The present description considers a communications/broadcasting device such as a broadcaster, a base station, an access point, a terminal, a mobile phone, or the like provided with the transmission device, and a communications device such as a television, radio, terminal, personal computer, mobile phone, access point, base station, or the like provided with the reception device. The transmission device and the reception device pertaining to the present invention are communication devices in a form able to execute applications, such as a television, radio, personal computer, mobile phone, or similar, through connection to some sort of interface (e.g., USB).

Furthermore, in the present embodiment, symbols other than data symbols, such as pilot symbols (namely preamble, unique word, postamble, reference symbols, scattered pilot symbols and so on), symbols intended for control information, and so on may be freely arranged within the frame. Although pilot symbols and symbols intended for control information are presently named, such symbols may be freely named otherwise as the function thereof remains the important consideration.

Provided that a pilot symbol, for example, is a known symbol modulated with PSK modulation in the transmitter and receiver (alternatively, the receiver may be synchronized such that the receiver knows the symbols transmitted by the transmitter), the receiver is able to use this symbol for frequency synchronization, time synchronization, channel estimation (CSI (Channel State Information) estimation for each modulated signal), signal detection, and the like.

The symbols intended for control information are symbols transmitting information (such as the modulation scheme, error-correcting coding scheme, coding rate of error-correcting codes, and setting information for the top layer used in communications) transmitted to the receiving party in order to execute transmission of non-data (i.e., applications).

The present invention is not limited to the Embodiments, but may also be realized in various other ways. For example, while the above Embodiments describe communication devices, the present invention is not limited to such devices and may be implemented as software for the corresponding communications scheme.

Although the above-described Embodiments describe phase changing schemes for schemes of transmitting two modulated signals from two antennas, no limitation is intended in this regard. Precoding and a change of phase may be performed on four signals that have been mapped to generate four modulated signals transmitted using four antennas. That is, the present invention is applicable to performing a change of phase on N signals that have been mapped and precoded to generate N modulated signals transmitted using N antennas.

Although the above-described Embodiments describe examples of systems where two modulated signals are transmitted from two antennas and received by two respective antennas in a MIMO system, the present invention is not limited in this regard and is also applicable to MISO (Multiple Input Single Output) systems. In a MISO system, the reception device does not include antenna 701_Y, wireless unit 703_Y, channel fluctuation estimator 707_1 for modulated signal z1, and channel fluctuation estimator 707_2 for modulated signal z2 from FIG. 7. However, the processing described in Embodiment 1 may still be executed to estimate r1 and r2. Technology for receiving and decoding a plurality of signals transmitted simultaneously at a common frequency are received by a single antenna is widely known. The present invention is additional processing supplementing conventional technology for a signal processor reverting a phase changed by the transmitter.

Although the present invention describes examples of systems where two modulated signals are transmitted from two antennas and received by two respective antennas in a MIMO communications system, the present invention is not limited in this regard and is also applicable to MISO systems. In a MISO system, the transmission device performs precoding and change of phase such that the points described thus far are applicable. However, the reception device does not include antenna 701_Y, wireless unit 703_Y, channel fluctuation estimator 707_1 for modulated signal z1, and channel fluctuation estimator 707_2 for modulated signal z2 from FIG. 7. However, the processing described in the present description may still be executed to estimate the data transmitted by the transmission device. Technology for receiving and decoding a plurality of signals transmitted simultaneously at a common frequency are received by a single antenna is widely known (a single-antenna receiver may apply ML operations (Max-log APP or similar)). The present invention may have the signal processor 711 from FIG. 7 perform demodulation (detection) by taking the precoding and change of phase applied by the transmitter into consideration.

The present description uses terms such as precoding, precoding weights, precoding matrix, and so on. The terminology itself may be otherwise (e.g., may be alternatively termed a codebook) as the key point of the present invention is the signal processing itself.

Furthermore, although the present description discusses examples mainly using OFDM as the transmission scheme, the invention is not limited in this manner. Multi-carrier schemes other than OFDM and single-carrier schemes may all be used to achieve similar Embodiments. Here, spread-spectrum communications may also be used. When single-carrier schemes are used, a change of phase is performed with respect to the time domain.

In addition, although the present description discusses the use of ML operations, APP, Max-log APP, ZF, MMSE and so on by the reception device, these operations may all be generalized as wave detection, demodulation, detection, estimation, and demultiplexing as the soft results (log-likelihood and log-likelihood ratio) and the hard results (zeroes and ones) obtained thereby are the individual bits of data transmitted by the transmission device.

Different data may be transmitted by each stream s1(*t*) and s2(*t*) (s1(*i*), s2(*i*)), or identical data may be transmitted thereby.

The two stream baseband signals s1(*i*) and s2(*i*) (where i indicates sequence (with respect to time or (carrier) frequency)) undergo precoding and a regular change of phase (the order of operations may be freely reversed) to generate two post-processing baseband signals z1(*i*) and z2(*i*). For post-processing baseband signal z1(*i*), the in-phase component I is $I_1$(i) while the quadrature component is $Q_1$(i), and for post processing baseband signal z2(*i*), the in-phase component is $I_1$(i) while the quadrature component is $Q_2$(i). The baseband components may be switched, as long as the following holds.

Let the in-phase component and the quadrature component of switched baseband signal r1(*i*) be $I_1$(i) and $Q_2$(i), and the in-phase component and the quadrature component of switched baseband signal r2(*i*) be $I_2$(i) and $Q_1$(i). The modulated signal corresponding to switched baseband signal r1(*i*) is transmitted by transmit antenna 1 and the modulated signal corresponding to switched baseband signal r2(*i*) is transmitted from transmit antenna 2, simultaneously on a common frequency. As such, the modulated signal corresponding to switched baseband signal r1(*i*) and the modulated signal corresponding to switched baseband signal r2(*i*) are transmitted from different antennas, simultaneously on a common frequency. Alternatively, For switched baseband signal r1(*i*), the in-phase component may be $I_1$(i) while the quadrature component may be $I_2$(i), and for switched baseband signal r2(*i*), the in-phase component may be $Q_1$(i) while the quadrature component may be $Q_2$(i).

For switched baseband signal r1(*i*), the in-phase component may be $I_2$(i) while the quadrature component may be $I_1$(i), and for switched baseband signal r2(*i*), the in-phase component may be $Q_1$(i) while the quadrature component may be $Q_2$(i).

For switched baseband signal r1(*i*), the in-phase component may be $I_1$(i) while the quadrature component may be $I_2$(i), and for switched baseband signal r2(*i*), the in-phase component may be $Q_2$(i) while the quadrature component may be $Q_1$(i).

For switched baseband signal r1(*i*), the in-phase component may be $I_2$(i) while the quadrature component may be $I_1$(i), and for switched baseband signal r2(*i*), the in-phase component may be $Q_2$(i) while the quadrature component may be $Q_1$(i).

For switched baseband signal r1(*i*), the in-phase component may be $I_1$(i) while the quadrature component may be $Q_2$(i), and for switched baseband signal r2(*i*), the in-phase component may be $Q_1$(i) while the quadrature component may be $I_2$(i).

For switched baseband signal r1(*i*), the in-phase component may be $Q_2$(i) while the quadrature component may be $I_1$(i), and for switched baseband signal r2(*i*), the in-phase component may be $I_2$(i) while the quadrature component may be $Q_1$(i).

For switched baseband signal r1(*i*), the in-phase component may be $Q_2$(i) while the quadrature component may be $I_1$(i), and for switched baseband signal r2(*i*), the in-phase component may be $Q_1$(i) while the quadrature component may be $I_2$(i).

For switched baseband signal r2(*i*), the in-phase component may be $I_1$(i) while the quadrature component may be $I_2$(i), and for switched baseband signal r1(*i*), the in-phase component may be $Q_1$(i) while the quadrature component may be $Q_2$(i).

For switched baseband signal r2(*i*), the in-phase component may be $I_2$(i) while the quadrature component may be $I_1$(i), and for switched baseband signal r1(*i*), the in-phase component may be $Q_1$(i) while the quadrature component may be $Q_2$(i).

For switched baseband signal r2(*i*), the in-phase component may be $I_1$(i) while the quadrature component may be $I_2$(i), and for switched baseband signal r1(*i*), the in-phase component may be $Q_2$(i) while the quadrature component may be $Q_1$(i).

For switched baseband signal r2(*i*), the in-phase component may be $I_2$(i) while the quadrature component may be $I_1$(i), and for switched baseband signal r1(*i*), the in-phase component may be $Q_2$(i) while the quadrature component may be $Q_1$(i).

For switched baseband signal r2(*i*), the in-phase component may be $I_1$(i) while the quadrature component may be $Q_2$(i), and for switched baseband signal r1(*i*), the in-phase component may be $I_2$(i) while the quadrature component may be $Q_1$(i).

For switched baseband signal r2(*i*), the in-phase component may be $I_1$(i) while the quadrature component may be $Q_2$(i), and for switched baseband signal r1(*i*), the in-phase component may be $Q_1$(i) while the quadrature component may be $I_2$(i).

For switched baseband signal r2(*i*), the in-phase component may be $Q_2$(i) while the quadrature component may be $I_1$(i), and for switched baseband signal r1(*i*), the in-phase component may be $I_2$(i) while the quadrature component may be $Q_1$(i).

For switched baseband signal r2(*i*), the in-phase component may be $Q_2$(i) while the quadrature component may be $I_1$(i), and for switched baseband signal r1(*i*), the in-phase component may be $Q_1$(i) while the quadrature component may be $I_2$(i).

Alternatively, although the above description discusses performing two types of signal processing on both stream signals so as to switch the in-phase component and quadrature component of the two signals, the invention is not limited in this manner. The two types of signal processing may be performed on more than two streams, so as to switch the in-phase component and quadrature component thereof.

Alternatively, although the above examples describe switching baseband signals having a common time (common (sub-)carrier) frequency), the baseband signals being switched need not necessarily have a common time. For example, any of the following are possible.

For switched baseband signal r1(*i*), the in-phase component may be $I_1$(i+v) while the quadrature component may be $Q_2$(i+w), and for switched baseband signal r2(*i*), the in-phase component may be $I_2$(i+w) while the quadrature component may be $Q_1$(i+v).

For switched baseband signal r1(*i*), the in-phase component may be $I_1$(i+v) while the quadrature component may be $I_2$(i+w), and for switched baseband signal r2(*i*), the in-phase component may be $Q_1$(i+v) while the quadrature component may be $Q_2$(i+w).

For switched baseband signal r1(*i*), the in-phase component may be $I_2$(i+w) while the quadrature component may be $I_1$(i+v), and for switched baseband signal r2(*i*), the in-phase component may be $Q_1$(i+v) while the quadrature component may be $Q_2$(i+w).

For switched baseband signal r1(*i*), the in-phase component may be $I_1$(i+v) while the quadrature component may be $I_2$(i+w), and for switched baseband signal r2(*i*), the in-phase component may be $Q_2$(i+w) while the quadrature component may be $Q_1$(i+v).

For switched baseband signal r1(*i*), the in-phase component may be $I_2$(i+w) while the quadrature component may be $I_1$(i+v), and for switched baseband signal r2(*i*), the in-phase component may be $Q_2$(i+w) while the quadrature component may be $Q_1$(i+v).

For switched baseband signal r1(*i*), the in-phase component may be $I_1$(i+v) while the quadrature component may be $Q_2$(i+w), and for switched baseband signal r2(*i*), the in-phase component may be $Q_1$(i+v) while the quadrature component may be $I_2$(i+w).

For switched baseband signal r1(*i*), the in-phase component may be $Q_2$(i+w) while the quadrature component may be $I_1$(i+v), and for switched baseband signal r2(*i*), the in-phase component may be $I_2$(i+w) while the quadrature component may be $Q_1$(i+v).

For switched baseband signal r1(*i*), the in-phase component may be $Q_2$(i+w) while the quadrature component may be $I_1$(i+v), and for switched baseband signal r2(*i*), the in-phase component may be $Q_1$(i+v) while the quadrature component may be $I_2$(i+w).

For switched baseband signal r2(*i*), the in-phase component may be $I_1$(i+v) while the quadrature component may be $I_2$(i+w), and for switched baseband signal r1(*i*), the in-phase component may be $Q_1$(i+v) while the quadrature component may be $Q_2$(i+w).

For switched baseband signal r2(*i*), the in-phase component may be $I_2$(i+w) while the quadrature component may be $I_1$(i+v), and for switched baseband signal r1(*i*), the in-phase component may be $Q_1$(i+v) while the quadrature component may be $Q_2$(i+w).

For switched baseband signal r2(*i*), the in-phase component may be $I_1$(i+v) while the quadrature component may be $I_2$(i+w), and for switched baseband signal r1(*i*), the in-phase component may be $Q_2$(i+w) while the quadrature component may be $Q_1$(i+v).

For switched baseband signal r2(*i*), the in-phase component may be $I_2$(i+w) while the quadrature component may be $I_1$(i+v), and for switched baseband signal r1(*i*), the in-phase component may be $Q_2$(i+w) while the quadrature component may be $Q_1$(i+v).

For switched baseband signal r2(*i*), the in-phase component may be $I_1$(i+v) while the quadrature component may be $Q_2$(i+w), and for switched baseband signal r1(*i*), the in-phase component may be $I_2$(i+w) while the quadrature component may be $Q_1$(i+v).

For switched baseband signal r2(*i*), the in-phase component may be $I_1$(i+v) while the quadrature component may be $Q_2$(i+w), and for switched baseband signal r1(*i*), the in-phase component may be $Q_1$(i+v) while the quadrature component may be $I_2$(i+w).

For switched baseband signal r2(*i*), the in-phase component may be $Q_2$(i+w) while the quadrature component may be $I_1$(i+v), and for switched baseband signal r1(*i*), the in-phase component may be $I_2$(i+w) while the quadrature component may be $Q_1$(i+v).

For switched baseband signal r2(*i*), the in-phase component may be $Q_2$(i+w) while the quadrature component may be $I_1$(i+v), and for switched baseband signal r1(*i*), the in-phase component may be $Q_1$(i+v) while the quadrature component may be $I_2$(i+w).

Figure 55:
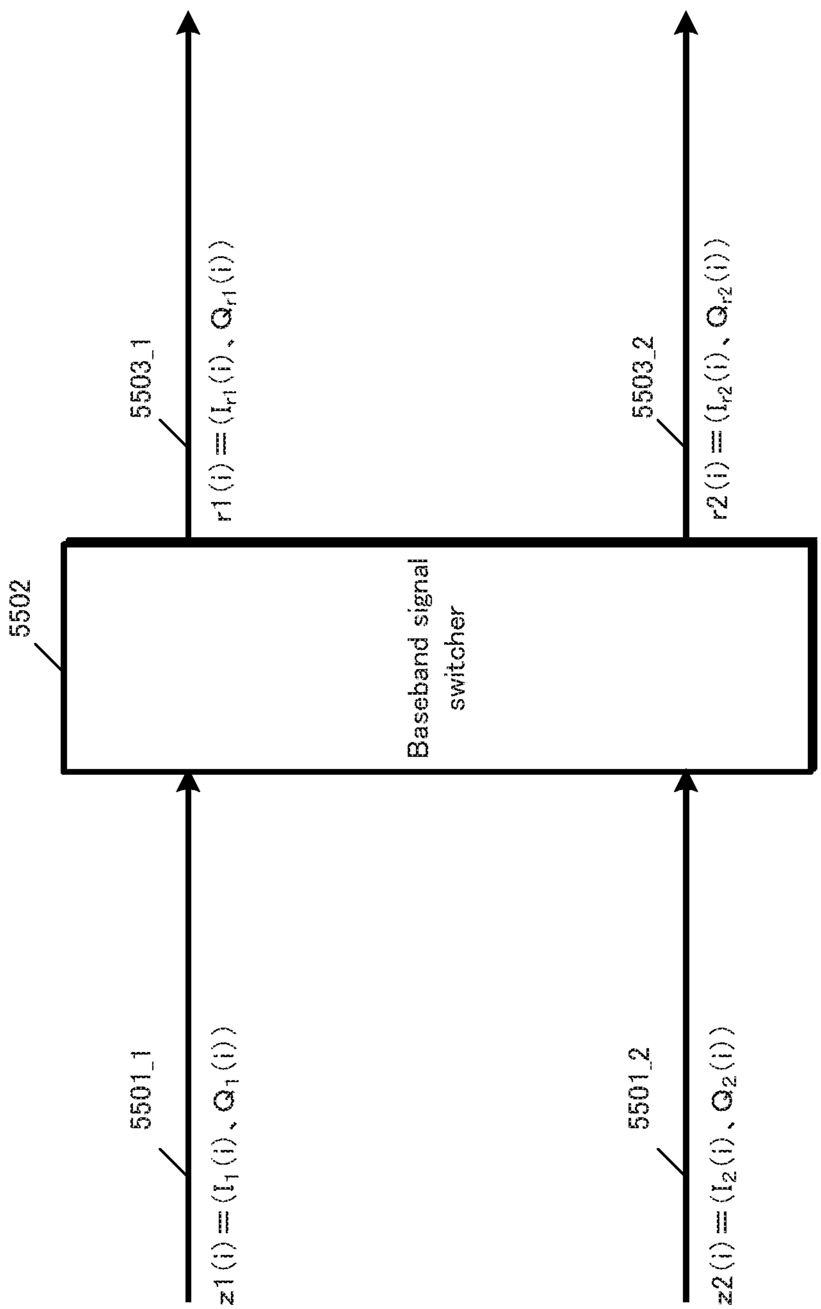
FIG. 55 illustrates a baseband signal switcher.

FIG. 55 illustrates a baseband signal switcher 5502 explaining the above. As shown, of the two processed baseband signals z1(*i*) 5501_1 and z2(*i*) 5501_2, processed baseband signal z1(*i*) 5501_1 has in-phase component $I_1$(i) and quadrature component $Q_1$(i), while processed baseband signal z2(*i*) 5501_2 has in-phase component $I_2$(i) and quadrature component $Q_2$(i). Then, after switching, switched baseband signal r1(*i*) 5503_1 has in-phase component $I_{r1}$(i) and quadrature component $Q_{r1}$(i), while switched baseband signal r2(*i*) 5503_2 has in-phase component $I_{r2}$(*i*) and quadrature component $Q_{r1}$(i). The in-phase component $I_{r1}$(i) and quadrature component $Q_{r1}$(i) of switched baseband signal r1(*i*) 5503_1 and the in-phase component $I_{r2}$(*i*) and quadrature component $Q_{r1}$(i) of switched baseband signal r2(*i*) 5503_2 may be expressed as any of the above. Although this example describes switching performed on baseband signals having a common time (common ((sub-)carrier) frequency) and having undergone two types of signal processing, the same may be applied to baseband signals having undergone two types of signal processing but having different time (different ((sub-)carrier) frequencies).

Each of the transmit antennas of the transmission device and each of the receive antennas of the reception device shown in the figures may be formed by a plurality of antennas.

The present description uses the symbol ∀, which is the universal quantifier, and the symbol ∃, which is the existential quantifier.

Furthermore, the present description uses the radian as the unit of phase in the complex plane, e.g., for the argument thereof.

When dealing with the complex plane, the coordinates of complex numbers are expressible by way of polar coordinates. For a complex number z=a+jb (where a and b are real numbers and j is the imaginary unit), the corresponding point (a, b) on the complex plane is expressed with the polar coordinates[r, θ], converted as follows:

$$a = r \times \cos\theta$$

$$b = r \times \sin\theta$$

[Math. 49]

$$r = \sqrt{a^2 + b^2} \quad \text{(formula 49)}$$

where r is the absolute value of z (r=|z|), and θ is the argument thereof. As such, z=a+jb is expressible as $re^{j\theta}$.

In the present invention, the baseband signals s1, s2, z1, and z2 are described as being complex signals. A complex signal made up of in-phase signal I and quadrature signal Q is also expressible as complex signal I+jQ. Here, either of I and Q may be equal to zero.

Figure 46:
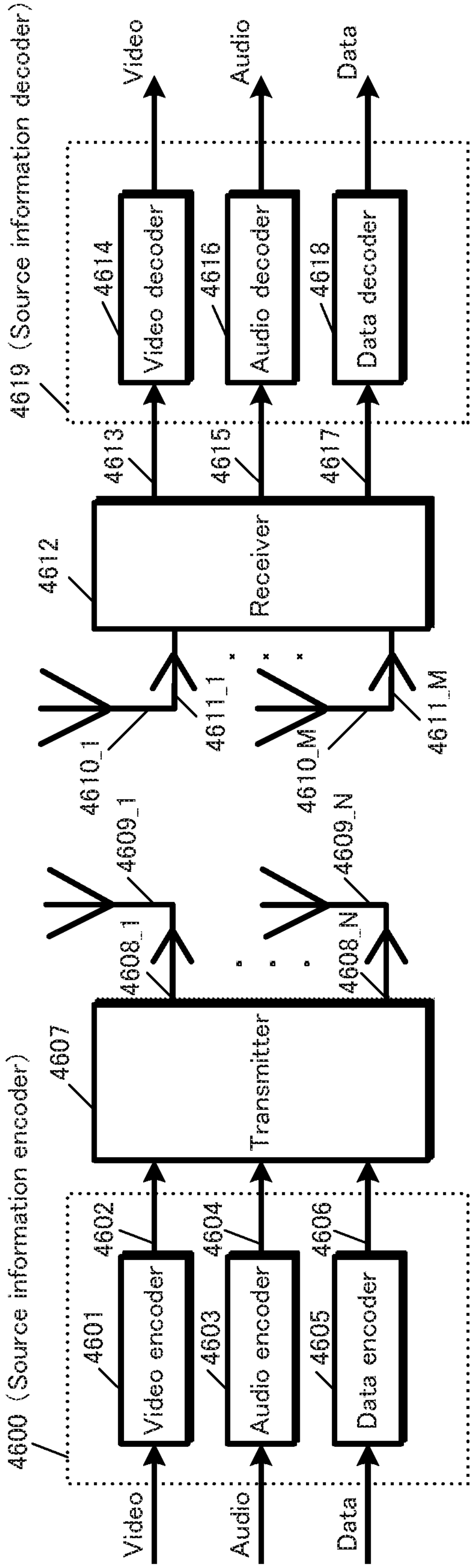
FIG. 46 illustrates a sample configuration of a communications system.

FIG. 46 illustrates a sample broadcasting system using the phase changing scheme described in the present description. As shown, a video encoder 4601 takes video as input, performs video encoding, and outputs encoded video data 4602. An audio encoder takes audio as input, performs audio encoding, and outputs encoded audio data 4604. A data encoder 4605 takes data as input, performs data encoding (e.g., data compression), and outputs encoded data 4606. Taken as a whole, these components form a source information encoder 4600.

A transmitter 4607 takes the encoded video data 4602, the encoded audio data 4604, and the encoded data 4606 as input, performs error-correcting coding, modulation, precoding, and phase changing (e.g., the signal processing by the transmission device from FIG. 3) on a subset of or on the entirety of these, and outputs transmit signals 4608_1 through 4608_N. Transmit signals 4608_1 through 4608_N are then transmitted by antennas 4609_1 through 4609_N as radio waves.

A receiver 4612 takes received signals 4611_1 through 4611_M received by antennas 4610_1 through 4610_M as input, performs processing such as frequency conversion, change of phase, decoding of the precoding, log-likelihood ratio calculation, and error-correcting decoding (e.g., the processing by the reception device from FIG. 7), and outputs received data 4613, 4615, and 4617. A source information decoder 4619 takes the received data 4613, 4615, and 4617 as input. A video decoder 4614 takes received data 4613 as input, performs video decoding, and outputs a video signal. The video is then displayed on a television display. An audio decoder 4616 takes received data 4615 as input. The audio decoder 4616 performs audio decoding and outputs an audio signal. The audio is then played through speakers. A data decoder 4618 takes received data 4617 as input, performs data decoding, and outputs information.

In the above-described Embodiments pertaining to the present invention, the number of encoders in the transmission device using a multi-carrier transmission scheme such as OFDM may be any number, as described above. Therefore, as in FIG. 4, for example, the transmission device may have only one encoder and apply a scheme for distributing output to the multi-carrier transmission scheme such as OFDM. In such circumstances, the wireless units 310A and 310B from FIG. 4 should replace the OFDM-related processors 1201A and 1201B from FIG. 12. The description of the OFDM-related processors is as given for Embodiment 1.

Although Embodiment 1 gives formula 36 as an example of a precoding matrix, another precoding matrix may also be used, when the following scheme is applied.

[Math. 50]

$$\begin{pmatrix} w11 & w12 \\ w21 & w22 \end{pmatrix} = \frac{1}{\sqrt{\alpha^2+1}} \begin{pmatrix} e^{j0} & \alpha \times e^{j\pi} \\ \alpha \times e^{j0} & e^{j0} \end{pmatrix} \quad \text{(formula 50)}$$

In the precoding matrices of formula 36 and formula 50, the value of a is set as given by formula 37 and formula 38. However, no limitation is intended in this manner. A simple precoding matrix is obtainable by setting α=1, which is also a valid value.

In Embodiment A1, the phase changers from FIGS. 3, 4, 6, 12, 25, 29, 51, and 53 are indicated as having a phase changing value of PHASE[i] (where i=0, 1, 2, . . . , N−2, N−1 (i denotes an integer that satisfies 0≤i≤N−1)) to achieve a period (cycle) of N (value reached given that FIGS. 3, 4, 6, 12, 25, 29, 51, and 53 perform a change of phase on only one baseband signal). The present description discusses performing a change of phase on one precoded baseband signal (i.e., in FIGS. 3, 4, 6, 12, 25, 29, and 51) namely on precoded baseband signal z2'. Here, PHASE[k] is calculated as follows.

[Math. 51]

$$\text{PHASE}[k] = \frac{2k\pi}{N} \text{ radians} \quad \text{(formula 51)}$$

where k=0, 1, 2, . . . , N−2, N−1 (k denotes an integer that satisfies 0≤k≤N−1). When N=5, 7, 9, 11, or 15, the reception device is able to obtain good data reception quality.

Although the present description discusses the details of phase changing schemes involving two modulated signals transmitted by a plurality of antennas, no limitation is intended in this regard. Precoding and a change of phase may be performed on three or more baseband signals on which mapping has been performed according to a modulation scheme, followed by predetermined processing on the post-phase-change baseband signals and transmission using a plurality of antennas, to realize the same results.

Programs for executing the above transmission scheme may, for example, be stored in advance in ROM (Read-Only Memory) and be read out for operation by a CPU.

Furthermore, the programs for executing the above transmission scheme may be stored on a computer-readable recording medium, the programs stored in the recording medium may be loaded in the RAM (Random Access Memory) of the computer, and the computer may be operated in accordance with the programs.

The components of the above-described Embodiments may be typically assembled as an LSI (Large Scale Integration), a type of integrated circuit. Individual components may respectively be made into discrete chips, or a subset or entirety of the components may be made into a single chip. Although an LSI is mentioned above, the terms IC (Integrated Circuit), system LSI, super LSI, or ultra LSI may also apply, depending on the degree of integration. Furthermore, the method of integrated circuit assembly is not limited to LSI. A dedicated circuit or a general-purpose processor may be used. After LSI assembly, a FPGA (Field Programmable Gate Array) or reconfigurable processor may be used.

Furthermore, should progress in the field of semiconductors or emerging technologies lead to replacement of LSI with other integrated circuit methods, then such technology may of course be used to integrate the functional blocks. Applications to biotechnology are also plausible.

Embodiment C1

Embodiment 1 explained that the precoding matrix in use may be switched when transmission parameters change. The present embodiment describes a detailed example of such a case, where, as described above (in the supplement), the transmission parameters change such that streams s1(*t*) and s2(*t*) switch between transmitting different data and transmitting identical data, and the precoding matrix and phase changing scheme being used are switched accordingly.

The example of the present embodiment describes a situation where two modulated signals transmitted from two different transmit antenna alternate between having the modulated signals include identical data and having the modulated signals each include different data.

Figure 56:
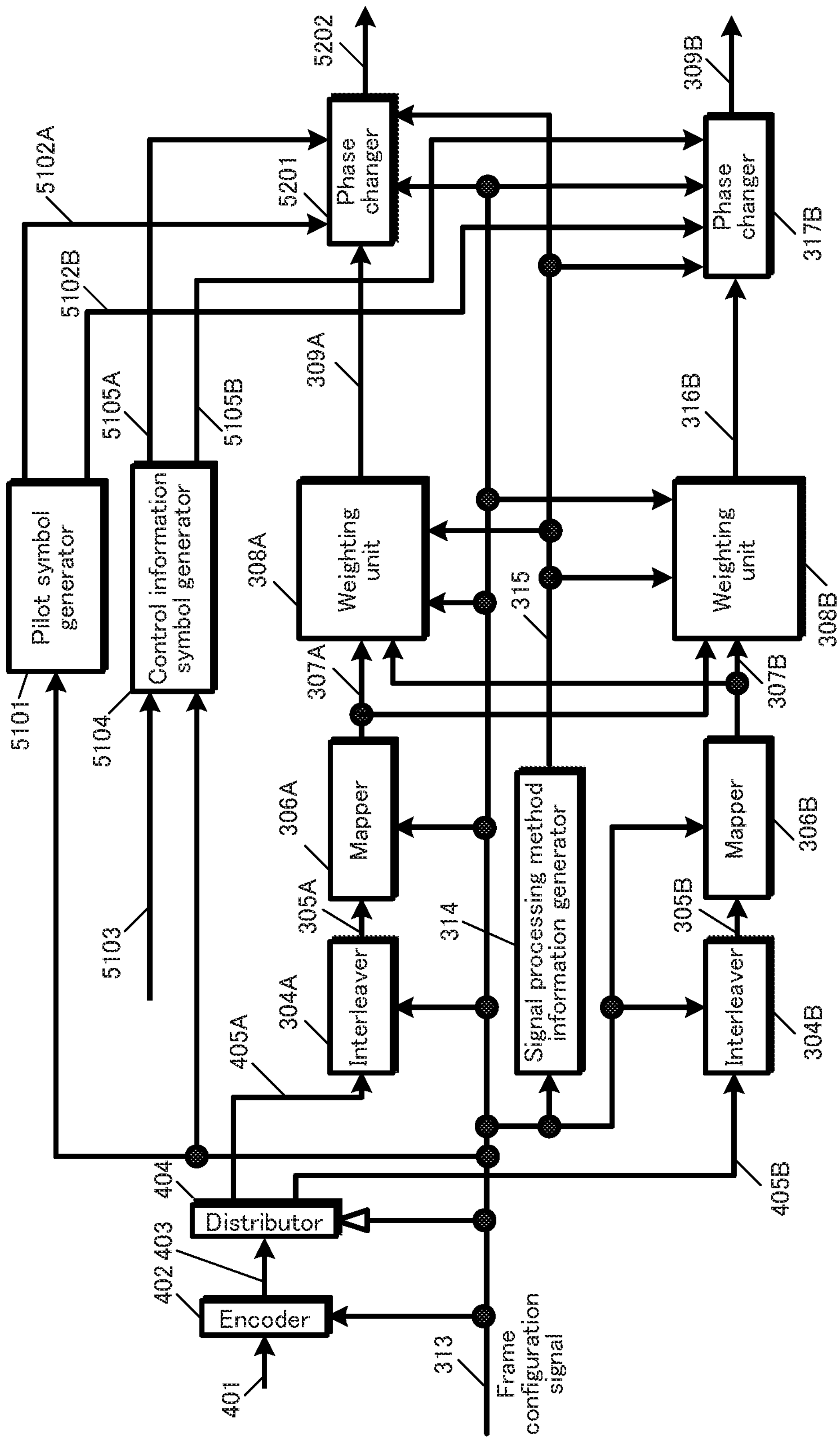
FIG. 56 illustrates yet still a further sample configuration of a transmission device.

FIG. 56 illustrates a sample configuration of a transmission device switching between transmission schemes, as described above. In FIG. 56, components operating in the manner described for FIG. 54 use identical reference numbers. As shown, FIG. 56 differs from FIG. 54 in that a distributor 404 takes the frame configuration signal 313 as input. The operations of the distributor 404 are described using FIG. 57.

Figure 57:
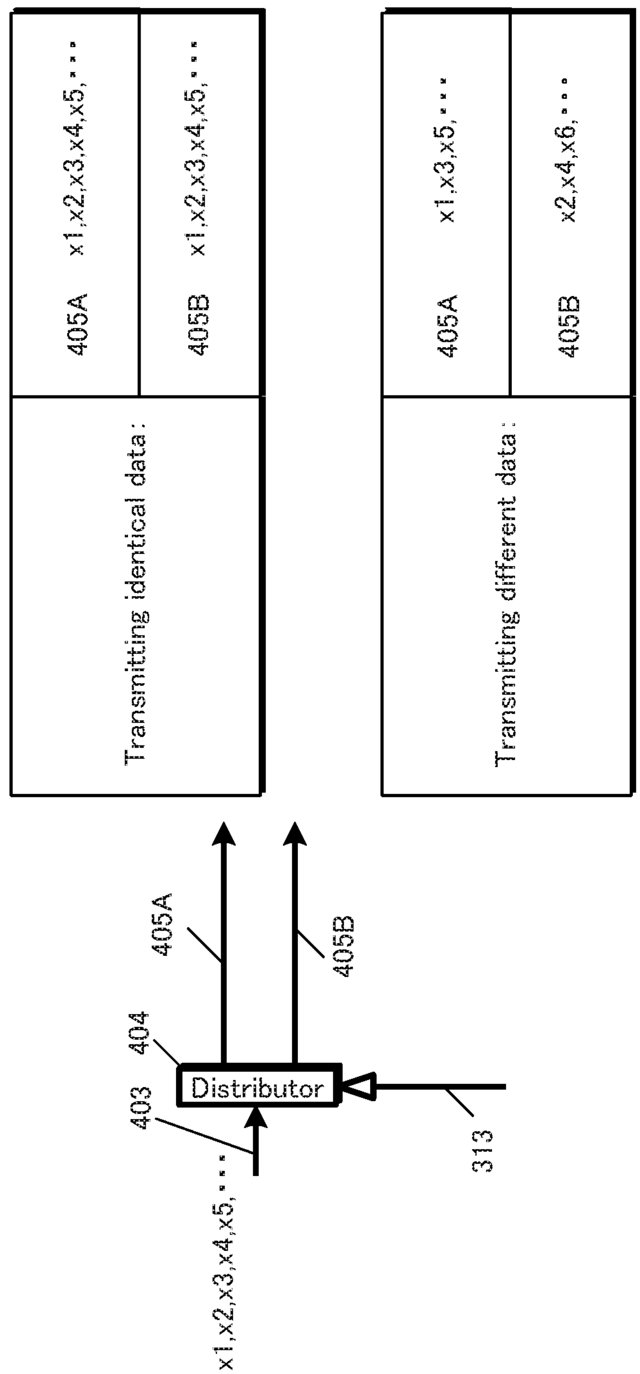
FIG. 57 illustrates sample operations of a distributor.

FIG. 57 illustrates the operations of the distributor 404 when transmitting identical data and when transmitting different data. As shown, given encoded data x1, x2, x3, x4, x5, x6, and so on, when transmitting identical data, distributed data 405 is given as x1, x2, x3, x4, x5, x6, and so on, while distributed data 405B is similarly given as x1, x2, x3, x4, x5, x6, and so on.

On the other hand, when transmitting different data, distributed data 405A are given as x1, x3, x5, x7, x9, and so on, while distributed data 405B are given as x2, x4, x6, x8, x10, and so on.

The distributor 404 determines, according to the frame configuration signal 313 taken as input, whether the transmission mode is identical data transmission or different data transmission.

Figure 58:
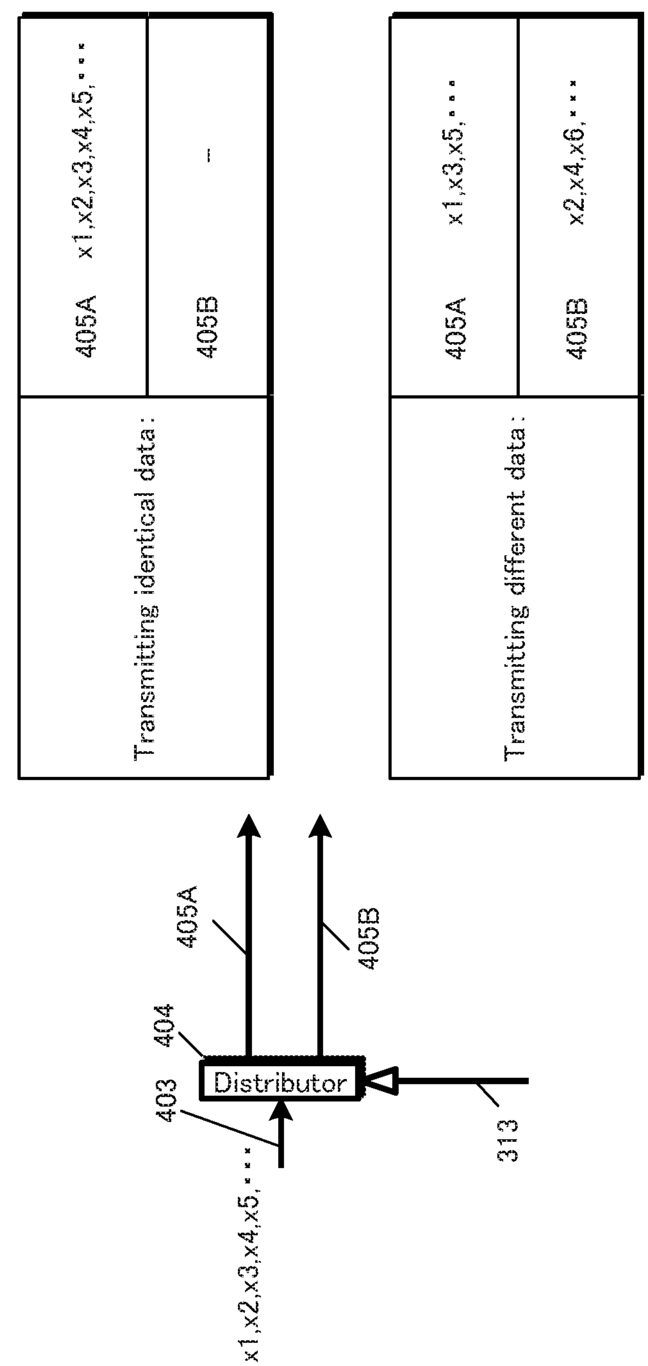
FIG. 58 illustrates further sample operations of a distributor.

An alternative to the above is shown in FIG. 58. As shown, when transmitting identical data, the distributor 404 outputs distributed data 405A as x1, x2, x3, x4, x5, x6, and so on, while outputting nothing as distributed data 405B. Accordingly, when the frame configuration signal 313 indicates identical data transmission, the distributor 404 operates as described above, while interleaver 304B and mapper 306B from FIG. 56 do not operate. Thus, only baseband signal 307A output by mapper 306A from FIG. 56 is valid, and is taken as input by both weighting unit 308A and 308B.

One characteristic feature of the present embodiment is that, when the transmission mode switches from identical data transmission to different data transmission, the precoding matrix may also be switched. As indicated by formula 36 and formula 39 in Embodiment 1, given a matrix made up of w11, w12, w21, and w22, the precoding matrix used to transmit identical data may be as follows.

[Math. 52]

$$\begin{pmatrix} w11 & w12 \\ w21 & w22 \end{pmatrix} = \begin{pmatrix} a & 0 \\ 0 & a \end{pmatrix} \quad \text{(formula 52)}$$

where a is a real number (a may also be a complex number, but given that the baseband signal input as a result of precoding undergoes a change of phase, a real number is preferable for considerations of circuit size and complexity reduction). Also, when a is equal to one, the weighting units 308A and 308B do not perform weighting and output the input signal as-is.

Accordingly, when transmitting identical data, the weighted baseband signals 309A and 316B are identical signals output by the weighting units 308A and 308B.

When the frame configuration signal indicates identical transmission mode, a phase changer 5201 performs a change of phase on weighted baseband signal 309A and outputs post-phase-change baseband signal 5202. Similarly, when the frame configuration signal indicates identical transmission mode, phase changer 317B performs a change of phase on weighted baseband signal 316B and outputs post-phase-change baseband signal 309B. The change of phase performed by phase changer 5201 is of $e^{jA(t)}$ (alternatively, $e^{jA(f)}$ or $e^{jA(t,f)}$) (where t is time and f is frequency) (accordingly, $e^{jA(t)}$ (alternatively, $e^{jA(f)}$ or $e^{jA(t,f)}$) is the value by which the input baseband signal is multiplied), and the change of phase performed by phase changer 317B is of ejB(t) (alternatively, $e^{jB(f)}$ or $e^{jB(t,f)}$) (where t is time and f is frequency) (accordingly, $e^{jB(t)}$ (alternatively, $e^{jB(f)}$ or $e^{jB(t,f)}$) is the value by which the input baseband signal is multiplied). As such, the following condition is satisfied.

[Math. 53]

Some time t satisfies $$e^{jA(t)} \neq e^{jB(t)} \quad \text{(formula 53)}$$

(Or, some (carrier) frequency f satisfies $e^{jA(f)} \neq e^{jB(f)}$)

(Or, some (carrier) frequency f and time t satisfy $e^{jA(t,f)} \neq e^{jB(t,f)}$)

As such, the transmit signal is able to reduce multi-path influence and thereby improve data reception quality for the reception device. (However, the change of phase may also be performed by only one of the weighted baseband signals 309A and 316B.)

In FIG. 56, when OFDM is used, processing such as IFFT and frequency conversion is performed on post-phase-change baseband signal 5202, and the result is transmitted by a transmit antenna. (See FIG. 13) (Accordingly, post-phase-change baseband signal 5202 may be considered the same as signal 1301A from FIG. 13.) Similarly, when OFDM is used, processing such as IFFT and frequency conversion is performed on post-phase-change baseband signal 309B, and the result is transmitted by a transmit antenna. (See FIG. 13) (Accordingly, post-phase-change baseband signal 309B may be considered the same as signal 1301B from FIG. 13.)

When the selected transmission mode indicates different data transmission, then any of formula 36, formula 39, and formula 50 given in Embodiment 1 may apply. Significantly, the phase changers 5201 and 317B from FIG. 56 us a different phase changing scheme than when transmitting identical data. Specifically, as described in Embodiment 1, for example, phase changer 5201 performs the change of phase while phase changer 317B does not, or phase changer 317B performs the change of phase while phase changer 5201 does not. Only one of the two phase changers performs the change of phase. As such, the reception device obtains good data reception quality in the LOS environment as well as the NLOS environment.

When the selected transmission mode indicates different data transmission, the precoding matrix may be as given in formula 52, or as given in any of formula 36, formula 50, and formula 39, or may be a precoding matrix unlike that given in formula 52. Thus, the reception device is especially likely to experience improvements to data reception quality in the LOS environment.

Furthermore, although the present embodiment discusses examples using OFDM as the transmission scheme, the invention is not limited in this manner. Multi-carrier schemes other than OFDM and single-carrier schemes may all be used to achieve similar Embodiments. Here, spread-spectrum communications may also be used. When single-carrier schemes are used, the change of phase is performed with respect to the time domain.

As explained in Embodiment 3, when the transmission scheme involves different data transmission, the change of phase is performed on the data symbols, only. However, as described in the present embodiment, when the transmission scheme involves identical data transmission, then the change of phase need not be limited to the data symbols but may also be performed on pilot symbols, control symbols, and other such symbols inserted into the transmission frame of the transmit signal. (The change of phase need not always be performed on symbols such as pilot symbols and control symbols, though doing so is preferable in order to achieve diversity gain.)

Embodiment C2

The present embodiment describes a configuration scheme for a base station corresponding to Embodiment C1.

Figure 59:
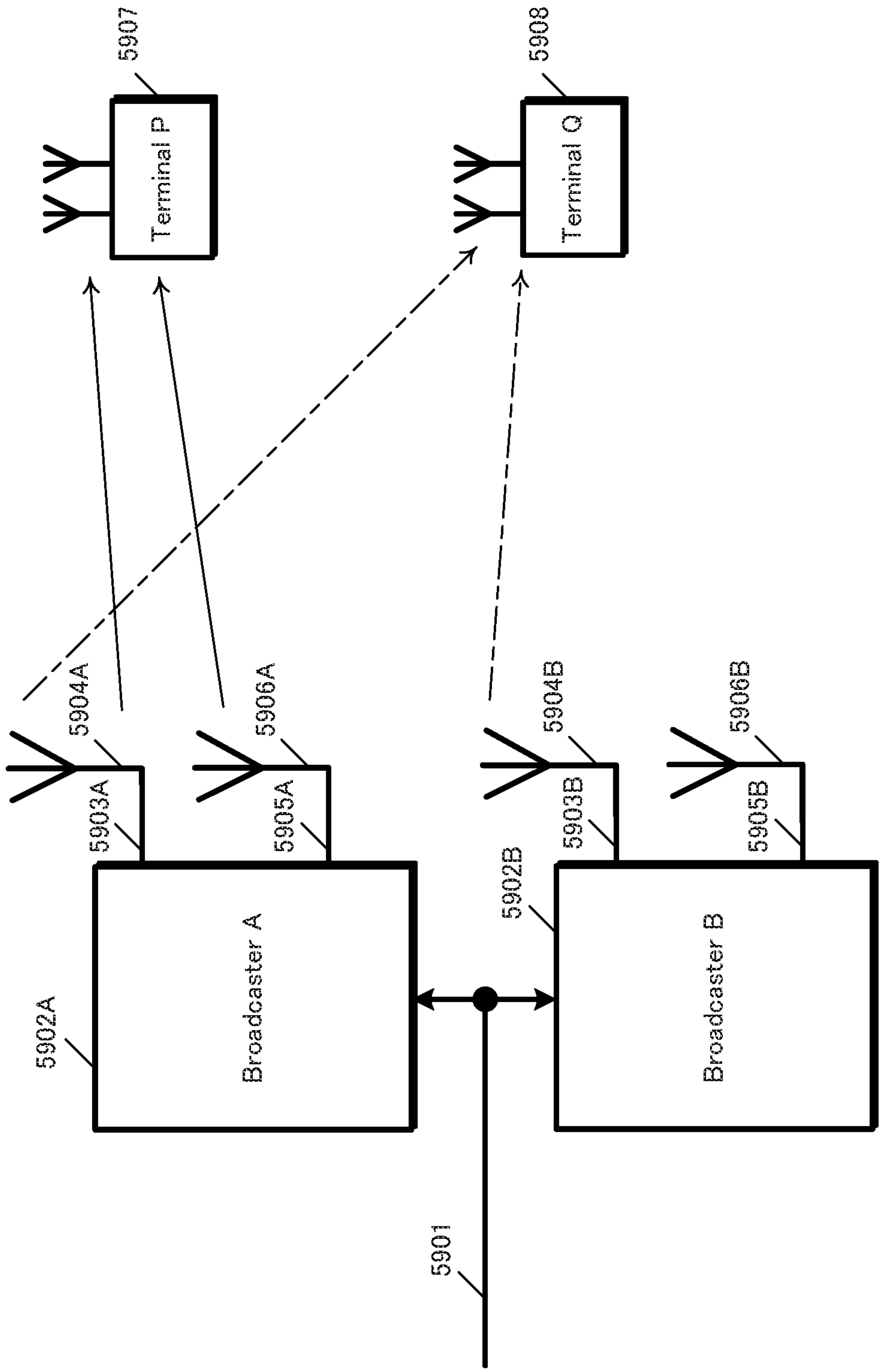
FIG. 59 illustrates a sample communications system indicating the relationship between base stations and terminals.

FIG. 59 illustrates the relationship of a base stations (broadcasters) to terminals. A terminal P (5907) receives transmit signal 5903A transmitted by antenna 5904A and transmit signal 5905A transmitted by antenna 5906A of broadcaster A (5902A), then performs predetermined processing thereon to obtained received data.

A terminal Q (5908) receives transmit signal 5903A transmitted by antenna 5904A of base station A (5902A) and transmit signal 593B transmitted by antenna 5904B of base station B (5902B), then performs predetermined processing thereon to obtained received data.

Figure 60:
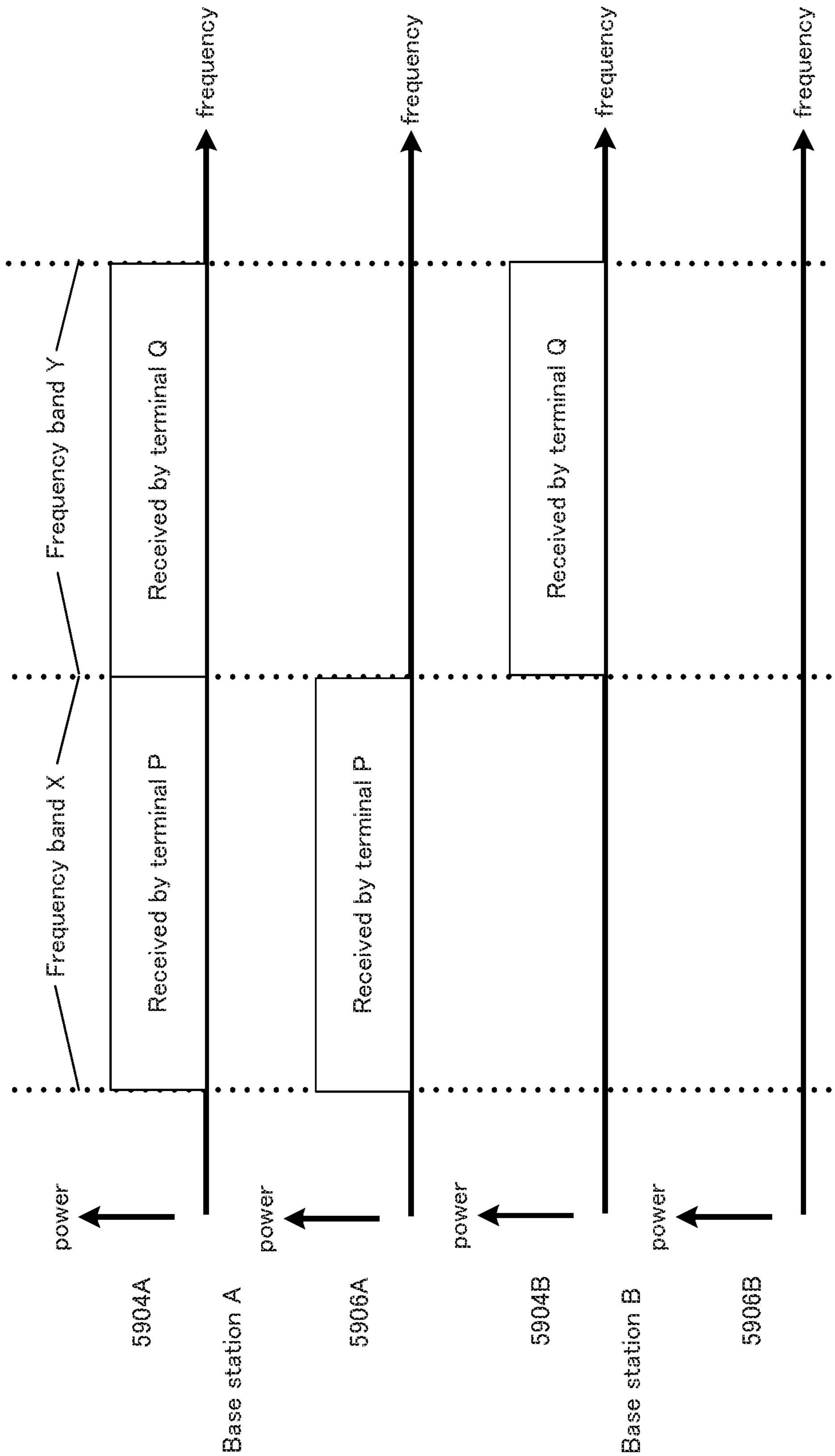
FIG. 60 illustrates an example of transmit signal frequency allocation.
Figure 61:
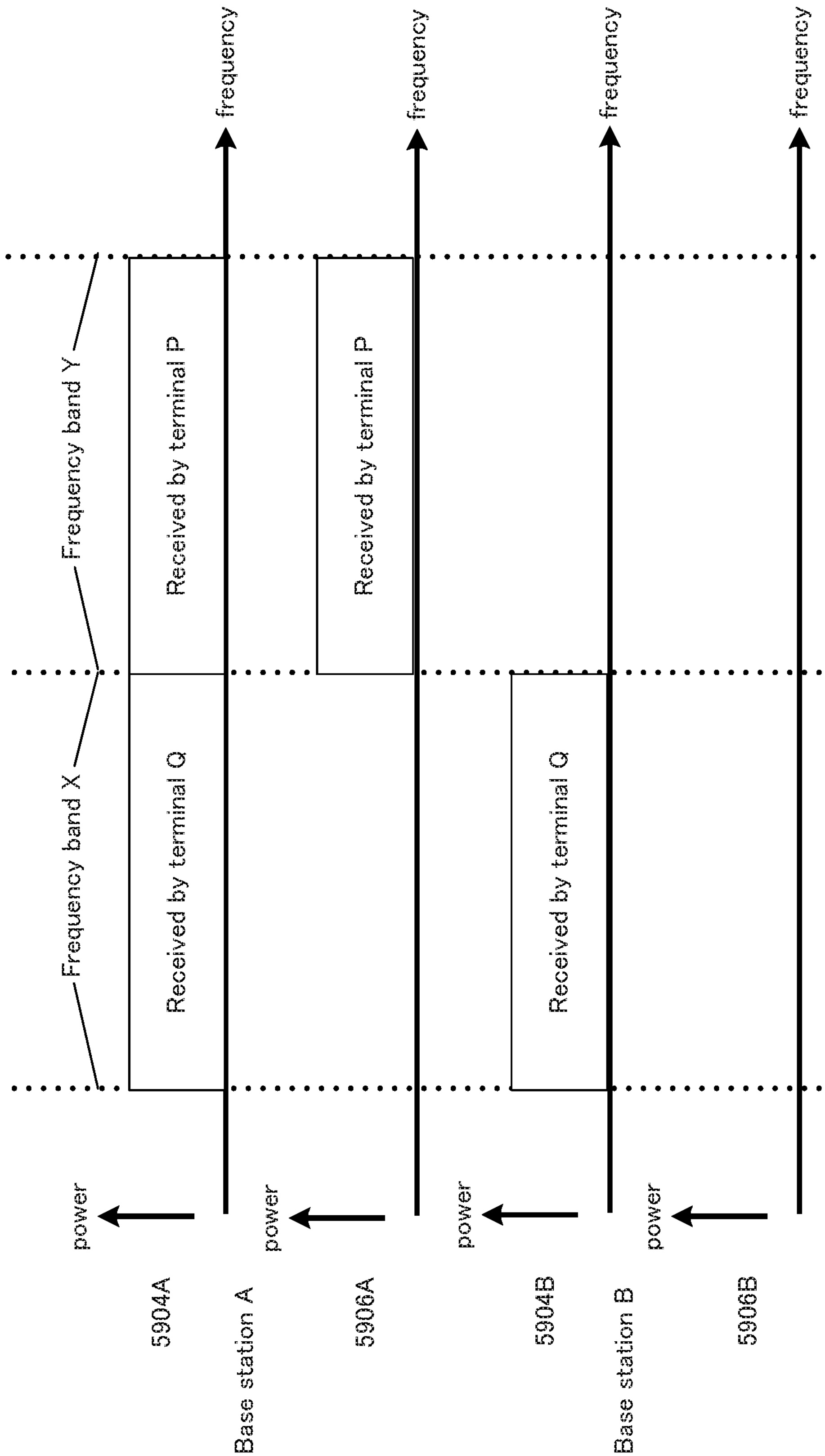
FIG. 61 illustrates another example of transmit signal frequency allocation.

FIGS. 60 and 61 illustrate the frequency allocation of base station A (5902A) for transmit signals 5903A and 5905A transmitted by antennas 5904A and 5906A, and the frequency allocation of base station B (5902B) for transmit signals 5903B and 5905B transmitted by antennas 5904B and 5906B. In FIGS. 60 and 61, frequency is on the horizontal axis and transmission power is on the vertical axis.

As shown, transmit signals 5903A and 5905A transmitted by base station A (5902A) and transmit signals 5903B and 5905B transmitted by base station B (5902B) use at least frequency band X and frequency band Y. Frequency band X is used to transmit data of a first channel, and frequency band Y is used to transmit data of a second channel.

Accordingly, terminal P (5907) receives transmit signal 5903A transmitted by antenna 5904A and transmit signal 5905A transmitted by antenna 5906A of base station A (5902A), extracts frequency band X therefrom, performs predetermined processing, and thus obtains the data of the first channel. Terminal Q (5908) receives transmit signal 5903A transmitted by antenna 5904A of base station A (5902A) and transmit signal 5903B transmitted by antenna 5904B of base station B (5902B), extracts frequency band Y therefrom, performs predetermined processing, and thus obtains the data of the second channel.

The following describes the configuration and operations of base station A (5902A) and base station B (5902B).

As described in Embodiment C1, both base station A (5902A) and base station B (5902B) incorporate a transmission device configured as illustrated by FIGS. 56 and 13. When transmitting as illustrated by FIG. 60, base station A (5902A) generates two different modulated signals (on which precoding and a change of phase are performed) with respect to frequency band X as described in Embodiment C1. The two modulated signals are respectively transmitted by the antennas 5904A and 5906A. With respect to frequency band Y, base station A (5902A) operates interleaver 304A, mapper 306A, weighting unit 308A, and phase changer from FIG. 56 to generate modulated signal 5202. Then, a transmit signal corresponding to modulated signal 5202 is transmitted by antenna 1310A from FIG. 13, i.e., by antenna 5904A from FIG. 59. Similarly, base station B (5902B) operates interleaver 304A, mapper 306A, weighting unit 308A, and phase changer 5201 from FIG. 56 to generate modulated signal 5202. Then, a transmit signal corresponding to modulated signal 5202 is transmitted by antenna 1310A from FIG. 13, i.e., by antenna 5904B from FIG. 59.

The creation of encoded data in frequency band Y may involve, as shown in FIG. 56, generating encoded data in individual base stations or may involve having one of the base stations generate such encoded data for transmission to other base stations. As an alternative scheme, one of the base stations may generate modulated signals and be configured to pass the modulated signals so generated to other base stations.

Also, in FIG. 59, signal 5901 includes information pertaining to the transmission mode (identical data transmission or different data transmission). The base stations obtain this signal and thereby switch between generation schemes for the modulated signals in each frequency band. Here, signal 5901 is indicated in FIG. 59 as being input from another device or from a network. However, configurations where, for example, base station A (5902) is a master station passing a signal corresponding to signal 5901 to base station B (5902B) are also possible.

As explained above, when the base station transmits different data, the precoding matrix and phase changing scheme are set according to the transmission scheme to generate modulated signals.

On the other hand, to transmit identical data, two base stations respectively generate and transmit modulated signals. In such circumstances, base stations each generating modulated signals for transmission from a common antenna may be considered to be two combined base stations using the precoding matrix given by formula 52. The phase changing scheme is as explained in Embodiment C1, for example, and satisfies the conditions of formula 53.

In addition, the transmission scheme of frequency band X and frequency band Y may vary over time. Accordingly, as illustrated in FIG. 61, as time passes, the frequency allocation changes from that indicated in FIG. 60 to that indicated in FIG. 61.

According to the present embodiment, not only can the reception device obtain improved data reception quality for identical data transmission as well as different data transmission, but the transmission devices can also share a phase changer.

Furthermore, although the present embodiment discusses examples using OFDM as the transmission scheme, the invention is not limited in this manner. Multi-carrier schemes other than OFDM and single-carrier schemes may all be used to achieve similar Embodiments. Here, spread-spectrum communications may also be use. When single-carrier schemes are used, the change of phase is performed with respect to the time domain.

As explained in Embodiment 3, when the transmission scheme involves different data transmission, the change of phase is carried out on the data symbols, only. However, as described in the present embodiment, when the transmission scheme involves identical data transmission, then the change of phase need not be limited to the data symbols but may also be performed on pilot symbols, control symbols, and other such symbols inserted into the transmission frame of the transmit signal. (The change of phase need not always be performed on symbols such as pilot symbols and control symbols, though doing so is preferable in order to achieve diversity gain.)

Embodiment C3

The present embodiment describes a configuration scheme for a repeater corresponding to Embodiment C1. The repeater may also be termed a repeating station.

Figure 62:
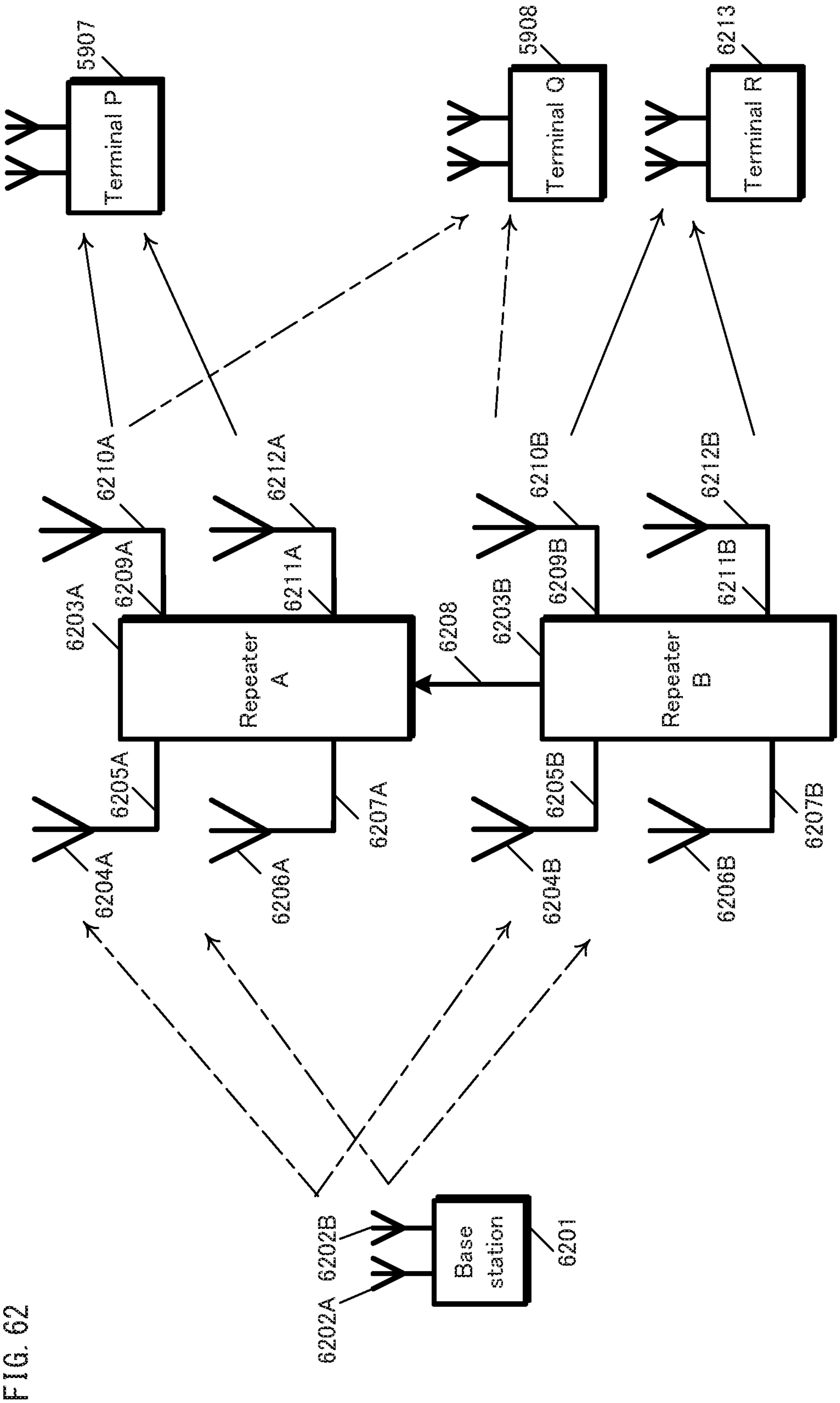
FIG. 62 illustrates a sample communications system indicating the relationship between a base station, repeaters, and terminals.
Figure 63:
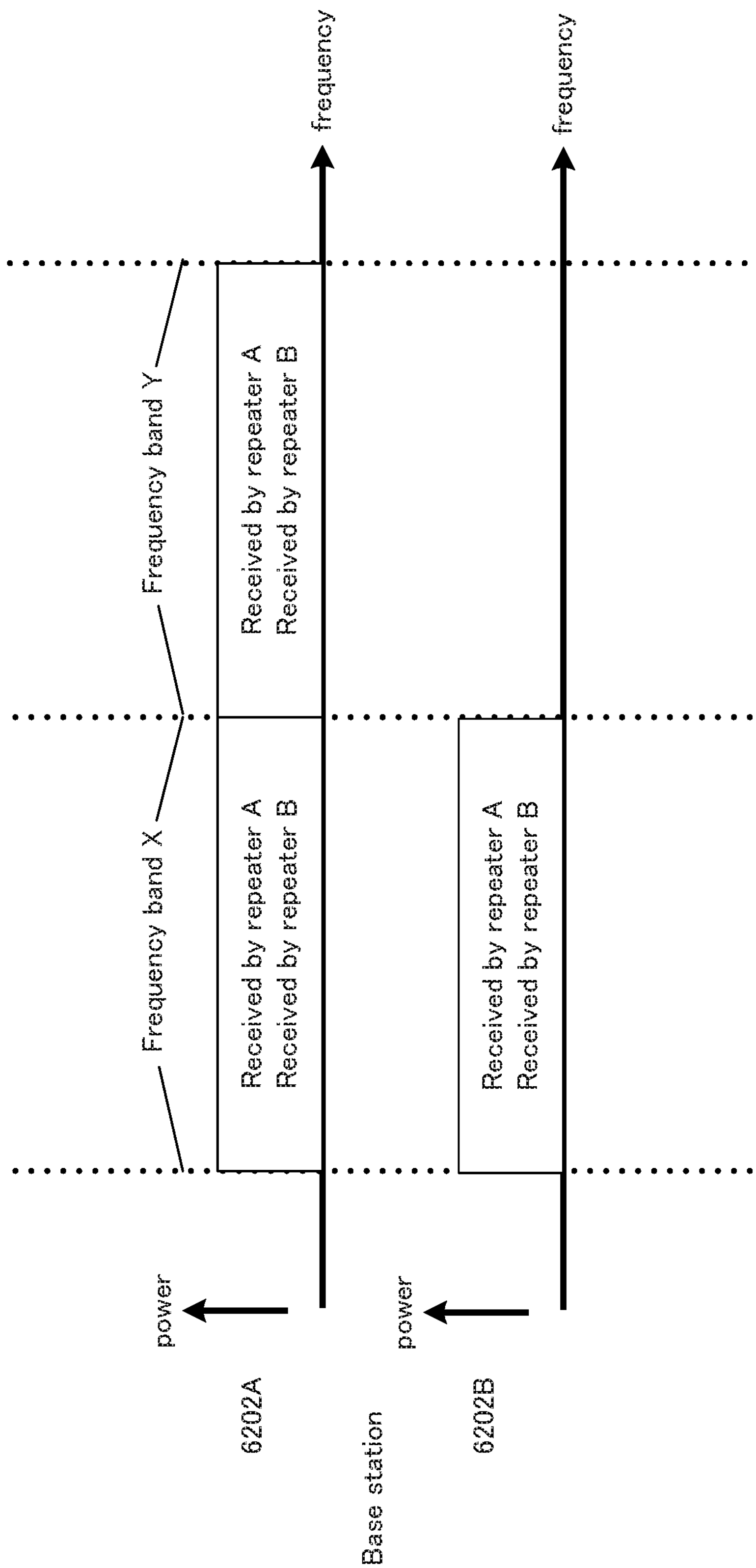
FIG. 63 illustrates an example of transmit signal frequency allocation with respect to the base station.

FIG. 62 illustrates the relationship of a base stations (broadcasters) to repeaters and terminals. As shown in FIG. 63, base station 6201 at least transmits modulated signals on frequency band X and frequency band Y. Base station 6201 transmits respective modulated signals on antenna 6202A and antenna 6202B. The transmission scheme here used is described later, with reference to FIG. 63.

Repeater A (6203A) performs processing such as demodulation on received signal 6205A received by receive antenna 6204A and on received signal 6207A received by receive antenna 6206A, thus obtaining received data. Then, in order to transmit the received data to a terminal, repeater A (6203A) performs transmission processing to generate modulated signals 6209A and 6211A for transmission on respective antennas 6210A and 6212A.

Similarly, repeater B (6203B) performs processing such as demodulation on received signal 6205B received by receive antenna 6204B and on received signal 6207B received by receive antenna 6206B, thus obtaining received data. Then, in order to transmit the received data to a terminal, repeater B (6203B) performs transmission processing to generate modulated signals 6209B and 6211B for transmission on respective antennas 6210B and 6212B. Here, repeater B (6203B) is a master repeater that outputs a control signal 6208. repeater A (6203A) takes the control signal as input. A master repeater is not strictly necessary. Base station 6201 may also transmit individual control signals to repeater A (6203A) and to repeater B (6203B).

Terminal P (5907) receives modulated signals transmitted by repeater A (6203A), thereby obtaining data. Terminal Q (5908) receives signals transmitted by repeater A (6203A) and by repeater B (6203B), thereby obtaining data. Terminal R (6213) receives modulated signals transmitted by repeater B (6203B), thereby obtaining data.

FIG. 63 illustrates the frequency allocation for a modulated signal transmitted by antenna 6202A among transmit signals transmitted by the base station, and the frequency allocation of modulated signals transmitted by antenna 6202B. In FIG. 63, frequency is on the horizontal axis and transmission power is on the vertical axis.

As shown, the modulated signals transmitted by antenna 6202A and by antenna 6202B use at least frequency band X and frequency band Y. Frequency band X is used to transmit data of a first channel, and frequency band Y is used to transmit data of a second channel.

As described in Embodiment C1, the data of the first channel is transmitted using frequency band X in different data transmission mode. Accordingly, as shown in FIG. 63, the modulated signals transmitted by antenna 6202A and by antenna 6202B include components of frequency band X. These components of frequency band X are received by repeater A and by repeater B. Accordingly, as described in Embodiment 1 and in Embodiment C1, modulated signals in frequency band X are signals on which mapping has been performed, and to which precoding (weighting) and the change of phase are applied.

As shown in FIG. 62, the data of the second channel is transmitted by antenna 6202A of FIG. 2 and transmits data in components of frequency band Y. These components of frequency band Y are received by repeater A and by repeater B.

Figure 64:
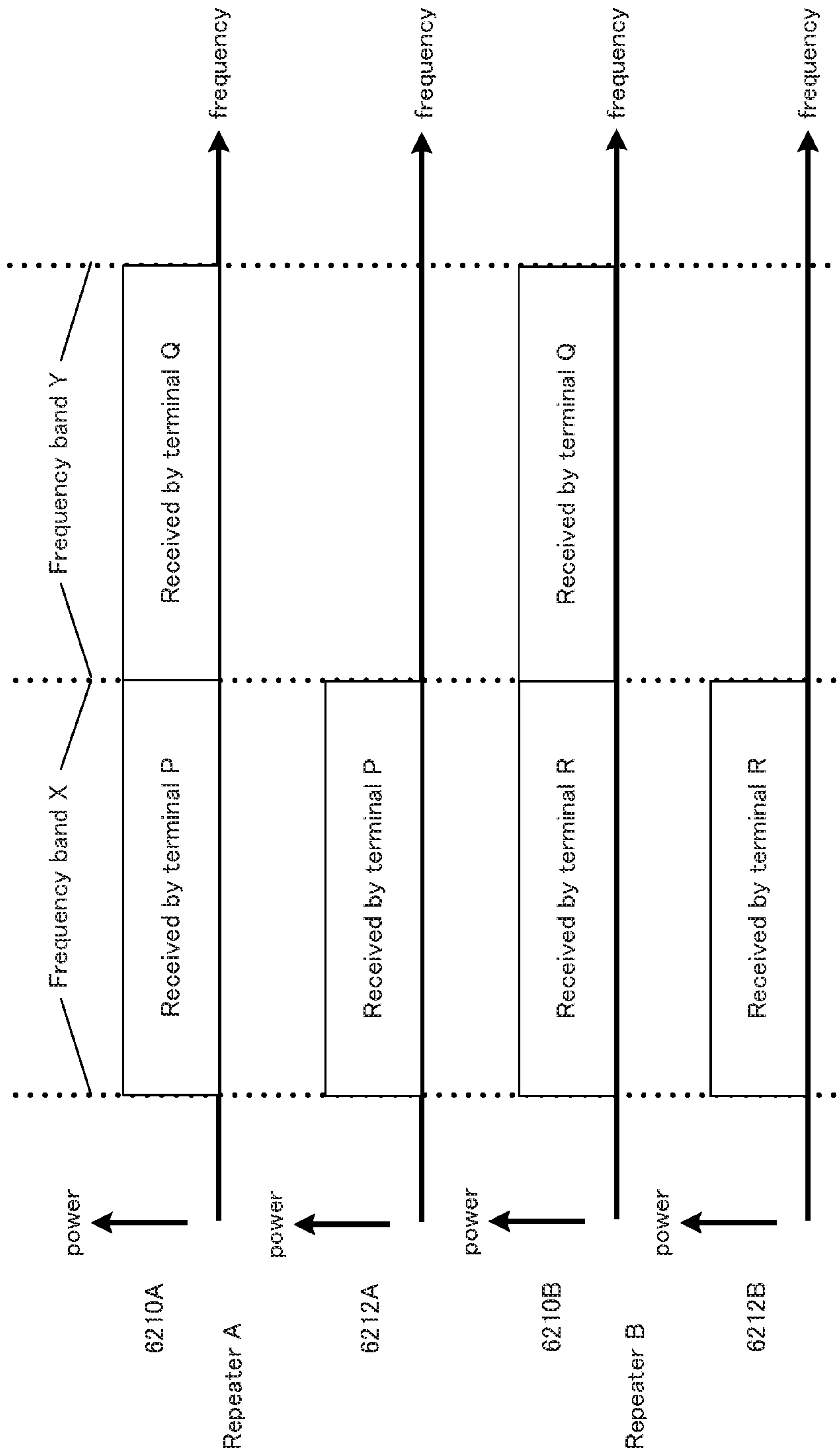
FIG. 64 illustrates an example of transmit signal frequency allocation with respect to the repeaters.

FIG. 64 illustrate the frequency allocation for transmit signals transmitted by repeater A and repeater B, specifically for modulated signal 6209A transmitted by antenna 6210A and modulated signal 6211A transmitted by antenna 6212A of repeater 6210A, and for modulated signal 6209B transmitted by antenna 6210B and modulated signal 6211B transmitted by antenna 6212B of repeater B. In FIG. 64, frequency is on the horizontal axis and transmission power is on the vertical axis.

As shown in FIG. 64, modulated signal 6209A transmitted by antenna 6210A and modulated signal 6211A transmitted by antenna 6212A use at least frequency band X and frequency band Y. Also, modulated signal 6209B transmitted by antenna 6210B and modulated signal 6211B transmitted by antenna 6212B similarly use at least frequency band X and frequency band Y. Frequency band X is used to transmit data of a first channel, and frequency band Y is used to transmit data of a second channel.

As described in Embodiment C1, the data of the first channel is transmitted using frequency band X in different data transmission mode. Accordingly, as shown in FIG. 64, modulated signal 6209A transmitted by antenna 6210A and modulated signal 6211A transmitted by antenna 6212B include components of frequency band X. These components of frequency band X are received by terminal P. Similarly, as shown in FIG. 64, modulated signal 6209B transmitted by antenna 6210B and modulated signal 6211B transmitted by antenna 6212B include components of frequency band X. These components of frequency band X are received by terminal R. Accordingly, as described in Embodiment 1 and in Embodiment C1, modulated signals in frequency band X are signals on which mapping has been performed, and to which precoding (weighting) and the change of phase are applied.

As shown in FIG. 64, the data of the second channel is carried by the modulated signals transmitted by antenna 6210A of repeater A (6203A) and by antenna 6210B of repeater B (6203) from FIG. 62 and transmits data in components of frequency band Y. Here, the components of frequency band Y in modulated signal 6209A transmitted by antenna 6210A of repeater A (6203A) and those in modulated signal 6209B transmitted by antenna 6210B of repeater B (6203B) are used in a transmission mode that involves identical data transmission, as explained in Embodiment C1. These components of frequency band Y are received by terminal Q.

Figure 65:
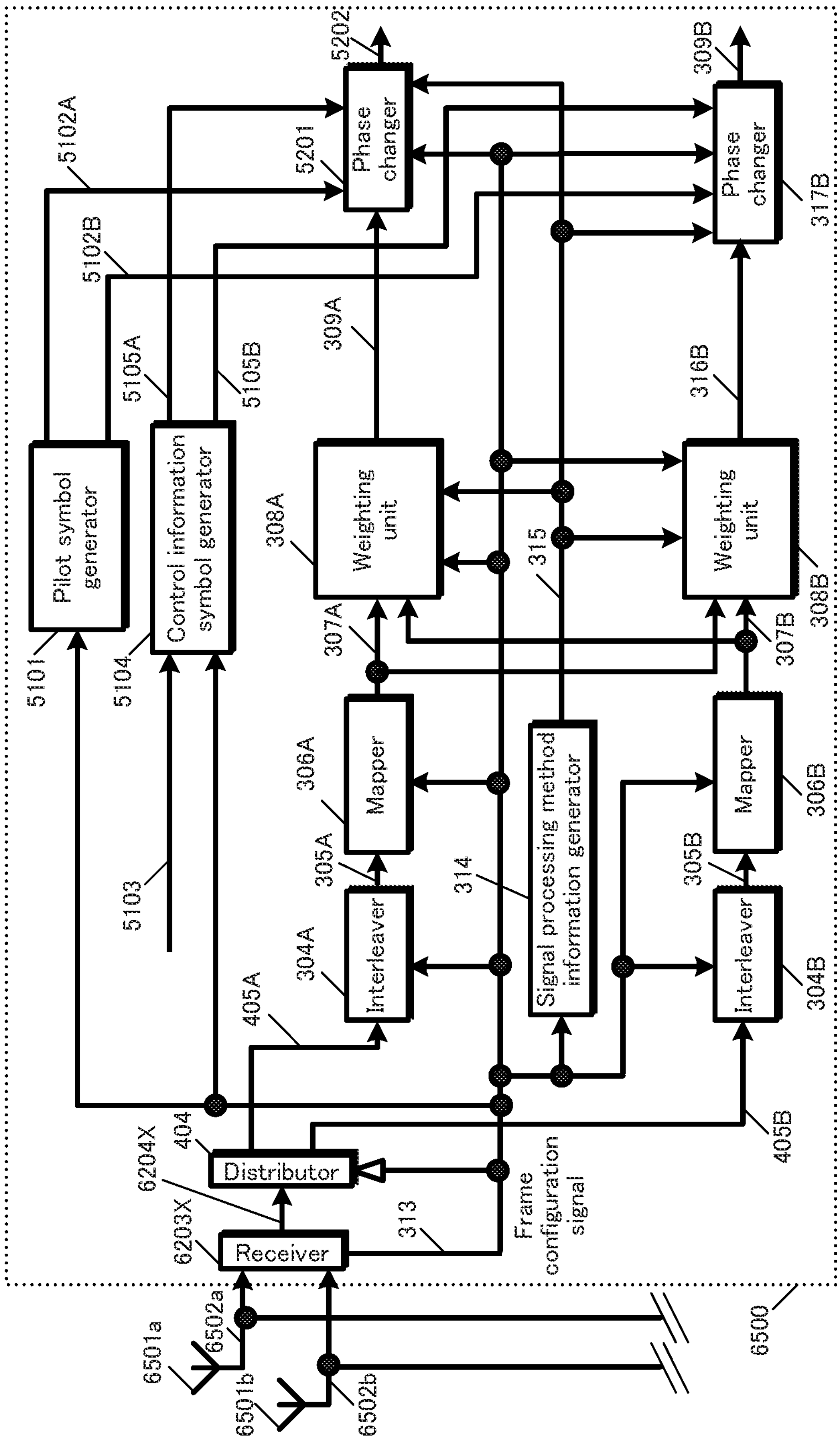
FIG. 65 illustrates a sample configuration of a receiver and transmitter in the repeater.

The following describes the configuration of repeater A (6203A) and repeater B (6203B) from FIG. 62, with reference to FIG. 65.

FIG. 65 illustrates a sample configuration of a receiver and transmitter in a repeater. Components operating identically to those of FIG. 56 use the same reference numbers thereas. Receiver 6203X takes received signal 6502A received by receive antenna 6501A and received signal 6502B received by receive antenna 6501B as input, performs signal processing (signal demultiplexing or compositing, error-correction decoding, and so on) on the components of frequency band X thereof to obtain data 6204X transmitted by the base station using frequency band X, outputs the data to the distributor 404 and obtains transmission scheme information included in control information (and transmission scheme information when transmitted by a repeater), and outputs the frame configuration signal 313.

Receiver 6203X and onward constitute a processor for generating a modulated signal for transmitting frequency band X. Further, the receiver here described is not only the receiver for frequency band X as shown in FIG. 65, but also incorporates receivers for other frequency bands. Each receiver forms a processor for generating modulated signals for transmitting a respective frequency band.

The overall operations of the distributor 404 are identical to those of the distributor in the base station described in Embodiment C2.

When transmitting as indicated in FIG. 64, repeater A (6203A) and repeater B (6203B) generate two different modulated signals (on which precoding and change of phase are performed) in frequency band X as described in Embodiment C1. The two modulated signals are respectively transmitted by antennas 6210A and 6212A of repeater A (6203) from FIG. 62 and by antennas 6210B and 6212B of repeater B (6203B) from FIG. 62.

As for frequency band Y, repeater A (6203A) operates a processor 6500 pertaining to frequency band Y and corresponding to the signal processor 6500 pertaining to frequency band X shown in FIG. 65 (the signal processor 6500 is the signal processor pertaining to frequency band X, but given that an identical signal processor is incorporated for frequency band Y, this description uses the same reference numbers), interleaver 304A, mapper 306A, weighting unit 308A, and phase changer 5201 to generate modulated signal 5202. A transmit signal corresponding to modulated signal 5202 is then transmitted by antenna 1310A from FIG. 13, that is, by antenna 6210A from FIG. 62. Similarly, repeater B (6203 B) operates interleaver 304A, mapper 306A, weighting unit 308A, and phase changer 5201 from FIG. 62 pertaining to frequency band Y to generate modulated signal 5202. Then, a transmit signal corresponding to modulated signal 5202 is transmitted by antenna 1310A from FIG. 13, i.e., by antenna 6210B from FIG. 62.

Figure 66:
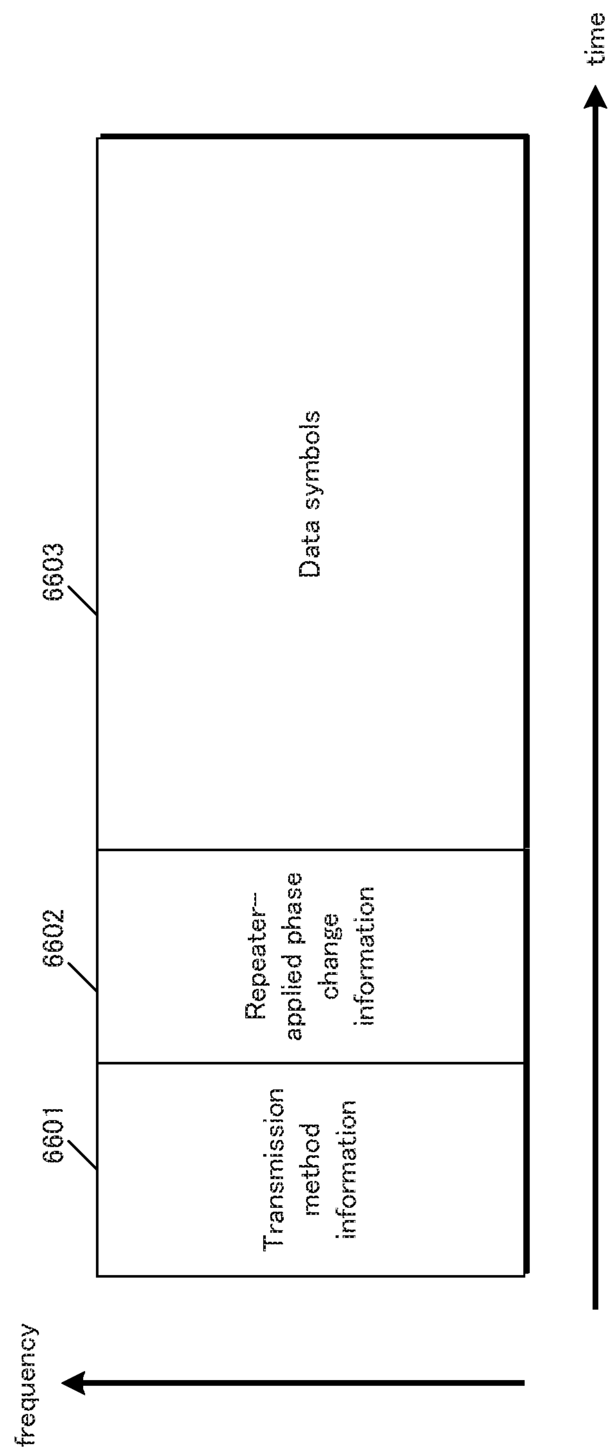
FIG. 66 illustrates a signal data format used for transmission by the base station.

As shown in FIG. 66 (FIG. 66 illustrates the frame configuration of the modulated signal transmitted by the base station, with time on the horizontal axis and frequency on the vertical axis), the base station transmits transmission scheme information 6601, repeater-applied phase change information 6602, and data symbols 6603. The repeater obtains and applies the transmission scheme information 6601, the repeater-applied phase change information 6602, and the data symbols 6603 to the transmit signal, thus determining the phasing changing scheme. When the repeater-applied phase change information 6602 from FIG. 66 is not included in the signal transmitted by the base station, then as shown in FIG. 62, repeater B (6203B) is the master and indicates the phase changing scheme to repeater A (6203A).

As explained above, when the repeater transmits different data, the precoding matrix and phase changing scheme are set according to the transmission scheme to generate modulated signals.

On the other hand, to transmit identical data, two repeaters respectively generate and transmit modulated signals. In such circumstances, repeaters each generating modulated signals for transmission from a common antenna may be considered to be two combined repeaters using the precoding matrix given by formula 52. The phase changing scheme is as explained in Embodiment C1, for example, and satisfies the conditions of formula 53.

Also, as explained in Embodiment C1 for frequency band X, the base station and repeater may each have two antennas that transmit respective modulated signals and two antennas that receive identical data. The operations of such a base station or repeater are as described for Embodiment C1.

According to the present embodiment, not only can the reception device obtain improved data reception quality for identical data transmission as well as different data transmission, but the transmission devices can also share a phase changer.

Furthermore, although the present embodiment discusses examples using OFDM as the transmission scheme, the invention is not limited in this manner. Multi-carrier schemes other than OFDM and single-carrier schemes may all be used to achieve similar Embodiments. Here, spread-spectrum communications may also be used. When single-carrier schemes are used, the change of phase is performed with respect to the time domain.

As explained in Embodiment 3, when the transmission scheme involves different data transmission, the change of phase is carried out on the data symbols, only. However, as described in the present embodiment, when the transmission scheme involves identical data transmission, then the change of phase need not be limited to the data symbols but may also be performed on pilot symbols, control symbols, and other such symbols inserted into the transmission frame of the transmit signal. (The change of phase need not always be performed on symbols such as pilot symbols and control symbols, though doing so is preferable in order to achieve diversity gain.)

Embodiment C4

The present embodiment concerns a phase changing scheme different from the phase changing schemes described in Embodiment 1 and in the Supplement.

In Embodiment 1, formula 36 is given as an example of a precoding matrix, and in the Supplement, formula 50 is similarly given as another such example. In Embodiment A1, the phase changers from FIGS. 3, 4, 6, 12, 25, 29, 51, and 53 are indicated as having a phase changing value of PHASE[i] (where i=0, 1, 2, . . . , N−2, N−1 (i denotes an integer that satisfies 0≤i≤N−1)) to achieve a period (cycle) of N (value reached given that FIGS. 3, 4, 6, 12, 25, 29, 51, and 53 perform the change of phase on only one baseband signal). The present description discusses performing a change of phase on one precoded baseband signal (i.e., in FIGS. 3, 4, 6, 12, 25, 29, and 51) namely on precoded baseband signal z2'. Here, PHASE[k] is calculated as follows.

[Math. 54]

$$\text{PHASE}[k] = \frac{k\pi}{N} \text{ radians} \qquad \text{(formula 54)}$$

where k=0, 1, 2, . . . , N−2, N−1 (k denotes an integer that satisfies 0≤k≤N−1).

Accordingly, the reception device is able to achieve improvements in data reception quality in the LOS environment, and especially in a radio wave propagation environment. In the LOS environment, when the change of phase has not been performed, a regular phase relationship holds. However, when the change of phase is performed, the phase relationship is modified, in turn avoiding poor conditions in a burst-like propagation environment. As an alternative to formula 54, PHASE[k] may be calculated as follows.

[Math. 55]

$$\text{PHASE}[k] = -\frac{k\pi}{N} \text{ radians} \qquad \text{(formula 55)}$$

where k=0, 1, 2, . . . , N−2, N−1 (k denotes an integer that satisfies 0≤k≤N−1).

As a further alternative phase changing scheme, PHASE [k] may be calculated as follows.

[Math. 56]

$$\text{PHASE}[k] = \frac{k\pi}{N} + Z \text{ radians} \quad \text{(formula 56)}$$

where k=0, 1, 2, . . . , N−2, N−1 (k denotes an integer that satisfies 0≤k≤N−1), and Z is a fixed value.

As a further alternative phase changing scheme, PHASE [k] may be calculated as follows.

[Math. 57]

$$\text{PHASE}[k] = -\frac{k\pi}{N} + Z \text{ radians} \quad \text{(formula 57)}$$

where k=0, 1, 2, . . . , N−2, N−1 (k denotes an integer that satisfies 0≤k≤N−1), and Z is a fixed value.

As such, by performing the change of phase according to the present embodiment, the reception device is made more likely to obtain good reception quality.

The change of phase of the present embodiment is applicable not only to single-carrier schemes but also to multi-carrier schemes. Accordingly, the present embodiment may also be realized using, for example, spread-spectrum communications, OFDM, SC-FDMA, SC-OFDM, wavelet OFDM as described in Non-Patent Literature 7, and so on. As previously described, while the present embodiment explains the change of phase by changing the phase with respect to the time domain t, the phase may alternatively be changed with respect to the frequency domain as described in Embodiment 1. That is, considering the change of phase in the time domain t described in the present embodiment and replacing t with f (f being the ((sub-) carrier) frequency) leads to a change of phase applicable to the frequency domain. Also, as explained above for Embodiment 1, the phase changing scheme of the present embodiment is also applicable to a change of phase in both the time domain and the frequency domain. Further, when the phase changing scheme described in the present embodiment satisfies the conditions indicated in Embodiment A1, the reception device is highly likely to obtain good data quality.

Embodiment C5

The present embodiment concerns a phase changing scheme different from the phase changing schemes described in Embodiment 1, in the Supplement, and in Embodiment C4.

In Embodiment 1, formula 36 is given as an example of a precoding matrix, and in the Supplement, formula 50 is similarly given as another such example. In Embodiment A1, the phase changers from FIGS. 3, 4, 6, 12, 25, 29, 51, and 53 are indicated as having a phase changing value of PHASE[i] (where i=0, 1, 2, . . . , N−2, N−1 (i denotes an integer that satisfies 0≤i≤N−1)) to achieve a period (cycle) of N (value reached given that FIGS. 3, 4, 6, 12, 25, 29, 51, and 53 perform the change of phase on only one baseband signal). The present description discusses performing a change of phase on one precoded baseband signal (i.e., in FIGS. 3, 4, 6, 12, 25, 29, 51 and 53) namely on precoded baseband signal z2'.

The characteristic feature of the phase changing scheme pertaining to the present embodiment is the period (cycle) of N=2n+1. To achieve the period (cycle) of N=2n+1, n+1 different phase changing values are prepared. Among these n+1 different phase changing values, n phase changing values are used twice per period (cycle), and one phase changing value is used only once per period (cycle), thus achieving the period (cycle) of N=2n+1. The following describes these phase changing values in detail.

The n+1 different phase changing values required to achieve a phase changing scheme in which the phase changing value is regularly switched in a period (cycle) of N=2n+1 are expressed as PHASE[0], PHASE[1], PHASE[i], . . . , PHASE[n−1], PHASE[n] (where i=0, 1, 2, . . . , n−2, n−1, n (i denotes an integer that satisfies 0≤i≤n)). Here, the n+1 different phase changing values of PHASE[0], PHASE[1], PHASE[i], . . . , PHASE[n−1], PHASE[n] are expressed as follows.

[Math. 58]

$$\text{PHASE}[k] = \frac{2k\pi}{2n+1} \text{ radians} \quad \text{(formula 58)}$$

where k=0, 1, 2, . . . , n−2, n−1, n (k denotes an integer that satisfies 0≤k≤n). The n+1 different phase changing values PHASE[0], PHASE[1], PHASE[i], . . . , PHASE[n−1], PHASE[n] are given by formula 58. PHASE[0] is used once, while PHASE[1] through PHASE[n] are each used twice (i.e., PHASE[1] is used twice, PHASE[2] is used twice, and so on, until PHASE[n−1] is used twice and PHASE[n] is used twice). As such, through this phase changing scheme in which the phase changing value is regularly switched in a period (cycle) of N=2n+1, a phase changing scheme is realized in which the phase changing value is regularly switched between fewer phase changing values. Thus, the reception device is able to achieve better data reception quality. As the phase changing values are fewer, the effect thereof on the transmission device and reception device may be reduced. According to the above, the reception device is able to achieve improvements in data reception quality in the LOS environment, and especially in a radio wave propagation environment. In the LOS environment, when the change of phase has not been performed, a regular phase relationship occurs. However, when the change of phase is performed, the phase relationship is modified, in turn avoiding poor conditions in a burst-like propagation environment. As an alternative to formula 54, PHASE[k] may be calculated as follows.

[Math. 59]

$$\text{PHASE}[k] = -\frac{2k\pi}{2n+1} \text{ radians} \quad \text{(formula 59)}$$

where k=0, 1, 2, . . . , n−2, n−1, n (k denotes an integer that satisfies 0≤k≤n).

The n+1 different phase changing values PHASE[0], PHASE[1], . . . , PHASE[i], . . . , PHASE[n−1], PHASE[n] are given by formula 59. PHASE[0] is used once, while PHASE[1] through PHASE[n] are each used twice (i.e., PHASE[1] is used twice, PHASE[2] is used twice, and so on, until PHASE[n−1] is used twice and PHASE[n] is used twice). As such, through this phase changing scheme in which the phase changing value is regularly switched in a period (cycle) of N=2n+1, a phase changing scheme is realized in which the phase changing value is regularly switched between fewer phase changing values. Thus, the reception device is able to achieve better data reception quality. As the phase changing values are fewer, the effect thereof on the transmission device and reception device may be reduced.

As a further alternative, PHASE[k] may be calculated as follows.

[Math. 60]

$$\text{PHASE}[k] = \frac{2k\pi}{2n+1} + Z \text{ radians} \quad \text{(formula 60)}$$

where k=0, 1, 2, . . . , n−2, n−1, n (k denotes an integer that satisfies 0≤k≤n) and Z is a fixed value.

The n+1 different phase changing values PHASE[0], PHASE[1], . . . , PHASE[i], . . . , PHASE[n−1], PHASE[n] are given by formula 60. PHASE[0] is used once, while PHASE[1] through PHASE[n] are each used twice (i.e., PHASE[1] is used twice, PHASE[2] is used twice, and so on, until PHASE[n−1] is used twice and PHASE[n] is used twice). As such, through this phase changing scheme in which the phase changing value is regularly switched in a period (cycle) of N=2n+1, a phase changing scheme is realized in which the phase changing value is regularly switched between fewer phase changing values. Thus, the reception device is able to achieve better data reception quality. As the phase changing values are fewer, the effect thereof on the transmission device and reception device may be reduced.

As a further alternative, PHASE[k] may be calculated as follows.

[Math. 61]

$$\text{PHASE}[k] = -\frac{2k\pi}{2n+1} + Z \text{ radians} \quad \text{(formula 61)}$$

where k=0, 1, 2, . . . , n−2, n−1, n(k denotes an integer that satisfies 0≤k≤n) and Z is a fixed value.

The n+1 different phase changing values PHASE[0], PHASE[1], . . . , PHASE[i], . . . , PHASE[n−1], PHASE[n] are given by formula 61. PHASE[0] is used once, while PHASE[1] through PHASE[n] are each used twice (i.e., PHASE[1] is used twice, PHASE[2] is used twice, and so on, until PHASE[n−1] is used twice and PHASE[n] is used twice). As such, through this phase changing scheme in which the phase changing value is regularly switched in a period (cycle) of N=2n+1, a phase changing scheme is realized in which the phase changing value is regularly switched between fewer phase changing values. Thus, the reception device is able to achieve better data reception quality. As the phase changing values are smaller, the effect thereof on the transmission device and reception device may be reduced.

As such, by performing the change of phase according to the present embodiment, the reception device is made more likely to obtain good reception quality.

The change of phase of the present embodiment is applicable not only to single-carrier schemes but also to transmission using multi-carrier schemes. Accordingly, the present embodiment may also be realized using, for example, spread-spectrum communications, OFDM, SC-FDMA, SC-OFDM, wavelet OFDM as described in Non-Patent Literature 7, and so on. As previously described, while the present embodiment explains the change of phase as a change of phase with respect to the time domain t, the phase may alternatively be changed with respect to the frequency domain as described in Embodiment 1. That is, considering the change of phase with respect to the time domain t described in the present embodiment and replacing t with f (f being the ((sub-) carrier) frequency) leads to a change of phase applicable to the frequency domain. Also, as explained above for Embodiment 1, the phase changing scheme of the present embodiment is also applicable to a change of phase with respect to both the time domain and the frequency domain.

Embodiment C6

The present embodiment describes a scheme for regularly changing the phase, specifically that of Embodiment C5, when encoding is performed using block codes as described in Non-Patent Literature 12 through 15, such as QC LDPC Codes (not only QC-LDPC but also LDPC codes may be used), concatenated LDPC (blocks) and BCH codes, Turbo codes or Duo-Binary Turbo Codes using tail-biting, and so on. The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

FIG. 34 illustrates the varying numbers of symbols and slots needed in two coded blocks when block codes are used. FIG. 34 illustrates the varying numbers of symbols and slots needed in each coded block when block codes are used when, for example, two streams s1 and s2 are transmitted as indicated by the transmission device from FIG. 4, and the transmission device has only one encoder. (Here, the transmission scheme may be any single-carrier scheme or multi-carrier scheme such as OFDM.)

As shown in FIG. 34, when block codes are used, there are 6000 bits making up a single coded block. In order to transmit these 6000 bits, the number of required symbols depends on the modulation scheme, being 3000 symbols for QPSK, 1500 symbols for 16-QAM, and 1000 symbols for 64-QAM.

Then, given that the transmission device from FIG. 4 transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols are required for each of s1 and s2.

By the same reasoning, when the modulation scheme is 16-QAM, 750 slots are needed to transmit all of the bits making up one coded block, and when the modulation scheme is 64-QAM, 500 slots are needed to transmit all of the bits making up one coded block.

The following describes the relationship between the above-defined slots and the phase, as pertains to schemes for a regular change of phase.

Here, five different phase changing values (or phase changing sets) are assumed as having been prepared for use in the scheme for a regular change of phase, which has a period (cycle) of five. That is, the phase changer of the transmission device from FIG. 4 uses five phase changing values (or phase changing sets) to achieve the period (cycle) of five. However, as described in Embodiment C5, three different phase changing values are present. Accordingly, some of the five phase changing values needed for the period (cycle) of five are identical. (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). The five phase changing values (or phase changing sets) needed for the period (cycle) of five are expressed as P[0], P[1], P[2], P[3], and P[4].

The following describes the relationship between the above-defined slots and the phase, as pertains to schemes for a regular change of phase.

For the above-described 1500 slots needed to transmit the 6000 bits making up a single coded block when the modulation scheme is QPSK, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots. This is due to the fact that any bias in phase changing value usage causes great influence to be exerted by the more frequently used phase changing value, and that the reception device is dependent on such influence for data reception quality.

Similarly, for the above-described 750 slots needed to transmit the 6000 bits making up a single coded block when the modulation scheme is 16-QAM, phase changing value P[0] is used on 150 slots, phase changing value P[1] is used on 150 slots, phase changing value P[2] is used on 150 slots, phase changing value P[3] is used on 150 slots, and phase changing value P[4] is used on 150 slots.

Furthermore, for the above-described 500 slots needed to transmit the 6000 bits making up a single coded block when the modulation scheme is 64-QAM, phase changing value P[0] is used on 100 slots, phase changing value P[1] is used on 100 slots, phase changing value P[2] is used on 100 slots, phase changing value P[3] is used on 100 slots, and phase changing value P[4] is used on 100 slots.

As described above, a phase changing scheme for a regular change of phase changing value as given in Embodiment C5 requires the preparation of N=2n+1 phase changing values P[0], P[1], . . . , P[2n−1], P[2n] (where P[0], P[1], . . . , P[2n−1], P[2n] are expressed as PHASE[0], PHASE[1], PHASE[2], . . . , PHASE[n−1], PHASE[n] (see Embodiment C5)). As such, in order to transmit all of the bits making up a single coded block, phase changing value P[0] is used on $K_0$ slots, phase changing value P[1] is used on $K_1$ slots, phase changing value P[i] is used on $K_i$ slots (where i=0, 1, 2, . . . , 2n−1, 2n (i denotes an integer that satisfies 0≤i≤2n)), and phase changing value P[2n] is used on $K_{2n}$ slots, such that Condition #C01 is met.

(Condition #C01)

$K_0=K_1 \ldots =K_i= \ldots K_{2n}$. That is, $K_a=K_b$ (∀a and ∀b where a, b, =0, 1, 2, . . . , 2n−1, 2n (a denotes an integer that satisfies 0≤a≤2n, b denotes an integer that satisfies 0≤b≤2n), a≠b).

A phase changing scheme for a regular change of phase changing value as given in Embodiment C5 having a period (cycle) of N=2n+1 requires the preparation of phase changing values PHASE[0], PHASE[1], PHASE[2], . . . , PHASE[n−1], PHASE[n]. As such, in order to transmit all of the bits making up a single coded block, phase changing value PHASE[0] is used on $G_0$ slots, phase changing value PHASE[1] is used on $G_1$ slots, phase changing value PHASE[i] is used on $G_i$ slots (where i=0, 1, 2, . . . , n−1, n (i denotes an integer that satisfies 0≤i≤n), and phase changing value PHASE[n] is used on $G_n$ slots, such that Condition #C01 is met. Condition #C01 may be modified as follows.

(Condition #C02)

$2\times G_0=G_1 \ldots =G_i= \ldots G_n$. That is, $2\times G_0=G_a$ (∀a where a=1, 2, . . . , n−1, n (a denotes an integer that satisfies 1≤a≤n)).

Then, when a communication system that supports multiple modulation schemes selects one such supported scheme for use, Condition #C01 (or Condition #C02) should preferably be met for the supported modulation scheme.

However, when multiple modulation schemes are supported, each such modulation scheme typically uses symbols transmitting a different number of bits per symbols (though some may happen to use the same number), Condition #C01 (or Condition #C02) may not be satisfied for some modulation schemes. In such a case, the following condition applies instead of Condition #C01.

(Condition #C03)

The difference between $K_a$ and $K_b$ satisfies 0 or 1. That is, $|K_a-K_b|$ satisfies 0 or 1 (∀a, ∀b, where a, b=0, 1, 2, . . . , 2n−1, 2n (a denotes an integer that satisfies 0≤a≤2n, b denotes an integer that satisfies 0≤b≤2n) a≠b).

Alternatively, Condition #C03 may be expressed as follows.

(Condition #C04)

The difference between $G_a$ and $G_b$ satisfies 0, 1, or 2. That is, $|G_a-G_b|$ satisfies 0, 1, or 2 (∀a, ∀b, where a, b=1, 2, . . . , n−1, n (a denotes an integer that satisfies 1≤a≤n, b denotes an integer that satisfies 1≤b≤n), a≠b)

and

The difference between $2\times G_0$ and $G_a$ satisfies 0, 1, or 2. That is, $|2\times G_0-G_a|$ satisfies 0, 1, or 2 (∀a, where a=1, 2, . . . , n−1, n (a denotes an integer that satisfies 1≤a≤n)).

FIG. 35 illustrates the varying numbers of symbols and slots needed in two coded blocks when block codes are used. FIG. 35 illustrates the varying numbers of symbols and slots needed in each coded block when block codes are used when, for example, two streams s1 and s2 are transmitted as indicated by the transmission device from FIG. 3 and FIG. 12, and the transmission device has two encoders. (Here, the transmission scheme may be any single-carrier scheme or multi-carrier scheme such as OFDM.)

As shown in FIG. 35, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

The transmission device from FIG. 3 and the transmission device from FIG. 12 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up one coded block, and when the modulation scheme is 64-QAM, 1000 slots are needed to transmit all of the bits making up one coded block.

The following describes the relationship between the above-defined slots and the phase, as pertains to schemes for a regular change of phase.

Here, five different phase changing values (or phase changing sets) are assumed as having been prepared for use in the scheme for a regular change of phase, which has a period (cycle) of five. That is, the phase changer of the transmission device from FIG. 4 uses five phase changing values (or phase changing sets) to achieve the period (cycle) of five. However, as described in Embodiment C5, three different phase changing values are present. Accordingly, some of the five phase changing values needed for the period (cycle) of five are identical. (As in FIG. 6, five phase changing values are needed in order to perform the change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). The five phase changing values (or phase changing sets) needed for the period (cycle) of five are expressed as P[0], P[1], P[2], P[3], and P[4].

For the above-described 3000 slots needed to transmit the 6000×2 bits making up the pair of coded blocks when the modulation scheme is QPSK, phase changing value P[0] is used on 600 slots, phase changing value P[1] is used on 600 slots, phase changing value P[2] is used on 600 slots, phase changing value P[3] is used on 600 slots, and phase changing value P[4] is used on 600 slots. This is due to the fact that any bias in phase changing value usage causes great influence to be exerted by the more frequently used phase changing value, and that the reception device is dependent on such influence for data reception quality.

Further, in order to transmit the first coded block, phase changing value P[0] is used on slots 600 times, phase changing value P[1] is used on slots 600 times, phase changing value P[2] is used on slots 600 times, phase changing value P[3] is used on slots 600 times, and phase changing value PHASE[4] is used on slots 600 times. Furthermore, in order to transmit the second coded block, phase changing value P[0] is used on slots 600 times, phase changing value P[1] is used on slots 600 times, phase changing value P[2] is used on slots 600 times, phase changing value P[3] is used on slots 600 times, and phase changing value P[4] is used on slots 600 times.

Similarly, for the above-described 1500 slots needed to transmit the 6000×2 bits making up the pair of coded blocks when the modulation scheme is 16-QAM, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots.

Furthermore, in order to transmit the first coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times. Furthermore, in order to transmit the second coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times.

Furthermore, for the above-described 1000 slots needed to transmit the 6000×2 bits making up the two coded blocks when the modulation scheme is 64-QAM, phase changing value P[0] is used on 200 slots, phase changing value P[1] is used on 200 slots, phase changing value P[2] is used on 200 slots, phase changing value P[3] is used on 200 slots, and phase changing value P[4] is used on 200 slots.

Further, in order to transmit the first coded block, phase changing value P[0] is used on slots 200 times, phase changing value P[1] is used on slots 200 times, phase changing value P[2] is used on slots 200 times, phase changing value P[3] is used on slots 200 times, and phase changing value P[4] is used on slots 200 times. Furthermore, in order to transmit the second coded block, phase changing value P[0] is used on slots 200 times, phase changing value P[1] is used on slots 200 times, phase changing value P[2] is used on slots 200 times, phase changing value P[3] is used on slots 200 times, and phase changing value P[4] is used on slots 200 times.

As described above, a phase changing scheme for regularly varying the phase changing value as given in Embodiment C5 requires the preparation of N=2n+1 phase changing values P[0], P[1], . . . , P[2n−1], P[2n] (where P[0], P[1], . . . , P[2n−1], P[2n] are expressed as PHASE[0], PHASE[1], PHASE[2], . . . , PHASE[n−1], PHASE[n] (see Embodiment C5)). As such, in order to transmit all of the bits making up the two coded blocks, phase changing value P[0] is used on $K_0$ slots, phase changing value P[1] is used on $K_1$ slots, phase changing value P[i] is used on $K_i$ slots (where i=0, 1, 2, . . . , 2n−1, 2n (i denotes an integer that satisfies 0≤i≤2n)), and phase changing value P[2n] is used on $K_{2n}$ slots, such that Condition #C01 is met.

(Condition #C05)

$K_0=K_1 \ldots =K_i= \ldots K_{2n}$. That is, $K_a=K_b$ (∀a and ∀b where a, b, =0, 1, 2, . . . , 2n−1, 2n (a denotes an integer that satisfies 0≤a≤2n, b denotes an integer that satisfies 0≤b≤2n), a≠b). In order to transmit all of the bits making up the first coded block, phase changing value P[0] is used $K_{0,1}$ times, phase changing value P[1] is used $K_{1,1}$ times, phase changing value P[i] is used $K_{i,1}$ (where i=0, 1, 2, . . . , 2n−1, 2n (i denotes an integer that satisfies 0≤i≤2n)), and phase changing value P[2n] is used $K_{2n,1}$ times.

(Condition #C06)

$K_{0,1}==K_{1,1} \ldots =K_{i,1}= \ldots K_{2n,1}$. That is, $K_{a,1}=K_{b,1}$ (∀a and ∀b where a, b, =0, 1, 2, . . . , 2n−1, 2n (a denotes an integer that satisfies 0≤a≤2n, b denotes an integer that satisfies 0≤b≤2n), a≠b).

In order to transmit all of the bits making up the second coded block, phase changing value P[0] is used $K_{0,2}$ times, phase changing value P[1] is used $K_{1,2}$ times, phase changing value P[i] is used $K_{i,2}$ (where i=0, 1, 2, . . . , 2n−1, 2n (i denotes an integer that satisfies 0≤i≤2n)), and phase changing value P[2n] is used $K_{2n,2}$ times.

(Condition #C07)

$K_{0,2}=K_{1,2} \ldots =K_{i,2}= \ldots K_{2n,2}$. That is, $K_{a,2}=K_{b,2}$ (∀a and ∀b where a, b, =0, 1, 2, . . . , 2n−1, 2n (a denotes an integer that satisfies 0≤a≤2n, b denotes an integer that satisfies 0≤b≤2n), a≠b).

A phase changing scheme for regularly varying the phase changing value as given in Embodiment C5 having a period (cycle) of N=2n+1 requires the preparation of phase changing values PHASE[0], PHASE[1], PHASE[2], . . . , PHASE [n−1], PHASE[n]. As such, in order to transmit all of the bits making up the two coded blocks, phase changing value PHASE[0] is used on $G_0$ slots, phase changing value PHASE[1] is used on $G_1$ slots, phase changing value PHASE[i] is used on G slots (where i=0, 1, 2, . . . , n−1, n (i denotes an integer that satisfies 0≤i≤n)), and phase changing value PHASE[n] is used on $G_n$ slots, such that Condition #C05 is met.

(Condition #C08)

$2\times G_0=G_1 \ldots =G_i= \ldots G_n$. That is, $2\times G_0=G_a$ (∀a where a=1, 2, . . . , n−1, n (a denotes an integer that satisfies 1≤a≤n, b denotes an integer that satisfies 1≤b≤n)).

In order to transmit all of the bits making up the first coded block, phase changing value PHASE[0] is used $G_{0,1}$ times, phase changing value PHASE[1] is used $G_{1,1}$ times, phase changing value PHASE[i] is used $G_{i,1}$ (where i=0, 1, 2, . . . , n−1, n (i denotes an integer that satisfies 0≤i≤n)), and phase changing value PHASE[n] is used $G_{n,1}$ times.

(Condition #C09)

$2\times G_{0,1}=G_{1,1} \ldots =G_{i,1}= \ldots G_{n,1}$. That is, $2\times G_{0,1}=G_{a,1}$ (∀a where a=1, 2, . . . , n−1, n (a denotes an integer that satisfies 1≤a≤n)).

In order to transmit all of the bits making up the second coded block, phase changing value PHASE[0] is used $G_{0,2}$ times, phase changing value PHASE[1] is used $G_{1,2}$ times, phase changing value PHASE[i] is used $G_{i,2}$ (where i=0, 1, 2, . . . , n−1, n (i denotes an integer that satisfies 0≤i≤n)), and phase changing value PHASE[n] is used $G_{n,1}$ times.

(Condition #C10)

$2\times G_{0,2}=G_{1,2} \ldots =G_{i,2}= \ldots G_{n,2}$. That is, $2\times G_{0,2}=G_{a,2}$ (∀a where a=1, 2, . . . , n−1, n (a denotes an integer that satisfies 1≤a≤n)).

Then, when a communication system that supports multiple modulation schemes selects one such supported scheme for use, Condition #C05, Condition #C06, and Condition #C07 (or Condition #C08, Condition #C09, and Condition #C10) should preferably be met for the supported modulation scheme.

However, when multiple modulation schemes are supported, each such modulation scheme typically uses symbols transmitting a different number of bits per symbols (though some may happen to use the same number), Condition #C05, Condition #C06, and Condition #C07 (or Condition #C08, Condition #C09, and Condition #C10) may not be satisfied for some modulation schemes. In such a case, the following conditions apply instead of Condition #C05, Condition #C06, and Condition #C07.

(Condition #C11)

The difference between $K_a$ and $K_b$ satisfies 0 or 1. That is, $|K_a-K_b|$ satisfies 0 or 1 (∀a, ∀b, where a, b=0, 1, 2, . . . , 2n−1, 2n (a denotes an integer that satisfies 0≤a≤2n, b denotes an integer that satisfies 0≤b≤2n), a≠b).

(Condition #C12)

The difference between $K_{a,1}$ and $K_{b,1}$ satisfies 0 or 1. That is, $|K_{a,1}-K_{b,1}|$ satisfies 0 or 1 (∀a, ∀b, where a, b=0, 1, 2, . . . , 2n−1, 2n (a denotes an integer that satisfies 0≤a≤2n, b denotes an integer that satisfies 0≤b≤2n), a≠b).

(Condition #C13)

The difference between $K_{a,2}$ and $K_{b,2}$ satisfies 0 or 1. That is, $|K_{a,2}-K_{b,2}|$ satisfies 0 or 1 (∀a, ∀b, where a, b=0, 1, 2, . . . , 2n−1, 2n (a denotes an integer that satisfies 0≤a≤2n, b denotes an integer that satisfies 0≤b≤2n), a≠b).

Alternatively, Condition #C11, Condition #C12, and Condition #C13 may be expressed as follows.

(Condition #C14)

The difference between $G_a$ and $G_b$ satisfies 0, 1, or 2. That is, $|G_a-G_b|$ satisfies 0, 1, or 2 (∀a, ∀b, where a, b=1, 2, . . . , n−1, n (a denotes an integer that satisfies 1≤a≤n, b denotes an integer that satisfies 1≤b≤n), a≠b)

and

The difference between $2\times G_0$ and $G_a$ satisfies 0, 1, or 2. That is, $|2\times G_0-G_a|$ satisfies 0, 1, or 2 (∀a, where a=1, 2, . . . , n−1, n (a denotes an integer that satisfies 1≤a≤n)).

(Condition #C15)

The difference between $G_{a,1}$ and $G_{b,1}$ satisfies 0, 1, or 2. That is, $|G_{a,1}-G_{b,1}|$ satisfies 0, 1, or 2 (∀a, ∀b, where a, b=1, 2, . . . , n−1, n (a denotes an integer that satisfies 1≤a≤n, b denotes an integer that satisfies 1≤b≤n), a≠b)

and

The difference between $2\times G_{0,1}$ and $G_{a,1}$ satisfies 0, 1, or 2. That is, $|2\times G_{0,1}-G_{a,1}|$ satisfies 0, 1, or 2 (∀a, where a=1, 2, . . . , n−1, n (a denotes an integer that satisfies 1≤a≤n)).

(Condition #C16)

The difference between $G_{a,2}$ and $G_{b,2}$ satisfies 0, 1, or 2. That is, $G_{a,2}$ satisfies 0, 1, or 2 (∀a, ∀b, where a, b=1, 2, . . . , n−1, n (a denotes an integer that satisfies 1≤a≤n, b denotes an integer that satisfies 1≤b≤n), a≠b)

and

The difference between $2\times G_{0,2}$ and $G_{a,2}$ satisfies 0, 1, or 2. That is, $|2\times G_{0,2}-G_{a,2}|$ satisfies 0, 1, or 2 (∀a, where a=1, 2, . . . , n−1, n (a denotes an integer that satisfies 1≤a≤n)).

As described above, bias among the phase changing values being used to transmit the coded blocks is removed by creating a relationship between the coded block and the phase changing values. As such, data reception quality can be improved for the reception device.

In the present embodiment, N phase changing values (or phase changing sets) are needed in order to perform the change of phase having a period (cycle) of N with a regular phase changing scheme. As such, N phase changing values (or phase changing sets) P[0], P[1], P[2], . . . , P[N−2], and P[N−1] are prepared. However, schemes exist for ordering the phases in the stated order with respect to the frequency domain. No limitation is intended in this regard. The N phase changing values (or phase changing sets) P[0], P[1], P[2], . . . , P[N−2], and P[N−1] may also change the phases of blocks in the time domain or in the time-frequency domain to obtain a symbol arrangement as described in Embodiment 1. Although the above examples discuss a phase changing scheme with a period (cycle) of N, the same effects are obtainable using N phase changing values (or phase changing sets) at random. That is, the N phase changing values (or phase changing sets) need not always have regular periodicity. As long as the above-described conditions are satisfied, quality data reception improvements are realizable for the reception device.

Furthermore, given the existence of modes for spatial multiplexing MIMO schemes, MIMO schemes using a fixed precoding matrix, space-time block coding schemes, single-stream transmission, and schemes using a regular change of phase, the transmission device (broadcaster, base station) may select any one of these transmission schemes.

As described in Non-Patent Literature 3, spatial multiplexing MIMO schemes involve transmitting signals s1 and s2, which are mapped using a selected modulation scheme, on each of two different antennas. MIMO schemes using a fixed precoding matrix involve performing precoding only (with no change of phase). Further, space-time block coding schemes are described in Non-Patent Literature 9, 16, and 17. Single-stream transmission schemes involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO schemes, MIMO schemes using a fixed precoding matrix, space-time block coding schemes, single-stream transmission, and schemes using a regular change of phase may be used. In particular, schemes using a regular change of phase on a selected (sub-)carrier group are preferably used to realize the present embodiment.

When a change of phase by, for example, a phase changing value for P[i] of X radians is performed on only one precoded baseband signal, the phase changers from FIGS. 3, 4, 6, 12, 25, 29, 51, and 53 multiply precoded baseband signal z2' by $e^{jX}$. Then, when a change of phase by, for example, a phase changing set for P[i] of X radians and Y radians is performed on both precoded baseband signals, the phase changers from FIGS. 26, 27, 28, 52, and 54 multiply precoded baseband signal z2' by $e^{jX}$ and multiply precoded baseband signal z1' by $e^{jY}$.

Embodiment C7

The present embodiment describes a scheme for regularly changing the phase, specifically as done in Embodiment A1 and Embodiment C6, when encoding is performed using block codes as described in Non-Patent Literature 12 through 15, such as QC LDPC Codes (not only QC-LDPC but also LDPC (block) codes may be used), concatenated LDPC and BCH codes, Turbo codes or Duo-Binary Turbo Codes, and so on. The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

FIG. 34 illustrates the varying numbers of symbols and slots needed in one coded block when block codes are used. FIG. 34 illustrates the varying numbers of symbols and slots needed in each coded block when block codes are used when, for example, two streams s1 and s2 are transmitted as indicated by the transmission device from FIG. 4, and the transmission device has only one encoder. (Here, the transmission scheme may be any single-carrier scheme or multi-carrier scheme such as OFDM.)

As shown in FIG. 34, when block codes are used, there are 6000 bits making up a single coded block. In order to transmit these 6000 bits, the number of required symbols depends on the modulation scheme, being 3000 symbols for QPSK, 1500 symbols for 16-QAM, and 1000 symbols for 64-QAM.

Then, given that the transmission device from FIG. 4 transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up one coded block, and when the modulation scheme is 64-QAM, 500 slots are needed to transmit all of the bits making up one coded block.

The following describes the relationship between the above-defined slots and the phase, as pertains to schemes for a regular change of phase.

Here, five different phase changing values (or phase changing sets) are assumed as having been prepared for use in the scheme for a regular change of phase, which has a period (cycle) of five. The phase changing values (or phase changing sets) prepared in order to regularly change the phase with a period (cycle) of five are P[0], P[1], P[2], P[3], and P[4]. However, P[0], P[1], P[2], P[3], and P[4] should include at least two different phase changing values (i.e., P[0], P[1], P[2], P[3], and P[4] may include identical phase changing values). (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances).

For the above-described 1500 slots needed to transmit the 6000 bits making up a single coded block when the modulation scheme is QPSK, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots. This is due to the fact that any bias in phase changing value usage causes great influence to be exerted by the more frequently used phase changing value, and that the reception device is dependent on such influence for data reception quality.

Furthermore, for the above-described 750 slots needed to transmit the 6000 bits making up a single coded block when the modulation scheme is 16-QAM, phase changing value P[0] is used on 150 slots, phase changing value P[1] is used on 150 slots, phase changing value P[2] is used on 150 slots, phase changing value P[3] is used on 150 slots, and phase changing value P[4] is used on 150 slots.

Further, for the above-described 500 slots needed to transmit the 6000 bits making up a single coded block when the modulation scheme is 64-QAM, phase changing value P[0] is used on 100 slots, phase changing value P[1] is used on 100 slots, phase changing value P[2] is used on 100 slots, phase changing value P[3] is used on 100 slots, and phase changing value P[4] is used on 100 slots.

As described above, the phase changing values used in the phase changing scheme regularly switching between phase changing values with a period (cycle) of N are expressed as P[0], P[1], . . . , P[N−2], P[N−1]. However, P[0], P[1], . . . , P[N−2], P[N−1] should include at least two different phase changing values (i.e., P[0], P[1], . . . , P[N−2], P[N−1] may include identical phase changing values). In order to transmit all of the bits making up a single coded block, phase changing value P[0] is used on $K_0$ slots, phase changing value P[1] is used on $K_1$ slots, phase changing value P[i] is used on $K_i$ slots (where i=0, 1, 2, . . . , N−1 (i denotes an integer that satisfies 0≤i≤N−1)), and phase changing value P[N−1] is used on $K_{N-1}$ slots, such that Condition #C17 is met.

(Condition #C17)

$K_0=K_1 \ldots =K_i= \ldots K_{N-1}$. That is, $K_a=K_b$ (∀a and ∀b where a, b, =0, 1, 2, . . . , N−1 (a denotes an integer that satisfies 0≤a≤N−1, b denotes an integer that satisfies 0≤b≤N−1), a≠b).

Then, when a communication system that supports multiple modulation schemes selects one such supported scheme for use, Condition #C17 should preferably be met for the supported modulation scheme.

However, when multiple modulation schemes are supported, each such modulation scheme typically uses symbols transmitting a different number of bits per symbols (though some may happen to use the same number), Condition #C17 may not be satisfied for some modulation schemes. In such a case, the following condition applies instead of Condition #C17.

(Condition #C18)

The difference between $K_a$ and $K_b$ satisfies 0 or 1. That is, $|K_a-K_b|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b).

FIG. 35 illustrates the varying numbers of symbols and slots needed in two coded block when block codes are used. FIG. 35 illustrates the varying numbers of symbols and slots needed in each coded block when block codes are used when, for example, two streams s1 and s2 are transmitted as indicated by the transmission device from FIG. 3 and FIG. 12, and the transmission device has two encoders. (Here, the transmission scheme may be any single-carrier scheme or multi-carrier scheme such as OFDM.)

As shown in FIG. 35, when block codes are used, there are 6000 bits making up a single coded block. In order to transmit these 6000 bits, the number of required symbols depends on the modulation scheme, being 3000 symbols for QPSK, 1500 symbols for 16-QAM, and 1000 symbols for 64-QAM.

The transmission device from FIG. 3 and the transmission device from FIG. 12 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up one coded block, and when the modulation scheme is 64-QAM, 1000 slots are needed to transmit all of the bits making up one coded block.

The following describes the relationship between the above-defined slots and the phase, as pertains to schemes for a regular change of phase.

Here, five different phase changing values (or phase changing sets) are assumed as having been prepared for use in the scheme for a regular change of phase, which has a period (cycle) of five. That is, the phase changer of the transmission device from FIG. 4 uses five phase changing values (or phase changing sets) P[0], P[1], P[2], P[3], and P[4] to achieve the period (cycle) of five. However, P[0], P[1], P[2], P[3], and P[4] should include at least two different phase changing values (i.e., P[0], P[1], P[2], P[3], and P[4] may include identical phase changing values). (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). The five phase changing values (or phase changing sets) needed for the period (cycle) of five are expressed as P[0], P[1], P[2], P[3], and P[4].

For the above-described 3000 slots needed to transmit the 6000×2 bits making up the pair of coded blocks when the modulation scheme is QPSK, phase changing value P[0] is used on 600 slots, phase changing value P[1] is used on 600 slots, phase changing value P[2] is used on 600 slots, phase changing value P[3] is used on 600 slots, and phase changing value P[4] is used on 600 slots. This is due to the fact that any bias in phase changing value usage causes great influence to be exerted by the more frequently used phase changing value, and that the reception device is dependent on such influence for data reception quality.

Further, in order to transmit the first coded block, phase changing value P[0] is used on slots 600 times, phase changing value P[1] is used on slots 600 times, phase changing value P[2] is used on slots 600 times, phase changing value P[3] is used on slots 600 times, and phase changing value P[4] is used on slots 600 times. Furthermore, in order to transmit the second coded block, phase changing value P[0] is used on slots 600 times, phase changing value P[1] is used on slots 600 times, phase changing value P[2] is used on slots 600 times, phase changing value P[3] is used on slots 600 times, and phase changing value P[4] is used on slots 600 times.

Similarly, for the above-described 1500 slots needed to transmit the 6000×2 bits making up the pair of coded blocks when the modulation scheme is 16-QAM, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots.

Further, in order to transmit the first coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times. Furthermore, in order to transmit the second coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times.

Similarly, for the above-described 1000 slots needed to transmit the 6000×2 bits making up the pair of coded blocks when the modulation scheme is 64-QAM, phase changing value P[0] is used on 200 slots, phase changing value P[1] is used on 200 slots, phase changing value P[2] is used on 200 slots, phase changing value P[3] is used on 200 slots, and phase changing value P[4] is used on 200 slots.

Further, in order to transmit the first coded block, phase changing value P[0] is used on slots 200 times, phase changing value P[1] is used on slots 200 times, phase changing value P[2] is used on slots 200 times, phase changing value P[3] is used on slots 200 times, and phase changing value P[4] is used on slots 200 times. Furthermore, in order to transmit the second coded block, phase changing value P[0] is used on slots 200 times, phase changing value P[1] is used on slots 200 times, phase changing value P[2]

is used on slots 200 times, phase changing value P[3] is used on slots 200 times, and phase changing value P[4] is used on slots 200 times.

As described above, the phase changing values used in the phase changing scheme regularly switching between phase changing values with a period (cycle) of N are expressed as P[0], P[1], . . . , P[N−2], P[N−1]. However, P[0], P[1], . . . , P[N−2], P[N−1] should include at least two different phase changing values (i.e., P[0], P[1], . . . , P[N−2], P[N−1] may include identical phase changing values). In order to transmit all of the bits making up two coded blocks, phase changing value P[0] is used on K0 slots, phase changing value P[1] is used on $K_1$ slots, phase changing value P[i] is used on $K_i$ slots (where i=0, 1, 2, . . . , N−1 (i denotes an integer that satisfies 0≤i≤N−1)), and phase changing value P[N−1] is used on $K_{N-1}$ slots, such that Condition #C19 is met.

(Condition #C19)

$K_0=K_1 \ldots =K_i= \ldots K_{N-1}$. That is, $K_a=K_b$ (∀a and ∀b where a, b, =0, 1, 2, . . . , N−1 (a denotes an integer that satisfies 0≤a≤N−1, b denotes an integer that satisfies 0≤b≤N−1), a≠b).

In order to transmit all of the bits making up the first coded block, phase changing value P[0] is used $K_{0,1}$ times, phase changing value P[1] is used $K_1$,1 times, phase changing value P[i] is used $K_{i,1}$ (where i=0, 1, 2, . . . , N−1 (i denotes an integer that satisfies 0≤i≤N−1)), and phase changing value P[N−1] is used $K_{N-1,1}$ times.

(Condition #C20)

$K_{0,1}=K_{1,1}= \ldots K_{i,1}= \ldots K_{N-1,1}$. That is, $K_{a,1}=K_{b,1}$ (∀a and ∀b where a, b, =0, 1, 2, . . . , N−1 (a denotes an integer that satisfies 0≤a≤N−1, b denotes an integer that satisfies 0≤b≤N−1), a≠b).

In order to transmit all of the bits making up the second coded block, phase changing value P[0] is used $K_{0,2}$ times, phase changing value P[1] is used $K_{1,2}$ times, phase changing value P[i] is used $K_{i,2}$ (where i=0, 1, 2, . . . , N−1 (i denotes an integer that satisfies 0≤i≤N−1)), and phase changing value P[N−1] is used $K_{N-1,2}$ times.

(Condition #C21)

$K_{0,2}=K_{1,2}= \ldots K_{i,2}= \ldots K_{N-1,2}$. That is, $K_{a,2}=K_{b,2}$ (∀a and ∀b where a, b, =0, 1, 2, . . . , N−1 (a denotes an integer that satisfies 0≤a≤N−1, b denotes an integer that satisfies 0≤b≤N−1), a≠b).

Then, when a communication system that supports multiple modulation schemes selects one such supported scheme for use, Condition #C19, Condition #C20, and Condition #C21 are preferably met for the supported modulation scheme.

However, when multiple modulation schemes are supported, each such modulation scheme typically uses symbols transmitting a different number of bits per symbols (though some may happen to use the same number), Condition #C19, Condition #C20, and Condition #C21 may not be satisfied for some modulation schemes. In such a case, the following conditions apply instead of Condition #C19, Condition #C20, and Condition #C21.

(Condition #C22)

The difference between $K_a$ and $K_b$ satisfies 0 or 1. That is, $|K_a-K_b|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b).

(Condition #C23)

The difference between $K_{a,1}$ and $K_{b,1}$ satisfies 0 or 1. That is, $|K_{a,1}-K_{b,1}|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b).

(Condition #C24)

The difference between $K_{a,2}$ and $K_{b,2}$ satisfies 0 or 1. That is, $|K_{a,2}-K_{b,2}|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b).

As described above, bias among the phase changing values being used to transmit the coded blocks is removed by creating a relationship between the coded block and the phase changing values. As such, data reception quality can be improved for the reception device.

In the present embodiment, N phase changing values (or phase changing sets) are needed in order to perform a change of phase having a period (cycle) of N with the scheme for a regular change of phase. As such, N phase changing values (or phase changing sets) P[0], P[1], P[2], . . . , P[N−2], and P[N−1] are prepared. However, schemes exist for ordering the phases in the stated order with respect to the frequency domain. No limitation is intended in this regard. The N phase changing values (or phase changing sets) P[0], P[1], P[2], . . . , P[N−2], and P[N−1] may also change the phases of blocks in the time domain or in the time-frequency domain to obtain a symbol arrangement as described in Embodiment 1. Although the above examples discuss a phase changing scheme with a period (cycle) of N, the same effects are obtainable using N phase changing values (or phase changing sets) at random. That is, the N phase changing values (or phase changing sets) need not always have regular periodicity. As long as the above-described conditions are satisfied, great quality data reception improvements are realizable for the reception device.

Furthermore, given the existence of modes for spatial multiplexing MIMO schemes, MIMO schemes using a fixed precoding matrix, space-time block coding schemes, single-stream transmission, and schemes using a regular change of phase, the transmission device (broadcaster, base station) may select any one of these transmission schemes.

As described in Non-Patent Literature 3, spatial multiplexing MIMO schemes involve transmitting signals s1 and s2, which are mapped using a selected modulation scheme, on each of two different antennas. MIMO schemes using a fixed precoding matrix involve performing precoding only (with no change of phase). Further, space-time block coding schemes are described in Non-Patent Literature 9, 16, and 17. Single-stream transmission schemes involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO schemes, MIMO schemes using a fixed precoding matrix, space-time block coding schemes, single-stream transmission, and schemes using a regular change of phase may be used. In particular, schemes using a regular change of phase on a selected (sub-)carrier group are preferably used to realize the present embodiment.

When a change of phase by, for example, a phase changing value for P[i] of X radians is performed on only one precoded baseband signal, the phase changers of FIGS. 3, 4, 6, 12, 25, 29, 51, and 53 multiply precoded baseband signal z2' by $e^{jX}$. Then, when a change of phase by, for example, a phase changing set for P[i] of X radians and Y radians is performed on both precoded baseband signals, the phase changers from FIGS. 26, 27, 28, 52, and 54 multiply precoded baseband signal z2' by $e^{jX}$ and multiply precoded baseband signal z1' by $e^{jY}$.

Embodiment D1

Figure 67:
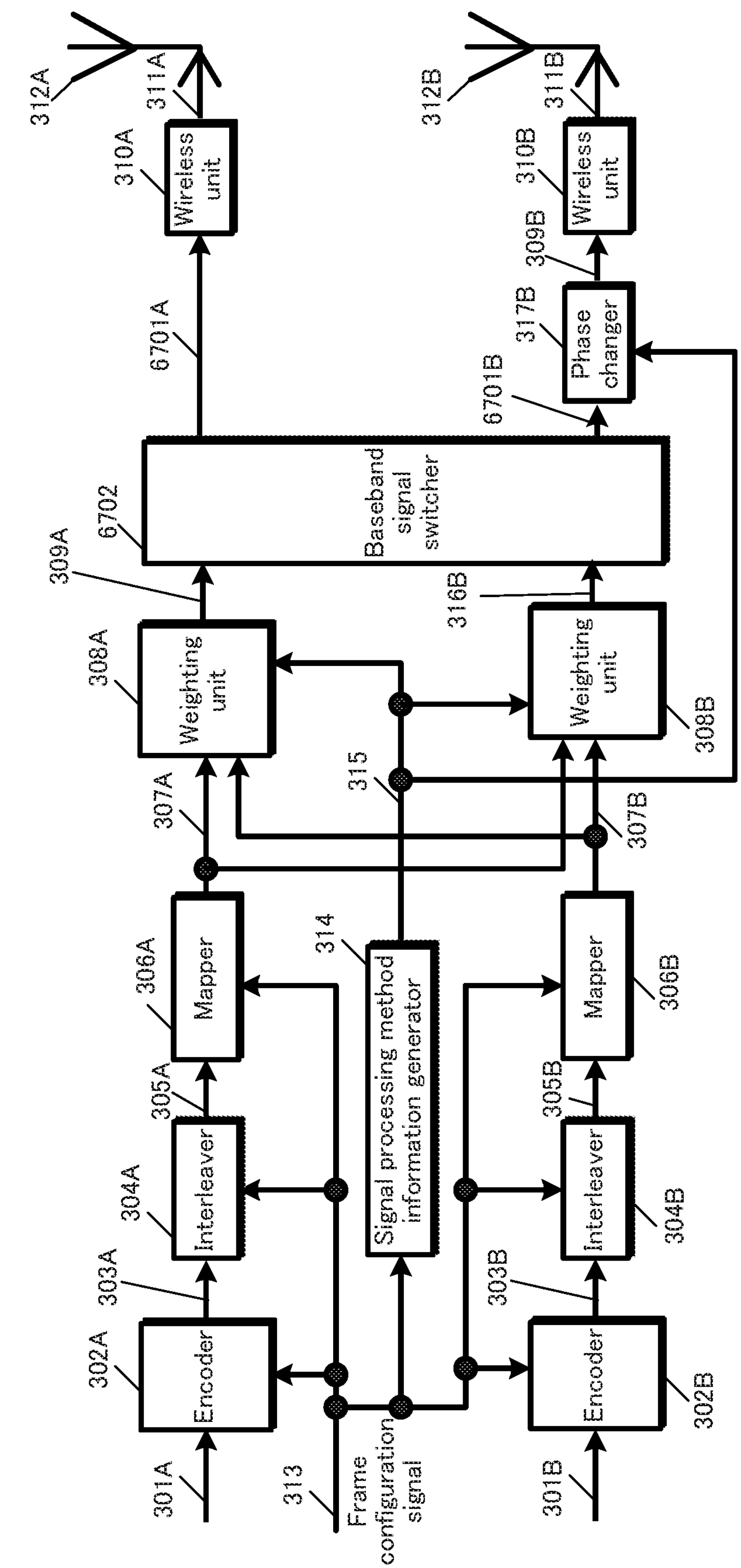
FIG. 67 illustrates yet still another sample configuration of a transmission device.

The present embodiment is first described as a variation of Embodiment 1. FIG. 67 illustrates a sample transmission device pertaining to the present embodiment. Components thereof operating identically to those of FIG. 3 use the same reference numbers thereas, and the description thereof is omitted for simplicity, below. FIG. 67 differs from FIG. 3 in the insertion of a baseband signal switcher 6702 directly following the weighting units. Accordingly, the following explanations are primarily centered on the baseband signal switcher 6702.

FIG. 21 illustrates the configuration of the weighting units 308A and 308B. The area of FIG. 21 enclosed in the dashed line represents one of the weighting units. Baseband signal 307A is multiplied by w11 to obtain w11·s1($t$), and multiplied by w21 to obtain w21·s1($t$). Similarly, baseband signal 307B is multiplied by w12 to obtain w12·s2($t$), and multiplied by w22 to obtain w22·s2($t$). Next, z1($t$)=w11·s1($t$)+w12·s2($t$) and z2($t$)=w21·s1($t$)+w22·s22($t$) are obtained. Here, as explained in Embodiment 1, s1($t$) and s2($t$) are baseband signals modulated according to a modulation scheme such as BPSK, QPSK, 8-PSK, 16-QAM, 32-QAM, 64-QAM, 256-QAM, 16-APSK and so on. Both weighting units perform weighting using a fixed precoding matrix. The precoding matrix uses, for example, the scheme of formula 62, and satisfies the conditions of formula 63 or formula 64, all found below. However, this is only an example. The value of a is not limited to formula 63 and formula 64, and may, for example, be 1, or may be 0 (a is preferably a real number greater than or equal to 0, but may be also be an imaginary number).

Here, the precoding matrix is

[Math. 62]

$$\begin{pmatrix} w11 & w12 \\ w21 & w22 \end{pmatrix} = \frac{1}{\sqrt{\alpha^2+1}}\begin{pmatrix} e^{j0} & \alpha\times e^{j0} \\ \alpha\times e^{j0} & e^{j\pi} \end{pmatrix} \quad \text{(formula 62)}$$

In formula 62 above,

[Math. 63]

$$\alpha = \frac{\sqrt{2}+4}{\sqrt{2}+2} \quad \text{(formula 63)}$$

α is given by formula 63.

Alternatively, in formula 62,

[Math. 64]

$$\alpha = \frac{\sqrt{2}+3+\sqrt{5}}{\sqrt{2}+3-\sqrt{5}} \quad \text{(formula 64)}$$

α may be given by formula 64.

Alternatively, the precoding matrix is not restricted to that of formula 62, but may also be:

[Math. 65]

$$\begin{pmatrix} w11 & w12 \\ w21 & w22 \end{pmatrix} = \begin{pmatrix} a & b \\ c & d \end{pmatrix} \quad \text{(formula 65)}$$

where $a=Ae^{j\delta 11}$, $b=Be^{j\delta 12}$, $c=Ce^{j\delta 21}$, and $d=De^{j\delta 22}$. Further, one of a, b, c, and d may be equal to zero. For example: (1) a may be zero while b, c, and d are non-zero, (2) b may be zero while a, c, and d are non-zero, (3) c may be zero while a, b, and d are non-zero, or (4) d may be zero while a, b, and c are non-zero.

Alternatively, any two of a, b, c, and d may be equal to zero. For example, (1) a and d may be zero while b and c are non-zero, or (2) b and c may be zero while a and d are non-zero.

When any of the modulation scheme, error-correcting codes, and the coding rate thereof are changed, the precoding matrix in use may also be set and changed, or the same precoding matrix may be used as-is.

Next, the baseband signal switcher 6702 from FIG. 67 is described. The baseband signal switcher 6702 takes weighted signal 309A and weighted signal 316B as input, performs baseband signal switching, and outputs switched baseband signal 6701A and switched baseband signal 6701B. The details of baseband signal switching are as described with reference to FIG. 55. The baseband signal switching performed in the present embodiment differs from that of FIG. 55 in terms of the signal used for switching. The following describes the baseband signal switching of the present embodiment with reference to FIG. 68.

Figure 68:
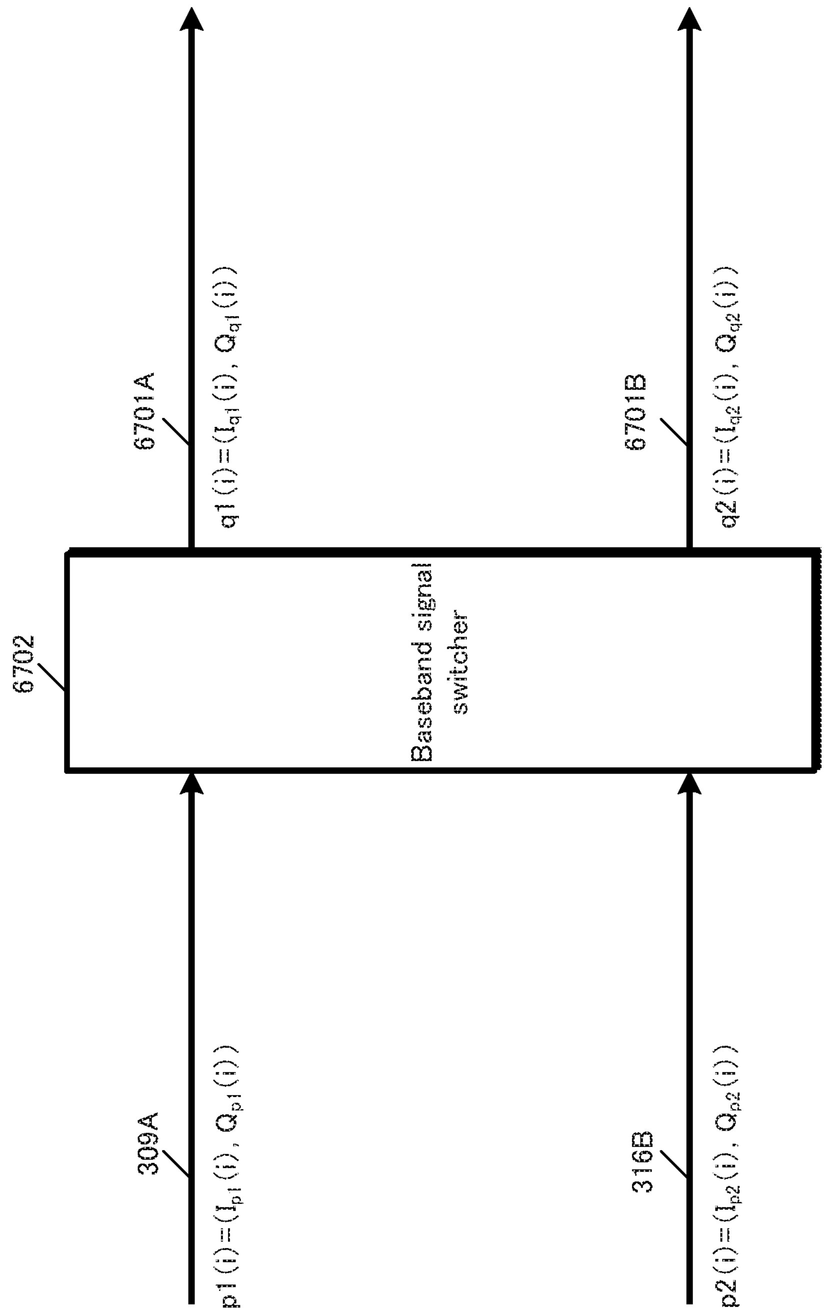
FIG. 68 illustrates another baseband signal switcher.

In FIG. 68, weighted signal 309A(p1($i$)) has an in-phase component I of $I_{p1}$(i) and a quadrature component Q of $Q_{p1}$(i), while weighted signal 316B(p2($i$)) has an in-phase component I of $I_{p2}$(i) and a quadrature component Q of $Q_{p2}$(i). In contrast, switched baseband signal 6701A(q1($i$)) has an in-phase component I of $I_{q1}$(i) and a quadrature component Q of $Q_{q1}$(i), while switched baseband signal 6701B(q2($i$) has an in-phase component I of $I_{q2}$(i) and a quadrature component Q of $Q_{q2}$(i). (Here, i represents (time or (carrier) frequency order). In the example of FIG. 67, i represents time, though i may also represent (carrier) frequency when FIG. 67 is applied to an OFDM scheme, as in FIG. 12. These points are elaborated upon below.)

Here, the baseband components are switched by the baseband signal switcher 6702, such that:

For switched baseband signal q1($i$), the in-phase component I may be $I_{p1}$(i) while the quadrature component Q may be $Q_{p2}$(i), and for switched baseband signal q2($i$), the in-phase component I may be $I_{p2}$(i) while the quadrature component q may be $Q_{p1}$(i). The modulated signal corresponding to switched baseband signal q1($i$) is transmitted by transmit antenna 1 and the modulated signal corresponding to switched baseband signal q2($i$) is transmitted from transmit antenna 2, simultaneously on a common frequency. As such, the modulated signal corresponding to switched baseband signal q1($i$) and the modulated signal corresponding to switched baseband signal q2($i$) are transmitted from different antennas, simultaneously on a common frequency. Alternatively, For switched baseband signal q1($i$), the in-phase component may be $I_{p1}$(i) while the quadrature component may be $I_{p2}$(i), and for switched baseband signal q2($i$), the in-phase component may be $Q_{p1}$(i) while the quadrature component may be $Q_{p2}$(i).

For switched baseband signal q1($i$), the in-phase component may be $I_{p2}(i)$ while the quadrature component may be $I_{p1}(i)$, and for switched baseband signal q2($i$), the in-phase component may be $Q_{p1}(i)$ while the quadrature component may be $Q_{p2}(i)$.

For switched baseband signal q1($i$), the in-phase component may be $I_{p1}(i)$ while the quadrature component may be $I_{p2}(i)$, and for switched baseband signal q2($i$), the in-phase component may be $Q_{p2}(i)$ while the quadrature component may be $Q_{p1}(i)$.

For switched baseband signal q1($i$), the in-phase component may be $I_{p2}(i)$ while the quadrature component may be $I_{p1}(i)$, and for switched baseband signal q2($i$), the in-phase component may be $Q_{p2}(i)$ while the quadrature component may be $Q_{p1}(i)$.

For switched baseband signal q1($i$), the in-phase component may be $I_{p1}(i)$ while the quadrature component may be $Q_{p2}(i)$, and for switched baseband signal q2($i$), the in-phase component may be $Q_{p1}(i)$ while the quadrature component may be $I_{p2}(i)$.

For switched baseband signal q1($i$), the in-phase component may be $Q_{p2}(i)$ while the quadrature component may be $I_{p1}(i)$, and for switched baseband signal q2($i$), the in-phase component may be $I_{p2}(i)$ while the quadrature component may be $Q_{p1}(i)$.

For switched baseband signal q1($i$), the in-phase component may be $Q_{p2}(i)$ while the quadrature component may be $I_{p1}(i)$, and for switched baseband signal q2($i$), the in-phase component may be $Q_{p1}(i)$ while the quadrature component may be $I_{p2}(i)$.

For switched baseband signal q2($i$), the in-phase component may be $I_{p1}(i)$ while the quadrature component may be $I_{p2}(i)$, and for switched baseband signal q1($i$), the in-phase component may be $Q_{p1}(i)$ while the quadrature component may be $Q_{p2}(i)$.

For switched baseband signal q2($i$), the in-phase component may be $I_{p2}(i)$ while the quadrature component may be $I_{p1}(i)$, and for switched baseband signal q1($i$), the in-phase component may be $Q_{p1}(i)$ while the quadrature component may be $Q_{p2}(i)$.

For switched baseband signal q2($i$), the in-phase component may be $I_{p1}(i)$ while the quadrature component may be $I_{p2}(i)$, and for switched baseband signal q1($i$), the in-phase component may be $Q_{p2}(i)$ while the quadrature component may be $Q_{p1}(i)$.

For switched baseband signal q2($i$), the in-phase component may be $I_{p2}(i)$ while the quadrature component may be $I_{p1}(i)$, and for switched baseband signal q1($i$), the in-phase component may be $Q_{p2}(i)$ while the quadrature component may be $Q_{p1}(i)$.

For switched baseband signal q2($i$), the in-phase component may be $I_{p1}(i)$ while the quadrature component may be $Q_{p2}(i)$, and for switched baseband signal q1($i$), the in-phase component may be $I_{p2}(i)$ while the quadrature component may be $Q_{p1}(i)$.

For switched baseband signal q2($i$), the in-phase component may be $I_{p1}(i)$ while the quadrature component may be $Q_{p2}(i)$, and for switched baseband signal q1($i$), the in-phase component may be $Q_{p1}(i)$ while the quadrature component may be $I_{p2}(i)$.

For switched baseband signal q2($i$), the in-phase component may be $Q_{p2}(i)$ while the quadrature component may be $I_{p1}(i)$, and for switched baseband signal q1($i$), the in-phase component may be $I_{p2}(i)$ while the quadrature component may be $Q_{p1}(i)$.

For switched baseband signal q2($i$), the in-phase component may be $Q_{p2}(i)$ while the quadrature component may be $I_{p1}(i)$, and for switched baseband signal q1($i$), the in-phase component may be $Q_{p1}(i)$ while the quadrature component may be $I_{p2}(i)$.

Alternatively, the weighted signals 309A and 316B are not limited to the above-described switching of in-phase component and quadrature component. Switching may be performed on in-phase components and quadrature components greater than those of the two signals.

Also, while the above examples describe switching performed on baseband signals having a common time (common (sub-)carrier) frequency), the baseband signals being switched need not necessarily have a common time (common (sub-)carrier) frequency). For example, any of the following are possible.

For switched baseband signal q1($i$), the in-phase component may be $I_{p1}(i+v)$ while the quadrature component may be $Q_{p2}(i+w)$, and for switched baseband signal q2($i$), the in-phase component may be $I_{p2}(i+w)$ while the quadrature component may be $Q_{p1}(i+v)$.

For switched baseband signal q1($i$), the in-phase component may be $I_{p1}(i+v)$ while the quadrature component may be $I_{p2}(i+w)$, and for switched baseband signal q2($i$), the in-phase component may be $Q_{p1}(i+v)$ while the quadrature component may be $Q_{p2}(i+w)$.

For switched baseband signal q1($i$), the in-phase component may be $I_{p2}(i+w)$ while the quadrature component may be $I_{p1}(i+v)$, and for switched baseband signal q2($i$), the in-phase component may be $Q_{p1}(i+v)$ while the quadrature component may be $Q_{p2}(i+w)$.

For switched baseband signal q1($i$), the in-phase component may be $I_{p1}(i+v)$ while the quadrature component may be $I_{p2}(i+w)$, and for switched baseband signal q2($i$), the in-phase component may be $Q_{p2}(i+w)$ while the quadrature component may be $Q_{p1}(i+v)$.

For switched baseband signal q1($i$), the in-phase component may be $I_{p2}(i+w)$ while the quadrature component may be $I_{p1}(i+v)$, and for switched baseband signal q2($i$), the in-phase component may be $Q_{p2}(i+w)$ while the quadrature component may be $Q_{p1}(i+v)$.

For switched baseband signal q1($i$), the in-phase component may be $I_{p1}(i+v)$ while the quadrature component may be $Q_{p2}(i+w)$, and for switched baseband signal q2($i$), the in-phase component may be $Q_{p1}(i+v)$ while the quadrature component may be $I_{p2}(i+w)$.

For switched baseband signal q1($i$), the in-phase component may be $Q_{p2}(i+w)$ while the quadrature component may be $I_{p1}(i+v)$, and for switched baseband signal q2($i$), the in-phase component may be $I_{p2}(i+w)$ while the quadrature component may be $Q_{p1}(i+v)$.

For switched baseband signal q1($i$), the in-phase component may be $Q_{p2}(i+w)$ while the quadrature component may be $I_{p1}(i+v)$, and for switched baseband signal q2($i$), the in-phase component may be $Q_{p1}(i+v)$ while the quadrature component may be $I_{p2}(i+w)$.

For switched baseband signal q2($i$), the in-phase component may be $I_{p1}(i+v)$ while the quadrature component may be $I_{p2}(i+w)$, and for switched baseband signal q1($i$), the in-phase component may be $Q_{p1}(i+v)$ while the quadrature component may be $Q_{p2}(i+w)$.

For switched baseband signal q2($i$), the in-phase component may be $I_{p2}(i+w)$ while the quadrature component may be $I_{p1}(i+v)$, and for switched baseband signal q1($i$), the in-phase component may be $Q_{p1}(i+v)$ while the quadrature component may be $Q_{p2}(i+w)$.

For switched baseband signal q2($i$), the in-phase component may be $I_{p1}(i+v)$ while the quadrature component may be $I_{p2}$(i+w), and for switched baseband signal q1(*i*), the in-phase component may be $Q_{p2}$(i+w) while the quadrature component may be $Q_{p1}$(i+v).

For switched baseband signal q2(*i*), the in-phase component may be $I_{p2}$(i+w) while the quadrature component may be $I_{p1}$(i+v), and for switched baseband signal q1(*i*), the in-phase component may be $Q_{p2}$(i+w) while the quadrature component may be $Q_{p1}$(i+v).

For switched baseband signal q2(*i*), the in-phase component may be $I_{p1}$(i+v) while the quadrature component may be $Q_{p2}$(i+w), and for switched baseband signal q1(*i*), the in-phase component may be $I_{p2}$(i+w) while the quadrature component may be $Q_{p1}$(i+v).

For switched baseband signal q2(*i*), the in-phase component may be $I_{p1}$(i+v) while the quadrature component may be $Q_{p2}$(i+w), and for switched baseband signal q1(*i*), the in-phase component may be $Q_{p1}$(i+v) while the quadrature component may be $I_{p2}$(i+w).

For switched baseband signal q2(*i*), the in-phase component may be $Q_{p2}$(i+w) while the quadrature component may be $I_{p1}$(i+v), and for switched baseband signal q1(*i*), the in-phase component may be $I_{p2}$(i+w) while the quadrature component may be $Q_{p1}$(i+v).

For switched baseband signal q2(*i*), the in-phase component may be $Q_{p2}$(i+w) while the quadrature component may be $I_{p1}$(i+v), and for switched baseband signal q1(*i*), the in-phase component may be $Q_{p1}$(i+v) while the quadrature component may be $I_{p2}$(i+w).

Here, weighted signal 309A(p1(*i*)) has an in-phase component I of $I_{p1}$(i) and a quadrature component Q of $Q_{p1}$(i), while weighted signal 316B(p2(*i*)) has an in-phase component I of $I_{p2}$(i) and a quadrature component Q of $Q_{p2}$(i). In contrast, switched baseband signal 6701A(q1(*i*)) has an in-phase component I of $I_q$i(i) and a quadrature component Q of $Q_{q1}$(i), while switched baseband signal 6701B(q2(*i*)) has an in-phase component $I_{q2}$(i) and a quadrature component Q of $Q_{q2}$(i).

In FIG. 68, as described above, weighted signal 309A(p1(*i*)) has an in-phase component I of $I_{p1}$(i) and a quadrature component Q of $Q_{p1}$(i), while weighted signal 316B(p2(*i*)) has an in-phase component I of $I_{p2}$(i) and a quadrature component Q of $Q_{p2}$(i). In contrast, switched baseband signal 6701A(q1(*i*)) has an in-phase component I of LAO and a quadrature component Q of $Q_{q1}$(i), while switched baseband signal 6701B(q2(*i*)) has an in-phase component LAO and a quadrature component Q of $Q_{q2}$(i).

As such, in-phase component I of LAO and quadrature component Q of $Q_{q1}$(i) of switched baseband signal 6701A (q1(*i*)) and in-phase component $I_{q2}$(*i*) and quadrature component Q of $Q_{q2}$(i) of baseband signal 6701B(q2(*i*)) are expressible as any of the above.

As such, the modulated signal corresponding to switched baseband signal 6701A(q1(*i*)) is transmitted from transmit antenna 312A, while the modulated signal corresponding to switched baseband signal 6701B(q2(*i*)) is transmitted from transmit antenna 312B, both being transmitted simultaneously on a common frequency. Thus, the modulated signals corresponding to switched baseband signal 6701A(q1(*i*)) and switched baseband signal 6701B(q2(*i*)) are transmitted from different antennas, simultaneously on a common frequency.

Phase changer 317B takes switched baseband signal 6701B and signal processing scheme information 315 as input and regularly changes the phase of switched baseband signal 6701B for output. This regular change is a change of phase performed according to a predetermined phase changing pattern having a predetermined period (cycle) (e.g., every n symbols (n being an integer, n>1) or at a predetermined interval). The phase changing pattern is described in detail in Embodiment 4.

Wireless unit 310B takes post-phase-change signal 309B as input and performs processing such as quadrature modulation, band limitation, frequency conversion, amplification, and so on, then outputs transmit signal 311B. Transmit signal 311B is then output as radio waves by an antenna 312B.

FIG. 67, much like FIG. 3, is described as having a plurality of encoders. However, FIG. 67 may also have an encoder and a distributor like FIG. 4. In such a case, the signals output by the distributor are the respective input signals for the interleaver, while subsequent processing remains as described above for FIG. 67, despite the changes required thereby.

FIG. 5 illustrates an example of a frame configuration in the time domain for a transmission device according to the present embodiment. Symbol 500_1 is a symbol for notifying the reception device of the transmission scheme. For example, symbol 500_1 conveys information such as the error-correction scheme used for transmitting data symbols, the coding rate thereof, and the modulation scheme used for transmitting data symbols.

Symbol 501_1 is for estimating channel fluctuations for modulated signal z2(*t*) (where t is time) transmitted by the transmission device. Symbol 502_1 is a data symbol transmitted by modulated signal z1(*t*) as symbol number u (in the time domain). Symbol 503_1 is a data symbol transmitted by modulated signal z1(*t*) as symbol number u+1.

Symbol 501_2 is for estimating channel fluctuations for modulated signal z2(*t*) (where t is time) transmitted by the transmission device. Symbol 502_2 is a data symbol transmitted by modulated signal z2(*t*) as symbol number u. Symbol 503_2 is a data symbol transmitted by modulated signal z1(*t*) as symbol number u+1.

Here, the symbols of z1(*t*) and of z2(*t*) having the same time (identical timing) are transmitted from the transmit antenna using the same (shared/common) frequency.

The following describes the relationships between the modulated signals z1(*t*) and z2(*t*) transmitted by the transmission device and the received signals r1(*t*) and r2(*t*) received by the reception device.

In FIGS. 5, 504#1 and 504#2 indicate transmit antennas of the transmission device, while 505#1 and 505#2 indicate receive antennas of the reception device. The transmission device transmits modulated signal z1(*t*) from transmit antenna 504#1 and transmits modulated signal z2(*t*) from transmit antenna 504#2. Here, modulated signals z1(*t*) and z2(*t*) are assumed to occupy the same (shared/common) frequency (band). The channel fluctuations in the transmit antennas of the transmission device and the antennas of the reception device are $h_{11}$(t), $h_{12}$(*t*), $h_{21}$(t), and $h_{22}$(*t*), respectively. Assuming that receive antenna 505#1 of the reception device receives received signal r1(*t*) and that receive antenna 505#2 of the reception device receives received signal r2(*t*), the following relationship holds.

[Math. 66]

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} \qquad \text{(formula 66)}$$

Figure 69:
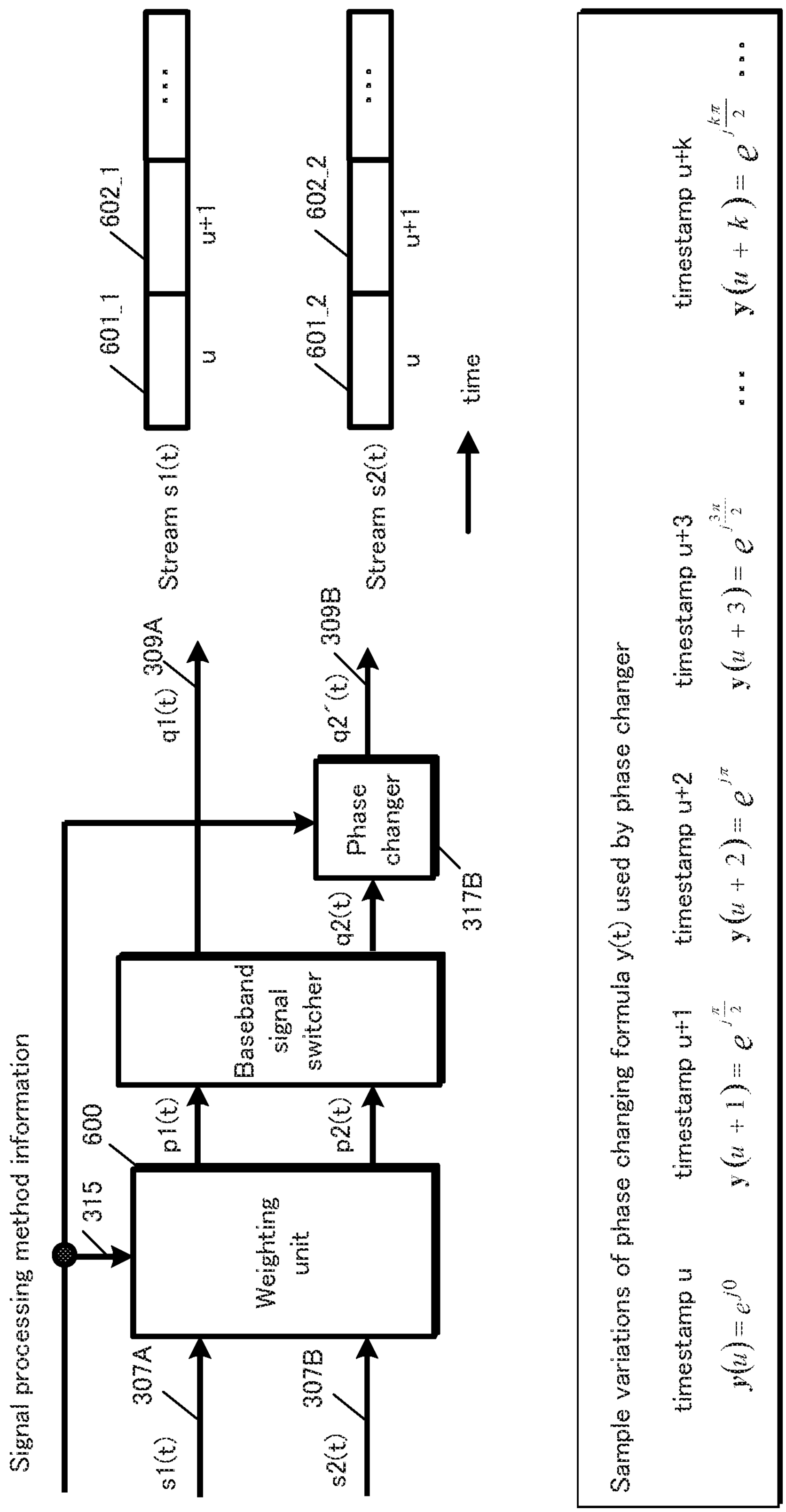
FIG. 69 illustrates a weighting, baseband signal switching, and phase changing scheme.

FIG. 69 pertains to the weighting scheme (precoding scheme), the baseband switching scheme, and the phase changing scheme of the present embodiment. The weighting unit 600 is a combined version of the weighting units 308A and 308B from FIG. 67. As shown, stream s1($t$) and stream s2($t$) correspond to the baseband signals 307A and 307B of FIG. 3. That is, the streams s1($t$) and s2($t$) are baseband signals made up of an in-phase component I and a quadrature component Q conforming to mapping by a modulation scheme such as QPSK, 16-QAM, and 64-QAM. As indicated by the frame configuration of FIG. 69, stream s1($t$) is represented as s1($u$) at symbol number u, as s1($u$+1) at symbol number u+1, and so forth. Similarly, stream s2($t$) is represented as s2($u$) at symbol number u, as s2($u$+1) at symbol number u+1, and so forth. The weighting unit 600 takes the baseband signals 307A (s1($t$)) and 307B (s2($t$)) as well as the signal processing scheme information 315 from FIG. 67 as input, performs weighting in accordance with the signal processing scheme information 315, and outputs the weighted signals 309A ($p_1(t)$) and 316B ($p_2(t)$) from FIG. 67.

Here, given vector W1=(w11,w12) from the first row of the fixed precoding matrix F, $p_1(t)$ can be expressed as formula 67, below.

[Math. 67]

$$p1(t)=W1s1(t) \quad \text{(formula 67)}$$

Here, given vector W2=(w21,w22) from the first row of the fixed precoding matrix F, $p_2(t)$ can be expressed as formula 68, below.

[Math. 68]

$$p2(t)=W2s2(t) \quad \text{(formula 68)}$$

Accordingly, precoding matrix F may be expressed as follows.

[Math. 69]

$$F=\begin{pmatrix} w11 & w12 \\ w21 & w22 \end{pmatrix} \quad \text{(formula 69)}$$

After the baseband signals have been switched, switched baseband signal 6701A($q_1(i)$) has an in-phase component I of $Iq_1(i)$ and a quadrature component Q of $Q_{p1}(i)$, and switched baseband signal 6701B($q_2(i)$) has an in-phase component I of $Iq_2(i)$ and a quadrature component Q of $Qq_2(i)$. The relationships between all of these are as stated above. When the phase changer uses phase changing formula y(t), the post-phase-change baseband signal 309B($q'_2(i)$) is given by formula 70, below.

[Math. 70]

$$q2'(t)=y(t)q2(t) \quad \text{(formula 70)}$$

Here, y(t) is a phase changing formula obeying a predetermined scheme. For example, given a period (cycle) of four and time u, the phase changing formula may be expressed as formula 71, below.

[Math. 71]

$$y(u)=e^{j0} \quad \text{(formula 71)}$$

Similarly, the phase changing formula for time u+1 may be, for example, as given by formula 72.

[Math. 72]

$$y(u+1)=e^{j\frac{\pi}{2}} \quad \text{(formula 72)}$$

That is, the phase changing formula for time u+k generalizes to formula 73.

[Math. 73]

$$y(u+k)=e^{j\frac{k\pi}{2}} \quad \text{(formula 73)}$$

Note that formula 71 through formula 73 are given only as an example of a regular change of phase.

The regular change of phase is not restricted to a period (cycle) of four. Improved reception capabilities (the error-correction capabilities, to be exact) may potentially be promoted in the reception device by increasing the period (cycle) number (this does not mean that a greater period (cycle) is better, though avoiding small numbers such as two is likely ideal.).

Furthermore, although formula 71 through formula 73, above, represent a configuration in which a change of phase is carried out through rotation by consecutive predetermined phases (in the above formula, every $\pi/2$), the change of phase need not be rotation by a constant amount but may also be random. For example, in accordance with the predetermined period (cycle) of y(t), the phase may be changed through sequential multiplication as shown in formula 74 and formula 75. The key point of the regular change of phase is that the phase of the modulated signal is regularly changed. The phase changing degree variance rate is preferably as even as possible, such as from $-\pi$ radians to $\pi$ radians. However, given that this concerns a distribution, random variance is also possible.

[Math. 74]

$$e^{j0} \rightarrow e^{j\frac{\pi}{5}} \rightarrow e^{j\frac{2\pi}{5}} \rightarrow e^{j\frac{3\pi}{5}} \rightarrow e^{j\frac{4\pi}{5}} \rightarrow e^{j\pi} \rightarrow \rightarrow e^{j\frac{6\pi}{5}} \rightarrow e^{j\frac{7\pi}{5}} \rightarrow e^{j\frac{8\pi}{5}} \rightarrow e^{j\frac{9\pi}{5}} \quad \text{(formula 74)}$$

[Math. 75]

$$e^{j\frac{\pi}{2}} \rightarrow e^{j\pi} \rightarrow e^{j\frac{3\pi}{2}} \rightarrow e^{j2\pi} \rightarrow e^{j\frac{\pi}{4}} \rightarrow e^{j\frac{3}{4}\pi} \rightarrow e^{j\frac{5\pi}{4}} \rightarrow e^{j\frac{7\pi}{4}} \quad \text{(formula 75)}$$

As such, the weighting unit 600 of FIG. 6 performs precoding using fixed, predetermined precoding weights, the baseband signal switcher performs baseband signal switching as described above, and the phase changer changes the phase of the signal input thereto while regularly varying the degree of change.

When a specialized precoding matrix is used in the LOS environment, the reception quality is likely to improve tremendously. However, depending on the direct wave conditions, the phase and amplitude components of the direct wave may greatly differ from the specialized precoding matrix, upon reception. The LOS environment has certain rules. Thus, data reception quality is tremendously improved through a regular change of transmit signal phase that obeys those rules. The present invention offers a signal processing scheme for improving the LOS environment.

FIG. 7 illustrates a sample configuration of a reception device 700 pertaining to the present embodiment. Wireless unit 703_X receives, as input, received signal 702_X received by antenna 701_X, performs processing such as frequency conversion, quadrature demodulation, and the like, and outputs baseband signal 704_X.

Channel fluctuation estimator 705_1 for modulated signal z1 transmitted by the transmission device takes baseband signal 704_X as input, extracts reference symbol 501_1 for channel estimation from FIG. 5, estimates the value of $h_{11}$ from formula 66, and outputs channel estimation signal 706_1.

Channel fluctuation estimator 705_2 for modulated signal z2 transmitted by the transmission device takes baseband signal 704_X as input, extracts reference symbol 501_2 for channel estimation from FIG. 5, estimates the value of $h_{12}$ from formula 66, and outputs channel estimation signal 706_2.

Wireless unit 703_Y receives, as input, received signal 702_Y received by antenna 701_X, performs processing such as frequency conversion, quadrature demodulation, and the like, and outputs baseband signal 704_Y.

Channel fluctuation estimator 707_1 for modulated signal z1 transmitted by the transmission device takes baseband signal 704_Y as input, extracts reference symbol 501_1 for channel estimation from FIG. 5, estimates the value of $h_{21}$ from formula 66, and outputs channel estimation signal 708_1.

Channel fluctuation estimator 707_2 for modulated signal z2 transmitted by the transmission device takes baseband signal 704_Y as input, extracts reference symbol 501_2 for channel estimation from FIG. 5, estimates the value of $h_{22}$ from formula 66, and outputs channel estimation signal 708_2.

A control information decoder 709 receives baseband signal 704_X and baseband signal 704_Y as input, detects symbol 500_1 that indicates the transmission scheme from FIG. 5, and outputs a transmission device transmission scheme information signal 710.

A signal processor 711 takes the baseband signals 704_X and 704_Y, the channel estimation signals 706_1, 706_2, 708_1, and 708_2, and the transmission scheme information signal 710 as input, performs detection and decoding, and then outputs received data 712_1 and 712_2.

Next, the operations of the signal processor 711 from FIG. 7 are described in detail. FIG. 8 illustrates a sample configuration of the signal processor 711 pertaining to the present embodiment. As shown, the signal processor 711 is primarily made up of an inner MIMO detector, a soft-in/soft-out decoder, and a coefficient generator. Non-Patent Literature 2 and Non-Patent Literature 3 describe the scheme of iterative decoding with this structure. The MIMO system described in Non-Patent Literature 2 and Non-Patent Literature 3 is a spatial multiplexing MIMO system, while the present embodiment differs from Non-Patent Literature 2 and Non-Patent Literature 3 in describing a MIMO system that regularly changes the phase over time, while using the precoding matrix and performing baseband signal switching. Taking the (channel) matrix H(t) of formula 66, then by letting the precoding weight matrix from FIG. 69 be F (here, a fixed precoding matrix remaining unchanged for a given received signal) and letting the phase changing formula used by the phase changer from FIG. 69 be Y(t) (here, Y(t) changes over time t), then given the baseband signal switching, the receive vector $R(t)=(r1(t),r2(t))^T$ and the stream vector $S(t)=(s1(t),s2(t))^T$ lead to the decoding method of Non-Patent Literature 2 and Non-Patent Literature 3, thus enabling MIMO detection.

Accordingly, the coefficient generator 819 from FIG. 8 takes a transmission scheme information signal 818 (corresponding to 710 from FIG. 7) indicated by the transmission device (information for specifying the fixed precoding matrix in use and the phase changing pattern used when the phase is changed) and outputs a signal processing scheme information signal 820.

The inner MIMO detector 803 takes the signal processing scheme information signal 820 as input and performs iterative detection and decoding using the signal. The operations are described below.

The processor illustrated in FIG. 8 uses a processing scheme, as is illustrated in FIG. 10, to perform iterative decoding (iterative detection). First, detection of one codeword (or one frame) of modulated signal (stream) s1 and of one codeword (or one frame) of modulated signal (stream) s2 are performed. As a result, the log-likelihood ratio of each bit of the codeword (or frame) of modulated signal (stream) s1 and of the codeword (or frame) of modulated signal (stream) s2 are obtained from the soft-in/soft-out decoder. Next, the log-likelihood ratio is used to perform a second round of detection and decoding. These operations (referred to as iterative decoding (iterative detection)) are performed multiple times. The following explanations center on the creation of the log-likelihood ratio of a symbol at a specific time within one frame.

In FIG. 8, a memory 815 takes baseband signal 801X (corresponding to baseband signal 704_X from FIG. 7), channel estimation signal group 802X (corresponding to channel estimation signals 706_1 and 706_2 from FIG. 7), baseband signal 801Y (corresponding to baseband signal 704_Y from FIG. 7), and channel estimation signal group 802Y (corresponding to channel estimation signals 708_1 and 708_2 from FIG. 7) as input, performs iterative decoding (iterative detection), and stores the resulting matrix as a transformed channel signal group. The memory 815 then outputs the above-described signals as needed, specifically as baseband signal 816X, transformed channel estimation signal group 817X, baseband signal 816Y, and transformed channel estimation signal group 817Y.

Subsequent operations are described separately for initial detection and for iterative decoding (iterative detection).

(Initial Detection)

The inner MIMO detector 803 takes baseband signal 801X, channel estimation signal group 802X, baseband signal 801Y, and channel estimation signal group 802Y as input. Here, the modulation scheme for modulated signal (stream) s1 and modulated signal (stream) s2 is described as 16-QAM.

The inner MIMO detector 803 first computes a candidate signal point corresponding to baseband signal 801X from the channel estimation signal groups 802X and 802Y. FIG. 11 represents such a calculation. In FIG. 11, each black dot is a candidate signal point in the I-Q plane. Given that the modulation scheme is 16-QAM, 256 candidate signal points exist. (However, FIG. 11 is only a representation and does not indicate all 256 candidate signal points.) Letting the four bits transmitted in modulated signal s1 be b0, b1, b2, and b3 and the four bits transmitted in modulated signal s2 be b4, b5, b6, and b7, candidate signal points corresponding to (b0, b1, b2, b3, b4, b5, b6, b7) are found in FIG. 11. The Euclidean squared distance between each candidate signal point and each received signal point 1101 (corresponding to baseband signal 801X) is then computed. The Euclidian squared distance between each point is divided by the noise variance $\sigma^2$. Accordingly, Ex(b0, b1, b2, b3, b4, b5, b6, b7) is calculated. That is, the Euclidian squared distance between a candidate signal point corresponding to (b0, b1, b2, b3, b4, b5, b6, b7) and a received signal point is divided by the noise variance. Here, each of the baseband signals and the modulated signals s1 and s2 is a complex signal.

Similarly, the inner MIMO detector 803 calculates candidate signal points corresponding to baseband signal 801Y from channel estimation signal group 802X and channel estimation signal group 802Y, computes the Euclidean squared distance between each of the candidate signal points and the received signal points (corresponding to baseband signal 801Y), and divides the Euclidean squared distance by the noise variance σ2. Accordingly, $E_Y$(b0, b1, b2, b3, b4, b5, b6, b7) is calculated. That is, $E_Y$ is the Euclidian squared distance between a candidate signal point corresponding to (b0, b1, b2, b3, b4, b5, b6, b7) and a received signal point, divided by the noise variance.

Next, $E_X$(b0, b1, b2, b3, b4, b5, b6, b7)+$E_Y$(b0, b1, b2, b3, b4, b5, b6, b7)=E(b0, b1, b2, b3, b4, b5, b6, b7) is computed.

The inner MIMO detector 803 outputs E(b0, b1, b2, b3, b4, b5, b6, b7) as the signal 804.

The log-likelihood calculator 805A takes the signal 804 as input, calculates the log-likelihood of bits b0, b1, b2, and b3, and outputs the log-likelihood signal 806A. Note that this log-likelihood calculation produces the log-likelihood of a bit being 1 and the log-likelihood of a bit being 0. The calculation is as shown in formula 28, formula 29, and formula 30, and the details thereof are given by Non-Patent Literature 2 and 3.

Similarly, log-likelihood calculator 805B takes the signal 804 as input, calculates the log-likelihood of bits b4, b5, b6, and b7, and outputs log-likelihood signal 806A.

A deinterleaver (807A) takes log-likelihood signal 806A as input, performs deinterleaving corresponding to that of the interleaver (the interleaver (304A) from FIG. 67), and outputs deinterleaved log-likelihood signal 808A.

Similarly, a deinterleaver (807B) takes log-likelihood signal 806B as input, performs deinterleaving corresponding to that of the interleaver (the interleaver (304B) from FIG. 67), and outputs deinterleaved log-likelihood signal 808B.

Log-likelihood ratio calculator 809A takes deinterleaved log-likelihood signal 808A as input, calculates the log-likelihood ratio of the bits encoded by encoder 302A from FIG. 67, and outputs log-likelihood ratio signal 810A.

Similarly, log-likelihood ratio calculator 809B takes deinterleaved log-likelihood signal 808B as input, calculates the log-likelihood ratio of the bits encoded by encoder 302B from FIG. 67, and outputs log-likelihood ratio signal 810B.

Soft-in/soft-out decoder 811A takes log-likelihood ratio signal 810A as input, performs decoding, and outputs a decoded log-likelihood ratio 812A.

Similarly, soft-in/soft-out decoder 811B takes log-likelihood ratio signal 810B as input, performs decoding, and outputs decoded log-likelihood ratio 812B.

(Iterative Decoding (Iterative Detection), k Iterations)

The interleaver (813A) takes the k−1th decoded log-likelihood ratio 812A decoded by the soft-in/soft-out decoder as input, performs interleaving, and outputs an interleaved log-likelihood ratio 814A. Here, the interleaving pattern used by the interleaver (813A) is identical to that of the interleaver (304A) from FIG. 67.

Another interleaver (813B) takes the k−1th decoded log-likelihood ratio 812B decoded by the soft-in/soft-out decoder as input, performs interleaving, and outputs interleaved log-likelihood ratio 814B. Here, the interleaving pattern used by the interleaver (813B) is identical to that of the other interleaver (304B) from FIG. 67.

The inner MIMO detector 803 takes baseband signal 816X, transformed channel estimation signal group 817X, baseband signal 816Y, transformed channel estimation signal group 817Y, interleaved log-likelihood ratio 814A, and interleaved log-likelihood ratio 814B as input. Here, baseband signal 816X, transformed channel estimation signal group 817X, baseband signal 816Y, and transformed channel estimation signal group 817Y are used instead of baseband signal 801X, channel estimation signal group 802X, baseband signal 801Y, and channel estimation signal group 802Y because the latter cause delays due to the iterative decoding.

The iterative decoding operations of the inner MIMO detector 803 differ from the initial detection operations thereof in that the interleaved log-likelihood ratios 814A and 814B are used in signal processing for the former. The inner MIMO detector 803 first calculates E(b0, b1, b2, b3, b4, b5, b6, b7) in the same manner as for initial detection. In addition, the coefficients corresponding to formula 11 and formula 32 are computed from the interleaved log-likelihood ratios 814A and 914B. The value of E(b0, b1, b2, b3, b4, b5, b6, b7) is corrected using the coefficients so calculated to obtain E'(b0, b1, b2, b3, b4, b5, b6, b7), which is output as the signal 804.

Log-likelihood calculator 805A takes the signal 804 as input, calculates the log-likelihood of bits b0, b1, b2, and b3, and outputs a log-likelihood signal 806A. Note that this log-likelihood calculation produces the log-likelihood of a bit being 1 and the log-likelihood of a bit being 0. The calculation is as shown in formula 31 through formula 35, and the details are given by Non-Patent Literature 2 and 3.

Similarly, log-likelihood calculator 805B takes the signal 804 as input, calculates the log-likelihood of bits b4, b5, b6, and b7, and outputs log-likelihood signal 806B. Operations performed by the deinterleaver onwards are similar to those performed for initial detection.

While FIG. 8 illustrates the configuration of the signal processor when performing iterative detection, this structure is not absolutely necessary as good reception improvements are obtainable by iterative detection alone. As long as the components needed for iterative detection are present, the configuration need not include the interleavers 813A and 813B. In such a case, the inner MIMO detector 803 does not perform iterative detection.

As shown in Non-Patent Literature 5 and the like, QR decomposition may also be used to perform initial detection and iterative detection. Also, as indicated by Non-Patent Literature 11, MMSE and ZF linear operations may be performed when performing initial detection.

FIG. 9 illustrates the configuration of a signal processor unlike that of FIG. 8, that serves as the signal processor for modulated signals transmitted by the transmission device from FIG. 4 as used in FIG. 67. The point of difference from FIG. 8 is the number of soft-in/soft-out decoders. A soft-in/soft-out decoder 901 takes the log-likelihood ratio signals 810A and 810B as input, performs decoding, and outputs a decoded log-likelihood ratio 902. A distributor 903 takes the decoded log-likelihood ratio 902 as input for distribution. Otherwise, the operations are identical to those explained for FIG. 8.

As described above, when a transmission device according to the present embodiment using a MIMO system transmits a plurality of modulated signals from a plurality of antennas, changing the phase over time while multiplying by the precoding matrix so as to regularly change the phase results in improvements to data reception quality for a reception device in a LOS environment, where direct waves are dominant, compared to a conventional spatial multiplexing MIMO system.

In the present embodiment, and particularly in the configuration of the reception device, the number of antennas is limited and explanations are given accordingly. However, the Embodiment may also be applied to a greater number of antennas. In other words, the number of antennas in the reception device does not affect the operations or advantageous effects of the present embodiment.

Further, in the present embodiments, the encoding is not particularly limited to LDPC codes. Similarly, the decoding scheme is not limited to implementation by a soft-in/soft-out decoder using sum-product decoding. The decoding scheme used by the soft-in/soft-out decoder may also be, for example, the BCJR algorithm, SOVA, and the Max-Log-Map algorithm. Details are provided in Non-Patent Literature 6.

In addition, although the present embodiment is described using a single-carrier scheme, no limitation is intended in this regard. The present embodiment is also applicable to multi-carrier transmission. Accordingly, the present embodiment may also be realized using, for example, spread-spectrum communications, OFDM, SC-FDMA, SC-OFDM, wavelet OFDM as described in Non-Patent Literature 7, and so on. Furthermore, in the present embodiment, symbols other than data symbols, such as pilot symbols (preamble, unique word, and so on) or symbols transmitting control information, may be arranged within the frame in any manner.

The following describes an example in which OFDM is used as a multi-carrier scheme.

Figure 70:
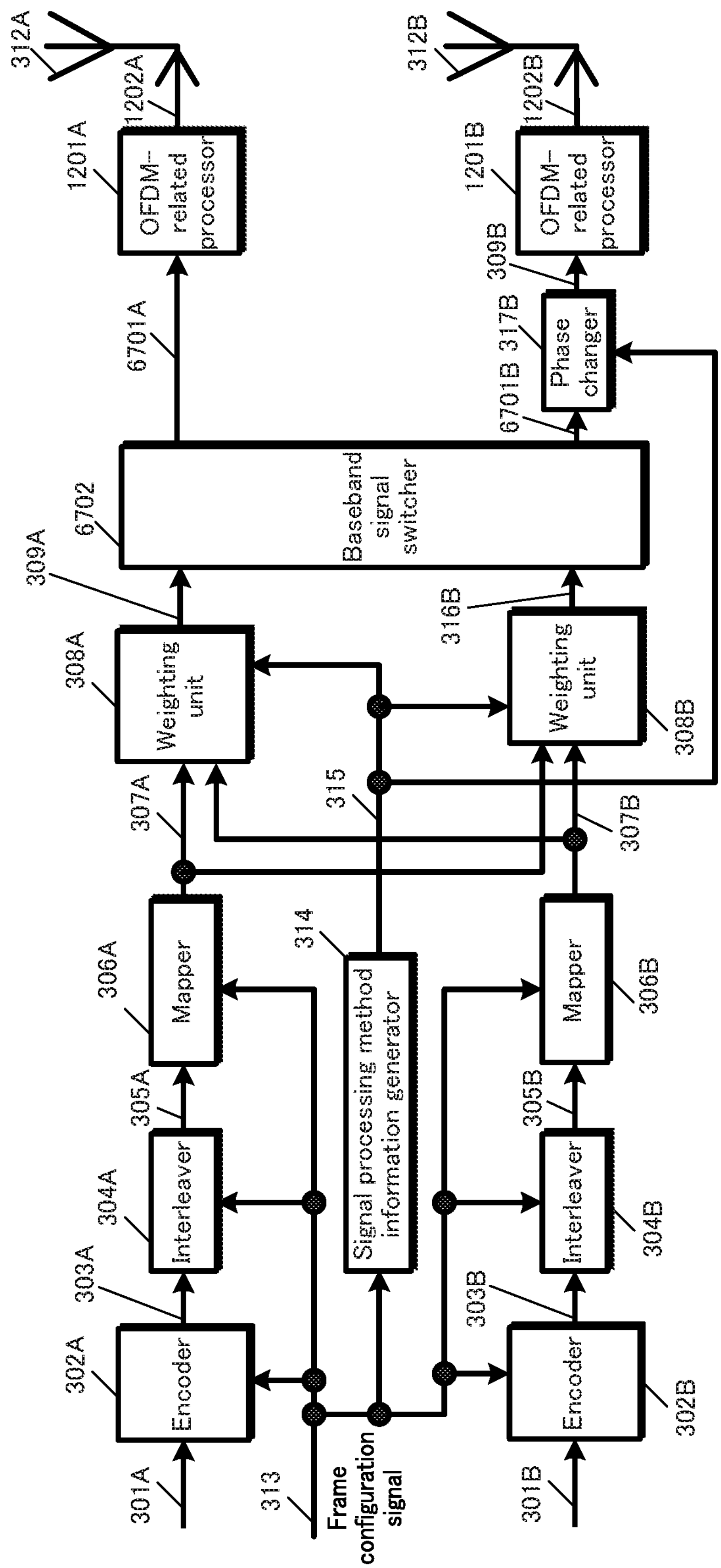
FIG. 70 illustrates a sample configuration of a transmission device using an OFDM scheme.

FIG. 70 illustrates the configuration of a transmission device using OFDM. In FIG. 70, components operating in the manner described for FIGS. 3, 12, and 67 use identical reference numbers.

An OFDM-related processor 1201A takes weighted signal 309A as input, performs OFDM-related processing thereon, and outputs transmit signal 1202A. Similarly, OFDM-related processor 1201B takes post-phase-change signal 309B as input, performs OFDM-related processing thereon, and outputs transmit signal 1202B.

FIG. 13 illustrates a sample configuration of the OFDM-related processors 7001A and 1201B and onward from FIG. 70. Components 1301A through 1310A belong between 1201A and 312A from FIG. 70, while components 1301B through 1310B belong between 1201B and 312B.

Serial-to-parallel converter 1302A performs serial-to-parallel conversion on switched baseband signal 1301A (corresponding to switched baseband signal 6701A from FIG. 70) and outputs parallel signal 1303A.

Reorderer 1304A takes parallel signal 1303A as input, performs reordering thereof, and outputs reordered signal 1305A. Reordering is described in detail later.

IFFT unit 1306A takes reordered signal 1305A as input, applies an IFFT thereto, and outputs post-IFFT signal 1307A.

Wireless unit 1308A takes post-IFFT signal 1307A as input, performs processing such as frequency conversion and amplification, thereon, and outputs modulated signal 1309A. Modulated signal 1309A is then output as radio waves by antenna 1310A.

Serial-to-parallel converter 1302B performs serial-to-parallel conversion on post-phase-change signal 1301B (corresponding to post-phase-change signal 309B from FIG. 12) and outputs parallel signal 1303B.

Reorderer 1304B takes parallel signal 1303B as input, performs reordering thereof, and outputs reordered signal 1305B. Reordering is described in detail later.

IFFT unit 1306B takes reordered signal 1305B as input, applies an IFFT thereto, and outputs post-IFFT signal 1307B.

Wireless unit 1308B takes post-IFFT signal 1307B as input, performs processing such as frequency conversion and amplification thereon, and outputs modulated signal 1309B. Modulated signal 1309B is then output as radio waves by antenna 1310A.

The transmission device from FIG. 67 does not use a multi-carrier transmission scheme. Thus, as shown in FIG. 69, a change of phase is performed to achieve a period (cycle) of four and the post-phase-change symbols are arranged in the time domain. As shown in FIG. 70, when multi-carrier transmission, such as OFDM, is used, then, naturally, symbols in precoded baseband signals having undergone switching and phase changing may be arranged in the time domain as in FIG. 67, and this may be applied to each (sub-)carrier. However, for multi-carrier transmission, the arrangement may also be in the frequency domain, or in both the frequency domain and the time domain. The following describes these arrangements.

FIGS. 14A and 14B indicate frequency on the horizontal axes and time on the vertical axes thereof, and illustrate an example of a symbol reordering scheme used by the reorderers 1304A and 1304B from FIG. 13. The frequency axes are made up of (sub-)carriers 0 through 9. The modulated signals z1 and z2 share common time (timing) and use a common frequency band. FIG. 14A illustrates a reordering scheme for the symbols of modulated signal z1, while FIG. 14B illustrates a reordering scheme for the symbols of modulated signal z2. With respect to the symbols of switched baseband signal 1301A input to serial-to-parallel converter 1302A, the ordering is #0, #1, #2, #3, and so on. Here, given that the example deals with a period (cycle) of four, #0, #1, #2, and #3 are equivalent to one period (cycle). Similarly, #4n, #4n+1, #4n+2, and #4n+3 (n being a non-zero positive integer) are also equivalent to one period (cycle).

As shown in FIG. 14A, symbols #0, #1, #2, #3, and so on are arranged in order, beginning at carrier 0. Symbols #0 through #9 are given time $1, followed by symbols #10 through #19 which are given time #2, and so on in a regular arrangement. Here, modulated signals z1 and z2 are complex signals.

Similarly, with respect to the symbols of weighted signal 1301B input to serial-to-parallel converter 1302B, the assigned ordering is #0, #1, #2, #3, and so on. Here, given that the example deals with a period (cycle) of four, a different change in phase is applied to each of #0, #1, #2, and #3, which are equivalent to one period (cycle). Similarly, a different change in phase is applied to each of #4n, #4n+1, #4n+2, and #4n+3 (n being a non-zero positive integer), which are also equivalent to one period (cycle)

As shown in FIG. 14B, symbols #0, #1, #2, #3, and so on are arranged in order, beginning at carrier 0. Symbols #0 through #9 are given time $1, followed by symbols #10 through #19 which are given time #2, and so on in a regular arrangement.

The symbol group 1402 shown in FIG. 14B corresponds to one period (cycle) of symbols when the phase changing scheme of FIG. 69 is used. Symbol #0 is the symbol obtained by using the phase at time u in FIG. 69, symbol #1 is the symbol obtained by using the phase at time u+1 in FIG. 69, symbol #2 is the symbol obtained by using the phase at time u+2 in FIG. 69, and symbol #3 is the symbol obtained by using the phase at time u+3 in FIG. 69. Accordingly, for any symbol #x, symbol #x is the symbol obtained by using the phase at time u in FIG. 69 when x mod 4 equals 0 (i.e., when the remainder of x divided by 4 is 0, mod being the modulo operator), symbol #x is the symbol obtained by using the phase at time x+1 in FIG. 69 when x mod 4 equals 1, symbol #x is the symbol obtained by using the phase at time x+2 in FIG. 69 when x mod 4 equals 2, and symbol #x is the symbol obtained by using the phase at time x+3 in FIG. 69 when x mod 4 equals 3.

In the present embodiment, modulated signal z1 shown in FIG. 14A has not undergone a change of phase.

As such, when using a multi-carrier transmission scheme such as OFDM, and unlike single carrier transmission, symbols can be arranged in the frequency domain. Of course, the symbol arrangement scheme is not limited to those illustrated by FIGS. 14A and 14B. Further examples are shown in FIGS. 15A, 15B, 16A, and 16B.

FIGS. 15A and 15B indicate frequency on the horizontal axes and time on the vertical axes thereof, and illustrate an example of a symbol reordering scheme used by the reorderers 1304A and 1304B from FIG. 13 that differs from that of FIGS. 14A and 14B. FIG. 15A illustrates a reordering scheme for the symbols of modulated signal z1, while FIG. 15B illustrates a reordering scheme for the symbols of modulated signal z2. FIGS. 15A and 15B differ from FIGS. 14A and 14B in the reordering scheme applied to the symbols of modulated signal z1 and the symbols of modulated signal z2. In FIG. 15B, symbols #0 through #5 are arranged at carriers 4 through 9, symbols #6 though #9 are arranged at carriers 0 through 3, and this arrangement is repeated for symbols #10 through #19. Here, as in FIG. 14B, symbol group 1502 shown in FIG. 15B corresponds to one period (cycle) of symbols when the phase changing scheme of FIG. 6 is used.

FIGS. 16A and 16B indicate frequency on the horizontal axes and time on the vertical axes thereof, and illustrate an example of a symbol reordering scheme used by the reorderers 1304A and 1304B from FIG. 13 that differs from that of FIGS. 14A and 14B. FIG. 16A illustrates a reordering scheme for the symbols of modulated signal z1, while FIG. 16B illustrates a reordering scheme for the symbols of modulated signal z2. FIGS. 16A and 16B differ from FIGS. 14A and 14B in that, while FIGS. 14A and 14B showed symbols arranged at sequential carriers, FIGS. 16A and 16B do not arrange the symbols at sequential carriers. Obviously, for FIGS. 16A and 16B, different reordering schemes may be applied to the symbols of modulated signal z1 and to the symbols of modulated signal z2 as in FIGS. 15A and 15B.

FIGS. 17A and 17B indicate frequency on the horizontal axes and time on the vertical axes thereof, and illustrate an example of a symbol reordering scheme used by the reorderers 1304A and 1304B from FIG. 13 that differs from those of FIGS. 14A through 16B. FIG. 17A illustrates a reordering scheme for the symbols of modulated signal z1 while FIG. 17B illustrates a reordering scheme for the symbols of modulated signal z2. While FIGS. 14A through 16B show symbols arranged with respect to the frequency axis, FIGS. 17A and 17B use the frequency and time axes together in a single arrangement.

While FIG. 69 describes an example where the change of phase is performed in a four slot period (cycle), the following example describes an eight slot period (cycle). In FIGS. 17A and 17B, the symbol group 1702 is equivalent to one period (cycle) of symbols when the phase changing scheme is used (i.e., on eight symbols) such that symbol #0 is the symbol obtained by using the phase at time u, symbol #1 is the symbol obtained by using the phase at time u+1, symbol #2 is the symbol obtained by using the phase at time u+2, symbol #3 is the symbol obtained by using the phase at time u+3, symbol #4 is the symbol obtained by using the phase at time u+4, symbol #5 is the symbol obtained by using the phase at time u+5, symbol #6 is the symbol obtained by using the phase at time u+6, and symbol #7 is the symbol obtained by using the phase at time u+7. Accordingly, for any symbol #x, symbol #x is the symbol obtained by using the phase at time u when x mod 8 equals 0, symbol #x is the symbol obtained by using the phase at time u+1 when x mod 8 equals 1, symbol #x is the symbol obtained by using the phase at time u+2 when x mod 8 equals 2, symbol #x is the symbol obtained by using the phase at time u+3 when x mod 8 equals 3, symbol #x is the symbol obtained by using the phase at time u+4 when x mod 8 equals 4, symbol #x is the symbol obtained by using the phase at time u+5 when x mod 8 equals 5, symbol #x is the symbol obtained by using the phase at time u+6 when x mod 8 equals 6, and symbol #x is the symbol obtained by using the phase at time u+7 when x mod 8 equals 7. In FIGS. 17A and 17B four slots along the time axis and two slots along the frequency axis are used for a total of 4×2=8 slots, in which one period (cycle) of symbols is arranged. Here, given m×n symbols per period (cycle) (i.e., m×n different phases are available for multiplication), then n slots (carriers) in the frequency domain and m slots in the time domain should be used to arrange the symbols of each period (cycle), such that m>n. This is because the phase of direct waves fluctuates slowly in the time domain relative to the frequency domain. Accordingly, the present embodiment performs a regular change of phase that reduces the influence of steady direct waves. Thus, the phase changing period (cycle) should preferably reduce direct wave fluctuations. Accordingly, m should be greater than n. Taking the above into consideration, using the time and frequency domains together for reordering, as shown in FIGS. 17A and 17B, is preferable to using either of the frequency domain or the time domain alone due to the strong probability of the direct waves becoming regular. As a result, the effects of the present invention are more easily obtained. However, reordering in the frequency domain may lead to diversity gain due the fact that frequency-domain fluctuations are abrupt. As such, using the frequency and time domains together for reordering is not always ideal.

FIGS. 18A and 18B indicate frequency on the horizontal axes and time on the vertical axes thereof, and illustrate an example of a symbol reordering scheme used by the reorderers 1304A and 1304B from FIG. 13 that differs from that of FIGS. 17A and 17B. FIG. 18A illustrates a reordering scheme for the symbols of modulated signal z1, while FIG. 18B illustrates a reordering scheme for the symbols of modulated signal z2. Much like FIGS. 17A and 17B, FIGS. 18A and 18B illustrate the use of the time and frequency axes, together. However, in contrast to FIGS. 17A and 17B, where the frequency axis is prioritized and the time axis is used for secondary symbol arrangement, FIGS. 18A and 18B prioritize the rime axis and use the frequency axis for secondary symbol arrangement. In FIG. 18B, symbol group 1802 corresponds to one period (cycle) of symbols when the phase changing scheme is used.

In FIGS. 17A, 17B, 18A, and 18B, the reordering scheme applied to the symbols of modulated signal z1 and the symbols of modulated signal z2 may be identical or may differ as like in FIGS. 15A and 15B. Either approach allows good reception quality to be obtained. Also, in FIGS. 17A, 17B, 18A, and 18B, the symbols may be arranged non-sequentially as in FIGS. 16A and 16B. Either approach allows good reception quality to be obtained.

FIG. 22 indicates frequency on the horizontal axis and time on the vertical axis thereof, and illustrates an example of a symbol reordering scheme used by the reorderers 1304A and 1304B from FIG. 13 that differs from the above. FIG. 22 illustrates a regular phase changing scheme using four slots, similar to time u through u+3 from FIG. 69. The characteristic feature of FIG. 22 is that, although the symbols are reordered with respect to the frequency domain, when read along the time axis, a periodic shift of n (n=1 in the example of FIG. 22) symbols is apparent. The frequency-domain symbol group 2210 in FIG. 22 indicates four symbols to which are applied the changes of phase at time u through u+3 from FIG. 6.

Here, symbol #0 is obtained using the change of phase at time u, symbol #1 is obtained using the change of phase at time u+1, symbol #2 is obtained using the change of phase at time u+2, and symbol #3 is obtained using the change of phase at time u+3.

Similarly, for frequency-domain symbol group 2220, symbol #4 is obtained using the change of phase at time u, symbol #5 is obtained using the change of phase at time u+1, symbol #6 is obtained using the change of phase at time u+2, and symbol #7 is obtained using the change of phase at time u+3.

The above-described change of phase is applied to the symbol at time $1. However, in order to apply periodic shifting with respect to the time domain, the following change of phases are applied to symbol groups 2201, 2202, 2203, and 2204.

For time-domain symbol group 2201, symbol #0 is obtained using the change of phase at time u, symbol #9 is obtained using the change of phase at time u+1, symbol #18 is obtained using the change of phase at time u+2, and symbol #27 is obtained using the change of phase at time u+3.

For time-domain symbol group 2202, symbol #28 is obtained using the change of phase at time u, symbol #1 is obtained using the change of phase at time u+1, symbol #10 is obtained using the change of phase at time u+2, and symbol #19 is obtained using the change of phase at time u+3.

For time-domain symbol group 2203, symbol #20 is obtained using the change of phase at time u, symbol #29 is obtained using the change of phase at time u+1, symbol #2 is obtained using the change of phase at time u+2, and symbol #11 is obtained using the change of phase at time u+3.

For time-domain symbol group 2204, symbol #12 is obtained using the change of phase at time u, symbol #21 is obtained using the change of phase at time u+1, symbol #30 is obtained using the change of phase at time u+2, and symbol #3 is obtained using the change of phase at time u+3.

The characteristic feature of FIG. 22 is seen in that, taking symbol #11 as an example, the two neighbouring symbols thereof along the frequency axis (#10 and #12) are both symbols change using a different phase than symbol #11, and the two neighbouring symbols thereof having the same carrier in the time domain (#2 and #20) are both symbols changed using a different phase than symbol #11. This holds not only for symbol #11, but also for any symbol having two neighboring symbols in the frequency domain and the time domain. Accordingly, the change of phase is effectively carried out. This is highly likely to improve data reception quality as influence from regularizing direct waves is less prone to reception.

Although FIG. 22 illustrates an example in which n=1, the invention is not limited in this manner. The same may be applied to a case in which n=3. Furthermore, although FIG. 22 illustrates the realization of the above-described effects by arranging the symbols in the frequency domain and advancing in the time domain so as to achieve the characteristic effect of imparting a periodic shift to the symbol arrangement order, the symbols may also be randomly (or regularly) arranged to the same effect.

Although the present embodiment describes a variation of Embodiment 1 in which a baseband signal switcher is inserted before the change of phase, the present embodiment may also be realized as a combination with Embodiment 2, such that the baseband signal switcher is inserted before the change of phase in FIGS. 26 and 28. Accordingly, in FIG. 26, phase changer 317A takes switched baseband signal 6701A($q_1$(i)) as input, and phase changer 317B takes switched baseband signal 6701B($q_2$(i)) as input. The same applies to the phase changers 317A and 317B from FIG. 28.

The following describes a scheme for allowing the reception device to obtain good received signal quality for data, regardless of the reception device arrangement, by considering the location of the reception device with respect to the transmission device.

FIG. 31 illustrates an example of frame configuration for a portion of the symbols within a signal in the time-frequency domains, given a transmission scheme where a regular change of phase is performed for a multi-carrier scheme such as OFDM.

FIG. 31 illustrates the frame configuration of modulated signal z2' corresponding to the switched baseband signal input to phase changer 317B from FIG. 67. Each square represents one symbol (although both signals s1 and s2 are included for precoding purposes, depending on the precoding matrix, only one of signals s1 and s2 may be used).

Consider symbol 3100 at carrier 2 and time $2 of FIG. 31. The carrier here described may alternatively be termed a sub-carrier.

Within carrier 2, there is a very strong correlation between the channel conditions for symbol 610A at carrier 2, time $2 and the channel conditions for the time domain nearest-neighbour symbols to time $2, i.e., symbol 3013 at time $1 and symbol 3101 at time $3 within carrier 2.

Similarly, for time $2, there is a very strong correlation between the channel conditions for symbol 3100 at carrier 2, time $2 and the channel conditions for the frequency-domain nearest-neighbour symbols to carrier 2, i.e., symbol 3104 at carrier 1, time $2 and symbol 3104 at time $2, carrier 3.

As described above, there is a very strong correlation between the channel conditions for symbol 3100 and the channel conditions for each symbol 3101, 3102, 3103, and 3104.

The present description considers N different phases (N being an integer, N≥2) for multiplication in a transmission scheme where the phase is regularly changed. The symbols illustrated in FIG. 31 are indicated as $e^{j0}$, for example. This signifies that this symbol is signal z2' from FIG. 6 having undergone a change in phase through multiplication by $e^{j0}$. That is, the values given for the symbols in FIG. 31 are the value of y(t) as given by formula 70.

The present embodiment takes advantage of the high correlation in channel conditions existing between neighbouring symbols in the frequency domain and/or neighbouring symbols in the time domain in a symbol arrangement enabling high data reception quality to be obtained by the reception device receiving the post-phase-change symbols.

In order to achieve this high data reception quality, conditions #D1-1 and #D1-2 should preferably be met.

(Condition #D1-1)

As shown in FIG. 69, for a transmission scheme involving a regular change of phase performed on switched baseband signal q2 using a multi-carrier scheme such as OFDM, time X, carrier Y is a symbol for transmitting data (hereinafter, data symbol), neighbouring symbols in the time domain, i.e., at time X−1, carrier Y and at time X+1, carrier Y are also data symbols, and a different change of phase should be performed on switched baseband signal q2 corresponding to each of these three data symbols, i.e., on switched baseband signal q2 at time X, carrier Y, at time X−1, carrier Y and at time X+1, carrier Y.

(Condition #D1-2)

As shown in FIG. 69, for a transmission scheme involving a regular change of phase performed on switched baseband signal q2 using a multi-carrier scheme such as OFDM, time X, carrier Y is a symbol for transmitting data (hereinafter, data symbol), neighbouring symbols in the time domain, i.e., at time X, carrier Y+1 and at time X, carrier Y−1 are also data symbols, and a different change of phase should be performed on switched baseband signal q2 corresponding to each of these three data symbols, i.e., on switched baseband signal q2 at time X, carrier Y, at time X, carrier Y−1 and at time X, carrier Y+1.

Ideally, a data symbol should satisfy Condition #D1-1. Similarly, the data symbols should satisfy Condition #D1-2.

The reasons supporting Conditions #D1-1 and #D1-2 are as follows.

A very strong correlation exists between the channel conditions of given symbol of a transmit signal (hereinafter, symbol A) and the channel conditions of the symbols neighbouring symbol A in the time domain, as described above.

Accordingly, when three neighbouring symbols in the time domain each have different phases, then despite reception quality degradation in the LOS environment (poor signal quality caused by degradation in conditions due to phase relations despite high signal quality in terms of SNR) for symbol A, the two remaining symbols neighbouring symbol A are highly likely to provide good reception quality. As a result, good received signal quality is achievable after error correction and decoding.

Similarly, a very strong correlation exists between the channel conditions of given symbol of a transmit signal (symbol A) and the channel conditions of the symbols neighbouring symbol A in the frequency domain, as described above.

Accordingly, when three neighbouring symbols in the frequency domain each have different phases, then despite reception quality degradation in the LOS environment (poor signal quality caused by degradation in conditions due to direct wave phase relationships despite high signal quality in terms of SNR) for symbol A, the two remaining symbols neighbouring symbol A are highly likely to provide good reception quality. As a result, good received signal quality is achievable after error correction and decoding.

Combining Conditions #D1-1 and #D1-2, ever greater data reception quality is likely achievable for the reception device. Accordingly, the following Condition #D1-3 can be derived.

(Condition #D1-3)

As shown in FIG. 69, for a transmission scheme involving a regular change of phase performed on switched baseband signal q2 using a multi-carrier scheme such as OFDM, time X, carrier Y is a symbol for transmitting data (data symbol), neighbouring symbols in the time domain, i.e., at time X−1, carrier Y and at time X+1, carrier Y are also data symbols, and neighbouring symbols in the frequency domain, i.e., at time X, carrier Y−1 and at time X, carrier Y+1 are also data symbols, such that a different change of phase should be performed on switched baseband signal q2 corresponding to each of these five data symbols, i.e., on switched baseband signal q2 at time X, carrier Y, at time X, carrier Y−1, at time X, carrier Y+1, at time X−1, carrier Y and at time X+1, carrier Y.

Here, the different changes in phase are as follows. Phase changes are defined from 0 radians to 2π radians. For example, for time X, carrier Y, a phase change of $e^{j\theta_{X,Y}}$ is applied to precoded baseband signal $q_2$ from FIG. 69, for time X−1, carrier Y, a phase change of $e^{j\theta_{X-1,Y}}$ is applied to precoded baseband signal q2 from FIG. 69, for time X+1, carrier Y, a phase change of $e^{j\theta_{X+1,Y}}$ is applied to precoded baseband signal q2 from FIG. 69, such that $0 \le \theta_{X,Y} < 2\pi$, $0 \le \theta_{X-1,Y} < 2\pi$, and $0 \le \theta_{X+1,Y} < 2\pi$, □□ all units being in radians. And, for Condition #D1-1, it follows that $\theta_{X,Y} \ne \theta_{X-1,Y}$, $\theta_{X,Y} \ne \theta_{X+1,Y}$, and that $\theta_{X-1} \ne \theta_{X+1,Y}$. Similarly, for Condition #D1-2, it follows that $\theta_{X,Y} \ne \theta_{X,Y-1}$, $\theta_{X,Y} \ne \theta_{X,Y+1}$, and that $\theta_{X,Y-1} \ne \theta_{X,Y+1}$. And, for Condition #D1-3, it follows that $\theta_{X,Y} \ne \theta_{X-1,Y}$, $\theta_{X,Y} \ne \theta_{X+1,Y}$, $\theta_{X,Y} \ne \theta_{X,Y-1}$, $\theta_{X,Y} \ne \theta_{X,Y+1}$, $\theta_{X-1,Y} \ne \theta_{X+1,Y}$, $\theta_{X-1,Y} \ne \theta_{X,Y-1}$, $\theta_{X-1,Y} \ne \theta_{X,Y+1}$, $\theta_{X+1,Y} \ne \theta_{X,Y-1}$, $\theta_{X+1,Y} \ne \theta_{X,Y+1}$ and that $\theta_{X,Y-1} \ne \theta_{X,Y+1}$.

Ideally, a data symbol should satisfy Condition #D1-1.

FIG. 31 illustrates an example of Condition #D1-3, where symbol A corresponds to symbol 3100. The symbols are arranged such that the phase by which switched baseband signal q2 from FIG. 69 is multiplied differs for symbol 3100, for both neighbouring symbols thereof in the time domain 3101 and 3102, and for both neighbouring symbols thereof in the frequency domain 3102 and 3104. Accordingly, despite received signal quality degradation of symbol 3100 for the receiver, good signal quality is highly likely for the neighbouring signals, thus guaranteeing good signal quality after error correction.

FIG. 32 illustrates a symbol arrangement obtained through phase changes under these conditions.

As evident from FIG. 32, with respect to any data symbol, a different change in phase is applied to each neighbouring symbol in the time domain and in the frequency domain. As such, the ability of the reception device to correct errors may be improved.

In other words, in FIG. 32, when all neighbouring symbols in the time domain are data symbols, Condition #D1-1 is satisfied for all Xs and all Ys.

Similarly, in FIG. 32, when all neighbouring symbols in the frequency domain are data symbols, Condition #D1-2 is satisfied for all Xs and all Ys.

Similarly, in FIG. 32, when all neighbouring symbols in the frequency domain are data symbols and all neighbouring symbols in the time domain are data symbols, Condition #D1-3 is satisfied for all Xs and all Ys.

The following discusses the above-described example for a case where the change of phase is performed on two switched baseband signals q1 and q2 (see FIG. 68).

Several phase changing schemes are applicable to performing a change of phase on two switched baseband signals q1 and q2. The details thereof are explained below.

Scheme 1 involves a change of phase of switched baseband signal q2 as described above, to achieve the change of phase illustrated by FIG. 32. In FIG. 32, a change of phase having a period (cycle) of ten is applied to switched baseband signal q2. However, as described above, in order to satisfy Conditions #D1-1, #D1-2, and #D1-3, the change in phase applied to switched baseband signal q2 at each (sub-)carrier changes over time. (Although such changes are applied in FIG. 32 with a period (cycle) of ten, other phase changing schemes are also applicable.) Then, as shown in FIG. 33, the phase change degree performed on switched baseband signal q2 produce a constant value that is one-tenth that of the change in phase performed on switched baseband signal q2. In FIG. 33, for a period (cycle) (of phase change performed on switched baseband signal q2) including time $1, the value of the change in phase performed on switched baseband signal q1 is $e^{j0}$. Then, for the next period (cycle) (of change in phase performed on switched baseband signal q2) including time $2, the value of the phase changing degree performed on precoded baseband signal q1 is $e^{j\pi/9}$, and so on.

The symbols illustrated in FIG. 33 are indicated as $e^{j0}$, for example. This signifies that this symbol is signal q1 from FIG. 26 having undergone a change of phase through multiplication by $e^{j0}$.

As shown in FIG. 33, the change in phase applied to switched baseband signal q1 produces a constant value that is one-tenth that of the change in phase performed on precoded, switched baseband signal q2 such that the phase changing value varies with the number of each period (cycle). (As described above, in FIG. 33, the value is $e^{j0}$ for the first period (cycle), $e^{j\pi/9}$ for the second period (cycle), and so on.)

As described above, the change in phase performed on switched baseband signal q2 has a period (cycle) of ten, but the period (cycle) can be effectively made greater than ten by taking the degree of phase change applied to switched baseband signal q1 and to switched baseband signal q2 into consideration. Accordingly, data reception quality may be improved for the reception device.

Scheme 2 involves a change in phase of switched baseband signal q2 as described above, to achieve the change in phase illustrated by FIG. 32. In FIG. 32, a change of phase having a period (cycle) of ten is applied to switched baseband signal q2. However, as described above, in order to satisfy Conditions #D1-1, #D1-2, and #D1-3, the change in phase applied to switched baseband signal q2 at each (sub-)carrier changes over time. (Although such changes are applied in FIG. 32 with a period (cycle) of ten, other phase changing schemes are also applicable.) Then, as shown in FIG. 33, the change in phase performed on switched baseband signal q2 produces a constant value that is one-tenth of that performed on switched baseband signal q2.

The symbols illustrated in FIG. 30 are indicated as $e^{j0}$, for example. This signifies that this symbol is switched baseband signal q1 having undergone a change of phase through multiplication by $e^{j0}$.

As described above, the change in phase performed on switched baseband signal q2 has a period (cycle) of ten, but the period (cycle) can be effectively made greater than ten by taking the changes in phase applied to switched baseband signal q1 and to switched baseband signal q2 into consideration. Accordingly, data reception quality may be improved for the reception device. An effective way of applying scheme 2 is to perform a change in phase on switched baseband signal q1 with a period (cycle) of N and perform a change in phase on precoded baseband signal q2 with a period (cycle) of M such that N and M are coprime. As such, by taking both switched baseband signals q1 and q2 into consideration, a period (cycle) of N$\lambda$M is easily achievable, effectively making the period (cycle) greater when N and M are coprime.

While the above discusses an example of the above-described phase changing scheme, the present invention is not limited in this manner. The change in phase may be performed with respect to the frequency domain, the time domain, or on time-frequency blocks. Similar improvement to the data reception quality can be obtained for the reception device in all cases.

The same also applies to frames having a configuration other than that described above, where pilot symbols (SP symbols) and symbols transmitting control information are inserted among the data symbols. The details of the change in phase in such circumstances are as follows.

FIGS. 47A and 47B illustrate the frame configuration of modulated signals (switched baseband signals q1 and q2) z1 or z1' and z2' in the time-frequency domain. FIG. 47A illustrates the frame configuration of modulated signal (switched baseband signal q1) z1 or z1' while FIG. 47B illustrates the frame configuration of modulated signal (switched baseband signal q2) z2'. In FIGS. 47A and 47B, 4701 marks pilot symbols while 4702 marks data symbols. The data symbols 4702 are symbols on which switching or switching and change in phase have been performed.

FIGS. 47A and 47B, like FIG. 69, indicate the arrangement of symbols when a change in phase is applied to switched baseband signal q2 (while no change in phase is performed on switched baseband signal q1). (Although FIG. 69 illustrates a change in phase with respect to the time domain, switching time t with carrier f in FIG. 69 corresponds to a change in phase with respect to the frequency domain. In other words, replacing (t) with (t, f) where t is time and f is frequency corresponds to performing a change of phase on time-frequency blocks.) Accordingly, the numerical values indicated in FIGS. 47A and 47B for each of the symbols are the values of switched baseband signal q2 after the change in phase. No values are given for the symbols of switched baseband signal q1(z1) from FIGS. 47A and 47B as no change in phase is performed thereon.

The important point of FIGS. 47A and 47B is that the change in phase performed on the data symbols of switched baseband signal q2, i.e., on symbols having undergone precoding or precoding and switching. (The symbols under discussion, being precoded, actually include both symbols s1 and s2.) Accordingly, no change in phase is performed on the pilot symbols inserted in z2'.

FIGS. 48A and 48B illustrate the frame configuration of modulated signals (switched baseband signals q1 and q2) z1 or z1' and z2' in the time-frequency domain. FIG. 48A illustrates the frame configuration of modulated signal (switched baseband signal q1) z1 or z1' while FIG. 48B illustrates the frame configuration of modulated signal (switched baseband signal q2) z2'. In FIGS. 48A and 48B, 4701 marks pilot symbols while 4702 marks data symbols. The data symbols 4702 are symbols on which precoding or precoding and a change in phase have been performed.

FIGS. 48A and 48B indicate the arrangement of symbols when a change in phase is applied to switched baseband signal q1 and to switched baseband signal q2. Accordingly, the numerical values indicated in FIGS. 48A and 48B for each of the symbols are the values of switched baseband signals q1 and q2 after the change in phase.

The important point of FIGS. 48A and 48B is that the change in phase is performed on the data symbols of switched baseband signal q1, that is, on the precoded or precoded and switched symbols thereof, and on the data symbols of switched baseband signal q2, that is, on the precoded or precoded and switched symbols thereof. (The symbols under discussion, being precoded, actually include both symbols s1 and s2.) Accordingly, no change in phase is performed on the pilot symbols inserted in z1', nor on the pilot symbols inserted in z2'.

FIGS. 49A and 49B illustrate the frame configuration of modulated signals (switched baseband signals q1 and q2) z1 or z1' and z2' in the time-frequency domain. FIG. 49A illustrates the frame configuration of modulated signal (switched baseband signal q1) z1 or z1' while FIG. 49B illustrates the frame configuration of modulated signal (switched baseband signal q2) z2'. In FIGS. 49A and 49B, 4701 marks pilot symbols, 4702 marks data symbols, and 4901 marks null symbols for which the in-phase component of the baseband signal I=0 and the quadrature component Q=0. As such, data symbols 4702 are symbols on which precoding or precoding and a change in phase have been performed. FIGS. 49A and 49B differ from FIGS. 47A and 47B in the configuration scheme for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 49A and 49B, like FIG. 69, indicate the arrangement of symbols when a change in phase is applied to switched baseband signal q2 (while no change in phase is performed on switched baseband signal q1). (Although FIG. 69 illustrates a change in phase with respect to the time domain, switching time t with carrier f in FIG. 6 corresponds to a change in phase with respect to the frequency domain. In other words, replacing (t) with (t, f) where t is time and f is frequency corresponds to performing the change of phase on time-frequency blocks.) Accordingly, the numerical values indicated in FIGS. 49A and 49B for each of the symbols are the values of switched baseband signal q2 after the change in phase. No values are given for the symbols of switched baseband signal q1 from FIGS. 49A and 49B as no change in phase is performed thereon.

The important point of FIGS. 49A and 49B is that the change in phase performed on the data symbols of switched baseband signal q2, i.e., on symbols having undergone precoding or precoding and switching. (The symbols under discussion, being precoded, actually include both symbols s1 and s2.) Accordingly, no change in phase is performed on the pilot symbols inserted in z2'.

FIGS. 50A and 50B illustrate the frame configuration of modulated signals (switched baseband signals q1 and q2) z1 or z1' and z2' in the time-frequency domain. FIG. 50A illustrates the frame configuration of modulated signal (switched baseband signal q1) z1 or z1' while FIG. 50B illustrates the frame configuration of modulated signal (switched baseband signal q2) z2'. In FIGS. 50A and 50B, 4701 marks pilot symbols, 4702 marks data symbols, and 4901 marks null symbols for which the in-phase component of the baseband signal I=0 and the quadrature component Q=0. As such, data symbols 4702 are symbols on which precoding or precoding and a change in phase have been performed. FIGS. 50A and 50B differ from FIGS. 48A and 48B in the configuration scheme for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 50A and 50B indicate the arrangement of symbols when a change in phase is applied to switched baseband signal q1 and to switched baseband signal q2. Accordingly, the numerical values indicated in FIGS. 50A and 50B for each of the symbols are the values of switched baseband signals q1 and q2 after a change in phase.

The important point of FIGS. 50A and 50B is that a change in phase is performed on the data symbols of switched baseband signal q1, that is, on the precoded or precoded and switched symbols thereof, and on the data symbols of switched baseband signal q2, that is, on the precoded or precoded and switched symbols thereof. (The symbols under discussion, being precoded, actually include both symbols s1 and s2.) Accordingly, no change in phase is performed on the pilot symbols inserted in z1', nor on the pilot symbols inserted in z2'.

FIG. 51 illustrates a sample configuration of a transmission device generating and transmitting modulated signal having the frame configuration of FIGS. 47A, 47B, 49A, and 49B. Components thereof performing the same operations as those of FIG. 4 use the same reference symbols thereas. FIG. 51 does not include a baseband signal switcher as illustrated in FIGS. 67 and 70. However, FIG. 51 may also include a baseband signal switcher between the weighting units and phase changers, much like FIGS. 67 and 70.

In FIG. 51, the weighting units 308A and 308B, phase changer 317B, and baseband signal switcher only operate at times indicated by the frame configuration signal 313 as corresponding to data symbols.

In FIG. 51, a pilot symbol generator 5101 (that also generates null symbols) outputs baseband signals 5102A and 5102B for a pilot symbol whenever the frame configuration signal 313 indicates a pilot symbol (and a null symbol).

Although not indicated in the frame configurations from FIGS. 47A through 50B, when precoding (and phase change) is not performed, such as when transmitting a modulated signal using only one antenna (such that the other antenna transmits no signal) or when using a space-time coding transmission scheme (particularly, space-time block coding) to transmit control information symbols, then the frame configuration signal 313 takes control information symbols 5104 and control information 5103 as input. When the frame configuration signal 313 indicates a control information symbol, baseband signals 5102A and 5102B thereof are output.

The wireless units 310A and 310B of FIG. 51 take a plurality of baseband signals as input and select a desired baseband signal according to the frame configuration signal 313. The wireless units 310A and 310B then apply OFDM signal processing and output modulated signals 311A and 311B conforming to the frame configuration.

FIG. 52 illustrates a sample configuration of a transmission device generating and transmitting modulated signal having the frame configuration of FIGS. 48A, 48B, 50A, and 50B. Components thereof performing the same operations as those of FIGS. 4 and 51 use the same reference symbols thereas. FIG. 52 features an additional phase changer 317A that only operates when the frame configuration signal 313 indicates a data symbol. At all other times, the operations are identical to those explained for FIG. 51. FIG. 52 does not include a baseband signal switcher as illustrated in FIGS. 67 and 70. However, FIG. 52 may also include a baseband signal switcher between the weighting unit and phase changer, much like FIGS. 67 and 70.

FIG. 53 illustrates a sample configuration of a transmission device that differs from that of FIG. 51. FIG. 53 does not include a baseband signal switcher as illustrated in FIGS. 67 and 70. However, FIG. 53 may also include a baseband signal switcher between the weighting unit and phase changer, much like FIGS. 67 and 70. The following describes the points of difference. As shown in FIG. 53, phase changer 317B takes a plurality of baseband signals as input. Then, when the frame configuration signal 313 indicates a data symbol, phase changer 317B performs the change in phase on precoded baseband signal 316B. When frame configuration signal 313 indicates a pilot symbol (or null symbol) or a control information symbol, phase changer 317B pauses phase changing operations such that the symbols of the baseband signal are output as-is. (This may be interpreted as performing forced rotation corresponding to $e^{j0}$.)

A selector 5301 takes the plurality of baseband signals as input and selects a baseband signal having a symbol indicated by the frame configuration signal 313 for output.

FIG. 54 illustrates a sample configuration of a transmission device that differs from that of FIG. 52. FIG. 54 does not include a baseband signal switcher as illustrated in FIGS. 67 and 70. However, FIG. 54 may also include a baseband signal switcher between the weighting unit and phase changer, much like FIGS. 67 and 70. The following describes the points of difference. As shown in FIG. 54, phase changer 317B takes a plurality of baseband signals as input. Then, when the frame configuration signal 313 indicates a data symbol, phase changer 317B performs the change in phase on precoded baseband signal 316B. When frame configuration signal 313 indicates a pilot symbol (or null symbol) or a control information symbol, phase changer 317B pauses phase changing operations such that the symbols of the baseband signal are output as-is. (This may be interpreted as performing forced rotation corresponding to $e^{j0}$.)

Similarly, as shown in FIG. 54, phase changer 5201 takes a plurality of baseband signals as input. Then, when the frame configuration signal 313 indicates a data symbol, phase changer 5201 performs the change in phase on precoded baseband signal 309A. When frame configuration signal 313 indicates a pilot symbol (or null symbol) or a control information symbol, phase changer 5201 pauses phase changing operations such that the symbols of the baseband signal are output as-is. (This may be interpreted as performing forced rotation corresponding to $e^{j0}$.)

The above explanations are given using pilot symbols, control symbols, and data symbols as examples. However, the present invention is not limited in this manner. When symbols are transmitted using schemes other than precoding, such as single-antenna transmission or transmission using space-time block codes, the absence of change in phase is important. Conversely, performing the change of phase on symbols that have been precoded is the key point of the present invention.

Accordingly, a characteristic feature of the present invention is that the change in phase is not performed on all symbols within the frame configuration in the time-frequency domain, but only performed on baseband signals that have been precoded and have undergone switching.

The following describes a scheme for regularly changing the phase when encoding is performed using block codes as described in Non-Patent Literature 12 through 15, such as QC LDPC Codes (not only QC-LDPC but also LDPC codes may be used), concatenated LDPC and BCH codes, Turbo codes or Duo-Binary Turbo Codes using tail-biting, and so on. The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is necessary, then the number of bits making up each coded block is the sum of the number of bits making up the block codes and the number of bits making up the information.

FIG. 34 illustrates the varying numbers of symbols and slots needed in two coded blocks when block codes are used. Unlike FIGS. 69 and 70, for example, FIG. 34 illustrates the varying numbers of symbols and slots needed in each coded block when block codes are used when, for example, two streams s1 and s2 are transmitted as indicated in FIG. 4, with an encoder and distributor. (Here, the transmission scheme may be any single-carrier scheme or multi-carrier scheme such as OFDM.)

As shown in FIG. 34, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

Then, given that the above-described transmission device transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up one coded block, and when the modulation scheme is 64-QAM, 500 slots are needed to transmit all of the bits making up one coded block.

The following describes the relationship between the above-defined slots and the phase of multiplication, as pertains to schemes for a regular change of phase.

Here, five different phase changing values (or phase changing sets) are assumed as having been prepared for use in the scheme for a regular change of phase. That is, the phase changer of the above-described transmission device uses five phase changing values (or phase changing sets) to achieve the period (cycle) of five. (As in FIG. 69, five phase changing values are needed in order to perform a change of phase having a period (cycle) of five on switched baseband signal q2 only. Similarly, in order to perform the change in phase on both switched baseband signals q1 and q2, two phase changing values are needed for each slot. These two phase changing values are termed a phase changing set. Accordingly, here, in order to perform a change of phase having a period (cycle) of five, five such phase changing sets should be prepared). The five phase changing values (or phase changing sets) are expressed as PHASE[0], PHASE[1], PHASE[2], PHASE[3], and PHASE[4].

For the above-described 1500 slots needed to transmit the 6000 bits making up a single coded block when the modulation scheme is QPSK, PHASE[0] is used on 300 slots, PHASE[1] is used on 300 slots, PHASE[2] is used on 300 slots, PHASE[3] is used on 300 slots, and PHASE[4] is used on 300 slots. This is due to the fact that any bias in phase usage causes great influence to be exerted by the more frequently used phase, and that the reception device is dependent on such influence for data reception quality.

Furthermore, for the above-described 750 slots needed to transmit the 6000 bits making up a single coded block when the modulation scheme is 16-QAM, PHASE[0] is used on 150 slots, PHASE[1] is used on 150 slots, PHASE[2] is used on 150 slots, PHASE[3] is used on 150 slots, and PHASE[4] is used on 150 slots.

Further still, for the above-described 500 slots needed to transmit the 6000 bits making up a single coded block when the modulation scheme is 64-QAM, PHASE[0] is used on 150 slots, PHASE[1] is used on 100 slots, PHASE[2] is used on 100 slots, PHASE[3] is used on 100 slots, and PHASE[4] is used on 100 slots.

As described above, a scheme for a regular change of phase requires the preparation of N phase changing values (or phase changing sets) (where the N different phases are expressed as PHASE[0], PHASE[1], PHASE[2], . . . , PHASE[N−2], PHASE[N−1]). As such, in order to transmit all of the bits making up a single coded block, PHASE[0] is used on K0 slots, PHASE[1] is used on $K_1$ slots, PHASE[i] is used on $K_i$ slots (where i=0, 1, 2, . . . , N−1 (i denotes an integer that satisfies 0≤i≤N−1)), and PHASE[N−1] is used on $K_{N-1}$ slots, such that Condition #D1-4 is met.

(Condition #D1-4)

$K_0=K_1 \ldots =K_i= \ldots K_{N-1}$. That is, $K_a=K_b$ (for ∀a and ∀b where a, b, =0, 1, 2, . . . , N−1 (a denotes an integer that satisfies 0≤a≤N−1, b denotes an integer that satisfies 0≤b≤N−1), a≠b).

Then, when a communication system that supports multiple modulation schemes selects one such supported scheme for use, Condition #D1-4 is preferably satisfied for the supported modulation scheme.

However, when multiple modulation schemes are supported, each such modulation scheme typically uses symbols transmitting a different number of bits per symbols (though some may happen to use the same number), Condition #D1-4 may not be satisfied for some modulation schemes. In such a case, the following condition applies instead of Condition #D1-4.

(Condition #D1-5)

The difference between $K_a$ and $K_b$ satisfies 0 or 1. That is, $|K_a-K_b|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b)

FIG. 35 illustrates the varying numbers of symbols and slots needed in two coded block when block codes are used. FIG. 35 illustrates the varying numbers of symbols and slots needed in each coded block when block codes are used when, for example, two streams s1 and s2 are transmitted as indicated by the transmission device from FIG. 67 and FIG. 70, and the transmission device has two encoders. (Here, the transmission scheme may be any single-carrier scheme or multi-carrier scheme such as OFDM.)

As shown in FIG. 35, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

The transmission device from FIG. 67 and the transmission device from FIG. 70 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up the two coded blocks, and when the modulation scheme is 64-QAM, 1000 slots are needed to transmit all of the bits making up the two coded blocks.

The following describes the relationship between the above-defined slots and the phase of multiplication, as pertains to schemes for a regular change of phase.

Here, five different phase changing values (or phase changing sets) are assumed as having been prepared for use in the scheme for a regular change of phase. That is, the phase changer of the transmission device from FIG. 67 and FIG. 67 uses five phase changing values (or phase changing sets) to achieve the period (cycle) of five. (As in FIG. 69, five phase changing values are needed in order to perform a change of phase having a period (cycle) of five on switched baseband signal q2 only. Similarly, in order to perform the change in phase on both switched baseband signals q1 and q2, two phase changing values are needed for each slot. These two phase changing values are termed a phase changing set. Accordingly, here, in order to perform a change of phase having a period (cycle) of five, five such phase changing sets should be prepared). The five phase changing values (or phase changing sets) are expressed as PHASE[0], PHASE[1], PHASE[2], PHASE[3], and PHASE[4].

For the above-described 3000 slots needed to transmit the 6000×2 bits making up the two coded blocks when the modulation scheme is QPSK, PHASE[0] is used on 600 slots, PHASE[1] is used on 600 slots, PHASE[2] is used on 600 slots, PHASE[3] is used on 600 slots, and PHASE[4] is used on 600 slots. This is due to the fact that any bias in phase usage causes great influence to be exerted by the more frequently used phase, and that the reception device is dependent on such influence for data reception quality.

Further, in order to transmit the first coded block, PHASE [0] is used on slots 600 times, PHASE[1] is used on slots 600 times, PHASE[2] is used on slots 600 times, PHASE[3] is used on slots 600 times, and PHASE[4] is used on slots 600 times. Furthermore, in order to transmit the second coded block, PHASE[0] is used on slots 600 times, PHASE[1] is used on slots 600 times, PHASE[2] is used on slots 600 times, PHASE[3] is used on slots 600 times, and PHASE[4] is used on slots 600 times.

Similarly, for the above-described 1500 slots needed to transmit the 6000×2 bits making up the two coded blocks when the modulation scheme is 16-QAM, PHASE[0] is used on 300 slots, PHASE[1] is used on 300 slots, PHASE[2] is used on 300 slots, PHASE[3] is used on 300 slots, and PHASE[4] is used on 300 slots.

Further, in order to transmit the first coded block, PHASE [0] is used on slots 300 times, PHASE[1] is used on slots 300 times, PHASE[2] is used on slots 300 times, PHASE[3] is used on slots 300 times, and PHASE[4] is used on slots 300 times. Furthermore, in order to transmit the second coded block, PHASE[0] is used on slots 300 times, PHASE[1] is used on slots 300 times, PHASE[2] is used on slots 300 times, PHASE[3] is used on slots 300 times, and PHASE[4] is used on slots 300 times.

Similarly, for the above-described 1000 slots needed to transmit the 6000×2 bits making up the two coded blocks when the modulation scheme is 64-QAM, PHASE[0] is used on 200 slots, PHASE[1] is used on 200 slots, PHASE[2] is used on 200 slots, PHASE[3] is used on 200 slots, and PHASE[4] is used on 200 slots.

Further, in order to transmit the first coded block, PHASE [0] is used on slots 200 times, PHASE[1] is used on slots 200 times, PHASE[2] is used on slots 200 times, PHASE[3] is used on slots 200 times, and PHASE[4] is used on slots 200 times. Furthermore, in order to transmit the second coded block, PHASE[0] is used on slots 200 times, PHASE[1] is used on slots 200 times, PHASE[2] is used on slots 200 times, PHASE[3] is used on slots 200 times, and PHASE[4] is used on slots 200 times.

As described above, a scheme for a regular change of phase requires the preparation of N phase changing values (or phase changing sets) (where the N different phases are expressed as PHASE[0], PHASE[1], PHASE[2], . . . , PHASE[N−2], PHASE[N−1]). As such, in order to transmit all of the bits making up a single coded block, PHASE[0] is used on K0 slots, PHASE[1] is used on $K_1$ slots, PHASE[i] is used on $K_i$ slots (where i=0, 1, 2, . . . , N−1 (i denotes an integer that satisfies 0≤i≤N−1)), and PHASE[N−1] is used on $K_{N-1}$ slots, such that Condition #D1-6 is met.

(Condition #D1-6)

$K_0=K_1 \ldots == \ldots K_{N-1}$. That is, $K_a=K_b$ (for ∀a and ∀b where a, b, =0, 1, 2, . . . , N−1 (a denotes an integer that satisfies 0≤a≤N−1, b denotes an integer that satisfies 0≤b≤N−1), a≠b).

Further, in order to transmit all of the bits making up the first coded block, PHASE[0] is used $K_{0,1}$ times, PHASE[1] is used $K_{1,1}$ times, PHASE[i] is used $K_{i,1}$ times (where i=0, 1, 2, . . . , N−1 (i denotes an integer that satisfies 0≤i≤N−1)), and PHASE[N−1] is used $K_{N-1,1}$ times, such that Condition #D1-7 is met.

(Condition #D1-7)

$K_{0,1}=K_{1,1}= \ldots K_{i,1}= \ldots K_{N-1,1}$. That is, $K_{a,1}=K_{b,1}$ (∀a and ∀b where a, b, =0, 1, 2, . . . , N−1 (a denotes an integer that satisfies 0≤a≤N−1, b denotes an integer that satisfies 0≤b≤N−1), a≠b).

Furthermore, in order to transmit all of the bits making up the second coded block, PHASE[0] is used $K_{0,2}$ times, PHASE[1] is used $K_{1,2}$ times, PHASE[i] is used $K_{i,2}$ times (where i=0, 1, 2, . . . , N−1 (i denotes an integer that satisfies 0≤i≤N−1)), and PHASE[N−1] is used $K_{N-1,2}$ times, such that Condition #D1-8 is met.

(Condition #D1-8)

$K_{0,2}=K_{1,2}= \ldots K_{i,2}= \ldots K_{N-1,2}$. That is, $K_{a,2}=K_{b,2}$ (∀a and ∀b where a, b, =0, 1, 2, . . . , N−1 (a denotes an integer that satisfies 0≤a≤N−1, b denotes an integer that satisfies 0≤b≤N−1), a≠b).

Then, when a communication system that supports multiple modulation schemes selects one such supported scheme for use, Condition #D1-6 Condition #D1-7, and Condition #D1-8 are preferably satisfied for the supported modulation scheme.

However, when multiple modulation schemes are supported, each such modulation scheme typically uses symbols transmitting a different number of bits per symbols (though some may happen to use the same number), Condition #D1-6 Condition #D1-7, and Condition #D1-8 may not be satisfied for some modulation schemes. In such a case, the following conditions apply instead of Condition #D1-6 Condition #D1-7, and Condition #D1-8.

(Condition #D1-9)

The difference between $K_a$ and $K_b$ satisfies 0 or 1. That is, $|K_a-K_b|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b)

(Condition #D1-10)

The difference between $K_{a,1}$ and $K_{b,1}$ satisfies 0 or 1. That is, $|K_{a,1}-K_{b,1}|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b)

(Condition #D1-11)

The difference between $K_{a,2}$ and $K_{b,2}$ satisfies 0 or 1. That is, $|K_{a,2}-K_{b,2}|$ satisfies 0 or 1 (∀a, ∀b, where a, b=0, 1, 2, . . . , N−1 (a denotes an integer that satisfies 0≤a≤N−1, b denotes an integer that satisfies 0≤b≤N−1), a≠b)

As described above, bias among the phases being used to transmit the coded blocks is removed by creating a relationship between the coded block and the phase of multiplication. As such, data reception quality may be improved for the reception device.

As described above, N phase changing values (or phase changing sets) are needed in order to perform a change of phase having a period (cycle) of N with the scheme for the regular change of phase. As such, N phase changing values (or phase changing sets) PHASE[0], PHASE[1], PHASE [2], . . . , PHASE[N−2], and PHASE[N−1] are prepared. However, schemes exist for ordering the phases in the stated order with respect to the frequency domain. No limitation is intended in this regard. The N phase changing values (or phase changing sets) PHASE[0], PHASE[1], PHASE [2], . . . , PHASE[N−2], and PHASE[N−1] may also change the phases of blocks in the time domain or in the time-frequency domain to obtain a symbol arrangement. Although the above examples discuss a phase changing scheme with a period (cycle) of N, the same effects are obtainable using N phase changing values (or phase changing sets) at random. That is, the N phase changing values (or phase changing sets) need not always have regular periodicity. As long as the above-described conditions are satisfied, great quality data reception improvements are realizable for the reception device.

Furthermore, given the existence of modes for spatial multiplexing MIMO schemes, MIMO schemes using a fixed precoding matrix, space-time block coding schemes, single-stream transmission, and schemes using a regular change of phase, the transmission device (broadcaster, base station) may select any one of these transmission schemes.

As described in Non-Patent Literature 3, spatial multiplexing MIMO schemes involve transmitting signals s1 and s2, which are mapped using a selected modulation scheme, on each of two different antennas. MIMO schemes using a fixed precoding matrix involve performing precoding only (with no change in phase). Further, space-time block coding schemes are described in Non-Patent Literature 9, 16, and 17. Single-stream transmission schemes involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO schemes, MIMO schemes using a fixed precoding matrix, space-time block coding schemes, single-stream transmission, and schemes using a regular change of phase may be used. In particular, schemes using a regular change of phase on a selected (sub-)carrier group are preferably used to realize the above.

Although the present description describes the present embodiment as a transmission device applying precoding, baseband switching, and change in phase, all of these may be variously combined. In particular, the phase changer discussed for the present embodiment may be freely combined with the change in phase discussed in all other Embodiments.

Embodiment D2

The present embodiment describes a phase change initialization scheme for the regular change of phase described throughout the present description. This initialization scheme is applicable to the transmission device from FIG. 4 when using a multi-carrier scheme such as OFDM, and to the transmission devices of FIGS. 67 and 70 when using a single encoder and distributor, similarly to FIG. 4.

The following is also applicable to a scheme for regularly changing the phase when encoding is performed using block codes as described in Non-Patent Literature 12 through 15, such as QC LDPC Codes (not only QC-LDPC but also LDPC codes may be used), concatenated LDPC and BCH codes, Turbo codes or Duo-Binary Turbo Codes using tail-biting, and so on.

The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

FIG. 34 illustrates the varying numbers of symbols and slots needed in each coded block when block codes are used. FIG. 34 illustrates the varying numbers of symbols and slots needed in each coded block when block codes are used when, for example, two streams s1 and s2 are transmitted as indicated by the above-described transmission device, and the transmission device has only one encoder. (Here, the transmission scheme may be any single-carrier scheme or multi-carrier scheme such as OFDM.)

As shown in FIG. 34, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

Then, given that the above-described transmission device transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up each coded block, and when the modulation scheme is 64-QAM, 500 slots are needed to transmit all of the bits making up each coded block.

Figure 71A:
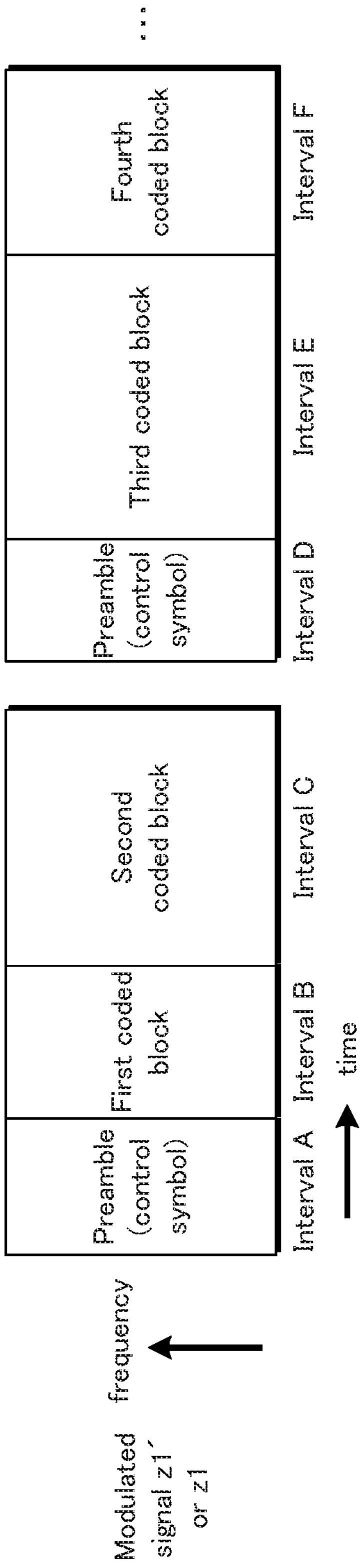
FIGS. 71A and 71B illustrate further sample frame configurations.
Figure 71B:
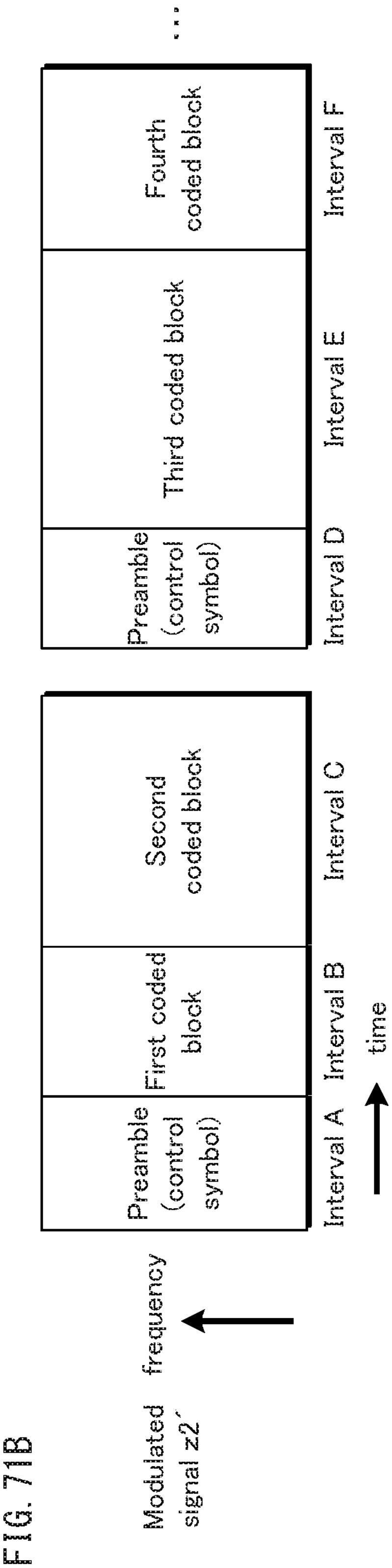

The following describes a transmission device transmitting modulated signals having a frame configuration illustrated by FIGS. 71A and 71B. FIG. 71A illustrates a frame configuration for modulated signal z1' or z1 (transmitted by antenna 312A) in the time and frequency domains. Similarly, FIG. 71B illustrates a frame configuration for modulated signal z2 (transmitted by antenna 312B) in the time and frequency domains. Here, the frequency (band) used by modulated signal z1' or z1 and the frequency (band) used for modulated signal z2 are identical, carrying modulated signals z1' or z1 and z2 at the same time.

As shown in FIG. 71A, the transmission device transmits a preamble (control symbol) during interval A. The preamble is a symbol transmitting control information for another party. In particular, this preamble includes information on the modulation scheme used to transmit a first and a second coded block. The transmission device transmits the first coded block during interval B. The transmission device then transmits the second coded block during interval C.

Further, the transmission device transmits a preamble (control symbol) during interval D. The preamble is a symbol transmitting control information for another party. In particular, this preamble includes information on the modulation scheme used to transmit a third or fourth coded block and so on. The transmission device transmits the third coded block during interval E. The transmission device then transmits the fourth coded block during interval D.

Also, as shown in FIG. 71B, the transmission device transmits a preamble (control symbol) during interval A. The preamble is a symbol transmitting control information for another party. In particular, this preamble includes information on the modulation scheme used to transmit a first and a second coded block. The transmission device transmits the first coded block during interval B. The transmission device then transmits the second coded block during interval C.

Further, the transmission device transmits a preamble (control symbol) during interval D. The preamble is a symbol transmitting control information for another party. In particular, this preamble includes information on the modulation scheme used to transmit a third or fourth coded block and so on. The transmission device transmits the third coded block during interval E. The transmission device then transmits the fourth coded block during interval D.

Figure 72:
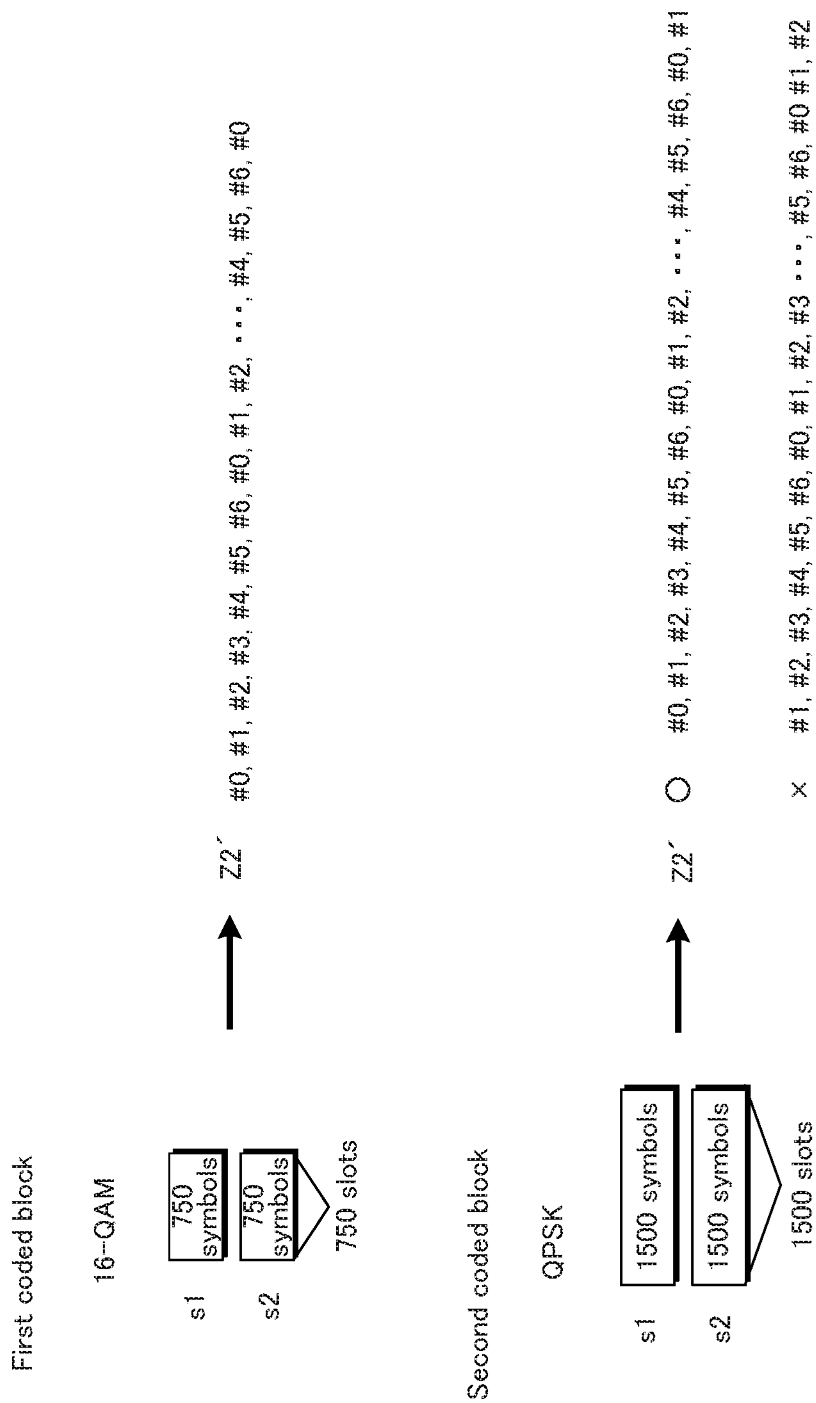
FIG. 72 illustrates the numbers of slots and phase changing values corresponding to a modulation scheme.

FIG. 72 indicates the number of slots used when transmitting the coded blocks from FIG. 34, specifically using 16-QAM as the modulation scheme for the first coded block. Here, 750 slots are needed to transmit the first coded block.

Similarly, FIG. 72 also indicates the number of slots used to transmit the second coded block, using QPSK as the modulation scheme therefor. Here, 1500 slots are needed to transmit the second coded block.

Figure 73:
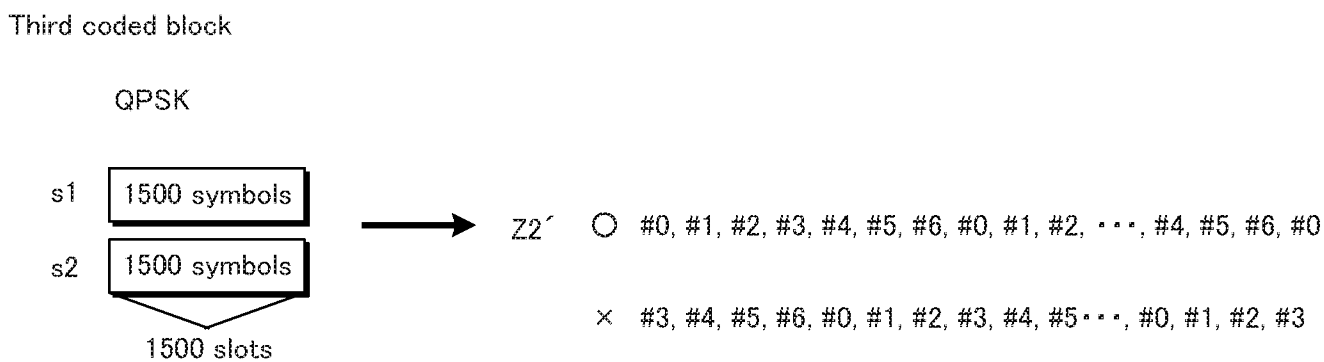
FIG. 73 further illustrates the numbers of slots and phase changing values corresponding to a modulation scheme.

FIG. 73 indicates the slots used when transmitting the coded blocks from FIG. 34, specifically using QPSK as the modulation scheme for the third coded block. Here, 1500 slots are needed to transmit the coded block.

As explained throughout this description, modulated signal z1, i.e., the modulated signal transmitted by antenna 312A, does not undergo a change in phase, while modulated signal z2, i.e., the modulated signal transmitted by antenna 312B, does undergo a change in phase. The following phase changing scheme is used for FIGS. 72 and 73.

Before the change in phase can occur, seven different phase changing values is prepared. The seven phase changing values are labeled #0, #1, #2, #3, #4, #5, #6, and #7. The change in phase is regular and periodic. In other words, the phase changing values are applied regularly and periodically, such that the order is #0, #1, #2, #3, #4, #5, #6, #0, #1, #2, #3, #4, #5, #6, #0, #1, #2, #3, #4, #5, #6 and so on.

As shown in FIG. 72, given that 750 slots are needed for the first coded block, phase changing value #0 is used initially, such that #0, #1, #2, #3, #4, #5, #6, #0, #1, #2, . . . , #3, #4, #5, #6 are used in succession, with the 750th slot using #0 at the final position.

The change in phase is then applied to each slot for the second coded block. The present description assumes multicast transmission and broadcasting applications. As such, a receiving terminal may have no need for the first coded block and extract only the second coded block. In such circumstances, given that the final slot used for the first coded block uses phase changing value #0, the initial phase changing value used for the second coded block is #1. As such, the following schemes are conceivable:

(a): The aforementioned terminal monitors the transmission of the first coded block, i.e., monitors the pattern of the phase changing values through the final slot used to transmit the first coded block, and then estimates the phase changing value used for the initial slot of the second coded block;

(b): (a) does not occur, and the transmission device transmits information on the phase changing values in use at the initial slot of the second coded block. Scheme (a) leads to greater energy consumption by the terminal due to the need to monitor the transmission of the first coded block. However, scheme (b) leads to reduced data transmission efficiency.

Accordingly, there is a need to improve the phase changing value allocation described above. Consider a scheme in which the phase changing value used to transmit the initial slot of each coded block is fixed. Thus, as indicated in FIG. 72, the phase changing value used to transmit the initial slot of the second coded block and the phase changing value used to transmit the initial slot of the first coded block are identical, being #0.

Similarly, as indicated in FIG. 73, the phase changing value used to transmit the initial slot of the third coded block is not #3, but is instead identical to the phase changing value used to transmit the initial slot of the first and second coded blocks, being #0.

As such, the problems accompanying both schemes (a) and (b) described above can be constrained while retaining the effects thereof.

In the present embodiment, the scheme used to initialize the phase changing value for each coded block, i.e., the phase changing value used for the initial slot of each coded block, is fixed so as to be #0. However, other schemes may also be used for single-frame units. For example, the phase changing value used for the initial slot of a symbol transmitting information after the preamble or control symbol has been transmitted may be fixed at #0.

Embodiment D3

The above-described Embodiments discuss a weighting unit using a precoding matrix expressed in complex numbers for precoding. However, the precoding matrix may also be expressed in real numbers.

That is, suppose that two baseband signals s1($i$) and s2($i$) (where i is time or frequency) have been mapped (using a modulation scheme), and precoded to obtained precoded baseband signals z1($i$) and z2($i$). As such, mapped baseband signal s1($i$) has an in-phase component of $I_{s1}(i)$ and a quadrature component of $Q_{s1}(i)$, and mapped baseband signal s2($i$) has an in-phase component of $I_{s2}(i)$ and a quadrature component of $Q_{s2}(i)$, while precoded baseband signal z1($i$) has an in-phase component of Iz1($i$) and a quadrature component of $Q_{z1}(i)$, and precoded baseband signal z2($i$) has an in-phase component of $I_2(i)$ and a quadrature component of $Q_{z2}(i)$, which gives the following precoding matrix $H_r$ when all values are real numbers.

[Math. 76]

$$\begin{pmatrix} I_{z1}(i) \\ Q_{z1}(i) \\ I_{z2}(i) \\ Q_{z2}(i) \end{pmatrix} = H_r \begin{pmatrix} I_{s1}(i) \\ Q_{s1}(i) \\ I_{s2}(i) \\ Q_{s2}(i) \end{pmatrix} \quad \text{(formula 76)}$$

Precoding matrix $H_r$ may also be expressed as follows, where all values are real numbers.

[Math. 77]

$$H_r = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \quad \text{(formula 77)}$$

where $a_{11}, a_{12}, a_{13}, a_{14}, a_{21}, a_{22}, a_{23}, a_{24}, a_{31}, a_{32}, a_{33}, a_{34}, a_{41}, a_{42}, a_{43}$, and $a_{44}$ are real numbers. However, none of the following may hold: $\{a_{11}=0, a_{12}=0, a_{13}=0$, and $a_{14}=0\}$, $\{a_{21}=0, a_{22}=0, a_{23}=0$, and $a_{24}=0\}$, $\{a_{31}=0, a_{32}=0, a_{33}=0$, and $a_{34}=0\}$, and $\{a_{41}=0, a_{42}=0, a_{43}=0$, and $a_{44}=0\}$. Also, none of the following may hold: $\{a_{11}=0, a_{21}=0, a_{31}=0$, and $a_{41}=0\}$, $\{a_{12}=0, a_{22}=0, a_{32}=0$, and $a_{42}=0\}$, $\{a_{13}=0, a_{23}=0, a_{33}=0$, and $a_{43}=0\}$, and $\{a_{14}=0, a_{24}=0, a_{34}=0$, and $a_{44}=0\}$.

Embodiment E1

The present embodiment describes a scheme of initializing phase change in a case where (i) the transmission device in FIG. 4 is used, (ii) the transmission device in FIG. 4 is compatible with the multi-carrier scheme such as the OFDM scheme, and (iii) one encoder and a distributor is adopted in the transmission device in FIG. 67 and the transmission device in FIG. 70 as shown in FIG. 4, when the phase change scheme for regularly performing phase change described in this description is used.

The following describes the scheme for regularly changing the phase when using a Quasi-Cyclic Low-Density Parity-Check (QC-LDPC) code (or an LDPC code other than a QC-LDPC code), a concatenated code consisting of an LDPC code and a Bose-Chaudhuri-Hocquenghem (BCH) code, and a block code such as a turbo code or a duo-binary turbo code using tail-biting. These codes are described in Non-Patent Literatures 12 through 15.

The following describes a case of transmitting two streams s1 and s2 as an example. Note that, when the control information and the like are not required to perform encoding using the block code, the number of bits constituting the coding (encoded) block is the same as the number of bits constituting the block code (however, the control information and the like described below may be included). When the control information and the like (e.g. CRC (cyclic redundancy check), a transmission parameter) are required to perform encoding using the block code, the number of bits constituting the coding (encoded) block can be a sum of the number of bits constituting the block code and the number of bits of the control information and the like.

FIG. 34 shows a change in the number of symbols and slots required for one coding (encoded) block when the block code is used. FIG. 34 shows a change in the number of symbols and slots required for one coding (encoded) block when the block code is used in a case where the two streams s1 and s2 are transmitted and the transmission device has a single encoder, as shown in the transmission device described above (note that, in this case, either the single carrier transmission or the multi-carrier transmission such as the OFDM may be used as a transmission system).

As shown in FIG. 34, let the number of bits constituting one coding (encoded) block in the block code be 6000 bits. In order to transmit the 6000 bits, 3000 symbols, 1500 symbols and 1000 symbols are necessary when the modulation scheme is QPSK, 16-QAM and 64-QAM, respectively.

Since two streams are to be simultaneously transmitted in the transmission device above, when the modulation scheme is QPSK, 1500 symbols are allocated to s1 and remaining 1500 symbols are allocated to s2 out of the above-mentioned 3000 symbols. Therefore, 1500 slots (referred to as slots) are necessary to transmit 1500 symbols by s1 and transmit 1500 symbols by s2.

Making the same considerations, 750 slots are necessary to transmit all the bits constituting one coding (encoded) block when the modulation scheme is 16-QAM, and 500 slots are necessary to transmit all the bits constituting one block when the modulation scheme is 64-QAM.

Next, a case where the transmission device transmits modulated signals each having a frame structure shown in FIGS. 71A and 71B is considered. FIG. 71A shows a frame structure in the time and frequency domain for a modulated signal z'1 or z1 (transmitted by the antenna 312A). FIG. 71B shows a frame structure in the time and frequency domain for a modulated signal z2 (transmitted by the antenna 312B). In this case, the modulated signal z'l or z1 and the modulated signal z2 are assumed to occupy the same frequency (band), and the modulated signal z'1 or z1 and the modulated signal z2 are assumed to exist at the same time.

As shown in FIG. 71A, the transmission device transmits a preamble (control symbol) in an interval A. The preamble is a symbol for transmitting control information to the communication partner and is assumed to include information on the modulation scheme for transmitting the first coding (encoded) block and the second coding (encoded) block. The transmission device is to transmit the first coding (encoded) block in an interval B. The transmission device is to transmit the second coding (encoded) block in an interval C.

The transmission device transmits the preamble (control symbol) in an interval D. The preamble is a symbol for transmitting control information to the communication partner and is assumed to include information on the modulation scheme for transmitting the third coding (encoded) block, the fourth coding (encoded) block and so on. The transmission device is to transmit the third coding (encoded) block in an interval E. The transmission device is to transmit the fourth coding (encoded) block in an interval F.

As shown in FIG. 71B, the transmission device transmits a preamble (control symbol) in the interval A. The preamble is a symbol for transmitting control information to the communication partner and is assumed to include information on the modulation scheme for transmitting the first coding (encoded) block and the second coding (encoded) block. The transmission device is to transmit the first coding (encoded) block in the interval B. The transmission device is to transmit the second coding (encoded) block in the interval C.

The transmission device transmits the preamble (control symbol) in the interval D. The preamble is a symbol for transmitting control information to the communication partner and is assumed to include information on the modulation scheme for transmitting the third coding (encoded) block, the fourth coding (encoded) block and so on. The transmission device is to transmit the third coding (encoded) block in the interval E. The transmission device is to transmit the fourth coding (encoded) block in the interval F.

FIG. 72 shows the number of slots used when the coding (encoded) blocks are transmitted as shown in FIG. 34, and, in particular, when 16-QAM is used as the modulation scheme in the first coding (encoded) block. In order to transmit first coding (encoded) block, 750 slots are necessary.

Figure 100:
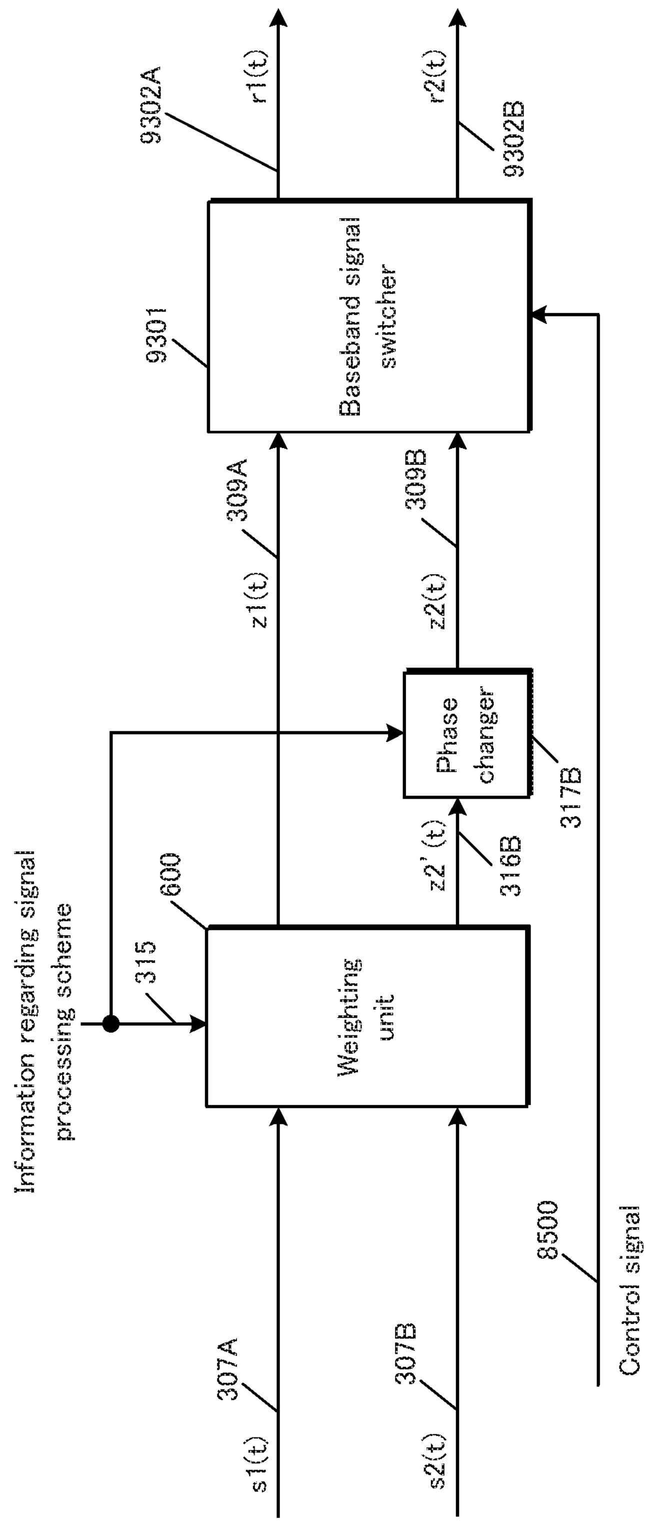
FIG. 100 illustrates an example of a structure of the signal processor pertaining to the weighting unit.

Similarly, FIG. 100 shows the number of slots used when QPSK is used as the modulation scheme in the second coding (encoded) block. In order to transmit second coding (encoded) block, 1500 slots are necessary.

FIG. 73 shows the number of slots used when the coding (encoded) block is transmitted as shown in FIG. 34, and, in particular, when QPSK is used as the modulation scheme in the third coding (encoded) block. In order to transmit third coding (encoded) block, 1500 slots are necessary.

As described in this description, a case where phase change is not performed for the modulated signal z1, i.e. the modulated signal transmitted by the antenna 312A, and is performed for the modulated signal z2, i.e. the modulated signal transmitted by the antenna 312B, is considered. In this case, FIGS. 72 and 73 show the scheme of performing phase change.

First, assume that seven different phase changing values are prepared to perform phase change, and are referred to as #0, #1, #2, #3, #4, #5 and #6. The phase changing values are to be regularly and cyclically used. That is to say, the phase changing values are to be regularly and cyclically changed in the order such as #0, #1, #2, #3, #4, #5, #6, #0, #1, #2, #3, #4, #5, #6, #0, #1, #2, #3, #4, #5, #6, . . . .

First, as shown in FIG. 72, 750 slots exist in the first coding (encoded) block. Therefore, starting from #0, the phase changing values are arranged in the order #0, #1, #2, #3, #4, #5, #6, #0, #1, #2, . . . , #4, #5, #6, #0, and end using #0 for the $750^{th}$ slot.

Next, the phase changing values are to be applied to each slot in the second coding (encoded) block. Since this description is on the assumption that the phase changing values are applied to the multicast communication and broadcast, one possibility is that a reception terminal does not need the first coding (encoded) block and extracts only the second coding (encoded) block. In such a case, even when phase changing value #0 is used to transmit the last slot in the first coding (encoded) block, the phase changing value #1 is used first to transmit the second coding (encoded) block. In this case, the following two schemes are considered:

(a) The above-mentioned terminal monitors how the first coding (encoded) block is transmitted, i.e. the terminal monitors a pattern of the phase changing value used to transmit the last slot in the first coding (encoded) block, and estimates the phase changing value to be used to transmit the first slot in the second coding (encoded) block; and (b) The transmission device transmits information on the phase changing value used to transmit the first slot in the second coding (encoded) block without performing (a).

In the case of (a), since the terminal has to monitor transmission of the first coding (encoded) block, power consumption increases. In the case of (b), transmission efficiency of data is reduced.

Therefore, there is room for improvement in allocation of precoding matrices as described above. In order to address the above-mentioned problems, a scheme of fixing the phase changing value used to transmit the first slot in each coding (encoded) block is proposed. Therefore, as shown in FIG. 72, the phase changing value used to transmit the first slot in the second coding (encoded) block is set to #0 as with the phase changing value used to transmit the first slot in the first coding (encoded) block.

Similarly, as shown in FIG. 73, the phase changing value used to transmit the first slot in the third coding (encoded) block is set not to #3 but to #0 as with the phase changing value used to transmit the first slot in the first coding (encoded) block and in the second coding (encoded) block.

With the above-mentioned scheme, an effect of suppressing the problems occurring in (a) and (b) is obtained.

Note that, in the present embodiment, the scheme of initializing the phase changing values in each coding (encoded) block, i.e. the scheme in which the phase changing value used to transmit the first slot in each coding (encoded) block is fixed to #0, is described. As a different scheme, however, the phase changing values may be initialized in units of frames. For example, in the symbol for transmitting the preamble and information after transmission of the control symbol, the phase changing value used in the first slot may be fixed to #0.

For example, in FIG. 71, a frame is interpreted as starting from the preamble, the first coding (encoded) block in the first frame is first coding (encoded) block, and the first coding (encoded) block in the second frame is the third coding (encoded) block. This exemplifies a case where "the phase changing value used in the first slot may be fixed (to #0) in units of frames" as described above using FIGS. 72 and 73.

The following describes a case where the above-mentioned scheme is applied to a broadcasting system that uses the DVB-T2 standard. First, the frame structure for a broadcast system according to the DVB-T2 standard is described.

Figure 74:
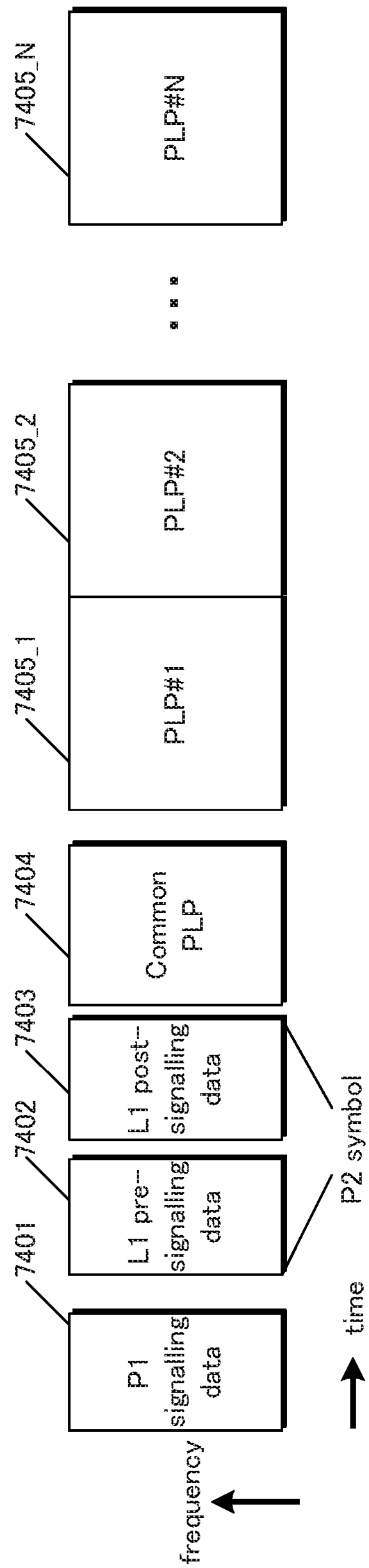
FIG. 74 illustrates the overall frame configuration of a signal transmitted by a broadcaster using DVB-T2.

FIG. 74 is an overview of the frame structure of a signal a signal transmitted by a broadcast station according to the DVB-T2 standard. According to the DVB-T2 standard, an OFDM scheme is employed. Thus, frames are structured in the time and frequency domains. FIG. 74 shows the frame structure in the time and frequency domains. The frame is composed of P1 Signalling data (7401), L1 Pre-Signalling data (7402), L1 Post-Signalling data (7403), Common PLP (7404), and PLPs #1 to #N (7405_1 to 7405_N) (PLP: Physical Layer Pipe). (Here, L1 Pre-Signalling data (7402) and L1 Post-Signalling data (7403) are referred to as P2 symbols.) As above, the frame composed of P1 Signalling data (7401), L1 Pre-Signalling data (7402), L1 Post-Signalling data (7403), Common PLP (7404), and PLPs #1 to #N (7405_1 to 7405_N) is referred to as a T2 frame, which is a unit of frame structure.

The P1 Signalling data (7401) is a symbol for use by a reception device for signal detection and frequency synchronization (including frequency offset estimation). Also, the P1 Signalling data (7401) transmits information including information indicating the FFT (Fast Fourier Transform) size, and information indicating which of SISO (Single-Input Single-Output) and MISO (Multiple-Input Single-Output) is employed to transmit a modulated signal. (The SISO scheme is for transmitting one modulated signal, whereas the MISO scheme is for transmitting a plurality of modulated signals using space-time block codes shown in Non-Patent Literatures 9, 16 and 17.)

The L1 Pre-Signalling data (7402) transmits information including: information about the guard interval used in transmitted frames; information about the signal processing method for reducing PAPR (Peak to Average Power Ratio); information about the modulation scheme, error correction scheme (FEC: Forward Error Correction), and coding rate of the error correction scheme all used in transmitting L1 Post-Signalling data; information about the size of L1 Post-Signalling data and the information size; information about the pilot pattern; information about the cell (frequency region) unique number; and information indicating which of the normal mode and extended mode (the respective modes differs in the number of subcarriers used in data transmission) is used.

The L1 Post-Signalling data (7403) transmits information including: information about the number of PLPs; information about the frequency region used; information about the unique number of each PLP; information about the modulation scheme, error correction scheme, coding rate of the error correction scheme all used in transmitting the PLPs; and information about the number of blocks transmitted in each PLP.

The Common PLP (7404) and PLPs #1 to #N (7405_1 to 7405_N) are fields used for transmitting data.

Figure 75:
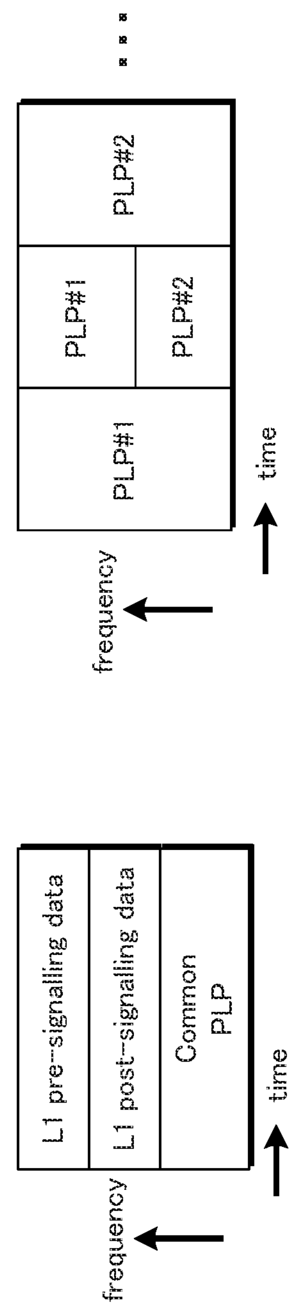
FIG. 75 illustrates two or more types of signals at the same time.

In the frame structure shown in FIG. 74, the P1 Signalling data (7401), L1 Pre-Signalling data (7402), L1 Post-Signalling data (7403), Common PLP (7404), and PLPs #1 to #N (7405_1 to 7405_N) are illustrated as being transmitted by time-sharing. In practice, however, two or more of the signals are concurrently present. FIG. 75 shows such an example. As shown in FIG. 75, L1 Pre-Signalling data, L1 Post-Signalling data, and Common PLP may be present at the same time, and PLP #1 and PLP #2 may be present at the same time. That is, the signals constitute a frame using both time-sharing and frequency-sharing.

Figure 76:
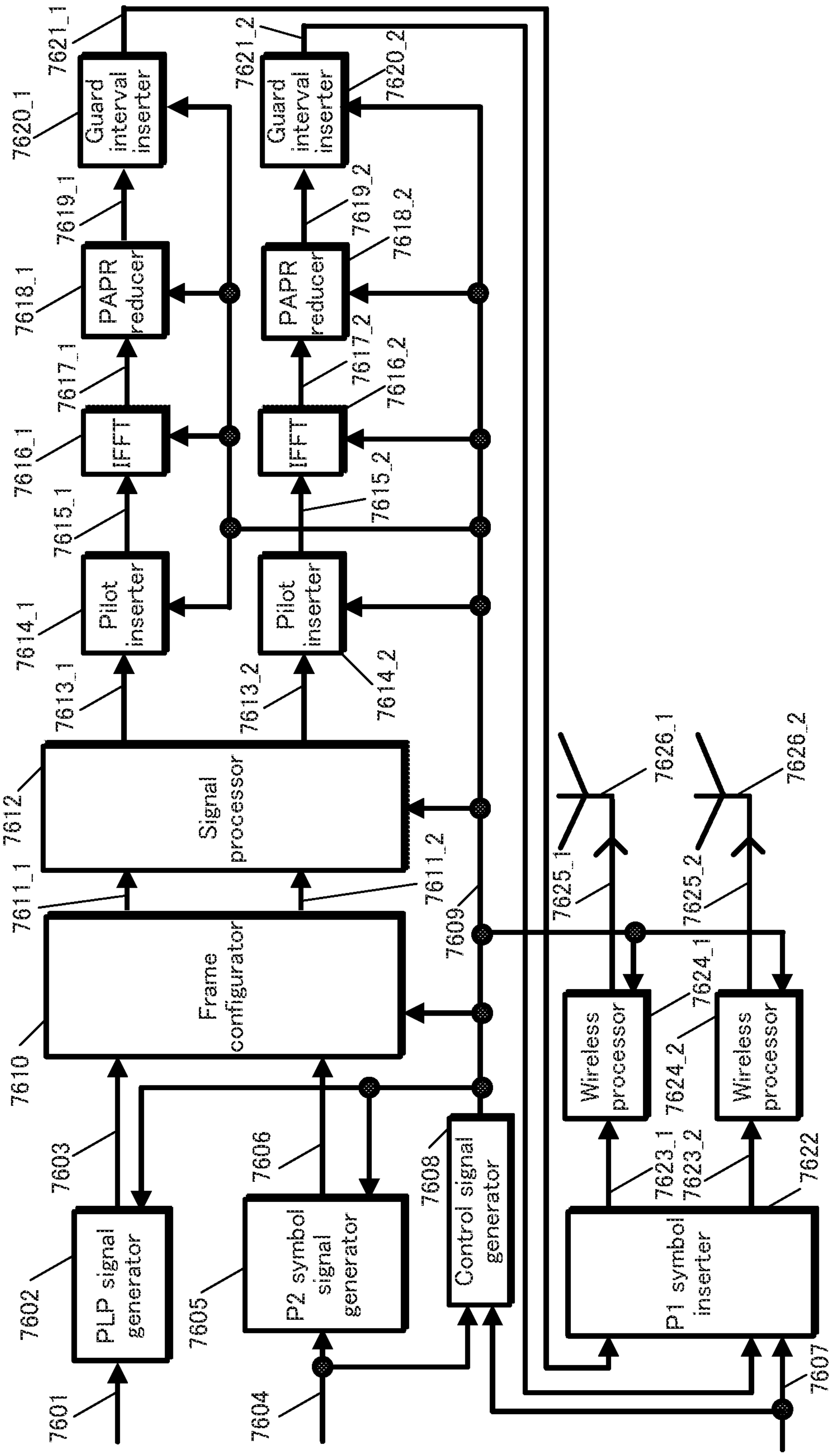
FIG. 76 illustrates still a further sample configuration of a transmission device.

FIG. 76 shows an example of the structure of a transmission device obtained by applying the phase change schemes of performing phase change on the signal after performing precoding (or after performing precoding, and switching the baseband signals) to a transmission device compliant with the DVB-T2 standard (i.e., to a transmission device of a broadcast station).

A PLP signal generator 7602 receives PLP transmission data (transmission data for a plurality of PLPs) 7601 and a control signal 7609 as input, performs mapping of each PLP according to the error correction scheme and modulation scheme indicated for the PLP by the information included in the control signal 7609, and outputs a (quadrature) baseband signal 7603 carrying a plurality of PLPs.

A P2 symbol signal generator 7605 receives P2 Csymbol transmission data 7604 and the control signal 7609 as input, performs mapping according to the error correction scheme and modulation scheme indicated for each P2 symbol by the information included in the control signal 7609, and outputs a (quadrature) baseband signal 7606 carrying the P2 symbols.

A control signal generator 7608 receives P1 symbol transmission data 7607 and P2 symbol transmission data 7604 as input, and then outputs, as the control signal 7609, information about the transmission scheme (the error correction scheme, coding rate of the error correction, modulation scheme, block length, frame structure, selected transmission schemes including a transmission scheme that regularly hops between precoding matrices, pilot symbol insertion scheme, IFFT (Inverse Fast Fourier Transform)/FFT, method of reducing PAPR, and guard interval insertion scheme) of each symbol group shown in FIG. 74 (P1 Signalling data (7401), L1 Pre-Signalling data (7402), L1 Post-Signalling data (7403), Common PLP (7404), PLPs #1 to #N (7405_1 to 7405_N)).

A frame configurator 7610 receives, as input, the baseband signal 7603 carrying PLPs, the baseband signal 7606 carrying P2 symbols, and the control signal 7609. On receipt of the input, the frame configurator 7610 changes the order of input data in frequency domain and time domain based on the information about frame structure included in the control signal, and outputs a (quadrature) baseband signal 7611_1 corresponding to stream 1 (a signal after the mapping, that is, a baseband signal based on a modulation scheme to be used) and a (quadrature) baseband signal 7611_2 corresponding to stream 2 (a signal after the mapping, that is, a baseband signal based on a modulation scheme to be used) both in accordance with the frame structure.

A signal processor 7612 receives, as input, the baseband signal 7611_1 corresponding to stream 1, the baseband signal 7611_2 corresponding to stream 2, and the control signal 7609 and outputs a modulated signal 1 (7613_1) and a modulated signal 2 (7613_2) each obtained as a result of signal processing based on the transmission scheme indicated by information included in the control signal 7609.

The characteristic feature noted here lies in the following. That is, when a transmission scheme that performs phase change on the signal after performing precoding (or after performing precoding, and switching the baseband signals) is selected, the signal processor performs phase change on signals after performing precoding (or after performing precoding, and switching the baseband signals) in a manner similar to FIGS. 6, 25, 26, 27, 28, 29 and 69. Thus, processed signals so obtained are the modulated signal 1 (7613_1) and modulated signal 2 (7613_2) obtained as a result of the signal processing.

A pilot inserter 7614_1 receives, as input, the modulated signal 1 (7613_1) obtained as a result of the signal processing and the control signal 7609, inserts pilot symbols into the received modulated signal 1 (7613_1), and outputs a modulated signal 7615_1 obtained as a result of the pilot signal insertion. Note that the pilot symbol insertion is carried out based on information indicating the pilot symbol insertion scheme included the control signal 7609.

A pilot inserter 7614_2 receives, as input, the modulated signal 2 (7613_2) obtained as a result of the signal processing and the control signal 7609, inserts pilot symbols into the received modulated signal 2 (7613_2), and outputs a modulated signal 7615_2 obtained as a result of the pilot symbol insertion. Note that the pilot symbol insertion is carried out based on information indicating the pilot symbol insertion scheme included the control signal 7609.

An IFFT (Inverse Fast Fourier Transform) unit 7616_1 receives, as input, the modulated signal 7615_1 obtained as a result of the pilot symbol insertion and the control signal 7609, and applies IFFT based on the information about the IFFT method included in the control signal 7609, and outputs a signal 7617_1 obtained as a result of the IFFT.

An IFFT unit 7616_2 receives, as input, the modulated signal 7615_2 obtained as a result of the pilot symbol insertion and the control signal 7609, and applies IFFT based on the information about the IFFT method included in the control signal 7609, and outputs a signal 7617_2 obtained as a result of the IFFT.

A PAPR reducer 7618_1 receives, as input, the signal 7617_1 obtained as a result of the IFFT and the control signal 7609, performs processing to reduce PAPR on the received signal 7617_1, and outputs a signal 7619_1 obtained as a result of the PAPR reduction processing. Note that the PAPR reduction processing is performed based on the information about the PAPR reduction included in the control signal 7609.

A PAPR reducer 7618_2 receives, as input, the signal 7617_2 obtained as a result of the IFFT and the control signal 7609, performs processing to reduce PAPR on the received signal 7617_2, and outputs a signal 7619_2 obtained as a result of the PAPR reduction processing. Note that the PAPR reduction processing is carried out based on the information about the PAPR reduction included in the control signal 7609.

A guard interval inserter 7620_1 receives, as input, the signal 7619_1 obtained as a result of the PAPR reduction processing and the control signal 7609, inserts guard intervals into the received signal 7619_1, and outputs a signal 7621_1 obtained as a result of the guard interval insertion. Note that the guard interval insertion is carried out based on the information about the guard interval insertion scheme included in the control signal 7609.

A guard interval inserter 7620_2 receives, as input, the signal 7619_2 obtained as a result of the PAPR reduction processing and the control signal 7609, inserts guard intervals into the received signal 7619_2, and outputs a signal 7621_2 obtained as a result of the guard interval insertion. Note that the guard interval insertion is carried out based on the information about the guard interval insertion scheme included in the control signal 7609.

A P1 symbol inserter 7622 receives, as input, the signal 7621_1 obtained as a result of the guard interval insertion, the signal 7621_2 obtained as a result of the guard interval insertion, and the P1 symbol transmission data 7607, generates a P1 symbol signal from the P1 symbol transmission data 7607, adds the P1 symbol to the signal 7621_1 obtained as a result of the guard interval insertion, and adds the P1 symbol to the signal 7621_2 obtained as a result of the guard interval insertion. Then, the P1 symbol inserter 7622 outputs a signal 7623_1 as a result of the addition of the P1 symbol and a signal 7623_2 as a result of the addition of the P1 symbol. Note that a P1 symbol signal may be added to both the signals 7623_1 and 7623_2 or to one of the signals 7623_1 and 7623_2. In the case where the P1 symbol signal is added to one of the signals 7623_1 and 7623_2, the following is noted. For purposes of description, an interval of the signal to which a P1 symbol is added is referred to as a P1 symbol interval. Then, the signal to which a P1 signal is not added includes, as a baseband signal, a zero signal in an interval corresponding to the P1 symbol interval of the other signal.

A wireless processor 7624_1 receives the signal 7623_1 obtained as a result of the processing related to P1 symbol and the control signal 7609, performs processing such as frequency conversion, amplification, and the like, and outputs a transmission signal 7625_1. The transmission signal 7625_1 is then output as a radio wave from an antenna 7626_1.

A wireless processor 7624_2 receives the signal 7623_2 obtained as a result of the processing related to P1 symbol and the control signal 7609, performs processing such as frequency conversion, amplification, and the like, and outputs a transmission signal 7625_2. The transmission signal 7625_2 is then output as a radio wave from an antenna 7626_2.

As described above, by the P1 symbol, P2 symbol and control symbol group, information on transmission scheme of each PLP (for example, a transmission scheme of transmitting a single modulated signal, a transmission scheme of performing phase change on the signal after performing precoding (or after performing precoding, and switching the baseband signals)) and a modulation scheme being used is transmitted to a terminal. In this case, if the terminal extracts only PLP that is necessary as information to perform demodulation (including separation of signals and signal detection) and error correction decoding, power consumption of the terminal is reduced. Therefore, as described using FIGS. 71 through 73, the scheme in which the phase changing value used in the first slot in the PLP transmitted using, as the transmission scheme, the transmission scheme for regularly performing phase change on the signal after performing precoding (or after performing precoding, and switching the baseband signals) is fixed (to #0) is proposed. Note that the PLP transmission scheme is not limited to those described above. For example, a transmission scheme using space-time block codes disclosed in Non-Patent Literatures 9, 16 and 17 or another transmission scheme may be adopted.

For example, assume that the broadcast station transmits each symbol having the frame structure as shown in FIG. 74. In this case, as an example, FIG. 77 shows a frame structure in frequency-time domain when the broadcast station transmits PLP $1 (to avoid confusion, #1 is replaced by $1) and PLP $K using the transmission scheme of performing phase change on the signal after performing precoding (or after performing precoding, and switching the baseband signals).

Note that, in the following description, as an example, assume that seven phase changing values are prepared in the transmission scheme of performing phase change on the signal after performing precoding (or after performing precoding, and switching the baseband signals), and are referred to as #0, #1, #2, #3, #4, #5 and #6. The phase changing values are to be regularly and cyclically used. That is to say, the phase changing values are to be regularly and cyclically changed in the order such as #0, #1, #2, #3, #4, #5, #6, #0, #1, #2, #3, #4, #5, #6, #0, #1, #2, #3, #4, #5, #6, . . . .

Figure 77:
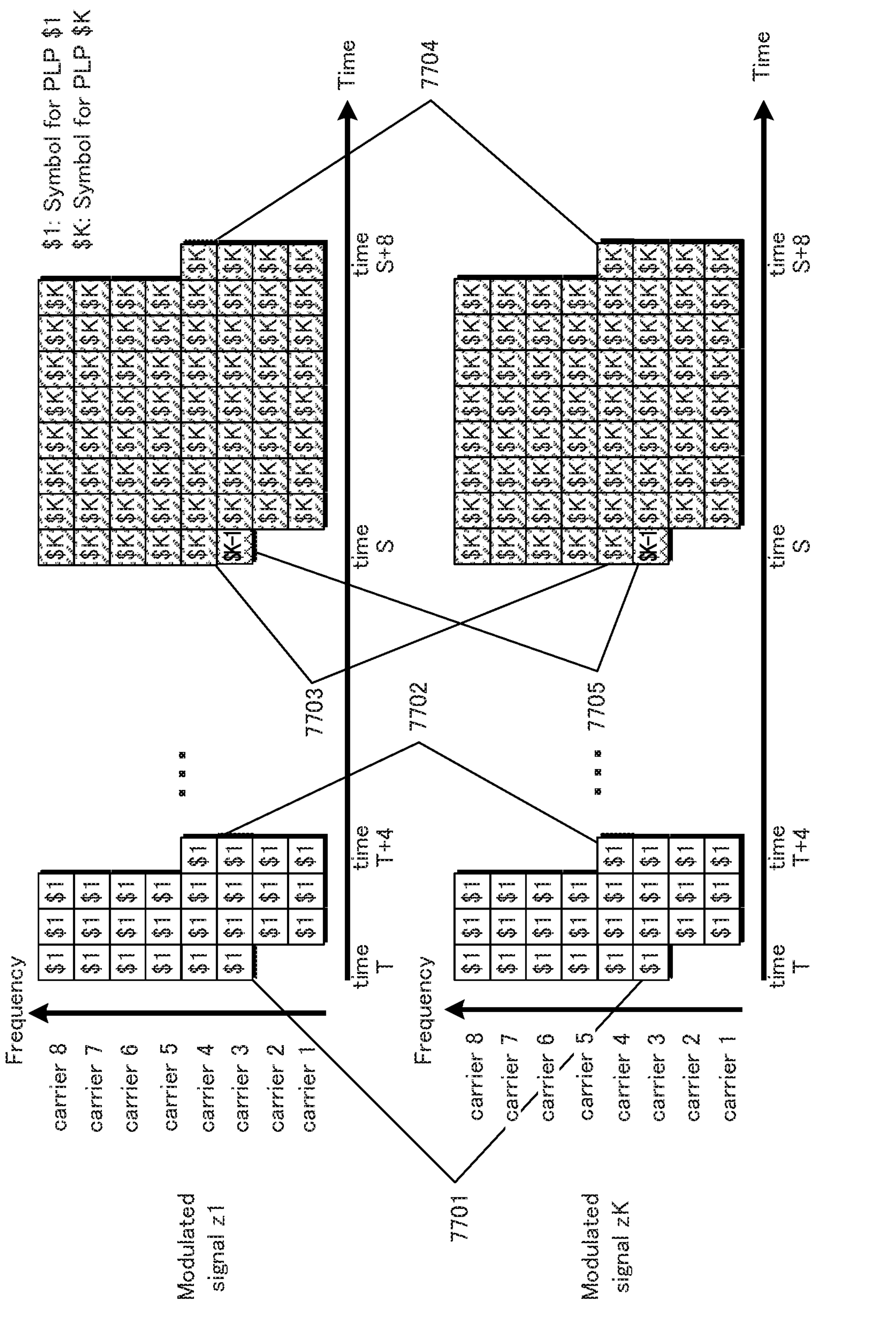
FIG. 77 illustrates an alternate sample frame configuration.

As shown in FIG. 77, the slot (symbol) in PLP $1 starts with a time T and a carrier 3 (7701 in FIG. 77) and ends with a time T+4 and a carrier 4 (7702 in FIG. 77) (see FIG. 77).

This is to say, in PLP $1, the first slot is the time T and the carrier 3, the second slot is the time T and the carrier 4, the third slot is the time T and a carrier 5, . . . , the seventh slot is a time T+1 and a carrier 1, the eighth slot is the time T+1 and a carrier 2, the ninth slot is the time T+1 and the carrier 3, . . . , the fourteenth slot is the time T+1 and a carrier 8, the fifteenth slot is a time T+2 and a carrier 0, . . . .

The slot (symbol) in PLP $K starts with a time S and a carrier 4 (7703 in FIG. 77) and ends with a time S+8 and the carrier 4 (7704 in FIG. 77) (see FIG. 77).

This is to say, in PLP $K, the first slot is the time S and the carrier 4, the second slot is the time S and a carrier 5, the third slot is the time S and a carrier 6, . . . , the fifth slot is the time S and a carrier 8, the ninth slot is a time S+1 and a carrier 1, the tenth slot is the time S+1 and a carrier 2, . . . , the sixteenth slot is the time S+1 and the carrier 8, the seventeenth slot is a time S+2 and a carrier 0, . . . .

Note that information on slot that includes information on the first slot (symbol) and the last slot (symbol) in each PLP and is used by each PLP is transmitted by the control symbol including the P1 symbol, the P2 symbol and the control symbol group.

In this case, as described using FIGS. 71 through 73, the first slot in PLP $1, which is the time T and the carrier 3 (7701 in FIG. 77), is subject to phase change using the phase changing value #0. Similarly, the first slot in PLP $K, which is the time S and the carrier 4 (7703 in FIG. 77), is subject to phase change using the phase changing value #0 regardless of the number of the phase changing values used in the last slot in PLP $K−1, which is the time S and the carrier 3 (7705 in FIG. 77). (However, as described above, it is assumed that precoding (or switching the precoding matrices and baseband signals) has been performed before the phase change is performed).

Also, the first slot in another PLP transmitted using a transmission scheme that performs phase change on the signal after performing precoding (or after performing precoding, and switching the baseband signals) is precoded using the precoding matrix #0.

With the above-mentioned scheme, an effect of suppressing the problems described in Embodiment D2 above, occurring in (a) and (b) is obtained.

Naturally, the reception device extracts necessary PLP from the information on slot that is included in the control symbol including the P1 symbol, the P2 symbol and the control symbol group and is used by each PLP to perform demodulation (including separation of signals and signal detection) and error correction decoding. The reception device learns a phase change rule of regularly performing phase change on the signal after performing precoding (or after performing precoding, and switching the baseband signals) in advance (when there are a plurality of rules, the transmission device transmits information on the rule to be used, and the reception device learns the rule being used by obtaining the transmitted information). By synchronizing a timing of rules of switching the phase changing values based on the number of the first slot in each PLP, the reception device can perform demodulation of information symbols (including separation of signals and signal detection).

Figure 78:
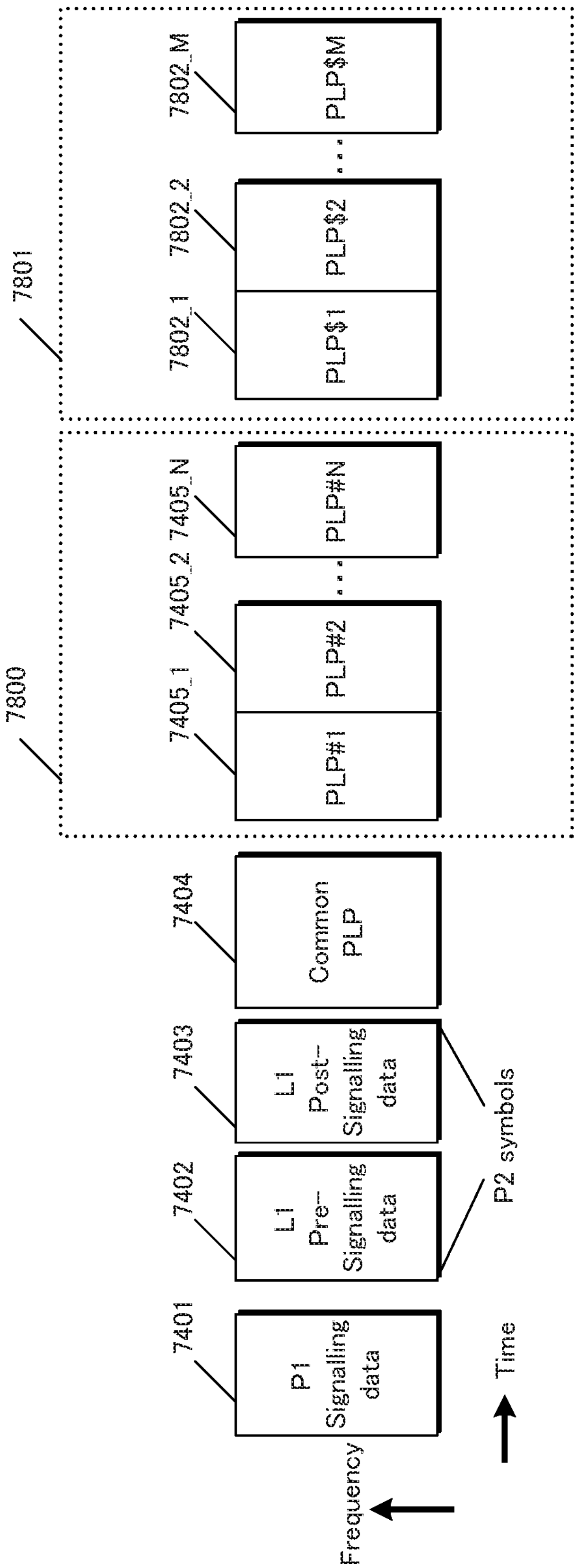
FIG. 78 illustrates another alternate sample frame configuration.

Next, a case where the broadcast station (base station) transmits a modulated signal having a frame structure shown in FIG. 78 is considered (the frame composed of symbol groups shown in FIG. 78 is referred to as a main frame). In FIG. 78, elements that operate in a similar way to FIG. 74 bear the same reference signs. The characteristic feature is that the main frame is separated into a subframe for transmitting a single modulated signal and a subframe for transmitting a plurality of modulated signals so that gain control of received signals can easily be performed. Note that the expression "transmitting a single modulated signal" also indicates that a plurality of modulated signals that are the same as the single modulated signal transmitted from a single antenna are generated, and the generated signals are transmitted from respective antennas.

In FIG. 78, PLP #1 (7405_1) through PLP #N (7405_N) constitute a subframe 7800 for transmitting a single modulated signal. The subframe 7800 is composed only of PLPs, and does not include PLP for transmitting a plurality of modulated signals. Also, PLP $1 (7802_1) through PLP $M (7802_M) constitute a subframe 7801 for transmitting a plurality of modulated signals. The subframe 7801 is composed only of PLPs, and does not include PLP for transmitting a single modulated signal.

In this case, as described above, when the above-mentioned transmission scheme for regularly performing phase change on the signal after performing precoding (or after performing precoding, and switching the baseband signals) is used in the subframe 7801, the first slot in PLP (PLP $1 (7802_1) through PLP $M (7802_M)) is assumed to be precoded using the precoding matrix #0 (referred to as initialization of the precoding matrices). The above-mentioned initialization of precoding matrices, however, is irrelevant to a PLP in which another transmission scheme, for example, one of the transmission scheme not performing phase change, the transmission scheme using the space-time block codes and the transmission scheme using a spatial multiplexing MIMO system (see FIG. 23) is used in PLP $1 (7802_1) through PLP $M (7802_M).

Figure 79:
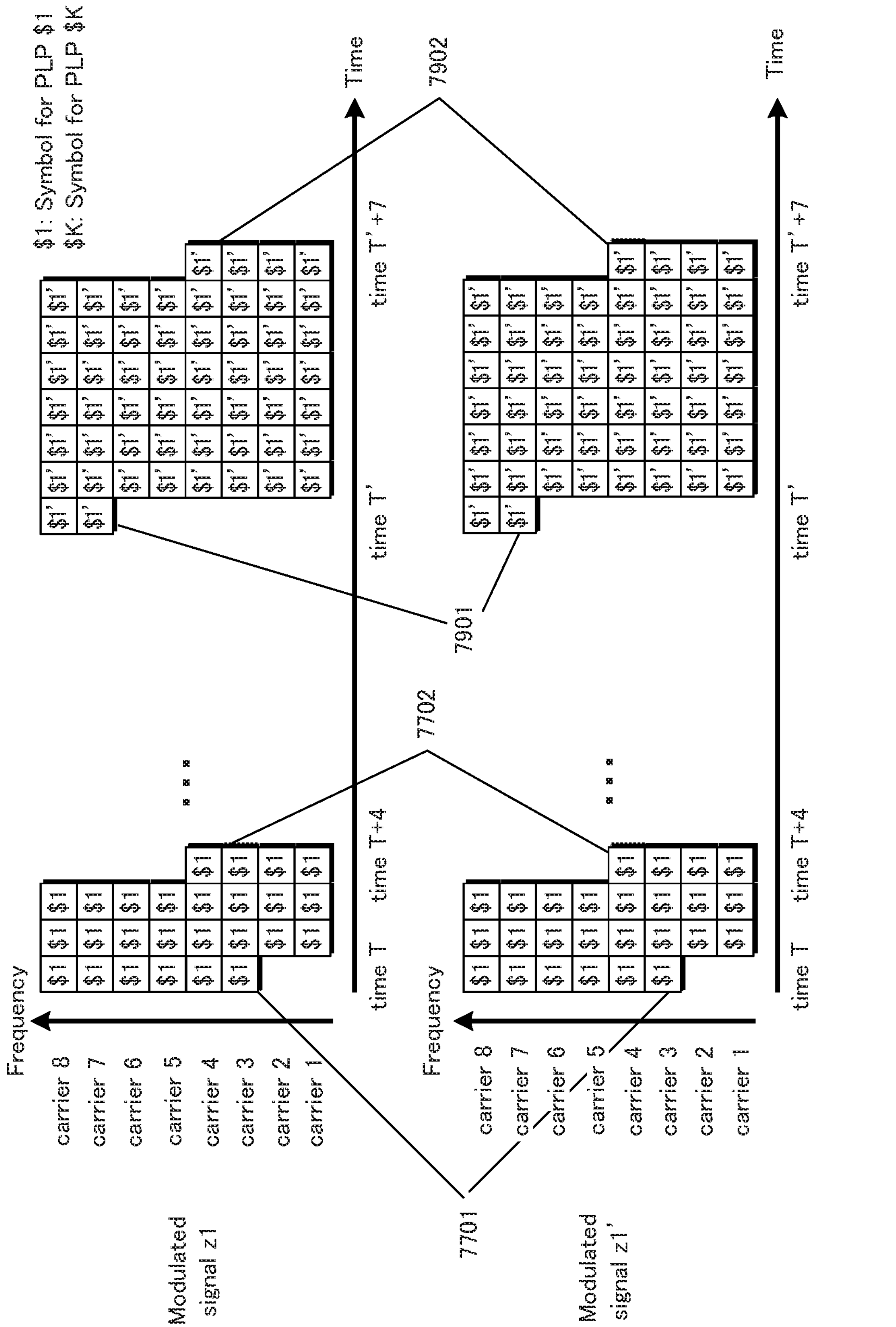
FIG. 79 illustrates a further alternate sample frame configuration.

As shown in FIG. 79, PLP $1 is assumed to be the first PLP in the subframe for transmitting a plurality of modulated signals in the Xth main frame. Also, PLP $1' is assumed to be the first PLP in the subframe for transmitting a plurality of modulated signals in the Yth main frame (Y is not X). Both PLP $1 and PLP $1' are assumed to use the transmission scheme for regularly performing phase change on the signal after performing precoding (or after performing precoding, and switching the baseband signals). In FIG. 79, elements that operate in a similar way to FIG. 77 bear the same reference signs.

In this case, the first slot (7701 in FIG. 79 (time T and carrier 3)) in PLP $1, which is the first PLP in the subframe for transmitting a plurality of modulated signals in the Xth main frame, is assumed to be subject to phase change using the phase changing value #0.

Similarly, the first slot (7901 in FIG. 79 (time T' and carrier 7)) in PLP $1', which is the first PLP in the subframe for transmitting a plurality of modulated signals in the Yth main frame, is assumed to be subject to phase change using the phase changing value #0.

As described above, in each main frame, the first slot in the first PLP in the subframe for transmitting a plurality of modulated signals is characterized by being subject to phase change using the phase changing value #0.

This is also important to suppress the problems described in Embodiment D2 occurring in (a) and (b).

Note that since the first slot (7701 in FIG. 79 (time T and carrier 3)) in PLP $1 is assumed to be subject to phase change using the phase changing value #0, when the phase changing value is updated in the time-frequency domain, the slot at time T, carrier 4 is subject to phase change using the phase changing value #1, the slot at time T, carrier 5 is subject to phase change using the phase changing value #2, the slot at time T, carrier 6 is subject to phase change using the phase changing value #3, and so on.

Similarly, note that since the first slot (7901 in FIG. 79 (time T' and carrier 7)) in PLP $1 is assumed to be subject to phase change using the phase changing value #0, when the phase changing value is updated in the time-frequency domain, the slot at time T', carrier 8 is subject to phase change using the phase changing value #1, the slot at time T'+1, carrier 1 is subject to phase change using the phase changing value #2, the slot at time T'+2, carrier 1 is subject to phase change using the phase changing value #3, the slot at time T'+3, carrier 1 is subject to phase change using the phase changing value #4, and so on.

Note that, in the present embodiment, cases where (i) the transmission device in FIG. 4 is used, (ii) the transmission device in FIG. 4 is compatible with the multi-carrier scheme such as the OFDM scheme, and (iii) one encoder and a distributor is adopted in the transmission device in FIG. 67 and the transmission device in FIG. 70 as shown in FIG. 4 are taken as examples. The initialization of phase changing values described in the present embodiment, however, is also applicable to a case where the two streams s1 and s2 are transmitted and the transmission device has two single encoders as shown in the transmission device in FIG. 3, the transmission device in FIG. 12, the transmission device in FIG. 67 and the transmission device in FIG. 70.

The transmission devices pertaining to the present invention, as illustrated by FIGS. 3, 4, 12, 13, 51, 52, 67, 70, 76, and so on transmit two modulated signals, namely modulated signal #1 and modulated signal #2, on two different transmit antennas. The average transmission power of the modulated signals #1 and #2 may be set freely. For example, when the two modulated signals each have a different average transmission power, conventional transmission power control technology used in wireless transmission systems may be applied thereto. Therefore, the average transmission power of modulated signals #1 and #2 may differ. In such circumstances, transmission power control may be applied to the baseband signals (e.g., when mapping is performed using the modulation scheme), or may be performed by a power amplifier immediately before the antenna.

Embodiment F1

The schemes for regularly performing phase change on the modulated signal after precoding described in Embodiments 1 through 4, Embodiment A1, Embodiments C1 through C7, Embodiments D1 through D3 and Embodiment E1 are applicable to any baseband signals s1 and s2 mapped in the I-Q plane. Therefore, in Embodiments 1 through 4, Embodiment A1, Embodiments C1 through C7, Embodiments D1 through D3 and Embodiment E1, the baseband signals s1 and s2 have not been described in detail. On the other hand, when the scheme for regularly performing phase change on the modulated signal after precoding is applied to the baseband signals s1 and s2 generated from the error correction coded data, excellent reception quality can be achieved by controlling average power (average value) of the baseband signals s1 and s2. In the present embodiment, the following describes a scheme of setting the average power of s1 and s2 when the scheme for regularly performing phase change on the modulated signal after precoding is applied to the baseband signals s1 and s2 generated from the error correction coded data.

As an example, the modulation schemes for the baseband signal s1 and the baseband signal s2 are described as QPSK and 16-QAM, respectively.

Since the modulation scheme for s1 is QPSK, s1 transmits two bits per symbol. Let the two bits to be transmitted be referred to as b0 and b1. On the other hand, since the modulation scheme for s2 is 16-QAM, s2 transmits four bits per symbol. Let the four bits to be transmitted be referred to as b2, b3, b4 and b5. The transmission device transmits one slot composed of one symbol for s1 and one symbol for s2, i.e. six bits b0, b1, b2, b3, b4 and b5 per slot.

Figure 80:
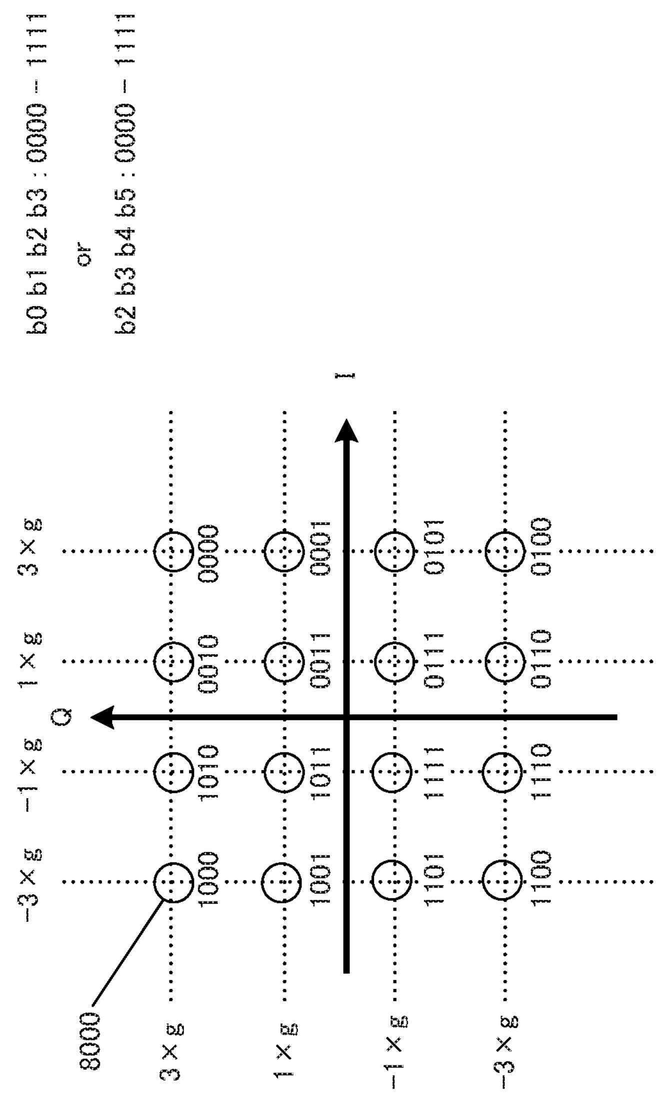
FIG. 80 illustrates an example of a signal point arrangement for 16-QAM in the I-Q plane.

For example, in FIG. 80 as an example of signal point arrangement in the I-Q plane for 16-QAM, (b2, b3, b4, b5)=(0, 0, 0, 0) is mapped onto (I,Q)=(3×g,3×g), (b2, b3, b4, b5)=(0, 0, 0, 1) is mapped onto (I,Q)=(3×g,1×g), (b2, b3, b4, b5)=(0, 0, 1, 0) is mapped onto (I,Q)=(1×g,3×g), (b2, b3, b4, b5)=(0, 0, 1, 1) is mapped onto (I,Q)=(1×g,1×g), (b2, b3, b4, b5)=(0, 1, 0, 0) is mapped onto (I,Q)=(3×g,−3×g), (b2, b3, b4, b5)=(1, 1, 1, 0) is mapped onto (I,Q)=(−1×g,−3×g), and (b2, b3, b4, b5)=(1, 1, 1, 1) is mapped onto (I,Q)=(−1×g,−1×g). Note that b2 through b5 shown on the top right of FIG. 80 shows the bits and the arrangement of the numbers shown on the I-Q plane.

Figure 81:
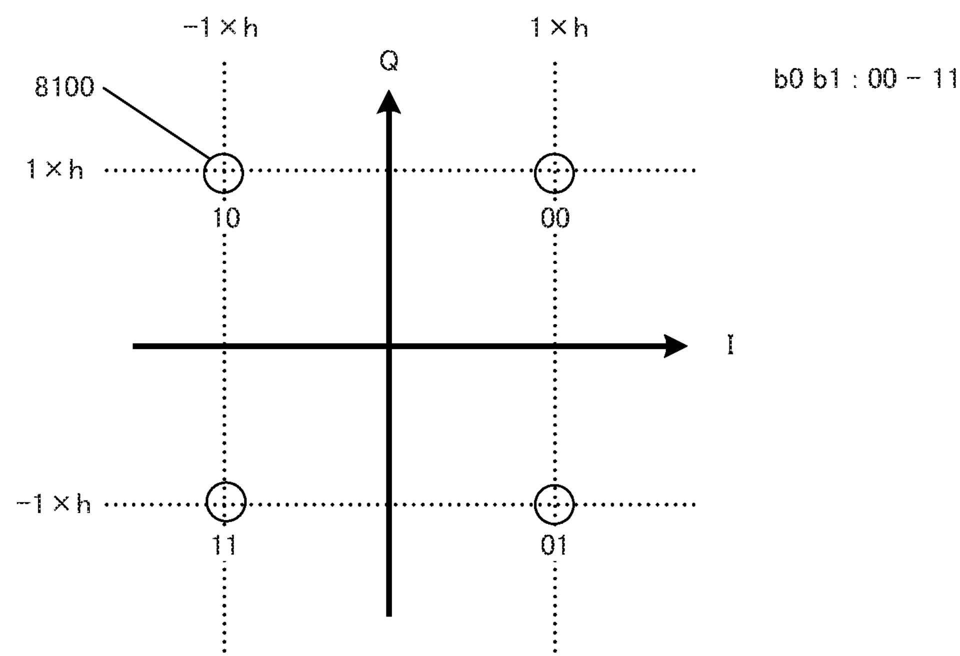
FIG. 81 illustrates an example of a signal point arrangement for QPSK in the I-Q plane.

Also, in FIG. 81 as an example of signal point arrangement in the I-Q plane for QPSK, (b0,b1)=(0,0) is mapped onto (I,Q)=(1×h,1×h), (b0,b1)=(0,1) is mapped onto (I,Q)=(1×h, −1×h), (b0,b1)=(1,0) is mapped onto (I,Q)=(−1×h,1×h), and (b0,b1)=(1,1) is mapped onto (I,Q)=(−1×h, −1×h). Note that b0 and b1 shown on the top right of FIG. 81 shows the bits and the arrangement of the numbers shown on the I-Q plane.

Here, assume that the average power of s1 is equal to the average power of s2, i.e. h shown in FIG. 81 is represented by formula 78 and g shown in FIG. 80 is represented by formula 79.

[Math. 78]

$$h = \frac{z}{\sqrt{2}} \quad \text{(formula 78)}$$

[Math. 79]

$$g = \frac{z}{\sqrt{10}} \quad \text{(Formula 79)}$$

Figure 82:
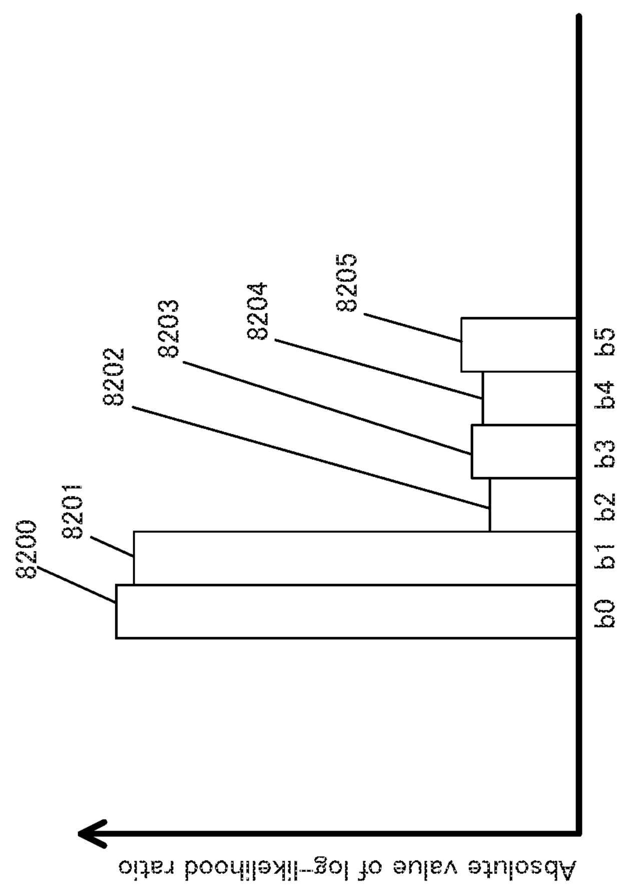
FIG. 82 schematically shows absolute values of a log-likelihood ratio obtained by the reception device.

FIG. 82 shows the log-likelihood ratio obtained by the reception device in this case. FIG. 82 schematically shows absolute values of the log-likelihood ratio for b0 through b5 described above when the reception device obtains the log-likelihood ratio. In FIG. 82, 8200 is the absolute value of the log-likelihood ratio for b0, 8201 is the absolute value of the log-likelihood ratio for b1, 8202 is the absolute value of the log-likelihood ratio for b2, 8203 is the absolute value of the log-likelihood ratio for b3, 8204 is the absolute value of the log-likelihood ratio for b4, and 8205 is the absolute value of the log-likelihood ratio for b5. In this case, as shown in FIG. 82, when the absolute values of the log-likelihood ratio for b0 and b1 transmitted in QPSK are compared with the absolute values of the log-likelihood ratio for b2 through b5 transmitted in 16-QAM, the absolute values of the log-likelihood ratio for b0 and b1 are higher than the absolute values of the log-likelihood ratio for b2 through b5. That is, reliability of b0 and b1 in the reception device is higher than the reliability of b2 through b5 in the reception device. This is because of the following reason. When h is represented by formula 79 in FIG. 80, a minimum Euclidian distance between signal points in the I-Q plane for QPSK is as follows.

[Math. 80]

$$\sqrt{2}z \quad \text{(formula 80)}$$

On the other hand, when h is represented by formula 78 in FIG. 78,

[Math. 81]

$$\frac{2}{\sqrt{10}}z \quad \text{(Formula 81)}$$

A minimum Euclidian distance between signal points in the I-Q plane for 16-QAM is as formula 81.

If the reception device performs error correction decoding (e.g. belief propagation decoding such as a sum-product decoding in a case where the communication system uses LDPC codes) under this situation, due to a difference in reliability that "the absolute values of the log-likelihood ratio for b0 and b1 are higher than the absolute values of the log-likelihood ratio for b2 through b5", a problem that the data reception quality degrades in the reception device by being affected by the absolute values of the log-likelihood ratio for b2 through b5 arises.

Figure 83:
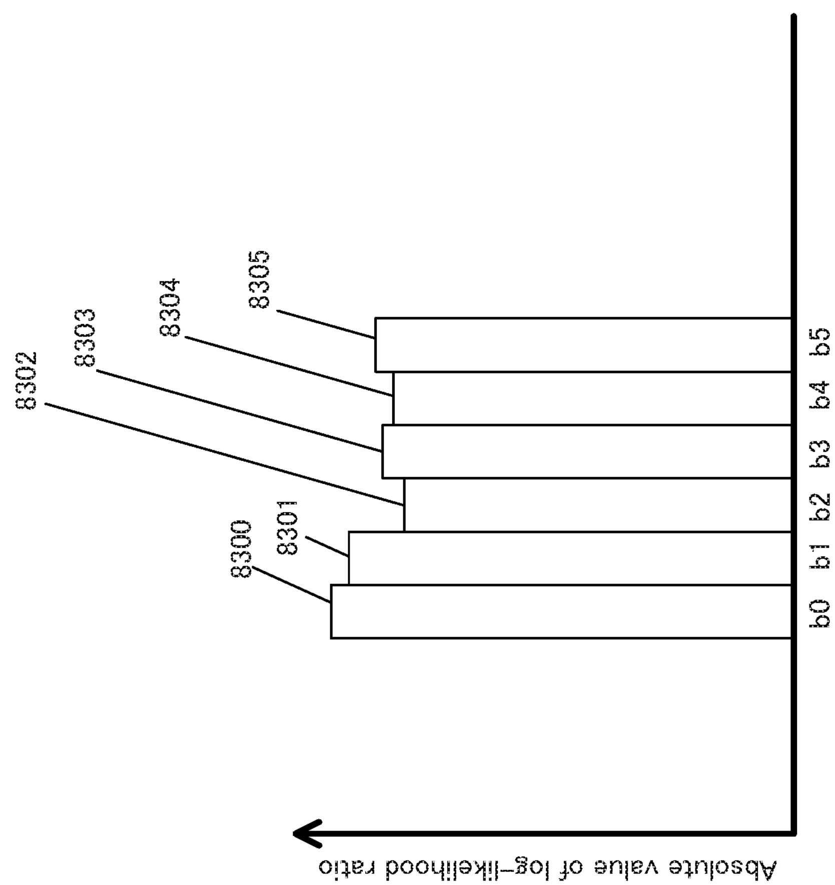
FIG. 83 schematically shows absolute values of a log-likelihood ratio obtained by the reception device.

In order to overcome the problem, the difference between the absolute values of the log-likelihood ratio for b0 and b1 and the absolute values of the log-likelihood ratio for b2 through b5 should be reduced compared with FIG. 82, as shown in FIG. 83.

Figure 84:
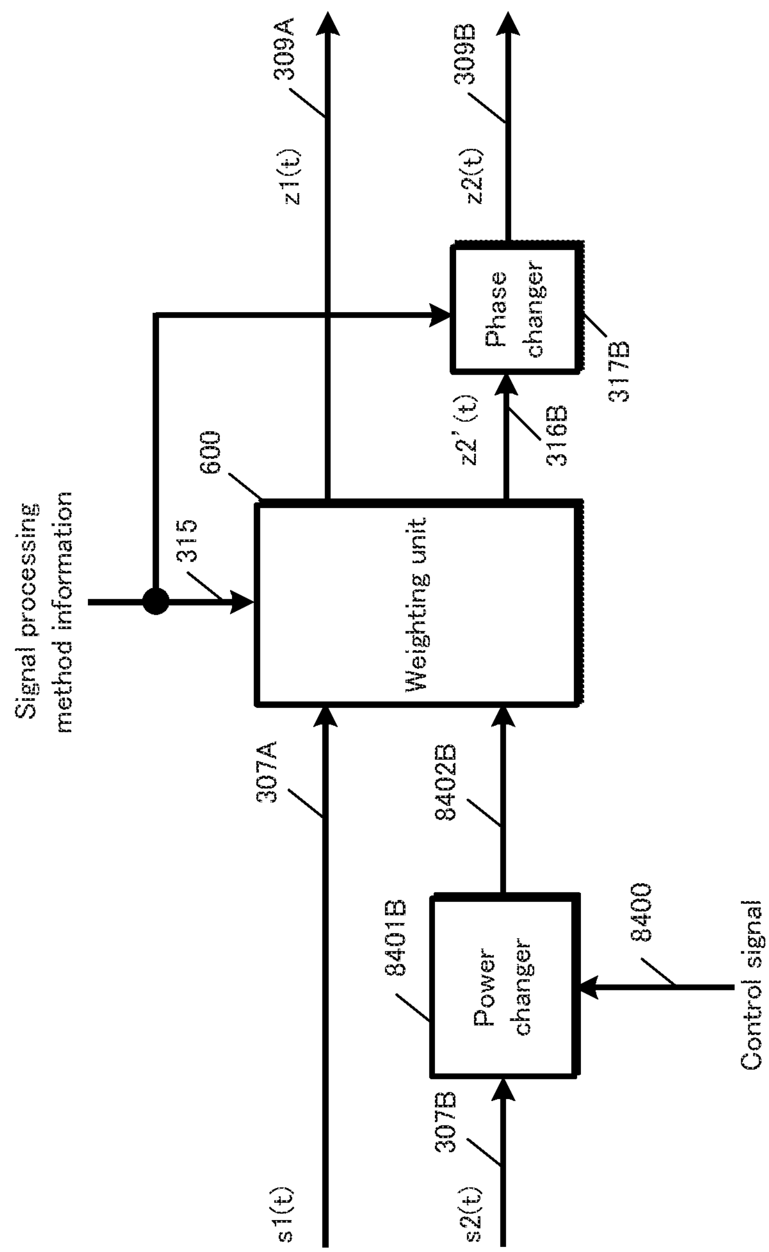
FIG. 84 illustrates an example of a structure of a signal processor pertaining to a weighting unit.
Figure 85:
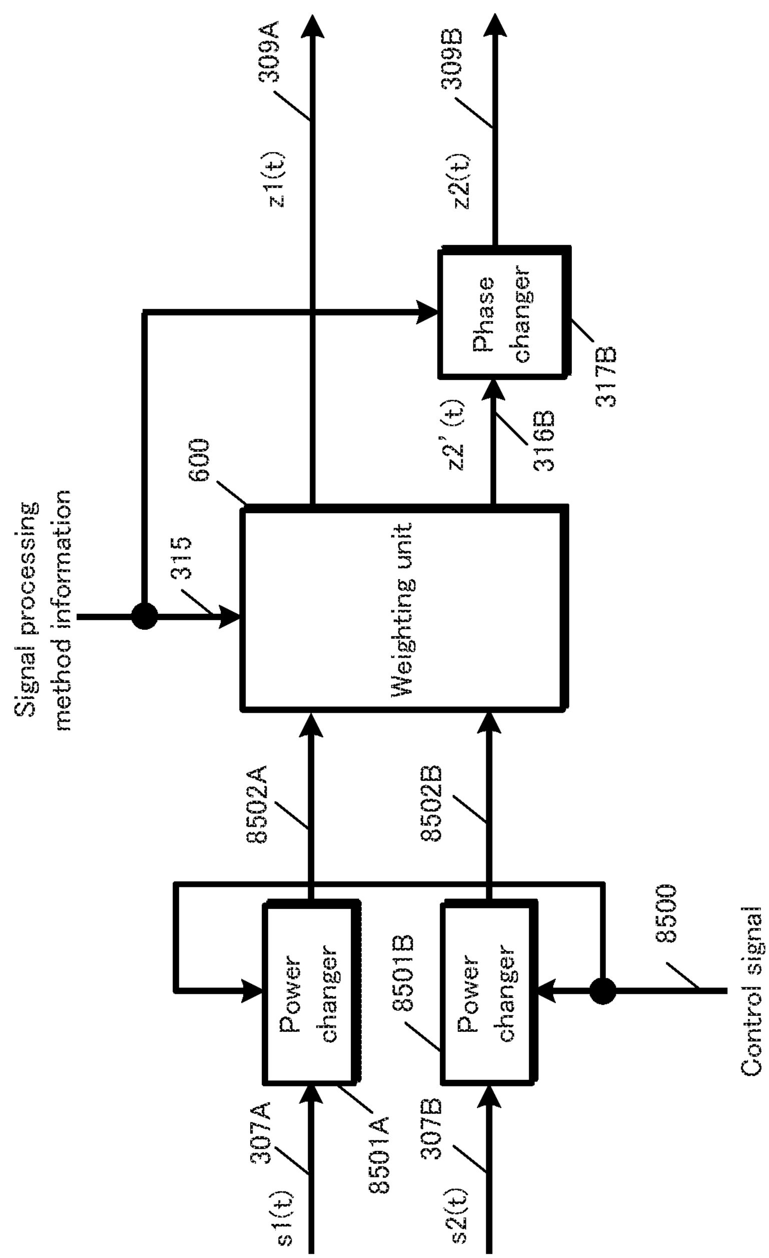
FIG. 85 illustrates an example of a structure of the signal processor pertaining to the weighting unit.

Therefore, it is considered that the average power (average value) of s1 is made to be different from the average power (average value) of s2. FIGS. 84 and 85 each show an example of the structure of the signal processor relating to a power changer (although being referred to as the power changer here, the power changer may be referred to as an amplitude changer or a weight unit) and the weighting (precoding) unit. In FIG. 84, elements that operate in a similar way to FIG. 3 and FIG. 6 bear the same reference signs. Also, in FIG. 85, elements that operate in a similar way to FIG. 3, FIG. 6 and FIG. 84 bear the same reference signs.

The following explains some examples of operations of the power changer.

Example 1

First, an example of the operation is described using FIG. 84. Let s1($t$) be the (mapped) baseband signal for the modulation scheme QPSK. The mapping scheme for s1($t$) is as shown in FIG. 81, and h is as represented by formula 78. Also, let s2($t$) be the (mapped) baseband signal for the modulation scheme 16-QAM. The mapping scheme for s2($t$) is as shown in FIG. 80, and g is as represented by formula 79. Note that t is time. In the present embodiment, description is made taking the time domain as an example.

The power changer (8401B) receives a (mapped) baseband signal 307B for the modulation scheme 16-QAM and a control signal (8400) as input. Letting a value for power change set based on the control signal (8400) be u, the power changer outputs a signal (8402B) obtained by multiplying the (mapped) baseband signal 307B for the modulation scheme 16-QAM by u. Let u be a real number, and u>1.0. Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, the following formula is satisfied.

[Math. 82]

$$\begin{pmatrix} z1(t) \\ z2(t) \end{pmatrix} = \begin{pmatrix} 1 & 0 \\ 0 & y(t) \end{pmatrix} F \begin{pmatrix} e^{j0} & 0 \\ 0 & ue^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} 1 & 0 \\ 0 & u \end{pmatrix} \begin{pmatrix} s1(t) \\ s2(t) \end{pmatrix} \quad \text{(formula 82)}$$

Therefore, a ratio of the average power for QPSK to the average power for 16-QAM is set to 1:u². With this structure, the reception device is in a reception condition in which the absolute value of the log-likelihood ratio shown in FIG. 83 is obtained. Therefore, data reception quality is improved in the reception device.

The following describes a case where u in the ratio of the average power for QPSK to the average power for 16-QAM 1:u² is set as shown in the following formula.

[Math. 83]

$$u = \sqrt{5} \quad \text{(formula 83)}$$

In this case, the minimum Euclidian distance between signal points in the I-Q plane for QPSK and the minimum Euclidian distance between signal points in the I-Q plane for 16-QAM can be the same. Therefore, excellent reception quality can be achieved.

The condition that the minimum Euclidian distances between signal points in the I-Q plane for two different modulation schemes are equalized, however, is a mere example of the scheme of setting the ratio of the average power for QPSK to the average power for 16-QAM. For example, according to other conditions such as a code length and a coding rate of an error correction code used for error correction codes, excellent reception quality may be achieved when the value u for power change is set to a value (higher value or lower value) different from the value at which the minimum Euclidian distances between signal points in the I-Q plane for two different modulation schemes are equalized. In order to increase the minimum distance between candidate signal points obtained at the time of reception, a scheme of setting the value u as shown in the following formula is considered, for example.

[Math. 84]

$$u=\sqrt{2} \quad \text{(formula 84)}$$

The value, however, is set appropriately according to conditions required as a system. This will be described later in detail.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (8400). The following describes setting of the value u for power change based on the control signal (8400) in order to improve data reception quality in the reception device in detail.

Example 1-1

The following describes a scheme of setting the average power (average values) of s1 and s2 according to a block length (the number of bits constituting one coding (encoded) block, and is also referred to as the code length) for the error correction coding used to generate s1 and s2 when the transmission device supports a plurality of block lengths for the error correction codes.

Examples of the error correction codes include block codes such as turbo codes or duo-binary turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two groups. The encoded data having been distributed to the two groups is modulated in the modulation scheme for s1 and in the modulation scheme for s2 to generate the (mapped) baseband signals s1($t$) and s2($t$).

The control signal (8400) is a signal indicating the selected block length for the error correction codes described above. The power changer (8401B) sets the value u for power change according to the control signal (8400).

The present invention is characterized in that the power changer (8401B) sets the value u for power change according to the selected block length indicated by the control signal (8400). Here, a value for power change set according to a block length X is referred to as $u_{LX}$.

For example, when 1000 is selected as the block length, the power changer (8401B) sets a value for power change to $u_{L1000}$. When 1500 is selected as the block length, the power changer (8401B) sets a value for power change to $u_{L1500}$. When 3000 is selected as the block length, the power changer (8401B) sets a value for power change to $U_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$).

Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 1-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as turbo codes or duo-binary turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two groups. The encoded data having been distributed to the two groups is modulated in the modulation scheme for s1 and in the modulation scheme for s2 to generate the (mapped) baseband signals s1($t$) and s2($t$).

The control signal (8400) is a signal indicating the selected coding rate for the error correction codes described above. The power changer (8401B) sets the value u for power change according to the control signal (8400).

The present invention is characterized in that the power changer (8401B) sets the value u for power change according to the selected coding rate indicated by the control signal (8400). Here, a value for power change set according to a coding rate rx is referred to as $u_{rX}$.

For example, when r1 is selected as the coding rate, the power changer (8401B) sets a value for power change to $u_{r1}$. When r2 is selected as the coding rate, the power changer (8401B) sets a value for power change to $u_{r2}$. When r3 is selected as the coding rate, the power changer (8401B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates 1/2, 2/3 and 3/4 are considered when the error correction code is the LDPC code.

Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 1-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Figure 86:
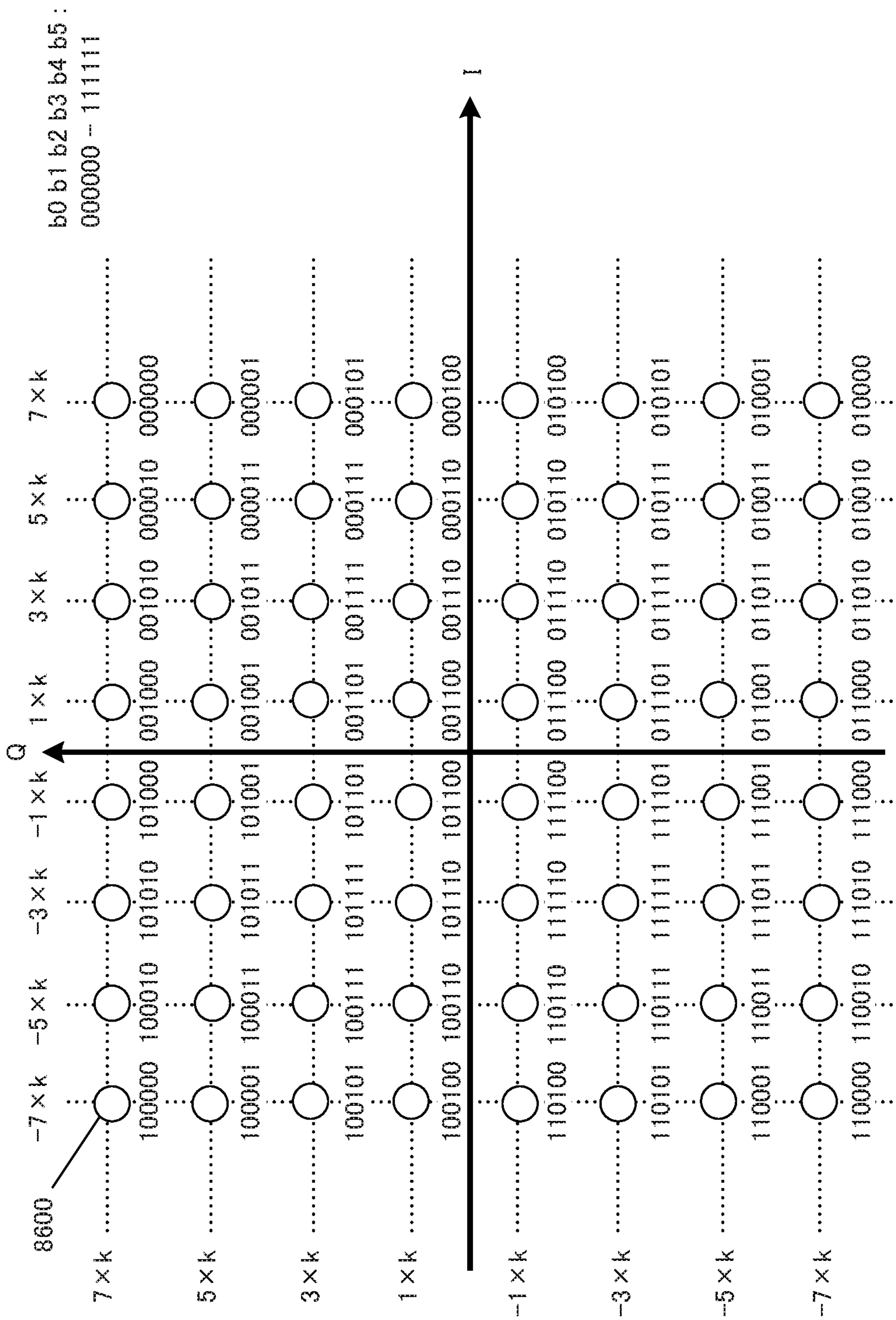
FIG. 86 illustrates an example of a signal point arrangement for 64-QAM in the I-Q plane.

Here, as an example, a case where the modulation scheme for s1 is fixed to QPSK and the modulation scheme for s2 is changed from 16-QAM to 64-QAM by the control signal (or can be set to either 16-QAM or 64-QAM) is considered. Note that, in a case where the modulation scheme for s2($t$) is 64-QAM, the mapping scheme for s2($t$) is as shown in FIG. 86. In FIG. 86, k is represented by the following formula.

[Math. 85]

$$k = \frac{Z}{\sqrt{42}} \quad \text{(formula 85)}$$

By performing mapping in this way, the average power obtained when h in FIG. 81 for QPSK is represented by formula 78 becomes equal to the average power obtained when g in FIG. 80 for 16-QAM is represented by formula 79. In the mapping in 64-QAM, the values I and Q are determined from an input of six bits. In this regard, the mapping 64-QAM may be performed similarly to the mapping in QPSK and 16-QAM.

That is to say, in FIG. 86 as an example of signal point arrangement in the I-Q plane for 64-QAM, (b0, b1, b2, b3, b4, b5)=(0, 0, 0, 0, 0, 0) is mapped onto (I,Q)=(7×k,7×k), (b0, b1, b2, b3, b4, b5)=(0, 0, 0, 0, 0, 1) is mapped onto (I,Q)=(7×k,5×k), (b0, b1, b2, b3, b4, b5)=(0, 0, 0, 0, 1, 0) is mapped onto (I,Q)=(5×k,7×k), (b0, b1, b2, b3, b4, b5)=(0, 0, 0, 0, 1, 1) is mapped onto (I,Q)=(5×k,5×k), (b0, b1, b2, b3, b4, b5)=(0, 0, 0, 1, 0, 0) is mapped onto (I,Q)=(7×k,1×k), (b0, b1, b2, b3, b4, b5)=(1, 1, 1, 1, 1, 0) is mapped onto (I,Q)=(−3×k,−1×k), and (b0, b1, b2, b3, b4, b5)=(1, 1, 1, 1, 1, 1) is mapped onto (I,Q)=(−3×k,−3×k). Note that b0 through b5 shown on the top right of FIG. 86 shows the bits and the arrangement of the numbers shown on the I-Q plane.

In FIG. 84, the power changer 8401B sets such that $u=u_{16}$ when the modulation scheme for s2 is 16-QAM, and sets such that $u=u_{64}$ when the modulation scheme for s2 is 64-QAM. In this case, due to the relationship between minimum Euclidian distances, by setting such that $u_{16}<u_{64}$, excellent data reception quality is obtained in the reception device when the modulation scheme for s2 is either 16-QAM or 64-QAM.

Note that, in the above description, the "modulation scheme for s1 is fixed to QPSK". It is also considered that the modulation scheme for s2 is fixed to QPSK. In this case, power change is assumed to be not performed for the fixed modulation scheme (here, QPSK), and to be performed for a plurality of modulation schemes that can be set (here, 16-QAM and 64-QAM). That is to say, in this case, the transmission device does not have the structure shown in FIG. 84, but has a structure in which the power changer 8401B is eliminated from the structure in FIG. 84 and a power changer is provided to a s1($t$)-side. When the fixed modulation scheme (here, QPSK) is set to s2, the following formula 86 is satisfied.

[Math. 86]

$$\begin{pmatrix} z1(t) \\ z2(t) \end{pmatrix} = \begin{pmatrix} 1 & 0 \\ 0 & y(t) \end{pmatrix} F \begin{pmatrix} ue^{j0} & 0 \\ 0 & e^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} u & 0 \\ 0 & 1 \end{pmatrix} \begin{pmatrix} s1(t) \\ s2(t) \end{pmatrix} \quad \text{(formula 86)}$$

When the modulation scheme for s2 is fixed to QPSK and the modulation scheme for s1 is changed from 16-QAM to 64-QAM (is set to either 16-QAM or 64-QAM), the relationship $u_{16}<u_{64}$ should be satisfied (note that a multiplied value for power change in 16-QAM is $u_{16}$, a multiplied value for power change in 64-QAM is $u_{64}$, and power change is not performed in QPSK).

Also, when a set of the modulation scheme for s1 and the modulation scheme for s2 can be set to any one of a set of QPSK and 16-QAM, a set of 16-QAM and QPSK, a set of QPSK and 64-QAM and a set of 64-QAM and QPSK, the relationship $u_{16}<u_{64}$ should be satisfied.

The following describes a case where the above-mentioned description is generalized.

Let the modulation scheme for s1 be fixed to a modulation scheme C in which the number of signal points in the I-Q plane is c. Also, let the modulation scheme for s2 be set to either a modulation scheme A in which the number of signal points in the I-Q plane is a or a modulation scheme B in which the number of signal points in the I-Q plane is b (a>b>c) (however, let the average power (average value) for s2 in the modulation scheme A be equal to the average power (average value) for s2 in the modulation scheme B).

In this case, a value for power change set when the modulation scheme A is set to the modulation scheme for s2 is $u_a$. Also, a value for power change set when the modulation scheme B is set to the modulation scheme for s2 is $u_b$. In this case, when the relationship $u_b<u_a$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_b<u_a$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_b<u_a$ should be satisfied.

Example 2

The following describes an example of the operation different from that described in Example 1, using FIG. 84. Let s1($t$) be the (mapped) baseband signal for the modulation scheme 64-QAM. The mapping scheme for s1($t$) is as shown in FIG. 86, and k is as represented by formula 85. Also, let s2($t$) be the (mapped) baseband signal for the modulation scheme 16-QAM. The mapping scheme for s2($t$) is as shown in FIG. 80, and g is as represented by formula 79. Note that t is time. In the present embodiment, description is made taking the time domain as an example.

The power changer (8401B) receives a (mapped) baseband signal 307B for the modulation scheme 16-QAM and a control signal (8400) as input. Letting a value for power change set based on the control signal (8400) be u, the power changer outputs a signal (8402B) obtained by multiplying the (mapped) baseband signal 307B for the modulation scheme 16-QAM by u. Let u be a real number, and u<1.0. Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, formula 82 is satisfied.

Therefore, a ratio of the average power for 64-QAM to the average power for 16-QAM is set to $1:u^2$. With this structure, the reception device is in a reception condition as shown in FIG. 83. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (8400). The following describes setting of the value u for power change based on the control signal (8400) in order to improve data reception quality in the reception device in detail.

Example 2-1

The following describes a scheme of setting the average power (average values) of s1 and s2 according to a block length (the number of bits constituting one coding (encoded) block, and is also referred to as the code length) for the error correction codes used to generate s1 and s2 when the transmission device supports a plurality of block lengths for the error correction codes.

Examples of the error correction codes include block codes such as turbo codes or duo-binary turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two groups. The encoded data having been distributed to the two groups is modulated in the modulation scheme for s1 and in the modulation scheme for s2 to generate the (mapped) baseband signals s1($t$) and s2($t$).

The control signal (8400) is a signal indicating the selected block length for the error correction codes described above. The power changer (8401B) sets the value u for power change according to the control signal (8400).

The present invention is characterized in that the power changer (8401B) sets the value u for power change according to the selected block length indicated by the control signal (8400). Here, a value for power change set according to a block length X is referred to as $u_{LX}$.

For example, when 1000 is selected as the block length, the power changer (8401B) sets a value for power change to $u_{L1000}$. When 1500 is selected as the block length, the power changer (8401B) sets a value for power change to $u_{L1500}$. When 3000 is selected as the block length, the power changer (8401B) sets a value for power change to $U_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$).

Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 2-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as turbo codes or duo-binary turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two groups. The encoded data having been distributed to the two groups is modulated in the modulation scheme for s1 and in the modulation scheme for s2 to generate the (mapped) baseband signals s1($t$) and s2($t$).

The control signal (8400) is a signal indicating the selected coding rate for the error correction codes described above. The power changer (8401B) sets the value u for power change according to the control signal (8400).

The present invention is characterized in that the power changer (8401B) sets the value u for power change according to the selected coding rate indicated by the control signal (8400). Here, a value for power change set according to a coding rate rx is referred to as $u_{rx}$.

For example, when r1 is selected as the coding rate, the power changer (8401B) sets a value for power change to $u_{r1}$. When r2 is selected as the coding rate, the power changer (8401B) sets a value for power change to $u_{r2}$. When r3 is selected as the coding rate, the power changer (8401B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates 1/2, 2/3 and 3/4 are considered when the error correction code is the LDPC code.

Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 2-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 64-QAM and the modulation scheme for s2 is changed from 16-QAM to QPSK by the control signal (or can be set to either 16-QAM or QPSK) is considered. In a case where the modulation scheme for s1 is 64-QAM, the mapping scheme for s1(*t*) is as shown in FIG. 86, and k is represented by formula 85 in FIG. 86. In a case where the modulation scheme for s2 is 16-QAM, the mapping scheme for s2(*t*) is as shown in FIG. 80, and g is represented by formula 79 in FIG. 80. Also, in a case where the modulation scheme for s2(*t*) is QPSK, the mapping scheme for s2(*t*) is as shown in FIG. 81, and h is represented by formula 78 in FIG. 81.

By performing mapping in this way, the average power in 16-QAM becomes equal to the average power (average value) in QPSK.

In FIG. 84, the power changer 8401B sets such that $u=u_{16}$ when the modulation scheme for s2 is 16-QAM, and sets such that $u=u_4$ when the modulation scheme for s2 is QPSK. In this case, due to the relationship between minimum Euclidian distances, by setting such that $u_4<u_{16}$, excellent data reception quality is obtained in the reception device when the modulation scheme for s2 is either 16-QAM or QPSK.

Note that, in the above description, the modulation scheme for s1 is fixed to 64-QAM. When the modulation scheme for s2 is fixed to 64-QAM and the modulation scheme for s1 is changed from 16-QAM to QPSK (is set to either 16-QAM or QPSK), the relationship $u_4<u_{16}$ should be satisfied (the same considerations should be made as the example 1-3) (note that a multiplied value for power change in 16-QAM is $u_{16}$, a multiplied value for power change in QPSK is $u_4$, and power change is not performed in 64-QAM). Also, when a set of the modulation scheme for s1 and the modulation scheme for s2 can be set to any one of a set of 64-QAM and 16-QAM, a set of 16-QAM and 64-QAM, a set of 64-QAM and QPSK and a set of QPSK and 64-QAM, the relationship $u_4<u_{16}$ should be satisfied.

The following describes a case where the above-mentioned description is generalized.

Let the modulation scheme for s1 be fixed to a modulation scheme C in which the number of signal points in the I-Q plane is c. Also, let the modulation scheme for s2 be set to either a modulation scheme A in which the number of signal points in the I-Q plane is a or a modulation scheme B in which the number of signal points in the I-Q plane is b (c>b>a) (however, let the average power (average value) for s2 in the modulation scheme A be equal to the average power (average value) for s2 in the modulation scheme B).

In this case, a value for power change set when the modulation scheme A is set to the modulation scheme for s2 is $u_a$. Also, a value for power change set when the modulation scheme B is set to the modulation scheme for s2 is $u_b$. In this case, when the relationship $u_a<u_b$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_a<u_b$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_a<u_b$ should be satisfied.

Example 3

The following describes an example of the operation different from that described in Example 1, using FIG. 84. Let s1(*t*) be the (mapped) baseband signal for the modulation scheme 16-QAM. The mapping scheme for s1(*t*) is as shown in FIG. 80, and g is as represented by formula 79. Let s2(*t*) be the (mapped) baseband signal for the modulation scheme 64-QAM. The mapping scheme for s2(*t*) is as shown in FIG. 86, and k is as represented by formula 85. Note that t is time. In the present embodiment, description is made taking the time domain as an example.

The power changer (8401B) receives a (mapped) baseband signal 307B for the modulation scheme 64-QAM and a control signal (8400) as input. Letting a value for power change set based on the control signal (8400) be u, the power changer outputs a signal (8402B) obtained by multiplying the (mapped) baseband signal 307B for the modulation scheme 64-QAM by u. Let u be a real number, and u>1.0. Letting the precoding matrix used in the scheme for regularly performing phase change on the modulated signal after precoding be F and the phase changing value used for regularly performing phase change be y(t) (y(t) may be imaginary number having the absolute value of 1, i.e. $ej^{\theta(t)}$, formula 82 is satisfied.

Therefore, a ratio of the average power for 16-QAM to the average power for 64-QAM is set to $1:u^2$. With this structure, the reception device is in a reception condition as shown in FIG. 83. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (8400). The following describes setting of the value u for power change based on the control signal (8400) in order to improve data reception quality in the reception device in detail.

Example 3-1

The following describes a scheme of setting the average power (average values) of s1 and s2 according to a block length (the number of bits constituting one coding (encoded) block, and is also referred to as the code length) for the error correction codes used to generate s1 and s2 when the transmission device supports a plurality of block lengths for the error correction codes.

Examples of the error correction codes include block codes such as turbo codes or duo-binary turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected block length for the error correction codes described above. The power changer (8401B) sets the value u for power change according to the control signal (8400).

The present invention is characterized in that the power changer (8401B) sets the value u for power change according to the selected block length indicated by the control signal (8400). Here, a value for power change set according to a block length X is referred to as $u_{LX}$.

For example, when 1000 is selected as the block length, the power changer (8401B) sets a value for power change to $u_{L1000}$. When 1500 is selected as the block length, the power changer (8401B) sets a value for power change to $u_{L1500}$. When 3000 is selected as the block length, the power changer (8401B) sets a value for power change to $u_{L3000}$. In this case, for example, by setting $u_{L000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$).

Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 3-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as turbo codes or duo-binary turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected coding rate for the error correction codes described above. The power changer (8401B) sets the value u for power change according to the control signal (8400).

The present invention is characterized in that the power changer (8401B) sets the value u for power change according to the selected coding rate indicated by the control signal (8400). Here, a value for power change set according to a coding rate rx is referred to as $u_{rx}$.

For example, when r1 is selected as the coding rate, the power changer (8401B) sets a value for power change to $u_{r1}$. When r2 is selected as the coding rate, the power changer (8401B) sets a value for power change to $u_{r2}$. When r3 is selected as the coding rate, the power changer (8401B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates 1/2, 2/3 and 3/4 are considered when the error correction code is the LDPC code.

Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 3-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 16-QAM and the modulation scheme for s2 is changed from 64-QAM to QPSK by the control signal (or can be set to either 64-QAM or QPSK) is considered. In a case where the modulation scheme for s1 is 16-QAM, the mapping scheme for s2(*t*) is as shown in FIG. 80, and g is represented by formula 79 in FIG. 80. In a case where the modulation scheme for s2 is 64-QAM, the mapping scheme for s1(*t*) is as shown in FIG. 86, and k is represented by formula 85 in FIG. 86. Also, in a case where the modulation scheme for s2(*t*) is QPSK, the mapping scheme for s2(*t*) is as shown in FIG. 81, and his represented by formula 78 in FIG. 81.

By performing mapping in this way, the average power in 16-QAM becomes equal to the average power in QPSK.

In FIG. 84, the power changer 8401B sets such that $u=u_{64}$ when the modulation scheme for s2 is 64-QAM, and sets such that $u=u_4$ when the modulation scheme for s2 is QPSK. In this case, due to the relationship between minimum Euclidian distances, by setting such that $u_4<u_{64}$, excellent data reception quality is obtained in the reception device when the modulation scheme for s2 is either 16-QAM or 64-QAM.

Note that, in the above description, the modulation scheme for s1 is fixed to 16-QAM. When the modulation scheme for s2 is fixed to 16-QAM and the modulation scheme for s1 is changed from 64-QAM to QPSK (is set to either 64-QAM or QPSK), the relationship $u_4<u_{64}$ should be satisfied (the same considerations should be made as the example 1-3) (note that a multiplied value for power change in 64-QAM is $u_{64}$, a multiplied value for power change in QPSK is $u_4$, and power change is not performed in 16-QAM). Also, when a set of the modulation scheme for s1 and the modulation scheme for s2 can be set to any one of a set of 16-QAM and 64-QAM, a set of 64-QAM and 16-QAM, a set of 16-QAM and QPSK and a set of QPSK and 16-QAM, the relationship $u_4<u_{64}$ should be satisfied.

The following describes a case where the above-mentioned description is generalized.

Let the modulation scheme for s1 be fixed to a modulation scheme C in which the number of signal points in the I-Q plane is c. Also, let the modulation scheme for s2 be set to either a modulation scheme A in which the number of signal points in the I-Q plane is a or a modulation scheme B in which the number of signal points in the I-Q plane is b (c>b>a) (however, let the average power (average value) for s2 in the modulation scheme A be equal to the average power (average value) for s2 in the modulation scheme B).

In this case, a value for power change set when the modulation scheme A is set to the modulation scheme for s2 is $u_a$. Also, a value for power change set when the modulation scheme B is set to the modulation scheme for s2 is $u_b$. In this case, when the relationship $u_a<u_b$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_a<u_b$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_a<u_b$ should be satisfied.

Example 4

The case where power change is performed for one of the modulation schemes for s1 and s2 has been described above. The following describes a case where power change is performed for both of the modulation schemes for s1 and s2.

An example of the operation is described using FIG. 85. Let s1(*t*) be the (mapped) baseband signal for the modulation scheme QPSK. The mapping scheme for s1(*t*) is as shown in FIG. 81, and h is as represented by formula 78. Also, let s2(*t*) be the (mapped) baseband signal for the modulation scheme 16-QAM. The mapping scheme for s2(*t*) is as shown in FIG. 80, and g is as represented by formula 79. Note that t is time. In the present embodiment, description is made taking the time domain as an example.

The power changer (8401A) receives a (mapped) baseband signal 307A for the modulation scheme QPSK and the control signal (8400) as input. Letting a value for power change set based on the control signal (8400) be v, the power changer outputs a signal (8402A) obtained by multiplying the (mapped) baseband signal 307A for the modulation scheme QPSK by v.

The power changer (8401B) receives a (mapped) baseband signal 307B for the modulation scheme 16-QAM and a control signal (8400) as input. Letting a value for power change set based on the control signal (8400) be u, the power changer outputs a signal (8402B) obtained by multiplying the (mapped) baseband signal 307B for the modulation scheme 16-QAM by u. Then, let u=v×w (w>1.0).

Letting the precoding matrix used in the scheme for regularly performing phase change be F, formula 87 shown next is satisfied.

Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, formula 87 shown next is satisfied.

[Math. 87]

$$\begin{pmatrix} z1(t) \\ z2(t) \end{pmatrix} = \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} v & 0 \\ 0 & u \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} v & 0 \\ 0 & v\times w \end{pmatrix} \begin{pmatrix} s1(t) \\ s2(t) \end{pmatrix} \quad \text{(formula 87)}$$

Therefore, a ratio of the average power for QPSK to the average power for 16-QAM is set to $v^2:u^2=v^2:v^2\times w^2=1:w^2$. With this structure, the reception device is in a reception condition as shown in FIG. 83. Therefore, data reception quality is improved in the reception device.

Note that, in view of formula 83 and formula 84, effective examples of the ratio of the average power for QPSK to the average power for 16-QAM are considered to be $v^2:u^2=v^2:v^2\times w^2=1:w^2=1:5$ or $v^2:u^2=v^2:v^2\times w^2=1:w^2=1:2$. The ratio, however, is set appropriately according to conditions required as a system.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the values v and u for power change are set based on the control signal (8400). The following describes setting of the values v and u for power change based on the control signal (8400) in order to improve data reception quality in the reception device in detail.

Example 4-1

The following describes a scheme of setting the average power (average values) of s1 and s2 according to a block length (the number of bits constituting one coding (encoded) block, and is also referred to as the code length) for the error correction codes used to generate s1 and s2 when the transmission device supports a plurality of block lengths for the error correction codes.

Examples of the error correction codes include block codes such as turbo codes or duo-binary turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected block length for the error correction codes described above. The power changer (8401B) sets the value v for power change according to the control signal (8400). Similarly, the power changer (8401B) sets the value u for power change according to the control signal (8400).

The present invention is characterized in that the power changers (8401A and 8401B) respectively set the values v and u for power change according to the selected block length indicated by the control signal (8400). Here, values for power change set according to the block length X are referred to as $v_{LX}$ and $u_{LX}$.

For example, when 1000 is selected as the block length, the power changer (8401A) sets a value for power change to $v_{L1000}$. When 1500 is selected as the block length, the power changer (8401A) sets a value for power change to $v_{L1500}$. When 3000 is selected as the block length, the power changer (8401A) sets a value for power change to $v_{L3000}$.

On the other hand, when 1000 is selected as the block length, the power changer (8401B) sets a value for power change to $u_{L1000}$. When 1500 is selected as the block length, the power changer (8401B) sets a value for power change to $u_{L1500}$. When 3000 is selected as the block length, the power changer (8401B) sets a value for power change to $u_{L3000}$.

In this case, for example, by setting $v_{L1000}$, $v_{L1500}$ and $v_{L3000}$ so as to be different from one another, a high error correction capability can be achieved for each code length. Similarly, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied, and $v_{L1000}=v_{L1500}$ may be satisfied. What is important is that two or more values exist in a set of $v_{L1000}$, $v_{L1500}$ and $v_{L3000}$, and that two or more values exist in a set of $u_{L1000}$, $u_{L1500}$ and $u_{L3000}$). Note that, as described above, $v_{LX}$ and $u_{LX}$ are set so as to satisfy the ratio of the average power $1:w^2$.

Although the case of three code lengths is taken as an example in the above description, the present invention is not limited to this. One important point is that two or more values $u_{LX}$ for power change exist when there are two or more code lengths that can be set, and the transmission device selects any of the values for power change from among the two or more values $u_{LX}$ for power change when the code length is set, and performs power change. Another important point is that two or more values $v_{LX}$ for power change exist when there are two or more code lengths that can be set, and the transmission device selects any of the values for power change from among the two or more values $v_{LX}$ for power change when the code length is set, and performs power change.

Example 4-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as turbo codes or duo-binary turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected coding rate for the error correction codes described above. The power changer (8401A) sets the value v for power change according to the control signal (8400). Similarly, the power changer (8401B) sets the value u for power change according to the control signal (8400).

The present invention is characterized in that the power changers (8401A and 8401B) respectively set the values v and u for power change according to the selected coding rate indicated by the control signal (8400). Here, values for power change set according to the coding rate rx are referred to as $v_{rx}$ and $u_{rx}$.

For example, when r1 is selected as the coding rate, the power changer (8401A) sets a value for power change to $v_{r1}$. When r2 is selected as the coding rate, the power changer (8401A) sets a value for power change to $v_{r2}$. When r3 is selected as the coding rate, the power changer (8401A) sets a value for power change to $v_{r3}$.

Also, when r1 is selected as the coding rate, the power changer (8401B) sets a value for power change to $u_{r1}$. When r2 is selected as the coding rate, the power changer (8401B) sets a value for power change to $u_{r2}$. When r3 is selected as the coding rate, the power changer (8401B) sets a value for power change to $u_{r3}$.

In this case, for example, by setting $v_{r1}$, $v_{r2}$ and $v_{r3}$ so as to be different from one another, a high error correction capability can be achieved for each code length. Similarly, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $v_{r1}=v_{r2}$ may be satisfied, and $u_{r1}=u_{r2}$ may be satisfied. What is important is that two or more values exist in a set of $v_{r1}$, $v_{r2}$ and $v_{r3}$, and that two or more values exist in a set of $u_{r1}$, $u_{r2}$ and $u_{r3}$). Note that, as described above, $v_{rX}$ and $u_{rX}$ are set so as to satisfy the ratio of the average power $1:w^2$.

Also, note that, as examples of r1, r2 and r3 described above, coding rates 1/2, 2/3 and 3/4 are considered when the error correction code is the LDPC code.

Although the case of three coding rates is taken as an example in the above description, the present invention is not limited to this. One important point is that two or more values $u_{rx}$ for power change exist when there are two or more coding rates that can be set, and the transmission device selects any of the values for power change from among the two or more values $u_{rx}$ for power change when the coding rate is set, and performs power change. Another important point is that two or more values $v_{rX}$ for power change exist when there are two or more coding rates that can be set, and the transmission device selects any of the values for power change from among the two or more values $v_{rX}$ for power change when the coding rate is set, and performs power change.

Example 4-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to QPSK and the modulation scheme for s2 is changed from 16-QAM to 64-QAM by the control signal (or can be set to either 16-QAM or 64-QAM) is considered. In a case where the modulation scheme for s1 is QPSK, the mapping scheme for s1(*t*) is as shown in FIG. 81, and h is represented by formula 78 in FIG. 81. In a case where the modulation scheme for s2 is 16-QAM, the mapping scheme for s2(*t*) is as shown in FIG. 80, and g is represented by formula 79 in FIG. 80. Also, in a case where the modulation scheme for s2(*t*) is 64-QAM, the mapping scheme for s2(*t*) is as shown in FIG. 86, and k is represented by formula 85 in FIG. 86.

In FIG. 85, when the modulation scheme for s1 is QPSK and the modulation scheme for s2 is 16-QAM, assume that $v=\alpha$ and $u=\alpha\times w_{16}$. In this case, the ratio between the average power of QPSK and the average power of 16-QAM is $v^2:u^2=\alpha^2:\alpha^2\times w_{16}^2=1:w_{16}^2$.

In FIG. 85, when the modulation scheme for s1 is QPSK and the modulation scheme for s2 is 64-QAM, assume that $v=\beta$ and $u=\beta\times w_{64}$. In this case, the ratio between the average power of QPSK and the average power of 64-QAM is $v:u=\beta^2:\beta_2\times w_{64}^2=1:w_{64}^2$. In this case, according to the minimum Euclidean distance relationship, the reception device achieves high data reception quality when $1.0<w_{16}<w_{64}$, regardless of whether the modulation scheme for s2 is 16-QAM or 64-QAM.

Note that although "the modulation scheme for s1 is fixed to QPSK" in the description above, it is possible that "the modulation scheme for s2 is fixed to QPSK". In this case, power change is assumed to be not performed for the fixed modulation scheme (here, QPSK), and to be performed for a plurality of modulation schemes that can be set (here, 16-QAM and 64-QAM). When the fixed modulation scheme (here, QPSK) is set to s2, the following formula 88 is satisfied.

[Math. 88]

$$\begin{pmatrix} z1(t) \\ z2(t) \end{pmatrix} = \begin{pmatrix} 1 & 0 \\ 0 & y(t) \end{pmatrix} F \begin{pmatrix} ue^{j0} & 0 \\ 0 & ve^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} u & 0 \\ 0 & v \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} v\times w & 0 \\ 0 & v \end{pmatrix} \begin{pmatrix} s1(t) \\ s2(t) \end{pmatrix} \quad \text{(formula 88)}$$

Given that, even when "the modulation scheme for s2 is fixed to QPSK and the modulation scheme for s1 is changed from 16-QAM to 64-QAM (set to either 16-QAM or 64-QAM)", $1.0<w_{16}<w_{64}$ should be fulfilled. (Note that the value used for the multiplication for the power change in the case of 16-QAM is $u=\alpha\times w_m$, the value used for the multiplication for the power change in the case of 64-QAM is $u=\beta\times w_{64}$, the value used for the power change in the case of QPSK is $v=\alpha$ when the selectable modulation scheme is 16-QAM and $v=\beta$ when the selectable modulation scheme is 64-QAM.) Also, when the set of (the modulation scheme for s1, the modulation scheme for s2) is selectable from the sets of (QPSK, 16-QAM), (16-QAM, QPSK), (QPSK, 64-QAM) and (64-QAM, QPSK), $1.0<w_{16}<w_{64}$ should be fulfilled.

The following describes a case where the above-mentioned description is generalized.

For generalization, assume that the modulation scheme for s1 is fixed to a modulation scheme C with which the number of signal points in the I-Q plane is c. Also assume that the modulation scheme for s2 is selectable from a modulation scheme A with which the number of signal points in the I-Q plane is a and a modulation scheme B with which the number of signal points in the I-Q plane is b (a>b>c). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B, is $1:w_b^2$. If this is the case, the reception device achieves a high data reception quality when $w_b<w_a$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_b<w_a$. (If this is the case, as with the description above, when the average power of the modulation scheme C is 1, the average power of the modulation scheme A is $w_a^2$, and the average power of the modulation scheme B is $w_b^2$.) Also, when the set of (the modulation scheme for s1, the modulation scheme for s2) is selectable from the sets of (the modulation scheme C, the modulation scheme A), (the modulation scheme A, the modulation scheme C), (the modulation scheme C, the modulation scheme B) and (the modulation scheme B, the modulation scheme C), the average powers should fulfill $w_b<w_a$.

Example 5

The following describes an example of the operation different from that described in Example 4, using FIG. 85. Let s1(*t*) be the (mapped) baseband signal for the modulation scheme 64-QAM. The mapping scheme for s1(*t*) is as shown in FIG. 86, and k is as represented by formula 85. Also, let s2(*t*) be the (mapped) baseband signal for the modulation scheme 16-QAM. The mapping scheme for s2(*t*) is as shown in FIG. 80, and g is as represented by formula 79. Note that t is time. In the present embodiment, description is made taking the time domain as an example.

The power changer (8401A) receives a (mapped) baseband signal 307A for the modulation scheme 64-QAM and the control signal (8400) as input. Letting a value for power change set based on the control signal (8400) be v, the power changer outputs a signal (8402A) obtained by multiplying the (mapped) baseband signal 307A for the modulation scheme 64-QAM by v.

The power changer (8401B) receives a (mapped) baseband signal 307B for the modulation scheme 16-QAM and a control signal (8400) as input. Letting a value for power change set based on the control signal (8400) be u, the power changer outputs a signal (8402B) obtained by multiplying the (mapped) baseband signal 307B for the modulation scheme 16-QAM by u. Then, let $u=v\times w$ $(w<1.0)$.

Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, formula 87 shown above is satisfied.

Therefore, a ratio of the average power for 64-QAM to the average power for 16-QAM is set to $v^2:u^2=v^2:v^2\times w^2=1:w^2$. With this structure, the reception device is in a reception condition as shown in FIG. 83. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the values v and u for power change are set based on the control signal (8400). The following describes setting of the values v and u for power change based on the control signal (8400) in order to improve data reception quality in the reception device in detail.

Example 5-1

The following describes a scheme of setting the average power (average values) of s1 and s2 according to a block length (the number of bits constituting one coding (encoded) block, and is also referred to as the code length) for the error correction codes used to generate s1 and s2 when the transmission device supports a plurality of block lengths for the error correction codes.

Examples of the error correction codes include block codes such as turbo codes or duo-binary turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected block length for the error correction codes described above. The power changer (8401B) sets the value v for power change according to the control signal (8400). Similarly, the power changer (8401B) sets the value u for power change according to the control signal (8400).

The present invention is characterized in that the power changers (8401A and 8401B) respectively set the values v and u for power change according to the selected block length indicated by the control signal (8400). Here, values for power change set according to the block length X are referred to as $v_{LX}$ and $u_{LX}$.

For example, when 1000 is selected as the block length, the power changer (8401A) sets a value for power change to $v_{L1000}$. When 1500 is selected as the block length, the power changer (8401A) sets a value for power change to $v_{L1500}$. When 3000 is selected as the block length, the power changer (8401A) sets a value for power change to $u_{L3000}$.

On the other hand, when 1000 is selected as the block length, the power changer (8401B) sets a value for power change to $u_{L1000}$. When 1500 is selected as the block length, the power changer (8401B) sets a value for power change to $u_{L1500}$. When 3000 is selected as the block length, the power changer (8401B) sets a value for power change to $u_{L3000}$.

In this case, for example, by setting $v_{L1000}$, $v_{L1500}$ and $v_{L3000}$ so as to be different from one another, a high error correction capability can be achieved for each code length. Similarly, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied, and $v_{L1000}=v_{L1500}$ may be satisfied. What is important is that two or more values exist in a set of $v_{L1000}$, $v_{L1500}$ and $v_{L3000}$, and that two or more values exist in a set of $u_{L1000}$, $u_{L1500}$ and $u_{L3000}$). Note that, as described above, $v_{LX}$ and $u_{LX}$ are set so as to satisfy the ratio of the average power $1:w^2$.

Although the case of three code lengths is taken as an example in the above description, the present invention is not limited to this. One important point is that two or more values $u_{LX}$ for power change exist when there are two or more code lengths that can be set, and the transmission device selects any of the values for power change from among the two or more values $u_{LX}$ for power change when the code length is set, and performs power change. Another important point is that two or more values $v_{LX}$ for power change exist when there are two or more code lengths that can be set, and the transmission device selects any of the values for power change from among the two or more values $v_{LX}$ for power change when the code length is set, and performs power change.

Example 5-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as turbo codes or duo-binary turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected coding rate for the error correction codes described above. The power changer (8401A) sets the value v for power change according to the control signal (8400). Similarly, the power changer (8401B) sets the value u for power change according to the control signal (8400).

The present invention is characterized in that the power changers (8401A and 8401B) respectively set the values v and u for power change according to the selected coding rate indicated by the control signal (8400). Here, values for power change set according to the coding rate rx are referred to as $v_{rx}$ and $u_{rx}$.

For example, when r1 is selected as the coding rate, the power changer (8401A) sets a value for power change to $v_{r1}$. When r2 is selected as the coding rate, the power changer (8401A) sets a value for power change to $v_{r2}$. When r3 is selected as the coding rate, the power changer (8401A) sets a value for power change to $v_{r3}$.

Also, when r1 is selected as the coding rate, the power changer (8401B) sets a value for power change to $u_{r1}$. When r2 is selected as the coding rate, the power changer (8401B) sets a value for power change to $u_{r2}$. When r3 is selected as the coding rate, the power changer (8401B) sets a value for power change to $u_{r3}$.

In this case, for example, by setting $v_{r1}$, $v_{r2}$ and $v_{r3}$ so as to be different from one another, a high error correction capability can be achieved for each code length. Similarly, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $v_{r1}=v_{r2}$ may be satisfied, and $u_{r1}=u_{r2}$ may be satisfied. What is important is that two or more values exist in a set of $v_{r1}$, $v_{r2}$ and $v_{r3}$, and that two or more values exist in a set of $u_{r1}$, $u_{r2}$ and $u_{r3}$). Note that, as described above, $v_{rx}$ and $u_{rx}$ are set so as to satisfy the ratio of the average power $1:w^2$.

Also, note that, as examples of r1, r2 and r3 described above, coding rates 1/2, 2/3 and 3/4 are considered when the error correction code is the LDPC code.

Although the case of three coding rates is taken as an example in the above description, the present invention is not limited to this. One important point is that two or more values $u_{rx}$ for power change exist when there are two or more coding rates that can be set, and the transmission device selects any of the values for power change from among the two or more values $u_{rx}$ for power change when the coding rate is set, and performs power change. Another important point is that two or more values $v_{rx}$ for power change exist when there are two or more coding rates that can be set, and the transmission device selects any of the values for power change from among the two or more values $v_{rx}$ for power change when the coding rate is set, and performs power change.

Example 5-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 64-QAM and the modulation scheme for s2 is changed from 16-QAM to QPSK by the control signal (or can be set to either 16-QAM or QPSK) is considered. In a case where the modulation scheme for s1 is 64-QAM, the mapping scheme for s1(*t*) is as shown in FIG. 86, and k is represented by formula 85 in FIG. 86. In a case where the modulation scheme for s2 is 16-QAM, the mapping scheme for s2(*t*) is as shown in FIG. 80, and g is represented by formula 79 in FIG. 80. Also, in a case where the modulation scheme for s2(*t*) is QPSK, the mapping scheme for s2(*t*) is as shown in FIG. 81, and his represented by formula 78 in FIG. 81.

In FIG. 85, when the modulation scheme for s1 is 64-QAM and the modulation scheme for s2 is 16-QAM, assume that $v=\alpha$ and $u=\alpha\times w_m$. In this case, the ratio between the average power of 64-QAM and the average power of 16-QAM is $v^2:u^2=\alpha^2:\alpha^2\times w_{16}^2=1:w_{16}^2$.

In FIG. 85, when the modulation scheme for s1 is 64-QAM and the modulation scheme for s2 is QPSK, assume that $v=\beta$ and $u=\beta\times w_4$. In this case, the ratio between the average power of 64-QAM and the average power of QPSK is $v^2:u^2=\beta^2:\beta^2\times w_4^2=1:w_4^2$. In this case, according to the minimum Euclidean distance relationship, the reception device achieves a high data reception quality when $w_4<w_{16<1.0}$, regardless of whether the modulation scheme for s2 is 16-QAM or QPSK.

Note that although "the modulation scheme for s1 is fixed to 64-QAM" in the description above, it is possible that "the modulation scheme for s2 is fixed to 64-QAM and the modulation scheme for s1 is changed from 16-QAM to QPSK (set to either 16-QAM or QPSK)", $w_4<w_{16<1.0}$ should be fulfilled. (The same as described in Example 4-3.). (Note that the value used for the multiplication for the power change in the case of 16-QAM is $u=\alpha\times w_{16}$, the value used for the multiplication for the power change in the case of QPSK is $u=w_4$, the value used for the power change in the case of 64-QAM is $v=\alpha$ when the selectable modulation scheme is 16-QAM and $v=\beta$ when the selectable modulation scheme is QPSK.). Also, when the set of (the modulation scheme for s1, the modulation scheme for s2) is selectable from the sets of (64-QAM, 16-QAM), (16-QAM, 64-QAM), (64-QAM, QPSK) and (QPSK, 64-QAM), $w_4<w_{16}<1.0$ should be fulfilled.

The following describes a case where the above-mentioned description is generalized.

For generalization, assume that the modulation scheme for s1 is fixed to a modulation scheme C with which the number of signal points in the I-Q plane is c. Also assume that the modulation scheme for s2 is selectable from a modulation scheme A with which the number of signal points in the I-Q plane is a and a modulation scheme B with which the number of signal points in the I-Q plane is b (c>b>a). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B, is $1:w_b^2$. If this is the case, the reception device achieves a high data reception quality when $w_a<w_b$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_a<w_b$. (If this is the case, as with the description above, when the average power of the modulation scheme is C, the average power of the modulation scheme A is $w_a^a$, and the average power of the modulation scheme B is $w_b^2$.) Also, when the set of (the modulation scheme for s1, the modulation scheme for s2) is selectable from the sets of (the modulation scheme C, the modulation scheme A), (the modulation scheme A, the modulation scheme C), (the modulation scheme C, the modulation scheme B) and (the modulation scheme B, the modulation scheme C), the average powers should fulfill $w_a<w_b$.

Example 6

The following describes an example of the operation different from that described in Example 4, using FIG. 85. Let s1(*t*) be the (mapped) baseband signal for the modulation scheme 16-QAM. The mapping scheme for s1(*t*) is as shown in FIG. 86, and g is as represented by formula 79. Let s2(*t*) be the (mapped) baseband signal for the modulation scheme 64-QAM. The mapping scheme for s2(*t*) is as shown in FIG. 86, and k is as represented by formula 85. Note that t is time. In the present embodiment, description is made taking the time domain as an example.

The power changer (8401A) receives a (mapped) baseband signal 307A for the modulation scheme 16-QAM and the control signal (8400) as input. Letting a value for power change set based on the control signal (8400) be v, the power changer outputs a signal (8402A) obtained by multiplying the (mapped) baseband signal 307A for the modulation scheme 16-QAM by v.

The power changer (8401B) receives a (mapped) baseband signal 307B for the modulation scheme 64-QAM and a control signal (8400) as input. Letting a value for power change set based on the control signal (8400) be u, the power changer outputs a signal (8402B) obtained by multiplying the (mapped) baseband signal 307B for the modulation scheme 64-QAM by u. Then, let $u=v\times w$ ($w<1.0$).

Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, formula 87 shown above is satisfied.

Therefore, a ratio of the average power for 64-QAM to the average power for 16-QAM is set to $v^2:u^2=v^2:v^2\times w^2=1:w^2$. With this structure, the reception device is in a reception condition as shown in FIG. 83. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the values v and u for power change are set based on the control signal (8400). The following describes setting of the values v and u for power change based on the control signal (8400) in order to improve data reception quality in the reception device in detail.

Example 6-1

The following describes a scheme of setting the average power (average values) of s1 and s2 according to a block length (the number of bits constituting one coding (encoded) block, and is also referred to as the code length) for the error correction codes used to generate s1 and s2 when the transmission device supports a plurality of block lengths for the error correction codes.

Examples of the error correction codes include block codes such as turbo codes or duo-binary turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected block length for the error correction codes described above. The power changer (8401B) sets the value v for power change according to the control signal (8400). Similarly, the power changer (8401B) sets the value u for power change according to the control signal (8400).

The present invention is characterized in that the power changers (8401A and 8401B) respectively set the values v and u for power change according to the selected block length indicated by the control signal (8400). Here, values for power change set according to the block length X are referred to as $v_{LX}$ and $u_{LX}$.

For example, when 1000 is selected as the block length, the power changer (8401A) sets a value for power change to $v_{L1000}$. When 1500 is selected as the block length, the power changer (8401A) sets a value for power change to $v_{L1500}$. When 3000 is selected as the block length, the power changer (8401A) sets a value for power change to $v_{L3000}$.

On the other hand, when 1000 is selected as the block length, the power changer (8401B) sets a value for power change to $u_{L1000}$. When 1500 is selected as the block length, the power changer (8401B) sets a value for power change to $u_{L1500}$. When 3000 is selected as the block length, the power changer (8401B) sets a value for power change to $u_{L3000}$.

In this case, for example, by setting $v_{L1000}$, $v_{L1500}$ and $v_{L3000}$ so as to be different from one another, a high error correction capability can be achieved for each code length. Similarly, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied, and $v_{L1000}=v_{L1500}$ may be satisfied. What is important is that two or more values exist in a set of $v_{L1000}$, $v_{L1500}$ and $v_{L3000}$, and that two or more values exist in a set of $u_{L1000}$, $u_{L1500}$ and $u_{L3000}$). Note that, as described above, $v_{LX}$ and $u_{LX}$ are set so as to satisfy the ratio of the average power $1:w^2$.

Although the case of three code lengths is taken as an example in the above description, the present invention is not limited to this. One important point is that two or more values $u_{LX}$ for power change exist when there are two or more code lengths that can be set, and the transmission device selects any of the values for power change from among the two or more values $u_{LX}$ for power change when the code length is set, and performs power change. Another important point is that two or more values $v_{LX}$ for power change exist when there are two or more code lengths that can be set, and the transmission device selects any of the values for power change from among the two or more values $v_{LX}$ for power change when the code length is set, and performs power change.

Example 6-2

The following describes a scheme of setting the average power of s1 and s2 according to a coding rate for the error correction codes used to generate s1 and s2 when the transmission device supports a plurality of coding rates for the error correction codes.

Examples of the error correction codes include block codes such as turbo codes or duo-binary turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two groups. The encoded data having been distributed to the two groups is modulated in the modulation scheme for s1 and in the modulation scheme for s2 to generate the (mapped) baseband signals s1(*t*) and s2(*t*).

The control signal (8400) is a signal indicating the selected coding rate for the error correction codes described above. The power changer (8401A) sets the value v for power change according to the control signal (8400). Similarly, the power changer (8401B) sets the value u for power change according to the control signal (8400).

The present invention is characterized in that the power changers (8401A and 8401B) respectively set the values v and u for power change according to the selected coding rate indicated by the control signal (8400). Here, values for power change set according to the coding rate rx are referred to as $v_{rx}$ and $u_{rx}$.

For example, when r1 is selected as the coding rate, the power changer (8401A) sets a value for power change to $v_{r1}$. When r2 is selected as the coding rate, the power changer (8401A) sets a value for power change to $v_{r2}$. When r3 is selected as the coding rate, the power changer (8401A) sets a value for power change to $v_{r3}$.

Also, when r1 is selected as the coding rate, the power changer (8401B) sets a value for power change to $u_{r1}$. When r2 is selected as the coding rate, the power changer (8401B) sets a value for power change to $u_{r2}$. When r3 is selected as the coding rate, the power changer (8401B) sets a value for power change to $u_{r3}$.

In this case, for example, by setting $v_{r1}$, $v_{r2}$ and $v_{r3}$ so as to be different from one another, a high error correction capability can be achieved for each code length. Similarly, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $v_{r1}=v_{r2}$ may be satisfied, and $u_{r1}=u_{r2}$ may be satisfied. What is important is that two or more values exist in a set of $v_{r1}$, $v_{r2}$ and $v_{r3}$, and that two or more values exist in a set of $u_{r1}$, $u_{r2}$ and $u_{r3}$). Note that, as described above, $v_{rx}$ and $u_{rx}$ are set so as to satisfy the ratio of the average power $1:w^2$.

Also, note that, as examples of r1, r2 and r3 described above, coding rates 1/2, 2/3 and 3/4 are considered when the error correction code is the LDPC code.

Although the case of three coding rates is taken as an example in the above description, the present invention is not limited to this. One important point is that two or more values $u_{rx}$ for power change exist when there are two or more coding rates that can be set, and the transmission device selects any of the values for power change from among the two or more values $u_{rx}$ for power change when the coding rate is set, and performs power change. Another important point is that two or more values $v_{rX}$ for power change exist when there are two or more coding rates that can be set, and the transmission device selects any of the values for power change from among the two or more values $v_{rX}$ for power change when the coding rate is set, and performs power change.

Example 6-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 16-QAM and the modulation scheme for s2 is changed from 64-QAM to QPSK by the control signal (or can be set to either 16-QAM or QPSK) is considered. In a case where the modulation scheme for s1 is 16-QAM, the mapping scheme for s1(*t*) is as shown in FIG. 80, and g is represented by formula 79 in FIG. 80. In a case where the modulation scheme for s2 is 64-QAM, the mapping scheme for s2(*t*) is as shown in FIG. 86, and k is represented by formula 85 in FIG. 86. Also, in a case where the modulation scheme for s2(*t*) is QPSK, the mapping scheme for s2(*t*) is as shown in FIG. 81, and his represented by formula 78 in FIG. 81.

In FIG. 85, when the modulation scheme for s1 is 16-QAM and the modulation scheme for s2 is 64-QAM, assume that $v=\alpha$ and $u=\alpha\times w_{64}$. In this case, the ratio between the average power of 64-QAM and the average power of 16-QAM is $v^2:u^2=\alpha^2:\alpha^2\times w_{64}{}^2=1:w_{64}{}^2$.

In FIG. 85, when the modulation scheme for s1 is 16-QAM and the modulation scheme for s2 is QPSK, assume that $v=\beta$ and $u=\beta\times w_4$. In this case, the ratio between the average power of 64-QAM and the average power of QPSK is $v^2:u^2=\beta^2:\beta^2\times w_4{}^2=1:w_4{}^2$. In this case, according to the minimum Euclidean distance relationship, the reception device achieves a high data reception quality when $w_4<w_{64}$, regardless of whether the modulation scheme for s2 is 64-QAM or QPSK.

Note that although "the modulation scheme for s1 is fixed to 16-QAM" in the description above, it is possible that "the modulation scheme for s2 is fixed to 16-QAM and the modulation scheme for s1 is changed from 64-QAM to QPSK (set to either 16-QAM or QPSK)", $w_4<w_{64}$ should be fulfilled. (The same as described in Example 4-3.). (Note that the value used for the multiplication for the power change in the case of 16-QAM is $u=\alpha\times w_{16}$, the value used for the multiplication for the power change in the case of QPSK is $u=\beta\times w_4$, the value used for the power change in the case of 64-QAM is $v=\alpha$ when the selectable modulation scheme is 16-QAM and $v=\beta$ when the selectable modulation scheme is QPSK.). Also, when the set of (the modulation scheme for s1, the modulation scheme for s2) is selectable from the sets of (16-QAM, 64-QAM), (64-QAM, 16-QAM), (16-QAM, QPSK) and (QPSK, 16-QAM), $w_4<w_{64}$ should be fulfilled.

The following describes a case where the above-mentioned description is generalized.

For generalization, assume that the modulation scheme for s1 is fixed to a modulation scheme C with which the number of signal points in the I-Q plane is c. Also assume that the modulation scheme for s2 is selectable from a modulation scheme A with which the number of signal points in the I-Q plane is a and a modulation scheme B with which the number of signal points in the I-Q plane is b (c>b>a). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B, is $1:w_b^2$. If this is the case, the reception device achieves a high data reception quality when $w_a<w_b$ is fulfilled.

Note that although “the modulation scheme for s1 is fixed to C” in the description above, even when “the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_a<w_b$. (If this is the case, as with the description above, when the average power of the modulation scheme is C, the average power of the modulation scheme A is $w_a^2$, and the average power of the modulation scheme B is $w_b^2$.) Also, when the set of (the modulation scheme for s1 and the modulation scheme for s2) is selectable from the sets of (the modulation scheme C and the modulation scheme A), (the modulation scheme A and the modulation scheme C), (the modulation scheme C and the modulation scheme B) and (the modulation scheme B and the modulation scheme C), the average powers should fulfill $w_a<w_b$.

In the present description including “Embodiment 1”, and so on, the power consumption by the transmission device can be reduced by setting α=1 in the formula 36 representing the precoding matrices used for the scheme for regularly changing the phase. This is because the average power of z1 and the average power of z2 are the same even when “the average power (average value) of s1 and the average power (average value) of s2 are set to be different when the modulation scheme for s1 and the modulation scheme for s2 are different”, and setting α=1 does not result in increasing the PAPR (Peak-to-Average Power Ratio) of the transmission power amplifier provided in the transmission device.

However, even when α≠1, there are some precoding matrices that can be used with the scheme that regularly changes the phase and have limited influence to PAPR. For example, when the precoding matrices represented by formula 36 in Embodiment 1 are used to achieve the scheme for regularly changing the phase, the precoding matrices have limited influence to PAPR even when α≠1.

(Operations of the Reception Device)

Subsequently, explanation is provided of the operations of the reception device. Explanation of the reception device has already been provided in Embodiment 1 and so on, and the structure of the reception device is illustrated in FIGS. 7, 8 and 9, for instance According to the relation illustrated in FIG. 5, when the transmission device transmits modulated signals as introduced in FIGS. 84 and 85, one relation among the two relations denoted by the two formulas below is satisfied. Note that in the two formulas below, r1(*t*) and r2(*t*) indicate reception signals, and h11(t), h12(t), h21(t), and h22(t) indicate channel fluctuation values.

In the case of Example 1, Example 2 and Example 3, the following relationship shown in formula 89 is derived from FIG. 5.

[Math. 89]

$$\begin{aligned}\begin{pmatrix} r1(t) \\ r2(t) \end{pmatrix} &= \begin{pmatrix} h11(t) & h12(t) \\ h21(t) & h22(t) \end{pmatrix}\begin{pmatrix} z1(t) \\ z2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} e^{j0} & 0 \\ 0 & ue^{j0} \end{pmatrix}\begin{pmatrix} s1(t) \\ s2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} 1 & 0 \\ 0 & u \end{pmatrix}\begin{pmatrix} s1(t) \\ s2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} s1(t) \\ us2(t) \end{pmatrix}\end{aligned} \quad \text{(formula 89)}$$

Also, as explained in Example 1, Example 2, and Example 3, the relationship may be as shown in formula 90 below:

[Math. 90]

$$\begin{aligned}\begin{pmatrix} r1(t) \\ r2(t) \end{pmatrix} &= \begin{pmatrix} h11(t) & h12(t) \\ h21(t) & h22(t) \end{pmatrix}\begin{pmatrix} z1(t) \\ z2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} ue^{j0} & 0 \\ 0 & e^{j0} \end{pmatrix}\begin{pmatrix} s1(t) \\ s2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} u & 0 \\ 0 & 1 \end{pmatrix}\begin{pmatrix} s1(t) \\ s2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} us1(t) \\ s2(t) \end{pmatrix}\end{aligned} \quad \text{(formula 90)}$$

The reception device performs demodulation (detection) (i.e. estimates the bits transmitted by the transmission device) by using the relationships described above (in the same manner as described in Embodiment 1 and so on).

In the case of Example 4, Example 5 and Example 6, the following relationship shown in formula 91 is derived from FIG. 5.

[Math. 91]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} v & 0 \\ 0 & v \times w \end{pmatrix} \begin{pmatrix} s1(t) \\ s2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} vs1(t) \\ us2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} vs1(t) \\ v \times w \times s2(t) \end{pmatrix} \quad \text{(formula 91)}$$

Also, as explained in Example 3, Example 4, and Example 5, the relationship may be as shown in formula 92 below:

[Math. 92]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} ue^{j0} & 0 \\ 0 & ve^{j0} \end{pmatrix} \begin{pmatrix} s1(t) \\ s2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} v \times w & 0 \\ 0 & v \end{pmatrix} \begin{pmatrix} s1(t) \\ s2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} us1(t) \\ vs2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} v \times ws1(t) \\ vs2(t) \end{pmatrix} \quad \text{(formula 92)}$$

The reception device performs demodulation (detection) (i.e. estimates the bits transmitted by the transmission device) by using the relationships described above (in the same manner as described in Embodiment 1 and so on).

Note that although Examples 1 through 6 show the case where the power changer is added to the transmission device, the power change may be performed at the stage of mapping.

As described in Example 1, Example 2, and Example 3, and as particularly shown in formula 89, the mapper 306B in FIG. 3 and FIG. 4 may output u×s2(*t*), and the power changer may be omitted in such cases. If this is the case, it can be said that the scheme for regularly changing the phase is applied to the signal s1(*t*) after the mapping and the signal u×s2(*t*) after the mapping, the modulated signal after precoding.

As described in Example 1, Example 2, and Example 3, and as particularly shown in formula 90, the mapper 306A in FIG. 3 and FIG. 4 may output u×s1(*t*), and the power changer may be omitted in such cases. If this is the case, it can be said that the scheme for regularly changing the phase is applied to the signal s2(*t*) after the mapping and the signal u×s1(*t*) after the mapping, the modulated signal after precoding.

In Example 4, Example 5, and Example 6, as particularly shown in formula 91, the mapper 306A in FIG. 3 and FIG. 4 may output v×s1(*t*), and the mapper 306B may output u×s2(*t*), and the power changer may be omitted in such cases. If this is the case, it can be said that the scheme for regularly changing the phase is applied to the signal v×s1(*t*) after the mapping and the signal u×s2(*t*) after the mapping, the modulated signals after precoding.

In Example 4, Example 5, and Example 6, as particularly shown in formula 92, the mapper 306A in FIG. 3 and FIG. 4 may output u×s1(*t*), and the mapper 306B may output v×s2(*t*), and the power changer may be omitted in such cases. If this is the case, it can be said that the scheme for regularly changing the phase is applied to the signal u×s1(*t*) after the mapping and the signal v×s2(*t*) after the mapping, the modulated signals after precoding.

Note that F shown in formulas 89 through 92 denotes precoding matrices used at time t, and y(t) denotes phase changing values. The reception device performs demodulation (detection) by using the relationships between r1(*t*), r2(*t*) and s1(*t*), s2(*t*) described above (in the same manner as described in Embodiment 1 and so on). However, distortion components, such as noise components, frequency offset, channel estimation error, and the likes are not considered in the formulas described above. Hence, demodulation (detection) is performed with them. Regarding the values u and v that the transmission device uses for performing the power change, the transmission device transmits information about these values, or transmits information of the transmission mode (such as the transmission scheme, the modulation scheme and the error correction scheme) to be used. The reception device detects the values used by the transmission device by acquiring the information, obtains the relationships described above, and performs the demodulation (detection).

In the present embodiment, the switching between the phase changing values is performed on the modulated signal after precoding in the time domain. However, when a multi-carrier transmission scheme such as an OFDM scheme is used, the present invention is applicable to the case where the switching between the phase changing values is performed on the modulated signal after precoding in the frequency domain, as described in other embodiments. If this is the case, t used in the present embodiment is to be replaced with f (frequency ((sub) carrier)).

Accordingly, in the case of performing the switching between the phase changing values on the modulated signal after precoding in the time domain, z1(*t*) and z2(*t*) at the same time point is transmitted from different antennas by using the same frequency. On the other hand, in the case of performing the switching between the phase changing values on the modulated signal after precoding in the frequency domain, z1(*f*) and z2(*f*) at the same frequency is transmitted from different antennas at the same time point.

Also, even in the case of performing switching between the phase changing values on the modulated signal after precoding in the time and frequency domains, the present invention is applicable as described in other embodiments. The scheme pertaining to the present embodiment, which switches between the phase changing values on the modulated signal after precoding, is not limited the scheme which switches between the phase changing values on the modulated signal after precoding as described in the present Description.

Also, assume that processed baseband signals z1(*i*), z2(*i*) (where i represents the order in terms of time or frequency (carrier)) are generated by regular phase change and precoding (it does not matter which is performed first) on baseband signals s1 (*i*) and s2(*i*) for two streams. Let the in-phase component I and the quadrature component Q of the processed baseband signal z1(*i*) be $I_1(i)$ and $Q_1(i)$ respectively, and let the in-phase component I and the quadrature component Q of the processed baseband signal z2(*i*) be $I_2(i)$ and $Q_2(i)$ respectively. In this case, the baseband components may be switched, and modulated signals corresponding to the switched baseband signal r1(*i*) and the switched baseband signal r2(*i*) may be transmitted from different antennas at the same time and over the same frequency by transmitting a modulated signal corresponding to the switched baseband signal r1(*i*) from transmit antenna 1 and a modulated signal corresponding to the switched baseband signal r2(*i*) from transmit antenna 2 at the same time and over the same frequency. Baseband components may be switched as follows.

Let the in-phase component and the quadrature component of the switched baseband signal r1(*i*) be $I_1(i)$ and $Q_2(i)$ respectively, and the in-phase component and the quadrature component of the switched baseband signal r2(*i*) be $I_2(i)$ and $Q_1(i)$ respectively.

Let the in-phase component and the quadrature component of the switched baseband signal r1(*i*) be $I_1(i)$ and $I_2(i)$ respectively, and the in-phase component and the quadrature component of the switched baseband signal r2(*i*) be $Q_1(i)$ and $Q_2(i)$ respectively.

Let the in-phase component and the quadrature component of the switched baseband signal r1(*i*) be $I_2(i)$ and $I_1(i)$ respectively, and the in-phase component and the quadrature component of the switched baseband signal r2(*i*) be $Q_1(i)$ and $Q_2(i)$ respectively.

Let the in-phase component and the quadrature component of the switched baseband signal r1(*i*) be $I_1(i)$ and $I_2(i)$ respectively, and the in-phase component and the quadrature component of the switched baseband signal r2(*i*) be $Q_2(i)$ and $Q_1(i)$ respectively.

Let the in-phase component and the quadrature component of the switched baseband signal r1(*i*) be $I_2(i)$ and $I_1(i)$ respectively, and the in-phase component and the quadrature component of the switched baseband signal r2(*i*) be $Q_2(i)$ and $Q_1(i)$ respectively.

Let the in-phase component and the quadrature component of the switched baseband signal r1(*i*) be $I_1(i)$ and $Q_2(i)$ respectively, and the in-phase component and the quadrature component of the switched baseband signal r2(*i*) be $Q_1(i)$ and $I_2(i)$ respectively.

Let the in-phase component and the quadrature component of the switched baseband signal r1(*i*) be $Q_2(i)$ and $I_1(i)$ respectively, and the in-phase component and the quadrature component of the switched baseband signal r2(*i*) be $I_2(i)$ and $Q_1(i)$ respectively.

Let the in-phase component and the quadrature component of the switched baseband signal r1(*i*) be $Q_2(i)$ and $I_1(i)$ respectively, and the in-phase component and the quadrature component of the switched baseband signal r2(*i*) be $Q_1(i)$ and $I_2(i)$ respectively.

Let the in-phase component and the quadrature component of the switched baseband signal r2(*i*) be $I_1(i)$ and $I_2(i)$ respectively, and the in-phase component and the quadrature component of the switched baseband signal r1(*i*) be $Q_1(i)$ and $Q_2(i)$ respectively.

Let the in-phase component and the quadrature component of the switched baseband signal r2(*i*) be $I_2(i)$ and $I_1(i)$ respectively, and the in-phase component and the quadrature component of the switched baseband signal $r_1(i)$ be $Q_1(i)$ and $Q_2(i)$ respectively.

Let the in-phase component and the quadrature component of the switched baseband signal r2(*i*) be $I_1(i)$ and $I_2(i)$ respectively, and the in-phase component and the quadrature component of the switched baseband signal r1(*i*) be $Q_2(i)$ and $Q_1(i)$ respectively.

Let the in-phase component and the quadrature component of the switched baseband signal r2(*i*) be $I_2(i)$ and $I_1(i)$ respectively, and the in-phase component and the quadrature component of the switched baseband signal r1(*i*) be $Q_2(i)$ and $Q_1(i)$ respectively.

Let the in-phase component and the quadrature component of the switched baseband signal r2(*i*) be $I_1(i)$ and $Q_2(i)$ respectively, and the in-phase component and the quadrature component of the switched baseband signal r1(*i*) be $I_2(i)$ and $Q_1(i)$ respectively.

Let the in-phase component and the quadrature component of the switched baseband signal r2(*i*) be $I_1(i)$ and $Q_2(i)$ respectively, and the in-phase component and the quadrature component of the switched baseband signal r1(*i*) be $Q_1(i)$ and $I_2(i)$ respectively.

Let the in-phase component and the quadrature component of the switched baseband signal r2(*i*) be $Q_2(i)$ and $I_1(i)$ respectively, and the in-phase component and the quadrature component of the switched baseband signal r1(*i*) be $I_2(i)$ and $Q_1(i)$ respectively.

Let the in-phase component and the quadrature component of the switched baseband signal r2(*i*) be $Q_2(i)$ and $I_1(i)$ respectively, and the in-phase component and the quadrature component of the switched baseband signal r1(*i*) be $Q_1(i)$ and $I_2(i)$ respectively.

In the above description, signals in two streams are processed and in-phase components and quadrature components of the processed signals are switched, but the present invention is not limited in this way. Signals in more than two streams may be processed, and the in-phase components and quadrature components of the processed signals may be switched.

In addition, the signals may be switched in the following manner. For example,

Let the in-phase component and the quadrature component of the switched baseband signal r1(*i*) be $I_2(i)$ and $Q_2(i)$ respectively, and the in-phase component and the quadrature component of the switched baseband signal r2(*i*) be $I_1(i)$ and $Q_1(i)$ respectively.

Such switching can be achieved by the structure shown in FIG. 55.

In the above-mentioned example, switching between baseband signals at the same time (at the same frequency ((sub)carrier)) has been described, but the present invention is not limited to the switching between baseband signals at the same time. As an example, the following description can be made.

Let the in-phase component and the quadrature component of the switched baseband signal r1(*i*) be $I_1(i+v)$ and $Q_2(i+w)$ respectively, and the in-phase component and the quadrature component of the switched baseband signal r2(*i*) be $I_2(i+w)$ and $Q_1(i+v)$ respectively.

Let the in-phase component and the quadrature component of the switched baseband signal r1(*i*) be $I_1(i+v)$ and $I_2$(i+w) respectively, and the in-phase component and the quadrature component of the switched baseband signal r2(*i*) be $Q_1$(i+v) and $Q_2$(i+w) respectively.

Let the in-phase component and the quadrature component of the switched baseband signal r1(*i*) be $I_2$(i+w) and $I_1$(i+v) respectively, and the in-phase component and the quadrature component of the switched baseband signal r2(*i*) be $Q_1$(i+v) and $Q_2$(i+w) respectively.

Let the in-phase component and the quadrature component of the switched baseband signal r1(*i*) be $I_1$(i+v) and $I_2$(i+w) respectively, and the in-phase component and the quadrature component of the switched baseband signal r2(*i*) be $Q_2$(i+w) and $Q_1$(i+v) respectively.

Let the in-phase component and the quadrature component of the switched baseband signal r1(*i*) be $I_2$(i+w) and $I_1$(i+v) respectively, and the in-phase component and the quadrature component of the switched baseband signal r2(*i*) be $Q_2$(i+w) and $Q_1$(i+v) respectively.

Let the in-phase component and the quadrature component of the switched baseband signal r1(*i*) be $I_1$(i+v) and $Q_2$(i+w) respectively, and the in-phase component and the quadrature component of the switched baseband signal r2(*i*) be $Q_1$(i+v) and $I_2$(i+w) respectively.

Let the in-phase component and the quadrature component of the switched baseband signal r1(*i*) be $Q_2$(i+w) and $I_1$(i+v) respectively, and the in-phase component and the quadrature component of the switched baseband signal r2(*i*) be $I_2$(i+w) and $Q_1$(i+v) respectively.

Let the in-phase component and the quadrature component of the switched baseband signal r1(*i*) be $Q_2$(i+w) and $I_1$(i+v) respectively, and the in-phase component and the quadrature component of the switched baseband signal r2(*i*) be $Q_1$(i+v) and $I_2$(i+w) respectively.

Let the in-phase component and the quadrature component of the switched baseband signal r2(*i*) be $I_1$(i+v) and $I_2$(i+w) respectively, and the in-phase component and the quadrature component of the switched baseband signal r1(*i*) be $Q_1$(i+v) and $Q_2$(i+w) respectively.

Let the in-phase component and the quadrature component of the switched baseband signal r2(*i*) be $I_2$(i+w) and $I_1$(i+v) respectively, and the in-phase component and the quadrature component of the switched baseband signal r1(*i*) be $Q_1$(i+v) and $Q_2$(i+w) respectively.

Let the in-phase component and the quadrature component of the switched baseband signal r2(*i*) be $I_1$(i+v) and $I_2$(i+w) respectively, and the in-phase component and the quadrature component of the switched baseband signal r1(*i*) be $Q_2$(i+w) and $Q_1$(i+v) respectively.

Let the in-phase component and the quadrature component of the switched baseband signal r2(*i*) be $I_2$(i+w) and $I_1$(i+v) respectively, and the in-phase component and the quadrature component of the switched baseband signal r1(*i*) be $Q_2$(i+w) and $Q_1$(i+v) respectively.

Let the in-phase component and the quadrature component of the switched baseband signal r2(*i*) be $I_1$(i+v) and $Q_2$(i+w) respectively, and the in-phase component and the quadrature component of the switched baseband signal r1(*i*) be $I_2$(i+w) and $Q_1$(i+v) respectively.

Let the in-phase component and the quadrature component of the switched baseband signal r2(*i*) be $I_1$(i+v) and $Q_2$(i+w) respectively, and the in-phase component and the quadrature component of the switched baseband signal r1(*i*) be $Q_1$(i+v) and $I_2$(i+w) respectively.

Let the in-phase component and the quadrature component of the switched baseband signal r2(*i*) be $Q_2$(i+w) and $I_1$(i+v) respectively, and the in-phase component and the quadrature component of the switched baseband signal r1(*i*) be $I_2$(i+w) and $Q_1$(i+v) respectively.

Let the in-phase component and the quadrature component of the switched baseband signal r2(*i*) be $Q_2$(i+w) and $I_1$(i+v) respectively, and the in-phase component and the quadrature component of the switched baseband signal r1(*i*) be $Q_1$(i+v) and $I_2$(i+w) respectively.

In addition, the signals may be switched in the following manner. For example,

Let the in-phase component and the quadrature component of the switched baseband signal r1(*i*) be $I_2$(i+w) and $Q_2$(i+w) respectively, and the in-phase component and the quadrature component of the switched baseband signal r2(*i*) be $I_1$(i+v) and $Q_1$(i+w) respectively.

This can also be achieved by the structure shown in FIG. 55.

FIG. 55 illustrates a baseband signal switcher 5502 explaining the above. As shown, of the two processed baseband signals z1(*i*) 5501_1 and z2(*i*) 5501_2, processed baseband signal z1(*i*) 5501_1 has in-phase component $I_1$(i) and quadrature component $Q_1$(i), while processed baseband signal z2(*i*) 5501_2 has in-phase component $I_2$(i) and quadrature component $Q_2$(i). Then, after switching, switched baseband signal r1(*i*) 5503_1 has in-phase component $I_{r1}$(i) and quadrature component $Q_{r1}$(i), while switched baseband signal r2(*i*) 5503_2 has in-phase component $I_{r2}$(i) and quadrature component $Q_{r2}$(i). The in-phase component $I_{r1}$(i) and quadrature component $Q_{r1}$(i) of switched baseband signal r1(*i*) 5503_1 and the in-phase component Ir2(*i*) and quadrature component $Q_{r2}$(i) of switched baseband signal r2(*i*) 5503_2 may be expressed as any of the above. Although this example describes switching performed on baseband signals having a common time (common ((sub-)carrier) frequency) and having undergone two types of signal processing, the same may be applied to baseband signals having undergone two types of signal processing but having different time (different ((sub-)carrier) frequencies).

The switching may be performed while regularly changing switching methods.

For example,

At time 0, for switched baseband signal r1(0), the in-phase component may be $I_1$(0) while the quadrature component may be $Q_1$(0), and for switched baseband signal r2(0), the in-phase component may be $I_2$(0) while the quadrature component may be $Q_2$(0);

At time 1, for switched baseband signal r1(1), the in-phase component may be $I_2$(1) while the quadrature component may be $Q_2$(1), and for switched baseband signal r2(1), the in-phase component may be $I_1$(1) while the quadrature component may be $Q_1$(1), and so on. In other words, When time is 2k (k is an integer), for switched baseband signal r1(2k), the in-phase component may be $I_1$(2k) while the quadrature component may be $Q_1$(2k), and for switched baseband signal r2(2k), the in-phase component may be $I_2$(2k) while the quadrature component may be $Q_2$(2k).

When time is 2k+1 (k is an integer), for switched baseband signal r1(2k+1), the in-phase component may be $I_2$(2k+1) while the quadrature component may be $Q_2$(2k+1), and for switched baseband signal r2(2k+

1), the in-phase component may be $I_1(2k+1)$ while the quadrature component may be $Q_1(2k+1)$.

When time is 2k (k is an integer), for switched baseband signal r1(2k), the in-phase component may be $I_2(2k)$ while the quadrature component may be $Q_2(2k)$, and for switched baseband signal r2(2k), the in-phase component may be $I_1(2k)$ while the quadrature component may be $Q_1(2k)$.

When time is 2k+1 (k is an integer), for switched baseband signal r1(2k+1), the in-phase component may be $I_1(2k+1)$ while the quadrature component may be $Q_1(2k+1)$, and for switched baseband signal r2(2k+1), the in-phase component may be $I_2(2k+1)$ while the quadrature component may be $Q_2(2k+1)$.

Similarly, the switching may be performed in the frequency domain. In other words, When frequency ((sub) carrier) is 2k (k is an integer), for switched baseband signal r1(2k), the in-phase component may be $I_1(2k)$ while the quadrature component may be $Q_1(2k)$, and for switched baseband signal r2(2k), the in-phase component may be $I_2(2k)$ while the quadrature component may be $Q_2(2k)$.

When frequency ((sub) carrier) is 2k+1 (k is an integer), for switched baseband signal r1(2k+1), the in-phase component may be $I_2(2k+1)$ while the quadrature component may be $Q_2(2k+1)$, and for switched baseband signal r2(2k+1), the in-phase component may be $I_1(2k+1)$ while the quadrature component may be $Q_1(2k+1)$.

When frequency ((sub) carrier) is 2k (k is an integer), for switched baseband signal r1(2k), the in-phase component may be $I_2(2k)$ while the quadrature component may be $Q_2(2k)$, and for switched baseband signal r2(2k), the in-phase component may be $I_1(2k)$ while the quadrature component may be $Q_1(2k)$.

When frequency ((sub) carrier) is 2k+1 (k is an integer), for switched baseband signal r1(2k+1), the in-phase component may be $I_1(2k+1)$ while the quadrature component may be $Q_1(2k+1)$, and for switched baseband signal r2(2k+1), the in-phase component may be $I_2(2k+1)$ while the quadrature component may be $Q_2(2k+1)$.

Embodiment G1

The present embodiment describes a scheme that is used when the modulated signal subject to the QPSK mapping and the modulated signal subject to the 16-QAM mapping are transmitted, for example, and is used for setting the average power of the modulated signal subject to the QPSK mapping and the average power of the modulated signal subject to the 16-QAM mapping such that the average powers will be different from each other. This scheme is different from Embodiment F1.

As explained in Embodiment F1, when the modulation scheme for the modulated signal of s1 is QPSK and the modulation scheme for the modulated signal of s2 is 16-QAM (or the modulation scheme for the modulated signal s1 is 16-QAM and the modulation scheme for the modulated signal s2 is QPSK), if the average power of the modulated signal subject to the QPSK mapping and the average power of the modulated signal subject to the 16-QAM mapping are set to be different from each other, the PAPR (Peak-to-Average Power Ratio) of the transmission power amplifier provided in the transmission device may increase, depending on the precoding matrix used by the transmission device. The increase of the PAPR may lead to the increase in power consumption by the transmission device.

In the present embodiment, description is provided on the scheme for regularly performing phase change after performing the precoding described in "Embodiment 1" and so on, where, even when $\alpha \neq 1$ in the formula 36 of the precoding matrix to be used in the scheme for regularly changing the phase, the influence to the PAPR is suppressed to a minimal extent.

In the present embodiment, description is provided taking as an example a case where the modulation scheme applied to the streams s1 and s2 is either QPSK or 16-QAM.

Firstly, explanation is provided of the mapping scheme for QPSK modulation and the mapping scheme for 16-QAM modulation. Note that, in the present embodiment, the symbols s1 and s2 refer to signals which are either in accordance with the mapping for QPSK modulation or the mapping for 16-QAM modulation.

First of all, description is provided concerning mapping for 16-QAM with reference to the accompanying FIG. 80. FIG. 80 illustrates an example of a signal point arrangement in the I-Q plane (I: in-phase component; Q: quadrature component) for 16-QAM. Concerning the signal point 8000 in FIG. 80, when the bits transferred (input bits) are b0-b3, that is, when the bits transferred are indicated by (b0, b1, b2, b3)=(1, 0, 0, 0) (this value being illustrated in FIG. 80), the coordinates in the I-Q plane (I: in-phase component; Q: quadrature component) corresponding thereto are denoted as $(I,Q)=(-3\times g, 3\times g)$. The values of coordinates I and Q in this set of coordinates indicate the mapped signals. Note that, when the bits transferred (b0, b1, b2, b3) take other values than in the above, the set of values I and Q is determined according to the values of the bits transferred (b0, b1, b2, b3) and according to FIG. 80. Further, similarly as in the above, the values of coordinates I and Q in this set indicate the mapped signals (s1 and s2).

Subsequently, description is provided concerning mapping for QPSK modulation with reference to the accompanying FIG. 81. FIG. 81 illustrates an example of a signal point arrangement in the I-Q plane (I: in-phase component; Q: quadrature component) for QPSK. Concerning the signal point 8100 in FIG. 81, when the bits transferred (input bits) are b0 and b1, that is, when the bits transferred are indicated by (b0,b1)=(1,0) (this value being illustrated in FIG. 81), the coordinates in the I-Q plane (I: in-phase component; Q: quadrature component) corresponding thereto are denoted as $(I,Q)=(-1\times h, 1\times h)$. Further, the values of coordinates I and Q in this set of coordinates indicate the mapped signals. Note that, when the bits transferred (b0,b1) take other values than in the above, the set of coordinates (I,Q) is determined according to the values of the bits transferred (b0,b1) and according to FIG. 81. Further, similarly as in the above, the values of coordinates I and Q in this set indicate the mapped signals (s1 and s2).

Further, when the modulation scheme applied to s1 and s2 is either QPSK or 16-QAM, in order to equalize the values of the average power, h is as represented by formula 78, and g is as represented by formula 79.

FIGS. 87 and 88 illustrate an example of the scheme of changing the modulation scheme, the power changing value, and the precoding matrix in the time domain (or in the frequency domain, or in the time domain and the frequency domain) when using a precoding-related signal processor illustrated in FIG. 85.

In FIG. 87, a chart is provided indicating the modulation scheme, the power changing value (u, v), and the phase changing value (y[t]) to be set at each of times t=0 through t=11. Note that, concerning the modulated signals z1($t$) and z2($t$), the modulated signals z1($t$) and z2($t$) at the same time point are to be simultaneously transmitted from different transmit antennas at the same frequency. (Although the chart in FIG. 87 is based on the time domain, when using a multi-carrier transmission scheme as the OFDM scheme, switching between schemes (modulation scheme, power changing value, phase changing value) may be performed according to the frequency (subcarrier) domain, rather than according to the time domain. In such a case, replacement should be made of t=0 with f=f0, t=1 with f=f1, . . . , as is shown in FIG. 87. (Note that here, f denotes frequencies (subcarriers), and thus, f0, f1, . . . indicate different frequencies (subcarriers) to be used.) Further, note that concerning the modulated signals z1(*f*) and z2(*f*) in such a case, the modulated signals z1(*f*) and z2(*f*) having the same frequency are to be simultaneously transmitted from different transmit antennas.

As illustrated in FIG. 87, when the modulation scheme applied is QPSK, the power changer (although referred to as the power changer herein, may also be referred to as an amplification changer or a weight unit) multiplies a (a being a real number) with respect to a signal modulated in accordance with QPSK. Similarly, when the modulation scheme applied is 16-QAM, the power changer (although referred to as the power changer herein, may also be referred to as the amplification changer or the weight unit) multiplies b (b being a real number) with respect to a signal modulated in accordance with 16-QAM.

In the example illustrated in FIG. 87, three phase changing values, namely y[0], y[1], and y[2] are prepared as phase changing values used in the scheme for regularly performing phase change after precoding. Additionally, the period (cycle) for the scheme for regularly performing phase change after precoding is 3 (thus, each of t0-t2, t3-t5, . . . , composes one period (cycle)). Note, in this embodiment, since the phase change is performed on one of the signals after precoding as shown in the example in FIG. 85, y[i] is an imaginary number having the absolute value of 1 (i.e. $y[i]=e^{j\theta}$. However, as described in this Description, the phase change may be performed after performing the precoding on a plurality of signals. If this is the case, a phase changing value exists for each of the plurality of signals after precoding.

The modulation scheme applied to s1(*t*) is QPSK in period (cycle) t0-t2, 16-QAM in period (cycle) t3-t5 and so on, whereas the modulation scheme applied to s2(*t*) is 16-QAM in period (cycle) t0-t2, QPSK in period (cycle) t3-t5 and so on. Thus, the set of (modulation scheme of s1(*t*), modulation scheme of s2(*t*)) is either (QPSK, 16-QAM) or (16-QAM, QPSK).

Here, it is important that:

when performing phase change according to y[0], both (QPSK, 16-QAM) and (16-QAM, QPSK) can be the set of (modulation scheme of s1(*t*), modulation scheme of s2(*t*)), when performing phase change according to y[1], both (QPSK, 16-QAM) and (16-QAM, QPSK) can be the set of (modulation scheme of s1(*t*), modulation scheme of s2(*t*)), and similarly, when performing phase change according to y[2], both (QPSK, 16-QAM) and (16-QAM, QPSK) can be the set of (modulation scheme of s1(*t*), modulation scheme of s2(*t*)).

In addition, when the modulation scheme applied to s1(*t*) is QPSK, the power changer (8501A) multiples s1(*t*) with a and thereby outputs a×s1(*t*). On the other hand, when the modulation scheme applied to s1(*t*) is 16-QAM, the power changer (8501A) multiples s1(*t*) with b and thereby outputs b×s1(*t*).

Further, when the modulation scheme applied to s2(*t*) is QPSK, the power changer (8501B) multiples s2(*t*) with a and thereby outputs a×s2(*t*). On the other hand, when the modulation scheme applied to s2(*t*) is 16-QAM, the power changer (8501B) multiples s2(*t*) with b and thereby outputs b×s2(*t*).

Note that, regarding the scheme for differently setting the average power of signals in accordance with mapping for QPSK modulation and the average power of signals in accordance with mapping for 16-QAM modulation, description has already been made in Embodiment F1.

Thus, when taking the set of (modulation scheme of s1(*t*), modulation scheme of s2(*t*)) into consideration, the period (cycle) for the phase change and the switching between modulation schemes is 6=3×2 (where 3: the number of phase changing values prepared as phase changing values used in the scheme for regularly performing phase change after precoding, and 2: both (QPSK, 16-QAM) and (16-QAM, QPSK) can be the set of (modulation scheme of s1(*t*), modulation scheme of s2(*t*)) for each of the phase changing values), as shown in FIG. 87.

As description has been made in the above, by making an arrangement such that both (QPSK, 16-QAM) and (16-QAM, QPSK) exist as the set of (modulation scheme of s1(*t*), modulation scheme of s2(*t*)), and such that both (QPSK, 16-QAM) and (16-QAM, QPSK) exist as the set of (modulation scheme of s1(*t*), modulation scheme of s2(*t*)) with respect to each of the phase changing values prepared as phase changing values used in the scheme for regularly performing phase change, the following advantageous effects are to be yielded. That is, even when differently setting the average power of signals in accordance with mapping for QPSK modulation and the average power of signals in accordance with mapping for 16-QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Note that, although description has been provided in the above, taking as an example a case where the set of (modulation scheme of s1(*t*), modulation scheme of s2(*t*)) is (QPSK, 16-QAM) and (16-QAM, QPSK), the possible sets of (modulation scheme of s1(*t*), modulation scheme of s2(*t*)) are not limited to this. More specifically, the set of (modulation scheme of s1(*t*), modulation scheme of s2(*t*)) may be one of: (QPSK, 64-QAM), (64-QAM, QPSK); (16-QAM, 64-QAM), (64-QAM, 16-QAM); (128QAM, 64-QAM), (64-QAM, 128QAM); (256-QAM, 64-QAM), (64-QAM, 256-QAM), and the like. That is, the present invention is to be similarly implemented provided that two different modulation schemes are prepared, and a different one of the modulation schemes is applied to each of s1(*t*) and s2(*t*).

In FIG. 88, a chart is provided indicating the modulation scheme, the power changing value, and the phase changing value to be set at each of times t=0 through t=11. Note that, concerning the modulated signals z1(*t*) and z2(*t*), the modulated signals z1(*t*) and z2(*t*) at the same time point are to be simultaneously transmitted from different transmit antennas at the same frequency. (Although the chart in FIG. 88 is based on the time domain, when using a multi-carrier transmission scheme as the OFDM scheme, switching between schemes may be performed according to the frequency (subcarrier) domain, rather than according to the time domain. In such a case, replacement should be made of t=0 with f=f0, t=1 with f=f1, . . . , as is shown in FIG. 88. (Note that here, f denotes frequencies (subcarriers), and thus, f0, f1, . . . indicate different frequencies (subcarriers) to be used.) Further, note that concerning the modulated signals z1(*f*) and z2(*f*) in such a case, the modulated signals z1(*f*) and z2(*f*) having the same frequency are to be simultaneously transmitted from different transmit antennas. Note that the example illustrated in FIG. 88 is an example that differs from the example illustrated in FIG. 87, but satisfies the requirements explained with reference to FIG. 87.

As illustrated in FIG. 88, when the modulation scheme applied is QPSK, the power changer (although referred to as the power changer herein, may also be referred to as an amplification changer or a weight unit) multiplies a (a being a real number) with respect to a signal modulated in accordance with QPSK. Similarly, when the modulation scheme applied is 16-QAM, the power changer (although referred to as the power changer herein, may also be referred to as the amplification changer or the weight unit) multiplies b (b being a real number) with respect to a signal modulated in accordance with 16-QAM.

In the example illustrated in FIG. 88, three phase changing values, namely y[0], y[1], and y[2] are prepared as phase changing values used in the scheme for regularly performing phase change after precoding. Additionally, the period (cycle) for the scheme for regularly performing phase change after precoding is 3 (thus, each of t0-t2, t3-t5, . . . , composes one period (cycle)).

Further, QPSK and 16-QAM are alternately set as the modulation scheme applied to s1(*t*) in the time domain, and the same applies to the modulation scheme set to s2(*t*). The set of (modulation scheme of s1(*t*), modulation scheme of s2(*t*)) is either (QPSK, 16-QAM) or (16-QAM, QPSK).

Here, it is important that: when performing phase change according to y[0], both (QPSK, 16-QAM) and (16-QAM, QPSK) can be the set of (modulation scheme of s1(*t*), modulation scheme of s2(*t*)), when performing phase change according to y[1], both (QPSK, 16-QAM) and (16-QAM, QPSK) can be the set of (modulation scheme of s1(*t*), modulation scheme of s2(*t*)), and similarly, when performing phase change according to y[2], both (QPSK, 16-QAM) and (16-QAM, QPSK) can be the set of (modulation scheme of s1(*t*), modulation scheme of s2(*t*)).

In addition, when the modulation scheme applied to s1(*t*) is QPSK, the power changer (8501A) multiples s1(*t*) with a and thereby outputs a×s1(*t*). On the other hand, when the modulation scheme applied to s1(*t*) is 16-QAM, the power changer (8501A) multiples s1(*t*) with b and thereby outputs b×s1(*t*).

Further, when the modulation scheme applied to s2(*t*) is QPSK, the power changer (8501B) multiples s2(*t*) with a and thereby outputs a×s2(*t*). On the other hand, when the modulation scheme applied to s2(*t*) is 16-QAM, the power changer (8501B) multiples s2(*t*) with b and thereby outputs b×s2(*t*).

Thus, when taking the set of (modulation scheme of s1(*t*), modulation scheme of s2(*t*)) into consideration, the period (cycle) for the phase change and the switching between modulation schemes is 6=3×2 (where 3: the number of phase changing values prepared as phase changing values used in the scheme for regularly performing phase change after precoding, and 2: both (QPSK, 16-QAM) and (16-QAM, QPSK) can be the set of (modulation scheme of s1(*t*), modulation scheme of s2(*t*)) for each of the phase changing values), as shown in FIG. 88.

As description has been made in the above, by making an arrangement such that both (QPSK, 16-QAM) and (16-QAM, QPSK) exist as the set of (modulation scheme of s1(*t*), modulation scheme of s2(*t*)), and such that both (QPSK, 16-QAM) and (16-QAM, QPSK) exist as the set of (modulation scheme of s1(*t*), modulation scheme of s2(*t*)) with respect to each of the phase changing values prepared as phase changing values used in the scheme for regularly performing phase change, the following advantageous effects are to be yielded. That is, even when differently setting the average power of signals in accordance with mapping for QPSK modulation and the average power of signals in accordance with mapping for 16-QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Note that, although description has been provided in the above, taking as an example a case where the set of (modulation scheme of s1(*t*), modulation scheme of s2(*t*)) is (QPSK, 16-QAM) and (16-QAM, QPSK), the possible sets of (modulation scheme of s1(*t*), modulation scheme of s2(*t*)) are not limited to this. More specifically, the set of (modulation scheme of s1(*t*), modulation scheme of s2(*t*)) may be one of: (QPSK, 64-QAM), (64-QAM, QPSK); (16-QAM, 64-QAM), (64-QAM, 16-QAM); (128QAM, 64-QAM), (64-QAM, 128QAM); (256-QAM, 64-QAM), (64-QAM, 256-QAM), and the like. That is, the present invention is to be similarly implemented provided that two different modulation schemes are prepared, and a different one of the modulation schemes is applied to each of s1(*t*) and s2(*t*).

Additionally, the relation between the modulation scheme, the power changing value, and the phase changing value set at each of times (or for each of frequencies) is not limited to those described in the above with reference to FIGS. 87 and 88.

To summarize the explanation provided in the above, the following points are essential.

Arrangements are to be made such that the set of (modulation scheme of s1(*t*), modulation scheme of s2(*t*)) can be either (modulation scheme A, modulation scheme B) or (modulation scheme B, modulation scheme A), and such that the average power of signals in accordance with mapping for QPSK modulation and the average power of signals in accordance with mapping for 16-QAM modulation are differently set. Further, when the modulation scheme applied to s1(*t*) is modulation scheme A, the power changer (8501A) multiples s1(*t*) with a and thereby outputs a×s1(*t*). Further, when the modulation scheme applied to s1(*t*) is modulation scheme B, the power changer (8501A) multiples s1(*t*) with a and thereby outputs b×s1(*t*). Similarly, when the modulation scheme applied to s2(*t*) is modulation scheme A, the power changer (8501B) multiples s2(*t*) with a and thereby outputs a×s2(*t*). On the other hand, when the modulation scheme applied to s2(*t*) is modulation scheme B, the power changer (8501A) multiples s2(*t*) with b and thereby outputs b×s2(*t*).

Further, an arrangement is to be made such that phase changing values y[0], y[1], . . . , y[n−2], and y[n−1] (or y[k], where k satisfies 0 k n−1) exist as phase changing values prepared for use in the scheme for regularly performing phase change after precoding. Further, an arrangement is to be made such that both (modulation scheme A, modulation scheme B) and (modulation scheme B, modulation scheme A) exist as the set of (modulation scheme of s1(*t*), modulation scheme of s2(*t*)) for y[k]. (Here, the arrangement may be made such that both (modulation scheme A, modulation scheme B) and (modulation scheme B, modulation scheme A) exist as the set of (modulation scheme of s1(*t*), modulation scheme of s2(*t*)) for y[k] for all values of k, or such that a value k exists where both (modulation scheme A, modulation scheme B) and (modulation scheme B, modulation scheme A) exist as the set of (modulation scheme of s1(*t*), modulation scheme of s2(*t*)) for y[k].)

As description has been made in the above, by making an arrangement such that both (modulation scheme A, modulation scheme B) and (modulation scheme B, modulation scheme A) exist as the set of (modulation scheme of s1(*t*), modulation scheme of s2(*t*)), and such that both (modulation scheme A, modulation scheme B) and (modulation scheme B, modulation scheme A) exist as the set of (modulation scheme of s1(*t*), modulation scheme of s2(*t*)) with respect to each of the phase changing values prepared as phase changing values used in the scheme for regularly performing phase change, the following advantageous effects are to be yielded. That is, even when differently setting the average power of signals for modulation scheme A and the average power of signals for modulation scheme B, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

In connection with the above, explanation is provided of a scheme for generating baseband signals s1(*t*) and s2(*t*) in the following. As illustrated in FIGS. 3 and 4, the baseband signal s1(*t*) is generated by the mapper 306A and the baseband signal s2(*t*) is generated by the mapper 306B. As such, in the examples provided in the above with reference to FIGS. 87 and 88, the mapper 306A and 306B switch between mapping according to QPSK and mapping according to 16-QAM by referring to the charts illustrated in FIGS. 87 and 88.

Here, note that, although separate mappers for generating each of the baseband signal s1(*t*) and the baseband signal s2(*t*) are provided in the illustrations in FIGS. 3 and 4, the present invention is not limited to this. For instance, the mapper (8902) may receive input of digital data (8901), generate s1(*t*) and s2(*t*) according to FIGS. 87 and 88, and respectively output s1(*t*) as the mapped signal 307A and s2(*t*) as the mapped signal 307B.

Figure 89:
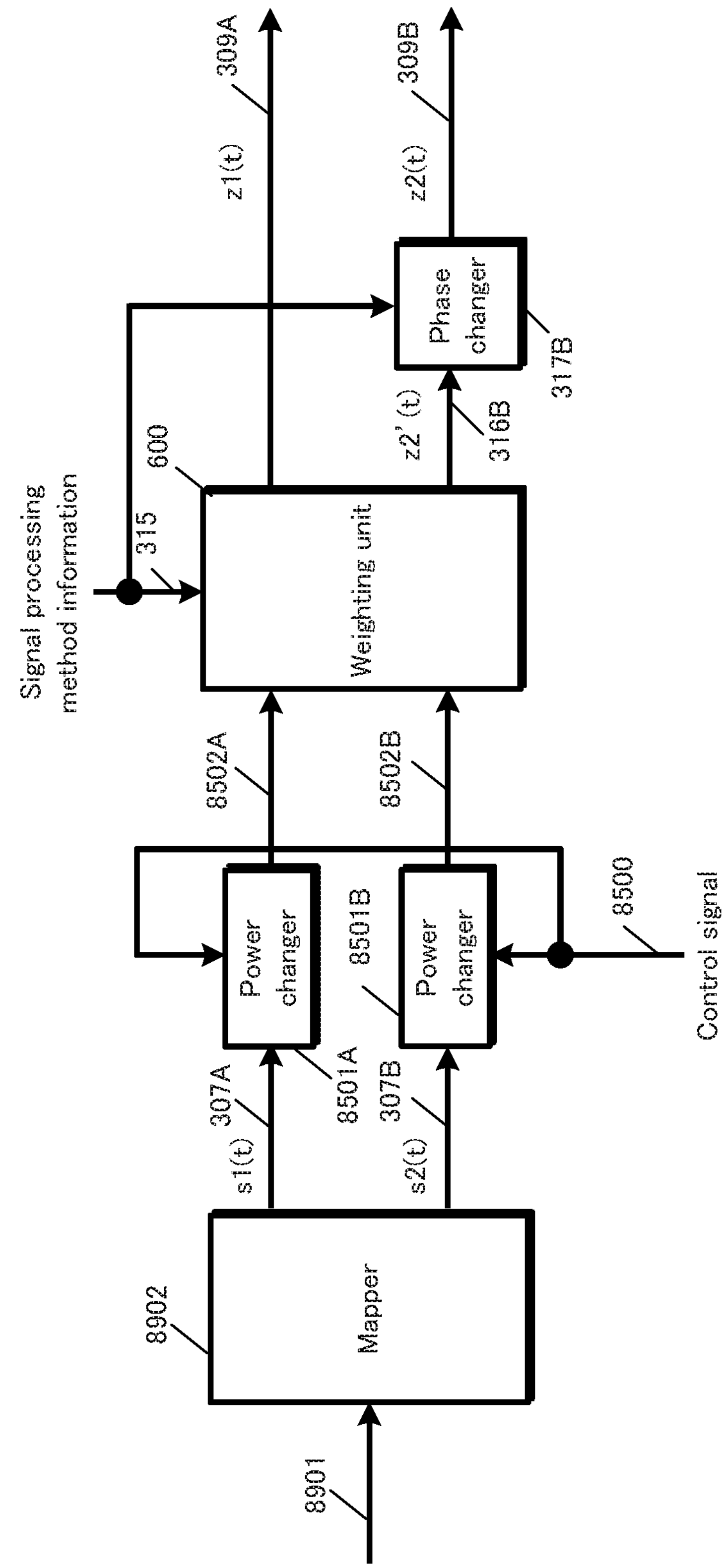
FIG. 89 illustrates an example of a structure of the signal processor pertaining to the weighting unit.
Figure 90:
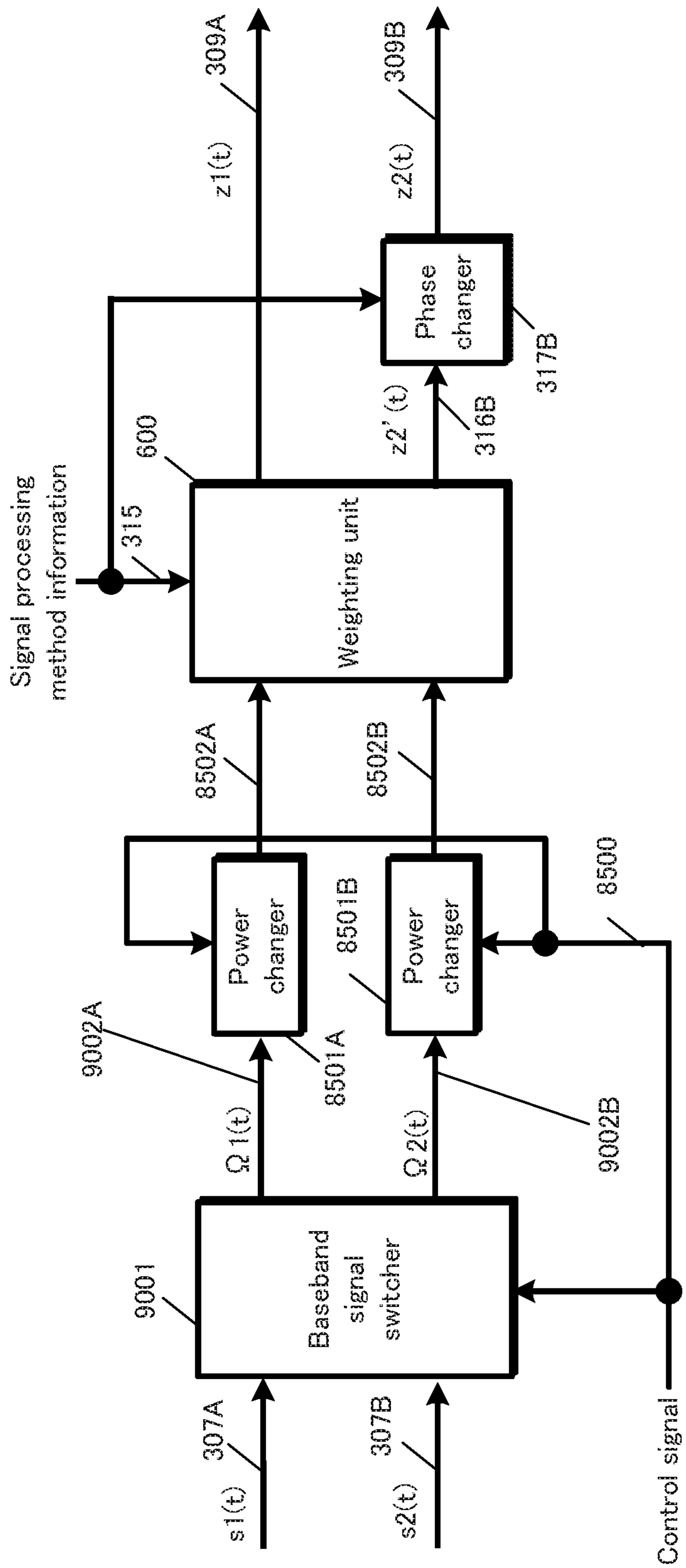
FIG. 90 illustrates an example of a structure of the signal processor pertaining to the weighting unit.

FIG. 90 illustrates one structural example of the periphery of the weighting unit (precoding unit), which differs from the structures illustrated in FIGS. 85 and 89. In FIG. 90, elements that operate in a similar way to FIG. 3 and FIG. 85 bear the same reference signs. In FIG. 91, a chart is provided indicating the modulation scheme, the power changing value, and the phase changing value to be set at each of times t=0 through t=11 with respect to the structural example illustrated in FIG. 90. Note that, concerning the modulated signals z1(*t*) and z2(*t*), the modulated signals z1(*t*) and z2(*t*) at the same time point are to be simultaneously transmitted from different transmit antennas at the same frequency. (Although the chart in FIG. 91 is based on the time domain, when using a multi-carrier transmission scheme as the OFDM scheme, switching between schemes may be performed according to the frequency (subcarrier) domain, rather than according to the time domain. In such a case, replacement should be made of t=0 with f=f0, t=1 with f=f1, . . . , as is shown in FIG. 91. (Note that here, f denotes frequencies (subcarriers), and thus, f0, f1, . . . indicate different frequencies (subcarriers) to be used.) Further, note that concerning the modulated signals z1(*f*) and z2(*f*) in such a case, the modulated signals z1(*f*) and z2(*f*) having the same frequency are to be simultaneously transmitted from different transmit antennas.

As illustrated in FIG. 91, when the modulation scheme applied is QPSK, the power changer (although referred to as the power changer herein, may also be referred to as an amplification changer or a weight unit) multiplies a (a being a real number) with respect to a signal modulated in accordance with QPSK. Similarly, when the modulation scheme applied is 16-QAM, the power changer (although referred to as the power changer herein, may also be referred to as the amplification changer or the weight unit) multiplies b (b being a real number) with respect to a signal modulated in accordance with 16-QAM.

In the example illustrated in FIG. 91, three phase changing values, namely y[0], y[1], and y[2] are prepared as phase changing values used in the scheme for regularly performing phase change after precoding. Additionally, the period (cycle) for the scheme for regularly performing phase change after precoding is 3 (thus, each of t0-t2, t3-t5, . . . , composes one period (cycle)).

Further, the modulation scheme applied to s1(*t*) is fixed to QPSK, and the modulation scheme to be applied to s2(*t*) is fixed to 16-QAM. Additionally, the signal switcher (9001) illustrated in FIG. 90 receives the mapped signals 307A and 307B and the control signal (8500) as input thereto. The signal switcher (9001) performs switching with respect to the mapped signals 307A and 307B according to the control signal (8500) (there are also cases where the switching is not performed), and outputs switched signals (9002A: Ω1(*t*), and 9002B: Ω2(*t*)).

Here, it is important that:

When performing phase change according to y[0], both (QPSK, 16-QAM) and (16-QAM, QPSK) can be the set of (modulation scheme of Ω1(*t*), modulation scheme of Ω2(*t*)), when performing phase change according to y[1], both (QPSK, 16-QAM) and (16-QAM, QPSK) can be the set of (modulation scheme of Ω1(*t*), modulation scheme of Ω2(*t*)), and similarly, when performing phase change according to y[2], both (QPSK, 16-QAM) and (16-QAM, QPSK) can be the set of (modulation scheme of Ω1(*t*), modulation scheme of Ω2(*t*)).

Further, when the modulation scheme applied to Ω1(*t*) is QPSK, the power changer (8501A) multiples Ω1(*t*) with a and thereby outputs a×Ω1(*t*). On the other hand, when the modulation scheme applied to Ω1(*t*) is 16-QAM, the power changer (8501A) multiples Ω1(*t*) with b and thereby outputs b×Ω1(*t*).

Further, when the modulation scheme applied to Ω2(*t*) is QPSK, the power changer (8501B) multiples Ω2(*t*) with a and thereby outputs a×Ω2(*t*). On the other hand, when the modulation scheme applied to Ω2(*t*) is 16-QAM, the power changer (8501B) multiples Ω2(*t*) with b and thereby outputs b×Ω2(*t*).

Note that, regarding the scheme for differently setting the average power of signals in accordance with mapping for QPSK modulation and the average power of signals in accordance with mapping for 16-QAM modulation, description has already been made in Embodiment F1.

Thus, when taking the set of (modulation scheme of Ω1(*t*), modulation scheme of Ω2(*t*)) into consideration, the period (cycle) for the phase change and the switching between modulation schemes is 6=3×2 (where 3: the number of phase changing values prepared as phase changing values used in the scheme for regularly performing phase change after precoding, and 2: both (QPSK, 16-QAM) and (16-QAM, QPSK) can be the set of (modulation scheme of Ω1($t$), modulation scheme of Ω2($t$)) for each of the phase changing values), as shown in FIG. 91.

As description has been made in the above, by making an arrangement such that both (QPSK, 16-QAM) and (16-QAM, QPSK) exist as the set of (modulation scheme of Ω1($t$), modulation scheme of Ω2($t$)), and such that both (QPSK, 16-QAM) and (16-QAM, QPSK) exist as the set of (modulation scheme of Ω1($t$), modulation scheme of Ω2($t$)) with respect to each of the phase changing values prepared as phase changing values used in the scheme for regularly performing phase change, the following advantageous effects are to be yielded. That is, even when differently setting the average power of signals in accordance with mapping for QPSK modulation and the average power of signals in accordance with mapping for 16-QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Note that, although description has been provided in the above, taking as an example a case where the set of (modulation scheme of Ω1($t$), modulation scheme of Ω2($t$)) is (QPSK, 16-QAM) and (16-QAM, QPSK), the possible sets of (modulation scheme of Ω1($t$), modulation scheme of Ω2($t$)) are not limited to this. More specifically, the set of (modulation scheme of Ω1($t$), modulation scheme of Ω2($t$)) may be one of: (QPSK, 64-QAM), (64-QAM, QPSK); (16-QAM, 64-QAM), (64-QAM, 16-QAM); (128QAM, 64-QAM), (64-QAM, 128QAM); (256-QAM, 64-QAM), (64-QAM, 256-QAM), and the like. That is, the present invention is to be similarly implemented provided that two different modulation schemes are prepared, and a different one of the modulation schemes is applied to each of Ω1($t$) and Ω2($t$).

In FIG. 92, a chart is provided indicating the modulation scheme, the power changing value, and the phase changing value to be set at each of times t=0 through t=11 with respect to the structural example illustrated in FIG. 90. Note that the chart in FIG. 92 differs from the chart in FIG. 91. Note that, concerning the modulated signals z1($t$) and z2($t$), the modulated signals z1($t$) and z2($t$) at the same time point are to be simultaneously transmitted from different transmit antennas at the same frequency. (Although the chart in FIG. 92 is based on the time domain, when using a multi-carrier transmission scheme as the OFDM scheme, switching between schemes may be performed according to the frequency (subcarrier) domain, rather than according to the time domain. In such a case, replacement should be made of t=0 with f=f0, t=1 with f=f1, . . . , as is shown in FIG. 92. (Note that here, f denotes frequencies (subcarriers), and thus, f0, f1, . . . indicate different frequencies (subcarriers) to be used.) Further, note that concerning the modulated signals z1($f$) and z2($f$) in such a case, the modulated signals z1($f$) and z2($f$) having the same frequency are to be simultaneously transmitted from different transmit antennas.

As illustrated in FIG. 92, when the modulation scheme applied is QPSK, the power changer (although referred to as the power changer herein, may also be referred to as an amplification changer or a weight unit) multiplies a (a being a real number) with respect to a signal modulated in accordance with QPSK. Similarly, when the modulation scheme applied is 16-QAM, the power changer (although referred to as the power changer herein, may also be referred to as the amplification changer or the weight unit) multiplies b (b being a real number) with respect to a signal modulated in accordance with 16-QAM.

In the example illustrated in FIG. 92, three phase changing values, namely y[0], y[1], and y[2] are prepared as phase changing values used in the scheme for regularly performing phase change after precoding. Additionally, the period (cycle) for the scheme for regularly performing phase change after precoding is 3 (thus, each of t0-t2, t3-t5, . . . , composes one period (cycle)).

Further, the modulation scheme applied to s1($t$) is fixed to QPSK, and the modulation scheme to be applied to s2($t$) is fixed to 16-QAM. Additionally, the signal switcher (9001) illustrated in FIG. 90 receives the mapped signals 307A and 307B and the control signal (8500) as input thereto. The signal switcher (9001) performs switching with respect to the mapped signals 307A and 307B according to the control signal (8500) (there are also cases where the switching is not performed), and outputs switched signals (9002A: Ω1($t$), and 9002B: Ω2($t$)).

Here, it is important that:

When performing phase change according to y[0], both (QPSK, 16-QAM) and (16-QAM, QPSK) can be the set of (modulation scheme of Ω1($t$), modulation scheme of Ω2($t$)), when performing phase change according to y[1], both (QPSK, 16-QAM) and (16-QAM, QPSK) can be the set of (modulation scheme of Ω1($t$), modulation scheme of Ω2($t$)), and similarly, when performing phase change according to y[2], both (QPSK, 16-QAM) and (16-QAM, QPSK) can be the set of (modulation scheme of Ω1($t$), modulation scheme of Ω2($t$)).

Further, when the modulation scheme applied to Ω1($t$) is QPSK, the power changer (8501A) multiples Ω1($t$) with a and thereby outputs a×Ω1($t$). On the other hand, when the modulation scheme applied to Ω1($t$) is 16-QAM, the power changer (8501A) multiples Ω1($t$) with b and thereby outputs b×Ω1($t$).

Further, when the modulation scheme applied to Ω2($t$) is QPSK, the power changer (8501B) multiples Ω2($t$) with a and thereby outputs α×Ω2($t$). On the other hand, when the modulation scheme applied to Ω2($t$) is 16-QAM, the power changer (8501B) multiples Ω2($t$) with b and thereby outputs b×Ω2($t$).

Note that, regarding the scheme for differently setting the average power of signals in accordance with mapping for QPSK modulation and the average power of signals in accordance with mapping for 16-QAM modulation, description has already been made in Embodiment F1.

Thus, when taking the set of (modulation scheme of Ω1($t$), modulation scheme of Ω2($t$)) into consideration, the period (cycle) for the phase change and the switching between modulation schemes is 6=3×2 (where 3: the number of phase changing values prepared as phase changing values used in the scheme for regularly performing phase change after precoding, and 2: both (QPSK, 16-QAM) and (16-QAM, QPSK) can be the set of (modulation scheme of Ω1($t$), modulation scheme of Ω2($t$)) for each of the phase changing values), as shown in FIG. 92.

As description has been made in the above, by making an arrangement such that both (QPSK, 16-QAM) and (16-QAM, QPSK) exist as the set of (modulation scheme of Ω1($t$), modulation scheme of Ω2($t$)), and such that both (QPSK, 16-QAM) and (16-QAM, QPSK) exist as the set of (modulation scheme of Ω1($t$), modulation scheme of Ω2($t$)) with respect to each of the phase changing values prepared as phase changing values used in the scheme for regularly performing phase change, the following advantageous effects are to be yielded. That is, even when differently setting the average power of signals in accordance with mapping for QPSK modulation and the average power of signals in accordance with mapping for 16-QAM modulation, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Note that, although description has been provided in the above, taking as an example a case where the set of (modulation scheme of Ω1($t$), modulation scheme of Ω2($t$)) is (QPSK, 16-QAM) and (16-QAM, QPSK), the possible sets of (modulation scheme of Ω$t$), modulation scheme of Ω2($t$)) are not limited to this. More specifically, the set of (modulation scheme of Ω1($t$), modulation scheme of Ω2($t$)) may be one of: (QPSK, 64-QAM), (64-QAM, QPSK); (16-QAM, 64-QAM), (64-QAM, 16-QAM); (128QAM, 64-QAM), (64-QAM, 128QAM); (256-QAM, 64-QAM), (64-QAM, 256-QAM), and the like. That is, the present invention is to be similarly implemented provided that two different modulation schemes are prepared, and a different one of the modulation schemes is applied to each of Ω1($t$) and Ω2($t$).

Additionally, the relation between the modulation scheme, the power changing value, and the phase changing value set at each of times (or for each of frequencies) is not limited to those described in the above with reference to FIGS. 91 and 92.

To summarize the explanation provided in the above, the following points are essential.

Arrangements are to be made such that the set of (modulation scheme of Ω1($t$), modulation scheme of Ω2($t$)) can be either (modulation scheme A, modulation scheme B) or (modulation scheme B, modulation scheme A), and such that the average power for the modulation scheme A and the average power for the modulation scheme B are differently set.

Further, when the modulation scheme applied to Ω1($t$) is modulation scheme A, the power changer (8501A) multiples Ω1($t$) with a and thereby outputs a×Ω1($t$). On the other hand, when the modulation scheme applied to Ω1($t$) is modulation scheme B, the power changer (8501A) multiples Ω1($t$) with b and thereby outputs b×Ω1($t$). Further, when the modulation scheme applied to Ω2($t$) is modulation scheme A, the power changer (8501B) multiples Ω2($t$) with a and thereby outputs a×Ω2($t$). On the other hand, when the modulation scheme applied to Ω2($t$) is modulation scheme B, the power changer (8501B) multiples Ω2($t$) with b and thereby outputs b×Ω2($t$).

Further, an arrangement is to be made such that phase changing values y[0], y[1], . . . , y[n−2], and y[n−1] (or y[k], where k satisfies 0≤k≤n−1) exist as phase changing values prepared for use in the scheme for regularly performing phase change after precoding. Further, an arrangement is to be made such that both (modulation scheme A, modulation scheme B) and (modulation scheme B, modulation scheme A) exist as the set of (modulation scheme of Ω1($t$), modulation scheme of Ω2($t$)) for y[k]. (Here, the arrangement may be made such that both (modulation scheme A, modulation scheme B) and (modulation scheme B, modulation scheme A) exist as the set of (modulation scheme of Ω1($t$), modulation scheme of Ω2($t$)) for y[k] for all values of k, or such that a value k exists where both (modulation scheme A, modulation scheme B) and (modulation scheme B, modulation scheme A) exist as the set of (modulation scheme of Ω1($t$), modulation scheme of Ω2($t$)) for y[k].)

As description has been made in the above, by making an arrangement such that both (modulation scheme A, modulation scheme B) and (modulation scheme B, modulation scheme A) exist as the set of (modulation scheme of Ω1($t$), modulation scheme of Ω2($t$)), and such that both (modulation scheme A, modulation scheme B) and (modulation scheme B, modulation scheme A) exist as the set of (modulation scheme of Ω1($t$), modulation scheme of Ω2($t$)) with respect to each of the phase changing values prepared as phase changing values used in the scheme for regularly performing phase change, the following advantageous effects are to be yielded. That is, even when differently setting the average power of signals for modulation scheme A and the average power of signals for modulation scheme B, the influence with respect to the PAPR of the transmission power amplifier included in the transmission device is suppressed to a minimal extent, and thus the influence with respect to the power consumption of the transmission device is suppressed to a minimal extent, while the reception quality of data received by the reception device in the LOS environment is improved, as explanation has already been provided in the present description.

Subsequently, explanation is provided of the operations of the reception device. Explanation of the reception device has already been provided in Embodiment 1 and so on, and the structure of the reception device is illustrated in FIGS. 7, 8 and 9, for instance.

According to the relation illustrated in FIG. 5, when the transmission device transmits modulated signals as introduced in FIGS. 87, 88, 91 and 92, one relation among the two relations denoted by the two formulas below is satisfied. Note that in the two formulas below, r1($t$) and r2($t$) indicate reception signals, and h11(t), h12(t), h21(t), and h22(t) indicate channel fluctuation values.

[Math. 93]

$$\begin{aligned}\begin{pmatrix} r1(t) \\ r2(t) \end{pmatrix} &= \begin{pmatrix} h11(t) & h12(t) \\ h21(t) & h22(t) \end{pmatrix}\begin{pmatrix} z1(t) \\ z2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} ve^{j0} & 0 \\ 0 & ue^{j0} \end{pmatrix}\begin{pmatrix} s1(t) \\ s2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} v & 0 \\ 0 & u \end{pmatrix}\begin{pmatrix} s1(t) \\ s2(t) \end{pmatrix} \\ &= \begin{pmatrix} h11(t) & h12(t) \\ h21(t) & h22(t) \end{pmatrix}\begin{pmatrix} 1 & 0 \\ 0 & y(t) \end{pmatrix} F\begin{pmatrix} a & 0 \\ 0 & b \end{pmatrix}\begin{pmatrix} s1(t) \\ s2(t) \end{pmatrix}\end{aligned} \quad \text{(formula G1)}$$

-continued

[Math. 94]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} v & 0 \\ 0 & u \end{pmatrix} \begin{pmatrix} s1(t) \\ s2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} b & 0 \\ 0 & a \end{pmatrix} \begin{pmatrix} s1(t) \\ s2(t) \end{pmatrix} \quad \text{(formula G2)}$$

Note that F shown in formulas G1 and G2 denotes precoding matrices used at time t, and y(t) denotes phase changing values. The reception device performs demodulation (detection) of signals by utilizing the relation defined in the two formulas above (that is, demodulation is to be performed in the same manner as explanation has been provided in Embodiment 1). However, the two formulas above do not take into consideration such distortion components as noise components, frequency offsets, and channel estimation errors, and thus, the demodulation (detection) is performed with such distortion components included in the signals. Regarding the values u and v that the transmission device uses for performing the power change, the transmission device transmits information about these values, or transmits information of the transmission mode (such as the transmission scheme, the modulation scheme and the error correction scheme) to be used. The reception device detects the values used by the transmission device by acquiring the information, obtains the two formulas described above, and performs the demodulation (detection).

Although description is provided in the present invention taking as an example a case where switching between phase changing values is performed in the time domain, the present invention may be similarly embodied when using a multi-carrier transmission scheme such as OFDM or the like and when switching between phase changing values in the frequency domain, as description has been made in other embodiments. If this is the case, t used in the present embodiment is to be replaced with f (frequency ((sub) carrier)). Further, the present invention may be similarly embodied in a case where switching between phase changing values is performed in the time-frequency domain. In addition, in the present embodiment, the scheme for regularly performing phase change after precoding is not limited to the scheme for regularly performing phase change after precoding, explanation of which has been provided in the other sections of the present description. Further in addition, the same effect of minimalizing the influence with respect to the PAPR is to be obtained when applying the present embodiment with respect to a precoding scheme where phase change is not performed.

Embodiment G2

In the present embodiment, description is provided on the scheme for regularly performing phase change, the application of which realizes an advantageous effect of reducing circuit size when the broadcast (or communications) system supports both of a case where the modulation scheme applied to s1 is QPSK and the modulation scheme applied to s2 is 16-QAM, and a case where the modulation scheme applied to s1 is 16-QAM and the modulation scheme applied to s2 is 16-QAM.

Firstly, explanation is made of the scheme for regularly performing phase change in a case where the modulation scheme applied to s1 is 16-QAM and the modulation scheme applied to s2 is 16-QAM.

Examples of the precoding matrices used in the scheme for regularly performing phase change in a case where the modulation scheme applied to s1 is 16-QAM and the modulation scheme applied to s2 is 16-QAM are shown in Embodiment 1. The precoding matrices [F] are represented as follows.

[Math. 95]

$$F = \frac{1}{\sqrt{\alpha^2+1}} \begin{pmatrix} e^{j0} & \alpha \times e^{j0} \\ \alpha \times e^{j0} & e^{j\pi} \end{pmatrix} \quad \text{(formula G3)}$$

In the following, description is provided on an example where the formula G3 is used as the precoding matrices for the scheme for regularly performing phrase change after precoding in a case where 16-QAM is applied as the modulation scheme to both s1 and s2.

Figure 93:
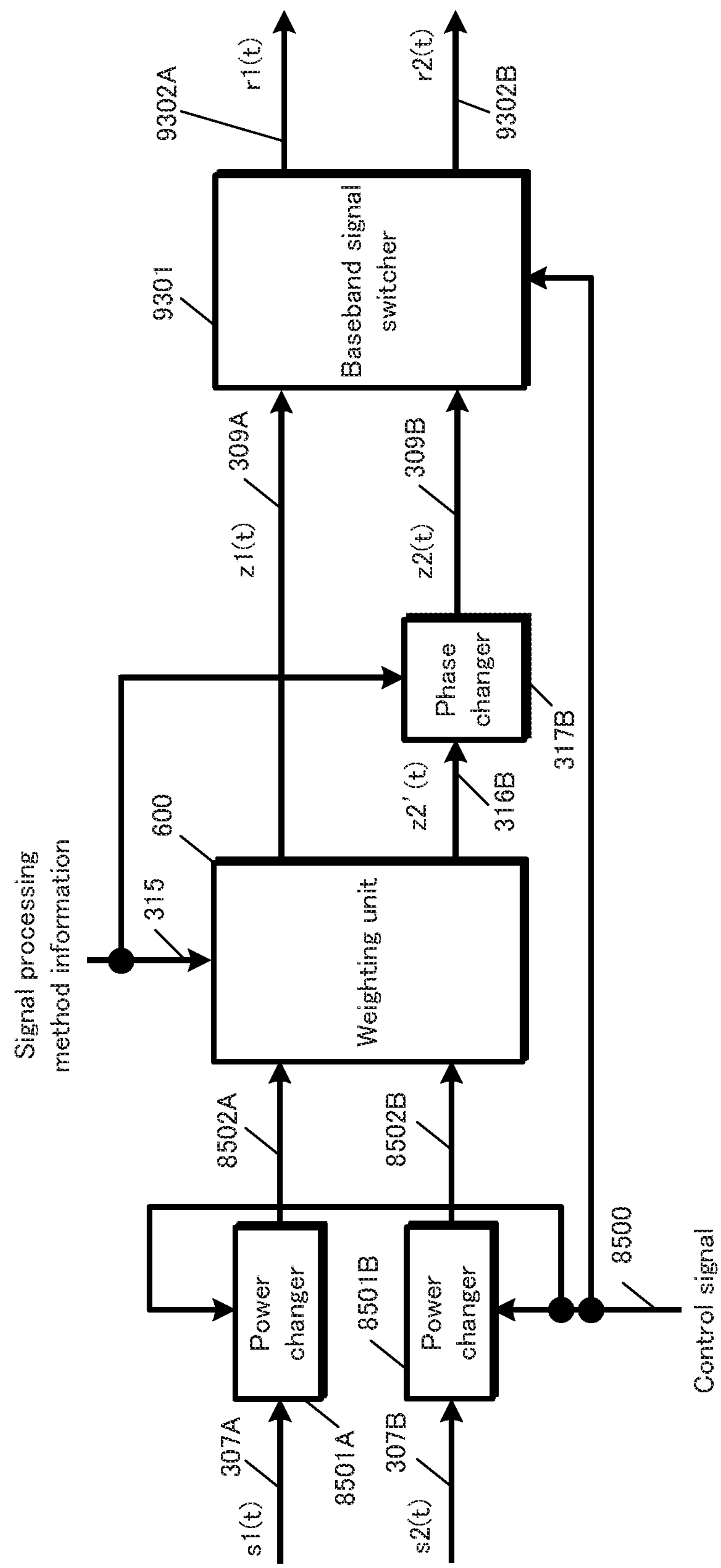
FIG. 93 illustrates an example of a structure of the signal processor pertaining to the weighting unit.

FIG. 93 illustrates a structural example of the periphery of the weighting unit (precoding unit) which supports both of a case where the modulation scheme applied to s1 is QPSK and the modulation scheme applied to s2 is 16-QAM, and a case where the modulation scheme applied to s1 is 16-QAM and the modulation scheme applied to s2 is 16-QAM. In FIG. 93, elements that operate in a similar way to FIG. 3, FIG. 6 and FIG. 85 bear the same reference signs, and explanations thereof are omitted.

In FIG. 93, the baseband signal switcher 9301 receives the precoded signal 309A(z1(*t*)), the precoded and phase-changed signal 309B(z2(*t*)), and the control signal 8500 as input. When the control signal 8500 indicates "do not perform switching of signals", the precoded signal 309A(z1(*t*)) is output as the signal 9302A(z1'(*t*)), and the precoded and phase-changed signal 309B(z2(*t*)) is output as the signal 9302B(z2'(*t*)).

In contrast, when the control signal 8500 indicates "perform switching of signals", the baseband signal switcher 8501 performs the following:

When time is 2k (k is an integer), outputs the precoded signal 309A(z1(2k)) as the signal 9302A(r1(2k)), and outputs the precoded signal 309B(z2(2k)) as the precoded and phase-changed signal 9302B(r2(2k)), When time is 2k+1 (k is an integer), outputs the precoded and phase-changed signal 309B(z2(2k+1)) as the signal 9302A(r1(2k+1)), and outputs the precoded signal 309A(z1(2k+1)) as the signal 9302B(r2(2k+1)), and further, When time is 2k (k is an integer), outputs the precoded signal 309B(z2(2k)) as the signal 9302A(r1(2k)), and outputs the precoded signal 309A(z1

(2k)) as the precoded and phase-changed signal 9302B(r2(2k)),

When time is 2k+1 (k is an integer), outputs the precoded signal 309A(z1(2k+1)) as the signal 9302A(r1(2k+1)), and outputs the precoded and phase-changed signal 309B(z2(2k+1)) as the signal 9302B(r2(2k+1)). (Although the above description provides an example of the switching between signals, the switching between signals is not limited to this. It is to be noted that importance lies in that switching between signals is performed when the control signal indicates "perform switching of signals".)

As explained in FIG. 3, FIG. 4, FIG. 5, FIG. 12, FIG. 13 and so on, the signal 9302A(r1(*t*)) is transmitted from an antenna instead of z1(*t*) (Note that predetermined processing is performed as shown in FIG. 3, FIG. 4, FIG. 5, FIG. 12, FIG. 13 and so on). Also, the signal 9302B(r2(*t*)) is transmitted from an antenna instead of z2(*t*) (Note that predetermined processing is performed as shown in FIG. 3, FIG. 4, FIG. 5, FIG. 12, FIG. 13 and so on.) Note that the signal 9302A(r1(*t*)) and the signal 9302B(r2(*t*)) are transmitted from different antenna.

Here, it should be noted that the switching of signals as described in the above is performed with respect to only precoded symbols. That is, the switching of signals is not performed with respect to other inserted symbols such as pilot symbols and symbols for transmitting information that is not to be precoded (e.g. control information symbols), for example. Further, although the description is provided in the above of a case where the scheme for regularly performing phase change after precoding is applied in the time domain, the present invention is not limited to this. The present embodiment may be similarly applied also in cases where the scheme for regularly performing phase change after precoding is applied in the frequency domain and in the time-frequency domain. Similarly, the switching of signals may be performed in the frequency domain or the time-frequency domain, even though description is provided in the above where switching of signals is performed in the time domain.

Subsequently, explanation is provided concerning the operation of each of the units in FIG. 93 in a case where 16-QAM is applied as the modulation scheme for both s1 and s2.

Since s1(*t*) and s2(*t*) are baseband signals (mapped signals) mapped with the modulation scheme 16-QAM, the mapping scheme applied thereto is as illustrated in FIG. 80, and g is represented by formula 79.

The power changer (8501A) receives a (mapped) baseband signal 307A for the modulation scheme 16-QAM and the control signal (8500) as input. Letting a value for power change set based on the control signal (8500) be v, the power changer outputs a signal (power-changed signal: 8502A) obtained by multiplying the (mapped) baseband signal 307A for the modulation scheme 16-QAM by v.

The power changer (8501B) receives a (mapped) baseband signal 307B for the modulation scheme 16-QAM and a control signal (8500) as input. Letting a value for power change set based on the control signal (8500) be u, the power changer outputs a signal (power-changed signal: 8502B) obtained by multiplying the (mapped) baseband signal 307B for the modulation scheme 16-QAM by u.

Here, the factors v and u satisfy: v=u=Ω, $v^2$: $u^2$=1:1. By making such an arrangement, data is received at an excellent reception quality by the reception device.

The weighting unit 600 receives the power-changed signal 8502A (the signal obtained by multiplying the baseband signal (mapped signal) 307A mapped with the modulation scheme 16-QAM by the factor v), the power-changed signal 8502B (the signal obtained by multiplying the baseband signal (mapped signal) 307B mapped with the modulation scheme 16-QAM by the factor u) and the information 315 regarding the weighting scheme as input. Further, the weighting unit 600 determines the precoding matrix based on the information 315 regarding the weighting scheme, and outputs the precoded signal 309A(z1(*t*)) and the precoded signal 316B(z2'(*t*)).

The phase changer 317B performs phase change on the precoded signal 316B(z2'(*t*)), based on the information 315 regarding the information processing scheme, and outputs the precoded and phase-changed signal 309B(z2(*t*)).

Here, when F represents a precoding matrix used in the scheme for regularly performing phase change after precoding and y(t) represents the phase changing values, the following formula holds.

[Math. 96]

$$\begin{pmatrix} z1(t) \\ z2(t) \end{pmatrix} = \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} v & 0 \\ 0 & u \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} \Omega & 0 \\ 0 & \Omega \end{pmatrix} \begin{pmatrix} s1(t) \\ s2(t) \end{pmatrix} \quad \text{(formula G4)}$$

Note that y(t) is an imaginary number having the absolute value of 1 (i.e. y[i]=ejθ).

Figure 94:
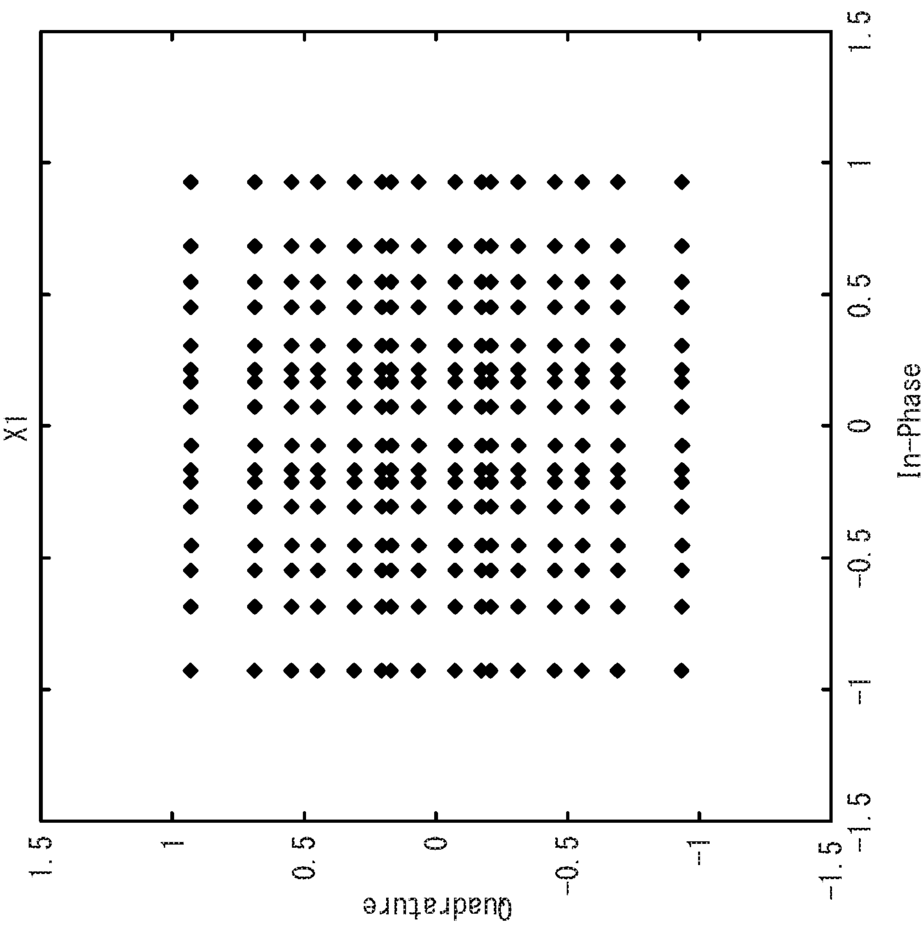
FIG. 94 illustrates an example of a signal point arrangement for 16-QAM and QPSK in the I-Q plane.

When the precoding matrix F, which is a precoding matrix used in the scheme for regularly performing phase change after precoding, is represented by formula G3 and when 16-QAM is applied as the modulation scheme of both s1 and s2, formula 37 is suitable as the value of α, as is described in Embodiment 1. When α is represented by formula 37, z1(*t*) and z2(*t*) each are baseband signals corresponding to one of the 256 signal points in the I-Q plane, as illustrated in FIG. 94. Note that FIG. 94 illustrates an example of the arrangement of the 256 signal points, and the arrangement may be a phase-rotated arrangement of the 256 signal points.

Here, since the modulation scheme applied to s1 is 16-QAM and the modulation scheme applied to s2 is also 16-QAM, the weighted and phase-changed signals z1(*t*) and z2(*t*) are each transmitted as 4 bits according to 16-QAM. Therefore a total of 8 bits are transferred as is indicated by the 256 signals points illustrated in FIG. 94. In such a case, since the minimum Euclidian distance between the signal points is comparatively large, the reception quality of data received by the reception unit is improved.

The baseband signal switcher 9301 receives the precoded signal 309A(z1(*t*)), the precoded and phase-changed signal 309B(z2(*t*)), and the control signal 8500 as input. Since 16-QAM is applied as the modulation scheme of both s1 and s2, the control signal 8500 indicates "do not perform switching of signals". Thus, the precoded signal 309A(z1(*t*)) is output as the signal 9302A(r1(*t*)) and the precoded and phase-changed signal 309B(z2(*t*)) is output as the signal 9302B(r2(*t*)).

Subsequently, explanation is provided concerning the operation of each of the units in FIG. 116 in a case where QPSK is applied as the modulation scheme for s1 and 16-QAM is applied as the modulation scheme for s2.

Let s1(*t*) be the (mapped) baseband signal for the modulation scheme QPSK. The mapping scheme for s1(*t*) is as shown in FIG. 81, and h is as represented by formula 78. Since s2($t$) is the (mapped) baseband signal for the modulation scheme 16-QAM, the mapping scheme for s2($t$) is as shown in FIG. 80, and g is as represented by formula 79.

The power changer (8501A) receives the baseband signal (mapped signal) 307A mapped according to the modulation scheme QPSK, and the control signal (8500) as input. Further, the power changer (8501A) multiplies the baseband signal (mapped signal) 307A mapped according to the modulation scheme QPSK by a factor v, and outputs the signal obtained as a result of the multiplication (the power-changed signal: 8502A). The factor v is a value for performing power change and is set according to the control signal (8500).

The power changer (8501B) receives a (mapped) baseband signal 307B for the modulation scheme 16-QAM and a control signal (8500) as input. Letting a value for power change set based on the control signal (8500) be u, the power changer outputs a signal (power-changed signal: 8502B) obtained by multiplying the (mapped) baseband signal 307B for the modulation scheme 16-QAM by u.

In Embodiment F1, description is provided that one exemplary example is where "the ratio between the average power of QPSK and the average power of 16-QAM is set so as to satisfy the formula $v^2$: $u^2$=1:5". (By making such an arrangement, data is received at an excellent reception quality by the reception device.) In the following, explanation is provided of the scheme for regularly performing phase change after precoding when such an arrangement is made.

The weighting unit 600 receives the power-changed signal 8502A (the signal obtained by multiplying the baseband signal (mapped signal) 307A mapped with the modulation scheme QPSK by the factor v), the power-changed signal 8502B (the signal obtained by multiplying the baseband signal (mapped signal) 307B mapped with the modulation scheme 16-QAM by the factor u) and the information 315 regarding the signal processing scheme as input. Further, the weighting unit 600 performs precoding according to the information 315 regarding the signal processing scheme, and outputs the precoded signal 309A(z1($t$)) and the precoded signal 316B(z2'($t$)).

Here, when F represents a precoding matrix used in the scheme for regularly performing phase change after precoding and y(t) represents the phase change values, the following formula holds.

[Math. 97]

$$\begin{pmatrix} z1(t) \\ z2(t) \end{pmatrix} = \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} v & 0 \\ 0 & u \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} v & 0 \\ 0 & \sqrt{5}\,v \end{pmatrix} \begin{pmatrix} s1(t) \\ s2(t) \end{pmatrix} \quad \text{(formula G5)}$$

Note that y(t) is an imaginary number having the absolute value of 1 (i.e. $y[i]=e^{j\theta}$).

When the precoding matrix F, which is a precoding matrix according to the precoding scheme for regularly performing phase change after precoding, is represented by formula G3 and when 16-QAM is applied as the modulation scheme of both s1 and s2, formula 37 is suitable as the value of a, as is described. The reason for this is explained in the following.

Figure 95:
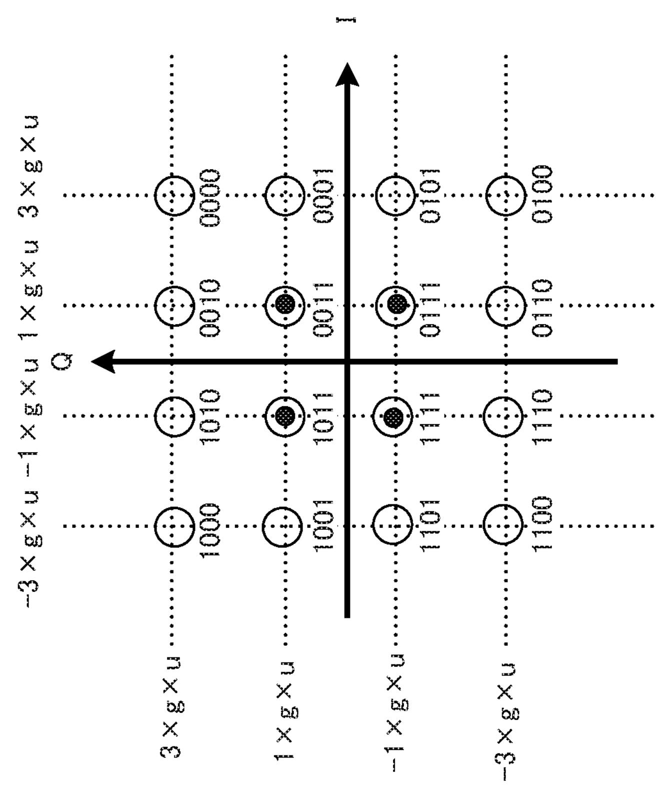
FIG. 95 illustrates an example of a signal point arrangement for 16-QAM and QPSK in the I-Q plane.

FIG. 95 illustrates the relationship between the 16 signal points of 16-QAM and the 4 signal points of QPSK on the I-Q plane when the transmission state is as described in the above. In FIG. 95, each ○ indicates a signal point of 16-QAM, and each ● indicates a signal point of QPSK. As can be seen in FIG. 95, four signal points among the 16 signal points of the 16-QAM coincide with the 4 signal points of the QPSK. Under such circumstances, when the precoding matrix F, which is a precoding matrix used in the scheme for regularly performing phase change after precoding, is represented by formula G3 and when formula 37 is the value of a, each of z1($t$) and z2($t$) is a baseband signal corresponding to 64 signal points extracted from the 256 signal points illustrated in FIG. 94 of a case where the modulation scheme applied to s1 is 16-QAM and the modulation scheme applied to s2 is 16-QAM. Note that FIG. 94 illustrates an example of the arrangement of the 256 signal points, and the arrangement may be a phase-rotated arrangement of the 256 signal points.

Since QPSK is the modulation scheme applied to s1 and 16-QAM is the modulation scheme applied to s2, the weighted and phase-changed signals z1($t$) and z2($t$) are respectively transmitted as 2 bits according to QPSK, and 4 bits according to 16-QAM. Therefore a total of 6 bits are transferred as is indicated by the 64 signals points. Since the minimum Euclidian distance between the 64 signal points as described in the above is comparatively large, the reception quality of the data received by the reception device is improved.

The baseband signal switcher 9301 receives the precoded signal 309A(z1($t$)), the precoded and phase-changed signal 309B(z2($t$)), and the control signal 8500 as input. Since QPSK is the modulation scheme for s1 and 16-QAM is the modulation scheme for s2 and thus, the control signal 8500 indicates "perform switching of signals", the baseband signal switcher 9301 performs, for instance, the following:

When time is 2k (k is an integer), outputs the precoded signal 309A(z1(2k)) as the signal 9302A(r1(2k)), and outputs the precoded signal 309B(z2(2k)) as the precoded and phase-changed signal 9302B(r2(2k)), When time is 2k+1 (k is an integer), outputs the precoded and phase-changed signal 309B(z2(2k+1)) as the signal 9302A(r1(2k+1)), and outputs the precoded signal 309A(z1(2k+1)) as the signal 9302B(r2(2k+1)), and further, When time is 2k (k is an integer), outputs the precoded signal 309B(z2(2k)) as the signal 9302A(r1(2k)), and outputs the precoded signal 309A(z1(2k)) as the precoded and phase-changed signal 9302B(r2(2k)), When time is 2k+1 (k is an integer), outputs the precoded signal 309A(z1(2k+1)) as the signal 9302A(r1(2k+1)), and outputs the precoded and phase-changed signal 309B(z2(2k+1)) as the signal 9302B(r2(2k+1)).

Note that, in the above, description is made that switching of signals is performed when QPSK is the modulation scheme applied to s1 and 16-QAM is the modulation scheme applied to s2. By making such an arrangement, the reduction of PAPR is realized and further, the electric consumption by the transmission unit is suppressed, as description has been provided in Embodiment F1. However, when the electric consumption by the transmission device need not be taken into account, an arrangement may be made such that switching of signals is not performed similarly to the case where 16-QAM is applied as the modulation scheme for both s1 and s2.

Additionally, description has been provided in the above on a case where QPSK is the modulation scheme applied to s1 and 16-QAM is the modulation scheme applied to s2, and further, the condition $v^2$: $u^2$=1:5 is satisfied, since such a case is considered to be exemplary. However, there exists a case where excellent reception quality is realized when (i) the scheme for regularly performing phase change after precoding when QPSK is the modulation scheme applied to s1 and 16-QAM is the modulation scheme applied to s2 and (ii) the scheme for regularly performing phase change after precoding when 16-QAM is the modulation scheme applied to s1 and 16-QAM is the modulation scheme applied to s2 are considered as being identical under the condition $v^2<u^2$. Thus, the condition to be satisfied by values v and u is not limited to $v^2$: $u^2$=1:5.

By considering (i) the scheme for regularly performing phase change after precoding when QPSK is the modulation scheme applied to s1 and 16-QAM is the modulation scheme applied to s2 and (ii) the scheme for regularly performing phase change after precoding when 16-QAM is the modulation scheme applied to s1 and 16-QAM is the modulation scheme applied to s2 to be identical as explained in the above, the reduction of circuit size is realized. Further, in such a case, the reception device performs demodulation according to formulas G4 and G5, and to the scheme of switching between signals, and since signal points coincide as explained in the above, the sharing of a single arithmetic unit computing reception candidate signal points is possible, and thus, the circuit size of the reception device can be realized to a further extent.

Note that, although description has been provided in the present embodiment taking the formula G3 as an example of the scheme for regularly performing phase change after precoding, the scheme for regularly performing phase change after precoding is not limited to this.

The essential points of the present invention are as described in the following:

When both the case where QPSK is the modulation scheme applied to s1 and 16-QAM is the modulation scheme applied to s2 and the case where 16-QAM is the modulation scheme applied for both s1 and s2 are supported, the same scheme for regularly performing phase change after precoding is applied in both cases.

The condition $v^2=u^2$ holds when 16-QAM is the modulation scheme applied for both s1 and s2, and the condition $v^2<u^2$ holds when QPSK is the modulation scheme applied to s1 and 16-QAM is the modulation scheme applied to s2

Further, examples where excellent reception quality of the reception device is realized are described in the following.

Example 1 (the following two conditions are to be satisfied):

The condition $v^2=u^2$ holds when 16-QAM is the modulation scheme applied for both s1 and s2, and the condition $v^2:u^2$=1:5 holds when QPSK is the modulation scheme applied to s1 and 16-QAM is the modulation scheme applied to s2, and The same scheme for regularly performing phase change after precoding is applied in both of cases where 16-QAM is the modulation scheme applied for both s1 and s2 and QPSK is the modulation scheme applied to s1 and 16-QAM is the modulation scheme applied to s2.

Example 2 (the following two conditions are to be satisfied):

The condition $v^2=u^2$ holds when 16-QAM is the modulation scheme applied for both s1 and s2, and the condition $v^2<u^2$ holds when QPSK is the modulation scheme applied to s1 and 16-QAM is the modulation scheme applied to s2, and When both the case where QPSK is the modulation scheme applied to s1 and 16-QAM is the modulation scheme applied to s2 and the case where 16-QAM is the modulation scheme applied for both s1 and s2 are supported, the same scheme for regularly performing phase change after the precoding is applied in both cases, and the precoding matrices are represented by formula G3.

Example 3 (the following two conditions are to be satisfied):

The condition $v^2=u^2$ holds when 16-QAM is the modulation scheme applied for both s1 and s2, and the condition $v^2<u^2$ holds when QPSK is the modulation scheme applied to s1 and 16-QAM is the modulation scheme applied to s2, and When both the case where QPSK is the modulation scheme applied to s1 and 16-QAM is the modulation scheme applied to s2 and the case where 16-QAM is the modulation scheme applied for both s1 and s2 are supported, the same scheme for regularly performing phase change after the precoding is applied in both cases, and the precoding matrices are represented by formula G3, and a is represented by formula 37.

Example 4 (the following two conditions are to be satisfied):

The condition $v^2=u^2$ holds when 16-QAM is the modulation scheme applied for both s1 and s2, and the condition $v^2:u^2$=1:5 holds when QPSK is the modulation scheme applied to s1 and 16-QAM is the modulation scheme applied to s2.

When both the case where QPSK is the modulation scheme applied to s1 and 16-QAM is the modulation scheme applied to s2 and the case where 16-QAM is the modulation scheme applied for both s1 and s2 are supported, the same scheme for regularly performing phase change after the precoding is applied in both cases, and the precoding matrices are represented by formula G3, and a is represented by formula 37.

Note that, although the present embodiment has been described with an example where the modulation schemes are QPSK and 16-QAM, the present embodiment is not limited to this example. The scope of the present embodiment may be expanded as described below. Consider a modulation scheme A and a modulation scheme B. Let a be the number of a signal point on the I-Q plane of the modulation scheme A, and let b be the number of signal points on the I-Q plane of the modulation scheme B, where $a<b$. Then, the essential points of the present invention are described as follows.

The following two conditions are to be satisfied.

If the case where the modulation scheme of s1 is the modulation scheme A and the modulation scheme of s2 is the modulation scheme B, and the case where the modulation scheme of s1 is the modulation scheme B and the modulation scheme of s2 is the modulation scheme B are both supported, the same scheme is used in common in both the cases for regularly performing phase change after precoding.

When the modulation scheme of s1 is the modulation scheme B and the modulation scheme of s2 is the modulation scheme B, the condition $v^2=u^2$ is satisfied, and when the modulation scheme of s1 is the modulation scheme A and the modulation scheme of s2 is the modulation scheme B, the condition $v^2<u^2$ is satisfied.

Here, the baseband signal switching as described with reference to FIG. 93 may be optionally executed. However, when the modulation scheme of s1 is the modulation scheme A and the modulation scheme of s2 is the modulation scheme B, it is preferable to perform the above-described baseband signal switching with the influence of the PAPR taken into account.

Alternatively, the following two conditions are to be satisfied.

If the case where the modulation scheme of s1 is the modulation scheme A and the modulation scheme of s2 is the modulation scheme B, and the case where the modulation scheme of s1 is the modulation scheme B and the modulation scheme of s2 is the modulation scheme B are both supported, the same scheme is used in common in both the cases for regularly performing phase change after precoding, and the precoding matrices are presented by formula G3.

When the modulation scheme of s1 is the modulation scheme B and the modulation scheme of s2 is the modulation scheme B, the condition $v^2=u^2$ is satisfied, and when the modulation scheme of s1 is the modulation scheme A and the modulation scheme of s2 is the modulation scheme B, the condition $v^2<u^2$ is satisfied.

Here, the baseband signal switching as described with reference to FIG. 93 may be optionally executed. However, when the modulation scheme of s1 is the modulation scheme A and the modulation scheme of s2 is the modulation scheme B, it is preferable to perform the above-described baseband signal switching with the influence of the PAPR taken into account.

As an exemplary set of the modulation scheme A and the modulation scheme B, (modulation scheme A, modulation scheme B) is one of (QPSK, 16-QAM), (16-QAM, 64-QAM), (64-QAM, 128QAM), and (64-QAM, 256-QAM).

Although the above explanation is given for an example where phase change is performed on one of the signals after precoding, the present invention is not limited to this. As described in this Description, even when phase change is performed on a plurality of precoded signals, the present embodiment is applicable. If this is the case, the relationship between the modulated signal set and the precoding matrices (the essential points of the present invention).

Further, although the present embodiment has been described on the assumption that the precoding matrices F are represented by formula G3, the present invention is not limited to this. For example, any one of the following may be used:

[Math. 98]

$$F=\frac{1}{\sqrt{\alpha^2+1}}\begin{pmatrix}\alpha\times e^{j0} & e^{j\pi}\\ e^{j0} & \alpha\times e^{j0}\end{pmatrix} \quad \text{(formula G6)}$$

[Math. 99]

$$F=\frac{1}{\sqrt{\alpha^2+1}}\begin{pmatrix}e^{j0} & \alpha\times e^{j\pi}\\ \alpha\times e^{j0} & e^{j0}\end{pmatrix} \quad \text{(formula G7)}$$

[Math. 100]

$$F=\frac{1}{\sqrt{\alpha^2+1}}\begin{pmatrix}\alpha\times e^{j0} & e^{j0}\\ e^{j0} & \alpha\times e^{j\pi}\end{pmatrix} \quad \text{(formula G8)}$$

[Math. 101]

$$F=\frac{1}{\sqrt{\alpha^2+1}}\begin{pmatrix}e^{j\theta_{11}} & \alpha\times e^{j(\theta_{11}+\lambda)}\\ \alpha\times e^{j\theta_{21}} & e^{j(\theta_{21}+\lambda+\pi)}\end{pmatrix} \quad \text{(formula G9)}$$

-continued

[Math. 102]

$$F=\frac{1}{\sqrt{\alpha^2+1}}\begin{pmatrix}\alpha\times e^{j\theta_{11}} & e^{j(\theta_{11}+\lambda+\pi)}\\ e^{j\theta_{21}} & \alpha\times e^{j(\theta_{21}+\lambda)}\end{pmatrix} \quad \text{(formula G10)}$$

Note that $\theta_{11}$, $\theta_{21}$ and $\lambda$ in formulas G9 and G10 are fixed values (radians).

Although description is provided in the present invention taking as an example a case where switching between phase change values is performed in the time domain, the present invention may be similarly embodied when using a multi-carrier transmission scheme such as OFDM or the like and when switching between phase change values in the frequency domain, as description has been made in other embodiments. If this is the case, t used in the present embodiment is to be replaced with f (frequency ((sub) carrier)). Further, the present invention may be similarly embodied in a case where switching between phase change values is performed in the time-frequency domain. Note that, in the present embodiment, the scheme for regularly performing phase change after precoding is not limited to the scheme for regularly performing phase change after precoding as described in this Description.

Furthermore, in any one of the two patterns of setting the modulation scheme according to the present embodiment, the reception device performs demodulation and detection using the reception scheme described in Embodiment F1.

Embodiment I1

In the present embodiment, description is provided on a signal processing scheme in which phase change is performed on precoded signals in the case where 8QAM (8 Quadrature Amplitude Modulation) is used as the modulation scheme for s1 and s2.

Figure 96:
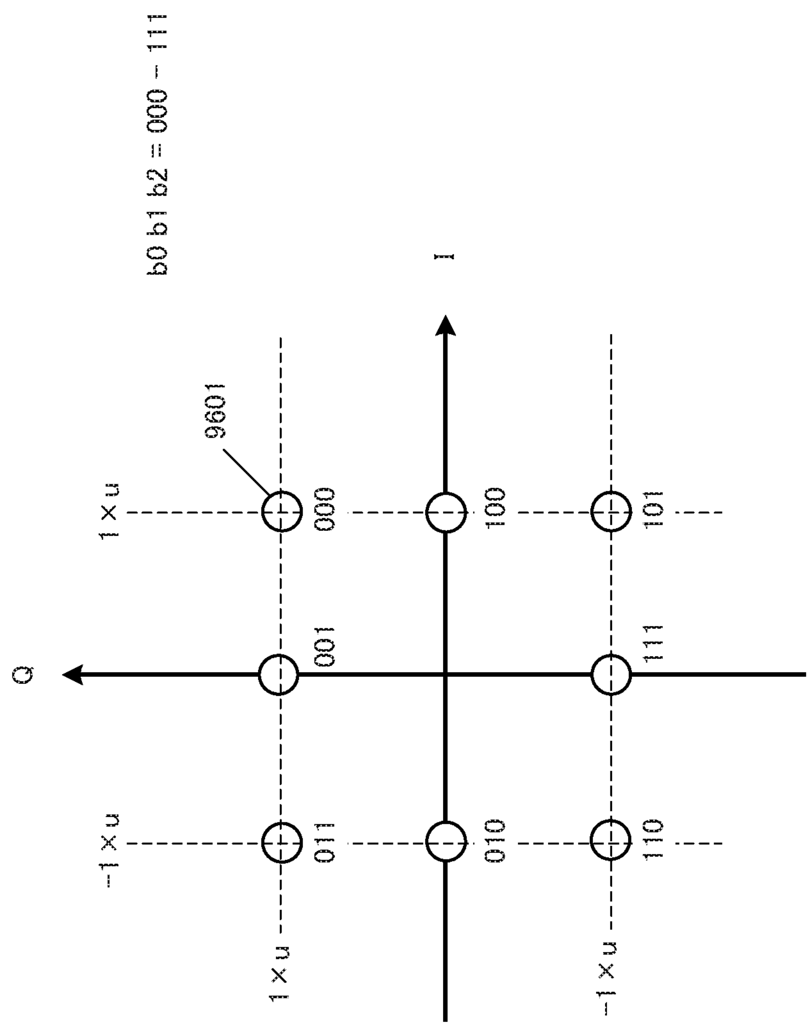
FIG. 96 illustrates an example of a signal point arrangement for 8-QAM in the I-Q plane.

The present embodiment relates to the mapping scheme for 8QAM which is used for the case where the signal processing scheme described in Embodiment 1 and so on is applied in which phase change is performed on precoded signals. In the present embodiment, 8QAM is used as the modulation scheme for s1(*t*) and s2(*t*) in the signal processing scheme described in Embodiment 1 and so on in which phase change is performed after precoding (weighting) shown in FIG. 6. FIG. 96 illustrates a signal point arrangement for 8QAM in the I-Q plane (I: in-phase; Q: quadrature). In FIG. 96, in the case where an average (transmission) power is set to z, the value of u in FIG. 96 is given by formula #I1.

[Math. 103]

$$u=z\times\sqrt{\frac{2}{3}} \quad \text{(formula \#I1)}$$

Note that a coefficient to be used for the case where the average power is set to z for QPSK is represented by Formula 78. Also, a coefficient to be used for the case where the average power is set to z for 16-QAM is represented by Formula 79. Furthermore, a coefficient to be used for the case where the average power is set to z for 64-QAM is represented by Formula 85. A transmission device can select, as the modulation scheme, any of QPSK, 16-QAM, 64-QAM, and 8QAM. In order to equalize the average power for 8QAM with the average power for QPSK, 16-QAM, and 64-QAM, formula #I1 is important.

In FIG. 96, when b0, b1, b2=000 is satisfied where b0, b1, and b2 are three bits to be transmitted, a signal point 9601 is selected. Values of the coordinates I and Q (I=1×u, Q=1×u) corresponding to the signal point 9601 are an in-phase component I and a quadrature component Q for 8QAM, respectively. When b0, b1, and b2 are 001 to 111, an in-phase component I and a quadrature component Q for 8QAM are similarly generated.

Subsequently, description is provided on the signal processing scheme in which phase change is performed on precoded signals in the case where 8QAM is used as the modulation scheme for s1 and s2.

The configuration of the signal processing scheme relating to the present embodiment in which phase change is performed on precoded signals is as described in Embodiment 1 and so on with reference to FIG. 6. The present embodiment is characterized in that, in FIG. 6, 8QAM is used as the modulation scheme for the mapped signals 307A (s1(*t*)) and 307B (s2(*t*)).

Then, the weighting unit 600 shown in FIG. 6 performs precoding. A precoding matrix F for precoding to be used here is represented by for example any of formulas G3, G6, G7, G8, G9, and G10 described in Embodiment G2. Note that these precoding matrices are just examples, and matrices represented by other formulas may be used as the precoding matrix.

Next, description is provided on an example of an appropriate value of a in the case where a precoding matrix represented by any of formulas G3, G6, G7, G8, G9, and G10 is used.

As described in Embodiment 1, signals on which precoding and phase change have been performed are represented as z1(*t*) and z2(*t*) (t: time) as shown in FIG. 6. Here, z1(*t*) and z2(*t*) are signals having the same frequency (the same (sub) carrier), and are transmitted from separate antennas. (Note that although the description is provided here using an example of signals in the time domain, z1(*f*) and z2(*f*) (f denotes (sub) carrier) may be transmitted from separate antennas as described in other embodiments. In this case, z1(*f*) and z2(*f*) are signals at the same time point, and are transmitted from separate antennas.)

Also, z1(*t*) and z2(*t*) are each a signal resulting from weighting of signals modulated by 8QAM. Accordingly, since three bits are transmitted by 8QAM, and as a result six bits in total are transmitted in two groups, there exist 64 signal points as long as signal points do not coincide with each other.

Figure 97:
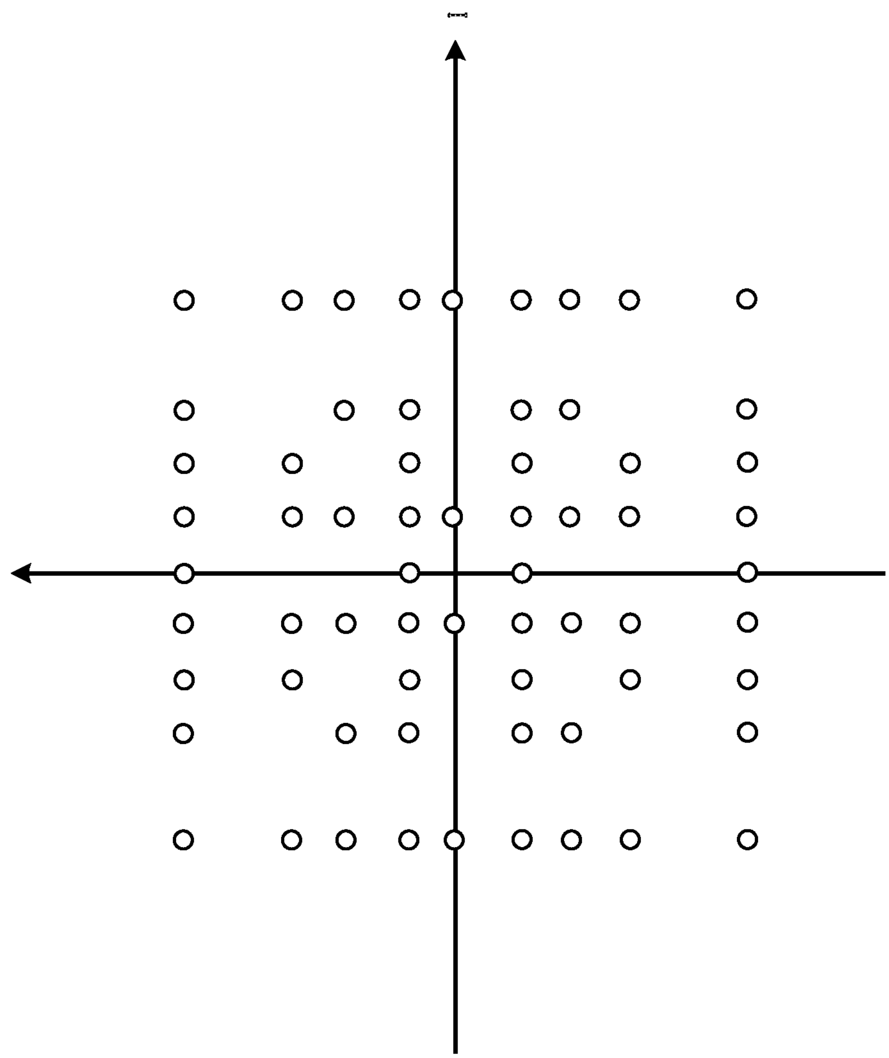
FIG. 97 illustrates an example of a signal point arrangement in the I-Q plane.

FIG. 97 shows an example of a signal point arrangement in the I-Q plane (I: in-phase; Q: quadrature) of the precoded signals z1(*t*) and z2(*t*) where α=3/2 (or 2/3) is satisfied as an example of an appropriate value of α in the case where a precoding matrix represented by any of formulas G3, G6, G7, G8, G9, and G10 is used. As shown in FIG. 97, when α=3/2 (or 2/3) is satisfied, there is often the case where the distance between each two neighboring signal points is substantially uniform. Accordingly, 64 signal points are densely laid out in the I-Q plane (I: in-phase; Q: quadrature).

Here, z1(*t*) and z2(*t*) are transmitted from separate antennas as shown in FIG. 5. Assume a state where one of the two signals transmitted from the two transmission antennas is not propagated to a reception device of a terminal. In FIG. 97, there occurs no degeneration of signal points (the number of signal points does not fall below 64), and 64 signal points are densely laid out in the I-Q plane (I: in-phase; Q: quadrature). This exhibits, in the reception device, an effect of excellent data reception quality as a result of detection and error correction.

Figure 98:
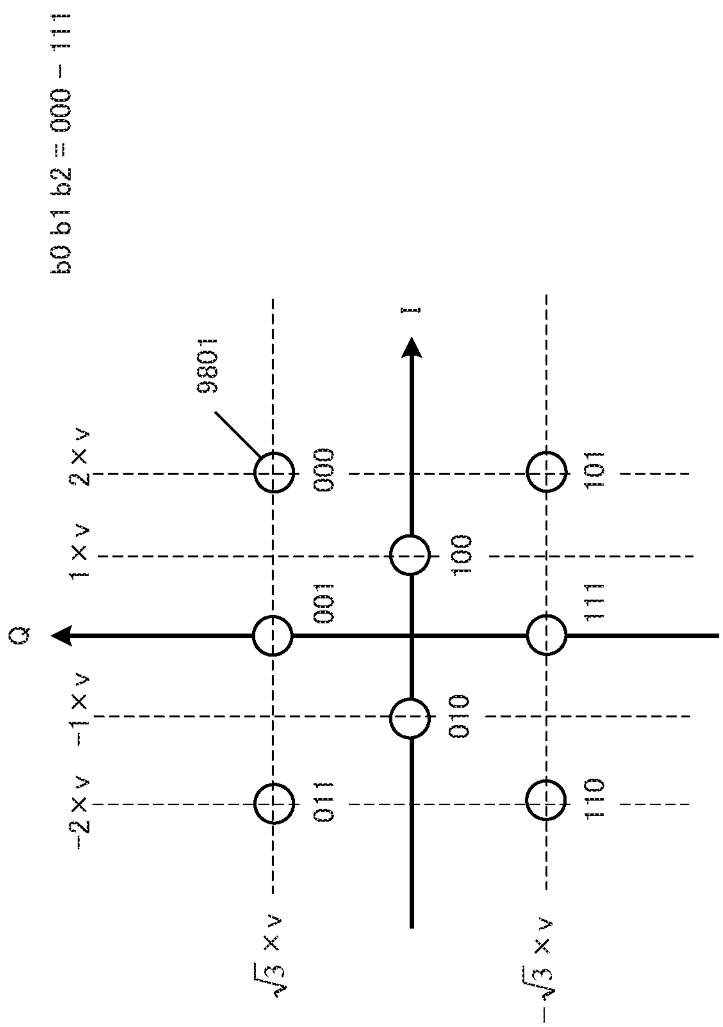
FIG. 98 illustrates an example of a signal point arrangement for 8-QAM in the I-Q plane.

Next, description is provided on a signal point arrangement for 8QAM which differs from that in FIG. 96. 8QAM is used as the modulation scheme for s1(*t*) and s2(*t*) in the signal processing scheme described in Embodiment 1 and so on in which phase change is performed after precoding (weighting) shown in FIG. 6. FIG. 98 shows a signal point arrangement for 8QAM in the I-Q plane (I: in-phase; Q: quadrature) which differs from that in FIG. 96.

In FIG. 98, in the case where an average transmission power is set to z, the value of v in FIG. 98 is given by formula #12.

[Math. 104]

$$v = z \times \frac{2}{\sqrt{11}} \qquad \text{(formula \#I2)}$$

Note that a coefficient to be used for the case where the average power is set to z for QPSK is represented by Formula 78. Also, a coefficient to be used for the case where the average power is set to z for 16-QAM is represented by Formula 79. Furthermore, a coefficient to be used for the case where the average power is set to z for 64-QAM is represented by Formula 85. The transmission device can select, as the modulation scheme, any of QPSK, 16-QAM, 64-QAM, and 8QAM. In order to equalize the average power for 8QAM with the average power for QPSK, 16-QAM, and 64-QAM, formula #12 is important.

In FIG. 98, when b0, b1, b2=000 is satisfied where b0, b1, and b2 are three bits to be transmitted, a point 9801 is selected as a signal point. Values of the coordinates I and Q (I=2×v, Q=2×v) corresponding to the signal point 9801 are an in-phase component I and a quadrature component Q for 8QAM, respectively. When b0, b1, and b2 are 001 to 111, an in-phase component I and a quadrature component Q for 8QAM are similarly generated.

Subsequently, description is provided on the signal processing scheme in which phase change is performed on precoded signals in the case where 8QAM shown in FIG. 98 is used as the modulation scheme for s1 and s2.

The configuration of the signal processing scheme relating to the present embodiment in which phase change is performed on precoded signals is as described in Embodiment 1 and so on with reference to FIG. 6. The characteristic feature of this case is that, in FIG. 6, 8QAM shown in FIG. 98 is used as the modulation scheme for the mapped signals 307A (s1(*t*)) and 307B (s2(*t*)).

Then, the weighting unit 600 shown in FIG. 6 performs precoding. A precoding matrix F for precoding to be used here is represented by for example any of formulas G3, G6, G7, G8, G9, and G10 described in Embodiment G2. Note that these precoding matrices are just examples, and matrices represented by other formulas may be used as the precoding matrix.

Next, description is provided on an example of an appropriate value of a in the case where a precoding matrix represented by any of formulas G3, G6, G7, G8, G9, and G10 is used.

As described in Embodiment 1, signals on which precoding and phase change have been performed are represented as z1(*t*) and z2(*t*) (t: time) as shown in FIG. 6. Here, z1(*t*) and z2(*t*) are signals having the same frequency (the same (sub) carrier), and are transmitted from separate antennas. (Note that although the description is provided here using an example of signals in the time domain, z1(*f*) and z2(*f*) (f denotes (sub) carrier) may be transmitted from separate antennas as described in other embodiments. In this case, z1(*f*) and z2(*f*) are signals at the same time point, and are transmitted from separate antennas.)

Also, z1(*t*) and z2(*t*) are each a signal resulting from weighting of signals modulated by 8QAM. Accordingly, since three bits are transmitted by 8QAM, and as a result six bits in total are transmitted in two groups, there exist 64 signal points as long as signal points do not coincide with each other.

Figure 99:
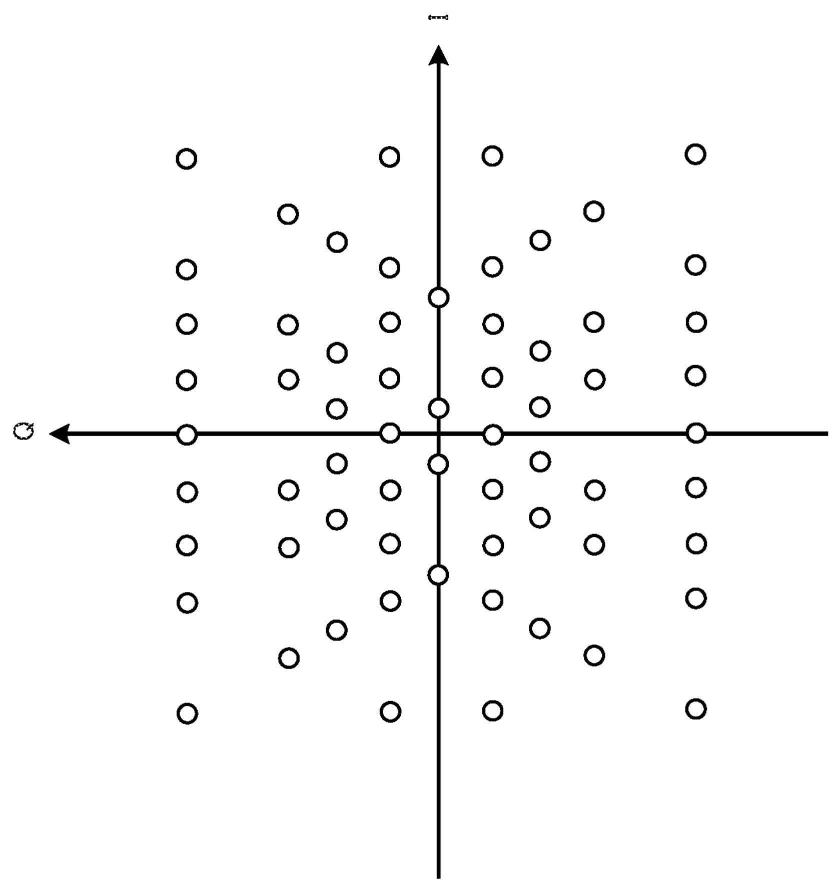
FIG. 99 illustrates an example of a signal point arrangement in the I-Q plane.

FIG. 99 shows an example of a signal point arrangement in the I-Q plane (I: in-phase; Q: quadrature) of the precoded signals z1(*t*) and z2(*t*) where α=3/2 (or 2/3) is satisfied as an example of an appropriate value of a in the case where a precoding matrix represented by any of formulas G3, G6, G7, G8, G9, and G10 is used. As shown in FIG. 99, when α=3/2 (or 2/3) is satisfied, there is often the case where the distance between each two neighboring signal points is substantially uniform. Accordingly, 64 signal points are densely laid out in the I-Q plane (I: in-phase; Q: quadrature).

Here, z1(*t*) and z2(*t*) are transmitted from separate antennas as shown in FIG. 5. Assume a state where one of the two signals transmitted from the two transmission antennas is not propagated to a reception device of a terminal. In FIG. 99, there occurs no degeneration of signal points (the number of signal points does not fall below 64), and 64 signal points are densely laid out in the I-Q plane (I: in-phase; Q: quadrature). This exhibits, in the reception device, an effect of excellent data reception quality as a result of detection and error correction.

Note that the phase changing scheme applied by the phase changer 317B shown in FIG. 6 is as described in other embodiments of the present description.

Next, description is provided on operations of the reception device relating to the present embodiment.

In the case where precoding and phase change shown in FIG. 6 described above are performed, the relationship given by formula #13 is derived from FIG. 5.

[Math. 105]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} s1(t) \\ s2(t) \end{pmatrix} \quad \text{(formula \#I3)}$$

Note that F denotes precoding matrices, and y(t) denotes phase changing values. The reception device performs demodulation (detection) by using the relationship between r1(*t*), r2(*t*) and s1(*t*), s2(*t*) described above (in the same manner as described in Embodiment 1 and so on). Note that the above formulas do not take into consideration such distortion components as noise components, frequency offsets, and channel estimation errors, and thus, the demodulation (detection) is performed with such distortion components included in the signals. Therefore, demodulation (detection) is performed based on received signals, values obtained from channel estimation, precoding matrices, and phase changing values. Note that a value resulting from the detection may be either a hard decision value (result "0" or "1") or a soft decision value (log-likelihood or log-likelihood ratio), and error-correction decoding is performed based on the value resulting from the detection.

In the present embodiment, the description has been provided using an example of the case where the phase changing value is switched in the time domain. Alternatively, as described in other embodiments, the present invention may be similarly embodied even in the case where a multi-carrier transmission scheme such as OFDM is used and the phase changing value is switched in the frequency domain. In these cases, t used in the present embodiment is replaced with f (frequency ((sub) carrier)).

Accordingly, in the case where the phase changing value is switched in the time domain, z1(*t*) and z2(*t*) at the same time point are transmitted from separate antennas at the same frequency. On the other hand, in the case where the phase changing value is switched in the frequency domain, z1(*f*) and z2(*f*) at the same frequency (the same subcarrier) are transmitted from separate antennas at the same time point. Furthermore, the present invention may be similarly embodied in the case where the phase changing value is switched in the time-frequency domain, as described in other embodiments.

Also, as shown in FIG. 13, reordering may be performed on the signals z1(*t*) and z2(*t*) (or z1(*f*) and z2(*f*), or z1(*t,f*) and z2(*t,f*)) (for example, in units of symbols).

Embodiment 12

In the present embodiment, description is provided on a signal processing scheme, which differs from that in Embodiment I1, in which phase change is performed on precoded signals in the case where 8QAM (8 Quadrature Amplitude Modulation) is used as the modulation scheme for the modulated signals s1 and s2.

The present embodiment relates to the mapping scheme for 8QAM which is used for the case where the signal processing scheme described in Embodiment G2 and so on is applied in which phase change is performed on precoded signals. FIG. 100 shows the configuration of the signal processing scheme relating to the present embodiment in which phase change is performed on precoded (weighted) signals. In FIG. 100, elements that operate in a similar way to FIG. 93 bear the same reference signs.

In FIG. 100, 8QAM is used as the modulation scheme for s1(*t*) and s2(*t*). FIG. 96 shows a signal point arrangement for 8QAM in the I-Q plane (I: in-phase; Q: quadrature). In FIG. 96, in the case where an average (transmission) power is set to z, the value of u in FIG. 96 is given by formula #I1.

Note that a coefficient to be used for the case where the average power is set to z for QPSK is represented by Formula 78. Also, a coefficient to be used for the case where the average power is set to z for 16-QAM is represented by Formula 79. Furthermore, a coefficient to be used for the case where the average power is set to z for 64-QAM is represented by Formula 85. The transmission device can select, as the modulation scheme, any of QPSK, 16-QAM, 64-QAM, and 8QAM. In order to equalize the average power for 8QAM with the average power for QPSK, 16-QAM, and 64-QAM, formula #I1 is important.

In FIG. 96, when b0, b1, b2=000 is satisfied where b0, b1, and b2 are three bits to be transmitted, a signal point 9601 is selected. Values of the coordinates I and Q (I=1×u, Q=1×u) corresponding to the signal point 9601 are an in-phase component I and a quadrature component Q for 8QAM, respectively. When b0, b1, and b2 are 001 to 111, an in-phase component I and a quadrature component Q for 8QAM are similarly generated.

Subsequently, description is provided on the signal processing scheme in which phase change is performed on precoded signals in the case where 8QAM is used as the modulation scheme for the signals s1 and s2.

The configuration of the signal processing scheme relating to the present embodiment in which phase change is performed on precoded signals is as shown in FIG. 100. The present embodiment is characterized in that, in FIG. 100, 8QAM is used as the modulation scheme for the mapped signals 307A (s1(*t*)) and 307B (s2(*t*)).

Then, the weighting unit 600 shown in FIG. 100 performs precoding. A matrix F for precoding to be used here is for example any of formulas G3, G6, G7, G8, G9, and G10 described in Embodiment G2. Note that these precoding matrices are just examples, and matrices given by other formulas may be used as precoding matrices.

The weighting unit 600 shown in FIG. 100 outputs precoded signals 309A (z1(*t*)) and 316B (z2'(*t*)). In the present embodiment, phase change is performed on the precoded signal 316B (z2'(*t*)). Accordingly, the phase changer 317B shown in FIG. 100 receives the precoded signal 316B (z2'(*t*)) as input, and performs phase change on the precoded signal 316B (z2'(*t*)), and outputs a post-phase-change signal 309B (z2(*t*)).

Then, the baseband signal switcher 9301 shown in FIG. 100 receives the precoded signal 309A (z1(*t*)) and the post-phase-change signal 309B (z2(*t*)) as input, performs baseband signal switching (selection of the set of output baseband signals), and outputs baseband signals 9302A (r1(*t*)) and 9302B (r2(*t*)).

The following describes a configuration scheme for the baseband signals 9302A (r1(*t*)) and 9302B (r2(*t*)), with reference to FIG. 101 and FIG. 102.

FIG. 101 shows an example of a power changing value and a configuration scheme for r1(*t*) and r2(*t*) to be set at each of times t=0 through t=11. As shown in FIG. 101, three phase changing values, namely, y[0], y[1], and y[2] are prepared as phase changing values for the phase changer 317B shown in FIG. 100. Then, as shown in FIG. 101, the phase changer 317B switches between phase changing values with a period (cycle) of three.

As the set of (r1(*t*), r2(*t*)), the set (z1(*t*), z2(*t*)) or the set (z2(*t*), z1(*t*)) is selected. In FIG. 101, the set of (r1(*t*), r2(*t*)) is as follows.

(r1(*t*=0), r2 (t=0))=(z1 (t=0), z2 (t=0))
(r1(*t*=1), r2 (t=1))=(z1 (t=1), z2 (t=1))
(r1(*t*=2), r2 (t=2))=(z1 (t=2), z2 (t=2))
(r1(*t*=3), r2 (t=3))=(z2 (t=3), z1(*t*=3))
(r1(*t*=4), r2 (t=4))=(z2 (t=4), z1(*t*=4))
(r1(*t*=5), r2 (t=5))=(z2 (t=5), z1(*t*=5))
.
.
.

The characteristic feature of this case is that when the phase changing value y[i] (i=0, 1, 2) is selected, (r1(*t*), r2(*t*))=(z1(*t*), z2(*t*)) or (r1(*t*), r2(*t*))=(z2(*t*), z1(*t*)) is satisfied. Therefore, as shown in FIG. 101, when taking phase change and baseband signal switching (selection of the set of output baseband signals) into consideration, the period (cycle) for phase change is six which is twice the above period (cycle) for phase change set to three.

In FIG. 101, the period (cycle) for phase change is three. Alternatively, the characteristic feature of the present embodiment may be as follows. In the case where the period (cycle) for phase change is set to N, "when the phase changing value y[i] is selected (where i=0, 1, 2, . . . , N−2, N−1 (i denotes an integer that satisfies 0≤i≤N−1)), (r1(*t*), r2(*t*))=(z1(*t*), z2(*t*)) or (r1(*t*), r2(*t*))=(z2(*t*), z1(*t*)) is satisfied". When taking phase change and baseband signal switching (selection of the set of output baseband signals) into consideration, the period (cycle) for phase change is 2×N which is twice the above period (cycle) for phase change set to N. The baseband signal switcher 9301 shown in FIG. 100 performs selection of the set of output baseband signals in this way.

FIG. 102 shows an example, which differs from that in FIG. 101, of a power changing value and a configuration scheme for r1(*t*) and r2(*t*) to be set at each of times t=0 through t=11. In FIG. 102, the following is satisfied similarly to in FIG. 101: "In the case where the period (cycle) for phase change is set to N, when the phase changing value y[i] is selected (where i=0, 1, 2, . . . , N−2, N−1 (i denotes an integer that satisfies 0≤i≤N−1)), (r1(*t*), r2(*t*))=(z1(*t*), z2(*t*)) or (r1(*t*), r2(*t*))=(z2(*t*), z1(*t*)) is satisfied. When taking phase change and baseband signal switching (selection of the set of output baseband signals) into consideration, the period (cycle) for phase change is 2×N which is twice the above period (cycle) for phase change set to N". Note that the power changing value and the configuration scheme for r1(*t*) and r2(*t*) are not limited to those of the examples shown in FIG. 101 and FIG. 102. As long as the above conditions are satisfied, the reception device achieves excellent data reception quality.

Next, description is provided on an example of an appropriate value of a in the case where a precoding matrix represented by any of formulas G3, G6, G7, G8, G9, and G10 is used.

Signals on which precoding and phase change have been performed are represented as z1(*t*) and z2(*t*) (t denotes time) as shown in FIG. 100. Here, z1(*t*) and z2(*t*) are signals having the same frequency and (the same (sub) carrier), and are transmitted from separate antennas. (Note that although the description is provided here using an example of signals in the time domain, z1(*f*) and z2(*f*) (f denotes (sub) carrier) may be transmitted from separate antennas as described in other embodiments. In this case, z1(*f*) and z2(*f*) are signals at the same time point, and are transmitted from separate antennas.)

Also, z1(*t*) and z2(*t*) are each a signal resulting from weighting of signals modulated by 8QAM. Accordingly, since three bits are transmitted by 8QAM, and as a result six bits in total are transmitted in two groups, there exist 64 signal points as long as signal points do not coincide with each other.

FIG. 97 shows an example of a signal point arrangement in the I-Q plane (I: in-phase; Q: quadrature) of the precoded signals z1(*t*) and z2(*t*) where α=3/2 (or 2/3) is satisfied as an example of an appropriate value of a in the case where a precoding matrix represented by any of formulas G3, G6, G7, G8, G9, and G10 is used. As shown in FIG. 97, when α=3/2 (or 2/3) is satisfied, there is often the case where the distance between each two neighboring signal points is substantially uniform. Accordingly, 64 signal points are densely laid out in the I-Q plane (I: in-phase; Q: quadrature).

Here, z1(*t*) and z2(*t*) are converted to r1(*t*) and r2(*t*), respectively, and then are transmitted from separate antennas as shown in FIG. 5. Assume a state where one of the two signals transmitted from the two transmission antennas is not propagated to a reception device of a terminal. In FIG. 97, there occurs no degeneration of signal points (the number of signal points does not fall below 64), and 64 signal points are densely laid out in the I-Q plane (I: in-phase; Q: quadrature). This exhibits, in the reception device, an effect of excellent data reception quality as a result of detection and error correction.

Next, description is provided on a signal point arrangement for 8QAM which differs from that in FIG. 96. 8QAM is used as the modulation scheme for s1 and s2 in the signal processing scheme in which phase change is performed after precoding (weighting) shown in FIG. 100. FIG. 98 shows a signal point arrangement for 8QAM in the I-Q plane (I: in-phase; Q: quadrature) which differs from that in FIG. 96.

In FIG. 98, in the case where an average transmission power is set to z, the value of v in FIG. 98 is given by formula #12.

Note that a coefficient to be used for the case where the average power is set to z for QPSK is represented by Formula 78. Also, a coefficient to be used for the case where the average power is set to z for 16-QAM is represented by Formula 79. Furthermore, a coefficient to be used for the case where the average power is set to z for 64-QAM is represented by Formula 85. The transmission device can select, as the modulation scheme, any of QPSK, 16-QAM, 64-QAM, and 8QAM. In order to equalize the average power for 8QAM with the average power for QPSK, 16-QAM, and 64-QAM, formula #12 is important.

In FIG. 98, when b0, b1, b2=000 is satisfied where b0, b1, and b2 are three bits to be transmitted, the point 9801 is selected as a signal point. Values of the coordinates I and Q (I=2×v, Q=2×v) corresponding to the signal point 9801 are an in-phase component I and a quadrature component Q for 8QAM, respectively. When b0, b1, and b2 are 001 to 111, an in-phase component I and a quadrature component Q for 8QAM are similarly generated.

Subsequently, description is provided on the signal processing scheme in which phase change is performed on precoded signals in the case where 8QAM shown in FIG. 98 is used as the modulation scheme for s1 and s2.

The configuration of the signal processing scheme relating to the present embodiment in which phase change is performed on precoded signals is as shown in FIG. 100. The present embodiment is characterized in that, in FIG. 100, 8QAM shown in FIG. 98 is used as the modulation scheme for the mapped signals 307A (s1(*t*)) and 307B (s2(*t*)).

Then, the weighting unit 600 shown in FIG. 100 performs precoding. A matrix F for precoding to be used here is for example any of formulas G3, G6, G7, G8, G9, and G10 described in Embodiment G2. Note that these precoding matrices are just examples, and matrices represented by other formulas may be used as precoding matrices.

The weighting unit 600 shown in FIG. 100 outputs precoded signals 309A (z1(*t*)) and 316B (z2'(*t*)). In the present embodiment, phase change is performed on the precoded signal 316B (z2'(*t*)). Accordingly, the phase changer 317B shown in FIG. 100 receives the precoded signal 316B (z2'(*t*)) as input, and performs phase change on the precoded signal 316B (z2'(*t*)), and outputs a post-phase-change signal 309B (z2(*t*)).

Then, the baseband signal switcher 9301 shown in FIG. 100 receives the precoded signal 309A (z1(*t*)) and the post-phase-change signal 309B (z2(*t*)) as input, performs baseband signal switching (selection of the set of output baseband signals), and outputs baseband signals 9302A (r1(*t*)) and 9302B (r2(*t*)).

The following describes a configuration scheme for the baseband signals 9302A (r1(*t*)) and 9302B (r2(*t*)), with reference to FIG. 101 and FIG. 102.

FIG. 101 shows an example of a power changing value and a configuration scheme for r1(*t*) and r2(*t*) to be set at each of times t=0 through t=11. As shown in FIG. 101, three phase changing values, namely, y[0], y[1], and y[2] are prepared as phase changing values for the phase changer 317B shown in FIG. 100. Then, as shown in FIG. 101, the phase changer 317B switches between phase changing values with a period (cycle) of three.

As the set of (r1(*t*), r2(*t*)), the set (z1(*t*), z2(*t*)) or the set (z2(*t*), z1(*t*)) is selected. In FIG. 101, the set of (r1(*t*), r2(*t*)) is as follows.

(r1(*t*=0), r2 (t=0))=(z1 (t=0), z2(*t*=0))
(r1(*t*=1), r2 (t=1))=(z1 (t=1), z2(*t*=1))
(r1(*t*=2), r2 (t=2))=(z1 (t=2), z2(*t*=2))
(r1(*t*=3), r2 (t=3))=(z2 (t=3), z1(*t*=3))
(r1(*t*=4), r2 (t=4))=(z2 (t=4), z1(*t*=4))
(r1(*t*=5), r2 (t=5))=(z2 (t=5), z1(*t*=5))
.
.
.

The characteristic feature of this case is that when the phase changing value y[i] (i=0, 1, 2) is selected, (r1(*t*), r2(*t*))=(z1(*t*), z2(*t*)) or (r1(*t*), r2(*t*))=(z2(*t*), z1(*t*)) is satisfied. Therefore, as shown in FIG. 101, when taking phase change and baseband signal switching (selection of the set of output baseband signals) into consideration, the period (cycle) for phase change is six which is twice the above period (cycle) for phase change set to three.

In FIG. 101, the period (cycle) for phase change is three. Alternatively, the characteristic feature of the present embodiment may be as follows. In the case where the period (cycle) for phase change is set to N, "when the phase changing value y[i] is selected (where i=0, 1, 2, . . . , N−2, N−1 (i denotes an integer that satisfies 0≤i≤N−1)), (r1(*t*), r2(*t*))=(z1(*t*), z2(*t*)) or (r1(*t*), r2(*t*))=(z2(*t*), z1(*t*)) is satisfied". When taking phase change and baseband signal switching (selection of the set of output baseband signals) into consideration, the period (cycle) for phase change is 2×N which is twice the above period (cycle) for phase change set to N. The baseband signal switcher 9301 shown in FIG. 100 performs selection of the set of output baseband signals in this way.

FIG. 102 shows an example, which differs from that in FIG. 101, of a power changing value and a configuration scheme for r1(*t*) and r2(*t*) to be set at each of times t=0 through t=11. In FIG. 102, the following is satisfied similarly to in FIG. 101: "In the case where the period (cycle) for phase change is set to N, when the phase changing value y[i] is selected (where i=0, 1, 2, . . . , N−2, N−1 (i denotes an integer that satisfies 0≤i≤N−1)), (r1(*t*), r2(*t*))=(z1(*t*), z2(*t*)) or (r1(*t*), r2(*t*))=(z2(*t*), z1(*t*)) is satisfied. When taking phase change and baseband signal switching (selection of the set of output baseband signals) into consideration, the period (cycle) for phase change is 2×N which is twice the above period (cycle) for phase change set to N". Note that the power changing value and the configuration scheme for r1(*t*) and r2(*t*) are not limited to those of the examples shown in FIG. 101 and FIG. 102. As long as the above conditions are satisfied, the reception device achieves excellent data reception quality.

Next, description is provided on an example of an appropriate value of a in the case where a precoding matrix represented by any of formulas G3, G6, G7, G8, G9, and G10 is used.

Signals on which precoding and phase change have been performed are represented as z1(*t*) and z2(*t*) (t denotes time) as shown in FIG. 100. Here, z1(*t*) and z2(*t*) are signals having the same frequency and (the same (sub) carrier), and are transmitted from separate antennas. (Note that although the description is provided here using an example of signals in the time domain, z1(*f*) and z2(*f*) (f denotes (sub) carrier) may be transmitted from separate antennas as described in other embodiments. In this case, z1($f$) and z2($f$) are signals at the same time point, and are transmitted from separate antennas.)

Also, z1($t$) and z2($t$) are each a signal resulting from weighting of signals modulated by 8QAM. Accordingly, since three bits are transmitted by 8QAM, and as a result six bits in total are transmitted in two groups, there exist 64 signal points as long as signal points do not coincide with each other.

FIG. 99 shows an example of a signal point arrangement in the I-Q plane (I: in-phase; Q: quadrature) of the precoded signals z1($t$) and z2($t$) where $\alpha$=3/2 (or 2/3) is satisfied as an example of an appropriate value of $\alpha$ in the case where a precoding matrix represented by any of formulas G3, G6, G7, G8, G9, and G10 is used. As shown in FIG. 99, when $\alpha$=3/2 (or 2/3) is satisfied, there is often the case where the distance between each two neighboring signal points is substantially uniform. Accordingly, 64 signal points are densely laid out in the I-Q plane (I: in-phase; Q: quadrature).

Here, z1($t$) and z2($t$) are converted to r1($t$) and r2($t$), respectively, and then are transmitted from separate antennas as shown in FIG. 5. Assume a state where one of the two signals transmitted from the two transmission antennas is not propagated to a reception device of a terminal. In FIG. 99, there occurs no degeneration of signal points (the number of signal points does not fall below 64), and 64 signal points are densely laid out in the I-Q plane (I: in-phase; Q: quadrature). This exhibits, in the reception device, an effect of excellent data reception quality as a result of detection and error correction.

Note that the phase changing scheme applied by the phase changer 317B shown in FIG. 100 is as described in other embodiments of the present description.

Next, description is provided on operations of the reception device relating to the present embodiment.

In the case where precoding and phase change shown in FIG. 100 described above are performed, the relationship given by one of formulas #14 and #15 is derived from FIG. 5.

[Math. 106]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} s1(t) \\ s2(t) \end{pmatrix} \qquad \text{(formula \#I4)}$$

[Math. 107]

$$\begin{pmatrix} r2(t) \\ r1(t) \end{pmatrix} = \begin{pmatrix} h21(t) & h22(t) \\ h11(t) & h12(t) \end{pmatrix} \begin{pmatrix} 1 & 0 \\ 0 & y(t) \end{pmatrix} F \begin{pmatrix} s1(t) \\ s2(t) \end{pmatrix} \qquad \text{(formula \#I5)}$$

Note that F denotes precoding matrices, y(t) denotes phase changing values, and r1($t$), r2($t$) is identical with r1($t$), r2($t$) shown in FIG. 5. The reception device performs demodulation (detection) by using the relationship between r1($t$), r2($t$) and s1($t$), s2($t$) described above (in the same manner as described in Embodiment 1 and so on). Note that the above formulas do not take into consideration such distortion components as noise components, frequency offsets, and channel estimation errors, and thus, the demodulation (detection) is performed with such distortion components included in the signals. Therefore, demodulation (detection) is performed based on received signals, values obtained from channel estimation, precoding matrices, and phase changing values. Note that a value resulting from the detection may be either a hard decision value (result "0" or "1") or a soft decision value (log-likelihood or log-likelihood ratio), and error-correction decoding is performed based on the value resulting from the detection.

In the present embodiment, the description has been provided using an example of the case where the phase changing value is switched in the time domain. Alternatively, as described in other embodiments, the present invention may be similarly embodied even in the case where a multi-carrier transmission scheme such as OFDM is used and the phase changing value is switched in the frequency domain. In these cases, t used in the present embodiment is replaced with f (frequency ((sub) carrier)).

Accordingly, in the case where the phase changing value is switched in the time domain, z1($t$) and z2($t$) at the same time point are transmitted from separate antennas at the same frequency. On the other hand, in the case where the phase changing value is switched in the frequency domain, z1($f$) and z2($f$) at the same frequency (the same subcarrier) are transmitted from separate antennas at the same time point. Furthermore, the present invention may be similarly embodied in the case where the phase changing value is switched in the time-frequency domain, as described in other embodiments.

Also, as shown in FIG. 13, reordering may be performed on the signals z1($t$) and z2($t$) (or z1($f$) and z2($f$), or z1($t,f$) and z2($t,f$)) (for example, in units of symbols).

In the present description, the description has been provided using examples of the modulation scheme such as BPSK, QPSK, 8QAM, 16-QAM, and 64-QAM. Alternatively, PAM (Pulse Amplitude Modulation) may be used as the modulation scheme. Also, the signal point arrangement schemes in the I-Q plane for signal points whose number is for example 2, 4, 8, 16, 64, 128, 256, or 1024 (the modulation schemes for signal points whose number is for example 2, 4, 8, 16, 64, 128, 256, or 1024) are not limited to the schemes such as the signal point arrangement scheme for QPSK and the signal point arrangement scheme for 16-QAM. Therefore, the function of outputting in-phase components and quadrature components based on a plurality of bits is served by the mapper. The function of performing precoding and phase change after mapping is an efficient function of the present invention.

Embodiment J1

In Embodiments F1, G1, and G2, the description has been provided on the scheme of performing precoding and phase change in the case where the modulated signals (modulated signals on which precoding and phase change have not been performed) s1 and s2 differ from each other in terms of modulation scheme, especially modulation level.

Also, in Embodiment C1, the description has been provided on the transmission scheme in which phase change is performed on a modulated signal on which precoding has been performed using formula 52.

In the present embodiment, description is provided on the case where the transmission scheme is applied in which phase change is performed on a modulated signal on which precoding has been performed using formula 52 in the case where the modulation schemes for s1 and s2 differ from each other. The description is provided especially on an antenna use scheme which is to be used for the case where the modulation schemes for s1 and s2 differ from each other and the transmission scheme is switched between the transmission scheme in which phase change is performed on a modulated signal on which precoding has been performed using formula 52 and the transmission scheme in which a single modulated signal is transmitted from a single antenna.

Note that the description has already been provided in Embodiments 3 and A1 on switching between the transmission scheme in which precoding and phase change are performed and the transmission scheme in which a single modulated signal is transmitted from a single antenna.

Figure 103:
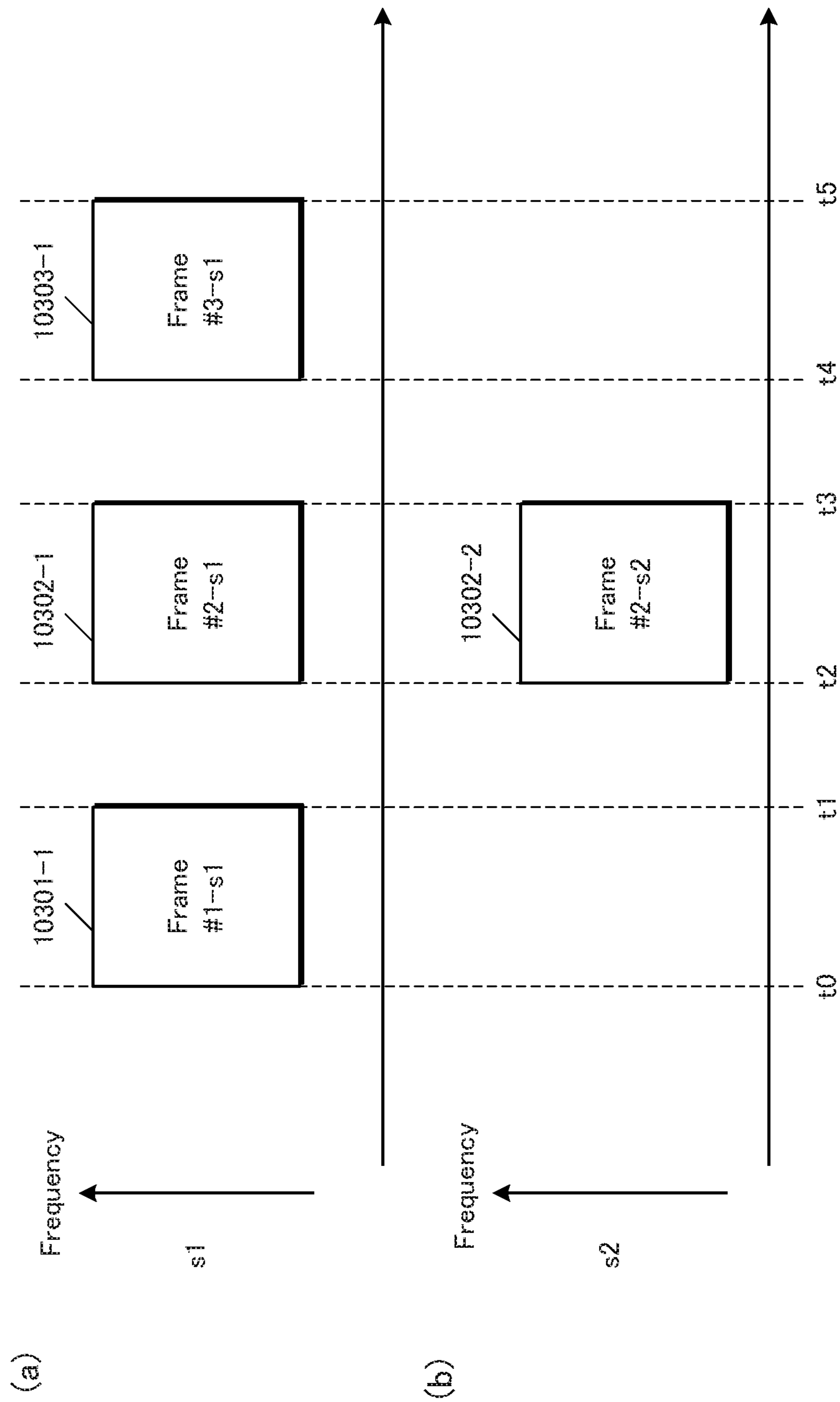
FIG. 103 illustrates a sample frame configuration for each modulated signal.

Consider the case where for example the transmission device shown in FIG. 3, FIG. 4, FIG. 12, and so on switches, with respect to the modulated signals s1 and s2, between the transmission scheme in which precoding and phase change are performed and the transmission scheme in which a single modulated signal is transmitted from a single antenna. FIG. 103 shows the frame configuration in the transmission device shown in FIG. 3, FIG. 4, FIG. 12, and so on in this case. Specifically, FIG. 103 shows an example of the frame configuration of the modulated signal s1 in portion (a) and an example of the frame configuration of the modulated signal s2 in portion (b). In FIG. 103, the horizontal axis represents time, the vertical axis represents frequency, and the same (common) range of frequency band is allocated to the horizontal axis for the modulated signals s1 and s2.

As shown in FIG. 103, in a period from time t0 through time t1, a frame #1-s1 (10301-1) including a symbol for transmitting information is included in the modulated signal s1. Compared with this, in the period from time t0 through time t1, the modulated signal s2 is not transmitted.

In a period from time t2 through time t3, a frame #2-s1 (10302-1) including a symbol for transmitting information is included in the modulated signal s1. Also, in the period from time t2 through time t3, a frame #2-s2 (10302-2) including a symbol for transmitting information is included in the modulated signal s2.

In a period from time t4 through time t5, a frame #3-s1 (10303-1) including a symbol for transmitting information is included in the modulated signal s1. Compared with this, in the period from time t4 through time t5, the modulated signal s2 is not transmitted.

In the present embodiment as described above, the description is provided on the case where precoding using formula 52 and phase change are performed on the modulated signals s1 and s2, which have been each modulated by a different modulation scheme and are to be simultaneously transmitted in the same frequency band. The following describes an example where the different modulation schemes are QPSK and 16-QAM. As described in Embodiments F1, G1, and G2, in the case where a signal modulated by QPSK having an average power of GQPSK and a signal modulated by 16-QAM having an average power of G16-QAM are transmitted after precoding and phase change, the relationship G16-QAM>GQPSK should be satisfied such that the reception device achieves excellent data reception quality.

The signal point arrangement in the I-Q plane, the scheme of changing power (the scheme of setting power changing value), the scheme of setting average power, which relate to QPSK, are as described in Embodiments F1, G1, and G2. Also, the signal point arrangement in the I-Q plane, the scheme of changing power (the scheme of setting power changing value), the scheme of setting average power, which relate to 16-QAM, are as described in Embodiments F1, G1, and G2.

In the case where precoding using formula 52 and phase change are performed on the modulated signals s1 and s2, which are to be simultaneously transmitted in the same frequency band, $z\mathbf{1}(t)=u\times s\mathbf{1}(t)$ and $z\mathbf{2}(t)=y(t)\times v\times s\mathbf{2}(t)$ are satisfied as shown in FIG. 85. As a result, a transmit antenna for transmitting $z\mathbf{1}(t)$ has an average transmission power which is equal to the average power of the modulation scheme for $s\mathbf{1}(t)$. Also, a transmit antenna for transmitting $z\mathbf{2}(t)$ has an average transmission power which is equal to the average power of the modulation scheme for $s\mathbf{2}(t)$.

Next, description is provided on the antenna use scheme for use in the case where the modulation schemes for s1 and s2 differ from each other and the transmission scheme is switched between the transmission scheme in which phase change is performed on a modulated signal on which precoding has been performed using formula 52 and the transmission scheme in which a single modulated signal is transmitted from a single antenna. As described above, when the modulated signals s1 and s2 are simultaneously transmitted in the same frequency band, precoding using formula 52 and phase change are performed on the modulated signals s1 and s2. Also, the modulation level of the modulation scheme for the modulated signal s1 differs from the modulation level of the modulation scheme for the modulated signal s2.

Here, an antenna for use in the transmission scheme of transmitting a single modulated signal from a single antenna is referred to as a first antenna. Also, in the case where precoding using formula 52 and phase change are performed on the modulated signals s1 and s2, which differ from each other in terms of modulation level of modulation scheme and are to be simultaneously transmitted in the same frequency band, Ms1>Ms2 is satisfied (where Ms1 denotes the modulation level of the modulation scheme for the modulated signal s1, and Ms2 denotes the modulation level of the modulation scheme for the modulated signal s2). Here, in the case where the transmission scheme is used in which precoding using formula 52 and phase change are performed on the modulated signals s1 and s2 which are to be simultaneously transmitted in the same frequency band, it is proposed that one signal, which is modulated by a modulation scheme whose modulation level is higher than that of the other signal (signal modulated by a modulation scheme whose average power is higher than that of the other signal), be transmitted from the first antenna. The one modulated signal here is the modulated signal s1 on which precoding has been performed, namely, $z\mathbf{1}(t)=u\times s\mathbf{1}(t)$ shown in FIG. 85. Therefore, the following description is provided using an example where 16-QAM is used as the modulation scheme for the modulated signal s1 and QPSK is used as the modulation scheme for the modulated signal s2. Note that, the combination of modulation schemes is not limited to this. For example, the combination of modulation schemes for the modulated signals s1 and s2 may be any of the combinations of 64-QAM and 16-QAM, 256-QAM and 64-QAM, 1024-QAM and 256-QAM, 4096-QAM and 1024-QAM, 64-QAM and QPSK, 256-QAM and 16-QAM, 1024-QAM and 64-QAM, 4096-QAM and 256-QAM, and so on.

Figure 104:
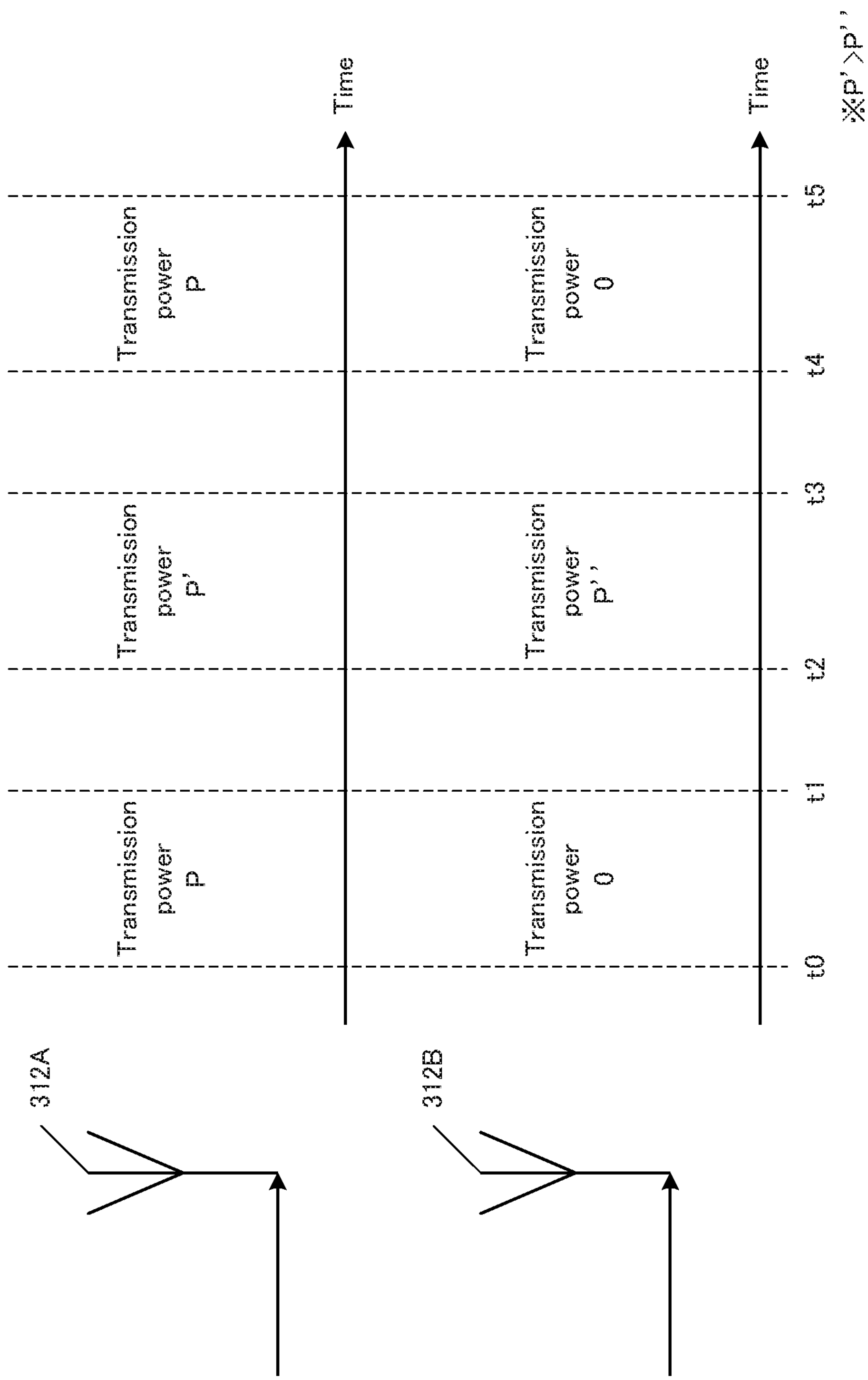
FIG. 104 illustrates an example of switching of transmission power for each modulated signal.

FIG. 104 shows a scheme of switching transmission power for use in the case where the transmission scheme is switched as shown in FIG. 103.

As shown in FIG. 103, in the period from time t0 through time t1, the frame #1-s1 (10301-1) including a symbol for transmitting information is included in the modulated signal s1. Compared with this, in the period from time t0 through time t1, the modulated signal s2 is not transmitted. Therefore, the modulated signal s1 is transmitted from the antenna 312A at transmission power P as shown in FIG. 104. Here, no modulated signal is transmitted from an antenna 312B in the same frequency band as the modulated signal s1. (Note that in the case where a multi-carrier scheme such as OFDM is used, a modulated signal may be transmitted from the antenna 312B in a different frequency band from the modulated signal s1. Also, in the case where a symbol does not include the modulated signal s1, control symbols, preambles, reference symbols, or pilot symbols may be transmitted from the antenna 312B. For this reason, although FIG. 104 shows that the transmission power of the antenna 312B in the period from time t0 to t1 and the period from time t4 through time t5 is zero, there is an exceptional case where symbols are transmitted from the antenna 312B in these periods.)

As shown in FIG. 103, in the period from time t2 through time t3, the frame #2-s1 (10302-1) including a symbol for transmitting information is included in the modulated signal s1. Also, in the period from time t2 through time t3, the frame #2-s2 (10302-2) including a symbol for transmitting information is included in the modulated signal s2. The transmission device applies the transmission scheme in which precoding using formula 52 and phase change are performed. Accordingly, as shown in FIG. 104, the transmission device transmits a modulated signal corresponding to the modulated signal s1 from the antenna 312A at transmission power P'. As described above, 16-QAM is for example used as the modulation scheme for the modulated signal s1. In this case, the transmission device transmits a modulated signal corresponding to the modulated signal s2 from the antenna 312B at transmission power P". As described above, QPSK is for example used as the modulation scheme for the modulated signal s2. As described above, P'>P" is satisfied.

As shown in FIG. 103, in the period from time t4 through time t5, the frame #3-s1 (10301-1) including a symbol for transmitting information is included in the modulated signal s1. Compared with this, in the period from time t4 through time t5, the modulated signal s2 is not transmitted. Therefore, the modulated signal s1 is transmitted from the antenna 312A at transmission power P as shown in FIG. 104. Here, no modulated signal is transmitted from an antenna 312B in the same frequency band as the modulated signal s1. (Note that in the case where a multi-carrier scheme such as OFDM is used, a modulated signal may be transmitted from the antenna 312B in a different frequency band from the modulated signal s1. Also, in the case where a symbol does not include the modulated signal s1, control symbols, preambles, reference symbols, or pilot symbols may be transmitted from the antenna 312B. For this reason, although FIG. 104 shows that the transmission power of the antenna 312B in the period from time t0 through time t1 and the period from time t4 through time t5 is zero, there is an exceptional case where symbols are transmitted from the antenna 312B in these periods.)

The following describes effects exhibited in the case where the antenna use scheme proposed above is applied. In FIG. 104, the transmission power of the antenna 312A is switched in the stated order of P, P', and P (referred to as a first scheme of distributing transmission power). Alternatively, the transmission power of the antenna 312A is switched in the stated order of P, P", and P (referred to as a second scheme of distributing transmission power). Here, the first scheme of distributing transmission power is smaller than the second scheme of distributing transmission power in terms of variation width of transmission power. A transmission power amplifier is provided upstream of each of the antennas 312A and 312B. An advantageous effect is exhibited that a small variation width of transmission power reduces loads on the transmission power amplifier, and this leads to small power consumption. Therefore, the first scheme of distributing transmission power is more preferable. Also, a small variation width of transmission power leads to an effect that the reception device performs easily automatic gain control on received signals.

In FIG. 104, the transmission power is switched in the stated order of zero, P', and zero (referred to as a third scheme of distributing transmission power). Alternatively, the transmission power of the antenna 312B is switched in the stated order of zero, P", and zero (referred to as a fourth scheme of distributing transmission power).

Here, the third scheme of distributing transmission power is smaller than the fourth scheme of distributing transmission power in terms of variation width of transmission power. Similarly as described above, the third scheme of distributing transmission power is more preferable in consideration of reduction in power consumption. Also, a small variation width of transmission power leads to an effect that the reception device performs easily automatic gain control on received signals.

As described above, the proposed antenna use scheme in which the first and third schemes of distributing transmission power are simultaneously performed is a preferable proposed antenna use scheme having the above advantageous effects.

Figure 105:
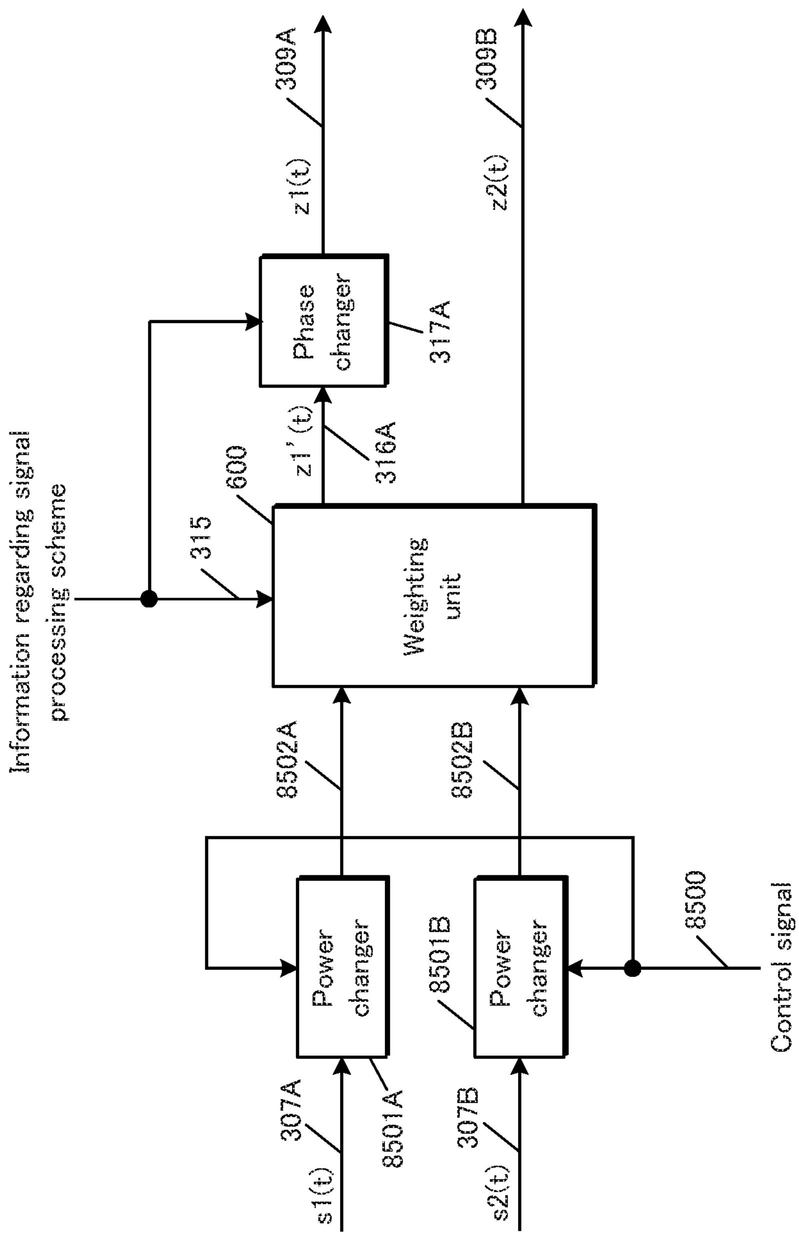
FIG. 105 illustrates an example of a structure of the signal processor pertaining to the weighting unit.

Note that although the phase changer is provided for performing phase change on $z2'(t)$ to obtain $z2(t)$ as shown in FIG. 85, a phase changer may be provided for performing phase change on $z1'(t)$ to obtain $z1(t)$ as shown in FIG. 105. Description is provided below on an implementation scheme in this case.

As described above, the description is provided on the case where precoding using formula 52 and phase change are performed on the modulated signals s1 and s2, which have been each modulated by a different modulation scheme and are to be simultaneously transmitted in the same frequency band. The following describes an example where the different modulation schemes are QPSK and 16-QAM. As described in Embodiments F1, G1, and G2, in the case where a signal modulated by QPSK having an average power of GQPSK and a signal modulated by 16-QAM having an average power of G16-QAM are transmitted after precoding and phase change, the relationship G16-QAM>GQPSK should be satisfied such that the reception device achieves excellent data reception quality.

The signal point arrangement in the I-Q plane, the scheme of changing power (the scheme of setting power changing value), the scheme of setting average power, which relate to QPSK, are as described in Embodiments F1, G1, and G2. Also, the signal point arrangement in the I-Q plane, the scheme of changing power (the scheme of setting power changing value), the scheme of setting average power, which relate to 16-QAM, are as described in Embodiments F1, G1, and G2.

In the case where precoding using formula 52 and phase change are performed on the modulated signals s1 and s2, which are to be simultaneously transmitted in the same frequency band, $z1(t)=y(t)\times u\times s1(t)$ and $z2(t)=v\times s2(t)$ are satisfied as shown in FIG. 105. As a result, a transmit antenna for transmitting $z1(t)$ has an average transmission power which is equal to the average power of the modulation scheme for $s1(t)$. Also, a transmit antenna for transmitting $z2(t)$ has an average transmission power which is equal to the average power of the modulation scheme for $s2(t)$.

Next, description is provided on the antenna use scheme for use in the case where the modulation schemes for s1 and s2 differ from each other and the transmission scheme is switched between the transmission scheme in which phase change is performed on a modulated signal on which precoding has been performed using formula 52 and the transmission scheme in which a single modulated signal is transmitted from a single antenna. As described above, when the modulated signals s1 and s2 are simultaneously transmitted in the same frequency band, precoding using formula 52 and phase change are performed on the modulated signals s1 and s2. Also, the modulation level of the modulation scheme for the modulated signal s1 differs from the modulation level of the modulation scheme for the modulated signal s2.

Here, an antenna for use in the transmission scheme of transmitting a single modulated signal by a single antenna is referred to as a first antenna. Also, in the case where precoding using formula 52 and phase change are performed on the modulated signals s1 and s2, which differ from each other in terms of modulation level of modulation scheme and are to be simultaneously transmitted in the same frequency band, Ms1>Ms2 is satisfied (where Ms1 denotes the modulation level of the modulation scheme for the modulated signal s1, and Ms2 denotes the modulation level of the modulation scheme for the modulated signal s2). Here, in the case where the transmission scheme is used in which precoding using formula 52 and phase change are performed on the modulated signals s1 and s2 which are to be simultaneously transmitted in the same frequency band, it is proposed that one signal, which is modulated by a modulation scheme whose modulation level is higher than that of the other signal (signal modulated by a modulation scheme whose average power is higher than that of the other signal), be transmitted from the first antenna. The one modulated signal here is the modulated signal s1 on which precoding has been performed, namely, $z1(t)=y(t)\times u\times s1(t)$ shown in FIG. 105. Therefore, the following description is provided using an example where 16-QAM is used as the modulation scheme for the modulated signal s1 and QPSK is used as the modulation scheme for the modulated signal s2. Note that, the combination of modulation schemes is not limited to this. For example, the combination of modulation schemes for the modulated signals s1 and s2 may be any of the combinations of 64-QAM and 16-QAM, 256-QAM and 64-QAM, 1024-QAM and 256-QAM, 4096-QAM and 1024-QAM, 64-QAM and QPSK, 256-QAM and 16-QAM, 1024-QAM and 64-QAM, 4096-QAM and 256-QAM, and so on.

FIG. 104 shows a scheme of switching transmission power for use in the case where the transmission scheme is switched as shown in FIG. 103.

As shown in FIG. 103, in the period from time t0 through time t1, the frame #1-s1 (10301-1) including a symbol for transmitting information is included in the modulated signal s1. Compared with this, in the period from time t0 through time t1, the modulated signal s2 is not transmitted. Therefore, the modulated signal s1 is transmitted from the antenna 312A at transmission power P as shown in FIG. 104. Here, no modulated signal is transmitted from an antenna 312B in the same frequency band as the modulated signal s1. (Note that in the case where a multi-carrier scheme such as OFDM is used, a modulated signal may be transmitted from the antenna 312B in a different frequency band from the modulated signal s1. Also, in the case where a symbol does not include the modulated signal s1, control symbols, preambles, reference symbols, or pilot symbols may be transmitted from the antenna 312B. For this reason, although FIG. 104 shows that the transmission power of the antenna 312B in the period from time t0 through time t1 and the period from time t4 through time t5 is zero, there is an exceptional case where symbols are transmitted from the antenna 312B in these periods.)

As shown in FIG. 103, in the period from time t2 through time t3, the frame #2-s1 (10302-1) including a symbol for transmitting information is included in the modulated signal s1. Also, in the period from time t2 through time t3, the frame #2-s2 (10302-2) including a symbol for transmitting information is included in the modulated signal s2. The transmission device applies the transmission scheme in which precoding using formula 52 and phase change are performed. Accordingly, as shown in FIG. 104, the transmission device transmits a modulated signal corresponding to the modulated signal s1 from the antenna 312A at transmission power P'. As described above, 16-QAM is for example used as the modulation scheme for the modulated signal s1. In this case, the transmission device transmits a modulated signal corresponding to the modulated signal s2 from the antenna 312B at transmission power P". As described above, QPSK is for example used as the modulation scheme for the modulated signal s2. As described above, P'>P" is satisfied.

As shown in FIG. 103, in the period from time t4 through time t5, the frame #3-s1 (10303-1) including a symbol for transmitting information is included in the modulated signal s1. Compared with this, in the period from time t4 through time t5, the modulated signal s2 is not transmitted. Therefore, the modulated signal s1 is transmitted from the antenna 312A at transmission power P as shown in FIG. 104. Here, no modulated signal is transmitted from an antenna 312B in the same frequency band as the modulated signal s1. (Note that in the case where a multi-carrier scheme such as OFDM is used, a modulated signal may be transmitted from the antenna 312B in a different frequency band from the modulated signal s1. Also, in the case where a symbol does not include the modulated signal s1, control symbols, preambles, reference symbols, or pilot symbols may be transmitted from the antenna 312B. For this reason, although FIG. 104 shows that the transmission power of the antenna 312B in the period from time t0 through time t1 and the period from time t4 through time t5 is zero, there is an exceptional case where symbols are transmitted from the antenna 312B in these periods.)

The following describes effects exhibited in the case where the antenna use scheme proposed above is applied. In FIG. 104, the transmission power of the antenna 312A is switched in the stated order of P, P', and P (referred to as a first scheme of distributing transmission power). Alternatively, the transmission power of the antenna 312A is switched in the stated order of P, P", and P (referred to as a second scheme of distributing transmission power). Here, the first scheme of distributing transmission power is smaller than the second scheme of distributing transmission power in terms of variation width of transmission power. A transmission power amplifier is provided upstream of each of the antennas 312A and 312B. An advantageous effect is exhibited that a small variation width of transmission power reduces loads on the transmission power amplifier, and this leads to small power consumption. Therefore, the first scheme of distributing transmission power is more preferable. Also, a small variation width of transmission power leads to an effect that the reception device performs easily automatic gain control on received signals.

In FIG. 104, the transmission power of the antenna 312B is switched in the stated order of zero, P', and zero (referred to as a third scheme of distributing transmission power). Alternatively, the transmission power of the antenna 312B is switched in the stated order of zero, P", and zero (referred to as a fourth scheme of distributing transmission power).

Here, the third scheme of distributing transmission power is smaller than the fourth scheme of distributing transmission power in terms of variation width of transmission power. Similarly as described above, the third scheme of distributing transmission power is more preferable in consideration of reduction in power consumption. Also, a small variation width of transmission power leads to an effect that the reception device performs easily automatic gain control on received signals.

As described above, the proposed antenna use scheme in which the first and third schemes of distributing transmission power are simultaneously performed is a preferable proposed antenna use scheme having the above advantageous effects.

Figure 106:
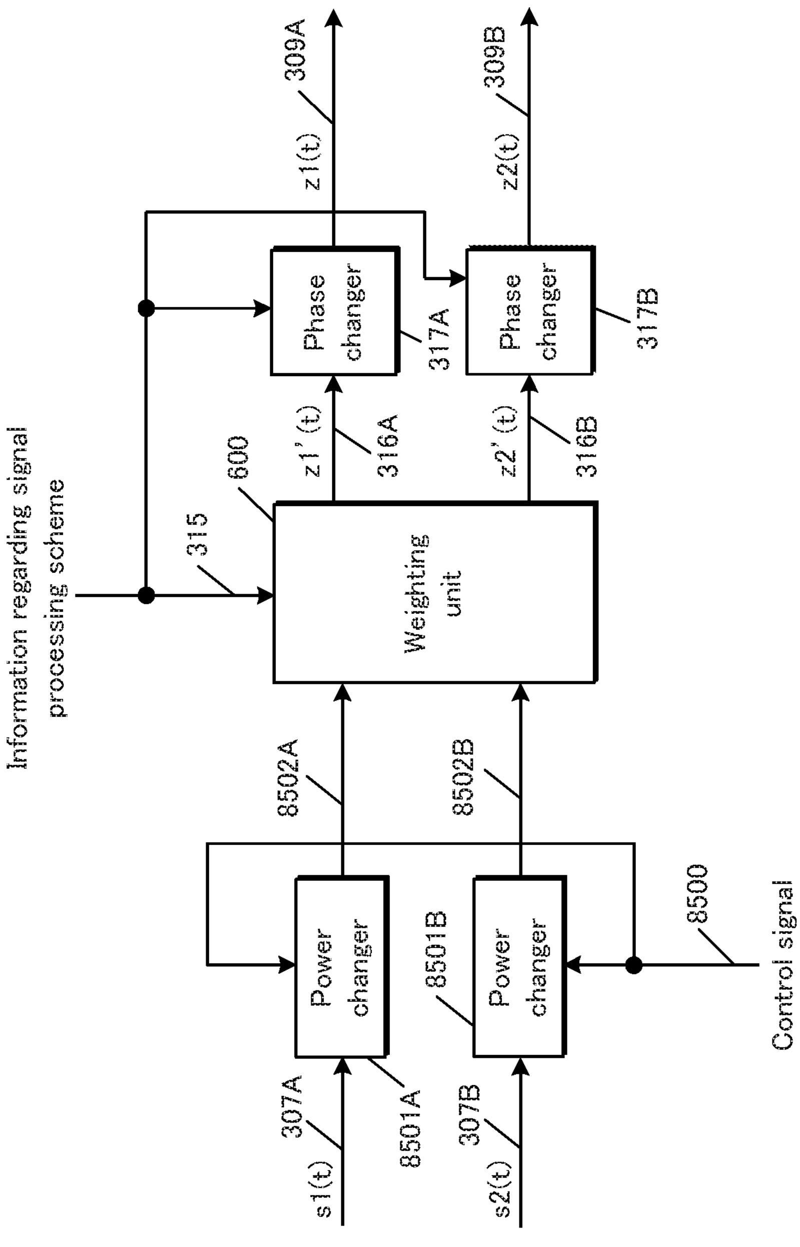
FIG. 106 illustrates an example of a structure of the signal processor pertaining to the weighting unit.

The above description has been provided using the respective two examples shown in FIG. 85 and FIG. 105. In each of the examples, phase change is performed on only one of z1(*t*) and z2(*t*). Alternatively, in the case where the examples shown in FIG. 85 and FIG. 105 are combined and phase change is performed on both z1(*t*) and z2(*t*), the present invention may be similarly embodied to in the above two examples. In this case, as clear from FIG. 85 and FIG. 105, two phase changers, namely a phase changer for z1(*t*) and a phase changer for z2(*t*) are provided. Accordingly, the structure of the signal processor including these phase changers is as shown in FIG. 106. Note that both the phase changers 317A and 317B shown in FIG. 106 may perform phase change at the same time (or at the same frequency (the same carrier)). Alternatively, only the phase changer 317A may perform phase change at the same time (or at the same frequency (the same carrier)). Further alternatively, only the phase changer 317B may perform phase change at the same time (or at the same frequency (the same carrier)). (Note that in the case where no phase change is performed, zx'(t)=zx(t) is satisfied (where x=1, 2)).

Also, in the present embodiment, the description has been provided using the precoding using formula 52 as an example of the precoding performed by the weighting unit 800 shown in FIG. 85, FIG. 105, and FIG. 106. Alternatively, precoding using formulas G3, G6, G7, G8, G9, or G10 may be used. In this case, the value of α in the used formula among formulas G3, G6, G7, G8, G9, and G10 should be set such that the average power of z1(*t*) is greater than the average power of z2(*t*). Furthermore, a precoding matrix represented by formula other than formulas 52, G3, G6, G7, G8, G9, and G10 may be used as long as the average power of z1(*t*) is greater than the average power of z2(*t*).

(Regarding Cyclic Q Delay)

The following describes the application of the Cyclic Q Delay mentioned throughout the present disclosure. Non-Patent Literature 10 describes the overall concept of Cyclic Q Delay. The following describes a specific example of a generation method for the s1 and s2 signals when Cyclic Q Delay is used.

Figure 107:
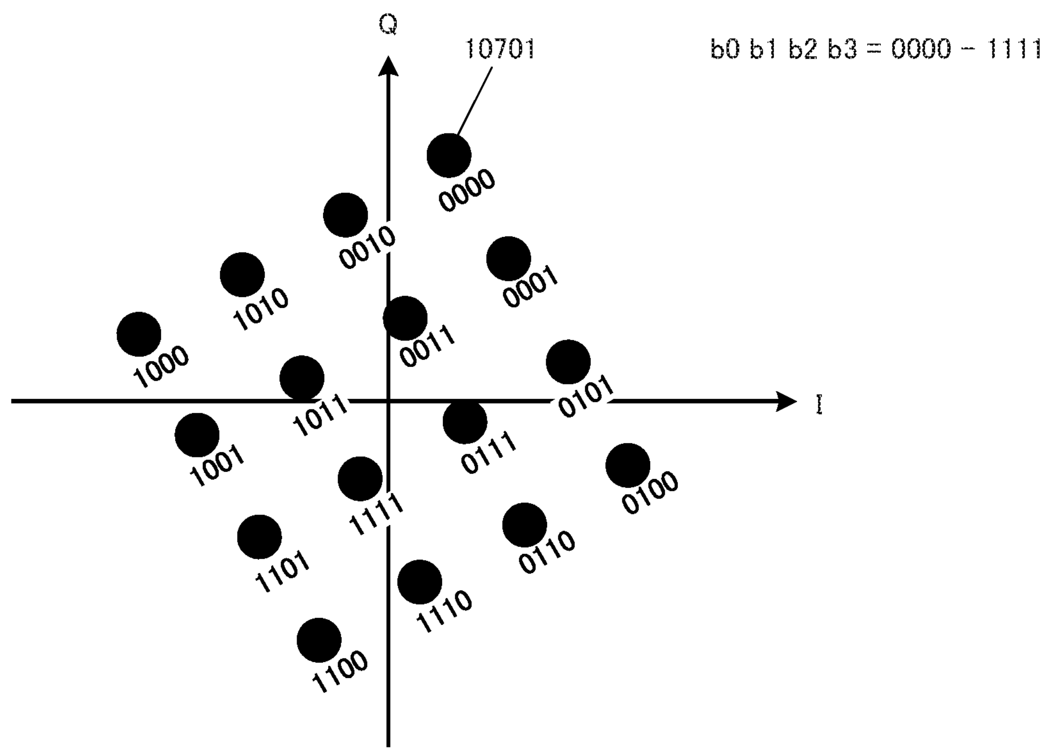
FIG. 107 illustrates an example of signal point arrangement for 16-QAM in the I-Q plane.

FIG. 107 illustrates an example of a signal point arrangement in the I-Q plane when the modulation scheme is 16-QAM. As shown, when the input bits are b0, b1, b2, and b3, the bits take on either a value of 0000 or a value of 1111. For example, when the bits b0, b1, b2, and b3 are to be expressed as 0000, then signal point 10701 of FIG. 107 is selected, a value of the in-phase component based on signal point 10701 is taken as the in-phase component of the baseband signal, and a value of the quadrature component based on signal point 10701 is taken as the quadrature component of the baseband signal. When the bits b0, b1, b2, and b3 are to be expressed as a different value, the in-phase component and the quadrature component of the baseband signal are generated similarly.

Figure 108:
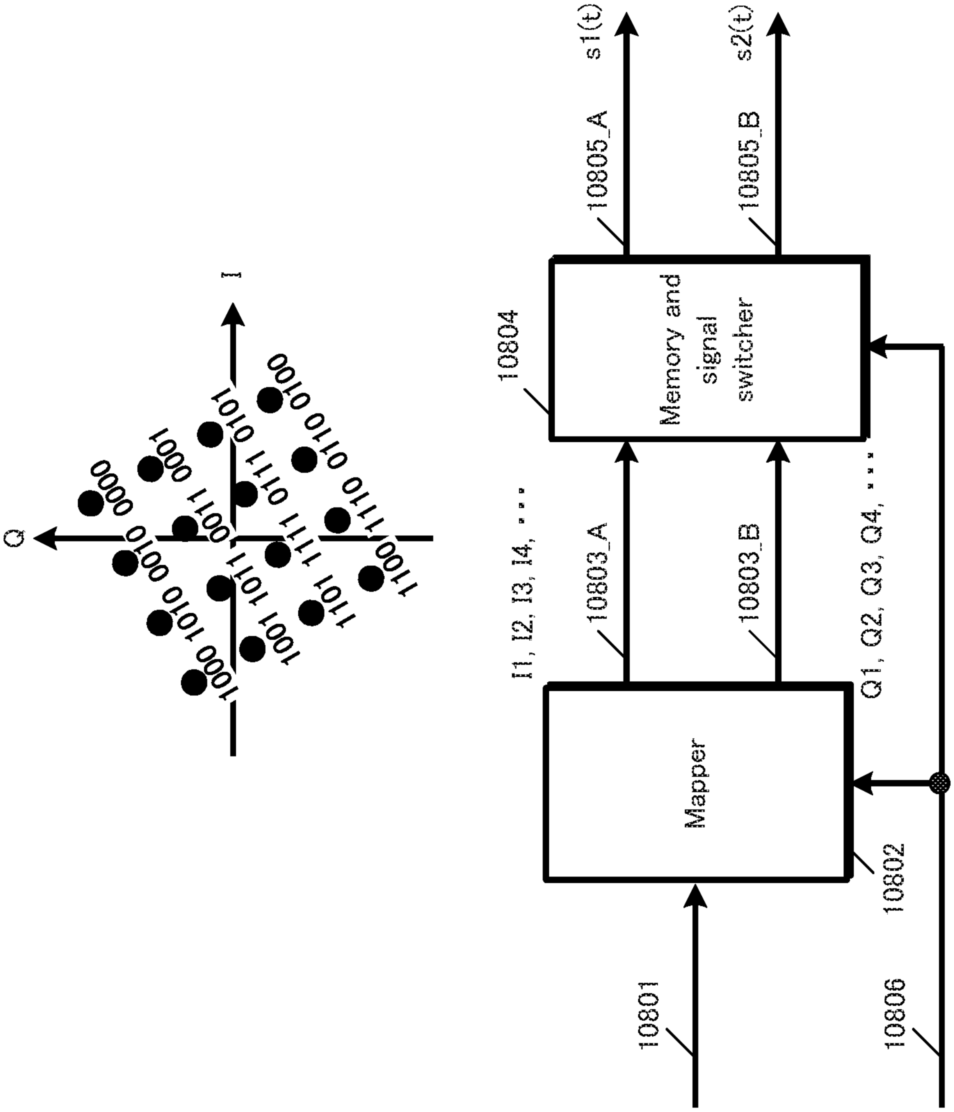
FIG. 108 indicates a sample configuration for a signal generator when cyclic Q delay is applied.

FIG. 108 illustrates a sample configuration of a signal generator for generating modulated signals s1(*t*) (where t is time) (alternatively, s1(*f*), where f is frequency) and s2(*t*) (alternatively, s2(*f*)) from (binary) data when the cyclic Q delay is applied.

A mapper 10802 takes data 10801 and a control signal 10306 as input, and performs mapping in accordance with the modulation scheme of the control signal 10306. For example, when 16-QAM is selected as the modulation scheme, mapping is performed as illustrated in FIG. 107. The mapper then outputs an in-phase component 10803_A and a quadrature component 10803_B for the mapped baseband signal. No limitation is intended to the modulation scheme being 16-QAM, and the operations are similar for other modulation schemes.

Here, the data at time 1 corresponding to the bits b0, b1, b2, and b3 from FIG. 107 are respectively indicated as b01, b11, b21, and b31. The mapper 10802 outputs the in-phase component I1 and the quadrature component Q1 for the baseband signal at time 1, according to the data b0, b1, b2, and b3 at time 1. Similarly, another mapper 10802 outputs the in-phase component 12 and the quadrature component Q2 and so on for the baseband signal at time 2.

A memory and signal switcher 10804 takes the in-phase component 10803_A and the quadrature component 10803_B of the baseband signal as input and, in accordance with a control signal 10306, stores the in-phase component 10803_A and the quadrature component 10803_B of the baseband signal, switches the signals, and outputs modulated signal s1(*t*) (10805_A) and modulated signal s2(*t*) (10805_B). The generation method for the modulated signals s1(*t*) and s2(*t*) is described in detail below.

As described elsewhere in the disclosure, precoding and phase changing are performed on the modulated signal s1(*t*) and s2(*t*). Here, as described elsewhere, signal processing involving phase change, power change, signal switching, and so on may be applied at any step. Thus, modulated signals r1(*t*) and r2(*t*), respectively obtained by applying the precoding and phase change to the modulated signals s1(*t*) and s2(*t*), are transmitted using the same (common) frequency band at the same (common) time.

Although the above description is given with respect to the time domain, s1(*t*) and s2(*t*) may be thought of as s1(*f*) and s2(*f*) (where f is the (sub-)carrier frequency) when a multi-carrier transmission scheme such as OFDM is employed. In contrast to the modulated signals s1(*f*) and s2(*f*), modulated signals r1(*f*) and r2(*f*) obtained using a precoding scheme in which the precoding matrix is regularly changed are transmitted at the same (common) time (r1(*f*) and r2(*f*) being, of course) signals of the same frequency band). Also, as described above, s1(*t*) and s2(*t*) may be treated as s1(*t,f*) and s2(*t,f*).

Figure 109:
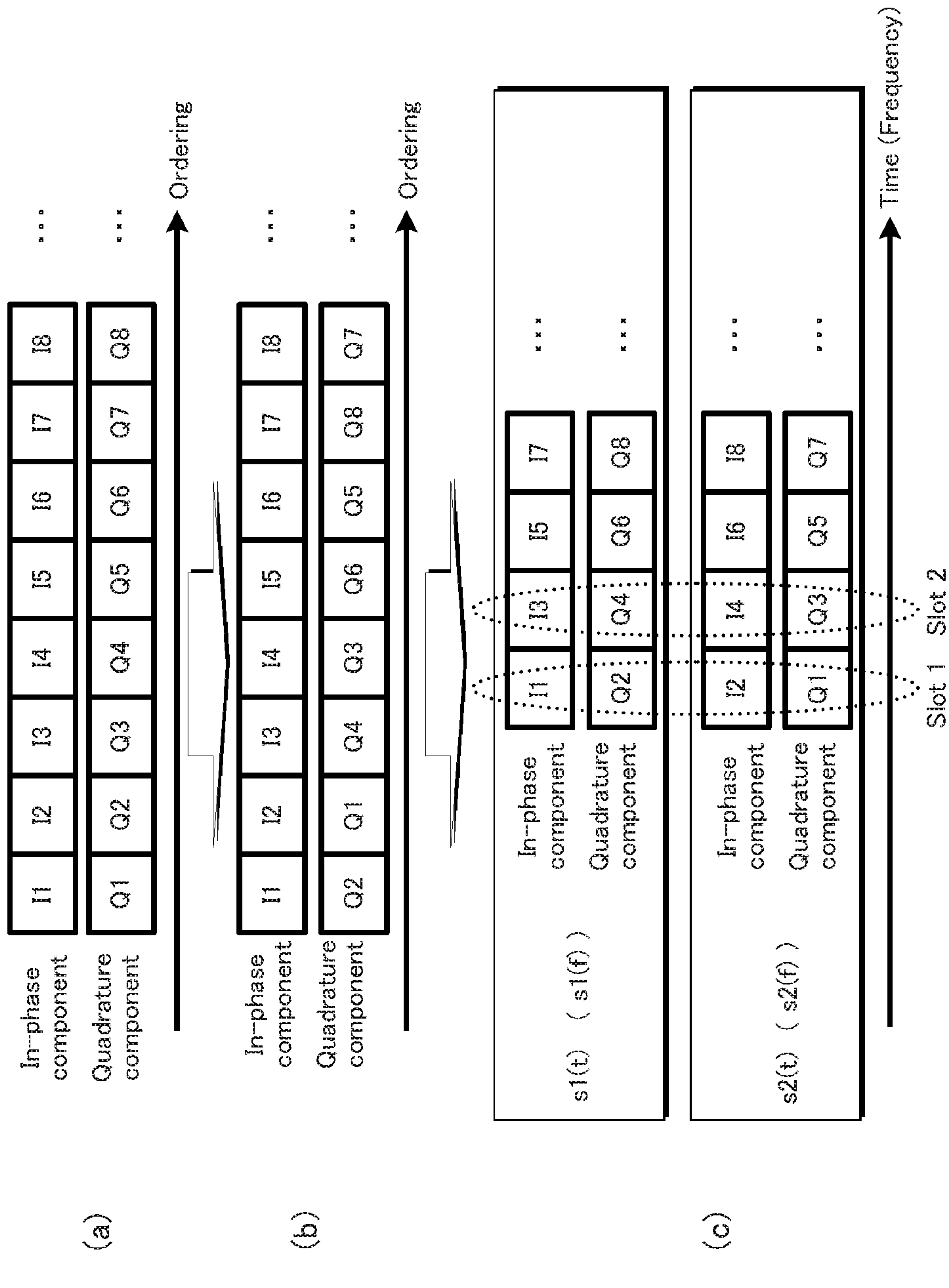
FIG. 109 illustrates a first example of a generation method for $s1(t)$ and $s2(t)$ when cyclic Q delay is used.

The following describes the generation method for modulated signals s1(*t*) and s2(*t*). FIG. 109 illustrates a first example of a generation method for s1(*t*) and s2(*t*) when a cyclic Q delay is used.

Portion (a) of FIG. 109 indicates the in-phase component and the quadrature component of the baseband signal obtained by the mapper 10802 of FIG. 108. As shown in the portion (a) of FIG. 109 and as described with reference to the mapper 10802 of FIG. 108, the mapper 10802 outputs the in-phase component and the quadrature component of the baseband signal such that in-phase component I1 and quadrature component Q1 occur at time 1, in-phase component 12 and quadrature component Q2 occur at time 2, in-phase component 13 and quadrature component Q3 occur at time 3, and so on.

Portion (b) of FIG. 109 illustrates a sample set of in-phase components and quadrature components for the baseband signal when signal switching is performed by the memory and signal switcher 10804 of FIG. 108. In the portion (b) of FIG. 109, pairs of quadrature components are switched at each of time 1 and time 2, time 3 and time 4, and time 5 and time 6 (i.e., time 2i+1 and time 2i+2, i being a non-zero positive integer) such that, for example, the components at time 1 and t2 are switched.

Accordingly, given that signal switching is not performed on the in-phase component of the baseband signal, the order thereof is such that in-phase component I1 occurs at time 1, in-phase component I2 occurs at time 2, baseband signal I3 occurs at time 3, and so on.

Then, signal switching is performed within the pairs of quadrature components for the baseband signal. Thus, quadrature component Q2 occurs at time 1, quadrature component Q1 occurs at time 2, quadrature component Q4 occurs at time 3, quadrature component Q3 occurs at time 4, and so on.

Portion (c) of FIG. 109 indicates a sample configuration for modulated signals s1(*t*) and s2(*t*) before precoding, when the scheme applied involves precoding and phase changing. For example, as shown in the portion (c) of FIG. 109, the baseband signal generated in the portion (b) of FIG. 109 is alternately assigned to s1(*t*) and to s2(*t*). Thus, the first slot of s1(*t*) takes (I1, Q2) and the first slot of s2(*t*) takes (I2, Q1). Likewise, the second slot of s1(*t*) takes (I3, Q4) and the second slot of s2(*t*) takes (I4, Q3). This continues similarly.

Although FIG. 109 describes an example with reference to the time domain, the same applies to the frequency domain (exactly as described above). In such cases, the descriptions pertain to s1(*f*) and 2(*f*).

Then, N-slot precoded and phase changed modulated signals r1(*t*) and r2(*t*) are obtained after applying the precoding and phase change to the N-slot modulated signals s1(*t*) and s2(*t*). This point is described elsewhere in the present disclosure.

Figure 110:
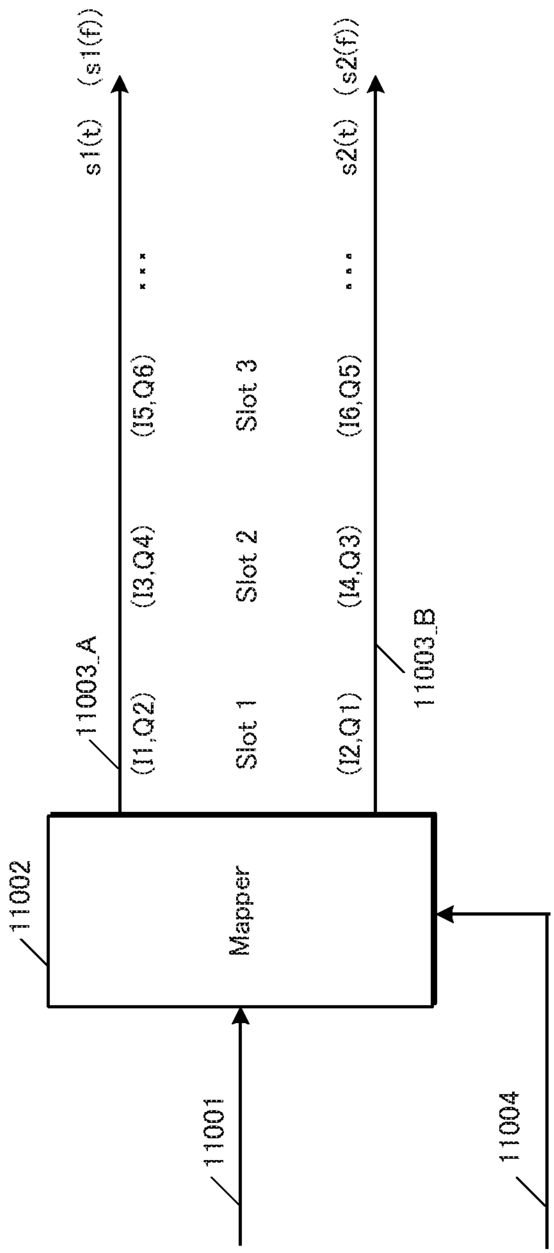
FIG. 110 indicates a sample configuration for a signal generator when cyclic Q delay is applied.

FIG. 110 illustrates a configuration that differs from that of FIG. 108 and is used to obtain the N-slot s1(*t*) and s2(*t*) from FIG. 109. The mapper 11002 takes data 11001 and a control signal 11004 as input and, in accordance with the modulation scheme of the control signal 11004, for example, performs mapping in consideration of the switching from FIG. 109, generates a mapped signal (i.e., in-phase components and quadrature components of the baseband signal) and generates modulated signal s1(*t*)(11003_A) and modulated signal s2(*t*)(11003_B) from the mapped signal. Modulated signal (s1(*t*) (11003_A) is identical to modulated signal 10805_A from FIG. 108, and modulated signal s2(*t*) (11003_B) is identical to modulated signal 10805_B from FIG. 108. This is as indicated in the portion (c) of FIG. 109. Accordingly, the first slot of modulated signal s1(*t*) (11003_A) takes (I1, Q2), the first slot of modulated signal s2(*t*) (11003_B) takes (I2, Q1), the second slot of modulated signal s1(*t*) (11003_A) takes (I3, Q4), the second slot of modulated signal s2(*t*) (11003_B) takes (I4, Q3), and so on.

The generation method for the first slot (I1, Q2) of modulated signal s1(*t*) (11003_A) and the first slot (I2, Q1) of modulated signal s2(*t*) (11003_B) by the mapper 11002 from FIG. 110 is described below, as a supplement.

The data 11001 indicated in FIG. 110 is made up of time 1 data b01, b11, b21, b31 and of time 2 data b02, b12, b22, b32. The mapper 11002 of FIG. 110 generates I1, Q1, I2, and Q2 as described above using the data b01, b11, b21, b31 and b02, b12, b22, and b32. Thus, the mapper 11002 of FIG. 110 is able to generate the modulated signals s1(*t*) and s2(*t*) from I1, Q1, I2, and Q2.

Figure 111:
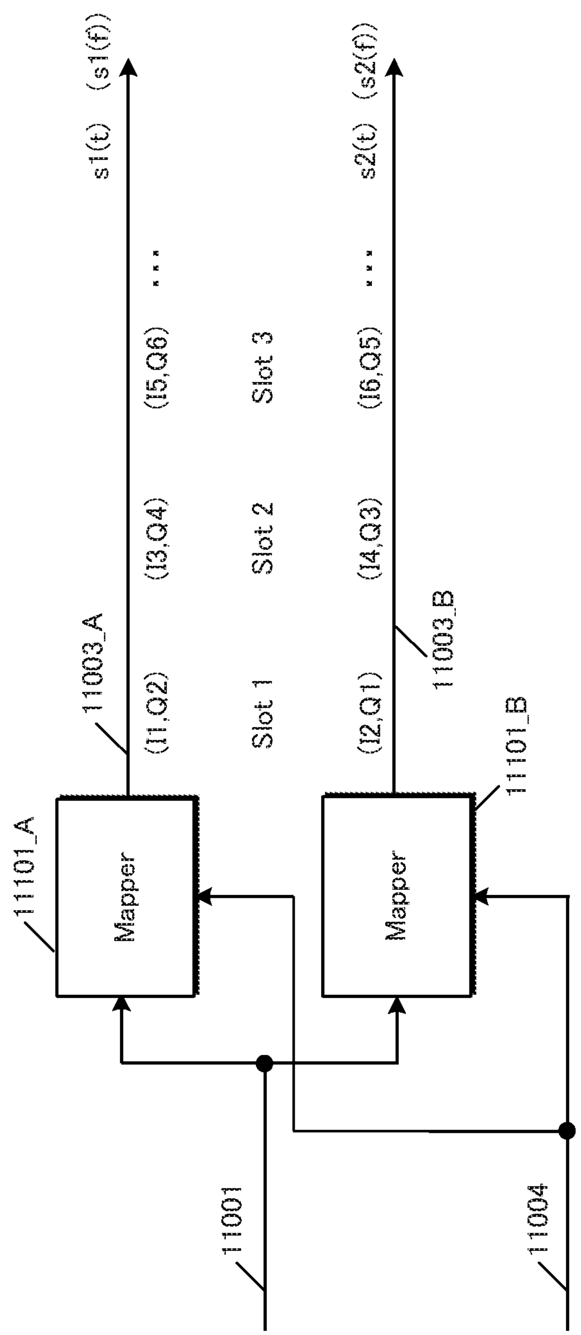
FIG. 111 indicates a sample configuration for a signal generator when cyclic

FIG. 111 illustrates a configuration that differs from those of FIGS. 108 and 110 and is used to obtain the N-slot s1(*t*) and s2(*t*) from FIG. 109. The mapper 11101_A takes data 11001 and a control signal 11004 as input and, in accordance with the modulation scheme of the control signal 11004, for example, performs mapping in consideration of the switching from FIG. 109, generates a mapped signal (i.e., in-phase components and quadrature components of the baseband signal) and generates a modulated signal s1(*t*) (11003_A) from the mapped signal. Similarly, the mapper 11101_B takes data 11001 and a control signal 11004 as input and, in accordance with the modulation scheme of the control signal 11004, for example, performs mapping in consideration of the switching from FIG. 109, generates a mapped signal (i.e., in-phase components and quadrature components of the baseband signal) and generates a modulated signal s2(*t*) (11003_B) from the mapped signal.

The data 11001 input to the mapper 11101_A and the data 11001 input to the mapper 11101_B are, of course, identical data. Modulated signal s1(*t*) (11003_A) is identical to modulated signal 10805_A from FIG. 108, and modulated signal s2(*t*) (11003_B) is identical to modulated signal 10805_B from FIG. 108. This is as indicated in the portion (c) of FIG. 109.

Accordingly, the first slot of modulated signal s1(*t*) (11003_A) takes (I1, Q2), the first slot of modulated signal s2(*t*) (11003_B) takes (I2, Q1), the second slot of modulated signal s1(*t*) (11003_A) takes (I3, Q4), the second slot of modulated signal s2(*t*) (11003_B) takes (I4, Q3), and so on.

The generation method for the first slot (I1, Q2) of modulated signal s1(*t*) (11003_A) by the mapper 11101_A from FIG. 111 is described below, as a supplement. The data 11001 indicated in FIG. 111 are made up of time 1 data b01, b11, b21, b31 and of time 2 data b02, b12, b22, b32. The mapper 11101_A of FIG. 111 generates I1 and Q2 as described above using the data b01, b11, b21, b31 and b02, b12, b22, and b32. The mapper 11101_A of FIG. 111 then generates modulated signal s1(*t*) from I1 and Q2.

The generation method for the first slot (I2, Q1) of modulated signal s2(*t*) (11003_B) by the mapper 11101_B from FIG. 111 is described below. The data 11001 indicated in FIG. 111 are made up of time 1 data b01, b11, b21, b31 and of time 2 data b02, b12, b22, b32. The mapper 11101_B of FIG. 111 generates 12 and Q1 as described above using the data b01, b11, b21, b31 and b02, b12, b22, and b32. Thus, the mapper 11101_B of FIG. 111 is able to generate modulated signal s2(*t*) from I2 and Q1.

Next, FIG. 112 illustrates a second example that differs from the generation method of s1(*t*) and s2(*t*) from FIG. 109 is given for a case where the cyclic Q delay is used. In FIG. 112, reference signs corresponding to elements found in FIG. 109 are identical (i.e., the in-phase component and quadrature component of the baseband signal).

Portion (a) of FIG. 112 indicates the in-phase component and the quadrature component of the baseband signal obtained by the mapper 10802 of FIG. 108. The portion (a) of FIG. 112 is identical to the portion (a) of FIG. 109. Explanations thereof are thus omitted.

Portion (b) of FIG. 112 illustrates the configuration of the in-phase component and the quadrature component of the baseband signals s1(*t*) and s2(*t*) prior to signal switching. As shown, the baseband signal is allocated to s1(t) at times 2i+1, and allocated to s2(t) at times 2i+2 (i being a non-zero positive integer).

Portion (c) of FIG. 112 illustrates a sample set of in-phase components and quadrature components for the baseband signal when signal switching is performed by the memory and signal switcher 10804 of FIG. 108. The main point of the portion (c) of FIG. 112 (and point of difference from the portion (c) of FIG. 109) is that signal switching occurs within s1(t) as well as s2(t).

Accordingly, in contrast to the portion (b) of FIGS. 112, Q1 and Q3 of s1(t) are switched in the portion (c) of FIG. 112, as are Q5 and Q7. Also, in contrast to the portion (b) of FIGS. 112, Q2 and Q4 of s2(t) are switched in the portion (c) of FIG. 112, as are Q6 and Q8.

Thus, the first slot of s1(t) has an in-phase component I1 and a quadrature component Q3, and the first slot of s2(t) has an in-phase component I2 and a quadrature component Q4. Also, the second slot of s1(t) has an in-phase component I3 and a quadrature component Q1, and the second slot of s2(t) has an in-phase component I4 and a quadrature component Q4. The third and fourth slots are as indicated in the portion (c) of FIG. 112, and subsequent slots are similar.

Then, N-slot precoded and phase changed modulated signals r1(t) and r2(t) are obtained after applying the precoding and phase change to the N-slot modulated signals s1(t) and s2(t). This point is described elsewhere in the present disclosure.

FIG. 113 illustrates a configuration that differs from that of FIG. 108 and is used to obtain the N-slot s1(t) and s2(t) from FIG. 112. The mapper 11002 takes data 11001 and a control signal 11004 as input and, in accordance with the modulation scheme of the control signal 11004, for example, performs mapping in consideration of the switching from FIG. 112, generates a mapped signal (i.e., in-phase components and quadrature components of the baseband signal) and generates modulated signal s1(t)(11003_A) and modulated signal s2(t)(11003_B) from the mapped signal. Modulated signal s1(t) (11003_A) is identical to modulated signal 10805_A from FIG. 108, and modulated signal s2(t) (11003_B) is identical to modulated signal 10805_B from FIG. 108. This is as indicated in portion (c) of FIG. 112. Accordingly, the first slot of modulated signal s1(t) (11003_A) takes (I1, Q3), the first slot of modulated signal s2(t) (11003_B) takes (I2, Q4), the second slot of modulated signal s1(t) (11003_A) takes (I3, Q1), the second slot of modulated signal s2(t) (11003_B) takes (I4, Q2), and so on.

The generation method for the first slot (I1, Q3) of modulated signal s1(t) (11003_A), the first slot (I2, Q4) of modulated signal s2(t) (11003_B), the second slot (I3, Q1) of modulated signal s1(t) (11003_A), and the second slot (I4, Q2) of modulated signal s2(t) (11003_B) by the mapper 11002 from FIG. 113 is described below, as a supplement.

The data 11001 indicated in FIG. 113 are made up of time 1 data b01, b11, b21, b31, time 2 data b02, b12, b22, b32, time 3 data b03, b13, b23, b33, and time 4 data b04, b14, b24, b34. The mapper 11002 of FIG. 113 generates the aforementioned I1, Q1, I2, Q2, I3, Q3, I4, and Q4 from the data b01, b11, b21, b31, b02, b12, b22, b32, b03, b13, b23, b33, b04, b14, b24, and b34. Thus, the mapper 11002 of FIG. 113 is able to generate the modulated signals s1(t) and s2(t) from I1, Q1, I2, Q2, I3, Q3, I4, and Q4.

FIG. 114 illustrates a configuration that differs from those of FIGS. 108 and 113 and is used to obtain the N-slot s1(t) and s2(t) from FIG. 112. A distributor 11401 takes data 11001 and the control signal 11004 as input, distributes the data in accordance with the control signal 11004, and outputs first data 11402_A and second data 11402_B. The mapper 11101_A takes the first data 11402_A and the control signal 11004 as input and, in accordance with the modulation scheme of the control signal 11004, for example, performs mapping in consideration of the switching from FIG. 112, generates a mapped signal (i.e., in-phase components and quadrature components of the baseband signal) and generates a modulated signal s1(t)(11003_A) from the mapped signal. Similarly, the mapper 11101_B takes second data 11402_B and the control signal 11004 as input and, in accordance with the modulation scheme of the control signal 11004, for example, performs mapping in consideration of the switching from FIG. 112, generates a mapped signal (i.e., in-phase components and quadrature components of the baseband signal) and generates a modulated signal s2(t) (11003_B) from the mapped signal.

Accordingly, the first slot of modulated signal s1(t) (11003_A) takes (I1, Q3), the first slot of modulated signal s2(t) (11003_B) takes (I2, Q4), the second slot of modulated signal s1(t) (11003_A) takes (I3, Q1), the second slot of modulated signal s2(t) (11003_B) takes (I4, Q2), and so on.

The generation method for the first slot (I1, Q3) of modulated signal s1(t) (11003_A) and the first slot (I3, Q1) of modulated signal s2(t) (11003_B) by the mapper 11101_A from FIG. 114 is described below, as a supplement. The data 11001 indicated in FIG. 114 are made up of time 1 data b01, b11, b21, b31, time 2 data b02, b12, b22, b32, time 3 data b03, b13, b23, b33, and time 4 data b04, b14, b24, b34. The distributor 11401 outputs the time 1 data b01, b11, b21, b31 and the time 3 data b03, b13, b23, b33, as the first data 11402_A, and outputs the time 2 data b02, b12, b22, b32 and the time 4 data b04, b14, b24, b34 as the second data 11402_B. The mapper 11101_A of FIG. 114 generates the first slot as (I1, Q3) and the second slot as (I3, Q1) from the data b01, b11, b21, b31, b03, b13, b23, b33. The third slot and subsequent slots are generated similarly.

The generation method for the first slot (I2, Q4) of modulated signal s2(t) (11003_B) and the second slot (I4, Q2) by the mapper 11101_B from FIG. 114 is described below. The mapper 11101_B from FIG. 114 generates the first slot as (12, Q4) and the second slot as (I4, Q2) from the time 2 data b02, b12, b22, b32 and the time 4 data b04, b14, b24, b34. The third slot and subsequent slots are generated similarly.

Although two methods using cyclic Q delay are described above, when the signals are switched among slot pairs as per FIG. 109, the demodulator (detector) of the reception device is able to constrain the quantity of candidate signal points. This has the merit of reducing the scope of calculation (circuit scope). Also, when the signals are switched within s1(t) and s2(t), as per FIG. 112, the demodulator (detector) of the reception device encounters a large quantity of candidate signal points. However, time diversity gain (or frequency diversity gain when switching is performed with respect to the frequency domain) is available, which as the merit of enabling further improvements to the data reception quality.

Although the above description uses examples of a 16-QAM modulation scheme, no limitation is intended. The same applies to other modulation schemes, such as QPSK, 8-QAM, 32-QAM, 64-QAM, 128-QAM, 256-QAM and so on.

Also, the cyclic Q delay method is not limited to the two schemes given above. For example, either of the two schemes given above may involve switching either of the quadrature component or the in-phase component of the baseband signal. Also, while the above describes switching performed at two times (e.g., switching the quadrature components of the baseband signal at times 1 and 2), the in-phase components and (or) the quadrature components of the baseband signal may also be switched at a plurality of times. Accordingly, when the in-phase components and quadrature components of the baseband signal are generated and cyclic Q delay is performed as in FIG. 109, then the in-phase component of the baseband signal after cyclic Q delay at time i is Ii, and the quadrature component of the baseband signal after cyclic Q delay at time i is Qj (where i≠j). Alternatively, the in-phase component of the baseband signal after cyclic Q delay at time i is Ij, and the quadrature component of the baseband signal after cyclic Q delay at time i is Qi (where i≠j). Alternatively, the in-phase component of the baseband signal after cyclic Q delay at time i is Ij, and the quadrature component of the baseband signal after cyclic Q delay at time i is Qk (where i≠j, i≠k, j≠k).

The precoding and phase change are then applied to the modulated signals s1(*t*) (or s1(*f*), or s1(*t,f*)) and s2(*t*) (or s2(*f*) or s2(*t,f*)) obtained by applying the above-described cyclic Q delay. (Here, as described elsewhere, signal processing involving phase change, power change, signal switching, and so on may be applied at any step.) Here, the precoding and phase changing application method used on the modulated signal obtained with the cyclic Q delay may be any of the precoding and phase changing methods described in the present disclosure.

Embodiment M

In the present embodiment, description is given on an example of a scheme of leading signals to houses, for the case where a plurality of modulated signals, which are obtained by performing precoding and regular phase change, are transmitted from a broadcast station by a plurality of antennas (for example, in the same frequency band at the same time), and the modulated signals transmitted from the broadcast station are received, for example. (Note that precoding matrices to be used may be any of the precoding matrices described in the present description. Also, even in the case where precoding matrices other than those described in the present description are used, it is possible to execute the scheme of leading signals to houses described in the present embodiment. In addition, although the present description gives description on the transmission scheme in which precoding and regular phase change are performed, it is possible to execute the scheme of leading signals to houses described in the present embodiment both in the case where regular phase change is performed and the case where no precoding is performed.)

A reception system 11501 shown in FIG. 115 is composed of a relay device 11502, and televisions 11503 and 11505 which are each provided in a house. Particularly, the relay device 11502 is a device for receiving a plurality of modulated signals transmitted from a broadcast station, and distributing the modulated signals to each of a plurality of houses. Note that although the description is given using an example of televisions, terminals included in the reception system 11501 are not limited to televisions, and the present embodiment may be similarly implemented for any terminal that requires information.

The relay device 11502 has a function of receiving broadcast waves (a plurality of modulated signals transmitted from the broadcast station). The relay device 11502 is characterized in having both a function of transmitting received signals to the television 11503 via a single cable 11504 and a function of transmitting received signals to the television 11505 via two cables 11506*a* and 11506*b*.

Note that there has been used, for example, a scheme of providing the relay device 11502 on a rooftop of a tall building in consideration of overcrowded residential areas where radio wave reception is difficult due to influences by tall buildings. This achieves, in each house, excellent reception quality for modulated signals transmitted from the broadcast station. It is possible to acquire, in each house, a plurality of modulated signals transmitted from the broadcast station at the same frequency band, thereby achieving an effect of an increased data transmission speed.

As described in the present description, the following describes detailed operations of the relay device, with reference to FIG. 116, for the case where when a broadcast station transmits a plurality of modulated signals at the same frequency band by different antennas, the relay device receives the modulated signals and relays the modulated signals to each house (residence) via a single signal line.

Description is given on the details of the case where signals are led to each house via a single signal line, with reference to FIG. 116.

As shown in FIG. 116, the relay device 11502 receives broadcast waves (a plurality of modulated signals transmitted from the broadcast station) by two antennas #1 and #2.

A frequency converter 11611 converts a signal received by the antenna #1 to an intermediate frequency (IF) #1 (this signal is referred to as a signal of the IF #1).

A frequency converter 11612 converts a signal received by the antenna #2 to an IF #2 that differs in frequency band from the IF #1 (this signal is referred to as a signal of the IF #2).

Then, an adder 11613 adds the signal of the IF #1 and the signal of the IF #2. As a result, the relay device 11502 transmits the signal received by the antenna #1 and the signal received by the antenna #2 by performing frequency division multiplexing (FDM).

In the television 11503, a brancher 11623 branches a signal transmitted via a single signal line to two signals.

A frequency converter 11621 performs frequency conversion relating to the IF #1 to obtain a baseband signal #1. As a result, the baseband signal #1 corresponds to the signal received by the antenna #1.

A frequency converter 11622 performs frequency conversion relating to the IF #2 to obtain a baseband signal #2. As a result, the baseband signal #2 corresponds to the signal received by the antenna #2.

Each of the intermediate frequencies #1 and #2 for use in leading signals to each house may be a frequency in a frequency band which is determined in advance between the relay device 11502 and the television 11503. Alternatively, information regarding the intermediate frequencies #1 and #2 used by the relay device 11502 may be transmitted to the television 11503 via some sort of transport medium. Further alternatively, the television 11503 may transmit (or issue an instruction to use) the intermediate frequencies #1 and #2 which are desirable to be used to the relay device 11502 via some sort of transport medium.

A MIMO detector 11624 performs detection for MIMO such as MLD (Maximum Likelihood Detection) to obtain a log-likelihood ratio for each bit. (This point is such as described in other embodiments.) (Here, this unit is referred to as a MIMO detector because operations of signal processing for detection are the same as operations performed by a generally known MIMO detector. However, the scheme of leading signals to houses differs from a scheme of transmitting signals in a general MIMO system, and uses the FDM scheme in order to transmit the respective signals received by the antennas #1 and #2. In the following description, although this unit is referred to as a MIMO detector even in this case, this unit may be regarded as a detector.)

As described in the present description, in the case where a broadcast station transmits a plurality of modulated signals, which are obtained by performing precoding and regular phase change, by a plurality of antennas, the MIMO detector 11624 performs detection that reflects precoding and regular phase change, and outputs a log-likelihood ratio for each bit, for example, as described in other embodiments.

Next, description is given on examples (schemes 1 and 2) of a case of leading signals to houses via two signal lines, with reference to FIG. 117.

(Scheme 1: Leading at IF)

According to the scheme 1 as shown in FIG. 117, a signal received by the antenna #1 is converted to a signal of the IF #1, a signal received by the antenna #2 is converted to a signal of the IF #2. Then, the signal of the IF #1 and the signal of the IF #2 are led to the television 11505 provided in a house via separate signal lines 11506*a* and 11506*b*, respectively. In this case, the IF #1 and the IF #2 may be the same, or may be different from each other.

(Scheme 2: Leading at Radio Frequency (RF))

According to the scheme 2, a signal received by the antenna #1 and a signal received by the antenna #2 each having an RF at which the relay device has received the signal are led to houses without frequency conversion. In other words, in the relay device 11502, as shown in FIG. 118, the signal received by the antenna #1 and the signal received by the antenna #2 are transmitted through relay units 11811 and 11812 which do not have a frequency conversion function, respectively, and then are transmitted through cables (signal lines) 11506*a* and 11506*b*, respectively. Accordingly, the respective signals received by the antennas #1 and #2 each having an RF are led to the television 11505 provided in the house without frequency conversion. Note that the relay units 11811 and 11812 may perform waveform shaping such as band limiting and noise reduction.

Also, according to the scheme of transmitting signals to houses, there is also a structure where a television judges whether a relayed received signal uses an IF or an RF, and appropriately switches operations in accordance with the frequency which is used.

As shown in FIG. 119, a television 11901 includes a judgment unit 11931. The judgment unit 11931 monitors a signal level of a received signal to judge whether the received signal uses an IF or an RF.

If judging that the received signal uses an IF, the judgment unit 11931 instructs the frequency converter 11621 to perform frequency conversion relating to the IF #1 via a control signal 11932, and instructs the frequency converter 11622 to perform frequency conversion relating to the IF #2 via the control signal 11932.

If judging that the received signal uses an RF, the judgment unit 11931 instructs each of the frequency converters 11621 and 11622 to perform frequency conversion relating to the RF via the control signal 11932.

Then, the signals after frequency conversion are automatically detected by the MIMO detector 11624.

Note that, instead of automatic judgment made by the judgment unit 11931, the settings regarding the scheme of transmitting signals to houses may be designed via an input unit such a switch included in the television 11901. The settings relate to "whether the number of signal lines is one or plural", "whether an RF is used or an IF is used", and so on.

The description has been given, with reference to FIGS. 115 to 119, on the scheme of transmitting signals to houses via a relay device for the case where a broadcast station transmits a plurality of modulated signals having the same frequency band by a plurality of antennas. Alternatively, as described in the present description, the broadcast station may transmit a plurality of modulated signals by appropriately switching between "the transmission scheme of transmitting a plurality of modulated signals having the same frequency band by a plurality of antennas" and "the transmission scheme of transmitting a single modulated signal by a single antenna or a plurality of antennas". Further alternatively, for a frequency band A, the broadcast station may transmit a plurality of modulated signals by performing FDM and using "the transmission scheme of transmitting a plurality of modulated signals having the same frequency band by a plurality of antennas". In addition, for a frequency band B, the broadcast station may transmit a plurality of modulated signals by performing FDM and using "the transmission scheme of transmitting a single modulated signal by a single antenna or a plurality of antennas" for a frequency band B.

In the case where the broadcast station uses "the transmission scheme of transmitting a plurality of modulated signals having the same frequency band by a plurality of antennas" as a result of appropriately switching between "the transmission scheme of transmitting a plurality of modulated signals having the same frequency band by a plurality of antennas" and "the transmission scheme of transmitting a single modulated signal by a single antenna or a plurality of antennas", the television can acquire data transmitted from the broadcast station using the scheme of "leading signals via a single signal line or a plurality of signal lines" to houses, as described above.

In the case where the broadcast station uses "the transmission scheme of transmitting a single modulated signal by a single antenna or a plurality of antennas", the television can acquire data transmitted from the broadcast station using the scheme of "leading signals via a single signal line or a plurality of signal lines" to houses, in the similar way. In the case where a single signal line is used, signals may be received by both the antennas #1 and #2 shown in FIG. 116. (Here, the MIMO detector 11624 included in the television 11505 performs maximal ratio combining, thereby achieving excellent data reception quality.) Alternatively, only a signal received by one of the antennas #1 and #2 may be led to houses. In this case, the adder 11613 causes only the signal received by the one antenna to be transmitted through without performing addition operations. (Here, the MIMO detector 11624 included in the television 11505 performs not detection for MIMO but general detection (demodulation) for the case where a single modulated signal is transmitted and received.)

Also, in the case where the broadcast station transmits a plurality of modulated signals by performing FDM and using "the transmission scheme of transmitting a plurality of modulated signals having the same frequency band by a plurality of antennas" for the frequency band A and using "the transmission scheme of transmitting a single modulated signal by a single antenna or a plurality of antennas" for the frequency band B, the television performs detection (demodulation) such as described above for each frequency band. In other words, in order to demodulate a modulated signal having the frequency band A, the television performs detection (demodulation) such as described with reference to FIGS. 116 to 119. Also, in order to demodulate a modulated signal having the frequency band B, the television performs detection (demodulation) for use in "the transmission scheme of transmitting a single modulated signal by a single antenna or a plurality of antennas" as described above. Furthermore, in the case where there exists a frequency band other than the frequency bands A and B, detection (demodulation) may be performed in the similar way.

Note that FIG. 115 shows, as an example, a relay system for the case where a common antenna is shared among a plurality of houses. Accordingly, signals received by antennas are distributed to a plurality of houses. Alternatively, a relay system corresponding to the relay system shown in FIG. 115 may be provided in each house. FIG. 115 represents an image that a signal line is wired to each house via the relay device. However, in the case where a relay system is provided in each house, a signal line is wired from the relay device to only a television device provided in the house. In this case, this number of signal lines to be wired may be one or plural.

FIG. 120 shows a relay device which has a new structure compared with the relay device included in the relay system shown in FIG. 115.

A relay device 12010 receives, as input, a signal 12001_1 received by an antenna 12000_1 for receiving radio waves of terrestrial digital television broadcast, a signal 12001_2 received by an antenna 12000_2 for receiving radio of terrestrial digital television broadcast, and a signal 12001_3 received by a BS (Broadcasting Satellite) antenna 12000_3 for receiving radio waves of satellite broadcast. Then, the relay device 12010 outputs a multiplexed signal 12008. The relay device 12010 includes a filter 12003, a plural modulated signal frequency converter 12004, and a multiplexer 12007.

FIG. 121 schematically shows, in portion (a), modulated signals transmitted from the broadcast station which correspond to the respective signals 12001_1 and 12001_2 received by the antennas 12001_1 and 12001_2. In the portions (a) and (b) of FIG. 121, the horizontal axis represents frequency, and squares each represent a frequency band at which a transmission signal exists.

In the portion (a) of FIG. 121, in a frequency band of Channel 1 (CH_1), there exists no other transmission signal. This means that a broadcast station, which transmits terrestrial radio waves, transmits only a (single) modulated signal of the Channel 1 (CH_1) by an antenna. Similarly, in a frequency band of Channel L (CH_L), there exists no other transmission signal. This means that the broadcast station, which transmits terrestrial radio waves, transmits only a (single) modulated signal of the Channel L (CH_L) by an antenna.

On the other hand, in the portion (a) of FIG. 121, in a frequency band of Channel K (CH_K), there exist two modulated signals. (Accordingly, in the portion (a) of FIG. 121(*a*), there are two squares expressed as Stream 1 and Stream 2 in the same frequency band.) The respective modulated signals of the Stream 1 and the Stream 2 are transmitted by different antennas at the same time. Note that, as described above, the Stream 1 and the Stream 2 each may be a modulated signal obtained by performing precoding and regular phase change, a modulated signal obtained by performing only precoding, or a modulated signal obtained without performing precoding. Similarly, in a frequency band of Channel M (CH_M), there exist two modulated signals. (Accordingly, in the portion (a) of FIG. 121(*a*), there are two squares expressed as the Stream 1 and the Stream 2 in the same frequency band.) The respective modulated signals of the Stream 1 and the Stream 2 are transmitted by different antennas at the same time. Note that, as described above, the Stream 1 and the Stream 2 each may be a modulated signal obtained by performing precoding and regular phase change, a modulated signal obtained by performing only precoding, or a modulated signal obtained without performing precoding.

Also, FIG. 121 schematically shows, in the portion (b), modulated signals transmitted from the broadcast station (BS) which correspond to the signal 12001_3 received by the BS antenna 12000_3.

In the portion (b) of FIG. 121, in a frequency band of BS Channel 1 (CH1), there exists no other transmission signal. This means that the broadcast station, which transmits BS radio waves, transmits only a (single) modulated signal of BS Channel 1 (CH1) by an antenna. Similarly, in a frequency band of BS Channel 2 (CH2), there exists no other transmission signal. This means that the broadcast station, which transmits BS radio waves, transmits only a (single) modulated signal of BS Channel 2 (CH2) by an antenna.

In the portions (a) and (b) in FIG. 121, the same range of frequency band is allocated to the horizontal axis.

Although FIG. 120 shows, as an example, the modulated signal transmitted by the terrestrial broadcast station and the modulated signal transmitted by the BS, modulated signals are not limited to be these. Alternatively, there may exist a modulated signal transmitted by CS (Communications Satellite) or a modulated signal transmitted by other different broadcasting system. In such a case, the relay device 12010 shown in FIG. 120 includes a reception unit for receiving modulated signals transmitted from broadcasting systems.

Upon receiving the signal 12001_1, the filter 12003 eliminates a "signal having a frequency band of a plurality of modulated signals" included in the received signal 12001_1, and outputs a signal 12005 after filtering.

For example, in the case where frequency allocation for the received signal 12001_1 is such as shown in the portion (a) of FIG. 121, the filter 12003 outputs the signal 12005 from which respective signals having the frequency bands of Channels K and Channel M have been eliminated, as shown in portion (b) of FIG. 122.

In the present embodiment, the plural modulated signal frequency converter 12004 has a function of the device described above as the relay devices 11502 and so on. Specifically, the plural modulated signal frequency converter 12004 detects a signal having a frequency band of a plurality of modulated signals, which have been transmitted from a broadcast station by different antennas in the same frequency band at the same time, and performs frequency conversion on the detected signal. In other words, the plural modulated signal frequency converter 12004 performs frequency conversion such that a "signal having a frequency band of a plurality of modulated signals" exists in each of two different frequency bands.

For example, the plural modulated signal frequency converter 12004 has the structure shown in FIG. 116, and converts a "signal having a frequency band of a plurality of modulated signals" included in signals received by two antennas to two intermediate frequencies, and as a result, the signal is converted to a frequency band that differs from a frequency band before conversion.

The plural modulated signal frequency converter 12004 shown in FIG. 120 receives the signal 12001_1 as input. As shown in FIG. 123, the plural modulated signal frequency converter 12004 extracts signals having frequency bands each where a plurality of modulated signals (a plurality of streams) exist, specifically, a signal of Channel K (CH_K) 12301 and a signal of Channel M (CH_M) 12302, and converts each of the respective modulated signals having these two frequency bands to a different frequency band. As a result, the signal of Channel K (CH_K) 12301 is converted to a signal of a frequency band 12303 as shown in portion (b) of FIG. 123. Also, the signal of Channel M (CH_M) 12302 is converted to a signal of a frequency band 12304 as shown in portion (b) of FIG. 123.

Furthermore, the plural modulated signal frequency converter 12004 shown in FIG. 120 receives the signal 12001_2 as input. As shown in FIG. 123, the plural modulated signal frequency converter 12004 extracts signals having frequency bands each where a plurality of modulated signals (a plurality of streams) exist, specifically, a signal of the Channel K (CH_K) 12301 and a signal of Channel M (CH_M) 12302, and converts each of the respective modulated signals having these two frequency bands to a different frequency band. As a result, the signal of the Channel K (CH_K) 12301 is converted to a signal of a frequency band 12305 as shown in portion (b) of FIG. 123. Also, the signal of the Channel M (CH_M) 12302 is converted to a signal of a frequency band 12306 as shown in portion (b) of FIG. 123.

Then, the plural modulated signal frequency converter 12004 shown in FIG. 120 outputs a signal including components of the four frequency bands shown in the portion (b) of FIG. 123.

In the portions (a) and (b) of FIG. 123, the horizontal axis represents frequency, and the same range of frequency band is allocated to the horizontal axis. The frequency band of the signal shown in the portion (a) of FIG. 123 does not overlap the frequency band of the signal shown in the portion (b) of FIG. 123.

The multiplexer 12007 shown in FIG. 120 receives, as input, the signal 12005 output by the filter 12003, the signal 12006 output by the plural modulated signal frequency converter 12004, and the signal 12001_3 input by the BS antenna 12000_3, and then multiplexes the received signals on the frequency domain. As a result, the multiplexer 12007 shown in FIG. 120 obtains and outputs the signal 12008 including frequency components shown in FIG. 125. A television 12009 receives this signal 12008 as input. Therefore, it is possible to view television broadcast with a high data reception quality by leading signals via a single signal line.

Next, description is given, as another example, on respective schemes by the plural modulated signal frequency converter 12004, which has the structure shown in FIG. 116, of setting a "signal having a frequency band of a plurality of modulated signals" included in signals received by two antennas to have a frequency band without frequency conversion and an IF band.

The plural modulated signal frequency converter 12004 shown in FIG. 120 receives the signal 12001_1 as input. As shown in FIG. 124, the plural modulated signal frequency converter 12004 extracts signals having frequency bands each where a plurality of modulated signals (a plurality of streams) exist, specifically, a signal of Channel K (CH_K) 12401 and a signal of Channel M (CH_M) 12402, and converts each of the respective modulated signals having these two frequency bands to a different frequency band. As a result, the signal of the Channel K (CH_K) 12401 is converted to a signal of a frequency band 12403 as shown in portion (b) of FIG. 124. Also, the signal of the Channel M (CH_M) 12402 is converted to a signal of a frequency band 12404 as shown in the portion (b) of FIG. 124.

Furthermore, the plural modulated signal frequency converter 12004 shown in FIG. 120 receives the signal 12001_2 as input. As shown in FIG. 124, the plural modulated signal frequency converter 12004 extracts signals having frequency bands each where a plurality of modulated signals (a plurality of streams) exist, specifically, a signal of the Channel K (CH_K) 12401 and a signal of the Channel M (CH_M) 12402, and arranges each of the respective modulated signals of these two frequency bands to the same frequency band before conversion. As a result, the signal of the Channel K (CH_K) 12401 is converted to a signal of the frequency band 12405 as shown in the portion (b) of FIG. 124. Also, the signal of the Channel M (CH_M) 12402 is converted to a signal of a frequency band 12406 as shown in the portion (b) of FIG. 124.

Then, the plural modulated signal frequency converter 12004 shown in FIG. 120 outputs a signal including components of the four frequency bands shown in the portion (b) of FIG. 124.

In the portions (a) and (b) of FIG. 124, the horizontal axis represents frequency, and the same range of frequency band is allocated to the horizontal axis. The frequency bands 12401 and 12405 are the same frequency band. The frequency bands 12402 and 12406 are the same frequency band.

The multiplexer 12007 shown in FIG. 120 receives, as input, the signal 12005 output from the filter 12003, the signal output from the plural modulated signal frequency converter 12004, and the signal 12001_3 output from the BS antenna 12000_3, and then multiplexes the received signals on the frequency domain. As a result, the multiplexer 12007 shown in FIG. 120 obtains and outputs the signal 12008 including frequency components shown in FIG. 126. The television 12009 receives this signal 12008 as input. Therefore, it is possible to view television broadcast with a high data reception quality by leading signals via a single signal line.

That is, signal leading to houses is performed such as described above, with respect to a signal, which is transmitted from the broadcast station in the frequency domain, having a frequency band which is used in the transmission scheme of transmitting a plurality of modulated signals by a plurality of antennas (for example, in the same frequency band at the same time). This exhibits advantageous effects that the television (terminal) achieves a high data reception quality and the number of signal lines to be wired to houses is reduced. Here, as described above, there may exist a frequency band where a transmission scheme is used of transmitting a single modulated signal from a broadcast station by one or more antennas.

In the present embodiment, the description has been given on the example where a relay device is provided on a rooftop of an apartment building or the like as shown in FIG. 115 (portion (a) of FIG. 127). However, the provision position of the relay device is not limited to this. Alternatively, as shown in portion (b) of FIG. 127, in the case where signals are led to a television or the like provided in each house, a relay device may be provided in each individual house, as described above. Further alternatively, as shown in portion (c) of FIG. 127, in the case where a cable television system operator receives broadcast waves (a plurality of modulated signals transmitted from a broadcast station), and re-distributes the received broadcast waves to each house and so on via a wire (cable), the relay device may be used as part of a relay system of the cable television system operator.

In other words, the respective relay devices described in the present embodiment shown in FIGS. 116 to 120 each may be provided on a rooftop of an apartment building as shown in the portion (a) of FIG. 127. Alternatively, in the case where signals are led to a television or the like provided in each house, the relay device may be provided for each individual house as shown in the portion (b) of FIG. 127. Further alternatively, in the case where the cable television system operator receives broadcast waves (a plurality of modulated signals transmitted from the broadcast station), and re-distributes the received broadcast waves to each house and so on via a wire (cable), the relay device may be used as part of the relay system of the cable television system operator as shown in the portion (c) of FIG. 127.

Embodiment N

As described in the above embodiment of the present description, the present embodiment describes a system of receiving a plurality of modulated signals transmitted from a plurality of antennas in the same frequency band at the same time by performing precoding and regular phase change, and re-distributing the received modulated signals via a cable television (wire). (Note that precoding matrices to be used may be any of the precoding matrices described in the present description. Also, even in the case where precoding matrices other than those described in the present description are used, it is possible to implement the present embodiment. In addition, although the present description provides description on the transmission scheme in which precoding and phase change are performed, it is possible to execute the scheme described in the present embodiment even in the case where no phase change is performed and the case where no precoding is performed.)

A cable television system operator has a device for receiving radio waves of broadcast waves which are wirelessly transmitted, and re-distributes data such as video, audio, data information to each house and so on where reception of broadcast waves is difficult. In the general meaning, some cable television system operators provide Internet connection services and telephone connection services.

In the case where a broadcast station transmits a plurality of modulated signals by a plurality of antennas (for example, in the same frequency band at the same time), this cable television system operator might have a problem. The problem is explained in the following.

A transmission frequency for transmitting broadcast waves by the broadcast station is determined in advance. In FIG. 128, the horizontal axis represents frequency. As shown in FIG. 128, the broadcast station transmits a plurality of modulated signals of a certain channel (CH_K in FIG. 128) from a plurality of antennas in the same frequency band at the same time. Note that Stream 1 and Stream 2 of the channel CH_K each contain different data, and accordingly a plurality of modulated signals are generated from the Stream 1 and the Stream 2.

Here, the broadcast station wirelessly transmits, to the cable television system operator, the plurality of modulated signals of Channel K (CH_K) by the plurality of antennas in the same frequency band at the same time. Therefore, as described in the embodiment of the present description, the cable television system operator receives, demodulates, and decodes signals which are transmitted from the broadcast station by the plurality of antennas in the frequency band of the Channel K (CH_K) at the same time.

As shown in FIG. 128, the plurality of modulated signals (two modulated signals in FIG. 128) are transmitted at the frequency band of the Channel K (CH_K). Accordingly, if these modulated signals without conversion are distributed to a cable (a single wire) using the pass-through scheme, the data reception quality of data contained in the Channel K (CH_K) greatly degrades in each house to which the cable is wired.

In view of this, as described in the above Embodiment M, it is considered that the cable television system operator performs frequency conversion on each of a plurality of received signals of the Channel K (CH_K) to convert to two or more different frequency bands, and transmits a multiplexed signal. However, there is a case where other frequency band is difficult to use because of being occupied by other channel, satellite broadcast channel, and the like.

Therefore, the present embodiment discloses a scheme of, even in the case where frequency conversion is difficult to perform, re-distributing via a wire a plurality of modulated signals transmitted from the broadcast station in the same frequency band at the same time.

FIG. 129 shows the structure of a relay device for a cable television system operator. FIG. 129 shows the case where the 2×2 MIMO communication system is used, in other words, the case where a broadcast station transmits two modulated signals in the same frequency band at the same time, and a relay device receives the modulated signals by two antennas.

The relay device for the cable television system operator includes a reception unit 12902 and a distribution data generating unit 12904.

As described in the present description, the reception unit 12902 performs reverse conversion processing of precoding and/or phase restoration processing is performed on each of a signal 12900_1 and a signal 12900_2 which are received by an antenna 12900_1 and an antenna 12900_2, respectively. The reception unit 12902 obtains a data signal rs1 12903_1 and a data signal rs2 12903_2, and outputs the obtained data signals rs1 12903_1 and rs2 12903_2 to the distribution data generating unit 12904. Also, the reception unit 12902 outputs, as information 12903_3 regarding a signal processing scheme, information regarding a signal processing scheme used for demodulating and decoding received signals and information regarding a transmission scheme used by the broadcast station for transmitting modulated signals, to the distribution data generating unit 12904.

Note that although FIG. 129 shows the case where the reception unit 12902 outputs data in two groups of the data signal 12903_1 and the data signal rs2 12903_2, this is just an example and the data output is not limited to this. Alternatively, the reception unit 12902 may output data in one group.

Specifically, the reception unit 12902 includes the wireless units 703_X and 703_Y, the channel fluctuation estimating unit 705_1 for the modulated signal z1, the channel fluctuation estimating unit 705_2 for the modulated signal z2, the channel fluctuation estimating unit 707_1 for the modulated signal z1, the channel fluctuation estimating unit 707_2 for the modulated signal z2, the control information decoding unit 709, and the signal processing unit 711, which are shown in FIG. 7. The antennas 12900_1 and 12900_2 shown in FIG. 129 correspond to the antennas 701_X and 701_Y shown in FIG. 7, respectively. Note that the signal processing unit 711 relating to the present embodiment has the structure shown in FIG. 130, unlike the signal processing unit relating to Embodiment 1 shown in FIG. 8.

As shown in FIG. 130, the signal processing unit 711, which is included in the reception unit 12902 relating to the present embodiment, includes an INNER MIMO detector 803, a storage unit 815, a log-likelihood calculating unit 13002A, a log-likelihood calculating unit 13002B, a hard-decision unit 13004A, a hard-decision unit 13004B, and a coefficient generating unit 13001.

In FIG. 130, units that are common with those in FIG. 8 have the same reference signs, and description thereof is omitted here.

The log-likelihood calculating unit 13002A calculates a log-likelihood, and outputs a log-likelihood signal 13003A to the hard-decision unit 13004A, in a similar way to the log-likelihood calculating unit 805A shown in FIG. 8.

Similarly, the log-likelihood calculating unit 13002B calculates a log-likelihood, and outputs a log-likelihood signal 13003B to the hard-decision unit 13004B, in a similar way to the log-likelihood calculating unit 805B shown in FIG. 8.

The hard-decision unit 13004A makes hard decision on the log-likelihood signal 13003A to obtain a bit value of the log-likelihood signal 13003A, and outputs the bit value as the data signal rs1 12903_1 to the distribution data generating unit 12904.

Similarly, the hard-decision unit 13004B makes hard decision on the log-likelihood signal 13003B to obtain a bit value of the log-likelihood signal 13003B, and outputs the bit value as the data signal rs2 12903_2 to the distribution data generating unit 12904.

In a similar way to the weighting coefficient generating unit 819, the weighting coefficient generating unit 13001 generates a coefficient, and outputs the generated coefficient to the INNER MIMO detector 803. In addition, the weighting coefficient generating unit 13001 extracts information regarding at least a modulation scheme used for two signals from a signal 818 regarding information (fixed precoding matrices which have been used, information for specifying a phase changing pattern used in the case where phases are regularly changed, and a modulation scheme) on the transmission scheme indicated by the broadcast station (transmission device). Then, the weighting coefficient generating unit 13001 outputs a signal of the information 12903_3 regarding the signal processing scheme including information regarding this modulation scheme to the distribution data generating unit 12904.

As can be seen from the above description, the reception unit 12902 performs demodulation to a degree of performing calculation of a log-likelihood and hard decision. However, in this example, the reception unit 12902 does not perform error correction.

FIG. 130 shows the structure in which the reception unit 12902 includes the log-likelihood calculating unit and the hard-decision unit. Alternatively, the INNER MIMO detector 803 may make hard decision without making soft decision. In this case, the reception unit 12902 does not need to include the log-likelihood calculating unit and the hard-decision unit. Also, hard-decision results do not need to be rs1 and rs2. Alternatively, soft-decision results for each bit may be rs1 and rs2.

The distribution data generating unit 12904 shown in FIG. 129 receives, as input, the data signal rs1 12903_1, the data signal rs2 12903_2, and the information 12903_3 regarding the signal processing scheme, and generates a distribution signal 12905 for distribution to each contracted house and so on.

The following describes in detail the scheme of generating the distribution signal 12905 by the distribution data generating unit 12904 shown in FIG. 129, with reference to FIGS. 131 to 133.

FIG. 131 is a block diagram showing the structure of the distribution data generating unit 12904. As shown in FIG. 131, the distribution data generating unit 12904 includes a combining unit 13101, a modulation unit 13103, and a distribution unit 13105.

The combining unit 13101 receives, as input, the data signal rs1 12903_1, the data signal rs2 12903_2, and the information 12903_3 regarding the signal processing scheme and the transmission scheme used by the broadcast station for transmitting modulated signals. Then, the combining unit 13101 outputs, to the modulation unit 13103, a combined data signal 13102 resulting from combining the data signals rs1 and rs2 defined by the information 12903_3 regarding the signal processing scheme and the transmission scheme used by the broadcast station for transmitting modulated signals. In FIG. 131, the data signals rs1 12903_1 and rs2 12903_2 are shown. Alternatively, as described above, it is possible to employ the structure of outputting data in one group by combining the data signals rs1 and rs2 in FIG. 130. In this case, the combining unit 13101 shown in FIG. 131 may be deleted.

The demodulation unit 13103 receives, as input, the combined data signal 13102 and the information 12903_3 regarding the signal processing scheme and the transmission scheme used by the broadcast station for transmitting modulated signals, and performs mapping according to the set modulation scheme to generate a modulated signal 13104 for output. The scheme of setting the modulation scheme is described later in detail.

The distribution unit 13105 receives, as input, the modulated signal 13104 and the information 12903_3 regarding the signal processing scheme and the transmission scheme used by the broadcast station for transmitting modulated signals. Then, the distribution unit 13105 distributes, to each contracted house and so on via a cable (wire), the modulated signal 13104, the information of the modulation scheme used for the modulated signal 13104 as control information for demodulating and decoding in a television reception device provided in each house, and the distribution signal 12905 including control information indicating information of error correction coding such as information of coding and a coding rate for error correction coding.

The following describes in detail the processing performed by the combining unit 13101 and the demodulation unit 13103 shown in FIG. 131, with reference to FIGS. 132 and 133.

FIG. 132 is a conceptual diagram showing the data signal rs1 and the data signal rs2 that are input to the distribution data generating unit 12904. In FIG. 132, the horizontal axis is the time domain. Squares shown in FIG. 132 each represent a data block to be simultaneously distributed at each time. As the error correction coding, a systematic code may be used or a non-systematic code may be used. The data block is composed of data on which error correction coding has been performed.

Here, the respective modulation schemes used for transmitting the data signals rs1 and rs2 are each 16-QAM. In other words, the modulation scheme used for transmitting the Stream 1 of the Channel K (CH_K) shown in FIG. 128 is 16-QAM, and the modulation scheme used for transmitting the Stream 2 of the Channel K (CH_K) shown in FIG. 128 is 16-QAM.

In this case, the number of bits constituting each symbol of the data signal rs1 is four, and the number of bits constituting each symbol of the data signal rs2 is four. Accordingly, the data blocks rs1_1, rs1_2, rs1_3, rs1_4, rs2_1, rs2_2, rs2_3, and rs2_4 shown in FIG. 132 are each 4-bit data.

As shown in FIG. 132, the data rs1_1 and the data rs2_1 are demodulated at a time t1, the data rs1_2 and the data rs2_2 are demodulated at a time t2, the data rs1_3 and the data rs2_3 are demodulated at a time t3, and the data rs1_4 and the data rs2_4 are demodulated at a time t4.

Note that an advantageous effect is exhibited that when the data rs1_1 and the data rs1_2 shown in FIG. 132 are simultaneously distributed to each house and so on, there is a small delay in period when data is transmitted from the broadcast station to when the data reaches television (terminal). Similarly, the data rs1_2 and the data rs2_2 should be simultaneously distributed, the data rs1_3 and the data rs2_3 should be simultaneously distributed, and the data rs1_4 and the data rs2_4 should be simultaneously distributed.

Accordingly, the distribution data generating unit 12904 shown in FIG. 129 combines data pieces (symbols) transmitted simultaneously included in the data signals rs1 and rs2 received from the reception unit 12902, and performs processing so as to transmit the data signals in one symbol.

In other words, as shown in FIG. 133, one data symbol is composed of one symbol of the data signal rs1_1 and one symbol of the data signal rs2_1. Specifically, in the case where the data signal rs1_1 and the data signal rs1_2 are judged to 4-bit data "0000" and 4-bit data "1111", respectively as a result of hard decision, data pieces rs1_1+rs2_1 shown in FIG. 132 corresponds to data "00001111". The 8-bit data is defined as one data symbol. Similarly, data pieces rs1_2+rs2_2 are defined as one data symbol composed of one symbol of the data signal rs1_2 and one symbol of the data signal rs2_2, data pieces rs1_3+rs2_3 are defined as one data symbol composed of one symbol of the data signal rs1_3 and one symbol of the data signal rs2_3, and data pieces rs1_4+rs2_4 are defined as one data symbol composed of one symbol of the data signal rs1_4 and one symbol of the data signal rs2_4. In FIG. 133, the horizontal axis is the time domain, and squares each represent a data symbol to be transmitted at one time. Also, in FIG. 133, although the sign "+" is used for convenience, the sign "+" means not addition but data in a form where two data pieces are simply arranged.

By the way, the data pieces rs1_1+rs2_1, rs1_2+rs2_2, rs1_3+rs2_3, and rs1_4+rs2_4 are each 8-bit data, and each are data that needs to be transmitted at one time. Although the 16AQM modulation scheme is used for transmitting the data signals rs1 and rs2, it is impossible to transmit 8-bit data at one time in the 16-QAM modulation scheme.

In view of this, the modulation unit 13103 modulates the input combined data signal 13102 in a modulation scheme enabling transmission of 8-bit data at one time, namely, the 256-QAM modulation scheme. In other words, the modulation unit 13103 acquires information of a modulation scheme used for transmitting the two data signals from the information 12903_3 regarding the signal processing scheme. Then, the modulation unit 13103 modulates the combined data signal 13102 in a modulation scheme whose number of constellation points is equal to a product of multiplication of the respective numbers of constellation points of the acquired two modulation schemes. Then, the modulation unit 13103 outputs a modulated signal 13104 resulting from modulation performed in the new modulation scheme (256-QAM in this case) to the distribution unit 13105.

Note that, in the case where the number of modulated signals transmitted from the broadcast station is one, the reception unit 12902 and the distribution data generating unit 12904 distribute the received modulated signal without conversion to a cable (wire) using the pass-through scheme. (Here, the description is given on the scheme of making hard decision and again performing modulation. Alternatively, a received signal may be amplified for transmission.)

In FIG. 129, the distribution signal 12905 distributed via a cable (wire) is received by a television reception device 13400 shown in FIG. 134. The television reception device 13400 shown in FIG. 134 has substantially the same structure as that of the reception device 3700 shown in FIG. 37. Units in FIG. 134 that are common with those in FIG. 37 have the same reference signs, and description thereof is omitted here.

Upon receiving the distribution signal 12905 via a cable 13401, a tuner 3701 extracts a signal of a designated channel, and outputs the extracted signal to a demodulation unit 13402.

The demodulation unit 13402 has the following functions in addition to the functions of the demodulation unit 3700 shown in FIG. 37. Upon detecting that signals transmitted from the tuner 3701 are two or more signals which have been transmitted from a broadcast station in the same frequency band at the same time according to the control information included in the distribution signal 12905, the demodulation unit 13402 divides each of the received modulated signals to two or more signals according to the control information. In other words, the demodulation unit 13402 performs processing of restoring the signal from the state shown in FIG. 133 to the state shown in FIG. 132, and outputs a signal resulting from the processing to the stream input/output unit 3703. The demodulation unit 13402 calculates a log-likelihood of each received signal, makes hard decision on the received signal, and divides data resulting from the calculation and the hard decision according to a mixing ratio of a plurality of signals. Then, the demodulation unit 13402 performs processing such as error correction on each of data pieces resulting from the division to obtain data.

In this way, the television reception device 13400 provided in each house can demodulate and decode broadcasts distributed via a cable (wire) even with respect to a channel at which a plurality of modulated signals are transmitted from a broadcast station to a cable television system operator in the same frequency band at the same time.

By the way, although the respective modulation schemes used for transmitting the two data signals rs1 and rs2 are each 16-QAM in the present embodiment, combination of modulation schemes of transmitting a plurality of modulated signals is not limited to the combination of 16-QAM and 16-QAM. As an example, there are combinations shown in the following Table 2.

TABLE 2

| Number of modulated transmission signals | Modulation scheme | Re-modulation scheme |
|---|---|---|
| 2 | #1: BPSK, #2: BPSK | QPSK |
| 2 | #1: BPSK, #2: QPSK | 8QAM |
| 2 | #1: BPSK, #2: 16-QAM | 32QAM |
| 2 | #1: BPSK, #2: 64-QAM | 128QAM |
| 2 | #1: BPSK, #2: 128QAM | 256-QAM |
| 2 | #1: QPSK, #2: 16-QAM | 64-QAM |
| 2 | #1: QPSK, #2: 64-QAM | 256-QAM |
| 2 | #1: QPSK, #2: 128QAM | 512QAM |
| 2 | #1: 16-QAM, #2: 16-QAM | 256-QAM |
| 2 | #1: 16-QAM, #2: 64-QAM | 1024-QAM |
| 2 | #1: 16-QAM, #2: 128QAM | 2048QAM |
| . | . | . |
| . | . | . |
| . | . | . |

Table 2 shows the correspondence among the number of streams generated by the broadcast station (the number of modulated signals for transmission in Table 2), combination of modulation schemes used for generating the two streams (sign #1 and sign #2 in Table 2 represent modulation schemes for Stream 1 and Stream 2, respectively), and a re-modulation scheme as a modulation scheme for use in re-modulation on each combination by the modulation unit 13103.

In FIG. 131, a re-modulation scheme to be used by the modulation unit 13103 is included in a combination of modulation schemes, which is indicated by the information 12903_3 regarding the signal processing scheme and the transmission scheme used by the broadcast station for transmitting modulated signals which is received by the demodulation unit 13103 as input. Combinations shown here are just examples. As can be seen from Table 2, the number of constellation points of each re-modulation scheme is equal to a product of multiplication of the respective numbers of constellation points of the respective modulation schemes for two streams. Specifically, the product is a product of multiplication of the number of signal points of the mapping scheme for the Stream #1 on the I (in-phase)-Q (quadrature) plane and the number of signal points of the mapping scheme for the Stream #2 on the I (in-phase)-Q (quadrature) plane. In the case where the number of constellation points of the re-modulation scheme (the number of signal points of the re-modulation scheme on the I (in-phase)-Q (quadrature) plane) exceeds this product, a modulation scheme other than the re-modulation schemes shown in Table 2 may be used.

Furthermore, also in the case where the number of streams transmitted from the broadcast station is at least three, a modulation scheme to be used by the modulation unit 13103 is determined based on a product of multiplication of the respective numbers of constellation points of the respective modulation schemes for the streams.

In the present embodiment, the description has been given on the case where the relay device makes hard decision to combine data pieces. Alternatively, soft decision may be made. In the case where soft decision is made, it is necessary to correct a baseband signal mapped according to a re-modulation scheme based on a soft-decision value.

Also, as described above, the data signals rs1 and rs2 are output in FIG. 129. The reception unit 12902 may output a single data signal by combining these data signals rs1 and rs2. In this case, the number of data lines is one. In the case where the number of bits to be transmitted in one symbol of the Stream 1 is four and the number of bits to be transmitted in one symbol of the Stream 2 is four, the reception unit 12902 outputs the data signal via the single data line by defining 8-bit data as one data symbol. Here, a modulation scheme for re-modulation be used by the modulation unit 13103 shown in FIG. 131 is the same as described above, and is for example 256-QAM. That is, Table 2 is applicable.

FIG. 135 shows another structure of a relay device for the cable television system operator shown in FIG. 129. A reception unit 13502 and a distribution data generating unit 13504 included in the relay device shown in FIG. 135 differ from those in FIG. 129, and perform processing on only a signal having a frequency band at which a plurality of modulated signals transmitted from a broadcast station in the same frequency band at the same time. The distribution data generating unit 13504 combines the signals as described above, and generates a signal 13505 by mapping, on the frequency band, a signal modulated in a modulation scheme that differs from the modulation scheme used at transmission from the broadcast station, and outputs the generated signal 13505.

On the other hand, a signal 12901_1 received by an antenna 12900_1 is supplied to a filter 13506 in addition to the reception unit 13502.

In the case where a plurality of modulated signals are transmitted from the broadcast station in the same frequency band at the same time, the filter 13506 eliminates only a signal having the frequency band from the received signal 12901_1, and outputs a signal 13507 after filtering to a multiplexer 13508.

Then, the multiplexer 13508 multiplexes the signal 13507 after filtering and the signal 13505 output by the distribution data generating unit 13504 to generate a distribution signal 12905, and distributes the generated distribution signal 12905 to each house via a cable (wire).

With this structure, the relay device for the cable television system operator does not need to perform processing on a signal having a frequency band other than the frequency band at which the plurality of modulated signals have been transmitted at the same time.

Although the present embodiment has described the relay device for the cable television system operator, the relay device is not limited to this. The relay device described in the present embodiment is in the form shown in the portion (c) of FIG. 127. Alternatively, as shown in the portions (a) and (b) of FIG. 127, a relay device for an apartment building, a relay device for individual house, and so on may be used.

Also, in the present embodiment, frequency conversion is not performed on a signal having a frequency band at which a plurality of modulated signals have been transmitted. Alternatively, frequency conversion such as described in Embodiment M may be performed on a signal having the frequency band at which the plurality of modulated signals have been transmitted.

Embodiment O

In other embodiments, the description has been given on the case where the transmission scheme in which precoding and regular phase change are performed is used in the broadcast system. In the present embodiment, description is given on the case where the precoding scheme of regularly hopping between precoding matrices is used in the communication system. In the case for use in the communication system, the following three sets of communication configurations and transmission schemes are employed as shown in FIG. 136.

(1) Multicast communication: Like in other embodiments, with use of the transmission scheme in which precoding and regular phase change are performed, a base station can transmit data to many terminals.

For example, the precoding scheme of regularly hopping between precoding matrices is used for multicast communication for simultaneous distribution of contents from a base station 13601 to mobile terminals 13602*a* to 13602*c* (portion (a) in FIG. 136).

(2) Unicast communication and closed-loop (where feedback information is received from a communication terminal (specifically, CSI (Channel State Information) is fed back from the communication terminal or precoding matrices which are desirable to be used by the base station is designated by the communication terminal)): Based on the CSI transmitted from the communication terminal and/or information of the precoding matrices which are desirable to be used by the base station, the base station selects precoding matrices from among prepared precoding matrices. The base station performs precoding on a plurality of modulated signals using the selected precoding matrices, and transmits the plurality of modulated signals by a plurality of antennas in the same frequency band at the same time. FIG. 136 shows an example in portion (b).

(3) Unicast communication and open-loop (where hopping between precoding matrices is performed independent from information transmitted from a communication terminal): The base station uses the transmission scheme in which precoding and regular phase change are performed. FIG. 136 shows an example in portion (c).

Note that although FIG. 136 shows examples of communication between a base station and communication terminals, communication may be performed between base stations or between communication terminals.

The following describes the structure of a base station (transmission device) and a mobile terminal (reception device) for realizing the above communication configuration.

FIG. 137 shows an example of the structure of a transmission and reception device of a base station relating to the present embodiment. Units included in the transmission and reception device of the base station shown in FIG. 137 which have the same functions as the units included in the transmission device shown in FIG. 4 have the same reference signs, and description thereof is omitted. Description is given on only the structure different from in FIG. 4.

As shown in FIG. 137, the transmission and reception device of the base station includes, in addition to the units shown in FIG. 4, an antenna 13701, a wireless unit 13703, and a feedback information analysis unit 13705. Also, the transmission and reception device includes a signal processing scheme information generator 13714 instead of the signal processing scheme information generator 314, and includes a phase changer 13717 instead of the phase changer 317B.

The antenna 13701 is an antenna for receiving data transmitted from a communication partner of the transmission and reception device of the base station. Here, part of the reception device of the base station shown in FIG. 137 receives feedback information transmitted from the communication partner.

The wireless unit 13703 demodulates and decodes a reception signal 13702 received by the antenna 13701, and outputs a data signal 13704 resulting from demodulation and decoding to the feedback information analysis unit 13705.

The feedback information analysis unit 13705 acquires, from the data signal 13704, feedback information transmitted from the communication partner. The feedback information includes, for example, at least one of CSI, information of precoding matrices which are desirable to be used by the base station, a communication scheme to be requested to the base station (request information indicating whether multicast communication is to be used or unicast communication is to be used, and request information indicating whether open-loop is used or closed-loop is used). The feedback information analysis unit 13705 outputs the acquired feedback information as feedback information 13706.

The signal processing scheme information generator 13714 receives, as input, a frame structure signal 13713 and the feedback information 13706. The signal processing scheme information generator 13714 selects any one of the transmission schemes (1) to (3) described in the present embodiment, based on both the frame structure signal 13713 and the feedback information 13706 (a transmission scheme requested by a terminal may be prioritized or a transmission scheme desired by the base station may be prioritized). Then, the signal processing scheme information generator 13714 outputs control information 13715 including information of the selected transmission scheme. In the case where the transmission schemes (1) and (3) described in the present embodiment are each selected, the control information 13715 includes information regarding the transmission scheme in which precoding and regular phase change are performed. Also, in the case where the transmission scheme (2) described in the present embodiment is selected, the control information 13715 includes information of precoding matrices to be used.

The weighting units 308A and 308B each receive, as input, the control information 13715 including the information of the selected transmission scheme, performs precoding processing based on the designated precoding matrix.

The phase changer 13717 receives, as input, the control information 13715 including the information of the selected transmission scheme. In the case where the transmission schemes (1) and (3) described in the present embodiment are each selected, the phase changer 13717 performs regular phase changing processing on the precoded signal 316B received as input. Also, in the case where the transmission scheme (2) described in the present embodiment is selected, the phase changer 13717 performs fixed phase changing processing on the precoded signal 316B received as input using a designated phase (phase changing processing may not performed if unnecessary). Then, the phase changer 13717 outputs a post-phase-change signal 309B.

This allows the transmission device to perform transmission suitable for each of the above three communication configurations. In order to notify a terminal that is a communication partner of information of the transmission scheme indicating which one of the transmission schemes (1) to (3) described in the present embodiment is selected and so on, the wireless unit 310A receives, as input, the control information 13715 including the information of the selected transmission scheme. The wireless unit 310A generates a symbol for transmitting the information of the selected transmission scheme, and inserts the generated symbol into a transmission frame. A transmission signal 311A including this symbol is transmitted as a radio wave by the antenna 312A.

FIG. 138 shows an example of the structure of a reception device of a terminal relating to the present embodiment. As shown in FIG. 138, the reception device includes a reception unit 13803, a CSI generating unit 13805, a feedback information generating unit 13807, and a transmission unit 13809.

The reception unit 13803 has the same structure as those shown in FIGS. 7 and 8 in the above Embodiment 1. The reception unit 13803 receives, as input, a signal 13802A received by an antenna 13801A and a signal 13802B received by an antenna 13801B to acquire data transmitted from the transmission device.

Here, the reception unit 13803 outputs a signal 13804 of channel estimation information obtained in a process of acquiring the data to the CSI generating unit 13805. The signal 13804 of the channel estimation information is output for example from each of the channel fluctuation estimating units 705_1, 705_2, 707_1, and 707_2 shown in FIG. 7.

Based on the input signal 13804 of the channel estimation information, the CSI generating unit 13805 generates CQI (Channel Quality Information), RI (Rank Indication), and PCI (Phase Change Information) which are basis for feedback information to be fed back to the transmission device (CSI (Channel State Information)), and outputs the generated CQI, RI, and PCI to the feedback information generating unit 13807. The CQI and the RI are each generated by a conventional scheme. The PCI is information useful for the transmission device of the base station to determine phase changing values, which enable more preferable reception of signals in the reception device. The CSI generating unit 13805 generates, as PCI, more preferable information based on the input signal 13804 of the channel estimation information (useful information is, for example, the degree of influence by components of direct waves, the status of phase change in values obtained from channel estimation).

The feedback information generating unit 13807 generates the CSI based on the CQI, RI, and PCI generated by the CSI generating unit 13805. FIG. 139 shows an example of the frame structure of feedback information (CSI). Note that although the CSI here does not include PMI (Precoding Matrix Indicator), the CSI may include the PMI. The PMI is information for the reception device to designate precoding matrices for precoding which is desirable to be performed by the transmission device.

The transmission unit 13809 modulates the feedback information (CSI) transmitted from the feedback information generating unit 13807, and transmits a modulated signal 13810 to the transmission device by an antenna 13811.

Note that the terminal may feed all or part of the pieces of information shown in FIG. 139 back to the base station. Also, information to be fed back is not limited to the pieces of information shown in FIG. 139. The base station selects one of the transmission schemes (1) to (3) described in the present embodiment, based on the feedback information transmitted from the terminal. Here, the base station does not necessarily need to select a transmission scheme of transmitting a plurality of modulated signals by a plurality of antennas. The base station may select other transmission scheme such as a transmission scheme of transmitting one modulated signal by at least one antenna, based on feedback information transmitted from the terminal.

With the above structure, it is possible to select a transmission scheme suitable for each of the communication configurations (1) to (3) described in the present embodiment. This allows the terminal to achieve excellent data reception quality in every communication configuration.

Embodiment P1

Concerning the symbols for transmitting data as described in the present description, precoding and regular phase change are performed on the baseband signals (signals mapped based on the modulation scheme) s1 and s2 to obtain modulated signals (data symbols). In general, pilot symbols (SP (Scattered Pilot)) and symbols transmitting control information are inserted into the data symbols.

Pilot symbols are symbols modulated with use of, for example, PSK modulation according to regulations. A receiver can easily estimate, from a received signal, pilot symbols transmitted by a transmitter. With the pilot symbols, the receiver perform frequency synchronization (and frequency offset estimation), time synchronization, channel estimation (of each modulated signal) (estimation of CSI (Channel State Information)), and so on.

Concerning the symbols for transmitting data as described in the present description, modulated signals z1 and z2 refer to the modulated signals resulting from the baseband signals (signals mapped based on the modulation scheme) s1 and s2 being subjected to precoding and regular phase change, and description has been provided on two cases, i.e., the case where the average power of the modulated signal z1 is equalized with the average power of the modulated signal z2, and the case where these average powers are changed so that the average power of the modulated signal z1 thus changed differs from the average power of the modulated signal z2 thus changed. In both of the cases, it is desirable not to greatly change a scheme for inserting pilot symbols, in particular, the average power of the pilot symbols (i.e., the amplitude of a signal point for a pilot symbol in the I-Q plane (either the distance between the origin and a signal point for a pilot symbol or the signal power (power between the origin and a signal point for a pilot symbol)) in order to secure the accuracy of frequency estimation, time synchronization, and channel estimation.

Suppose that the pilot symbols having the equal average power are inserted, using the same pattern, into the modulated signals z1 and z2 on which precoding and regular phase change have been performed. In this case, average powers GD1 and GD2 are set to be unequal (a specific example of which is described in the present description). Here, the average power GD1 denotes the average power of symbols on which precoding and regular phase change have been performed, within the modulated signal z1 on which precoding and regular phase change have been performed, and, the average power GD2 denotes the average power of symbols on which precoding and regular phase change have been performed, within the modulated signal z2 on which precoding and regular phase change have been performed. A ratio GD1/GD2, which is the ratio of the average power GD1 to the average power GD2, do not coincide with a ratio G1/G2, which is the ratio of average power G1 of a transmission signal including: the symbols on which precoding and regular phase change have been performed, within the modulated signal z1 on which precoding and regular phase change have been performed; pilot symbols; control symbols; and so on (i.e., a transmission signal transmitted from the first antenna) to average power G2 of a transmission signal including: the symbols on which precoding and regular phase change have been performed, within the modulated signal z2 on which precoding and regular phase change have been performed; pilot symbols; control symbols; and so on (i.e., a transmission signal transmitted from the second antenna differing from the first antenna).

Accordingly, for example, suppose that the average power GD1 of symbols on which precoding and regular phase change have been performed, within the modulated signal z1 on which precoding and regular phase change have been performed, is ½ of the average power GD2 of symbols on which precoding and regular phase change have been performed, within the modulated signal z2 on which precoding and regular phase change have been performed (i.e., the power level difference between the average power GD1 and the average power GD2 is 3 dB). In this case, the ratio G1/G2 which is the ratio of the average power G1 of the transmission signal transmitted from the first antenna to the average power G2 of the transmission signal transmitted from the second antenna is not ½, and varies depending on the insertion frequency and average power of pilot symbols. In the case of attempting to improve both the reception quality of data received by the receiver and a data transmission speed, the system is configured to include more than one insertion pattern for the pilot symbols and to include more than one setting for the insertion frequency for the pilot symbols. FIGS. 142A and 142B illustrate an example of insertion patterns of pilot symbols in the time-frequency domain. Note that the number of carriers and the time stamps are not limited to those illustrated in FIGS. 142A and 142B. The values of both the number of carriers (horizontal axis) and the time stamps (vertical axis) may be arbitrarily determined. Concerning the carriers and the time stamps not illustrated in each of FIGS. 142A and 142B, the same pattern as illustrated is repeated.

The following describes details of FIGS. 142A and 142B, with use of FIG. 140.

FIG. 140 illustrates an example of the structure of a transmission device compliant with the DVB-T2 standard (e.g., a transmission device of a broadcast station), which performs phase change on a precoded signal. In FIG. 140, elements that operate in a similar way to those shown in FIG. 76 bear the same reference signs. Description on the operations of the transmission device in FIG. 140 is described later. The following provides detailed description on the frame configuration of FIG. 142.

FIG. 142A illustrates the frame configuration of a transmission signal in the time-frequency domain. If the frame configuration of a transmission signal transmitted from the antenna 7626_1 in FIG. 140 is as shown in FIG. 142A, the frame configuration of a transmission signal transmitted from the antenna 7626_2 is also as shown in FIG. 142A.

In this case, in the transmission signal transmitted from the antenna 7626_1 in FIG. 140, symbols corresponding to the frequencies and time stamps at which pilot symbols are inserted are based on the BPSK modulation. Similarly, in the transmission signal transmitted from the antenna 7626_2 in FIG. 140, symbols corresponding to the frequencies and time stamps at which pilot symbols are inserted are based on the BPSK modulation.

In the transmission signal transmitted from the antenna 7626_1 in FIG. 140, when θ is 0 or π radians in formula #P4 shown below, symbols corresponding to the frequencies and time stamps at which data symbols are inserted only include s1 components. Also, when θ is π/2 radians or (3×π)/2 radians, the data symbols only include s2 components. Furthermore, when the following conditions are all satisfied: 0 radians≤θ<2×π radians; θ@0 radians; θ≠π radians; θ≠π/2 radians; and θ≠(3×π)/2 radians, the data symbols include both s1 and s2 components.

In the transmission signal transmitted from the antenna 7626_2 in FIG. 140, when θ is 0 or π radians in formula #P4 shown below, symbols corresponding to the frequencies and time stamps at which data symbols are inserted only include s2 components. Also, when θ is π/2 radians or (3×π)/2 radians, the data symbols only include s1 components. Furthermore, when the following conditions are all satisfied: 0 radians≤θ<2×π radians; θ≠0 radians; θ≠π radians; θ≠π/2 radians; and θ≠(3×π)/2 radians, the data symbols include both s1 and s2 components.

FIG. 142B illustrates a frame configuration in a time-frequency domain differing from that in FIG. 142A. The frame configuration in FIG. 142B is characterized in that the insertion frequency of pilot symbols differs from that in FIG. 142A. Note that when the frame configuration of a transmission signal transmitted from the antenna 7626_1 in FIG. 140 is as shown in FIG. 142B, the frame configuration of a transmission signal transmitted from the antenna 7626_2 is also as shown in FIG. 142B.

In this case, in the transmission signal transmitted from the antenna 7626_1 in FIG. 140, symbols corresponding to the frequencies and time stamps at which pilot symbols are inserted are based on the BPSK modulation. Similarly, in the transmission signal transmitted from the antenna 7626_2 in FIG. 140, symbols corresponding to the frequencies and time stamps at which pilot symbols are inserted are based on the BPSK modulation.

In the transmission signal transmitted from the antenna 7626_1 in FIG. 140, when θ is 0 or π radians in formula #P4 shown below, symbols corresponding to the frequencies and time stamps at which data symbols are inserted only include s1 components. Also, when θ is π/2 radians or (3×π)/2 radians, the data symbols only include s2 components. Furthermore, when the following conditions are all satisfied: 0 radians≤θ<2×π radians; θ≠0 radians; θ≠π radians; θ≠π/2 radians; and θ≠(3×π)/2 radians, the data symbols include both s1 and s2 components.

In the transmission signal transmitted from the antenna 7626_2 in FIG. 140, when θ is 0 or π radians in formula #P4 shown below, symbols corresponding to the frequencies and time stamps at which data symbols are inserted only include s2 components. Also, when θ is π/2 radians or (3×π)/2 radians, the data symbols only include s1 components. Furthermore, when the following conditions are all satisfied: 0 radians≤θ<2×π radians; θ≠0 radians; θ≠π radians; θ≠π/2 radians; and θ≠(3×π)/2 radians, the data symbols include both s1 and s2 components.

Although FIGS. 142A and 142B each illustrate the frame configuration made up of only the pilot symbols and data symbols, the frame configuration may further include control symbols or the like. Alternatively, the frame configuration of only one of the transmission signals may include transmission symbols at a given frequency and time (i.e., the frame configuration of the other transmission signal may include no transmission symbols at the given frequency and time). Also, the data symbols may be symbols on which precoding and phase change have been performed, as described in other embodiments, may be symbols on which precoding has been performed, may be symbols on which precoding has not been performed (i.e., symbols mapped according to a predetermined modulation scheme), or may be symbols obtained by performing phase change on symbols on which precoding has not been performed.

In Embodiment F1 and Embodiments G1 to G2, description is provided on the scheme of setting the average power (average value) of s1 and s2 when the scheme for regularly performing phase change on the modulated signals after precoding is applied to the baseband signals s1 and s2 (i.e., signals mapped in a predetermined modulation scheme) generated from the error correction coded data. Also, in Embodiment J1, description is provided on a case where the average power (average value) of z1 after precoding and regular phase change have been performed differs from the average power (average value) of z2 after precoding and regular phase change have been performed.

In the present embodiment, a combination of Embodiment F1, Embodiments G1 to G2, and Embodiment J1 is considered, and description is provided on a scheme of setting the average power of baseband signals after precoding. This scheme is performed so as to achieve a desired ratio of the average power of the transmission signal transmitted from the first antenna (7626_1 of FIG. 140) to the average power of the transmission signal transmitted from the second antenna (7626_2 of FIG. 140). Specifically, the desired ratio is achieved by: setting an average power GD1 of symbols on which precoding and regular phase change have been performed, within a modulated signal p1($t$) (see FIG. 140) on which precoding and regular phase change have been performed, to be unequal to an average power GD2 of symbols on which precoding and regular phase change have been performed, within a modulated signal p2($t$) on which precoding and regular phase change have been performed; and, for example, inserting pilot symbols having equal average power with use of the same pattern (insertion scheme for frames).

Note that the following description is provided based on the presumption that the average power of each of the baseband signals (i.e., signals mapped according to a predetermined modulation scheme) s1 and s2 generated from the error correction coded data is equal.

FIG. 140 illustrates an example of the structure of a transmission device compliant with the DVB-T2 standard (e.g., a transmission device of a broadcast station), which performs phase change on a precoded signal. In FIG. 140, elements that operate in a similar way to those shown in FIG. 76 bear the same reference signs.

The pilot inserter 7614_1 receives, as input, the modulated signal p1 (7613_1) resulting from the signal processing and the control signal 7609, inserts pilot symbols into the received modulated signal p1 (7613_1), and outputs a modulated signal x1 (7615_1) after insertion of the pilot symbols. Note that the insertion of the pilot symbols is carried out based on information indicating the pilot symbol insertion scheme included in the control signal 7609.

The pilot inserter 7614_2 receives, as input, the modulated signal p2 (7613_2) resulting from the signal processing and the control signal 7609, inserts pilot symbols into the received modulated signal p2 (7613_2), and outputs a modulated signal x2 (7615_2) after insertion of the pilot symbols. Note that the insertion of the pilot symbols is carried out based on information indicating the pilot symbol insertion scheme included in the control signal 7609.

Concerning this point, the following describes the signal point arrangement for pilot symbols in the I-Q plane, and the average power of pilot symbols, with use of FIG. 144. FIG. 144 illustrates the signal point arrangement for pilot symbols in the I-Q plane. In the following description, the modulation scheme used for pilot symbols is assumed to be BPSK (Binary Phase Shift Keying) as one example. Accordingly, each pilot symbol takes either of the two circles in FIG. 144 (indicated by ○). Accordingly, the coordinates of each pilot symbol in the I-Q plane are either (I, Q)=($1\times v_p$, 0) or ($-1\times v_p$, 0). At this time, the average power of pilot symbols is $v_p^2$. (Note that the square of the distance between the signal point of a pilot symbol and the origin (power of a pilot symbol) is $v_p^2$, and the distance between the signal point of a pilot symbol and the origin (amplitude of a pilot symbol) is $v_p$.) Although detailed description is provided later, the value of $v_p$ varies depending on the insertion scheme of pilot symbols (insertion interval, etc.). For example, the value of $v_p$ may be changed between the frame configuration in FIG. 142A and the frame configuration in FIG. 142B. Also, in FIG. 142A, it is possible to prepare two or more values for $v_p$, select one of these values, and use the selected value. Similarly, in FIG. 142B, it is possible to prepare two or more values for $v_p$, select one of these values, and use the selected value.

FIGS. 141 and 143 each illustrate an example of the structure of the power changers and the weighting unit that constitute the signal processor 7612 in FIG. 140. Note that in FIG. 141, elements that operate in a similar way to those shown in FIGS. 3, 6, and 85 bear the same reference signs. Also, in FIG. 143, elements that operate in a similar way to FIGS. 3, 6, 85, and 140 bear the same reference signs.

The following provides detailed description on a scheme of controlling the average power of baseband signals after precoding so as to obtain a desired ratio of the average power level of the transmission signal tr1 (7623_1) transmitted from the first transmission (transmit) antenna to the average power level of the transmission signal tr2 (7623_2) transmitted from the second (transmit) transmission antenna.

Example 1

First, an example of operations is described using FIG. 141. In FIG. 141, s1($t$) and s2($t$) are each a baseband signal mapped according to a predetermined modulation scheme. Note that t is time, and description is provided by taking the time domain as an example in the present embodiment. (As described in other embodiments of the present description, t may be changed to f (frequency) to achieve similar embodiments.)

In FIG. 141, a power changer (14101A) receives the precoded baseband signal 309A and a control signal (14100) as input. Letting a value for power change set based on the control signal (14100) be Q, the power changer outputs a signal (power-changed signal 14103A) (p1($t$)) obtained by multiplying the precoded baseband signal 309A by Q. Note that the power-changed signal 14103A (p1($t$)) corresponds to the signal 7613_1 (p1(t)) in FIG. 140.

A power changer (14101B) receives the precoded baseband signal 316B and the control signal (14100) as input. Letting a value for power change set based on the control signal (14100) be q, the power changer outputs a signal (power-changed signal 14102B) (p2'($t$)) obtained by multiplying the precoded baseband signal 316B by q.

The phase changer (317B) receives the power-changed signal 14102B (p2'($t$)) and the signal processing scheme information 315, regularly changes the phase of the power-changed signal 14102B (p2'($t$)), and outputs a phase-changed signal 14103B (p2($t$)). Note that the phase-changed signal 14103B (p2($t$)) corresponds to the signal 7613_2 (p2($t$)) in FIG. 140.

Also, the control signal (8500), the control signal (14100), and the signal processing scheme information 315 are parts of the control signal 7609 output from the control signal generator (7608) to the signal processor (7612) shown in FIG. 140. Also, Q and q are each a real number other than 0.

In this case, letting the precoding matrix be F, and the phase changing value used for regularly performing phase change in the scheme for regularly performing phase change on the modulated signals after precoding be y(t) (y(t) may be an imaginary number (or a real number) having the absolute value of 1, e.g., $e^{j\theta(t)}$, the following formula is satisfied.

[Math. 108]

$$\begin{pmatrix} p1(t) \\ p2(t) \end{pmatrix} = \begin{pmatrix} 1 & 0 \\ 0 & y(t) \end{pmatrix} \begin{pmatrix} Qe^{j0} & 0 \\ 0 & qe^{j0} \end{pmatrix} F \begin{pmatrix} ve^{j0} & 0 \\ 0 & ue^{j0} \end{pmatrix} \begin{pmatrix} s1(t) \\ s2(t) \end{pmatrix} = \begin{pmatrix} 1 & 0 \\ 0 & y(t) \end{pmatrix} \begin{pmatrix} Q & 0 \\ 0 & q \end{pmatrix} F \begin{pmatrix} v & 0 \\ 0 & u \end{pmatrix} \begin{pmatrix} s1(t) \\ s2(t) \end{pmatrix} \quad \text{(Formula \#P1)}$$

Here, let the precoding matrix F be expressed by the following formula.

[Math. 109]

$$F=\frac{1}{\sqrt{\alpha^2+1}}\begin{pmatrix} e^{j0} & \alpha\times e^{j0} \\ \alpha\times e^{j0} & e^{j\pi}\end{pmatrix} \quad \text{(Formula \#P2)}$$

In this case, the following formula is obtained.

[Math. 110]

$$\begin{aligned}\begin{pmatrix} p1(t) \\ p2(t)\end{pmatrix} &= \begin{pmatrix} 1 & 0 \\ 0 & y(t)\end{pmatrix}\begin{pmatrix} Qe^{j0} & 0 \\ 0 & qe^{j0}\end{pmatrix}\begin{pmatrix} \frac{e^{j0}}{\sqrt{\alpha^2+1}} & \frac{\alpha\times e^{j0}}{\sqrt{\alpha^2+1}} \\ \frac{\alpha\times e^{j0}}{\sqrt{\alpha^2+1}} & \frac{e^{j\pi}}{\sqrt{\alpha^2+1}}\end{pmatrix}\begin{pmatrix} ve^{j0} & 0 \\ 0 & ue^{j0}\end{pmatrix}\begin{pmatrix} s1(t) \\ s2(t)\end{pmatrix} \\ &= \frac{1}{\sqrt{\alpha^2+1}}\begin{pmatrix} 1 & 0 \\ 0 & y(t)\end{pmatrix}\begin{pmatrix} Q & 0 \\ 0 & q\end{pmatrix}\begin{pmatrix} 1 & \alpha \\ \alpha & -1\end{pmatrix}\begin{pmatrix} v & 0 \\ 0 & u\end{pmatrix}\begin{pmatrix} s1(t) \\ s2(t)\end{pmatrix} \\ &= \begin{pmatrix} 1 & 0 \\ 0 & y(t)\end{pmatrix}\begin{pmatrix} Q & 0 \\ 0 & q\end{pmatrix}\begin{pmatrix} \cos\theta & \sin\theta \\ \sin\theta & -\cos\theta\end{pmatrix}\begin{pmatrix} v & 0 \\ 0 & u\end{pmatrix}\begin{pmatrix} s1(t) \\ s2(t)\end{pmatrix}\end{aligned} \quad \text{(Formula \#P3)}$$

Accordingly, the precoding matrix F may be expressed by the following formula instead of formula #P2.

[Math. 111]

$$F=\begin{pmatrix} \cos\theta & \sin\theta \\ \sin\theta & -\cos\theta\end{pmatrix} \quad \text{(Formula \#P4)}$$

Operations similar to those pertaining to FIG. 141 can be realized by the structure in FIG. 143 which differs from the structure in FIG. 141. Accordingly, the following describes the operations pertaining to FIG. 143.

FIG. 143 differs from FIG. 141 in that the order of the phase changer 317B and the power changer 14101B is switched around.

The phase changer (317B) of FIG. 143 receives the precoded baseband signal 316B and the signal processing scheme information 315 as input, regularly changes the phase of the precoded baseband signal 316B, and outputs a phase-changed signal 14301B(p2"($t$)).

The power changer 14101B receives the phase-changed signal 14301B(p2"($t$)) and the control signal 14100 as input. Letting a value for power change set based on the control signal (14100) be q, the power changer 14101B outputs a signal (power-changed signal 14302B) (p2($t$)) obtained by multiplying the phase-changed signal 14301B(p2"($t$)) by q. Note that the phase-changed signal 14302B(p2($t$)) corresponds to the signal 7613_2($p$2($t$)) in FIG. 140.

In this case, letting the precoding matrix be F, and the phase changing value used for regularly performing phase change in the scheme for regularly performing phase change on the modulated signals after precoding be y(t) (y(t) may be an imaginary number (or a real number) having the absolute value of 1, e.g., $e^{j\theta(t)}$, the following formula is satisfied.

[Math. 112]

$$\begin{aligned}\begin{pmatrix} p1(t) \\ p2(t)\end{pmatrix} &= \begin{pmatrix} Qe^{j0} & 0 \\ 0 & qe^{j0}\end{pmatrix}\begin{pmatrix} 1 & 0 \\ 0 & y(t)\end{pmatrix}F\begin{pmatrix} ve^{j0} & 0 \\ 0 & ue^{j0}\end{pmatrix}\begin{pmatrix} s1(t) \\ s2(t)\end{pmatrix} \\ &= \begin{pmatrix} Q & 0 \\ 0 & q\end{pmatrix}\begin{pmatrix} 1 & 0 \\ 0 & y(t)\end{pmatrix}F\begin{pmatrix} v & 0 \\ 0 & u\end{pmatrix}\begin{pmatrix} s1(t) \\ s2(t)\end{pmatrix}\end{aligned} \quad \text{(Formula \#P5)}$$

Here, letting precoding matrix F be expressed by formula #P2, the following formula is satisfied.

[Math. 113]

$$\begin{aligned}\begin{pmatrix} p1(t) \\ p2(t)\end{pmatrix} &= \begin{pmatrix} Qe^{j0} & 0 \\ 0 & qe^{j0}\end{pmatrix}\begin{pmatrix} 1 & 0 \\ 0 & y(t)\end{pmatrix}\begin{pmatrix} \frac{e^{j0}}{\sqrt{\alpha^2+1}} & \frac{\alpha\times e^{j0}}{\sqrt{\alpha^2+1}} \\ \frac{\alpha\times e^{j0}}{\sqrt{\alpha^2+1}} & \frac{e^{j\pi}}{\sqrt{\alpha^2+1}}\end{pmatrix}\begin{pmatrix} ve^{j0} & 0 \\ 0 & ue^{j0}\end{pmatrix}\begin{pmatrix} s1(t) \\ s2(t)\end{pmatrix} \\ &= \frac{1}{\sqrt{\alpha^2+1}}\begin{pmatrix} Q & 0 \\ 0 & q\end{pmatrix}\begin{pmatrix} 1 & 0 \\ 0 & y(t)\end{pmatrix}\begin{pmatrix} 1 & \alpha \\ \alpha & -1\end{pmatrix}\begin{pmatrix} v & 0 \\ 0 & u\end{pmatrix}\begin{pmatrix} s1(t) \\ s2(t)\end{pmatrix} \\ &= \begin{pmatrix} Q & 0 \\ 0 & q\end{pmatrix}\begin{pmatrix} 1 & 0 \\ 0 & y(t)\end{pmatrix}\begin{pmatrix} \cos\theta & \sin\theta \\ \sin\theta & -\cos\theta\end{pmatrix}\begin{pmatrix} v & 0 \\ 0 & u\end{pmatrix}\begin{pmatrix} s1(t) \\ s2(t)\end{pmatrix}\end{aligned} \quad \text{(Formula \#P6)}$$

Accordingly, the precoding matrix F may be expressed by formula #P4 instead of formula #P2.

Note that based on formulas #P3 and #P6, it can be determined that p1($t$) obtained by the operations in FIG. 140 is identical to p1($t$) obtained by the operations in FIG. 141, and that p2($t$) obtained by the operations in FIG. 140 is identical to p2($t$) obtained by the operations in FIG. 141.

Note that according to the above description, a desired ratio is obtained between the average power level of the transmission signal tr1 (7623_1) transmitted from the first transmission antenna and the average power level of the transmission signal tr2 (7623_2) transmitted from the second transmission antenna. However, in a case where a symbol for transmitting only a single modulated signal exists within a frame to be transmitted, various schemes is applicable as a scheme to determine "the average power level of the transmission signal tr1 (7623_1) transmitted from the first transmission antenna" and "the average power level of the transmission signal tr2 (7623_2) transmitted from the second transmission antenna". Accordingly, in the present embodiment, description is provided on a scheme in a case where a symbol for transmitting only a single modulated signal does not exist, with use of FIG. 142. In other words, description is provided on a scheme, according to the present invention, for obtaining a desired ratio of the average power level of the transmission signal tr1 (7623_1) transmitted from the first transmission antenna to the average power level of the transmission signal tr2 (7623_2) transmitted from the second transmission antenna.

Note that FIG. 140 shows P1 symbol inserter 7622, and a P1 symbol is transmitted by a single modulated signal. Accordingly, the following considers a case where pilot symbols and data symbols are transmitted in the frame configuration in FIG. 142.

The following describes the specific requirements in the present invention, which are beneficial for a frame configuration differing from the above frame configuration, for example, a frame configuration in which data symbols are transmitted by a single modulated signal or a frame configuration in which a P1 symbol is inserted in a transmission frame.

In FIG. 140, it is assumed that: the modulated signals after insertion of pilot symbols are x1(*t*) and x2(*t*); GP denotes the average power of pilot symbols inserted in the modulated signals p1(*t*) and p2(*t*); and Ps denotes the ratio of pilot symbols to all symbols in the modulated signals x1(*t*) and x2(*t*) after insertion of pilot symbols.

Also, it is assumed that: GD1 denotes the average power of symbols on which precoding and regular phase change have been performed, within p1(*t*) (see FIG. 140) on which precoding and regular phase change have been performed; and GD2 denotes the average power of symbols on which precoding and regular phase change have been performed, within p2(*t*) (see FIG. 140) on which precoding and regular phase change have been performed.

In this case, the average power G1 of the transmission signal tr1 (7623_1) transmitted from the first transmission antenna and the average power G2 of the transmission signal tr2 (7623_2) transmitted from the second transmission antenna may be expressed by the following formulas.

[Math. 114]

$$G1=Ps\times GP+(1-Ps)\times GD1$$

$$G2=Ps\times GP+(1-Ps)\times GD2 \quad \text{(Formulas \#P7)}$$

Here, description is provided on a scheme of controlling the average power of baseband signals after precoding when the average power of the signal tr1(*t*) transmitted from the first transmission antenna is ½ of the average power of the signal tr2 transmitted from the second transmission antenna, i.e., when G1:G2=1:2.

For example, pilot symbols are inserted with any of the following four different schemes.

(Rule #1)

The insertion interval (insertion scheme) in a frame is set as shown in FIG. 142A, and the mapping scheme for pilot symbols is set to $v_p=z\times v_1$. In other words, the pilot symbols included in the transmission signal transmitted from the antenna 7626_1 in FIG. 140 and the pilot symbols included in the transmission signal transmitted from the antenna 7626_2 in FIG. 140 are both set to $v_p=z\times v_1$. (Note that $v_p$ is as described above, and is as shown in FIG. 144.)

(Rule #2)

The insertion interval (insertion scheme) in a frame is set as shown in FIG. 142A, and the mapping scheme for pilot symbols is set to $v_p=z\times v_2$ (where $v_1\neq v_2$). In other words, the pilot symbols included in the transmission signal transmitted from the antenna 7626_1 in FIG. 140 and the pilot symbols included in the transmission signal transmitted from the antenna 7626_2 in FIG. 140 are both set to $v_p=z\times v_2$. (Note that $v_p$ is as described above, and is as shown in FIG. 144.)

(Rule #3)

The insertion interval (insertion scheme) in a frame is set as shown in FIG. 142B, and the mapping scheme for pilot symbols is set to $v_p=z\times v_3$. In other words, the pilot symbols included in the transmission signal transmitted from the antenna 7626_1 in FIG. 140 and the pilot symbols included in the transmission signals transmitted from the antenna 7626_2 in FIG. 140 are both set to $v_p=z\times v_3$. (Note that $v_p$ is as described above, and is as shown in FIG. 144.)

(Rule #4)

The insertion interval (insertion scheme) in a frame is set as shown in FIG. 142B, and the mapping scheme for pilot symbols is set to $v_p=z\times v_4$ (where $v_3$ $v_4$). In other words, the pilot symbols included in the transmission signal transmitted from the antenna 7626_1 in FIG. 140 and the pilot symbols included in the transmission signals transmitted from the antenna 7626_2 in FIG. 140 are both set to $v_p=z\times v_4$. (Note that $v_p$ is as described above, and is as shown in FIG. 144.)

Note that in a case where pilot symbols are inserted into the modulated signals x1(*t*) and x2(*t*) by the scheme of (Rule #i) (i being an integer from 1 to 4) after insertion of pilot symbols, the average power of the transmission signal tr1 (7623_1) transmitted from the first transmission antenna (average power of the modulated signal x1(*t*)) is expressed by the following formula, in which Psi denotes the ratio of the pilot symbols to all the symbols.

$$G1=v_p^2\times Ps_i+GD1\times(1-Ps_i)=z^2\times v_i^2\times Ps_i+GD1\times(1-Ps_i)$$

Similarly, the average power of the transmission signal tr2 (7623_2) transmitted from the second transmission antenna (average power of the modulated signal x2(*t*)) is expressed by the following formula.

$$G2=z^2\times v_i^2\times Ps_i+GD2\times(1-Ps_i)$$

Example 1-1

The following describes an example where the modulation scheme for the baseband signal s1(*t*) is QPSK, the modulation scheme for the baseband signal s2(*t*) is 16-QAM, and precoding is performed on the baseband signals s1(*t*) and s2(*t*).

The signal point arrangement for QPSK in the I-Q plane is as shown in FIG. 81, and the signal point arrangement for 16-QAM in the I-Q plane is as shown in FIG. 80. Also, the following two formulas are satisfied in order to equalize the average power of s1(*t*) which is the baseband signal of QPSK, and the average power of s2(*t*) which is the baseband signal of 16-QAM.

[Math. 115]

$$h=\frac{z}{\sqrt{2}} \quad \text{(Formula \#P8)}$$

[Math. 116]

$$g=\frac{z}{\sqrt{10}} \quad \text{(Formula \#P9)}$$

Description on this point is also provided in Embodiment F1.

In (Example 1-1), the average power of the transmission signal tr1 (7623_1) transmitted from the first transmission antenna (average power of the modulated signal x1(*t*)) is set to ½ of the average power of the transmission signal tr2 (7623_2) transmitted from the second transmission antenna (average power of the modulated signal x2(*t*)) (G1=G2/2, i.e., G1:G2=1:2). (G1:G2 is set to a desired ratio of 1:2.)

The following describes the operations of the signal processor 7612 in FIG. 140, i.e., the operations in FIG. 141 (or FIG. 143) when G1:G2 is set to the desired ratio of 1:2.

Given that s1($t$) is the baseband signal of QPSK, and s2($t$) is the baseband signal of 16-QAM, the precoding matrix F is set such that $\alpha=0$ in formula #P2 (i.e., $\theta=0°$ (0 degrees) in formula #P4) so as to achieve high data reception quality for the reception device. In this case, the following formula is obtained.

[Math. 117]

$$F=\begin{pmatrix} e^{j0} & 0 \\ 0 & e^{j\pi} \end{pmatrix} \qquad \text{(Formula \#P10)}$$

Note that the following formula may be used instead of formula #P10.

[Math. 118]

$$F=\begin{pmatrix} e^{j0} & 0 \\ 0 & e^{j0} \end{pmatrix} \qquad \text{(Formula \#P11)}$$

Then, values for power change in the power changers 8501A and 8501B in FIG. 141 (FIG. 143) are set to $v^2=u^2=0.5$.

In this case, the modulated signals p1($t$) and p2($t$) are expressed by the following formula.

[Math. 119]

$$\begin{aligned}\begin{pmatrix} p1(t) \\ p2(t) \end{pmatrix} &= \begin{pmatrix} 1 & 0 \\ 0 & y(t) \end{pmatrix}\begin{pmatrix} Qe^{j0} & 0 \\ 0 & qe^{j0} \end{pmatrix} \\ &\quad \begin{pmatrix} e^{j0} & 0 \\ 0 & e^{j\pi} \end{pmatrix}\begin{pmatrix} ve^{j0} & 0 \\ 0 & ue^{j0} \end{pmatrix}\begin{pmatrix} s1(t) \\ s2(t) \end{pmatrix} \\ &= \begin{pmatrix} Qv & 0 \\ 0 & -quy(t) \end{pmatrix}\begin{pmatrix} s1(t) \\ s2(t) \end{pmatrix}\end{aligned} \qquad \text{(Formula \#P12)}$$

Accordingly, the average power of the modulated signal p1($t$) (the average value of the square of the amplitude of each signal point on a per-symbol basis in the I-Q plane) is expressed as GD1=$Q^2v^2\times 2h^2=Q^2z^2/2$, and the average power of the modulated signal p2($t$) is expressed as GD2=$q_2u^2\times 10g^2=q^2z^2/2$.

In order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are changed according to the average power of pilot symbols (i.e., $v_p$ in FIG. 144) inserted into the modulated signals p1($t$) and p2($t$) and the insertion frequency of pilot symbols, as described above.

Description on this point is described below with use of an example.

In (Rule #1) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#1}$ and $q_{\#1}$, respectively. (Note that $Q_{\#1}<q_{\#1}$.)

Similarly, in (Rule #2) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#2}$ and $q_{\#2}$, respectively. (Note that $Q_{\#2}<q_{\#2}$.)

Similarly, in (Rule #3) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#3}$ and $q_{\#3}$, respectively. (Note that $Q_{\#3}<q_{\#3}$.)

Similarly, in (Rule #4) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#4}$ and $q_{\#4}$, respectively. (Note that $Q_{\#4}<q_{\#4}$.)

Note that according to the above description, the average power of the transmission signal tr1 (7623_1) transmitted from the first transmission antenna (average power of the modulated signal x1($t$)) is set to ½ of the average power of the transmission signal tr2 (7623_2) transmitted from the second transmission antenna (average power of the modulated signal x2($t$)) (G1=G2/2, i.e., G1:G2=1:2); however, in practice, the average power of the transmission signal tr1 (7623_1) transmitted from the first transmission antenna (average power of the modulated signal x1($t$)) is set to approximately ½ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-1)

There exist i that is an integer from 1 to 4, and j that is an integer from 1 to 4, satisfying i≠j and $Q_{\#i} \neq Q_{\#j}$.

Similarly, the following condition is satisfied.

(Condition #P-2)

There exist i that is an integer from 1 to 4, and j that is an integer from 1 to 4, satisfying i≠j and $q_{\#i} \neq q_{\#j}$.

Concerning the schemes for inserting pilot symbols, there may be a scheme different from those mentioned in (Rule #1) to (Rule #4) above. For example, the average power of pilot symbols (i.e., the value of $v_p$) included in the transmission signal transmitted from the antenna 7626_1 in FIG. 140 may differ from the average power of pilot symbols (i.e., the value of $v_p$) included in the transmission signal transmitted from the antenna 7626_2 in FIG. 140. (In view of improvement of the accuracy of channel estimation in the reception device, it is desirable that the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described in (Rule #1) to (Rule #4). (Note that $v_p$ is as described above, and is as shown in FIG. 144.)

For example, pilot symbols are inserted with any of the following four different schemes.

(Rule #5)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p = z \times v_{5,1}$ is satisfied for the pilot symbols included in the transmission signal transmitted from the antenna 7626_1 in FIG. 140, and $v_p = z \times v_{5,2}$ is satisfied for the pilot symbols included in the transmission signal transmitted from the antenna 7626_2 in FIG. 140. Here, $v_{5,1} \neq v_{5,2}$. (Note that $v_p$ is as described above, and is as shown in FIG. 144.)

(Rule #6)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p = z \times v_{6,1}$ is satisfied for the pilot symbols included in the transmission signal transmitted from the antenna 7626_1 in FIG. 140, and $v_p = z \times v_{6,2}$ is satisfied for the pilot symbols included in the transmission signal transmitted from the antenna 7626_2 in FIG. 140. Here, $v_{6,1} \neq v_{6,2}$. Also, $v_{5,1} \neq v_{6,1}$ and $v_{5,2} \neq v_{6,1}$ are satisfied, or alternatively, $v_{5,1} \neq v_{6,2}$ and $v_{5,2} \neq v_{6,2}$ are satisfied. (Note that $v_p$ is as described above, and is as shown in FIG. 144.)

(Rule #7)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p = z \times v_{7,1}$ is satisfied for the pilot symbols included in the transmission signal transmitted from the antenna 7626_1 in FIG. 140, and $v_p = z \times v_{7,2}$ is satisfied for the pilot symbols included in the transmission signal transmitted from the antenna 7626_2 in FIG. 140. Here, $v_{7,1} \neq v_{7,2}$. (Note that $v_p$ is as described above, and is as shown in FIG. 144.)

(Rule #8)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p = z \times v_{8,1}$ is satisfied for the pilot symbols included in the transmission signal transmitted from the antenna 7626_1 in FIG. 140, and $v_p = z \times v_{8,2}$ is satisfied for the pilot symbols included in the transmission signal transmitted from the antenna 7626_2 in FIG. 140. Here, $v_{8,1} \neq v_{8,2}$. Also, $v_{7,1} \neq v_{8,1}$ and $v_{7,2} \neq v_{8,1}$ are satisfied, or alternatively, $v_{7,1} \neq v_{8,2}$ and $v_{7,2} \neq v_{8,2}$ are satisfied. (Note that $v_p$ is as described above, and is as shown in FIG. 144.)

The modulation scheme for the baseband signal s1(*t*) is QPSK, the modulation scheme for the baseband signal s2(*t*) is 16-QAM, and the mapping scheme for each modulation scheme is as described above. Also, the precoding scheme and the values for power change in the power changers 8501A and 8501B in FIG. 141 (FIG. 143) are as described above (θ=0°, and $v^2 = u^2 = 0.5$).

In (Rule #5) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#5}$ and $q_{\#5}$, respectively. (Note that $Q_{\#5} < q_{\#5}$.)

Similarly, in (Rule #6) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#6}$ and $q_{\#6}$, respectively. (Note that $Q_{\#6} < q_{\#6}$.)

Similarly, in (Rule #7) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#7}$ and $q_{\#7}$, respectively. (Note that $Q_{\#7} < q_{\#7}$.)

Similarly, in (Rule #8) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#8}$ and $q_{\#8}$, respectively. (Note that $Q_{\#8} < q_{\#8}$.)

Note that according to the above description, the average power of the transmission signal tr1 (7623_1) transmitted from the first transmission antenna (average power of the modulated signal x1(*t*)) is set to ½ of the average power of the transmission signal tr2 (7623_2) transmitted from the second transmission antenna (average power of the modulated signal x2($t$)) (G1=G2/2, i.e., G1:G2=1:2); however, in practice, the average power of the transmission signal tr1 (7623_1) transmitted from the first transmission antenna (average power of the modulated signal x1($t$)) is set to approximately ½ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-3)

There exist i that is an integer from 5 to 8, and j that is an integer from 5 to 8, satisfying i≠j and $Q_{\#i} \neq Q_{\#j}$.

Similarly, the following condition is satisfied.

(Condition #P-4)

There exist i that is an integer from 5 to 8, and j that is an integer from 5 to 8, satisfying i≠j and $q_{\#i} \neq q_{\#j}$.

Note that the transmission device may select either of the following two pilot symbol insertion schemes, i.e., (i) a pilot symbol insertion scheme in which the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described above in (Rule #1) to (Rule #4) and (ii) a pilot symbol insertion scheme in which the average power of pilot symbols (i.e., the value of $v_p$) included in the transmission signal transmitted from the antenna 7626_1 in FIG. 140 is not equal to the average power of pilot symbols (i.e., the value of $v_p$) included in the transmission signal transmitted from the antenna 7626_2 in FIG. 140, as described above in (Rule #5) to (Rule #8).

The following describes an example in which the transmission device selects a pilot symbol insertion scheme from among the pilot symbol insertion schemes described in (Rule #1) to (Rule #8) to transmit a modulated signal.

Note that according to the above description, the average power of the transmission signal tr1 (7623_1) transmitted from the first transmission antenna (average power of the modulated signal x1($t$)) is set to ½ of the average power of the transmission signal tr2 (7623_2) transmitted from the second transmission antenna (average power of the modulated signal x2($t$)) (G1=G2/2, i.e., G1:G2=1:2); however, in practice, the average power of the transmission signal tr1 (7623_1) transmitted from the first transmission antenna (average power of the modulated signal x1($t$)) is set to approximately ½ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-5)

There exist i that is an integer from 1 to 8, and j that is an integer from 1 to 8, satisfying i≠j and $Q_{\#i} \neq Q_{\#j}$.

Similarly, the following condition is satisfied.

(Condition #P-6)

There exist i that is an integer from 1 to 8, and j that is an integer from 1 to 8, satisfying i≠j and $q_{\#i} \neq q_{\#j}$.

Example 1-2

The following describes an example where the modulation scheme for the baseband signal s1($t$) is 16-QAM, the modulation scheme for the baseband signal s2($t$) is 16-QAM, and precoding is performed on the baseband signals s1($t$) and s2($t$).

The signal point arrangement for 16-QAM in the I-Q plane is as shown in FIG. 80. Also, formula #P9 is satisfied in order to equalize the average power of s1($t$) which is the baseband signal of 16-QAM, and the average power of s2($t$) which is the baseband signal of 16-QAM. Description on this point is also provided in Embodiment F1.

In (Example 1-2), the average power of the transmission signal tr1 (7623_1) transmitted from the first transmission antenna (average power of the modulated signal x1($t$)) is set to ½ of the average power of the transmission signal tr2 (7623_2) transmitted from the second transmission antenna (average power of the modulated signal x2($t$)) (G1=G2/2, i.e., G1:G2=1:2). (G1:G2 is set to the desired ratio of 1:2.)

The following describes the operations of the signal processor 7612 in FIG. 140, i.e., the operations in FIG. 141 (or FIG. 143) when G1:G2 is set to the desired ratio of 1:2.

Given that s1($t$) is the baseband signal of 16-QAM, and s2($t$) is the baseband signal of 16-QAM, the precoding matrix F is set such that θ=25° (25 degrees) in formula #P4 so as to achieve high data reception quality for the reception device.

Then, values for power change in the power changers 8501A and 8501B in FIG. 141 (FIG. 143) are set to $v^2=u^2=0.5$.

In order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are changed according to the average power of pilot symbols (i.e., $v_p$ in FIG. 144) inserted into the modulated signals p1($t$) and p2($t$) and the insertion frequency of pilot symbols, as described above.

Description on this point is described below with use of an example.

In (Rule #1) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#1}$ and $q_{\#1}$, respectively. (Note that $Q_{\#1}<q_{\#1}$).

Similarly, in (Rule #2) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#2}$ and $q_{\#2}$, respectively. (Note that $Q_{\#2}<q_{\#2}$.)

Similarly, in (Rule #3) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#3}$ and $q_{\#3}$, respectively. (Note that $Q_{\#3}<q_{\#3}$.)

Similarly, in (Rule #4) above pertaining to a pilot symbol insertion scheme, in order to satisfy the condition that the average power of the transmission signal tr1 (7623_1) transmitted from the first transmission antenna (average power of the modulated signal x1($t$)) is ½ of the average power of the transmission signal tr2 (7623_2) transmitted from the second transmission antenna (average power of the modulated signal x2($t$)) (G1=G2/2, i.e., G1:G2=1:2), the values Q and q for power change in the power changers 14101A and 14101B in FIG. 141 (FIG. 143) are set to $Q_{\#4}$ and $q_{\#4}$, respectively. (Note that $Q_{\#4}<q_{\#4}$.)

Note that according to the above description, the average power of the transmission signal tr1 (7623_1) transmitted from the first transmission antenna (average power of the modulated signal x1($t$)) is set to ½ of the average power of the transmission signal tr2 (7623_2) transmitted from the second transmission antenna (average power of the modulated signal x2($t$)) (G1=G2/2, i.e., G1:G2=1:2); however, in practice, the average power of the transmission signal tr1 (7623_1) transmitted from the first transmission antenna (average power of the modulated signal x1($t$)) is set to approximately ½ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-7)

There exist i that is an integer from 1 to 4, and j that is an integer from 1 to 4, satisfying i≠j and $Q_{\#i}\neq Q_{\#j}$.

Similarly, the following condition is satisfied.

(Condition #P-8)

There exist i that is an integer from 1 to 4, and j that is an integer from 1 to 4, satisfying i≠j and $Q_{\#i}\neq Q_{\#j}$.

Concerning the schemes for inserting pilot symbols, there may be a scheme different from those mentioned in (Rule #1) to (Rule #4) above. For example, the average power of pilot symbols (i.e., the value of $v_p$) included in the transmission signal transmitted from the antenna 7626_1 in FIG. 140 may differ from the average power of pilot symbols (i.e., the value of $v_p$) included in the transmission signal transmitted from the antenna 7626_2 in FIG. 140. (In view of improvement of the accuracy of channel estimation in the reception device, it is desirable that the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described in (Rule #1) to (Rule #4). (Note that $v_p$ is as described above, and is as shown in FIG. 144.)

For example, pilot symbols are inserted with any of the following four different schemes, similarly to the case of (Example 1-1).

(Rule #5)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{5,1}$ is satisfied for the pilot symbols included in the transmission signal transmitted from the antenna 7626_1 in FIG. 140, and $v_p=z\times v_{5,2}$ is satisfied for the pilot symbols included in the transmission signal transmitted from the antenna 7626_2 in FIG. 140. Here, $v_{5,1}\neq v_{5,2}$. (Note that $v_p$ is as described above, and is as shown in FIG. 144.)

(Rule #6)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{6,1}$ is satisfied for the pilot symbols included in the transmission signal transmitted from the antenna 7626_1 in FIG. 140, and $v_p=z\times v_{6,2}$ is satisfied for the pilot symbols included in the transmission signal transmitted from the antenna 7626_2 in FIG. 140. Here, $v_{6,1}$ $v_{6,2}$. Also, $v_{5,1}$ $v_{6,1}$ and $v_{5,2}$ $v_{6,1}$ are satisfied, or alternatively, $v_{5,1}$ $v_{6,2}$ and $v_{5,2}$ $v_{6,2}$ are satisfied. (Note that $v_p$ is as described above, and is as shown in FIG. 144.)

(Rule #7)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{7,1}$ is satisfied for the pilot symbols included in the transmission signal transmitted from the antenna 7626_1 in FIG. 140, and $v_p=z\times v_{7,2}$ is satisfied for the pilot symbols included in the transmission signal transmitted from the antenna 7626_2 in FIG. 140. Here, $v_{7,1}\neq v_{7,2}$. (Note that $v_p$ is as described above, and is as shown in FIG. 144.)

(Rule #8)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{8,1}$ is satisfied for the pilot symbols included in the transmission signal transmitted from the antenna 7626_1 in FIG. 140, and $v_p=z\times v_{8,2}$ is satisfied for the pilot symbols included in the transmission signal transmitted from the antenna 7626_2 in FIG. 140.

Here, $v_{8,1}$ $v_{8,2}$. Also, $v_{7,1}$ $v_{8,1}$ and $v_{7,2}$ $v_{8,1}$ are satisfied, or alternatively, $v_{7,1}$ $v_{8,2}$ and $v_{7,2}$ $v_{8,2}$ are satisfied. (Note that $v_p$ is as described above, and is as shown in FIG. 144.)

The modulation scheme for the baseband signal s1(*t*) is 16-QAM, the modulation scheme for the baseband signal s2(*t*) is 16-QAM, and the mapping scheme for each modulation scheme is as described above. Also, the precoding scheme and the values for power change in the power changers 8501A and 8501B in FIG. 141 (FIG. 143) are as described above (θ=25°, and $v^2=u^2=0.5$).

In (Rule #5) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#5}$ and $q_{\#5}$, respectively. (Note that $Q_{\#5}<q_{\#5}$.)

Similarly, in (Rule #6) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#6}$ and $q_{\#6}$, respectively. (Note that $Q_{\#6}<q_{\#6}$.)

Similarly, in (Rule #7) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#7}$ and $q_{\#7}$, respectively. (Note that $Q_{\#7}<q_{\#7}$.)

Similarly, in (Rule #8) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#8}$ and $q_{\#8}$, respectively. (Note that $Q_{\#8}<q_{\#8}$.)

Note that according to the above description, the average power of the transmission signal tr1 (7623_1) transmitted from the first transmission antenna (average power of the modulated signal x1(*t*)) is set to ½ of the average power of the transmission signal tr2 (7623_2) transmitted from the second transmission antenna (average power of the modulated signal x2(*t*)) (G1=G2/2, i.e., G1:G2=1:2); however, in practice, the average power of the transmission signal tr1 (7623_1) transmitted from the first transmission antenna (average power of the modulated signal x1(*t*)) is set to approximately ½ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-9)

There exist i that is an integer from 5 to 8, and j that is an integer from 5 to 8, satisfying i≠j and $Q_{\#i}\neq Q_{\#j}$.

Similarly, the following condition is satisfied.

(Condition #P-10)

There exist i that is an integer from 5 to 8, and j that is an integer from 5 to 8, satisfying i≠j and $q_{\#i}\neq q_{\#j}$.

Note that the transmission device may select either of the following two pilot symbol insertion schemes, i.e., (i) a pilot symbol insertion scheme in which the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described above in (Rule #1) to (Rule #4) and (ii) a pilot symbol insertion scheme in which the average power of pilot symbols (i.e., the value of $v_p$) included in the transmission signal transmitted from the antenna 7626_1 in FIG. 140 is not equal to the average power of pilot symbols (i.e., the value of $v_p$) included in the transmission signal transmitted from the antenna 7626_2 in FIG. 140, as described above in (Rule #5) to (Rule #8).

The following describes an example in which the transmission device selects a pilot symbol insertion scheme from among the pilot symbol insertion schemes described in (Rule #1) to (Rule #8) to transmit a modulated signal.

Note that according to the above description, the average power of the transmission signal tr1 (7623_1) transmitted from the first transmission antenna (average power of the modulated signal x1(*t*)) is set to ½ of the average power of the transmission signal tr2 (7623_2) transmitted from the second transmission antenna (average power of the modulated signal x2(*t*)) (G1=G2/2, i.e., G1:G2=1:2); however, in practice, the average power of the transmission signal tr1 (7623_1) transmitted from the first transmission antenna (average power of the modulated signal x1(*t*)) is set to approximately ½ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-11)

There exist i that is an integer from 1 to 8, and j that is an integer from 1 to 8, satisfying i≠j and $Q_{\#i}\neq Q_{\#j}$.

Similarly, the following condition is satisfied.

(Condition #P-12)

There exist i that is an integer from 1 to 8, and j that is an integer from 1 to 8, satisfying i≠j and $q_{\#i} \neq q_{\#j}$.

Example 1-3

The following describes an example where the modulation scheme for the baseband signal s1(*t*) is 16-QAM, the modulation scheme for the baseband signal s2(*t*) is 64-QAM, and precoding is performed on the baseband signals s1(*t*) and s2(*t*).

The signal point arrangement for 16-QAM in the I-Q plane is as shown in FIG. 80. Also, the signal point arrangement for 64-QAM in the I-Q plane is as shown in FIG. 86. Also, formula #P9 and the following formula are satisfied in order to equalize the average power of s1(*t*) which is the baseband signal of 16-QAM, and the average power of s2(*t*) which is the baseband signal of 64-QAM.

[Math. 120]

$$k = \frac{z}{\sqrt{42}} \quad \text{(Formula \#P13)}$$

Description on this point is also provided in Embodiment F1.

In (Example 1-3), the average power of the transmission signal tr1 (7623_1) transmitted from the first transmission antenna (average power of the modulated signal x1(*t*)) is set to ½ of the average power of the transmission signal tr2 (7623_2) transmitted from the second transmission antenna (average power of the modulated signal x2(*t*)) (G1=G2/2, i.e., G1:G2=1:2). (G1:G2 is set to the desired ratio of 1:2.)

The following describes the operations of the signal processor 7612 in FIG. 140, i.e., the operations in FIG. 141 (or FIG. 143) when G1:G2 is set to the desired ratio of 1:2.

Given that s1(*t*) is the baseband signal of 16-QAM, and s2(*t*) is the baseband signal of 64-QAM, the precoding matrix F is set such that θ=15° (15 degrees) in formula #P4 so as to achieve high data reception quality for the reception device.

Then, values for power change in the power changers 8501A and 8501B in FIG. 141 (FIG. 143) are set to $v^2=u^2=0.5$.

In order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are changed according to the average power of pilot symbols (i.e., $v_p$ in FIG. 144) inserted into the modulated signals p1(*t*) and p2(*t*) and the insertion frequency of pilot symbols, as described above.

Description on this point is described below with use of an example.

In (Rule #1) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#1}$ and $q_{\#1}$, respectively. (Note that $Q_{\#1}<q_{\#1}$).

Similarly, in (Rule #2) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#2}$ and $q_{\#2}$, respectively. (Note that $Q_{\#2}<q_{\#2}$.)

Similarly, in (Rule #3) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#3}$ and $q_{\#3}$, respectively. (Note that $Q_{\#3}<q_{\#3}$.)

Similarly, in (Rule #4) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#4}$ and $q_{\#4}$, respectively. (Note that $Q_{\#4}<q_{\#4}$.)

Note that according to the above description, the average power of the transmission signal tr1 (7623_1) transmitted from the first transmission antenna (average power of the modulated signal x1(*t*)) is set to ½ of the average power of the transmission signal tr2 (7623_2) transmitted from the second transmission antenna (average power of the modulated signal x2(*t*)) (G1=G2/2, i.e., G1:G2=1:2); however, in practice, the average power of the transmission signal tr1 (7623_1) transmitted from the first transmission antenna (average power of the modulated signal x1(*t*)) is set to approximately ½ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-13)

There exist i that is an integer from 1 to 4, and j that is an integer from 1 to 4, satisfying i≠j and $Q_{\#i} \neq Q_{\#j}$.

Similarly, the following condition is satisfied.

(Condition #P-14)

There exist i that is an integer from 1 to 4, and j that is an integer from 1 to 4, satisfying i≠j and $q_{\#i} \neq q_{\#j}$.

Concerning the schemes for inserting pilot symbols, there may be a scheme different from those mentioned in (Rule #1) to (Rule #4) above. For example, the average power of pilot symbols (i.e., the value of $v_p$) included in the transmission signal transmitted from the antenna 7626_1 in FIG. 140 may differ from the average power of pilot symbols (i.e., the value of $v_p$) included in the transmission signal transmitted from the antenna 7626_2 in FIG. 140. (In view of improvement of the accuracy of channel estimation in the reception device, it is desirable that the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described in (Rule #1) to (Rule #4). (Note that $v_p$ is as described above, and is as shown in FIG. 144.)

For example, pilot symbols are inserted with any of the following four different schemes, similarly to the case of (Example 1-1) and (Example 1-2).

(Rule #5)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p = z \times v_{5,1}$ is satisfied for the pilot symbols included in the transmission signal transmitted from the antenna 7626_1 in FIG. 140, and $v_p = z \times v_{5,2}$ is satisfied for the pilot symbols included in the transmission signal transmitted from the antenna 7626_2 in FIG. 140. Here, $v_{5,1} \neq v_{5,2}$. (Note that $v_p$ is as described above, and is as shown in FIG. 144.)

(Rule #6)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p = z \times v_{6,1}$ is satisfied for the pilot symbols included in the transmission signal transmitted from the antenna 7626_1 in FIG. 140, and $v_p = z \times v_{6,2}$ is satisfied for the pilot symbols included in the transmission signal transmitted from the antenna 7626_2 in FIG. 140. Here, $v_{6,1} \neq v_{6,2}$. Also, $v_{5,1} \neq v_{6,1}$ and $v_{5,2} \neq v_{6,1}$ are satisfied, or alternatively, $v_{5,1} \neq v_{6,2}$ and $v_{5,2} \neq v_{6,2}$ are satisfied. (Note that $v_p$ is as described above, and is as shown in FIG. 144.)

(Rule #7)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p = z \times v_{7,1}$ is satisfied for the pilot symbols included in the transmission signal transmitted from the antenna 7626_1 in FIG. 140, and $v_p = z \times v_{7,2}$ is satisfied for the pilot symbols included in the transmission signal transmitted from the antenna 7626_2 in FIG. 140. Here, $v_{7,1} \neq v_{7,2}$. (Note that $v_p$ is as described above, and is as shown in FIG. 144.)

(Rule #8)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p = z \times v_{8,1}$ is satisfied for the pilot symbols included in the transmission signal transmitted from the antenna 7626_1 in FIG. 140, and $v_p = z \times v_{8,2}$ is satisfied for the pilot symbols included in the transmission signal transmitted from the antenna 7626_2 in FIG. 140. Here, $v_{8,1} \neq v_{8,2}$. Also, $v_{7,1}$ $v_{8,1}$ and $v_{7,2} \neq v_{8,1}$ are satisfied, or alternatively, $v_{7,1} \neq v_{8,2}$ and $v_{7,2} \neq v_{8,2}$ are satisfied. (Note that $v_p$ is as described above, and is as shown in FIG. 144.)

The modulation scheme for the baseband signal s1(*t*) is 16-QAM, the modulation scheme for the baseband signal s2(*t*) is 64-QAM, and the mapping scheme for each modulation scheme is as described above. Also, the precoding scheme and the values for power change in the power changers 8501A and 8501B in FIG. 141 (FIG. 143) are as described above (θ=15°, and $v^2 = u^2 = 0.5$).

In (Rule #5) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#5}$ and $q_{\#5}$, respectively. (Note that $Q_{\#5} < q_{\#5}$.)

Similarly, in (Rule #6) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#6}$ and $q_{\#6}$, respectively. (Note that $Q_{\#6} < q_{\#6}$.)

Similarly, in (Rule #7) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#7}$ and $q_{\#7}$, respectively. (Note that $Q_{\#7} < q_{\#7}$.)

Similarly, in (Rule #8) above pertaining to a pilot symbol insertion scheme, in order to satisfy the condition that the average power of the transmission signal tr1 (7623_1) transmitted from the first transmission antenna (average power of the modulated signal x1(*t*)) is ½ of the average power of the transmission signal tr2 (7623_2) transmitted from the second transmission antenna (average power of the modulated signal x2(*t*)) (G1=G2/2, i.e., G1:G2=1:2), the values Q and q for power change in the power changers 14101A and 14101B in FIG. 141 (FIG. 143) are set to $Q_{\#8}$ and $q_{\#8}$, respectively. (Note that $Q_{\#8} < q_{\#8}$.)

Note that according to the above description, the average power of the transmission signal tr1 (7623_1) transmitted from the first transmission antenna (average power of the modulated signal x1(*t*)) is set to ½ of the average power of the transmission signal tr2 (7623_2) transmitted from the second transmission antenna (average power of the modulated signal x2(*t*)) (G1=G2/2, i.e., G1:G2=1:2); however, in practice, the average power of the transmission signal tr1 (7623_1) transmitted from the first transmission antenna (average power of the modulated signal x1(*t*)) is set to approximately ½ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-15)

There exist i that is an integer from 5 to 8, and j that is an integer from 5 to 8, satisfying i≠j and $Q_{\#i} \neq Q_{\#j}$.

Similarly, the following condition is satisfied.

(Condition #P-16)

There exist i that is an integer from 5 to 8, and j that is an integer from 5 to 8, satisfying i≠j and $q_{\#i} \neq q_{\#j}$.

Note that the transmission device may select either of the following two pilot symbol insertion schemes, i.e., (i) a pilot symbol insertion scheme in which the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described above in (Rule #1) to (Rule #4) and (ii) a pilot symbol insertion scheme in which the average power of pilot symbols (i.e., the value of $v_p$) included in the transmission signal transmitted from the antenna 7626_1 in FIG. 140 is not equal to the average power of pilot symbols (i.e., the value of $v_p$) included in the transmission signal transmitted from the antenna 7626_2 in FIG. 140, as described above in (Rule #5) to (Rule #8).

The following describes an example in which the transmission device selects a pilot symbol insertion scheme from among the pilot symbol insertion schemes described in (Rule #1) to (Rule #8) to transmit a modulated signal.

Note that according to the above description, the average power of the transmission signal tr1 (7623_1) transmitted from the first transmission antenna (average power of the modulated signal x1($t$)) is set to ½ of the average power of the transmission signal tr2 (7623_2) transmitted from the second transmission antenna (average power of the modulated signal x2($t$)) (G1=G2/2, i.e., G1:G2=1:2); however, in practice, the average power of the transmission signal tr1 (7623_1) transmitted from the first transmission antenna (average power of the modulated signal x1($t$)) is set to approximately ½ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-17)

There exist i that is an integer from 1 to 8, and j that is an integer from 1 to 8, satisfying i≠j and $Q_{\#i} \neq Q_{\#j}$.

Similarly, the following condition is satisfied.

(Condition #P-18)

There exist i that is an integer from 1 to 8, and j that is an integer from 1 to 8, satisfying i≠j and $q_{\#i} \neq q_{\#j}$.

Example 2

Next, description is provided on a scheme of controlling the average power of baseband signals after precoding when the average power of the signal tr1($t$) transmitted from the first transmission antenna is ¼ of the average power of the signal tr2 transmitted from the second transmission antenna, i.e., when G1:G2=1:4.

Similarly to the above example, (Rule #1) to (Rule #4) as described above are used as the pilot symbol insertion schemes.

Example 2-1

The following describes an example where the modulation scheme for the baseband signal s1($t$) is QPSK, the modulation scheme for the baseband signal s2($t$) is 16-QAM, and precoding is performed on the baseband signals s1($t$) and s2($t$).

The signal point arrangement for QPSK in the I-Q plane is as shown in FIG. 81, and the signal point arrangement for 16-QAM in the I-Q plane is as shown in FIG. 80. Also, the formulas #P8 and #P9 are satisfied in order to equalize the average power of s1($t$) which is the baseband signal of QPSK, and the average power of s2($t$) which is the baseband signal of 16-QAM. Description on this point is also provided in Embodiment F1.

In (Example 2-1), the average power of the transmission signal tr1 (7623_1) transmitted from the first transmission antenna (average power of the modulated signal x1($t$)) is set to ¼ of the average power of the transmission signal tr2 (7623_2) transmitted from the second transmission antenna (average power of the modulated signal x2($t$)) (G1=G2/4, i.e., G1:G2=1:4). (G1:G2 is set to a desired ratio of 1:4.)

The following describes the operations of the signal processor 7612 in FIG. 140, i.e., the operations in FIG. 141 (or FIG. 143) when G1:G2 is set to the desired ratio of 1:4.

Given that s1($t$) is the baseband signal of QPSK, and s2($t$) is the baseband signal of 16-QAM, the precoding matrix F is set such that θ=0° (0 degrees) in formula #P4 so as to achieve high data reception quality for the reception device. Accordingly, the precoding matrix F is expressed by formula #P10. Note that formula #P11 may be used instead of formula #P10.

Then, values for power change in the power changers 8501A and 8501B in FIG. 141 (FIG. 143) are set to $v^2=u^2=0.5$.

In order to satisfy the condition that the average power of the transmission signal tr1 (7623_1) transmitted from the first transmission antenna (average power of the modulated signal x1($t$)) is ¼ of the average power of the transmission signal tr2 (7623_2) transmitted from the second transmission antenna (average power of the modulated signal x2($t$)) (G1=G2/4, i.e., G1:G2=1:4), the values Q and q for power change in the power changers 14101A and 14101B in FIG. 141 (FIG. 143) are changed according to the average power of pilot symbols (i.e., $v_p$ in FIG. 144) inserted into the modulated signals p1($t$) and p2($t$) and the insertion frequency of pilot symbols, as described above.

Description on this point is described below with use of an example.

In (Rule #1) above pertaining to a pilot symbol insertion scheme, in order to satisfy the condition that the average power of the transmission signal tr1 (7623_1) transmitted from the first transmission antenna (average power of the modulated signal x1($t$)) is ¼ of the average power of the transmission signal tr2 (7623_2) transmitted from the second transmission antenna (average power of the modulated signal x2($t$)) (G1=G2/4, i.e., G1:G2=1:4), the values Q and q for power change in the power changers 14101A and 14101B in FIG. 141 (FIG. 143) are set to $Q_{\#1}$ and $q_{\#1}$, respectively. (Note that $Q_{\#1}<q_{\#1}$.)

Similarly, in (Rule #2) above pertaining to a pilot symbol insertion scheme, in order to satisfy the condition that the average power of the transmission signal tr1 (7623_1) transmitted from the first transmission antenna (average power of the modulated signal x1($t$)) is ¼ of the average power of the transmission signal tr2 (7623_2) transmitted from the second transmission antenna (average power of the modulated signal x2($t$)) (G1=G2/4, i.e., G1:G2=1:4), the values Q and q for power change in the power changers 14101A and 14101B in FIG. 141 (FIG. 143) are set to $Q_{\#2}$ and $q_{\#2}$, respectively. (Note that $Q_{\#2}<q_{\#2}$.)

Similarly, in (Rule #3) above pertaining to a pilot symbol insertion scheme, in order to satisfy the condition that the average power of the transmission signal tr1 (7623_1) transmitted from the first transmission antenna (average power of the modulated signal x1($t$)) is ¼ of the average power of the transmission signal tr2 (7623_2) transmitted from the second transmission antenna (average power of the modulated signal x2($t$)) (G1=G2/4, i.e., G1:G2=1:4), the values Q and q for power change in the power changers 14101A and 14101B in FIG. 141 (FIG. 143) are set to $Q_{\#3}$ and $q_{\#3}$, respectively. (Note that $Q_{\#3}<q_{\#3}$.)

Similarly, in (Rule #4) above pertaining to a pilot symbol insertion scheme, in order to satisfy the condition that the average power of the transmission signal tr1 (7623_1) transmitted from the first transmission antenna (average power of the modulated signal x1($t$)) is ¼ of the average power of the transmission signal tr2 (7623_2) transmitted from the second transmission antenna (average power of the modulated signal x2($t$)) (G1=G2/4, i.e., G1:G2=1:4), the values Q and q for power change in the power changers 14101A and 14101B in FIG. 141 (FIG. 143) are set to $Q_{\#4}$ and $q_{\#4}$, respectively. (Note that $Q_{\#4}<q_{\#4}$.)

Note that according to the above description, the average power of the transmission signal tr1 (7623_1) transmitted from the first transmission antenna (average power of the modulated signal x1($t$)) is set to ¼ of the average power of the transmission signal tr2 (7623_2) transmitted from the second transmission antenna (average power of the modulated signal x2($t$)) (G1=G2/4, i.e., G1:G2=1:4); however, in practice, the average power of the transmission signal tr1 (7623_1) transmitted from the first transmission antenna (average power of the modulated signal x1($t$)) is set to approximately ¼ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-19)

There exist i that is an integer from 1 to 4, and j that is an integer from 1 to 4, satisfying i≠j and $Q_{\#i}\neq Q_{\#j}$.

Similarly, the following condition is satisfied.

(Condition #P-20)

There exist i that is an integer from 1 to 4, and j that is an integer from 1 to 4, satisfying i≠j and $q_{\#i}\neq q_{\#j}$.

Concerning the schemes for inserting pilot symbols, there may be a scheme different from those mentioned in (Rule #1) to (Rule #4) above. For example, the average power of pilot symbols (i.e., the value of $v_p$) included in the transmission signal transmitted from the antenna 7626_1 in FIG. 140 may differ from the average power of pilot symbols (i.e., the value of $v_p$) included in the transmission signal transmitted from the antenna 7626_2 in FIG. 140. (In view of improvement of the accuracy of channel estimation in the reception device, it is desirable that the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described in (Rule #1) to (Rule #4). (Note that $v_p$ is as described above, and is as shown in FIG. 144.)

For example, pilot symbols are inserted with any of the following four different schemes, similarly to the case of (Example 1-1), (Example 1-2), and (Example 1-3).

(Rule #5)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{5,1}$ is satisfied for the pilot symbols included in the transmission signal transmitted from the antenna 7626_1 in FIG. 140, and $v_p=z\times v_{5,2}$ is satisfied for the pilot symbols included in the transmission signal transmitted from the antenna 7626_2 in FIG. 140. Here, $v_{5,1}\neq v_{5,2}$. (Note that $v_p$ is as described above, and is as shown in FIG. 144.)

(Rule #6)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{6,1}$ is satisfied for the pilot symbols included in the transmission signal transmitted from the antenna 7626_1 in FIG. 140, and $v_p=z\times v_{6,2}$ is satisfied for the pilot symbols included in the transmission signal transmitted from the antenna 7626_2 in FIG. 140. Here, $v_{6,1}\neq v_{6,2}$. Also, $v_{5,1}\neq v_{6,1}$ and $v_{5,2}\neq v_{6,1}$ are satisfied, or alternatively, $v_{5,1}\neq v_{6,2}$ and $v_{5,2}\neq v_{6,2}$ are satisfied. (Note that $v_p$ is as described above, and is as shown in FIG. 144.)

(Rule #7)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{7,1}$ is satisfied for the pilot symbols included in the transmission signal transmitted from the antenna 7626_1 in FIG. 140, and $v_p=z\times v_{7,2}$ is satisfied for the pilot symbols included in the transmission signal transmitted from the antenna 7626_2 in FIG. 140. Here, $v_{7,1}\neq v_{7,2}$. (Note that $v_p$ is as described above, and is as shown in FIG. 144.)

(Rule #8)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{8,1}$ is satisfied for the pilot symbols included in the transmission signal transmitted from the antenna 7626_1 in FIG. 140, and $v_p=z\times v_{8,2}$ is satisfied for the pilot symbols included in the transmission signal transmitted from the antenna 7626_2 in FIG. 140. Here, $v_{8,1}\neq v_{8,2}$. Also, $v_{7,1}\neq v_{8,1}$ and $v_{7,2}\neq v_{8,1}$ are satisfied, or alternatively, $v_{7,1}\neq v_{8,2}$ and $v_{7,2}\neq v_{8,2}$ are satisfied. (Note that $v_p$ is as described above, and is as shown in FIG. 144.)

The modulation scheme for the baseband signal s1(*t*) is QPSK, the modulation scheme for the baseband signal s2(*t*) is 16-QAM, and the mapping scheme for each modulation scheme is as described above. Also, the precoding scheme and the values for power change in the power changers 8501A and 8501B in FIG. 141 (FIG. 143) are as described above (θ=0°, and $v^2=u^2=0.5$).

In (Rule #5) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#5}$ and $q_{\#5}$, respectively. (Note that $Q_{\#5}<q_{\#5}$.)

Similarly, in (Rule #6) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#6}$ and $q_{\#6}$, respectively. (Note that $Q_{\#6}<q_{\#6}$.)

Similarly, in (Rule #7) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#7}$ and $q_{\#7}$, respectively. (Note that $Q_{\#7}<q_{\#7}$.)

Similarly, in (Rule #8) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#8}$ and $q_{\#8}$, respectively. (Note that $Q_{\#8}<q_{\#8}$.)

Note that according to the above description, the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4); however, in practice, the average power of the transmission signal tr1 (7623_1) transmitted from the first transmission antenna (average power of the modulated signal x1(*t*)) is set to approximately ¼ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-21)

There exist i that is an integer from 5 to 8, and j that is an integer from 5 to 8, satisfying i≠j and $Q_{\#i}\neq Q_{\#j}$.

Similarly, the following condition is satisfied.

(Condition #P-22)

There exist i that is an integer from 5 to 8, and j that is an integer from 5 to 8, satisfying i≠j and $q_{\#i}\neq q_{\#j}$.

Note that the transmission device may select either of the following two pilot symbol insertion schemes, i.e., (i) a pilot symbol insertion scheme in which the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described above in (Rule #1) to (Rule #4) and (ii) a pilot symbol insertion scheme in which the average power of pilot symbols (i.e., the value of $v_p$) included in the transmission signal transmitted from the antenna 7626_1 in FIG. 140 is not equal to the average power of pilot symbols (i.e., the value of $v_p$) included in the transmission signal transmitted from the antenna 7626_2 in FIG. 140, as described above in (Rule #5) to (Rule #8).

The following describes an example in which the transmission device selects a pilot symbol insertion scheme from among the pilot symbol insertion schemes described in (Rule #1) to (Rule #8) to transmit a modulated signal.

Note that according to the above description, the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4); however, in practice, the average power of the transmission signal tr1 (7623_1) transmitted from the first transmission antenna (average power of the modulated signal x1(*t*)) is set to approximately ¼ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-23)

There exist i that is an integer from 1 to 8, and j that is an integer from 1 to 8, satisfying i≠j and $Q_{\#i} \neq Q_{\#j}$.

Similarly, the following condition is satisfied.

(Condition #P-24)

There exist i that is an integer from 1 to 8, and j that is an integer from 1 to 8, satisfying i≠j and $q_{\#i} \neq q_{\#j}$.

Example 2-2

The following describes an example where the modulation scheme for the baseband signal s1(*t*) is 16-QAM, the modulation scheme for the baseband signal s2(*t*) is 16-QAM, and precoding is performed on the baseband signals s1(*t*) and s2(*t*).

The signal point arrangement for 16-QAM in the I-Q plane is as shown in FIG. 80. Also, formula #P9 is satisfied in order to equalize the average power of s1(*t*) which is the baseband signal of 16-QAM, and the average power of s2(*t*) which is the baseband signal of 16-QAM. Description on this point is also provided in Embodiment F1.

In (Example 2-2), the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4). (G1:G2 is set to the desired ratio of 1:4.)

The following describes the operations of the signal processor 7612 in FIG. 140, i.e., the operations in FIG. 141 (or FIG. 143) when G1:G2 is set to the desired ratio of 1:4.

Given that s1(*t*) is the baseband signal of 16-QAM, and s2(*t*) is the baseband signal of 16-QAM, the precoding matrix F is set such that θ=0° (0 degrees) in formula #P4 so as to achieve high data reception quality for the reception device. Accordingly, the precoding matrix F is expressed by formula #P10. Note that formula #P11 may be used instead of formula #P10.

Then, values for power change in the power changers 8501A and 8501B in FIG. 141 (FIG. 143) are set to $v^2=u^2=0.5$.

In order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are changed according to the average power of pilot symbols (i.e., $v_p$ in FIG. 144) inserted into the modulated signals p1(*t*) and p2(*t*) and the insertion frequency of pilot symbols, as described above.

Description on this point is described below with use of an example.

In (Rule #1) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#1}$ and $q_{\#1}$, respectively. (Note that $Q_{\#1}<q_{\#1}$).

Similarly, in (Rule #2) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#2}$ and $q_{\#2}$, respectively. (Note that $Q_{\#2}<q_{\#2}$.)

Similarly, in (Rule #3) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#3}$ and $q_{\#3}$, respectively. (Note that $Q_{\#3}<q_{\#3}$.)

Similarly, in (Rule #4) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#4}$ and $q_{\#4}$, respectively. (Note that $Q_{\#4}<q_{\#4}$.)

Note that according to the above description, the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4); however, in practice, the average power of the transmission signal tr1 (7623_1) transmitted from the first transmission antenna (average power of the modulated signal x1(*t*)) is set to approximately ¼ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-25)

There exist i that is an integer from 1 to 4, and j that is an integer from 1 to 4, satisfying i≠j and $Q_{\#i} \neq Q_{\#j}$.

Similarly, the following condition is satisfied.

(Condition #P-26)

There exist i that is an integer from 1 to 4, and j that is an integer from 1 to 4, satisfying i≠j and $q_{\#i} \neq q_{\#j}$.

Concerning the schemes for inserting pilot symbols, there may be a scheme different from those mentioned in (Rule #1) to (Rule #4) above. For example, the average power of pilot symbols (i.e., the value of $v_p$) included in the transmission signal transmitted from the antenna 7626_1 in FIG. 140 may differ from the average power of pilot symbols (i.e., the value of $v_p$) included in the transmission signal transmitted from the antenna 7626_2 in FIG. 140. (In view of improvement of the accuracy of channel estimation in the reception device, it is desirable that the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described in (Rule #1) to (Rule #4). (Note that $v_p$ is as described above, and is as shown in FIG. 144.)

For example, pilot symbols are inserted with any of the following four different schemes, similarly to the case of (Example 2-1).

(Rule #5)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{5,1}$ is satisfied for the pilot symbols included in the transmission signal transmitted from the antenna 7626_1 in FIG. 140, and $v_p=z\times v_{5,2}$ is satisfied for the pilot symbols included in the transmission signal transmitted from the antenna 7626_2 in FIG. 140. Here, $v_{5,1}\neq v_{5,2}$. (Note that $v_p$ is as described above, and is as shown in FIG. 144.)

(Rule #6)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{6,1}$ is satisfied for the pilot symbols included in the transmission signal transmitted from the antenna 7626_1 in FIG. 140, and $v_p=z\times v_{6,2}$ is satisfied for the pilot symbols included in the transmission signal transmitted from the antenna 7626_2 in FIG. 140. Here, $v_{6,1}\neq v_{6,2}$. Also, $v_{5,1}\neq v_{6,1}$ and $v_{5,2}\neq v_{6,1}$ are satisfied, or alternatively, $v_{5,1}\neq v_{6,2}$ and $v_{5,2}\neq v_{6,2}$ are satisfied. (Note that $v_p$ is as described above, and is as shown in FIG. 144.)

(Rule #7)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{7,1}$ is satisfied for the pilot symbols included in the transmission signal transmitted from the antenna 7626_1 in FIG. 140, and $v_p=z\times v_{7,2}$ is satisfied for the pilot symbols included in the transmission signal transmitted from the antenna 7626_2 in FIG. 140. Here, $v_{7,1}\neq v_{7,2}$. (Note that $v_p$ is as described above, and is as shown in FIG. 144.)

(Rule #8)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{8,1}$ is satisfied for the pilot symbols included in the transmission signal transmitted from the antenna 7626_1 in FIG. 140, and $v_p=z\times v_{8,2}$ is satisfied for the pilot symbols included in the transmission signal transmitted from the antenna 7626_2 in FIG. 140. Here, $v_{8,1}\neq v_{8,2}$. Also, $v_{7,1}\neq v_{8,1}$ and $v_{7,2}\neq v_{8,1}$ are satisfied, or alternatively, $v_{7,1}\neq v_{8,2}$ and $v_{7,2}\neq v_{8,2}$ are satisfied. (Note that $v_p$ is as described above, and is as shown in FIG. 144.)

The modulation scheme for the baseband signal s1(*t*) is 16-QAM, the modulation scheme for the baseband signal s2(*t*) is 16-QAM, and the mapping scheme for each modulation scheme is as described above. Also, the precoding scheme and the values for power change in the power changers 8501A and 8501B in FIG. 141 (FIG. 143) are as described above ($\theta=0°$, and $v^2=u^2=0.5$).

In (Rule #5) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#5}$ and $q_{\#5}$, respectively. (Note that $Q_{\#5}<q_{\#5}$.)

Similarly, in (Rule #6) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#6}$ and $q_{\#6}$, respectively. (Note that $Q_{\#6}<q_{\#6}$.)

Similarly, in (Rule #7) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#7}$ and $q_{\#7}$, respectively. (Note that $Q_{\#7}<q_{\#7}$.)

Similarly, in (Rule #8) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#8}$ and $q_{\#8}$, respectively. (Note that $Q_{\#8}<q_{\#8}$.)

Note that according to the above description, the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4); however, in practice, the average power of the transmission signal tr1 (7623_1) transmitted from the first transmission antenna (average power of the modulated signal x1(*t*)) is set to approximately ¼ of the average power of the transmission signal tr2 (7623_2) transmitted from the second transmission antenna (average power of the modulated signal x2(*t*)).

At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-27)

There exist i that is an integer from 5 to 8, and j that is an integer from 5 to 8, satisfying i≠j and $Q_{\#i} \neq Q_{\#j}$.

Similarly, the following condition is satisfied.

(Condition #P-28)

There exist i that is an integer from 5 to 8, and j that is an integer from 5 to 8, satisfying i≠j and $q_{\#i} \neq q_{\#j}$.

Note that the transmission device may select either of the following two pilot symbol insertion schemes, i.e., (i) a pilot symbol insertion scheme in which the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described above in (Rule #1) to (Rule #4) and (ii) a pilot symbol insertion scheme in which the average power of pilot symbols (i.e., the value of $v_p$) included in the transmission signal transmitted from the antenna 7626_1 in FIG. 140 is not equal to the average power of pilot symbols (i.e., the value of $v_p$) included in the transmission signal transmitted from the antenna 7626_2 in FIG. 140, as described above in (Rule #5) to (Rule #8).

The following describes an example in which the transmission device selects a pilot symbol insertion scheme from among the pilot symbol insertion schemes described in (Rule #1) to (Rule #8) to transmit a modulated signal.

Note that according to the above description, the average power of the transmission signal tr1 (7623_1) transmitted from the first transmission antenna (average power of the modulated signal x1($t$)) is set to ¼ of the average power of the transmission signal tr2 (7623_2) transmitted from the second transmission antenna (average power of the modulated signal x2($t$)) (G1=G2/4, i.e., G1:G2=1:4); however, in practice, the average power of the transmission signal tr1 (7623_1) transmitted from the first transmission antenna (average power of the modulated signal x1($t$)) is set to approximately ¼ of the average power of the transmission signal tr2 (7623_2) transmitted from the second transmission antenna (average power of the modulated signal x2($t$)). At this time, due to a large difference between the average power of the transmission signal tr1 (7623_1) transmitted from the first transmission antenna (average power of the modulated signal x1($t$)) and the average power of the transmission signal tr2 (7623_2) transmitted from the second transmission antenna (average power of the modulated signal x2($t$)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-29)

There exist i that is an integer from 1 to 8, and j that is an integer from 1 to 8, satisfying i≠j and $Q_{\#i} \neq Q_{\#j}$.

Similarly, the following condition is satisfied.

(Condition #P-30)

There exist i that is an integer from 1 to 8, and j that is an integer from 1 to 8, satisfying i≠j and $q_{\#i} \neq q_{\#j}$.

Example 2-3

The following describes an example where the modulation scheme for the baseband signal s1($t$) is 16-QAM, the modulation scheme for the baseband signal s2($t$) is 64-QAM, and precoding is performed on the baseband signals s1($t$) and s2($t$).

The signal point arrangement for 16-QAM in the I-Q plane is as shown in FIG. 80. Also, the signal point arrangement for 64-QAM in the I-Q plane is as shown in FIG. 86. Also, the formulas #P9 and #P13 are satisfied in order to equalize the average power of s1($t$) which is the baseband signal of 16-QAM, and the average power of s2($t$) which is the baseband signal of 64-QAM. Description on this point is also provided in Embodiment F1.

In (Example 2-3), the average power of the transmission signal tr1 (7623_1) transmitted from the first transmission antenna (average power of the modulated signal x1($t$)) is set to ¼ of the average power of the transmission signal tr2 (7623_2) transmitted from the second transmission antenna (average power of the modulated signal x2($t$)) (G1=G2/4, i.e., G1:G2=1:4). (G1:G2 is set to the desired ratio of 1:4.)

The following describes the operations of the signal processor 7612 in FIG. 140, i.e., the operations in FIG. 141 (or FIG. 143) when G1:G2 is set to the desired ratio of 1:4.

Given that s1($t$) is the baseband signal of 16-QAM, and s2($t$) is the baseband signal of 64-QAM, the precoding matrix F is set such that θ=0° (0 degrees) in formula #P4 so as to achieve high data reception quality for the reception device. Accordingly, the precoding matrix F is expressed by formula #P10. Note that formula #P11 may be used instead of formula #P10.

Then, values for power change in the power changers 8501A and 8501B in FIG. 141 (FIG. 143) are set to $v^2=u^2=0.5$.

In order to satisfy the condition that the average power of the transmission signal tr1 (7623_1) transmitted from the first transmission antenna (average power of the modulated signal x1($t$)) is ¼ of the average power of the transmission signal tr2 (7623_2) transmitted from the second transmission antenna (average power of the modulated signal x2($t$)) (G1=G2/4, i.e., G1:G2=1:4), the values Q and q for power change in the power changers 14101A and 14101B in FIG. 141 (FIG. 143) are changed according to the average power of pilot symbols (i.e., $v_p$ in FIG. 144) inserted into the modulated signals p1($t$) and p2($t$) and the insertion frequency of pilot symbols, as described above.

Description on this point is described below with use of an example.

In (Rule #1) above pertaining to a pilot symbol insertion scheme, in order to satisfy the condition that the average power of the transmission signal tr1 (7623_1) transmitted from the first transmission antenna (average power of the modulated signal x1($t$)) is ¼ of the average power of the transmission signal tr2 (7623_2) transmitted from the second transmission antenna (average power of the modulated signal x2($t$)) (G1=G2/4, i.e., G1:G2=1:4), the values Q and q for power change in the power changers 14101A and 14101B in FIG. 141 (FIG. 143) are set to $Q_{\#1}$ and $q_{\#1}$, respectively. (Note that $Q_{\#1} < q_{\#1}$.)

Similarly, in (Rule #2) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#2}$ and $q_{\#2}$, respectively. (Note that $Q_{\#2}<q_{\#2}$.)

Similarly, in (Rule #3) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#3}$ and $q_{\#3}$, respectively. (Note that $Q_{\#3}<q_{\#3}$.)

Similarly, in (Rule #4) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#4}$ and $q_{\#4}$, respectively. (Note that $Q_{\#4}<q_{\#4}$.)

Note that according to the above description, the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4); however, in practice, the average power of the transmission signal tr1 (7623_1) transmitted from the first transmission antenna (average power of the modulated signal x1(*t*)) is set to approximately ¼ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-31)

There exist i that is an integer from 1 to 4, and j that is an integer from 1 to 4, satisfying i≠j and $Q_{\#i}\neq Q_{\#j}$.

Similarly, the following condition is satisfied.

(Condition #P-32)

There exist i that is an integer from 1 to 4, and j that is an integer from 1 to 4, satisfying i≠j and $q_{\#i}\neq q_{\#j}$.

Concerning the schemes for inserting pilot symbols, there may be a scheme different from those mentioned in (Rule #1) to (Rule #4) above. For example, the average power of pilot symbols (i.e., the value of $v_p$) included in the transmission signal transmitted from the antenna 7626_1 in FIG. 140 may differ from the average power of pilot symbols (i.e., the value of $v_p$) included in the transmission signal transmitted from the antenna 7626_2 in FIG. 140. (In view of improvement of the accuracy of channel estimation in the reception device, it is desirable that the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described in (Rule #1) to (Rule #4). (Note that $v_p$ is as described above, and is as shown in FIG. 144.)

For example, pilot symbols are inserted with any of the following four different schemes, similarly to the case of (Example 2-1) and (Example 2-2).

(Rule #5)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{5,1}$ is satisfied for the pilot symbols included in the transmission signal transmitted from the antenna 7626_1 in FIG. 140, and $v_p=z\times v_{5,2}$ is satisfied for the pilot symbols included in the transmission signal transmitted from the antenna 7626_2 in FIG. 140. Here, $v_{5,1}\neq v_{5,2}$. (Note that $v_p$ is as described above, and is as shown in FIG. 144.)

(Rule #6)

The frame configuration of the transmission signal transmitted from the antenna 7626_1 in FIG. 140 is as shown in FIG. 142A, and the frame configuration of the transmission signal transmitted from the antenna 7626_2 in FIG. 140 is also as shown in FIG. 142A. Also, $v_p=z\times v_{6,1}$ is satisfied for the pilot symbols included in the transmission signal transmitted from the antenna 7626_1 in FIG. 140, and $v_p=z\times v_{6,2}$ is satisfied for the pilot symbols included in the transmission signal transmitted from the antenna 7626_2 in FIG. 140. Here, $v_{6,1}\neq v_{6,2}$. Also, $v_{5,1}\neq v_{6,1}$ and $v_{5,2}\neq v_{6,1}$ are satisfied, or alternatively, $v_{5,1}\neq v_{6,2}$ and $v_{5,2}\neq v_{6,2}$ are satisfied. (Note that $v_p$ is as described above, and is as shown in FIG. 144.)

(Rule #7)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{7,1}$ is satisfied for the pilot symbols included in the transmission signal transmitted from the antenna 7626_1 in FIG. 140, and $v_p=z\times v_{7,2}$ is satisfied for the pilot symbols included in the transmission signal transmitted from the antenna 7626_2 in FIG. 140. Here, $v_{7,1}$ $v_{7,2}$. (Note that $v_p$ is as described above, and is as shown in FIG. 144.)

(Rule #8)

The frame configuration of the transmission signal transmitted from the antenna 7626_1 in FIG. 140 is as shown in FIG. 142B, and the frame configuration of the transmission signal transmitted from the antenna 7626_2 in FIG. 140 is also as shown in FIG. 142B. Also, $v_p=z\times v_{8,1}$ is satisfied for the pilot symbols included in the transmission signal transmitted from the antenna 7626_1 in FIG. 140, and $v_p=z\times v_{8,2}$ is satisfied for the pilot symbols included in the transmission signal transmitted from the antenna 7626_2 in FIG. 140. Here, $v_{8,1}\neq v_{8,2}$. Also, $v_{7,1}\neq v_{8,1}$ and $v_{7,2}\neq v_{8,1}$ are satisfied, or alternatively, $v_{7,1}\neq v_{8,2}$ and $v_{7,2}\neq v_{8,2}$ are satisfied. (Note that $v_p$ is as described above, and is as shown in FIG. 144.)

The modulation scheme for the baseband signal s1(*t*) is 16-QAM, the modulation scheme for the baseband signal s2(*t*) is 64-QAM, and the mapping scheme for each modulation scheme is as described above. Also, the precoding scheme and the values for power change in the power changers 8501A and 8501B in FIG. 141 (FIG. 143) are as described above (θ=0°, and $v^2=u^2=0.5$).

In (Rule #5) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#5}$ and $q_{\#5}$, respectively. (Note that $Q_{\#5}<q_{\#5}$.)

Similarly, in (Rule #6) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#6}$ and $q_{\#6}$, respectively. (Note that $Q_{\#6}<q_{\#6}$.)

Similarly, in (Rule #7) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#7}$ and $q_{\#7}$, respectively. (Note that $Q_{\#7}<q_{\#7}$.)

Similarly, in (Rule #8) above pertaining to a pilot symbol insertion scheme, in order to satisfy the condition that the average power of the transmission signal tr1 (7623_1) transmitted from the first transmission antenna (average power of the modulated signal x1(*t*)) is ¼ of the average power of the transmission signal tr2 (7623_2) transmitted from the second transmission antenna (average power of the modulated signal x2(*t*)) (G1=G2/4, i.e., G1:G2=1:4), the values Q and q for power change in the power changers 14101A and 14101B in FIG. 141 (FIG. 143) are set to $Q_{\#8}$ and $q_{\#8}$, respectively. (Note that $Q_{\#8}<q_{\#8}$.)

Note that according to the above description, the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4); however, in practice, the average power of the transmission signal tr1 (7623_1) transmitted from the first transmission antenna (average power of the modulated signal x1(*t*)) is set to approximately ¼ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-33)

There exist i that is an integer from 5 to 8, and j that is an integer from 5 to 8, satisfying i≠j and $Q_{\#i}\neq Q_{\#j}$.

Similarly, the following condition is satisfied.

(Condition #P-34)

There exist i that is an integer from 5 to 8, and j that is an integer from 5 to 8, satisfying i≠j and $q_{\#i}q_{\#j}$.

Note that the transmission device may select either of the following two pilot symbol insertion schemes, i.e., (i) a pilot symbol insertion scheme in which the average power of pilot symbols (i.e., the value of $v_p$) included in the transmission signal transmitted from the antenna 7626_1 in FIG. 140 is equal to the average power of pilot symbols (i.e., the value of $v_p$) included in the transmission signal transmitted from the antenna 7626_2 in FIG. 140, as described above in (Rule #1) to (Rule #4) and (ii) a pilot symbol insertion scheme in which the average power of pilot symbols (i.e., the value of $v_p$) included in the transmission signal transmitted from the antenna 7626_1 in FIG. 140 is not equal to the average power of pilot symbols (i.e., the value of $v_p$) included in the transmission signal transmitted from the antenna 7626_2 in FIG. 140, as described above in (Rule #5) to (Rule #8).

The following describes an example in which the transmission device selects a pilot symbol insertion scheme from among the pilot symbol insertion schemes described in (Rule #1) to (Rule #8) to transmit a modulated signal.

Note that according to the above description, the average power of the transmission signal tr1 (7623_1) transmitted from the first transmission antenna (average power of the modulated signal x1(*t*)) is set to ¼ of the average power of the transmission signal tr2 (7623_2) transmitted from the second transmission antenna (average power of the modulated signal x2(*t*)) (G1=G2/4, i.e., G1:G2=1:4); however, in practice, the average power of the transmission signal tr1 (7623_1) transmitted from the first transmission antenna (average power of the modulated signal x1(*t*)) is set to approximately ¼ of the average power of the transmission signal tr2 (7623_2) transmitted from the second transmission antenna (average power of the modulated signal x2(*t*)). At this time, due to a large difference between the average power of the transmission signal tr1 (7623_1) transmitted from the first transmission antenna (average power of the modulated signal x1(*t*)) and the average power of the transmission signal tr2 (7623_2) transmitted from the second transmission antenna (average power of the modulated signal x2(*t*)), it is necessary to change the values Q and q for power change in the power changers 14101A and 14101B in FIG. 141 (FIG. 143) with use of a pilot symbol insertion scheme.

Accordingly, the following condition is satisfied.

(Condition #P-35)

There exist i that is an integer from 1 to 8, and j that is an integer from 1 to 8, satisfying i≠j and Similarly, the following condition is satisfied.

(Condition #P-36)

There exist i that is an integer from 1 to 8, and j that is an integer from 1 to 8, satisfying i≠j and $q_{\#i}\neq q_{\#j}$.

The description thus far has been provided based on specific examples pertaining to the present invention. The following describes a generalization of the invention described in the present embodiment.

"The ratio of the average power of the transmission signal tr1 transmitted from the first transmission antenna to the average power of the transmission signal tr2 transmitted from the second transmission antenna is set to a desired ratio. To satisfy the desired ratio, in FIG. 141 (or FIG. 143), the power changers 14101A and 14101B may change the values Q and q according to the insertion frequency of pilot symbols in a transmission frame (e.g., may change the insertion interval of pilot symbols in the frequency domain, may change the insertion interval of pilot symbols in the time domain, or may change the insertion interval of pilot symbols in both the frequency domain and the time domain) ."

Alternatively,

"the ratio of the average power of the transmission signal tr1 transmitted from the first transmission antenna to the average power of the transmission signal tr2 transmitted from the second transmission antenna is set to a desired ratio. To satisfy the desired ratio, in FIG. 141 (or FIG. 143), the power changers 14101A and 14101B may change the values Q and q according to the value of the average power of pilot symbols (i.e., value of $v_p$) (see FIG. 144)."

Alternatively,

"the ratio of the average power of the transmission signal tr1 transmitted from the first transmission antenna to the average power of the transmission signal tr2 transmitted from the second transmission antenna is set to a desired ratio. To satisfy the desired ratio, in FIG. 141 (or FIG. 143), the power changers 14101A and 14101B may change the values Q and q according to the insertion frequency of pilot symbols in a transmission frame (e.g., may change the insertion interval of pilot symbols in the frequency domain, may change the insertion interval of pilot symbols in the time domain, or may change the insertion interval of pilot symbols in both the frequency domain and the time domain) and the value of the average power of pilot symbols (i.e., value of $v_p$) (see FIG. 144)."

Note that in (Example 1-1) to (Example 1-3) and (Example 2-1) to (Example 2-3) above, description is provided with an example of the frame configuration in which both data symbols and pilot symbols exist. However, no limitation is intended thereby, and the conditions pertaining to the present invention generalized as described above should also be satisfied in the case of a frame configuration in which a P1 symbol or another symbol exists.

In this way, the transmission device can satisfy the condition that the ratio of the average power of the transmission signal tr1 transmitted from the first transmission antenna to the average power of the transmission signal tr2 transmitted from the second transmission antenna is set to a desired ratio, and under this condition, the reception device can improve the accuracy of channel estimation using pilot symbols. This produces an advantageous effect of securing high data reception quality.

Note that the transmission device in FIG. 140 may change the values Q and q, as described above. In such a case, the reception device which receives the modulated signals transmitted from the transmission device in FIG. 140 obtains the information on the transmission scheme used by the transmission device in FIG. 140, estimates the values Q and q used by the transmission device FIG. 140, based on the information thus obtained, reflects the values Q and q to learn formula #P1 (or formula #P3 or formula #P12), and performs detection (demodulation) by using a channel estimation value (channel matrix). Accordingly, it is important for the transmission device to transmit symbols that include the information that enables estimation of the values Q and q used by the transmission device, and the reception device can detect (demodulate) data by receiving the symbols.

(Supplement)

Although the above describes the configuration for performing phase change on the signal p2'(*t*), no limitation is intended thereby. For example, in FIG. 141, a phase changer may be arranged after the power changer 14101A. Alternatively, as described in Embodiment 2, phase change may be performed before precoding by the weighting unit 600, and the phase changer 317B may be arranged at a position (in a block diagram) before the weighting unit 600 instead of the configuration shown in FIG. 141 or FIG. 143. Also, phase change may be performed on both of the modulated signals s1(*t*) and s2(*t*). That is, phase change may be performed before precoding as described above, and phase changers for the respective modulated signals s1(*t*) and s2(*t*) may be arranged before the weighting unit 600.

Also, a phase changer is not absolutely necessary. For example, even if the phase changer 317B is omitted from the configuration in FIG. 141, the advantageous effect described in the present embodiment can be achieved by the operations of the power changers 14101A and 14101B described above.

The above describes the configuration in which the power changers 14101A and 14101B perform power change on the baseband signals s1(*t*) and s2(*t*) before precoding. However, no limitation is intended thereby. As described in Embodiment F1, it is possible to employ a configuration in which the power changer 14101B is omitted (see FIG. 145). This configuration is equivalent to the configuration in which the value q is fixed to 1 (q=1) in FIG. 141 or FIG. 143. At this time, the present invention can be considered as follows.

"The ratio of the average power of the transmission signal tr1 transmitted from the first transmission antenna to the average power of the transmission signal tr2 transmitted from the second transmission antenna is set to a desired ratio. To satisfy the desired ratio, in FIG. 145, the power changer 14101A may change the value Q according to the insertion frequency of pilot symbols in a transmission frame (e.g., may change the insertion interval of pilot symbols in the frequency domain, may change the insertion interval of pilot symbols in the time domain, or may change the insertion interval of pilot symbols in both the frequency domain and the time domain)."

Alternatively,

"the ratio of the average power of the transmission signal tr1 transmitted from the first transmission antenna to the average power of the transmission signal tr2 transmitted from the second transmission antenna is set to a desired ratio. To satisfy the desired ratio, in FIG. 145, the power changer 14101A may change the value Q according to the value of the average power of pilot symbols (i.e., value of $v_p$) (see FIG. 144)."

Alternatively,

"the ratio of the average power of the transmission signal tr1 transmitted from the first transmission antenna to the average power of the transmission signal tr2 transmitted from the second transmission antenna is set to a desired ratio. To satisfy the desired ratio, in FIG. 145, the power changer 14101A may change the value Q according to the insertion frequency of pilot symbols in a transmission frame (e.g., may change the insertion interval of pilot symbols in the frequency domain, may change the insertion interval of pilot symbols in the time domain, or may change the insertion interval of pilot symbols in both the frequency domain and the time domain) and the value of the average power of pilot symbols (i.e., value of $v_p$) (see FIG. 144)."

Instead of the configuration in which the power changer 14101B is omitted, it is possible to employ a configuration in which the power changer 14101A is omitted (see FIG.

146). This configuration is equivalent to the configuration in which the value Q is fixed to 1 (Q=1) in FIG. 141 and FIG. 143. At this time, the present invention can be considered as follows.

"The ratio of the average power of the transmission signal tr1 transmitted from the first transmission antenna to the average power of the transmission signal tr2 transmitted from the second transmission antenna is set to a desired ratio. To satisfy the desired ratio, in FIG. 146, the power changer 14101B may change the value q according to the insertion frequency of pilot symbols in a transmission frame (e.g., may change the insertion interval of pilot symbols in the frequency domain, may change the insertion interval of pilot symbols in the time domain, or may change the insertion interval of pilot symbols in both the frequency domain and the time domain)."

Alternatively,

"the ratio of the average power of the transmission signal tr1 transmitted from the first transmission antenna to the average power of the transmission signal tr2 transmitted from the second transmission antenna is set to a desired ratio. To satisfy the desired ratio, in FIG. 146, the power changer 14101B may change the value q according to the value of the average power of pilot symbols (i.e., value of $v_p$) (see FIG. 144)".

Alternatively,

"the ratio of the average power of the transmission signal tr1 transmitted from the first transmission antenna to the average power of the transmission signal tr2 transmitted from the second transmission antenna is set to a desired ratio. To satisfy the desired ratio, in FIG. 146, the power changer 14101B may change the value q according to the insertion frequency of pilot symbols in a transmission frame (e.g., may change the insertion interval of pilot symbols in the frequency domain, may change the insertion interval of pilot symbols in the time domain, or may change the insertion interval of pilot symbols in both the frequency domain and the time domain) and the value of the average power of pilot symbols (i.e., value of $v_p$) (see FIG. 144).

Also, the above describes the combinations of modulation schemes for the baseband signals s1 and s2. Specifically, (Modulation scheme for s1, Modulation scheme for s2) is any of (16-QAM, 16-QAM), (QPSK, 16-QAM), and (16-QAM, 64-QAM). However, no limitation is intended thereby. The combination of modulation schemes for the baseband signals s1 and s2 may be a combination other than those described above.

Also, the above describes a case where the precoding matrix F is expressed by formula #P2 or formula #P4. However, no limitation is intended thereby. For example, the precoding matrix F may be expressed by any of the following formulas.

[Math. 121]

$$F = \frac{1}{\sqrt{\alpha^2+1}}\begin{pmatrix} \alpha\times e^{j0} & e^{j\pi} \\ e^{j0} & \alpha\times e^{j0} \end{pmatrix} \quad \text{(Formula \#P14)}$$

[Math. 122]

$$F = \frac{1}{\sqrt{\alpha^2+1}}\begin{pmatrix} e^{j0} & \alpha\times e^{j\pi} \\ \alpha\times e^{j0} & e^{j0} \end{pmatrix} \quad \text{(Formula \#P15)}$$

-continued

[Math. 123]

$$F = \frac{1}{\sqrt{\alpha^2+1}}\begin{pmatrix} \alpha\times e^{j0} & e^{j0} \\ e^{j0} & \alpha\times e^{j\pi} \end{pmatrix} \quad \text{(Formula \#P16)}$$

[Math. 124]

$$F = \frac{1}{\sqrt{\alpha^2+1}}\begin{pmatrix} e^{j\theta_{11}} & \alpha\times e^{j(\theta_{11}+\lambda)} \\ \alpha\times e^{j\theta_{21}} & \alpha\times e^{j(\theta_{21}+\lambda+\pi)} \end{pmatrix} \quad \text{(Formula \#P17)}$$

[Math. 125]

$$F = \frac{1}{\sqrt{\alpha^2+1}}\begin{pmatrix} \alpha\times e^{j\theta_{11}} & e^{j(\theta_{11}+\lambda+\pi)} \\ e^{j\theta_{21}} & \alpha\times e^{j(\theta_{21}+\lambda)} \end{pmatrix} \quad \text{(Formula \#P18)}$$

Note that $\theta_{11}$, $\theta_{21}$, and $\lambda$ in formulas #P17 and #P18 are fixed values. Also, it is possible to use any of the precoding matrices mentioned in the present description.

Embodiment Q1

The present embodiment describes an example of precoding matrices usable in the schemes for performing phase change on a precoded signal described in the above embodiments.

Example 1

The following describes an example of a precoding matrix usable in a scheme for performing precoding on two modulated signals on which mapping for 16-QAM has been performed, and thereafter performing phase change on the precoded signals.

The following describes mapping for 16-QAM with use of FIG. 80. FIG. 80 illustrates an example of a signal point arrangement in the I (in-phase)-Q (quadrature) plane for 16-QAM. Concerning the signal point 8000 in FIG. 80, when the bits transferred (input bits) are b0-b3, that is, when the bits transferred are indicated by (b0, b1, b2, b3)=(1, 0, 0, 0) (this value being illustrated in FIG. 80), the coordinates in the I (in-phase)-Q (quadrature) plane corresponding thereto are denoted as (I,Q)=(−3×g,3×g). The values of coordinates I and Q in this set of coordinates indicate the mapped signals. Note that, when the bits (b0, b1, b2, b3) transferred take other values than in the above, the set of values I and Q is determined according to the values of the bits (b0, b1, b2, b3) transferred and according to FIG. 80. Further, similarly to the case above, the values of coordinates I and Q in this set indicate the mapped signals (s1 and s2). Note that when the modulation scheme applied to s1 and s2 is switched to a modulation scheme other than 16-QAM, the value g for equalizing the average power in 16-QAM and the average power in the other modulation scheme is expressed by formula 79, for example.

The following formula #Q1, which is described as an example in the present embodiment, represents the baseband signals z1 (*t*) and z2(*t*) generated by performing precoding and phase change on the modulated signals s1(*t*) and s2(*t*).

[Math. 126]

$$\begin{pmatrix} z1(t) \\ z2(t) \end{pmatrix} = \sqrt{2}\begin{pmatrix} 1 & 0 \\ 0 & y(t) \end{pmatrix}\begin{pmatrix} Qe^{j0} & 0 \\ 0 & qe^{j0} \end{pmatrix} F\begin{pmatrix} ve^{j0} & 0 \\ 0 & ue^{j0} \end{pmatrix}\begin{pmatrix} s1(t) \\ s2(t) \end{pmatrix} = \sqrt{2}\begin{pmatrix} 1 & 0 \\ 0 & y(t) \end{pmatrix}\begin{pmatrix} Q & 0 \\ 0 & q \end{pmatrix} F\begin{pmatrix} v & 0 \\ 0 & u \end{pmatrix}\begin{pmatrix} s1(t) \\ s2(t) \end{pmatrix} \quad \text{(Formula \#Q1)}$$

The following describes a case where power change is not performed before or after precoding. In this case, the values Q and q and the values v and u for power change in formula #Q1 are set to $Q^2=0.5$ and $v^2=u^2=0.5$, respectively, and formula #Q1 can be transformed to formula #Q2 below.

[Math. 127]

$$\begin{pmatrix} z1(t) \\ z2(t) \end{pmatrix} = \frac{1}{\sqrt{2}}\begin{pmatrix} 1 & 0 \\ 0 & y(t) \end{pmatrix} F\begin{pmatrix} s1(t) \\ s2(t) \end{pmatrix} \quad \text{(Formula \#Q2)}$$

The following describes an example of a precoding matrix that allows the reception device to obtain high reception quality, when the transmission device performs precoding and phase change on the modulated signals s1($t$) and s2($t$) in the 16-QAM modulation scheme according to the above formulas #Q1 and #Q2. First, description is provided on the case where the following formula #Q3 is used as a precoding matrix.

[Math. 128]

$$F = \frac{1}{\sqrt{\alpha^2+1}}\begin{pmatrix} e^{j0} & \alpha\times e^{j0} \\ \alpha\times e^{j0} & e^{j\pi} \end{pmatrix} \quad \text{(Formula \#Q3)}$$

In this case, the value a is set so as to satisfy the following formula.

[Math. 129]

$$\alpha = \frac{5}{4} \quad \text{(Formula \#Q4)}$$

When the modulation schemes of s1($t$) and s2($t$) are each 16-QAM, and a satisfies formula #Q4 in the precoding matrix, z1($t$) and z2($t$) are baseband signals each corresponding to one of 256 signal points arranged at different positions in the I-Q plane in FIG. 147. Note that the signal point arrangement in FIG. 147 is a signal point arrangement when phase change is not performed, i.e., when the amount of phase change is 0. When the amount of phase change is not 0 (or an integral multiple of 2π), the signal point arrangement of z2($t$) is a phase-rotated arrangement of the signal points in the I-Q plane in FIG. 147 about the origin.

Each of s1($t$) and s2($t$) in the 16-QAM modulation scheme is generated from 4-bit data. Accordingly, z1($t$) and z2($t$) generated by performing precoding on s1($t$) and s2($t$) according to the precoding matrix of formula #Q3 are each a baseband signal generated from 8-bit data in total. As described above, when a satisfies formula #Q4, each of the signals after precoding is a baseband signal corresponding to one of the 256 signal points arranged at different positions in the I-Q plane. In other words, 256 possible values for 8-bit data correspond one-to-one to the 256 signal points in the I-Q plane in FIG. 147, and precoded signals that are each generated from different 8-bit data are not arranged at the same position in the I-Q plane.

On the other hand, there is a case where depending on the value a, a signal z1($t$) generated from first data having a first value and a signal z1($t$) generated from second data having a second value differing from the first value may overlap in the I-Q plane, i.e., may be arranged at the same position in the I-Q plane. In this case, even if the reception device can completely separate the signals z1($t$) from signals z2($t$), the reception device cannot determine whether the data transferred by each of the signals z1($t$) is the first data or the second data. This may lower data reception quality. Such a problem may similarly occur in the case of the signals z2($t$). On the other hand, when a satisfies formula #Q4, the positions of the 256 signal points in the I-Q plane in FIG. 147 correspond one-to-one to the 256 possible values for 8-bit data. As a result, the positions of signal points do not overlap, and the reception device is more likely to obtain high reception quality as compared to the case where the positions of signal points overlap.

In particular, when a satisfies formula #Q4, the positions of the 256 signal points in the I-Q plane in FIG. 147 correspond one-to-one to the 256 possible values for 8-bit data, and also the Euclidian distance between each of 252 signal points and the closest neighbouring signal point is equal. Here, the 252 signal points exclude 4 signal points in the upper right, lower right, upper left, and lower left from the 256 signal points in the I-Q plane in FIG. 147. Accordingly, when a satisfies formula #Q4, the reception device is highly likely to obtain high reception quality.

Next, description is provided on the case where the following formula #Q5 is used as a precoding matrix instead of formula #Q3.

[Math. 130]

$$F = \begin{pmatrix} \cos\theta & \sin\theta \\ \sin\theta & -\cos\theta \end{pmatrix} \quad \text{(Formula \#Q5)}$$

In this case, the value θ is set so as to satisfy the following formula.

[Math. 131]

$$\theta = \tan^{-1}\left(\frac{5}{4}\right) \quad \text{(Formula \#Q6)}$$

As such, z1($t$) and z2($t$) are baseband signals each corresponding to one of the 256 signal points in the I-Q plane in FIG. 147. This allows the reception device to obtain high reception quality, similarly to the case where a satisfies formula #Q4 in the precoding matrix of formula #Q3.

Note that as an approximate value, the value θ may be set so as to satisfy the following formula.

[Math. 132]

θ=51 deg (Formula #Q7)

Even in this case, the same effect as in the case where the value θ satisfies formula #Q6 is obtained.

Also, the above describes a case where the precoding matrix F is expressed by formula #Q3 or formula #Q5. However, no limitation is intended thereby. For example, the precoding matrix F may be one of the following formulas:

[Math. 133]

$$F=\frac{1}{\sqrt{\alpha^2+1}}\begin{pmatrix}\alpha\times e^{j0} & e^{j0}\\ e^{j0} & \alpha\times e^{j\pi}\end{pmatrix} \quad \text{(Formula \#Q8)}$$

[Math. 134]

$$F=\frac{1}{\sqrt{\alpha^2+1}}\begin{pmatrix}e^{j0} & \alpha\times e^{j\pi}\\ \alpha\times e^{j0} & e^{j0}\end{pmatrix} \quad \text{(Formula \#Q9)}$$

[Math. 135]

$$F=\frac{1}{\sqrt{\alpha^2+1}}\begin{pmatrix}\alpha\times e^{j0} & e^{j\pi}\\ e^{j0} & \alpha\times e^{j0}\end{pmatrix} \quad \text{(Formula \#Q10)}$$

where a satisfies formula #Q4. Alternatively, for example, the precoding matrix F may be one of the following formulas:

[Math. 136]

$$F=\begin{pmatrix}\cos\theta & -\sin\theta\\ \sin\theta & \cos\theta\end{pmatrix} \quad \text{(Formula \#Q11)}$$

[Math. 137]

$$F=\begin{pmatrix}\sin\theta & \cos\theta\\ \cos\theta & -\sin\theta\end{pmatrix} \quad \text{(Formula \#Q12)}$$

[Math. 138]

$$F=\begin{pmatrix}\sin\theta & -\cos\theta\\ \cos\theta & \sin\theta\end{pmatrix} \quad \text{(Formula \#Q13)}$$

where θ satisfies formula #Q6 or formula #Q7.

In the above, description is provided on the case where the baseband signals z1(*t*) and z2(*t*) are expressed by formulas #Q1 and #Q2; however, the baseband signals z1(*t*) and z2(*t*) can be expressed by a formula differing from formula #Q1. For example, the baseband signals z1(*t*) and z2(*t*) can be expressed by formula #Q14 below.

[Math. 139]

$$\begin{pmatrix}z1(t)\\ z2(t)\end{pmatrix}=\sqrt{2}\begin{pmatrix}Q & 0\\ 0 & q\end{pmatrix}\frac{1}{\sqrt{\alpha^2+1}}\begin{pmatrix}e^{j\theta_{11}(t)} & \alpha\times e^{j(\theta_{11}(t)+\lambda)}\\ \alpha\times e^{j\theta_{21}(t)} & e^{j(\theta_{21}(t)+\lambda+\pi)}\end{pmatrix}\begin{pmatrix}v & 0\\ 0 & u\end{pmatrix}\begin{pmatrix}s1(t)\\ s2(t)\end{pmatrix} \quad \text{(Formula \#Q14)}$$

In the above formula, $\theta_{11}(t)$ and $\theta_{21}(t)$ are each a function of t, and λ is a value of an integral multiple of π/2, including 0. In this case as well, if a satisfies formula #Q4, it is possible to obtain the same effect as in the case where formula #Q3 is used as a precoding matrix in formula #Q1 or formula #Q2, and α satisfies formula #Q4.

In the present embodiment, description is provided on the case where power change is not performed before or after precoding. However, it is possible to employ a configuration where power change is not performed before precoding but is performed after precoding. In this case, the signal point arrangement of the baseband signals resulting from the modulated signals s1(*t*) and s2(*t*) being subjected to precoding and power change is obtained by changing the amplitude of each of the 256 signal points in the I-Q plane in FIG. 147 according to the values Q and q for power change.

Note that the present embodiment is based on the presumption that phase change is performed on the signals after precoding. However, even if phase change is not performed, precoding is performed on the signals according to any of the aforementioned precoding matrices, so that the precoded signals become the baseband signals each corresponding to one of the 256 signal points in FIG. 147. Accordingly, even in a system where phase change is not performed after precoding, the reception device is likely to obtain high reception quality by applying any of the aforementioned precoding matrices to the signals.

Example 2

The following describes an example of a precoding matrix usable in a scheme for performing precoding on two modulated signals on which mapping for 64-QAM has been performed, and thereafter performing phase change on the precoded signals.

The following describes mapping for 64-QAM with use of FIG. 86. FIG. 86 illustrates an example of a signal point arrangement in the I (in-phase)-Q (quadrature) plane for 64-QAM. Concerning the signal point 8600 in FIG. 86, when the bits transferred (input bits) are b0-b5, that is, when the bits transferred are indicated by (b0, b1, b2, b3, b4, b5)=(1, 0, 0, 0, 0, 0) (this value being illustrated in FIG. 86), the coordinates in the I (in-phase)-Q (quadrature) plane corresponding thereto are denoted as (I,Q)=(−7×k,7×k). The values of coordinates I and Q in this set of coordinates indicate the mapped signals. Note that, when the bits (b0, b1, b2, b3, b4, b5) transferred take other values than in the above, the set of values I and Q is determined according to the values of the bits (b0, b1, b2, b3, b4, b5) transferred and according to FIG. 86. Further, similarly to the case above, the values of coordinates I and Q in this set indicate the mapped signals (s1 and s2).

Note that when the modulation scheme applied to s1 and s2 is switched to a modulation scheme other than 64-QAM, the value k for equalizing the average power in 64-QAM and the average power in the other modulation scheme is expressed by formula 85, for example.

The following describes an example of a precoding matrix that allows the reception device to obtain high reception quality, when the transmission device performs precoding and phase change on the modulated signals s1(*t*) and s2(*t*) in the 64-QAM modulation scheme according to the above formulas #Q1 and #Q2. First, description is provided on the case where formula #Q3 is used as a precoding matrix.

When 64-QAM is used as a modulation scheme for the modulated signals s1(*t*) and s2(*t*), α in formula #Q3 is set so as to satisfy the following formula.

[Math. 140]

$$\alpha=\frac{9}{8} \quad \text{(Formula \#Q15)}$$

In this case, $z1(t)$ and $z2(t)$ are baseband signals each corresponding to one of 4096 signal points arranged at different positions in the I-Q plane in FIG. 148. Note that the signal point arrangement in FIG. 148 is a signal point arrangement when phase change is not performed, i.e., when the amount of phase change is 0. When the amount of phase change is not 0 (or an integral multiple of 2π), the signal point arrangement of $z2(t)$ is a phase-rotated arrangement of the signal points in the I-Q plane in FIG. 148 about the origin.

Each of $s1(t)$ and $s2(t)$ in the 64-QAM modulation scheme is generated from 6-bit data. Accordingly, $z1(t)$ and $z2(t)$ generated by performing precoding on $s1(t)$ and $s2(t)$ according to the precoding matrix of formula #Q3 are each a baseband signal generated from 12-bit data in total. As described above, when a satisfies formula #Q15, each of the signals after precoding is a baseband signal corresponding to one of the 4096 signal points arranged at different positions in the I-Q plane. In other words, 4096 possible values for 12-bit data correspond one-to-one to the 4096 signal points in the I-Q plane in FIG. 148, and precoded signals that are each generated from different 12-bit data are not arranged at the same position in the I-Q plane.

On the other hand, there is a case where depending on the value α, a signal $z1(t)$ generated from first data having a first value and a signal $z1(t)$ generated from second data having a second value differing from the first value may overlap in the I-Q plane, i.e., may be arranged at the same position in the I-Q plane. In this case, even if the reception device can completely separate the signals $z1(t)$ from signals $z2(t)$, the reception device cannot determine whether the data transferred by each of the signals $z1(t)$ is the first data or the second data. This may lower data reception quality. Such a problem may similarly occur in the case of the signals $z2(t)$. On the other hand, when α satisfies formula #Q15, the positions of the 4096 signal points in the I-Q plane in FIG. 148 correspond one-to-one to the 4096 possible values for 12-bit data. As a result, the positions of signal points do not overlap, and the reception device is more likely to obtain high reception quality as compared to the case where the positions of signal points overlap.

In particular, when a satisfies formula #Q15, the positions of the 4096 signal points in the I-Q plane in FIG. 148 correspond one-to-one to the 4096 possible values for 12-bit data, and also the Euclidian distance between each of 4092 signal points and the closest neighbouring signal point is equal. Here, the 4092 signal points exclude 4 signal points in the upper right, lower right, upper left, and lower left from the 4096 signal points in the I-Q plane in FIG. 148. Accordingly, when a satisfies formula #Q15, the reception device is highly likely to obtain high reception quality.

Next, description is provided on the case where the following formula #Q5 is used as a precoding matrix instead of formula #Q3.

When 64-QAM is used as a modulation scheme for the modulated signals $s1(t)$ and $s2(t)$, θ in formula #Q5 is set so as to satisfy the following formula.

[Math. 141]

$$\theta = \tan^{-1}\left(\frac{9}{8}\right) \quad \text{(Formula \#Q16)}$$

As such, $z1(t)$ and $z2(t)$ are baseband signals each corresponding to one of the 4096 signal points in the I-Q plane in FIG. 148. This allows the reception device to obtain high reception quality, similarly to the case where a satisfies formula #Q15 in the precoding matrix of formula #Q3.

Note that as an approximate value, the value θ may be set so as to satisfy the following formula.

[Math. 142]

$$\theta = 48 \text{ deg} \quad \text{(Formula \#Q17)}$$

Even in this case, the same effect as in the case where the value θ satisfies formula #Q16 is obtained.

Also, the above describes a case where the precoding matrix F is expressed by formula #Q3 or formula #Q5. However, no limitation is intended thereby. For example, the precoding matrix F may be one of formulas #Q8, #Q9, and #Q10, where a satisfies formula #Q15. Alternatively, for example, the precoding matrix F may be one of formulas #Q11, #Q12, and #Q13, where θ satisfies formula #Q16 or formula #Q17.

In the above, description is provided on the case where the baseband signals $z1(t)$ and $z2(t)$ are expressed by formulas #Q1 and #Q2; however, the baseband signals $z1(t)$ and $z2(t)$ can be expressed by formula #Q14 where a satisfies #Q15.

In the present embodiment, description is provided on the case where power change is not performed before or after precoding. However, it is possible to employ a configuration where power change is not performed before precoding but is performed after precoding. In this case, the signal point arrangement of the baseband signals resulting from the modulated signals $s1(t)$ and $s2(t)$ being subjected to precoding and power change is obtained by changing the amplitude of each of the 4096 signal points in the I-Q plane in FIG. 148 according to the values Q and q for power change.

Note that the present embodiment is based on the presumption that phase change is performed on the signals after precoding. However, even if phase change is not performed, precoding is performed on the signals according to any of the aforementioned precoding matrices, so that the precoded signals become the baseband signals each corresponding to one of the 4096 signal points in FIG. 148. Accordingly, even in a system where phase change is not performed after precoding, the reception device is likely to obtain high reception quality by applying any of the aforementioned precoding matrices to the signals.

Example 3

The following describes an example of a precoding matrix usable in a scheme for performing precoding on two modulated signals on which mapping for 256-QAM has been performed, and thereafter performing phase change on the precoded signals.

The following describes mapping for 256-QAM with use of FIG. 149. FIG. 149 illustrates an example of a signal point arrangement in the I (in-phase)-Q (quadrature) plane for 256-QAM. Concerning the signal point 14900 in FIG. 149, when the bits transferred (input bits) are b0-b7, that is, when the bits transferred are indicated by (b0, b1, b2, b3, b4, b5, b6, b7)=(1, 0, 0, 0, 0, 0, 0, 0) (this value being illustrated in FIG. 149), the coordinates in the I (in-phase)-Q (quadrature) plane corresponding thereto are denoted as (I,Q)=(−15×r, 15×r). The values of coordinates I and Q in this set of coordinates indicate the mapped signals. Note that, when the bits (b0, b1, b2, b3, b4, b5, b6, b7) transferred take other values than in the above, the set of values I and Q is determined according to the values of the bits (b0, b1, b2, b3, b4, b5, b6, b7) transferred and according to FIG. 149.

Further, similarly to the case above, the values of coordinates I and Q in this set indicate the mapped signals (s1 and s2).

Note that when the modulation scheme applied to s1 and s2 is switched to a modulation scheme other than 256-QAM, the value r for equalizing the average power in 256-QAM and the average power in the other modulation scheme is expressed by formula #Q18, for example.

[Math. 143]

$$r = \frac{Z}{\sqrt{170}} \quad \text{(Formula \#Q18)}$$

Note that z in formula #Q18 may be any value as long as the value is the same as z in formula 79 and formula 85. For example, z=1 is commonly used in formula #Q18, formula 79, and formula 85.

The following describes an example of a precoding matrix that allows the reception device to obtain high reception quality, when the transmission device performs precoding and phase change on the modulated signals s1($t$) and s2($t$) in the 256-QAM modulation scheme according to the above formulas #Q1 and #Q2. First, description is provided on the case where formula #Q3 is used as a precoding matrix.

When 256-QAM is used as a modulation scheme for the modulated signals s1($t$) and s2($t$), α in formula #Q3 is set so as to satisfy the following formula.

[Math. 144]

$$\alpha = \frac{17}{16} \quad \text{(Formula \#Q19)}$$

In this case, z1($t$) and z2($t$) are baseband signals each corresponding to one of 65536 signal points arranged at different positions in the I-Q plane. Note that a figure illustrating an example in which the 256-QAM modulation scheme is used for the modulated signals s1($t$) and s2($t$) is omitted in the present description, since there are 65536 signal points, which are too many to be identified in a figure.

Each of s1($t$) and s2($t$) in the 256-QAM modulation scheme is generated from 8-bit data. Accordingly, z1($t$) and z2($t$) generated by performing precoding on s1($t$) and s2($t$) according to the precoding matrix of formula #Q3 are each a baseband signal generated from 16-bit data in total. In other words, 65536 possible values for 16-bit data correspond one-to-one to the 65536 signal points arranged at different positions in the I-Q plane described above, and precoded signals that are each generated from different 16-bit data are not arranged at the same position in the I-Q plane.

On the other hand, there is a case where depending on the value a, a signal z1($t$) generated from first data having a first value and a signal z1($t$) generated from second data having a second value differing from the first value may overlap in the I-Q plane, i.e., may be arranged at the same position in the I-Q plane. In this case, even if the reception device can completely separate the signals z1($t$) from signals z2($t$), the reception device cannot determine whether the data transferred by each of the signals z1($t$) is the first data or the second data. This may lower data reception quality. Such a problem may similarly occur in the case of the signals z2($t$). On the other hand, when a satisfies formula #Q19, the positions of the 65536 signal points arranged at different positions in the I-Q plane correspond one-to-one to the 65536 possible values for 16-bit data. As a result, the positions of signal points do not overlap, and the reception device is more likely to obtain high reception quality as compared to the case where the positions of signal points overlap.

In particular, when α satisfies formula #Q19, the positions of the 65536 signal points arranged at different positions in the I-Q plane correspond one-to-one to the 65536 possible values for 16-bit data, and also the Euclidian distance between each of 65532 signal points and the closest neighbouring signal point is equal. Here, the 65532 signal points exclude 4 signal points in the upper right, lower right, upper left, and lower left from the 65536 signal points in the I-Q plane. Accordingly, when a satisfies formula #Q19, the reception device is highly likely to obtain high reception quality.

Next, description is provided on the case where the following formula #Q5 is used as a precoding matrix instead of formula #Q3.

When 256-QAM is used as a modulation scheme for the modulated signals s1($t$) and s2($t$), θ in formula #Q5 is set so as to satisfy the following formula.

[Math. 145]

$$\theta = \tan^{-1}\left(\frac{17}{16}\right) \quad \text{(Formula \#Q20)}$$

As such, z1($t$) and z2($t$) are baseband signals each corresponding to one of the 65536 signal points arranged at different positions in the I-Q plane. This allows the reception device to obtain high reception quality, similarly to the case where a satisfies formula #Q19 in the precoding matrix of formula #Q3.

Note that as an approximate value, the value θ may be set so as to satisfy the following formula.

[Math. 146]

$$\theta = 47 \text{ deg} \quad \text{(Formula \#Q21)}$$

Even in this case, the same effect as in the case where the value θ satisfies formula #Q20 is obtained.

Also, the above describes a case where the precoding matrix F is expressed by formula #Q3 or formula #Q5. However, no limitation is intended thereby. For example, the precoding matrix F may be one of formulas #Q8, #Q9, and #Q10, where a satisfies formula #Q19. Alternatively, for example, the precoding matrix F may be one of formulas #Q11, #Q12, and #Q13, where θ satisfies formula #Q20 or formula #Q21.

In the above, description is provided on the case where the baseband signals z1($t$) and z2($t$) are expressed by formulas #Q1 and #Q2; however, the baseband signals z1($t$) and z2($t$) can be expressed by formula #Q14 where a satisfies #Q19.

In the present embodiment, description is provided on the case where power change is not performed before or after precoding. However, it is possible to employ a configuration where power change is not performed before precoding but is performed after precoding. In this case, the signal point arrangement of the baseband signals resulting from the modulated signals s1($t$) and s2($t$) being subjected to precoding and power change is obtained by changing the amplitude of each of the 65536 signal points arranged at different positions in the I-Q plane according to the values Q and q for power change.

Note that the present embodiment is based on the presumption that phase change is performed on the signals after precoding. However, even if phase change is not performed, precoding is performed on the signals according to any of the aforementioned precoding matrices, so that the precoded signals become the baseband signals each corresponding to one of the 65536 signal points arranged at different positions in the I-Q plane. Accordingly, even in a system where phase change is not performed after precoding, the reception device is likely to obtain high reception quality by applying any of the aforementioned precoding matrices to the signals.

INDUSTRIAL APPLICABILITY

The present invention is widely applicable to wireless systems that transmit different modulated signals from a plurality of antennas, such as an OFDM-MIMO system. Furthermore, in a wired communication system with a plurality of transmission locations (such as a Power Line Communication (PLC) system, optical communication system, or Digital Subscriber Line (DSL) system), the present invention may be adapted to MIMO, in which case a plurality of transmission locations are used to transmit a plurality of modulated signals as described by the present invention. A modulated signal may also be transmitted from a plurality of transmission locations.

REFERENCE SIGNS LIST

302A, 302B Encoders
304A, 304B Interleavers
306A, 306B Mappers
314 Signal processing scheme information generator
308A, 308B Weighting units
310A, 310B Wireless units
312A, 312B Antennas
317A, 317B Phase changers
402 Encoder
404 Distributor
504#1, 504#2 Transmit antennas
505#1, 505#2 Receive antennas
600 Weighting unit
701_X, 701_Y Antennas
703_X, 703_Y Wireless units
705_1 Channel fluctuation estimator
705_2 Channel fluctuation estimator
707_1 Channel fluctuation estimator
707_2 Channel fluctuation estimator
709 Control information decoder
711 Signal processor
803 Inner MIMO detector
805A, 805B Log-likelihood calculators
807A, 807B Deinterleavers
809A, 809B Log-likelihood ratio calculators
811A, 811B Soft-in/soft-out decoders
813A, 813B Interleavers
815 Memory
819 Coefficient generator
901 Soft-in/soft-out decoder
903 Distributor
1201A, 1201B OFDM-related processors
1302A, 1302A Serial-to-parallel converters
1304A, 1304B Reorderers
1306A, 1306B IFFT units
1308A, 1308B Wireless units

The invention claimed is:

1. A transmission apparatus comprising:

signal processing circuitry configured to (i) generate a Quadrature Phase Shift Keying (QPSK) modulation signal s1(*t*) by applying a QPSK modulation scheme to a first data sequence, (ii) generate a 16-Quadrature Amplitude Modulation (QAM) modulation signal s2(*t*) by applying a 16-QAM modulation scheme to a second data sequence, and (iii) generate a first transmission signal z1(*t*) and a second transmission signal z2(*t*) by applying a phase hopping process, a precoding process, and a power adjust process indicated in Equation 1 to the QPSK modulation signal s1(*t*) and the 16-QAM modulation signal s2(*t*); and a transmitter configured to transmit the first transmission signal z1(*t*) and the second transmission signal z2(*t*) according to a Multiple-Input Multiple-Output scheme such that two bits of the QPSK modulation signal s1(*t*) and four bits of the 16-QAM modulation signal s2(*t*) are transmitted in per slot, wherein $$\begin{pmatrix} z1(t) \\ z2(t) \end{pmatrix} = \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} \quad \text{(Equation 1)}$$

where y(t) indicates an amount of change in phase, F indicates a matrix for the precoding process, v is a positive real number and a coefficient for power changing the QPSK modulation signal s1(*t*), u is a positive real number larger than v and a coefficient for power changing the 16-QAM modulation signal s2(*t*), and t indicates a slot.

2. The transmission apparatus according to claim 1, wherein v and u in Equation 1 are provided such that $v^2:u^2$ is equal to 1:2.

* * * * *